US009306993B2

(12) United States Patent
Maeda et al.

(10) Patent No.: US 9,306,993 B2
(45) Date of Patent: Apr. 5, 2016

(54) MOBILE COMMUNICATION SYSTEM

(71) Applicant: TCL COMMUNICATION TECHNOLOGY HOLDINGS LIMITED, Kowloon (HK)

(72) Inventors: Miho Maeda, Tokyo (JP); Mituru Mochizuki, Tokyo (JP); Yasushi Iwane, Tokyo (JP); Taiga Saegusa, Tokyo (JP)

(73) Assignee: TCL COMMUNICATION TECHNOLOGY HOLDINGS LIMITED, Kowloon (HK)

( * ) Notice: Subject to any disclaimer, the term of this patent is extended or adjusted under 35 U.S.C. 154(b) by 0 days.

(21) Appl. No.: 14/339,880

(22) Filed: Jul. 24, 2014

(65) Prior Publication Data

US 2014/0362756 A1  Dec. 11, 2014

Related U.S. Application Data

(62) Division of application No. 12/808,960, filed as application No. PCT/JP2008/003730 on Dec. 12, 2008, now Pat. No. 8,811,252.

(30) Foreign Application Priority Data

Dec. 17, 2007  (JP) ................. 2007-324525

(51) Int. Cl.
*H04W 12/00* (2009.01)
*H04L 29/06* (2006.01)
(Continued)

(52) U.S. Cl.
CPC .......... *H04L 65/4076* (2013.01); *H04L 5/0007* (2013.01); *H04L 5/0053* (2013.01); *H04W 72/005* (2013.01); *H04W 72/0466* (2013.01); *H04W 68/12* (2013.01)

(58) Field of Classification Search
CPC .................................................. H04W 72/005
See application file for complete search history.

(56) References Cited

U.S. PATENT DOCUMENTS

2004/0202140 A1  10/2004  Kim et al.
2004/0253959 A1  12/2004  Hwang et al.
(Continued)

FOREIGN PATENT DOCUMENTS

JP  2009-171013  7/2009
JP  2009-182575  8/2009
(Continued)

OTHER PUBLICATIONS

"UE Capability for Dedicated Carrier MBMS and Unicast Reception", Nokia, NTT DoCoMo, 3GPP TSG-RAN WG 2. Meeting #56, R2-063066, Total pp. 7 (Nov. 6-10, 2006).
(Continued)

*Primary Examiner* — John Blanton
(74) *Attorney, Agent, or Firm* — Shimokaji IP

(57) ABSTRACT

A communication system has three types of cells including, in addition to an MBMS dedicated cell, a unicast cell to and from which a mobile terminal can transmit and receive individual communication data, and a unicast/MBMS-mixed cell which can provide both a service provided by the unicast cell and a service provided by the MBMS dedicated cell. While receiving the broadcast type data transmitted from the MBMS dedicated cell, the mobile terminal makes a notification of an MBMS receiving state via the unicast cell or the unicast/MBMS-mixed cell to transmit information for identifying the MBMS dedicated cell, and the communication system transmits a paging signal to the mobile terminal currently receiving the broadcast type data transmitted from the MBMS dedicated cell on the basis of a tracking area (Tracking Area) in which the mobile terminal is tracked, the tracking area being determined on the basis of the information transmitted.

3 Claims, 88 Drawing Sheets

(51) Int. Cl.
*H04L 5/00* (2006.01)
*H04W 72/00* (2009.01)
*H04W 72/04* (2009.01)
*H04W 68/12* (2009.01)

(56) References Cited

U.S. PATENT DOCUMENTS

| | | | |
|---|---|---|---|
| 2005/0085183 A1* | 4/2005 | Lee | 455/3.01 |
| 2007/0025297 A1 | 2/2007 | Lee et al. | |
| 2007/0249282 A1 | 10/2007 | Shaheen | |
| 2008/0101317 A1 | 5/2008 | Bouazizi | |
| 2008/0280637 A1 | 11/2008 | Shaffer et al. | |
| 2009/0010196 A1 | 1/2009 | Bui et al. | |
| 2009/0073909 A1* | 3/2009 | Cai et al. | 370/312 |
| 2009/0305711 A1 | 12/2009 | Rinne et al. | |
| 2010/0151869 A1* | 6/2010 | Fischer et al. | 455/450 |
| 2010/0165901 A1* | 7/2010 | Kim | 370/312 |

FOREIGN PATENT DOCUMENTS

| | | |
|---|---|---|
| JP | 2009-182944 | 8/2009 |
| JP | 2009-188612 | 8/2009 |
| WO | WO 2006/104335 A2 | 10/2006 |

OTHER PUBLICATIONS

"Discussion of MBMS Dedicated Cell and Paging Configuration", Alcatel, TSG-RAN WG2 Meeting #55, R2-063284, Total pp. 4 (Nov. 6-10, 2006).

"Evolved Universal Terrestrial Radio Access (E-UTRA) and Evolved Universal Terrestrial Radio Access Network", 3GPP TS 36.300 V8.2.0, Release 8, pp. 1-86, (Sep. 2007).

"Hierarchical Network Configuration for LTE MBMS", Alcatel, 3GPP TSG-RAN WG RAN2 #55, R2-063311, Total pp. 4, ( Nov. 5-10, 2006).

"Signaling of MBSFN Subframe Allocation in D-BCH", Nokia Siemens Networks, 3GPP TSG-RAN WG1 Metting #49bis, R1-072963, Total pp. 3 (Jun. 25-29, 2007).

"E-UTRA DEL L1/L2 Control Channel Design-PICH/AICH/D-BCH", Motorola, 3GPP TSG RANI #51bis, R1-080073, Total pp. 6, (Jan. 14-18, 2008).

"Paging Formula", NTT DoCoMo, Inc., 3GPP TSG RAN WG2 #60bis, Tdoc-R2-080463, Total pp. 2 (Jan. 14-18, 2008).

"Measurement Rules, Objects and Mapping", NTT DoCoMo, Inc., 3GPP TSG RAN WG2 RRC Ad Hoc, Tdoc-R2-075570, Total pp. 4 (Dec. 13-14, 2007).

"Physical Channels and Modulation", 3GPP TS 36.211 V8.4.0, Release 8, pp. 61-68 (Sep. 2008).

"Radio Resource Control (RRC)", 3GPP TS 36.331 V8.3.0, Release 8, pp. 22-23 and 91-92 (Sep. 2008).

"User Equipment (UE) Radio Access Capabilities", 3GPP TS 36.306 V8.2.0, Release 8, pp. 1-13 (May 2008).

Office Action issued Nov. 12, 2013, in Japanese Patent Application No. 2013-049245 with English translation.

"On MBMS service continuity" by Nokia, and Nokia Siemens Networks, R2-074853, 3GPP TSG-RAN WG2 Meeting # 60, Nov. 5-9, 2007, 6 pages.

"MBMS Agreements" by Nokia, NSN, and Samsung, R2-071733, 3GPP TSG-RAN WG2 Meeting # 58, May 7-11, 2007, 2 pages.

Japanese Office Action issued Sep. 9, 2014 in Patent Application No. 2014-003410 with Partial English Translation.

QUALCOMM Europe, "MCCH Scheduling and UE Duly Cycle", 3GPP TSG-RAN WG2 #59, *R2-073442*, Aug. 24, 2007, 3 pages.

* cited by examiner

FIG.5
[A]
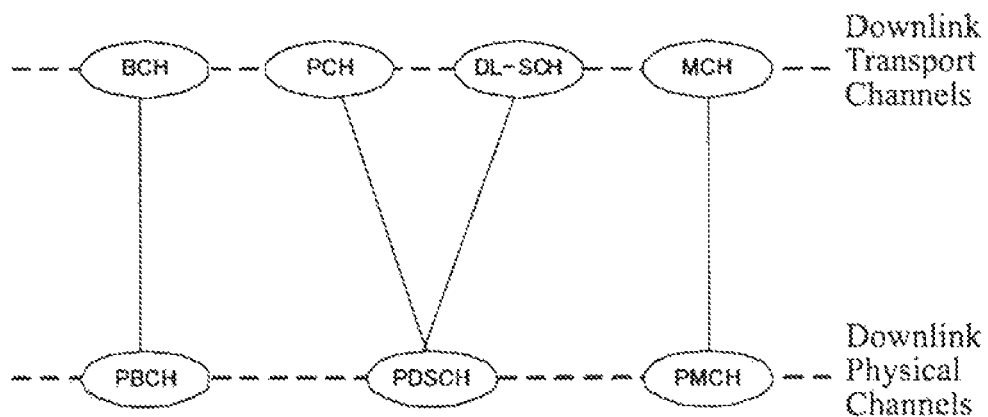
[B]
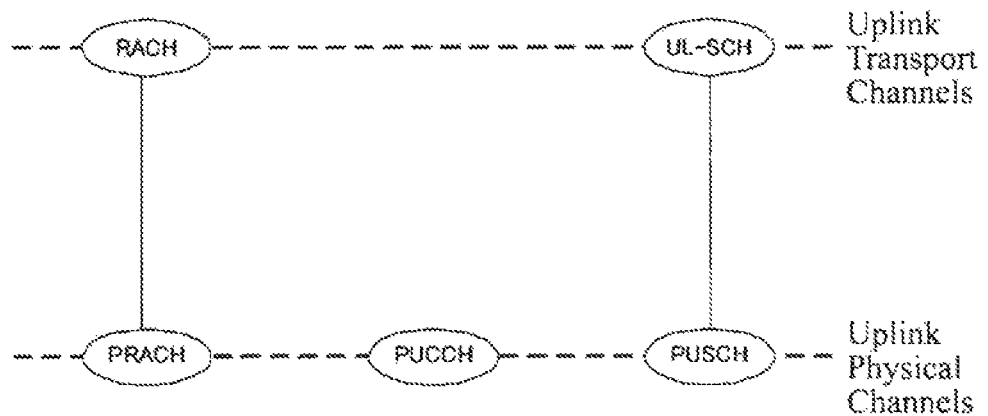

FIG.6
[A]
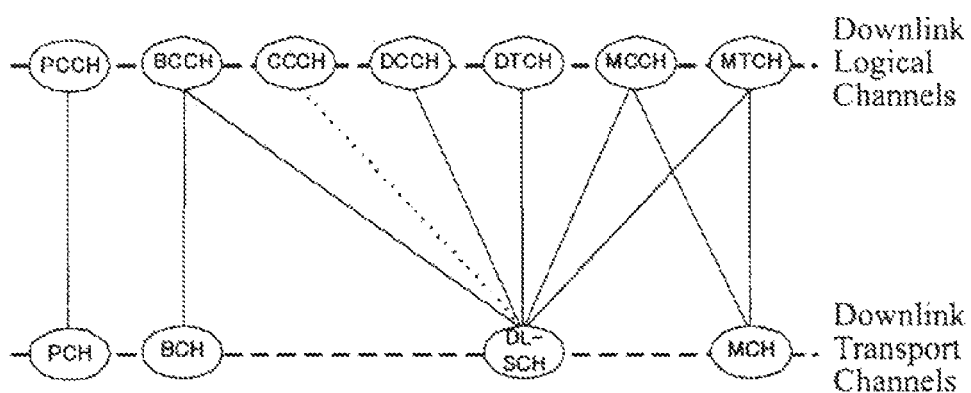
Downlink Logical Channels
Downlink Transport Channels
[B]
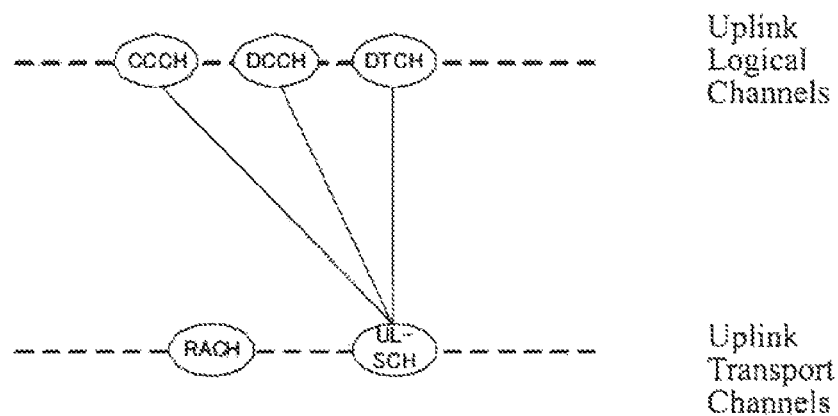
Uplink Logical Channels
Uplink Transport Channels

| UE #1<br>(UE-ID #1) | TA (unicast) #1 |
| --- | --- |
|  | TA (unicast) #2 |

| UE #2<br>(UE-ID #2) | TA (unicast) #1 |
| --- | --- |
|  | TA (MBMS) #1 |

[b]

| TA (unicast) #1 | Cell ID 1<br>2<br>3<br>4<br>5 |
| --- | --- |
| TA (unicast) #2 | Cell ID 23<br>24<br>25 |

[c]

| TA (MBMS) #1 | f (MBMS) 1, MBSFN Area 1 |
| --- | --- |
| TA (MBMS) #2 | f (MBMS) 1, MBSFN Area 2 |

[d]

| f (MBMS) 1, MBSFN Area 1 | MCE #1 |
| --- | --- |
| f (MBMS) 1, MBSFN Area 2 | MCE #2 |

[e]

| f (MBMS) 1, MBSFN Area 1 | Cell ID 101, 102, 103 |
| --- | --- |
| f (MBMS) 1, MBSFN Area 2 | Cell ID 153, 154 |

FIG.32
Configuration of PMCH Provided with Area for Paging Signal
(a)
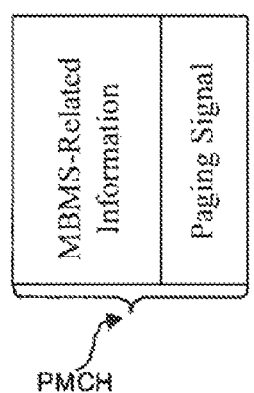
(b)
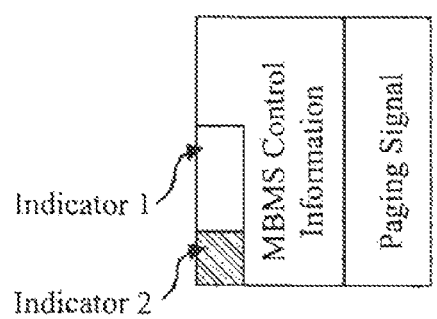
(c)
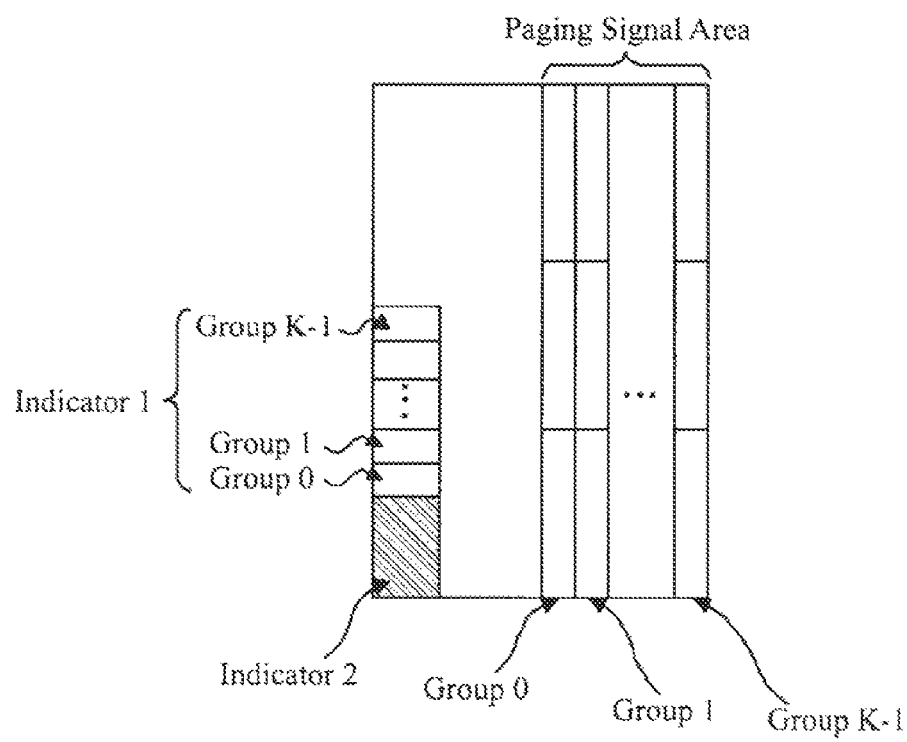

| | | Number of Receivers | Number of Settings of Center Frequency | Enable or Disable of Discontinuous Reception |
|---|---|---|---|---|
| Class 1 | Low Capability | 1 | 1 | Disable |
| Class 2 | High Capability | 2 | 2 | Enable |

FIG.39
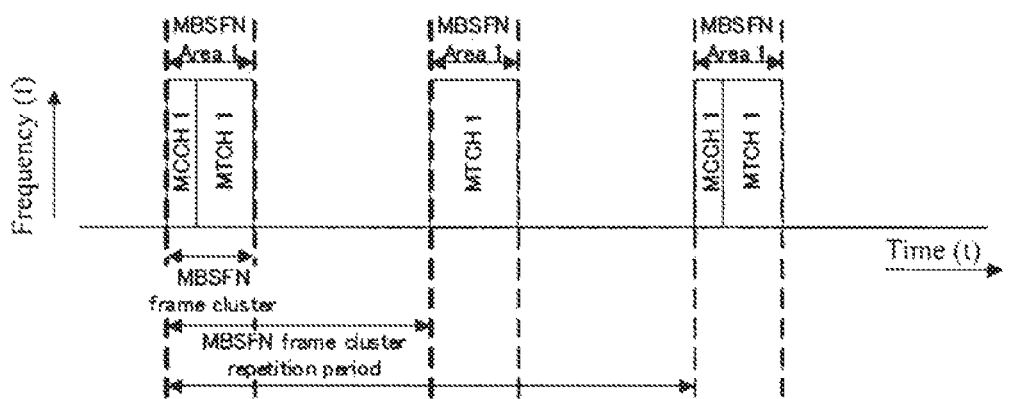
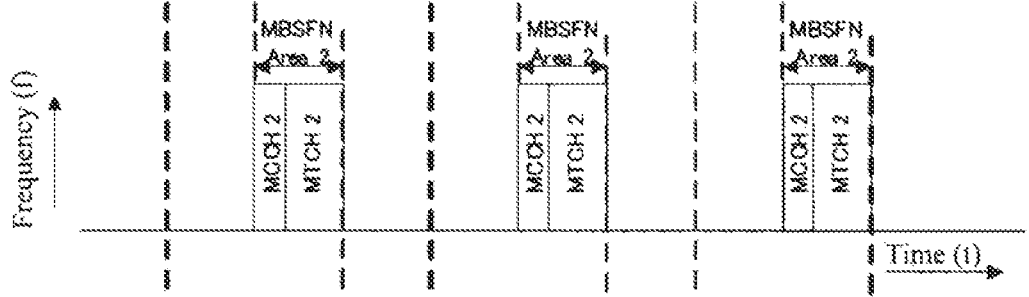
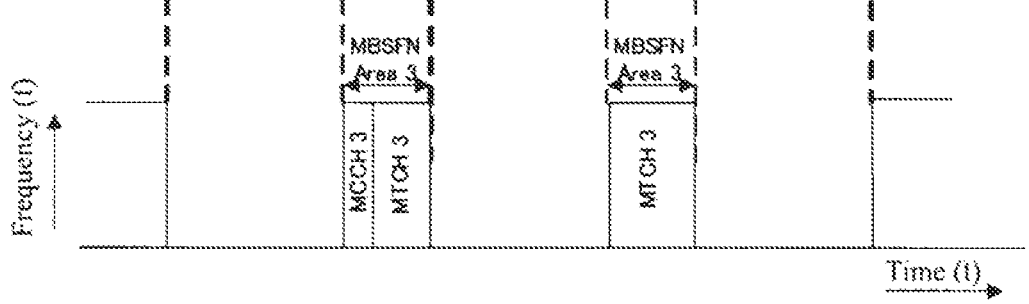

FIG.40
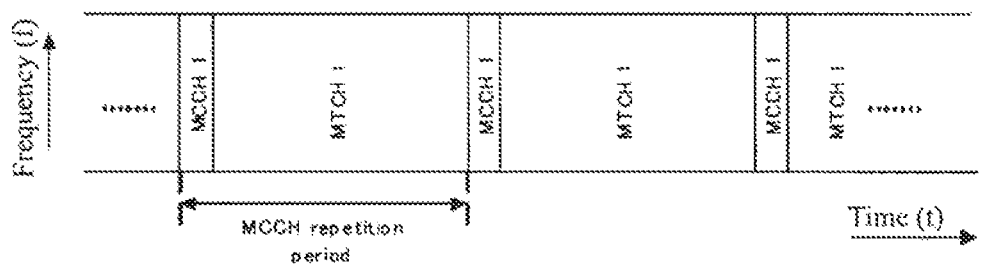
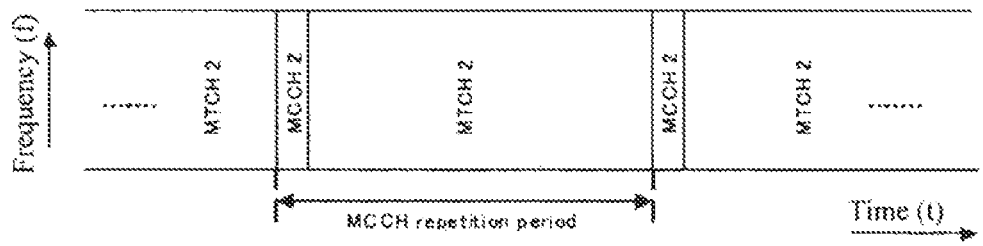
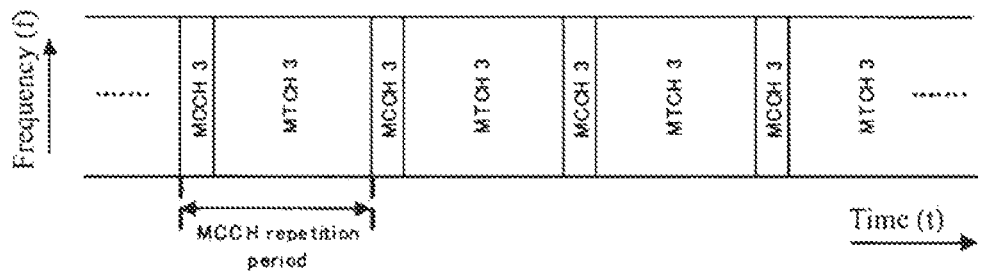

FIG.41
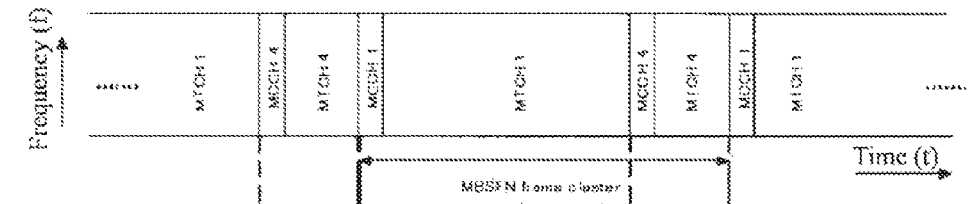
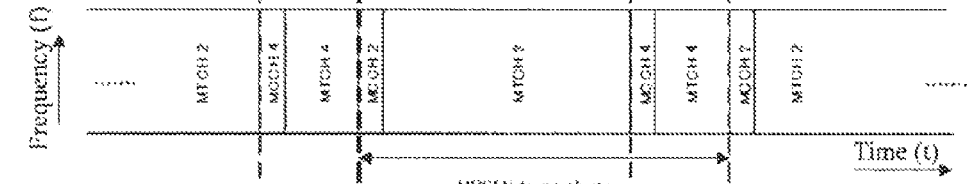
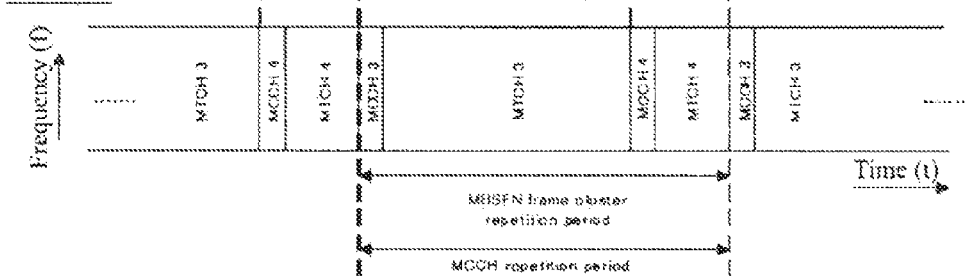
FIG.42
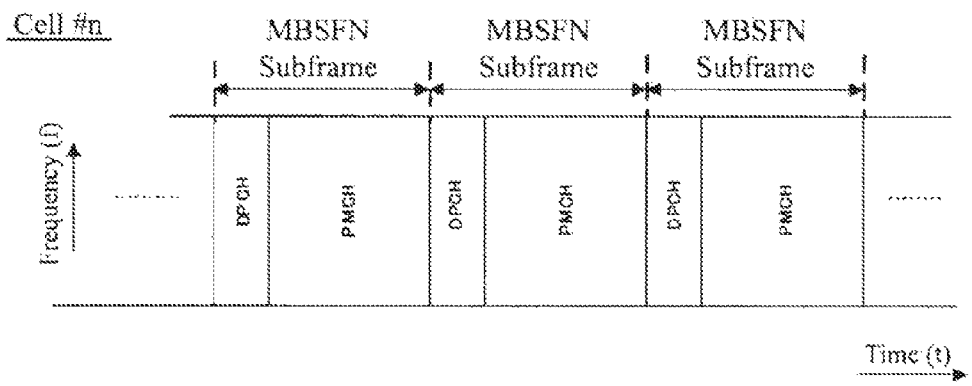

FIG.46
Cell #n1
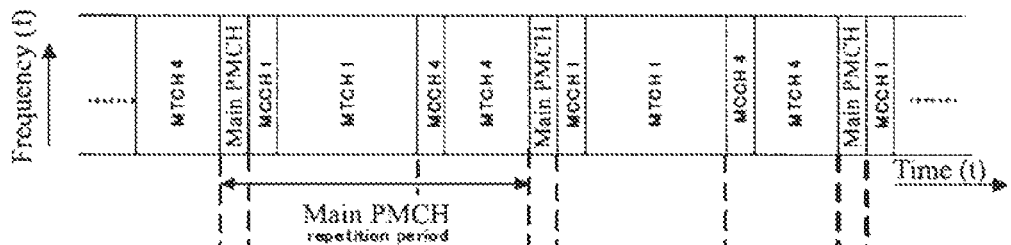
Cell #n2
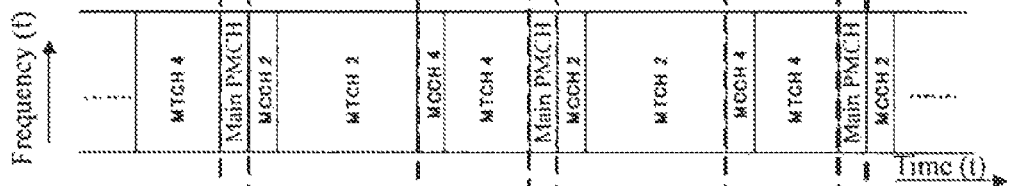
Cell #n3
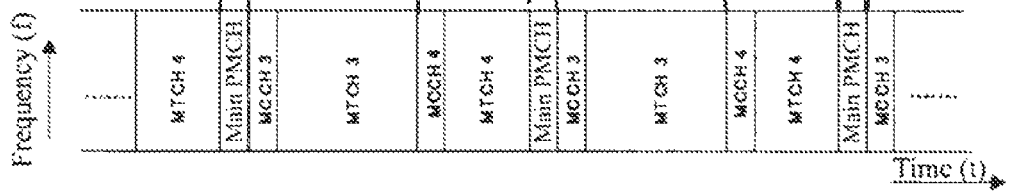
FIG.47
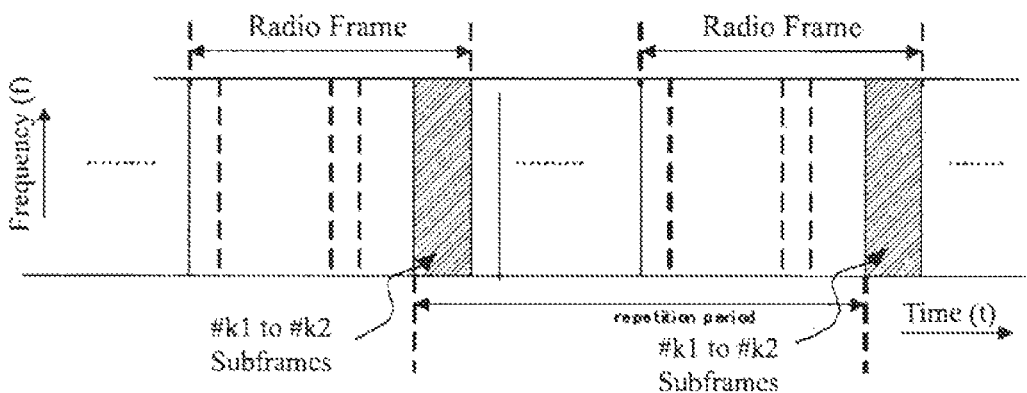

FIG.49
(a)
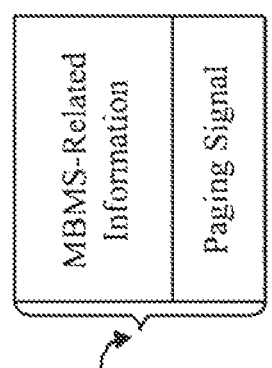
Main PMCH
(b)
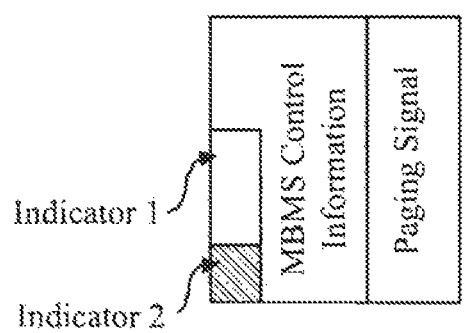
(c)
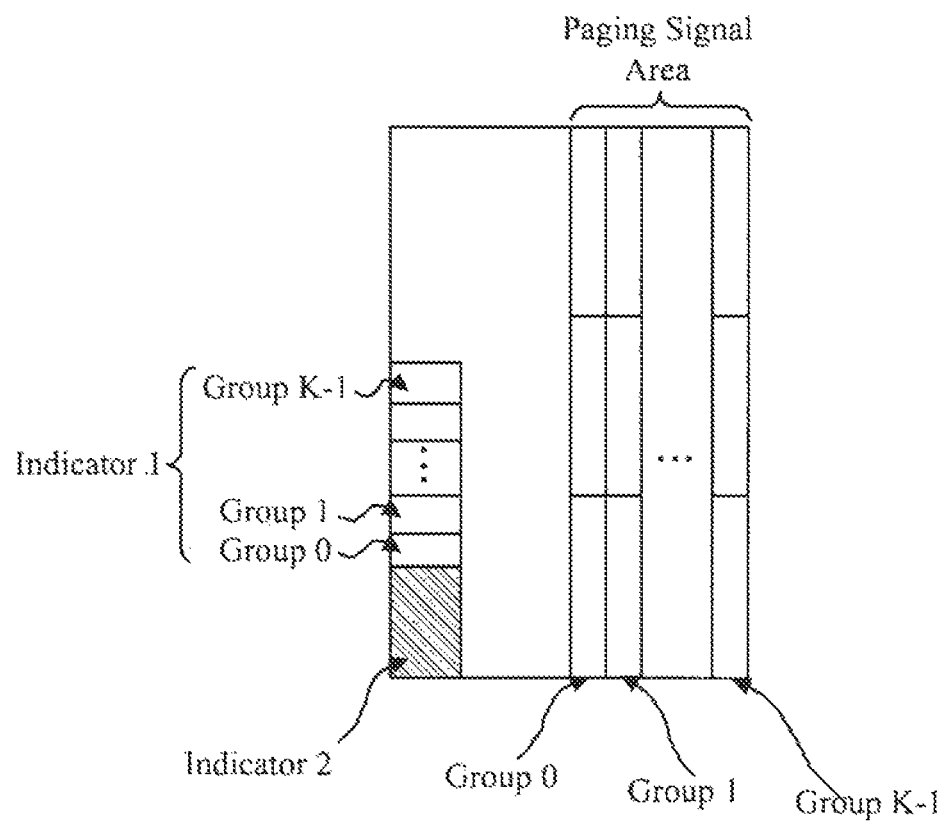

FIG.50
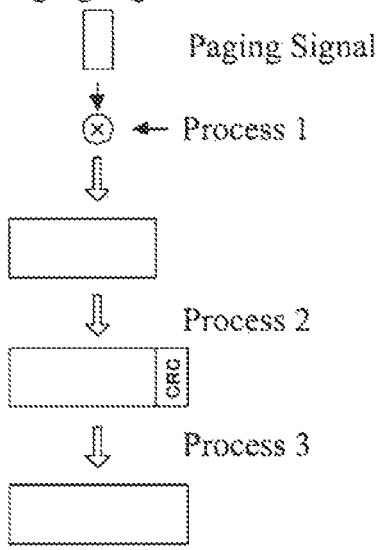
Cell Which Transmits Paging Signal
Paging Signal
Process 1
Process 2
Process 3
Cell Which Does Not Transmit Paging Signal
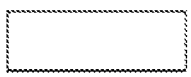
Terminal a   Terminal b
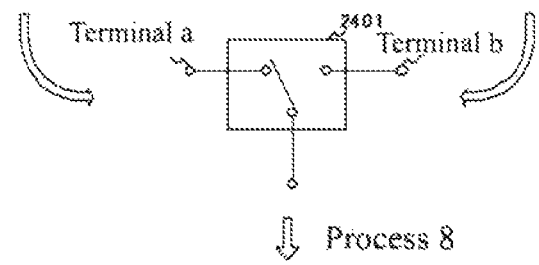
Process 8
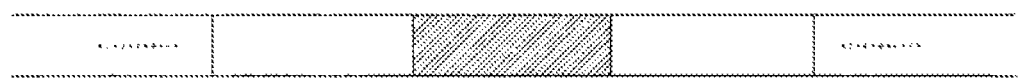

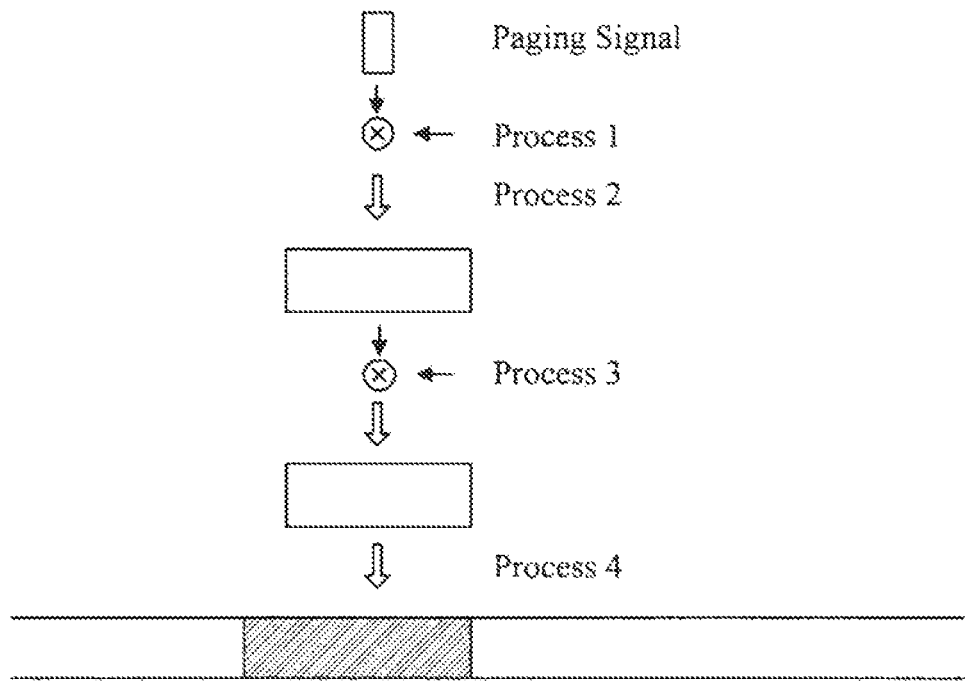

| MBSFN Area ID | DRX Period [Subframe] | DRX Cycle [Subframe] | Starting Point (DRX) [SFN Number] |
|---|---|---|---|
| 1 | 6 | 9 | 4 |
| 1, 2 | 3 | 9 | 7 |
| 1, 3 | 3 | 9 | 4 |

(b)

| MBSFN Area ID | DRX Period [Subframe] | DRX Cycle [Subframe] | Starting Point (DRX) [SFN Number] |
|---|---|---|---|
| 2 | 6 | 9 | 7 |
| 2, 1 | 3 | 9 | 7 |
| 2, 3 | 3 | 9 | 1 |

(c)

| MBSFN Area ID | DRX Period [Subframe] | DRX Cycle [Subframe] | Starting Point (DRX) [SFN Number] |
|---|---|---|---|
| 3 | 6 | 9 | 1 |
| 3, 1 | 3 | 9 | 4 |
| 3, 2 | 3 | 9 | 1 |

| MBSFN Area ID | Service Content | MBSFN frame cluster [Subframe] | MBSFN frame cluster repetition period [Subframe] | Starting Point (MBSFN frame cluster) [SFN Number] |
|---|---|---|---|---|
| 1 | Weather Forecast | 3 | 9 | 1 |
| 2 | News | 3 | 9 | 4 |
| 3 | Movie | 3 | 9 | 7 |

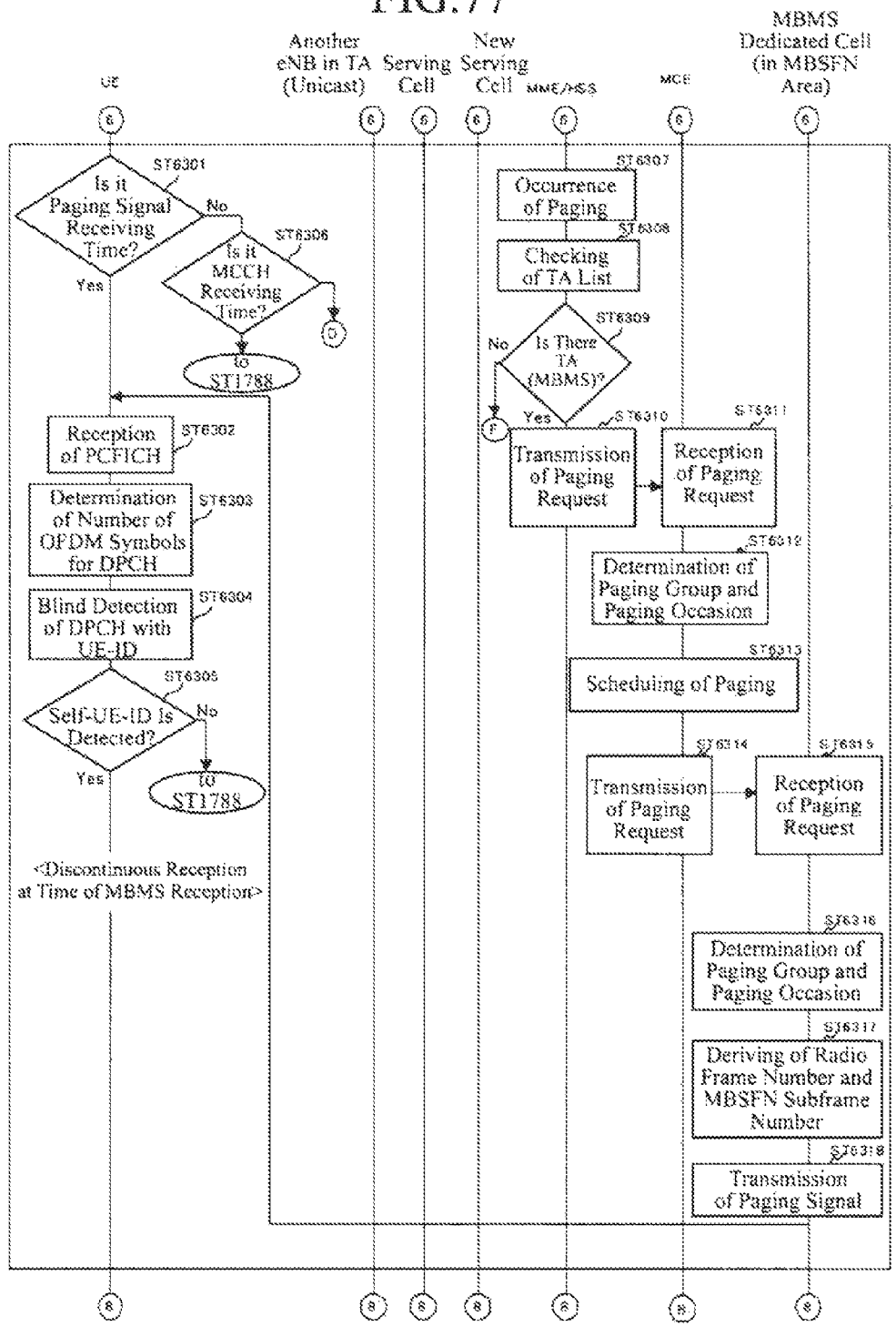

| MBMS Synchronization Area1 | f (MBMS) 1, MBSFN Area ID 1, 2, 3 |
|---|---|
| MBMS Synchronization Area2 | f (MBMS) 2, MBSFN Area ID 101, 102 |

[b]

| TA (MBMS) #1 | MBMS Synchronization Area ID 1 |
|---|---|
| TA (MBMS) #2 | MBMS Synchronization Area ID 2 |

| f (MBMS) 1, MBSFN Area 1 | MCE #10001 |
|---|---|
| f (MBMS) 1, MBSFN Area 2 | MCE #10002 |
| f (MBMS) 1, MBSFN Area 3 | MCE #10003 |
| f (MBMS) 2, MBSFN Area 101 | MCE #20101 |
| f (MBMS) 2, MBSFN Area 102 | MCE #20102 |

[b]

| f (MBMS) 1, MBSFN Area 1 | Cell ID 101, 102, 103 |
|---|---|
| f (MBMS) 1, MBSFN Area 2 | Cell ID 153, 154 |
| f (MBMS) 1, MBSFN Area 3 | Cell ID 182, 183 |
| f (MBMS) 2, MBSFN Area 101 | Cell ID 201, 202 |
| f (MBMS) 2, MBSFN Area 102 | Cell ID 257, 258 |

FIG.84

| Service Number | Service Contents |
|---|---|
| 1 | Weather Forecast |
| 2 | Baseball Live Broadcast |
| 3 | News |

FIG.94
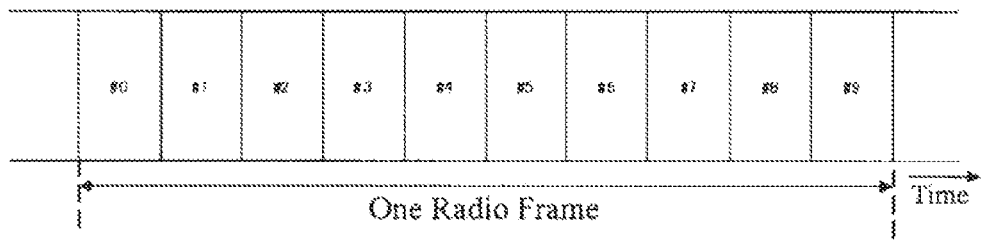
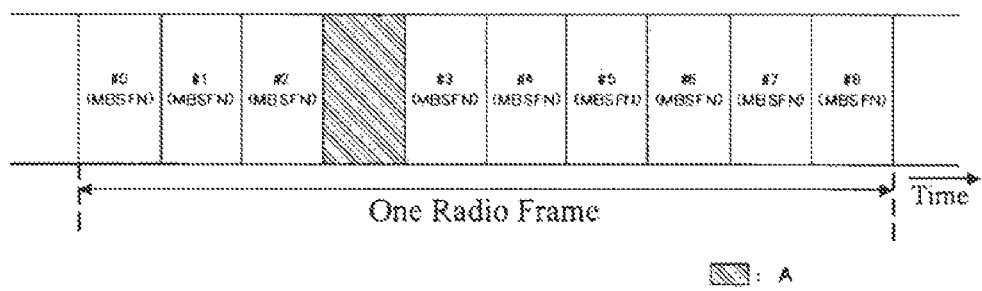
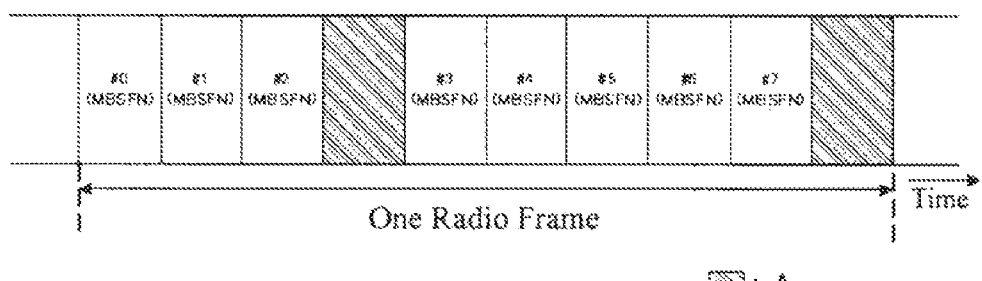

| Number of Subframes Excluding MBSFN Subframes | Subframe Number of Paging Occasion (MBSFN) |
|---|---|
| 10 | #4 (MBSFN) (#4) |
| 9 | #4 (MBSFN) |
| 8 | #3 (MBSFN) |
| ⋮ | ⋮ |
| 2 | #0 (MBSFN) |
| 1 | #0 (MBSFN) |

(b)

| Number of Subframes Excluding MBSFN Subframes | Subframe Number (MBSFN) in Case in Which Number of Occurrences of Subframe for Paging Occasion in One Radio Frame is "1" | Subframe Number (MBSFN) in Case in Which Number of Occurrences of Subframe for Paging Occasion in One Radio Frame is "2" | |
|---|---|---|---|
| 10 | #4 (MBSFN) (#4) | #3 (MBSFN) (#3)<br>#7 (MBSFN) (#7) | |
| 9 | #4 (MBSFN) | #2 (MBSFN)<br>#5 (MBSFN) | |
| 8 | #3 (MBSFN) | #3 (MBSFN)<br>#5 (MBSFN) | |
| ⋮ | ⋮ | ⋮ | |
| 2 | #0 (MBSFN) | #0 (MBSFN)<br>#1 (MBSFN) | |
| 1 | #0 (MBSFN) | #0 (MBSFN) | |

T: Discontinuous Reception Period Length in Mixed Frequency Layer
(Number of Radio Frames)
N: Number of Paging Groups

| MBSFN Subframe Number | Subframe Number of Paging Occasion |
|---|---|
| Null | #2 |
| #0 | #3 |
| #1 | #4 |
| ⋮ | ⋮ |
| #0<br>#1 | #4 |
| #0<br>#2 | #5 |
| ⋮ | ⋮ |

(b)

| MBSFN Subframe Number | Subframe Number (MBSFN) in Case in Which Number of Occurrences of Subframe for Paging Occasion in One Radio Frame is "1" | Subframe Number (MBSFN) in Case in Which Number of Occurrences of Subframe for Paging Occasion in One Radio Frame is "2" | ········ |
|---|---|---|---|
| Null | #2 | #2<br>#4 |  |
| #0 | #3 | #3<br>#5 |  |
| #1 | #4 | #4<br>#6 |  |
| ⋮ | ⋮ | ⋮ |  |
| #0<br>#1 | #4 | #4<br>#6 |  |
| #0<br>#2 | #5 | #5<br>#7 |  |
| ⋮ | ⋮ | ⋮ |  |

T: Discontinuous Reception Period Length in Mixed Frequency Layer (Number of Radio Frames)
N: Number of Paging Groups

MOBILE COMMUNICATION SYSTEM

CROSS-REFERENCE TO RELATED APPLICATIONS

This application is a divisional of U.S. application Ser. No. 12/808,960 filed Jun. 17, 2010, the entire content of which is incorporated herein by reference. U.S. application Ser. No. 12/808,960 is a National Phase of PCT/JP08/03730 filed Dec. 12, 2008 and claims priority to Japanese Patent Application No. 2007-324525 filed Dec. 17, 2007.

FIELD OF THE INVENTION

The present invention relates to a mobile communication system in which a base station carries out radio communications with a plurality of mobile terminals. More particularly, it relates to a mobile communication system that can provide a broadcast type multimedia service (MBMS: Multimedia Broadcast Multicast Service) for mobile terminals.

BACKGROUND OF THE INVENTION

Commercial services which employ a W-CDMA (Wideband Code division Multiple Access) method which is included in communication methods called a third generation were started in Japan since 2001. Furthermore, a service with HSDPA (High Speed Down Link Packet Access) which implements a further improvement in the speed of data transmission using downlinks (a dedicated data channel and a dedicated control channel) by adding a channel for packet transmission (HS-DSCH: High Speed-Downlink Shared Channel) to the downlinks has been started. In addition, an HSUPA (High Speed Up Link Packet Access) method has also been standardized in order to further speed up uplink data transmission. The W-CDMA is a communication method which was determined by the 3GPP (3rd Generation Partnership Project) which is the organization of standardization of mobile communication systems, and the technical specification of the release 7 has been being organized currently.

In the 3GPP, as a communication method different from the W-CDMA, a new communication method having a wireless section, which is referred to as "Long Term Evolution" (LTE), and a whole system configuration including a core network, which is referred to as "System Architecture Evolution" (SAE), has also been studied. The LTE has an access method, a radio channel structure, and protocols which are completely different from those of the current W-CDMA (HSDPA/HSUPA). For example, while the W-CDMA uses, as its access method, code division multiple access (Code Division Multiple Access), the LTE uses, as its access method, OFDM (Orthogonal Frequency Division Multiplexing) for the downlink direction and uses SC-FDMA (Single Career Frequency Division Multiple Access) for the uplink direction. Furthermore, while the W-CDMA has a bandwidth of 5 MHz, the LTE enables each base station to select one bandwidth from among bandwidths of 1.4/3/5/10/15/20 MHz. In addition, the LTE does not include a circuit switching method, unlike the W-CDMA, but uses only a packet communication method.

According to the LTE, because a communication system is configured using a new core network different from a core network (GPRS) in the W-CDMA, the communication system is defined as an independent radio access network which is separate from a W-CDMA network. Therefore, in order to distinguish from a communication system which complies with the W-CDMA, in a communication system which complies with the LTE, a base station (Base station) which communicates with a mobile terminal (UE: User Equipment) is referred to as eNB (E-UTRAN NodeB), and a base station control apparatus (Radio Network Controller) which performs exchange of control data and user data with a plurality of base stations is referred to as an EPC (Evolved Packet Core) (may be called aGW: Access Gateway). This communication system which complies with the LTE provides a y unicast (Unicast) service and an E-MBMS service (Evolved Multimedia Broadcast Multicast Service). An E-MBMS service is a broadcast type multimedia service, and simply may be referred to as an MBMS. A large-volume broadcast content, such as news, a weather forecast, or a mobile broadcasting content, is transmitted to a plurality of mobile terminals. This service is also referred to as a point-to-multipoint (Point to Multipoint) service.

Matters currently determined in the 3GPP and regarding a whole architecture (Architecture) in an LTE system are described in nonpatent reference 1. The whole architecture (chapter 4 of nonpatent reference 1) will be explained with reference to FIG. 1. FIG. 1 is an explanatory drawing showing the configuration of a communication system using an LTE method. In FIG. 1, if a control protocol (e.g., RRC (Radio Resource Management)) and a user plane (e.g., PDCP: Packet Data Convergence Protocol, RLC: Radio Link Control, MAC: Medium Access Control, PHY: Physical layer) for a mobile terminal 101 are terminated at a base station 102, E-UTRAN (Evolved Universal Terrestrial Radio Access) is constructed of one or more base stations 102. Each base station 102 carries out scheduling (Scheduling) and transmission of a paging signal (Paging Signaling, which is also referred to as paging messages (paging messages)) which is transmitted thereto from an MME 103 (Mobility Management Entity). The base stations 102 are connected to one another via X2 interfaces. Furthermore, each base station 102 is connected to an EPC (Evolved Packet Core) via an S1 interface. More specifically, each base station is connected to an MME 103 (Mobility Management Entity) via an S1_MME interface, and is also connected to an S-GW 104 (Serving Gateway) via an S1_U interface. Each MME 103 distributes a paging signal to one or more base stations 102. Furthermore, each MME 103 carries out mobility control (Mobility control) of an idle state (Idle State). Each S-GW 104 carries out transmission and reception of user data to and from one or more base stations 102.

Matters currently determined in the 3GPP and regarding a frame structure in a LTE system are described in nonpatent reference 1 (Chapter 5). The currently determined matters will be explained with reference to FIG. 2. FIG. 2 is an explanatory drawing showing the configuration of a radio frame for use in a communication system using an LTE method. In FIG. 2, one radio frame (Radio frame) has a time length of 10 ms. Each radio frame is divided into ten equal-sized subframes (Subframes). Each subframe is divided into two equal-sized slots (slots). A downlink synchronization channel (Downlink Synchronization Channel: SCH) is included in each of the 1st (#0) and 6th subframes (#5) of each frame. Synchronization signals include a primary synchronization channel (Primary Synchronization Channel: P-SCH) and a secondary synchronization channel (Secondary Synchronization Channel: S-SCH). Multiplexing of a channel used for MBSFN (Multimedia Broadcast multicast service Single Frequency Network) and a channel used for other than MBSFN is carried out for each subframe. Hereafter, a subframe used for MBSFN transmission is referred to as an MBSFN subframe (MBSFN subframe). In nonpatent reference 2, an example of signaling at the time of allocation of MBSFN subframes is described. FIG. 3 is an explanatory drawing showing the configuration of an MBSFN frame. In FIG. 3, MBSFN subframes are allocated to each MBSFN frame (MBSFN frame). An MBSFN frame cluster (MBSFN frame Cluster) is scheduled. The repetition period (Repetition Period) of an MBSFN frame cluster is allocated.

Matters currently determined in the 3GPP and regarding a channel structure in an LTE system are described in nonpatent reference 1. Physical channels (Physical channels) (chapter 5 of nonpatent reference 1) will be explained with reference to FIG. 4. FIG. 4 is an explanatory drawing explaining physical channels for use in a communication system using an LTE method. In FIG. 4, a physical broadcast channel 401 (Physical Broadcast channel: PBCH) is a downlink channel which is transmitted from a base station 102 to a mobile terminal 101. A BCH transport block (transport block) is mapped onto four subframes during a 40-ms time period. There is no clear signaling having a timing of 40 ms. A physical control channel format indicator channel 402 (Physical Control format indicator channel: PCFICH) is transmitted from the base station 102 to the mobile terminal 101. The PCFICH informs the number of OFDM symbols used for PDCCHs from the base station 102 to the mobile terminal 101. The PCFICH is transmitted in each subframe. A physical downlink control channel 403 (Physical downlink control channel: PDCCH) is a downlink channel transmitted from the base station 102 to the mobile terminal 101. The PDCCH informs resource allocation (allocation), HARQ information about a DL-SCH (a downlink shared channel which is one of transport channels shown in FIG. 5), and a PCH (paging channel which is one of the transport channels shown in FIG. 5). The PDCCH carries an uplink scheduling grant (Uplink Scheduling Grant). The PDCCH also carries ACK/Nack which is a response signal showing a response to uplink transmission. A physical downlink shared channel 404 (Physical downlink shared channel: PDSCH) is a downlink channel transmitted from the base station 102 to the mobile terminal 101. A DL-SCH (downlink shared channel) which is a transport channel is mapped onto the PDSCH. A physical multicast channel 405 (Physical multicast channel: PMCH) is a downlink channel transmitted from the base station 102 to the mobile terminal 101. An MCH (multicast channel) which is a transport channel is mapped onto the PMCH.

A physical uplink control channel 406 (Physical Uplink control channel: PUCCH) is an uplink channel transmitted from the mobile terminal 101 to the base station 102. The PUCCH carries ACK/Nack which is a response signal (response) which is a response to downlink transmission. The PUCCH carries a CQI (Channel Quality indicator) report. The CQI is quality information showing either the quality of received data or communication channel quality. A physical uplink shared channel 407 (Physical Uplink shared channel: PUSCH) is an uplink channel transmitted from the mobile terminal 101 to the base station 102. A UL-SCH (an uplink shared channel which is one of the transport channels shown in FIG. 5) is mapped onto the PUSCH. A physical HARQ indicator channel 408 (Physical Hybrid ARQ indicator channel: PHICH) is a downlink channel transmitted from the base station 102 to the mobile terminal 101. The PHICH carries ACK/Nack which is a response to uplink transmission. A physical random access channel 409 (Physical random access channel: PRACH) is an uplink channel transmitted from the mobile terminal 101 to the base station 102. The PRACH carries a random access preamble (random access preamble).

The transport channels (Transport channels) (chapter 5 of nonpatent reference 1) will be explained with reference to FIG. 5. FIG. 5 is an explanatory drawing explaining the transport channels for use in a communication system using an LTE method. Mapping between downlink transport channels and downlink physical channels is shown in FIG. 5A. Mapping between uplink transport channels and uplink physical channels is shown in FIG. 5B. In the downlink transport channels, a broadcast channel (Broadcast channel: BCH) is broadcast to all the base stations (cell). The BCH is mapped onto a physical broadcast channel (PBCH). Retransmission control with HARQ (Hybrid ARQ) is applied to a downlink shared channel (Downlink Shared channel: DL-SCH). Broadcasting to all the base stations (cell) can be carried out. Dynamic or semi-static (Semi-static) resource allocation is supported. Semi-static resource allocation is also referred to as persistent scheduling (Persistent Scheduling). DRX (Discontinuous reception) by a mobile terminal is supported in order to achieve low power consumption of the mobile terminal. The DL-SCH is mapped onto a physical downlink shared channel (PDSCH). A paging channel (Paging channel: PCH) supports DRX by a mobile terminal in order to enable the mobile terminal to achieve low power consumption. Broadcasting to all the base stations (cell) is requested. Mapping onto either a physical resource such as a physical downlink shared channel (PDSCH) which can be dynamically used for traffic, or a physical resource such as a physical downlink control channel (PDCCH) which is another control channel is carried out. A multicast channel (Multicast channel: MCH) is used for the broadcasting to all the base stations (cell). SFN combining of MBMS services (MTCH and MCCH) in multi-cell transmission is supported. Semi-static resource allocation is supported. The MCH is mapped onto a PMCH.

Retransmission control with HARQ (Hybrid ARQ) is applied to an uplink shared channel (Uplink Shared channel: UL-SCH). Dynamic or semi-static (Semi-static) resource allocation is supported. A UL-SCH is mapped onto a physical uplink shared channel (PUSCH). A random access channel (Random access channel: RACH) shown in FIG. 5B is limited to control information. There is a risk of collision. The RACH is mapped onto a physical random access channel (PRACH). HARQ will be explained hereafter.

HARQ is a technology of improving the communication quality of a transmission line by using a combination of automatic retransmission (Automatic Repeat reQuest) and error correction (Forward Error Correction). Retransmission provides an advantage of making an error correction function be effective also for a transmission line whose communication quality varies. Particularly, when performing retransmission, combining the results of reception of first-time transmission and the results of reception of retransmission provides a further improvement in the quality. An example of a retransmission method will be explained. When a receive side cannot decode received data correctly (when a CRC Cyclic Redundancy Check error occurs (CRC=NG)), the receive side transmits "Nack" to the transmit side. When receiving "Nack", the transmit side retransmits the data. In contrast, when the receive side can decode the received data correctly (when no CRC error occurs (CRC=OK)), the receive side transmits "Ack" to the transmit side. When receiving "Ack", the transmit side transmits the next data. There is "chase combining" (Chase Combining) as an example of a HARQ method. The chase combining is a method of transmitting the same data sequence at the time of first-time transmission and at the time of retransmission, and, when performing retransmission, combining the data sequence at the first-time transmission and the data sequence at the retransmission to improve the gain. This is based on an idea that even if the first-time transmission data has an error, the first-time transmission data partially includes correct data, and therefore the data can be transmitted with a higher degree of precision by combining the correct portion of the first-time transmission data and the retransmission data. Furthermore, there is IR (Incremental Redundancy) as another example of the HARQ method. The IR is a method of increasing the degree of redundancy with a combination with the first-time transmission by transmitting a parity bit at the time of retransmission to improve the quality by using an error correction function.

Logical channels (Logical channels) (chapter 6 of nonpatent reference 1) will be explained with reference to FIG. 6. FIG. 6 is an explanatory drawing explaining logical channels for use in a communication system using an LTE method. Mapping between downlink logical channels and downlink transport channels is shown in FIG. 6A. Mapping between uplink logical channels and uplink transport channels is shown in FIG. 6B. A broadcast control channel (Broadcast control channel: BCCH) is a downlink channel for broadcast system control information. The BCCH which is a logical channel is mapped onto either a broadcast channel (BCH) which is a transport channel, or a downlink shared channel (DL-SCH). A paging control channel (Paging control channel: PCCH) is a downlink channel for transmitting a paging signal. The PCCH is used when the network does not know the cell location of a mobile terminal. The PCCH which is a logical channel is mapped onto a paging channel (PCH) which is a transport channel. A common control channel (Common control channel: CCCH) is a channel for transmission control information between a mobile terminal and a base station. The CCCH is used when the mobile terminal does not have RRC connection (connection) between the mobile terminal and the network. Whether to dispose the CCCH for downlink is not decided at this time. In the uplink direction, the CCCH is mapped onto an uplink shared channel (UL-SCH) which is a transport channel.

A multicast control channel (Multicast control channel: MCCH) is a downlink channel for point-to-multipoint transmission. The channel is used for transmission of MBMS control information for one or some MTCHs from the network to mobile terminals. The MCCH is used only for a mobile terminal currently receiving an MBMS. The MCCH is mapped onto either a downlink shared channel (DL-SCH) which is a transport channel, or a multicast channel (MCH). A dedicated control channel (Dedicated control channel: DCCH) is a channel for transmitting dedicated control information between a mobile terminal and the network. The DCCH is mapped onto an uplink shared channel (UL-SCH) in the uplink, and is mapped onto a downlink shared channel (DL-SCH) in the downlink. A dedicated traffic channel (Dedicate Traffic channel: DTCH) is a channel of point-to-point communications to each mobile terminal for transmission of user information. The DTCH exists for both the uplink and the downlink. The DTCH is mapped onto an uplink shared channel (UL-SCH) in the uplink, and is mapped onto a downlink shared channel (DL-SCH) in the downlink. A multicast traffic channel (Multicast Traffic channel: MTCH) is a downlink channel for transmission of traffic data from the network to a mobile terminal. The MTCH is used only for a mobile terminal currently receiving an MBMS. The MTCH is mapped onto either a downlink shared channel (DL-SCH) or a multicast channel (MCH).

Matters currently determined in the 3GPP and regarding an E-MBMS service are described in nonpatent reference 1. The definitions of terms regarding E-MBMS (chapter 15 of nonpatent reference 1) will be explained with reference to FIG. 7. FIG. 7 is an explanatory drawing for explaining a relationship between an MBSFN synchronization area and MBSFN areas.

In FIG. 7, the MBSFN synchronization area 701 (Multimedia Broadcast multicast service Single Frequency Network Synchronization Area) is a network area in which all the base stations can perform MBSFN (Multimedia Broadcast Multicast service Single Frequency Network) transmission in synchronization with one another. The MBSFN synchronization area includes one or more MBSFN areas (MBSFN Areas) 702. In one frequency layer (frequency layer), each base station can belong only to one MBSFN synchronization area. Each MBSFN area 702 (MBSFN Area) consists of a group of base stations (cell) included in the MBSFN synchronization area of the network. The base stations (cell) in the MBSFN synchronization area may construct a plurality of MBSFN areas.

The logical architecture (Logical Architecture) of E-MBMS (chapter 15 of nonpatent reference 1) will be explained with reference to FIG. 8. FIG. 8 is an explanatory drawing explaining the logical architecture (Logical Architecture) of E-MBMS. In FIG. 8, a multi-cell/multicast coordination entity 801 (Multi-cell/multicast Coordination Entity: MCE) is a logical entity. The MCE 801 allocates radio resources to all the base stations in an MBSFN area in order to carry out multi-cell MBMS transmission (multi-cell MBMS transmission). The MCE 801 makes a decision about the details of radio configuration (e.g., a modulation method and a code) in addition to the allocation of the radio resources in time and/or in frequency. An E-MBMS gateway 802 (MBMS GW) is a logical entity. The E-MBMS gateway 802 is located between an eBMSC and base stations, and has a main function of transmitting and broadcasting an MBMS service to each of the base stations according to a SYNC protocol. An M3 interface is a control interface (Control Plane Interface) between the MCE 801 and the E-MBMS gateway 802. An M2 interface is a control interface between the MCE 801 and an eNB 102. An M1 interface is a user data interface (User Plane Interface) between the E-MBMS gateway 802 and the eNB 803.

The architecture (Architecture) of E-MBMS (chapter 15 of nonpatent reference 1) will be explained. FIG. 9 is an explanatory drawing explaining the architecture (Architecture) of E-MBMS. As to the architecture of E-MBMS, two examples are considered as shown in FIGS. 9A and 9B. Cells (15 of nonpatent reference 1) of MBMS will be explained. In an LTE system, there is an MBMS dedicated cell (base station) (MBMS dedicated cell) and an MBMS/Unicast-mixed cell (MBMS/Unicast-mixed cell) which can carry out both an MBMS service and a unicast service. An MBMS dedicated cell will be explained. Features in a case in which the MBMS dedicated cell belongs to a frequency layer dedicated to MBMS transmission will be described hereafter. Hereinafter, the MBMS transmission dedicated frequency layer is also referred to as an MBMS dedicated cell frequency layer. An MTCH (multicasting traffic channel) and an MCCH (multicast control channel) which are both downlink logical channels are mapped onto either an MCH (multicast channel) which is a downlink transport channel or a DL-SCH (downlink shared channel) in point-to-multipoint transmission. No uplink exists in the MBMS dedicated cell. Furthermore, transmission and reception of unicast data cannot be carried out within the MBMS dedicated cell. Furthermore, no counting mechanism is set up. Whether to provide a paging signal (Paging messages) in the MBMS transmission dedicated frequency layer has not been decided.

Next, an MBMS/Unicast-mixed cell will be explained. Features in a case in which the MBMS/Unicast-mixed cell does not belong to the MBMS transmission dedicated frequency layer will be described hereafter. A frequency layer other than the MBMS transmission dedicated frequency layer is referred to as a "unicast/mixed frequency layer". An MTCH and an MCCH which are both downlink logical channels are mapped onto either an MCH which is a downlink logical channel or a DL-SCH in point-to-multipoint transmission. In the MBMS/Unicast-mixed cell, both transmission of unicast data and transmission of MBMS data can be carried out.

MBMS transmission (chapter 15 of nonpatent reference 1) will be explained. The MBMS transmission in an LTE system supports single-cell transmission (Single-cell transmission: SC transmission) and multi-cell transmission (multi-cell transmission: MC transmission). An SFN (Single frequency Network) operation is not supported in the single-cell transmission. Furthermore, an SFN operation is supported in the multi-cell transmission. Transmission of an MBMS is synchronized in an MBSFN (Multimedia Broadcast multicast service Single Frequency Network) area. SFN combining (Combining) of MBMS services (MTCH and MCCH) in the multi-cell transmission is supported. An MTCH and an MCCH are mapped onto an MCH in point-to-multipoint transmission. Scheduling is carried out by an MCE.

The structure (Structure) of a multicast control channel (MCCH) (Chapter 15 of nonpatent reference) will be explained. A broadcast control channel (BCCH) which is a downlink logical channel shows scheduling of one or two primary multicast control channels (Primary MCCH: P-MCCH). A P-MCCH for single-cell transmission is mapped onto a DL-SCH (downlink shared channel). A P-MCCH for multi-cell transmission is mapped onto an MCH (multicast channel). In a case in which a secondary multicast control channel (Secondary MCCH: S-MCCH) is mapped on an MCH, the address of the secondary multicast control channel (S-MCCH) can be shown by using a primary multicast control channel (P-MCCH). Although a broadcast control channel (BCCH) shows a resource of a primary multicast control channel (P-MCCH), it does not show any available service.

Matters currently determined in the 3GPP and regarding paging are described in nonpatent reference 1 (chapter 10). A paging group uses an L1/L2 signaling channel (PDCCH). A precise identifier (UE-ID) of a mobile terminal can be checked on a paging channel (PCH).

[Nonpatent reference 1] 3GPP TS36.300 V8.2.0
[Nonpatent reference 2] 3GPP R1-072963
[Nonpatent reference 3] 3GPP R1-080073
[Nonpatent reference 4] 3GPP R2-080463
[Nonpatent reference 5] 3GPP R2-075570
[Nonpatent reference 6] 3GPP TS36.211 V8.4.0
[Nonpatent reference 7] 3GPP TS36.331 V8.3.0
[Nonpatent reference 8] 3GPP TS36.306 V8.2.0

DISCLOSURE OF THE INVENTION

Problems to be Solved by the Invention

Problems to be solved by the present invention will be explained. In nonpatent reference 1, it is not decided whether to make a paging signal exist in an MBMS transmission dedicated frequency layer. Therefore, a method of and a mobile communication system for transmitting a paging signal to a mobile terminal which is currently receiving an MBMS service in an MBMS transmission dedicated frequency layer have not been decided yet. It is therefore an object of the present invention to provide a method of and a mobile communication system for transmitting a paging signal to a mobile terminal which is currently receiving an MBMS service in an MBMS transmission dedicated frequency layer.

Furthermore, in a case of transmitting a paging signal in an MBMS transmission dedicated frequency layer, a mobile terminal which has received the paging signal needs to answer this signal. However, no uplink exists in an MBMS dedicated cell. Therefore, the mobile terminal needs to transmit a response to the paging signal to either a unicast cell or an MBMS/Unicast-mixed cell. It is therefore another object of the present invention to provide a method of enabling a mobile terminal which has received a paging signal to transmit a response to the paging signal to either a unicast cell or an MBMS/Unicast-mixed cell, and a mobile communication system which enables the method to be implemented therein.

Furthermore, the details of a method of transmitting a paging message has not been established also for a mobile terminal being in an idle state (Idle State) at a frequency which is not in an MBMS transmission dedicated frequency layer (in a unicast/mixed frequency layer). Nonpatent reference 1 discloses that a PCH is mapped onto either a PDSCH or a PDCCH. Nonpatent reference 1 also discloses that a paging group uses an L1/L2 signaling channel (a PDCCH) and that a precise identifier (UE-ID) of a mobile terminal can be found on a PCH. In contrast, nonpatent reference 1 does not disclose how mobile terminals are divided into paging groups, and how a PCH is informed. Furthermore, nonpatent reference 1 does not disclose how a mobile terminal being in an idle state carries out discontinuous reception. It is therefore a further object of the present invention to provide the details of a method of transmitting a paging signal to a mobile terminal being in an idle state in a unicast/mixed frequency layer, and a mobile communication system which enables the method to be implemented therein.

Furthermore, nonpatent reference 1 discloses existence of an MBMS transmission dedicated frequency layer, and existence and features of an MBMS dedicated cell. In contrast, nonpatent reference 1 does not disclose a method of enabling a mobile terminal to move to an MBMS transmission dedicated frequency layer and a method of selecting a desired service. In addition, although existence of a plurality of MBSFN areas in an MBMS transmission dedicated frequency layer has been debated, nonpatent reference 1 does not disclose a method of multiplexing MBSFN areas. It is therefore another object of the present invention to provide a method of multiplexing MBSFN areas. It is a further object of the present invention to provide a method of selecting a desired service in an MBMS transmission dedicated frequency layer according to the multiplexing method, and a mobile communication system which enables the method to be implemented therein.

Furthermore, no uplink exists in abase station dedicated to MBMS. Even when a mobile terminal moves, and a base station from which the mobile terminal can receive a downlink (a downlink signal or a downlink radio wave) changes and/or the best base station (cell) (providing the highest received power) included in the base stations from which the mobile terminal can receive the downlink changes, the mobile terminal has no means of informing to any base station dedicated to MBMS to that effect. A problem is therefore that in an MBMS transmission dedicated frequency layer which consists of base stations dedicated to MBMS, the management of mobility of mobile terminals cannot be carried out with the configuration of a conventional mobile communication system and with a conventional communication method. It is therefore another object of the present invention to provide a method of enabling the management of mobility of mobile terminals even in an MBMS transmission dedicated frequency layer which consists of base stations dedicated to MBMS, and a mobile communication system which enables the method to be implemented therein.

Furthermore, a mobile terminal needs to carry out a measurement (measurement) at fixed periods (cycles) in a unicast/mixed frequency layer. The length of each fixed period is informed by an upper layer. The measurement is an operation which the mobile terminal needs to perform also in order to recognize that the mobile terminal has moved and the base station which the mobile terminal can receive a downlink (a downlink signal or a downlink radio wave) has changed, the best base station (cell) (providing the highest received power) included in the base stations from which the mobile terminal can receive the downlink has changed. Therefore, unless the mobile terminal does not carry out the measurement, the mobility (Mobility) management becomes impossible in the mobile communication system. On the other hand, a base station which constructs an MBSFN synchronization area (MBSFN Synchronization Area) in an MBMS transmission dedicated frequency layer, and a base station which constructs a unicast/mixed frequency layer are asynchronous with each other. A problem with the configuration of a conventional mobile communication systems and a conventional communication method is therefore that because a mobile terminal currently receiving an MBMS service in an MBMS transmission dedicated frequency layer performs a measurement in a unicast/mixed frequency layer, the reception of the MBMS is interrupted. It is therefore a further object of the present invention to provide a method of enabling a mobile terminal currently receiving an MBMS service in an MBMS transmission dedicated frequency layer to perform a measurement in a unicast/mixed frequency layer without the reception of the MBMS being interrupted, and a mobile communication system which enables the method to be implemented therein.

Furthermore, nonpatent reference 1 discloses existence of an MBMS transmission dedicated frequency layer, and existence and features of an MBMS dedicated cell. In contrast, nonpatent reference 1 does not disclose a method of enabling a mobile terminal to move to an MBMS transmission dedicated frequency layer and a method of selecting a desired service. It is another object of the present invention to provide a method of selecting a desired service in an MBMS transmission dedicated frequency layer, and a mobile communication system which enables the method to be implemented therein.

Furthermore, it can be understood from chapter 15 of nonpatent reference 1 that an MBSFN area consists of cell groups included in an MBSFN synchronization area which is adjusted in order to implement MBSFN transmission. Therefore, there is a case in which MBSFN transmission is not implemented in a different MBSFN area. Therefore, the following problem arises. More specifically, when a mobile terminal currently receiving an MBMS service transmitted via a multi-cell transmission scheme from MBMS dedicated cells or unicast/MBMS mixed cells in a unicast/mixed frequency layer carries out a handover, the following problem arises. Hereafter, a case in which the unicast/MBMS mixed cell which is the handover source (the current serving cell), and a unicast/MBMS mixed cell which is the handover destination (a base station which has been newly selected as the serving cell (a new serving cell: New Serving cell)) do not belong to the same MBSFN area will be considered. In this case, there is a possibility that because the handover source and destination belong to different MBSFN areas, the contents of receivable MBMS services respectively in the MBSFN areas differ from each other. Therefore, there arises a problem that an interruption of reception of an MBMS service occurs due to a handover.

Means for Solving the Problem

In accordance with the present invention, there is provided a communication system which uses an OFDM (Orthogonal Frequency Division Multiplexing) method as a downlink access method, and also uses an SC-FDMA (Single Career Frequency Division Multiple Access) method as an uplink access method, and which can transmit broadcast type data for providing an MBMS (Multimedia Broadcast Multicast Service) which is a point-to-multipoint broadcast communication service to a mobile terminal and can also transmit point-to-point dedicated communication data to a mobile terminal, in which the communication system has three types of cells including a unicast cell to and from which a mobile terminal can transmit and receive the dedicated communication data, an MBMS dedicated cell from which the mobile terminal can receive the broadcast type data, but to and from which the mobile terminal cannot transmit and receive the dedicated communication data, and an MBMS/Unicast-mixed cell which can provide both a unicast cell service and an MBMS dedicated cell service, and, while receiving the broadcast type data transmitted from the MBMS dedicated cell, the mobile terminal makes a notification of an MBMS receiving state via the unicast cell or the MBMS/Unicast-mixed cell, and the communication system transmits a paging signal destined for the mobile terminal currently receiving the broadcast type data transmitted from the MBMS dedicated cell on a basis of a tracking area (Tracking Area) in which the mobile terminals is tracked, the tracking area being determined on a basis of information transmitted from the mobile terminal.

In accordance with the present invention, there is provided a communication system which uses an OFDM (Orthogonal Frequency Division Multiplexing) method as a downlink access method, and also uses an SC-FDMA (Single Career Frequency Division Multiple Access) method as an uplink access method, and which can transmit broadcast type data for providing an MBMS (Multimedia Broadcast Multicast Service) which is a point-to-multipoint broadcast communication service to a mobile terminal and can also transmit point-to-point dedicated communication data to a mobile terminal, in which the communication system has an MBSFN (Multimedia Broadcast multicast service Single Frequency Network) synchronization area comprised of a plurality of MBMS dedicated cells from each of which the mobile terminal can receive the broadcast type data, but to and from each of which the mobile terminal cannot transmit and receive the dedicated communication data, the plurality of MBMS dedicated cells being synchronized with one another at a single frequency, and the MBMS dedicated cell which constructs the MBSFN synchronization area discontinues transmission of MBMS data to the mobile terminal during a certain time period to provide a reception discontinuous time period during which the mobile terminal does not receive the MBMS data.

Advantages of the Invention

In the communication system in accordance with the present invention which uses the OFDM (Orthogonal Frequency Division Multiplexing) method as the downlink access method, and also uses the SC-FDMA (Single Career Frequency Division Multiple Access) method as the uplink access method, and which can transmit broadcast type data for providing an MBMS (Multimedia Broadcast Multicast Service) which is a point-to-multipoint broadcast communication service to a mobile terminal and can also transmit point-to-point dedicated communication data to a mobile terminal, the communication system has three types of cells including a unicast cell to and from which a mobile terminal can transmit and receive dedicated communication data, an MBMS dedicated cell from which a mobile terminal can receive broadcast type data, but to and from which the mobile terminal cannot transmit and receive dedicated communication data, and an MBMS/Unicast-mixed cell which can provide both a unicast cell service and an MBMS dedicated cell service, and a mobile terminal currently receiving broadcast type data transmitted from the MBMS dedicated cell makes a notification of an MBMS receiving state via the unicast cell or the MBMS/Unicast-mixed cell and the communication system transmits a paging signal destined for the mobile terminal currently receiving broadcast type data transmitted from the MBMS dedicated cell on a basis of a tracking area (Tracking Area) in which the mobile terminal is tracked, the tracking area being determined on a basis of information transmitted from the mobile terminal. Therefore, the mobile terminal can specify MBMS data (an MTCH and an MCCH) which the mobile terminal receives or is receiving, and the communication system can transmit a paging signal to the mobile terminal for which an MBMS service is provided from the MBMS transmission dedicated cell.

In the communication system in accordance with the present invention which uses the OFDM (Orthogonal Frequency Division Multiplexing) method as the downlink access method, and also uses the SC-FDMA (Single Career Frequency Division Multiple Access) method as the uplink access method, and which can transmit broadcast type data for providing an MBMS (Multimedia Broadcast Multicast Service) which is a point-to-multipoint broadcast communication service to a mobile terminal and can also transmit point-to-point dedicated communication data to a mobile terminal, the communication system has an MBSFN (Multimedia Broadcast multicast service Single Frequency Network) synchronization area comprised of a plurality of MBMS dedicated cells from each of which a mobile terminal can receive broadcast type data, but to and from each of which the mobile terminal cannot transmit and receive dedicated communication data, the plurality of MBMS dedicated cells being synchronized with one another at a single frequency, and an MBMS dedicated cell which constructs the MBSFN synchronization area discontinues transmission of MBMS data to a mobile terminal during a certain time period to provide a reception discontinuous time period during which the mobile terminal does not receive the MBMS data. Therefore, the mobile terminal becomes able to carry out a measurement process and location registration during this reception discontinuous time period, and the communication system can transmit a paging signal to the mobile terminal for which an MBMS service is provided from the MBMS transmission dedicated cell.

BRIEF DESCRIPTION OF THE FIGURES

FIG. 5 is an explanatory drawing explaining transport channels for use in the communication system which uses an LTE method;

FIG. 6 is an explanatory drawing explaining logical channels for use in the communication system which uses an LTE method;

FIG. 31 is an explanatory drawing explaining the details of a tracking area list;

FIG. 32 is a view of examples of the structure of a channel onto which a paging signal in a frequency layer dedicated to MBMS transmission is mapped;

FIG. 39 is an explanatory drawing showing the structure of a physical multicast channel disposed for each MBSFN (Multimedia Broadcast multicast service Single Frequency Network) area;

FIG. 40 is an explanatory drawing showing the structure of a physical multicast channel disposed for each MBSFN (Multimedia Broadcast multicast service Single Frequency Network) area;

FIG. 41 is an explanatory drawing showing the structure of a PMCH disposed for each MBSFN area;

FIG. 42 is an explanatory drawing showing the structure of a physical channel dedicated to paging which is transmitted via a multi-cell transmission scheme in an MBSFN area;

FIG. 46 is an explanatory drawing showing the structure of a physical channel (a main PMCH) which is transmitted via a multi-cell transmission scheme in an MBSFN synchronization area;

FIG. 47 is an explanatory drawing showing the configuration of a radio frame via which a main PMCH is transmitted;

FIG. 49 is an explanatory drawing showing the structure of a main PMCH in which an area for a paging signal is disposed;

FIG. 50 is an explanatory drawing showing a method of transmitting a paging signal to either an MBSFN area or some cells in an MBSFN synchronization area;

FIG. 51 is an explanatory drawing showing an example of a code for padding for each cell which is disposed in a cell which does not transmit a paging signal;

FIG. 52 is an explanatory drawing showing a method of using a code for paging transmission cell identification;

FIG. 71 is an explanatory drawing showing an example of discontinuous reception information;

FIG. 77 is a flow chart explaining a discontinuous reception process at the time of MBMS reception in Embodiment 15;

FIG. 78 is a view explaining the details of a tracking area list in Embodiment 16;

FIG. 79 is a view explaining the details of a tracking area list in Embodiment 16;

FIG. 84 is a table explaining a correspondence between service numbers and service contents;

FIG. 93 is a sequence diagram in a case of determining subframes in a radio frame for paging occasion onto which a paging signal is mapped;

FIG. 94 is a sequence diagram in a case of determining subframes in a radio frame for paging occasion onto which a paging signal is mapped;

FIG. 95 is a table showing a correspondence between subframes in a radio frame for paging occasion, and the number of subframes excluding subframes which can be MBSFN subframes;

FIG. 96 is a table showing a correspondence between subframes in a radio frame for paging occasion, and MBSFN subframe numbers;

EXPLANATIONS OF REFERENCE CHARACTERS

101 Mobile terminal, 102 Base station, 103 MME (Mobility Management Entity), 104 S-GW (Serving Gateway).

PREFERRED EMBODIMENTS OF THE INVENTION

Embodiment 1

Figure 10:
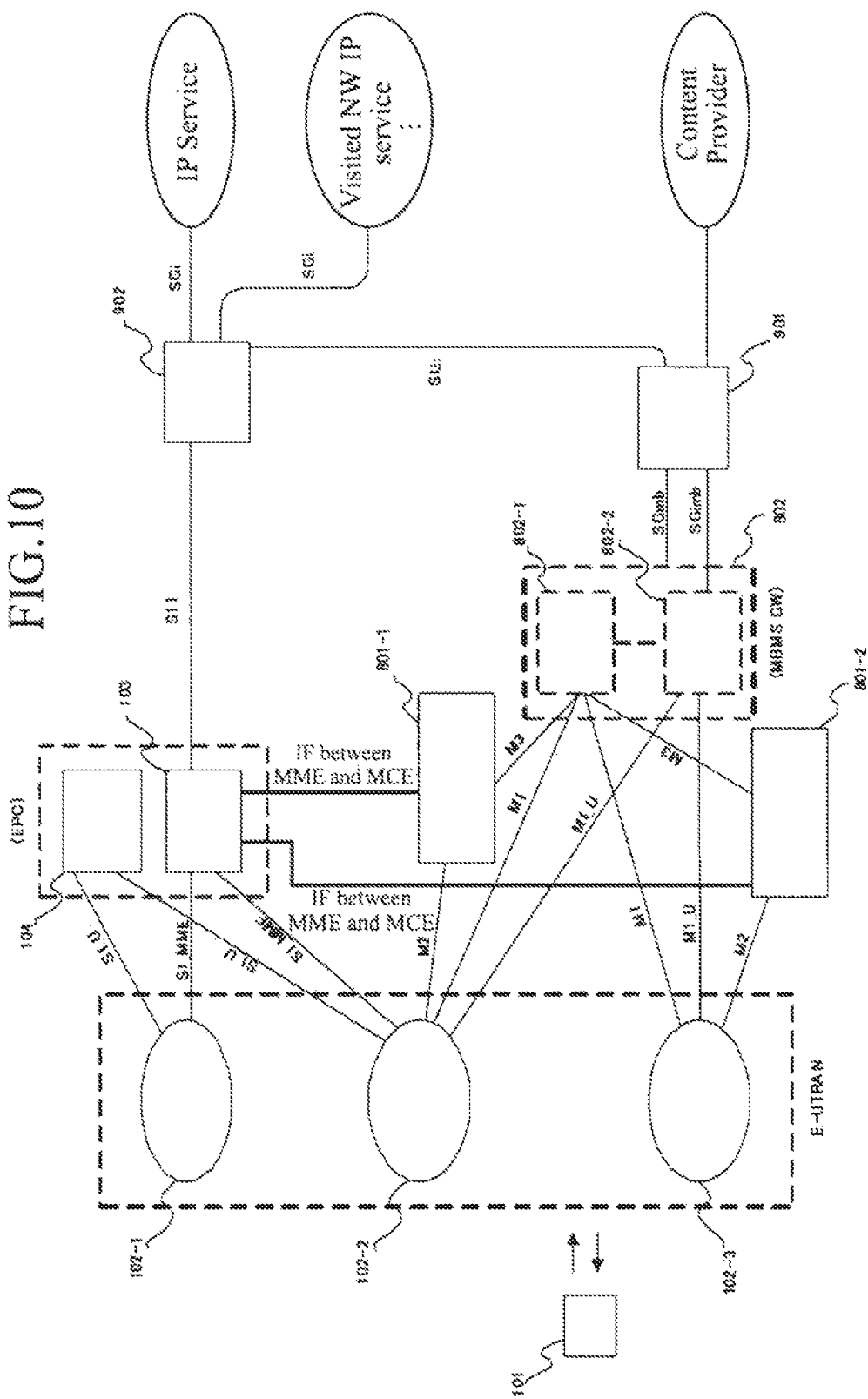
FIG. 10 is a block diagram showing the whole configuration of a mobile communication system in accordance with the present invention.

FIG. 10 is a block diagram showing the whole configuration of a mobile communication system in accordance with the present invention. In FIG. 10, a mobile terminal 101 carries out transmission and reception of control data (C-plane) and user data (U-plane) to and from a base station 102. Base stations 102 are classified into unicast cells 102-1 each of which handles only transmission and reception of unicast, mixed cells 102-2 each of which handles transmission and reception of unicast and MBMS services (MTCH and MCCH), and MBMS dedicated cells 102-3 each of which handles only transmission and reception of MBMS services. Each of a unicast cell 102-1 handling transmission and reception of unicast and an MBMS/Unicast-mixed cell (a mixed cell) 102-2 handling transmission and reception of unicast is connected to an MME 103 via an interface S1_MME. Each of a unicast cell 102-1 handling transmission and reception of unicast and a mixed cell 102-2 handling transmission and reception of unicast is also connected to an S-GW 104 via an interface S1 U for transmission and reception of unicast user data. The MME 103 is connected to a PDNGW (Packet Data Network Gateway) 902 via an interface S11. An MCE 801 allocates radio resources to all base stations 102 existing in an MBSFN area in order to carry out multi-cell (MC) transmission. For example, a case in which both an MBSFN area #1 consisting of one or more MBMS/Unicast-mixed cells 102-2, and an MBSFN area #2 consisting of one or more MBMS dedicated cells 102-3 exist will be considered. An MBMS/Unicast-mixed cell 102-2 is connected to an MCE 801-1 that allocates radio resources for all the base stations existing in the MBSFN area #1 via an interface M2. Furthermore, an MBMS dedicated cell 102-3 is connected to an MCE 801-2 that allocates radio resources for all the base stations existing in the MBSFN area #2 via an interface M2.

An MBMS GW 802 can be divided into an MBMS CP 802-1 that handles control data, and an MBMS UP 802-2 that handles user data. Each of an MBMS/Unicast-mixed cell 102-2 and an MBMS dedicated cell 102-3 is connected to the MBMS CP 802-1 via an interface M1 for transmission and reception of MBMS-related control data. Each of an MBMS/Unicast-mixed cell 102-2 and an MBMS dedicated cell 102-3 is connected to the MBMS UP 802-2 via an interface M1_U for transmission and reception of MBMS-related user data. The MCE 801 is connected to the MBMS CP 802-1 via an interface M3 for transmission and reception of MBMS-related control data. The MBMS UP 802-2 is connected to an eBMSC 901 via an interface SGimb. The MBMS GW 802 is connected to the eBMSC 901 via an interface SGmb. The eBMSC 901 is connected to a content provider. The eBMSC 901 is connected to a PDNGW 902 via an interface SGi. The MCE 801 is connected to an MME 103 via an interface (IF) between MME and MCE which is a new interface.

Figure 11:
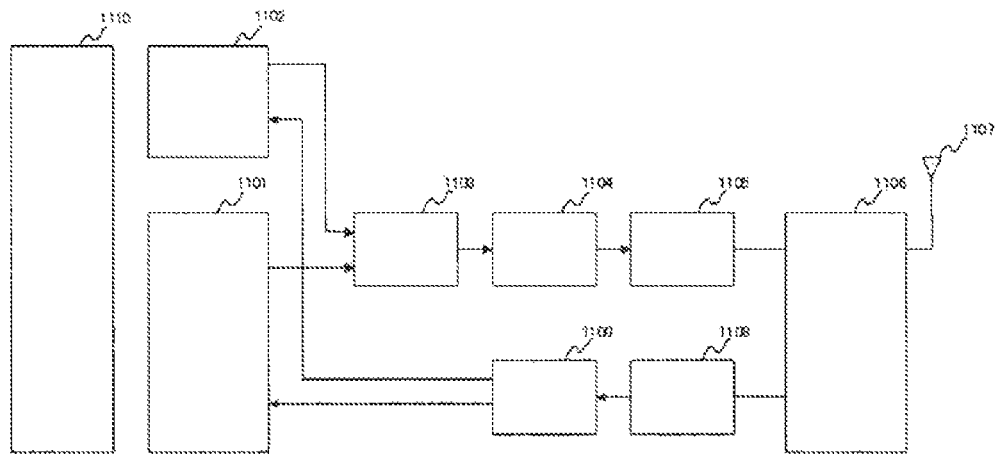
FIG. 11 is a block diagram showing the configuration of a mobile terminal.

FIG. 11 is a block diagram showing the configuration of a mobile terminal 101 for use in the system in accordance with the present invention. In FIG. 11, a transmitting process of the mobile terminal 101 is performed as follows. First, control data from a protocol processing unit 1101 and user data from an application unit 1102 are stored in a transmission data buffer unit 1103. The data stored in the transmission data buffer unit 1103 are delivered to an encoder unit 1104, and are subjected to an encoding process such as an error correction. There can exist data which are outputted directly from the transmission data buffer unit 1103 to a modulating unit 1105 without being encoded. A modulation process is performed on the data on which the encoding process has been performed by the encoder unit 1104 by the modulating unit 1105. After the modulated data are converted into a baseband signal, the baseband signal is outputted to a frequency converting unit 1106 and is converted into a transmission signal having a radio transmission frequency by the frequency converting unit 1106. After that, the transmission signal is transmitted to a base station 102 via an antenna 1107. The mobile terminal 101 also performs a receiving process as follows. A radio signal from a base station 102 is received by the antenna 1107. The received signal having a radio reception frequency is converted into a baseband signal by the frequency converting unit 1106, and a demodulation process is performed on the baseband signal by a demodulating unit 1108. Data which are obtained through the demodulating process are delivered to a decoder unit 1109, and are subjected to a decoding process such as an error correction. Control data included in the decoded data are delivered to the protocol processing unit 1101 while user data included in the decoded data are delivered to the application unit 1102. The series of processes carried out by the mobile terminal are controlled by a control unit 1110. Therefore, although not shown in the drawing, the control unit 1110 is connected to each of the units (1101 to 1109).

Figure 12:
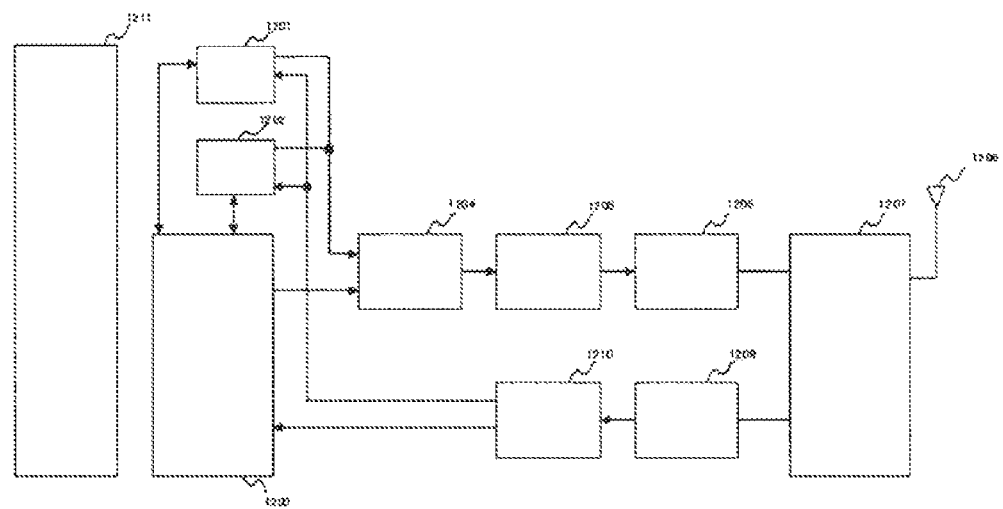
FIG. 12 is a block diagram showing the configuration of a base station.

FIG. 12 is a block diagram showing the configuration of a base station 102. The base station 102 performs a transmitting process as follows. An EPC communication unit 1201 transmits and receives data between the base station 102 and an EPC (an MME 103 and an S-GW 104). An other base station communicating unit 1202 transmits and receives data to and from another base station. Each of the EPC communication unit 1201 and the other base station communicating unit 1202 carries out reception and transmission of information from and to a protocol processing unit 1203. Control data from the protocol processing unit 1203, and user data and control data from the EPC communication unit 1201 and the other base station communicating unit 1202 are stored in a transmission data buffer unit 1204. The data stored in the transmission data buffer unit 1204 are delivered to an encoder unit 1205, and subjected to an encoding process such as an error correction. There can exist data which are outputted directly from the transmission data buffer unit 1204 to a modulating unit 1206 without being encoded. The modulating unit 1206 performs a modulation process on the encoded data. After the modulated data are converted into a baseband signal, the baseband signal is outputted to a frequency converting unit 1207 and is converted into a transmission signal having a radio transmission frequency by the frequency converting unit 1207. After that, the transmission signal is transmitted from an antenna 1208 to one or more mobile terminals 101. The base station 102 also performs a receiving process as follows. A radio signal from one or more mobile terminals 101 is received by the antenna 1208. The received signal having a radio reception frequency is converted into a baseband signal by the frequency converting unit 1207, and a demodulation process is performed on the baseband signal by a demodulating unit 1209. Data which are obtained through the demodulating process are delivered to a decoder unit 1210, and are subjected to a decoding process such as an error correction. Control data among the decoded data are delivered to the protocol processing unit 1203 or the EPC communication unit 1201 and the other base station communicating unit 1202, and user data among the decoded data are delivered to the EPC communication unit 1201 and the other base station communicating unit 1202. The series of processes carried out by the base station 102 are controlled by a control unit 1211. Therefore, although not shown in the drawing, the control unit 1211 is connected to each of the units (1201 to 1210).

Figure 13:
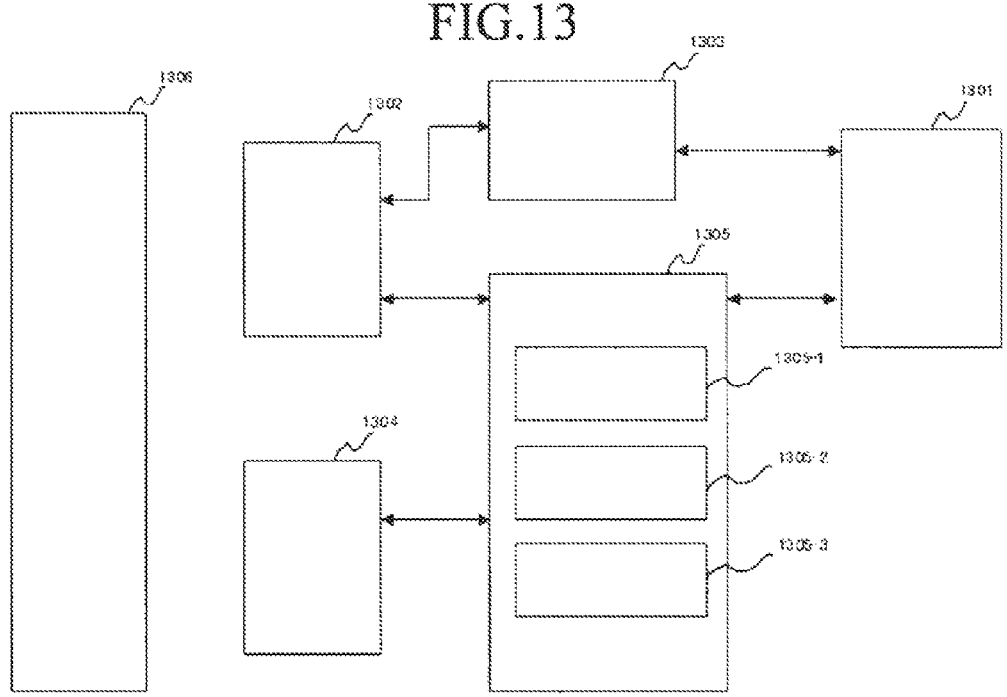
FIG. 13 is a block diagram showing the configuration of an MME (Mobility Management Entity)

FIG. 13 is a block diagram showing the configuration of an MME (Mobility Management Entity). A PDN GW communication unit 1301 carries out transmission and reception of data between the MME 103 and a PDN GW 902. A base station communication unit 1302 carries out transmission and reception of data between the MME 103 and a base station 102 via an S1_MME interface. When data received from the PDN GW 902 is user data, the user data is delivered from the PDN GW communication unit 1301 to the base station communication unit 1302 via a user plane processing unit 1303, and is then transmitted to one or more base stations 102. When data received from a base station 102 is user data, the user data is delivered from the base station communication unit 1302 to the PDN GW communication unit 1301 via the user plane processing unit 1303, and is then transmitted to the PDN GW 902.

An MCE communication unit 1304 carries out transmission and reception of data between the MME 103 and an MCE 801 via an IF between MME and MCE. When data received from the PDN GW 902 is control data, the control data is delivered from the PDN GW communication unit 1301 to a control plane control unit 1305. When data received from a base station 102 is control data, the control data is delivered from the base station communication unit 1302 to the control plane control unit 1305. Control data received from an MCE 801 is delivered from the MCE communication unit 1304 to the control plane control unit 1305. The results of a process carried out by the control plane control unit 1305 are transmitted to the PDN GW 902 via the PDN GW communication unit 1301, are then transmitted, via an S1_MME interface, to one or more base stations 102 by way of the base station communication unit 1302, and are then transmitted, via an IF between MME and MCE, to one or more MCEs 801 by way of the MCE communication unit 1304. A NAS security unit 1305-1, an SAE bearer control unit 1305-2, and an idle state (Idle State) mobility managing unit 1305-3 are included in the control plane control unit 1305, and the control plane control unit carries out general processes for control plane. The NAS security unit 1305-1 carries out security work for a NAS (Non-Access Stratum) message, etc. The SAE bearer control unit 1305-2 carries out management of a bearer of SAE (System Architecture Evolution), etc. The idle state mobility managing unit 1305-3 carries out mobility management of an idle state (an LTE-IDLE state, simply referred to as idle), generation and control of a paging signal at the time of an idle state, addition, deletion, update, and retrieval of a tracking area (TA) of one or more mobile terminals 101 being served by a base station, management of a tracking area list (TA List), etc. The MME starts a paging protocol by transmitting paging messages to cells belonging to a tracking area (TA) in which UEs are registered. The series of processes carried out by the MME 103 are controlled by a control unit 1306. Therefore, although not shown in the drawing, the control unit 1306 is connected to each of the units (1301 to 1305).

Figure 14:
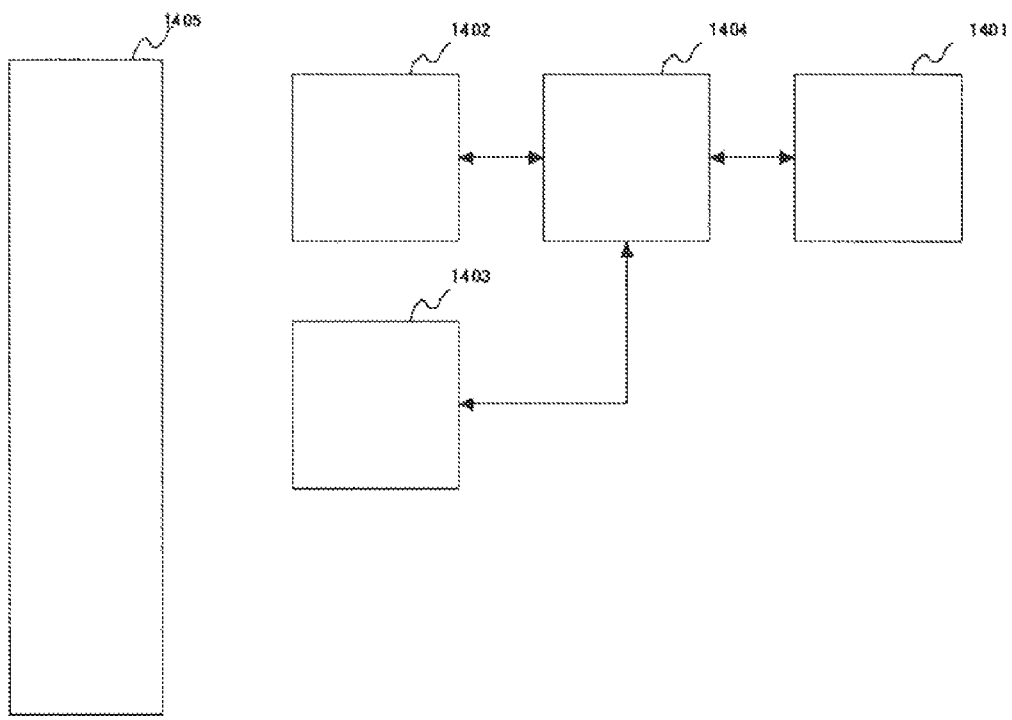
FIG. 14 is a block diagram showing the configuration of an MCE (Multi-cell/multicast Coordination Entity)

FIG. 14 is a block diagram showing the configuration of an MCE (Multi-cell/multicast Coordination Entity). An MBMS GW communication unit 1401 carries out transmission and reception of control data between the MCE 801 and an MBMS GW 802 via an M3 interface. A base station communication unit 1402 carries out transmission and reception of control data between the MCE 801 and a base station 102 via an M2 interface. An MME communication unit 1403 carries out transmission and reception of control data between the MCE 801 and an MME 103 via an IF between MME and MCE. An MC transmission scheduler unit 1404 carries out scheduling of multi-cell transmission of one or more MBSFN areas which the MC transmission scheduler unit manages by using control data from the MBMS GW 802 delivered thereto via the MBMS GW communication unit 1401, control data from a base station 102 in an MBSFN (Multimedia Broadcast multicast service Single Frequency Network) area, which are delivered thereto via the base station communication unit 1402, and control data from the MME 103 which are delivered thereto via the MME communication unit 1403. As an example of the scheduling, radio resources (time, frequency, etc.) of a base station, a radio configuration (a modulation method, a code, etc.), etc. can be provided. The results of the scheduling of multi-cell transmission are delivered to the base station communication unit 1402, and are then transmitted to one or more base stations 102 in the MBSFN area. The series of processes carried out by the MCE 801 are controlled by a control unit 1405. Therefore, although not shown in the drawing, the control unit 1405 is connected to each of the units (1401 to 1404).

Figure 15:
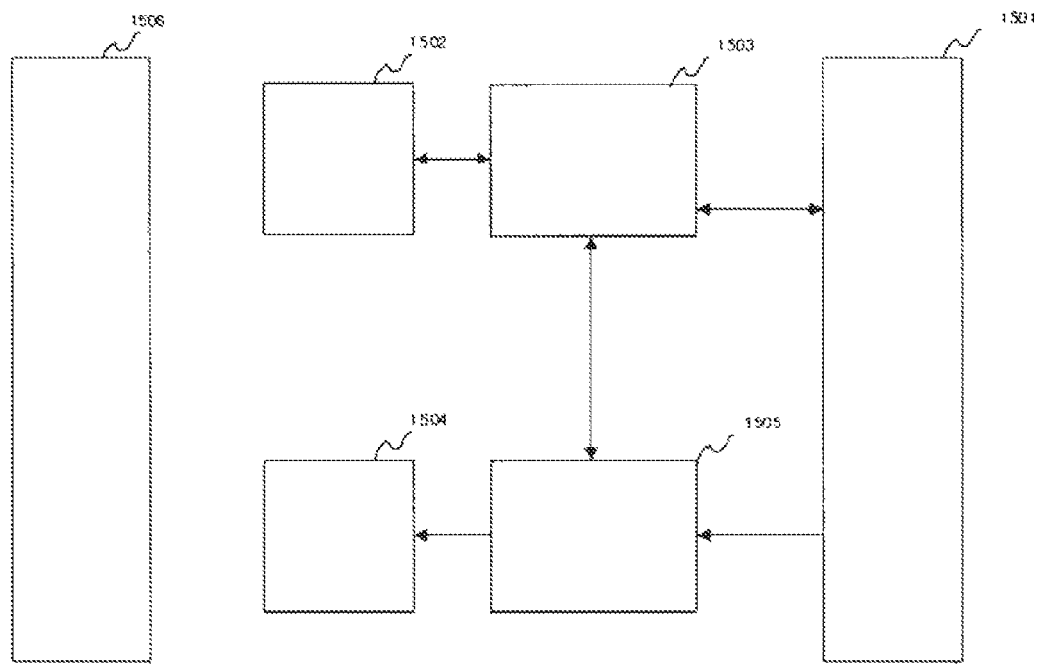
FIG. 15 is a block diagram showing the configuration of an MBMS gateway.

FIG. 15 is a block diagram showing the configuration of an MBMS gateway. In FIG. 15, an eBMSC communication unit 1501 of the MBMS GW 802 carries out transmission and reception of data (user data and control data) between the MBMS GW 802 and an eBMSC 901. The MCE communication unit 1502 carries out transmission and reception of control data between the MBMS GW 802 and an MCE 801 via an M3 interface. Control data received from the eBMSC 901 are delivered to an MBMS CP unit 1503 via the eBMSC communication unit 1501, and, after being processed by the MBMS CP unit 1503, are transmitted to one or more MCEs 801 via the MCE communication unit 1502. Control data received from the MCE 801 are delivered to the MBMS CP unit 1503 via the MCE communication unit 1502, and after being processed by the MBMS CP unit 1503, are transmitted to the eBMSC901 and/or the MCE 801 via the eBMSC communication unit 1501. A base station communication unit 1504 transmits user data (also referred to as traffic data) to the MBMS GW 802 and one or more base stations via an M1_U interface. User data received from the eBMSC 901 are delivered to an MBMS UP unit 1505 via the eBMSC communication unit 1501, and, after being processed by the MBMS UP unit 1505, are transmitted to one or more base stations 102 via the base station communication unit 1504. The MBMS CP unit 1503 and the MBMS UP unit 1505 are connected to each other. The series of processes carried out by the MBMS GW 802 is controlled by a control unit 1506. Therefore, although not shown in the drawing, the control unit 1506 is connected to each of the units (1501 to 1506).

Figure 16:
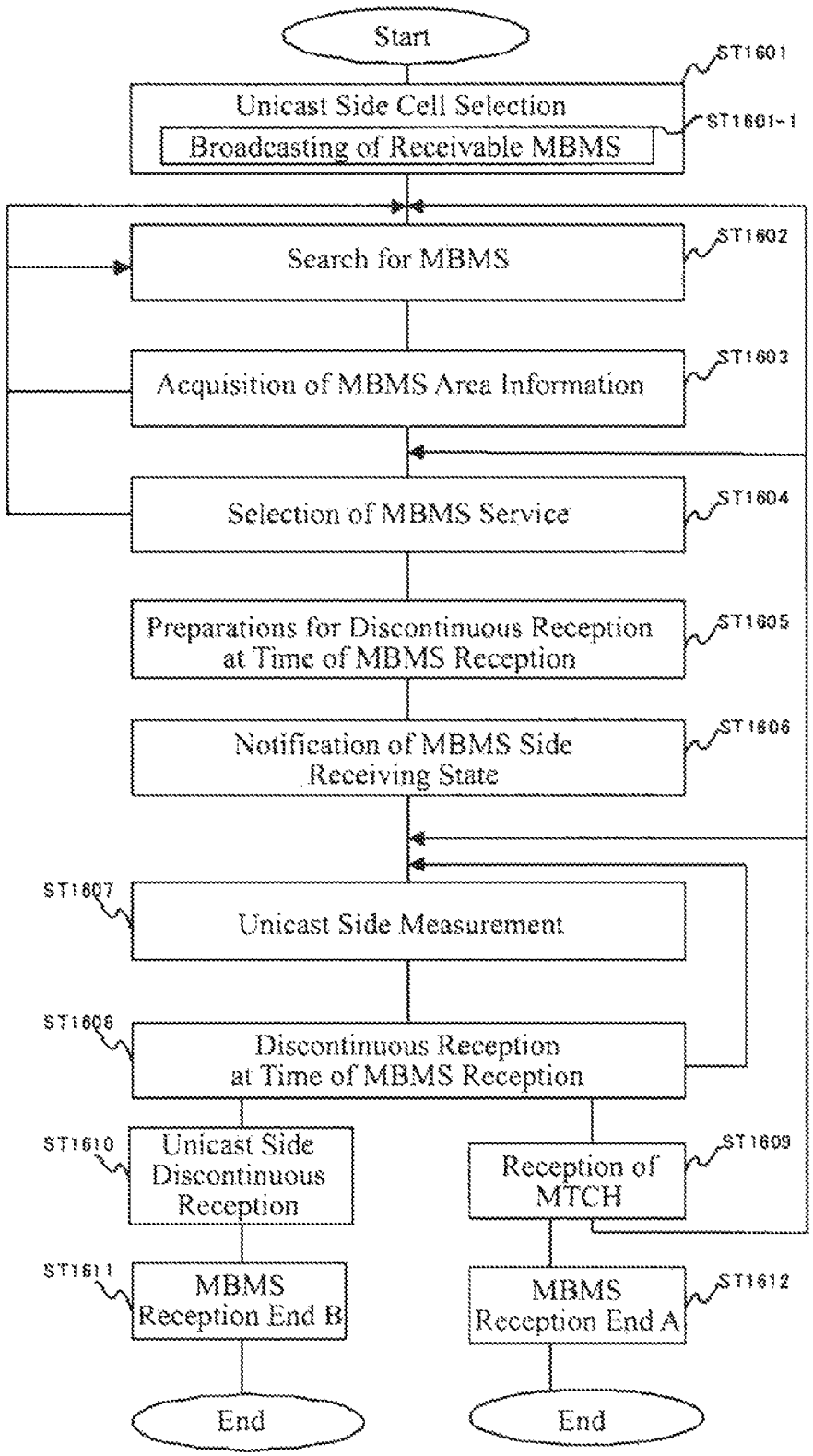
FIG. 16 is a flow chart showing an outline of processing including from a process of starting using an MBMS to a process of ending the use of the MBMS, which is carried out by a mobile terminal in the communication system which uses an LTE method.

Next, an example of a flow of processing carried out by the mobile communication system in accordance with the present invention will be shown in FIG. 16. FIG. 16 is a flow chart showing an outline of processing including from a process of starting using an MBMS to a process of ending the use of the MBMS, which is carried out by a mobile terminal in the communication system which uses an LTE method. The mobile terminal, in step ST1601 of FIG. 16, carries out a cell selection of a serving cell in an MBMS/Unicast-mixed cell. Hereafter, the process of step 1601 will be referred to as a "unicast side cell selection". A network side, in step ST1601-1, carries out a process of "broadcasting information about a receivable MBMS" to the mobile terminal. More specifically, the network side informs the mobile terminal that a currently-available MBMS service exists, or about information regarding frequencies of the MBMS service (a list of frequencies). Because through the process of step ST1601-1, the mobile terminal can know that a currently-available MBMS service exists, or know the information about frequencies of the MBMS service, the mobile terminal does not have to search for a receivable frequency in a round-robin manner. As a result, there is provided an advantage of shortening a control delay time occurring before the mobile terminal receives a service at a frequency other than a currently-selected frequency.

The mobile terminal, in step ST1602, carries out a search process of searching for an MBMS transmission dedicated cell on the basis of the information transmitted thereto from the network side in step ST1601. As an example of the search process, there is provided acquisition of timing synchronization (synchronization with radio frame timing), and system information, such as a system bandwidth, the number of transmission antennas, an MBSFN area identifier (ID) (also referred to as an MBSFN area number), and MCCH (multicast control channel)-related information, etc. Hereafter, the process of step 1602 will be referred to as a "search for MBMS". The mobile terminal, in step ST1603, receives information used for receiving an MBMS service (MCCH and MTCH) in the MBMS transmission dedicated cell from the network side. Hereafter, the process of step 1603 will be referred to as "MBMS area information acquisition". The user (mobile terminal), in step ST1604, selects an MBMS service which the user desires by using the information used for receiving the MBMS service received from the network side in step ST1603. Hereafter, the process of step 1604 will be referred to as "MBMS service selection".

As previously explained as the problems, it has been examined that in a communication system based on an LTE method, only a downlink for transmitting broadcast data provided by an MBMS service to mobile terminals is disposed while any uplinks are omitted, and a cell dedicated to MBMS transmission which implements a simple system configuration is disposed. In the above-mentioned explanation of steps ST1601-1 to ST1604, the method of selecting an MBMS service using such an MBMS transmission dedicated cell is disclosed. Therefore, there is provided an advantage of enabling the mobile terminal to receive a desired MBMS service by means of the MBMS transmission dedicated cell through the previously-explained series of processes.

The mobile terminal, in step ST1605, makes preparations for carrying out discontinuous reception of MBMS data from the MBMS transmission dedicated cell by using the information used for receiving an MBMS service received from the network side in step ST1603. Hereafter, the process of step 1605 will be referred to as "preparations for discontinuous reception at the time of MBMS reception". The mobile terminal, in step ST1606, carries out an "MBMS side receiving state notification" process of notifying the state of receiving the MBMS in the MBMS transmission dedicated cell to the network side. Because the MBMS transmission dedicated cell does not have any uplink disposed therein, any mobile terminal currently receiving MBMS data in the MBMS dedicated cell cannot carry out location registration into the network side. In this case, because the network side cannot specify the cell in which the mobile terminal is being located, it is difficult for the network side to transmit a paging signal to the mobile terminal when an incoming call destined for the mobile terminal in question is occurring. Because the network side, in this step ST1606, can know that the mobile terminal in question is receiving an MBMS service in the MBMS transmission dedicated cell, and becomes able to keep track of the mobile terminal, when an incoming call destined for the mobile terminal currently using the MBMS service in the MBMS transmission dedicated cell is occurring, the network side can transfer paging information to the MBMS transmission dedicated cell via an MME 103 and an MCE 801-1 to notify that a dedicated incoming call destined for the mobile terminal currently using the MBMS service is occurring. Therefore, the problem about paging to a mobile terminal currently using an MBMS service in an MBMS transmission dedicated cell can be solved.

The mobile terminal, in step ST1607, carries out a measurement (measurement) process including a measurement of the electric field intensity of a unicast cell (102-1 in FIG. 10) and/or that of an MBMS/Unicast-mixed cell (102-2 in FIG. 10), and a cell selection. This process will be referred to as a "unicast side measurement". By performing step ST1607, even if the mobile terminal is receiving MBMS data in the MBMS transmission dedicated cell, the mobile terminal becomes able to carryout a process including a measurement of a unicast cell (102-1 in FIG. 10) and a measurement of an MBMS/Unicast-mixed cell (102-2 in FIG. 10), a cell selection, location registration, etc. Because the mobile terminal currently using the MBMS service in the MBMS transmission dedicated cell has selected and updated either the unicast cell or the MBMS/Unicast-mixed cell which is the target for transmission by carrying out this measurement process, there is provided an advantage of being able to ensure mobility in the MBMS dedicated cells in which any uplink does not exist. Therefore, the mobile terminal currently using the MBMS service in the MBMS dedicated cell becomes able to surely carry out a process regarding mobility, such as location registration, via, for example, the unicast cell or the MBMS/Unicast-mixed cell, and, as a result, the network side becomes able to send a paging signal to the mobile terminal currently using the MBMS service in the MBMS transmission dedicated cell. The mobile terminal in question also carries out downlink synchronization establishment with a unicast/mixed frequency layer through a measurement at measurement periods (cycles). Accordingly, even in a case in which in an MBMS transmission dedicated cell in which any uplink does not exist, a mobile terminal transmits a response to a paging signal via an MBMS/Unicast-mixed cell, which is a challenge of the present invention, the control delay time can be reduced.

The mobile terminal, in step ST1608, carries out discontinuous reception in order to receive paging signals. More concretely, when a dedicated incoming call destined for the mobile terminal in question is occurring, the network side transmits a paging signal, via a downlink of the MBMS transmission dedicated cell, to the mobile terminal currently receiving the MBMS service from a frequency layer dedicated to MBMS transmission consisting of the MBMS transmission dedicated cell. In steps ST1605 to ST1608, a notification of paging to the mobile terminal using the MBMS service in the MBMS transmission dedicated cell, which is a challenge of the present invention, can be provided.

The mobile terminal which has not received the paging signal through the "discontinuous reception at the time of MBMS reception" of step ST1608, in step ST1609, receives MBMS traffic data transmitted thereto from the MBMS transmission dedicated cell via a multicasting traffic channel (MTCH). Hereafter, the process of step ST1609 will be referred to as "MTCH reception". The mobile terminal which is carrying out the "MTCH reception" makes a transition to step ST1607 at the time of the "unicast side measurement". As an alternative, the mobile terminal which is carrying out the "MTCH reception" makes a transition to step ST1602, ST1604, or ST1612 when the receive sensitivity becomes worse. In contrast, the mobile terminal which has received a paging signal through the "discontinuous reception at the time of MBMS reception" of step ST1608, in step ST1610, switches from a frequency (f(MBMS)) in the frequency layer dedicated to MBMS transmission to a frequency (f(Unicast)) in the unicast/mixed frequency layer, and carries out transmission and reception of control data. Hereafter, the process of step ST1610 will be referred to as "unicast side discontinuous reception". As a result, the mobile terminal in question becomes able to transmit uplink data, such as a response to the paging signal, to the network side via either the unicast cell or the mixed cell. The mobile terminal, in steps ST1611 and ST1612, informs the network side that the mobile terminal will end the reception of the MBMS data in the frequency layer dedicated to MBMS transmission (the MBMS transmission dedicated cell). By performing step ST1611, the mobile terminal enables the network side to know that the mobile terminal in question will end the use of the MBMS service. Because what is necessary is just to transmit a paging signal to the mobile terminal which has ended the use of the MBMS service with the frequency layer dedicated to MBMS transmission via either the unicast cell or the mixed cell, the network side can stop the process of transmitting the paging signal via the downlink of the MBMS transmission cell. Therefore, effective use of the radio resources of the MBMS transmission dedicated cell can be made.

Embodiment 2

Figure 17:
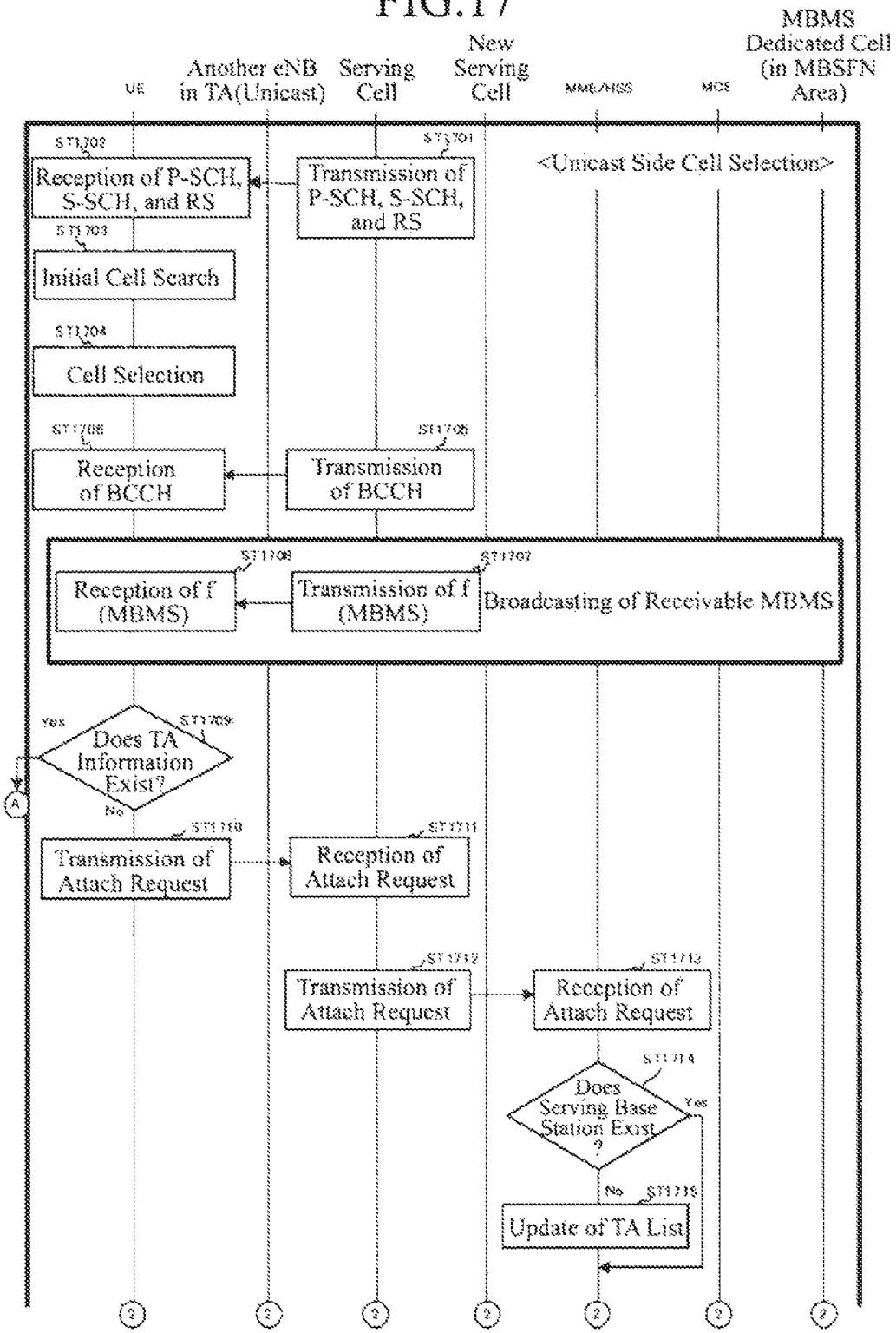
FIG. 17 is a flow chart explaining cell selection made by a unicast side.

In this embodiment, a detailed example of a flow of the processing carried out by the mobile communication system described in Embodiment 1 will be explained with reference to FIG. 17. FIG. 17 is a flow chart explaining a cell selection on a side of unicast. Each of a unicast cell and an MBMS/Unicast-mixed cell (simply refers to a mixed cell (Mixed cell)), in step ST1701, broadcasts a primary synchronization channel (Primary Synchronization Channel: P-SCH) and a secondary synchronization channel (Secondary Synchronization Channel: S-SCH), and a reference signal (also referred to as a reference symbol, Reference Symbol: RS) to mobile terminals being served thereby. Each of the mobile terminals, in step ST1702, receives the P-SCH, the S-SCH, and the RS from the base station (the unicast cell or/and the mixed cell). Each of the mobile terminals, in step ST1703, carries out an initial cell searching operation by using the P-SCH, the S-SCH, and the RS received thereby. The details of the cell searching operation which have been being debated in the 3GPP will be explained. In a first step, each of the mobile terminals carries out blind detection of the primary synchronization channel (P-SCH) for which three types of prescribed sequences exist in the mobile communication system. The P-SCH is mapped onto central 72 subcarriers of the system bandwidth in frequency, and is mapped onto the 1st (#0) and 6th (#5) subframes of each radio frame in time. Therefore, each of the mobile terminals which has blind-detected the P-SCH can detect 5 ms-timing and know cell groups (first to third groups corresponding to the above-mentioned three types of sequences of P-SCH). In a second step, each of the mobile terminals carries out blind detection of the secondary synchronization channel (S-SCH). The mapping positions of the S-SCH are the same as those of the P-SCH. Each of the mobile terminals which has blind-detected the S-SCH can detect 10 ms-timing frame synchronization) and know the cell identifier (Cell ID).

Each of the mobile terminals, in step ST1704, carries out a cell selection. The cell selection is a process of selecting one base station which satisfies the requirements for becoming a serving base station (cell) by using the results of a measurement of the downlink receive sensitivity of each of a plurality of base stations, which is carried out by each of the mobile terminals. As an example of the requirements for becoming a serving base station, there can be considered a case in which the base station to be selected has the best one of the downlink receive sensitivities of the plurality of base stations, or a case in which the base station to be selected has a receive sensitivity exceeding a minimum threshold of the receive sensitivity of a serving base station. As a value which each of the mobile terminals actually measures, there is reference symbol received power (Reference Symbol received power: RSRP), or an E-UTRA carrier received signal strength indicator (E-UTRA carrier received signal strength indicator: RSSI). A serving base station is a base station which takes charge of scheduling of the mobile terminal in question. Even a base station other than the serving base station for the mobile terminal in question can become a serving base station for other mobile terminals. That is, each of all base stations each of which is a unicast cell or an MBMS/Unicast-mixed cell has a scheduling function, and can become a serving base station for some mobile terminals. Each of the unicast cell and the MBMS/Unicast-mixed cell, in step ST1705, transmits broadcast information by using a broadcast control channel (BCCH) which is one of the logical channels. The broadcast information includes, as an example, a measurement period length, a discontinuous reception cycle length, and tracking area information (TA information). The measurement period length is informed from the network side to the mobile terminals being served thereby, and each of the mobile terminals measures a field intensity and so on at periods (cycles) of this period length. The discontinuous reception cycle length is the length of each of periods at which each of the mobile terminals monitors a paging signal periodically in order to receive a paging signal in an idle state (Idle State). The TA information is the information about a "tracking area" (Tracking Area). By sending a paging message to each eNB belonging to the tracking area in which UEs are registered, an MME starts a paging process (see TS36.300 19.2.2.1). Each of the mobile terminals, in step ST1706, receives the measurement period length, the discontinuous reception cycle length, the TA information, etc., via the BCCH, from the serving base station.

Each unicast cell or each MBMS/Unicast-mixed cell, in step ST1707, broadcasts one or more frequencies of an available MBMS service, i.e., one or more frequencies of a receivable MBSFN synchronization area (MBSFN Synchronization Area) (referred to as one or more frequencies f(MBMS)s) to the mobile terminals by using the BCCH. In a W-CDMA communication system, a parameter called preferred frequency information (Preferred frequency information: PL information) exists. The PL information is mapped onto a multicast control channel (MCCH), which is a logical channel, in the network side, and is broadcasted to the mobile terminals being served by the base station. A problem is, however, that in an LTE system, a unicast cell which does not provide any MBMS service is planned to be disposed, and this unicast cell cannot use the method of broadcasting a frequency f(MBMS) by using the MCCH which is a channel for MBMS.

Each of the mobile terminals, in step ST1708, receives the frequency f(MBMS) transmitted thereto by using the BCCH from the serving base station. By receiving the frequency f(MBMS), each of the mobile terminals does not have to search for a frequency at which a service can be provided therefor, other than a currently-selected frequency, in a round-robin manner. As a result, there is provided an advantage of shortening the control delay required for each of the mobile terminals to receive a service at a frequency other than the currently-selected frequency. Steps ST1707 and ST1708 are a detailed example of the "broadcasting information about a receivable MBMS" described in Embodiment 1. In this case, if each frequency f(MBMS) is determined statically (Static) or semi-statically (Semi-Static) in the mobile communication system, there can be provided an advantage of shortening the control delay time occurring before each of the above-mentioned mobile terminals receives a service at a frequency other than the currently-selected frequency without broadcasting each frequency f(MBMS) from the base station. In addition, because it becomes unnecessary to broadcast each frequency f(MBMS), an advantage of making effective use of the radio resources can also be provided.

As an alternative, the base station, in steps ST1707 and ST1708, can also broadcast the system bandwidth and the number of transmission antennas in each frequency f(MBMS) by using the BCCH in addition to each frequency f(MBMS). As a result, each of the mobile terminals does not have to acquire the system information (the system bandwidth and the number of transmission antennas) in the frequency layer dedicated to MBMS transmission by receiving frequency f(MBMS) transmitted by using the BCCH from the serving base station, in step ST1708. Therefore, there can be provided an advantage of shortening the control delay time. This is because even if the amount of information (the system bandwidth and the number of transmission antennas) increases, the length of processing time required for each of the mobile terminals to perform the processing does not increase so much because each of the mobile terminals needs to receive the BCCH from the serving base station in the unicast/frequency layer in order to receive each frequency f(MBMS), while because each of the mobile terminals needs to receive the BCCH in the frequency layer dedicated to MBMS transmission in order to acquire the system information of the frequency layer dedicated to MBMS transmission after switching to the frequency layer dedicated to MBMS transmission, and each of the mobile terminals therefore requires a decoding process of decoding another channel newly, a control delay time occurs.

Each of the mobile terminals, in step ST1709, checks to see whether or not the TA information of the serving base station received in step ST1706 is included in the current tracking area list (TA List) which each of the mobile terminals stores in the protocol processing unit 1101 or the control unit 1110 thereof. When the TA information is included in the current tracking area list, each of the mobile terminals makes a transition to step ST1720 of FIG. 18. In contrast, when the TA information is not included in the current tracking area list, each of the mobile terminals performs step ST1710. Each of the mobile terminals, in step ST1710, transmits an "attach request" (Attach Request) to the serving base station to inform that the TA information is not included in the current tracking area list. As information included in the "attach request", there are an identifier (IMSI (International Mobile Subscriber Identity)) or S-TMSI (S-Temporary Mobile Subscriber Identity, S-TMSI may be simply referred to as Temporary Mobile Subscriber Identity (TMSI)) of each of the mobile terminals, and the capability (Capability) of each of the mobile terminals. The serving base station which has received the "attach request" in step ST1711, in step ST1712, transmits the "attach request" to an MME (Mobility Management Entity) or an HSS (Home Subscriber Server). The MME, in step ST1713, receives the "attach request". The idle state mobility managing unit 1305-3 of the MME manages the tracking area list of each of the mobile terminals. The MME, in step ST1714, checks whether or not the serving base station of the mobile terminal in question is included in the tracking area list which is managed by the mobile terminal in question. When the serving base station of the mobile terminal in question is included in the tracking area list, the MME makes a transition to step ST1716 of FIG. 18. When the serving base station of the mobile terminal in question is not included in the tracking area list, the MME performs step ST1715. The idle state mobility managing unit 1305-3 of the MME, in step 1715, carries out a process of adding the TA information of the serving base station of the mobile terminal in question to the tracking area list which is managed by the mobile terminal in question (or updating the tracking area list). The MME, in step ST1716, informs an "attach accept" (Attach Accept) to the serving base station. The "attach accept" includes information such as the tracking area list, and an identifier (S-TMSI or the like) which is provided to the mobile terminal. The serving base station which, in step ST1717, has received the "attach accept", in step ST1718, informs the "attach accept" to the mobile terminal in question. The mobile terminal, in step ST1719, receives the "attach accept".

Figure 18:
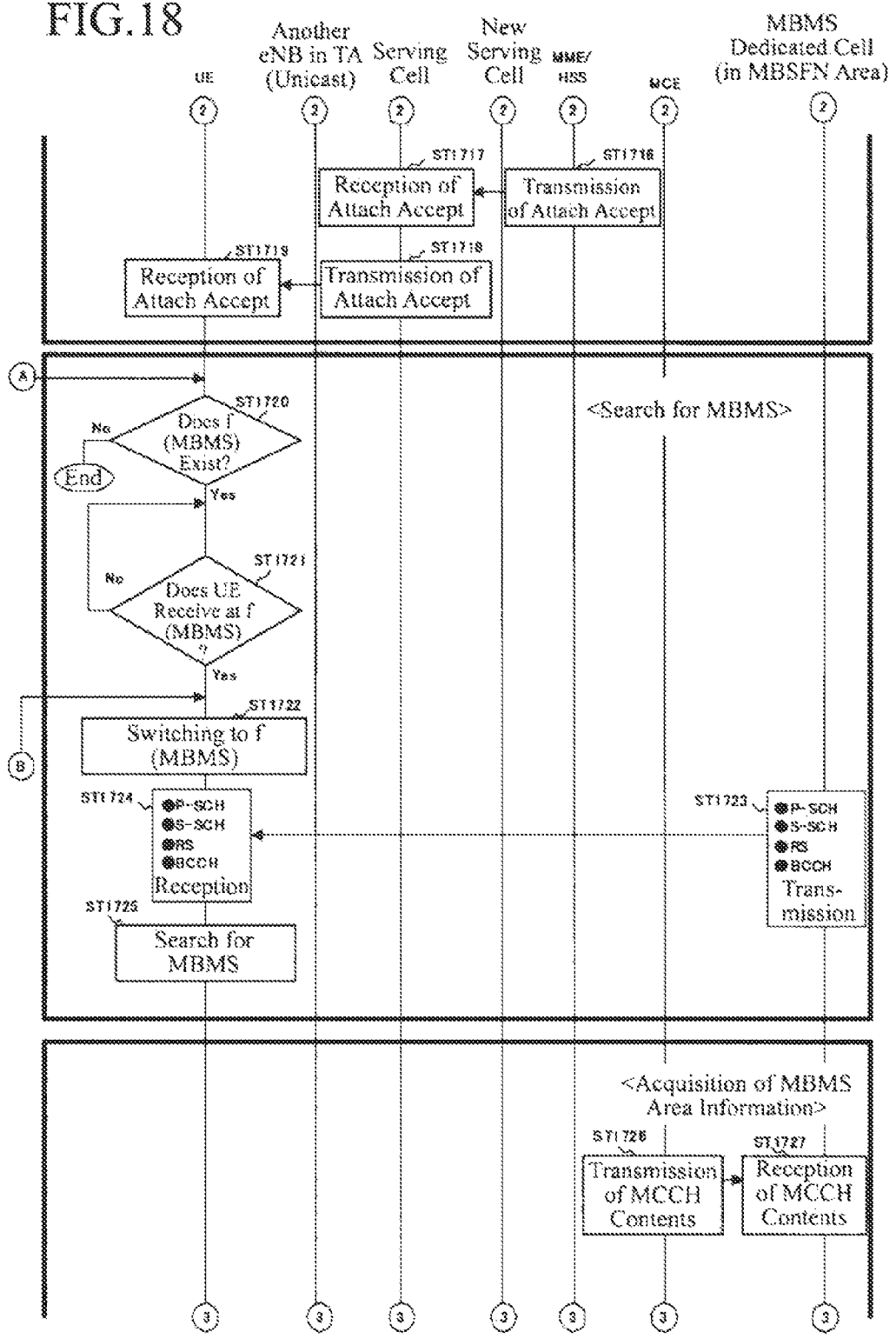
FIG. 18 is a flow chart showing an MBMS search process.

FIG. 18 is a flow chart showing an MBMS search process. Steps 1720 to 1725 of FIG. 18 are a concrete example of the "search for MBMS" described in Embodiment 1. Each of the mobile terminals, in step ST1720, checks to see whether it has received an frequency of a receivable MBSFN synchronization area (or a frequency of the frequency layer dedicated to MBMS transmission) in step ST1708. That is, each of the mobile terminals checks to see whether it has received one or more frequencies f(MBMS)s. When there exists no frequency (no f(MBMS)), each of the mobile terminals ends the process.

When there exists one or more frequencies (there exists one or more frequencies f(MBMS)s), each of the mobile terminals performs step ST1721. Each of the mobile terminals, in step ST1721, checks to see whether the user has an intention of receiving an MBMS service at a frequency f(MBMS). As an example of the checking, when the user has an intention of receiving an MBMS service, he or she uses a user interface to send a command to his or her mobile terminal, and each of the mobile terminals stores information showing the user's intention in the protocol processing unit 1101. Each of the mobile terminals, in step ST1721, checks to see whether or not the information showing the user's intention of receiving an MBMS service is stored in the protocol processing unit 1101. When the information showing the user's intention of receiving an MBMS service is not stored, each of the mobile terminals repeats the process of step ST1721. As a method of repeating the process, each of the mobile terminals uses a method of carrying out the determination of step ST1721 at constant periods (cycles), or a method of carrying out step ST1721 or ST1720 when receiving a notification showing a change in the user's intention of receiving an MBMS service from the user by way of the user interface. In contrast, when the information showing the user's intention of receiving an MBMS service is stored, each of the mobile terminals makes a transition to step ST1722. Each of the mobile terminals, in step ST1722, changes the frequency set to the frequency converting unit 1107 (synthesizer) thereof and changes its center frequency to the frequency f(MBMS) to start the searching operation of searching for an MBMS. Changing the frequency set to the frequency converting unit 1107 to change its center frequency is referred to as re-tune (re-tune). The MBMS dedicated cell, in step ST1723, broadcasts a primary synchronization channel (Primary Synchronization Signal: P-SCH) and a secondary synchronization channel (Secondary Synchronization Signal: S-SCH), a reference signal (RS (MBMS)), and a BCCH to the mobile terminals being served thereby. Each of the mobile terminals, in step ST1724, receives the P-SCH, the S-SCH, the RS (MBMS), and the BCCH (broadcast control channel) from the MBMS dedicated cell.

Each of the mobile terminals, in step ST1725, performs the searching operation of searching for an MBMS. At that time, each of the mobile terminals measures the reception quality using the reference signal (RS). The searching operation in the frequency layer dedicated to MBMS transmission which has been debated in the 3GPP will be explained. A sequence exclusively used in the frequency layer dedicated to MBMS transmission is added to the P-SCH. It is assumed that the additional sequence for exclusive use is defined statically. In a first step, each of the mobile terminals carries out blind detection of the P-SCH in the additional sequence for exclusive use. The P-SCH is mapped onto central 72 subcarriers of the system bandwidth in frequency, and is mapped onto the 1st (#0) and 6th (#5) subframes of each radio frame in time. Therefore, each of the mobile terminals which has blind-detected the P-SCH can carry out 5 ms-timing detection. Furthermore, the P-SCH is transmitted via a multi-cell transmission scheme. In a second step, each of the mobile terminals carries out blind detection of the S-SCH. The mapping positions of the S-SCH are the same as those of the P-SCH. Each of the mobile terminals which has blind-detected the S-SCH can detect 10 ms-timing (frame synchronization) and know the MBSFN area ID. Furthermore, the S-SCH is transmitted via a multi-cell transmission scheme. Each of the mobile terminals receives the BCCH by using the scrambling code (Scrambling Code) related to the MBSFN area ID acquired in the second step. Each of the mobile terminals can acquire the scheduling of the MCCH (multicast control channel) by decoding the BCCH. In this decoding process, each of the mobile terminals uses the scrambling code (Scrambling Code) related to the above-mentioned MBSFN area ID. Furthermore, the BCCH is transmitted via a multi-cell transmission scheme. In the present invention, it is assumed that each of the mobile terminals can acquire the system bandwidth at f(MBMS) and the number of transmission antennas at f(MBMS) by further decoding the BCCH. In a case in which in the mobile communication system, the system bandwidth and the number of transmission antennas at f(MBMS) are determined statically (Static) or semi-statically (Semi-Static), there can be provided an advantage of being able to eliminate the necessity to broadcast the system bandwidth and/or the number of transmission antennas at f(MBMS) from a base station to make effective use of the radio resources. Furthermore, because the necessity to change the decoding and the parameters (the system bandwidth and/or the number of transmission antennas at f(MBMS)) can be eliminated, there can be provided an advantage of achieving low power consumption in each mobile terminal, and a reduction of the control delay time.

In the present invention, the scheduling of the MCCH will be further studied. According to the current standards of the 3GPP, it is defined that an MBSFN synchronization area (Multimedia Broadcast multicast service Single Frequency Network Synchronization Area f(MBMS)) can support one or more MBSFN areas (MBSFN Areas) (refer to FIG. 7). In contrast, it has not been decided how to multiplex a plurality of MBSFN areas with f(MBMS) which is a single frequency (Single Frequency). Hereafter, the "MBMS search" process in accordance with the present invention which is adapted in such a way as to support several different methods of multiplexing MBSFN areas will be explained in the case of using each of the different multiplexing methods.

Figure 25:
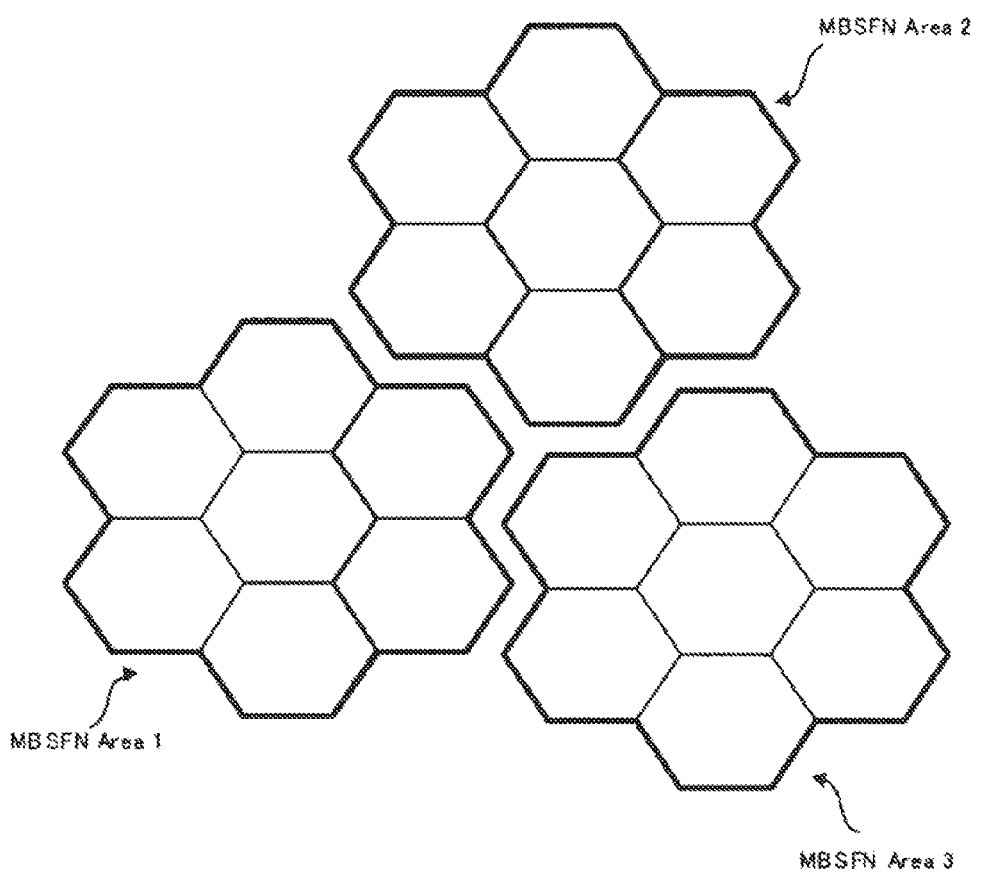
FIG. 25 is an explanatory drawing showing a plurality of MBSFN areas which construct an MBSFN synchronization area.
Figure 26:
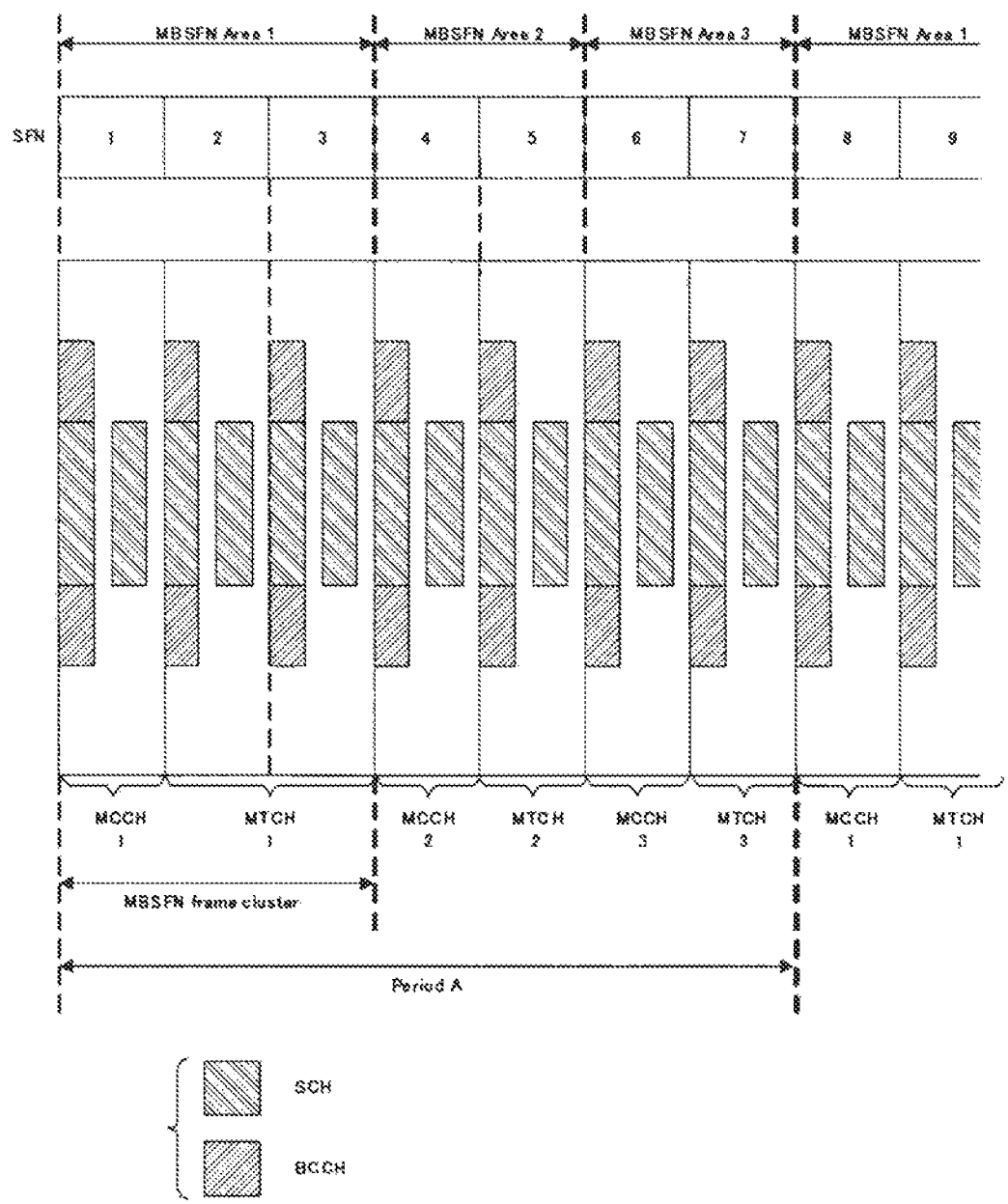
FIG. 26 is a conceptual diagram of mapping to a physical channel in the MBSFN synchronization area when time division multiplexing of MBSFN areas is carried out.

First, a case in which time division multiplexing (TDM: Time Division Multiplexing) of MBSFN areas is carried out will be explained. A conceptual diagram of the geographical location of a base station in a case in which two or more MBSFN areas exist is shown in FIG. 25. FIG. 25 is an explanatory drawing showing a plurality of MBSFN areas which construct an MBSFN synchronization area. In FIG. 25, the three areas: the MBSFN area 1, the MBSFN area 2, and the MBSFN area 3, exist within the single MBSFN synchronization area. An example of the scheduling of the MCCH in the BCCH acquired in step ST1725 has not been debated in detail in the 3GPP. In order to disclose a method of selecting a desired service in a frequency layer dedicated to MBMS transmission, and a mobile communication system which enables the method to be implemented therein, which are a challenge of the present invention, an example of the scheduling of the MCCH in the BCCH in the case in which time division multiplexing of MBSFN areas is carried out will be shown. FIG. 26 is a conceptual diagram of mapping to a physical channel in the MBSFN synchronization area when time division multiplexing of the MBSFN areas is carried out.

FIG. 26 shows a concept of time division multiplexing of channels to the plurality of MBMFN area which is carried out in the single MBSFN synchronization area. Because the MBFSN areas included in the single MBSFN synchronization area are synchronized with one another in time, the P-SCH (primary synchronization channel) is transmitted at the same time within each of the MBMS dedicated cell in the MBSFN area 1, the MBMS dedicated cell in the MBSFN area 2, and the MBMS dedicated cell in the MBSFN area 3. Furthermore, assuming that the additional sequence for exclusive use is used, the sequences of the P-SCH in all the MBSFN areas are the same as one another. Therefore, in the MBSFN synchronization area, identical information is transmitted at the same time by using the P-SCH. Furthermore, as mentioned above, it is considered that the MBSFN area ID is transmitted by using the S-SCH (secondary synchronization channel). In this case, by using the S-SCH, information different for each MBSFN area is transmitted at the same time in the MBSFN synchronization area. In this case, all the MBMS dedicated cells in each MBSFN area transmit identical information at the same time. When the mobile communication system carries out transmission of data using the BCCH, the mobile communication system multiplies the data by the scrambling code related to the MBSFN area ID. This scrambling code is informed to each of the mobile terminals by using the S-SCH (secondary synchronization channel). Therefore, information different for each MBSFN area is transmitted by using the BCCH at the same time in the MBSFN synchronization area. On the other hand, the contents of the BCCH are the same in all the base stations dedicated to MBMS in each MBSFN area. By decoding the BCCH, each of the mobile terminals can acquire the scheduling of the MCCH.

As described in nonpatent reference 2, for current 3GPP communication systems, allocation of MBSFN subframes in an MBMS/Unicast-mixed cell has been examined. In a communication system based on an LTE method, because there exist no subframes for unicast in an MBMS dedicated cell which is disposed in the communication system, all the subframes in the MBMS dedicated cell are MBSFN ones. However, it is important to match the configuration of an MBMS/Unicast-mixed cell to that of an MBMS dedicated cell as much as possible. To this end, a method of carrying out scheduling in an MBMS dedicated cell following the concept about the "MBSFN frame cluster" (MBSFN frame Cluster) disclosed by nonpatent reference 2 will be disclosed hereafter. In addition, the scheduling of the MCCH in an MBSFN subframe will also be explained. In FIG. 26, each of cycles in which an MBSFN frame cluster is repeated are referred to as an MBSFN frame cluster repetition period (MBSFN frame Cluster Repetition Period). Furthermore, each of cycles in which an MCCH is transmitted is referred to as an MCCH repetition period (MCCH Repetition Period). A case in which an MBSFN frame cluster is shorter than the MCCH repetition period length will be explained.

In FIG. 26, it is considered that a starting point value of a time at which the MCCH is mapped and the MCCH repetition period length are informed as the scheduling of the MCCH. More concretely, the number of radio frames is used for the indication of the MCCH repetition period length. An SFN (System Frame Number) is used for the indication of the starting point value. Something other than the number of radio frames can be used for the indication of the MCCH repetition period length. As a concrete example, the number of subframes can be used for the indication of the MCCH repetition period length. Something other than an SFN can be used for the indication of the starting point value. As a concrete example, an offset value from a certain reference value can be used for the indication of the starting point value. In a case in which the MCCH is mapped onto some subframes in a radio frame, an SFN, a subframe number, and so on can be informed as the starting point. A concrete computation expression for calculating the starting point value is expressed by (the starting point value=(the SFN number of the leading one of system frames onto which the MCCH is mapped) mod (the MCCH repetition period length)). In FIG. 26, the MCCH starting point value 1 of the MBSFN area 1 is 1 mod 7=1, 8 mod 7=1, or . . . , and the parameters of the MCCH scheduling of the MBSFN area 1 are the MCCH repetition period length 1 of "7" and the starting point value 1 of "1". Furthermore, the MCCH starting point value 2 of the MBSFN area 2 is 4 mod 7=4, or . . . , and the parameters of the MCCH scheduling of the MBSFN area 2 are the MCCH repetition period length 2 of "7" and the starting point value 2 of "4". Furthermore, the MCCH starting point value 3 of the MBSFN area 3 is 6 mod 7=6, or . . . , and the parameters of the MCCH scheduling of the MBSFN area 3 are the MCCH repetition period length 3 of "7" and the offset value 3 of "6". The SFN at this time is broadcast for each radio frame when mapped onto the BCCH, and is effective also when receiving the MCCH from the MCCH starting point value.

That is, data which are transmitted from each base station belonging to the MBSFN area 1 are provided as follows. The P-SCH (primary synchronization channel) which is the above-mentioned additional sequence for exclusive use, the S-SCH1 (secondary synchronization channel) onto which the MBSFN area ID1 and so on are mapped, a BCCH1 onto which the MCCH starting point value 1 of "1", the MCCH repetition period length 1 of "7", and so on are mapped, and which is multiplied by the scrambling code 1, and an MCCH1 and an MTCH1 of the MBSFN area 1 are transmitted. Because time division multiplexing of each base station belonging to the MBSFN area 1, MBSFN area 2 and MBSFN area 3 is carried out, an MCCH2 and an MCCH3 and an MTCH2 and an MTCH3 from each base station belonging to the MBSFN area 2 or 3 are in a discontinuous transmission (DTX: Discontinuous transmission) state during a time period during which the MBSFN area 1 is carrying out transmission. Each of the MCCH1 and the MTCH1 can be multiplied by the scrambling code 1. By multiplying each of the MCCH1 and the MTCH1 by the scrambling code, there can be provided an advantage of unifying a process to be performed on MBSFN-area-specific data (BCCH, MCCH, and MTCH). In contrast, because the MCCH and the MTCH are subjected to time division multiplexing (TDM), it is not necessary to multiply each of the MCCH and the MTCH by the MBSFN-area-specific scrambling code. In the case of not multiplying each of the MCCH1 and the MTCH1 by the scrambling code, there can be provided an advantage of reducing the load of encoding processing on each base station side and the load of decoding process on each mobile terminal side, and hence reducing the time delay occurring before data reception.

Like in the case of the MBSFN area 1, data which are transmitted from each base station belonging to the MBSFN area 2 are provided as follows. The P-SCH (primary synchronization channel) which is the above-mentioned additional sequence for exclusive use, the S-SCH2 (secondary synchronization channel) onto which the MBSFN area ID2 and so on are mapped, a BCCH2 onto which the MCCH starting point value 2 of "4", the MCCH repetition period length 2 of "7", and so on are mapped, and which is multiplied by the scrambling code 2, and the MCCH2 and the MTCH2 of each base station belonging to the MBSFN area 2 are transmitted. The MCCH1 and 3 and the MTCH1 and 3 from each base station belonging to the MBSFN area 1 and 3 are in a discontinuous transmission (DTX: Discontinuous transmission) state during this time period. Like in the case of the MBSFN area 1, data which are transmitted from each base station belonging to the MBSFN area 3 are provided as follows. The P-SCH (primary synchronization channel) which is the above-mentioned additional sequence for exclusive use, the S-SCH3 (secondary synchronization channel) onto which the MBSFN area ID3 and so on are mapped, a BCCH3 onto which the MCCH starting point value 3 of "6", the MCCH repetition period length 3 of "7", and so on are mapped, and which is multiplied by the scrambling code 3, and the MCCH3 and the MTCH3 of the MBSFN area 3 are transmitted. The MCCH1 and 2 and the MTCH1 and 2 from each base station belonging to the MBSFN area 1 and 2 are in a discontinuous transmission (DTX: Discontinuous transmission) state during this time period. For the sake of simplicity, an example in which time division multiplexing of the MCCH and the MTCH is carried out for each radio frame is shown in FIG. 26. However, the present invention can be applied to a case in which another method of multiplexing the MCCH and the MTCH is used, and a case in which the time division multiplexing is carried out for each of units other than each radio frame. Furthermore, as long as the MCCH repetition period length is determined statically (Static) or semi-statically (Semi-Static) in the mobile communication system, each base station does not have to broadcast the MCCH repetition period length. Therefore, because the amount of information to be broadcast decreases, there can be provided an advantage of making effective use of the radio resources.

Figure 27:
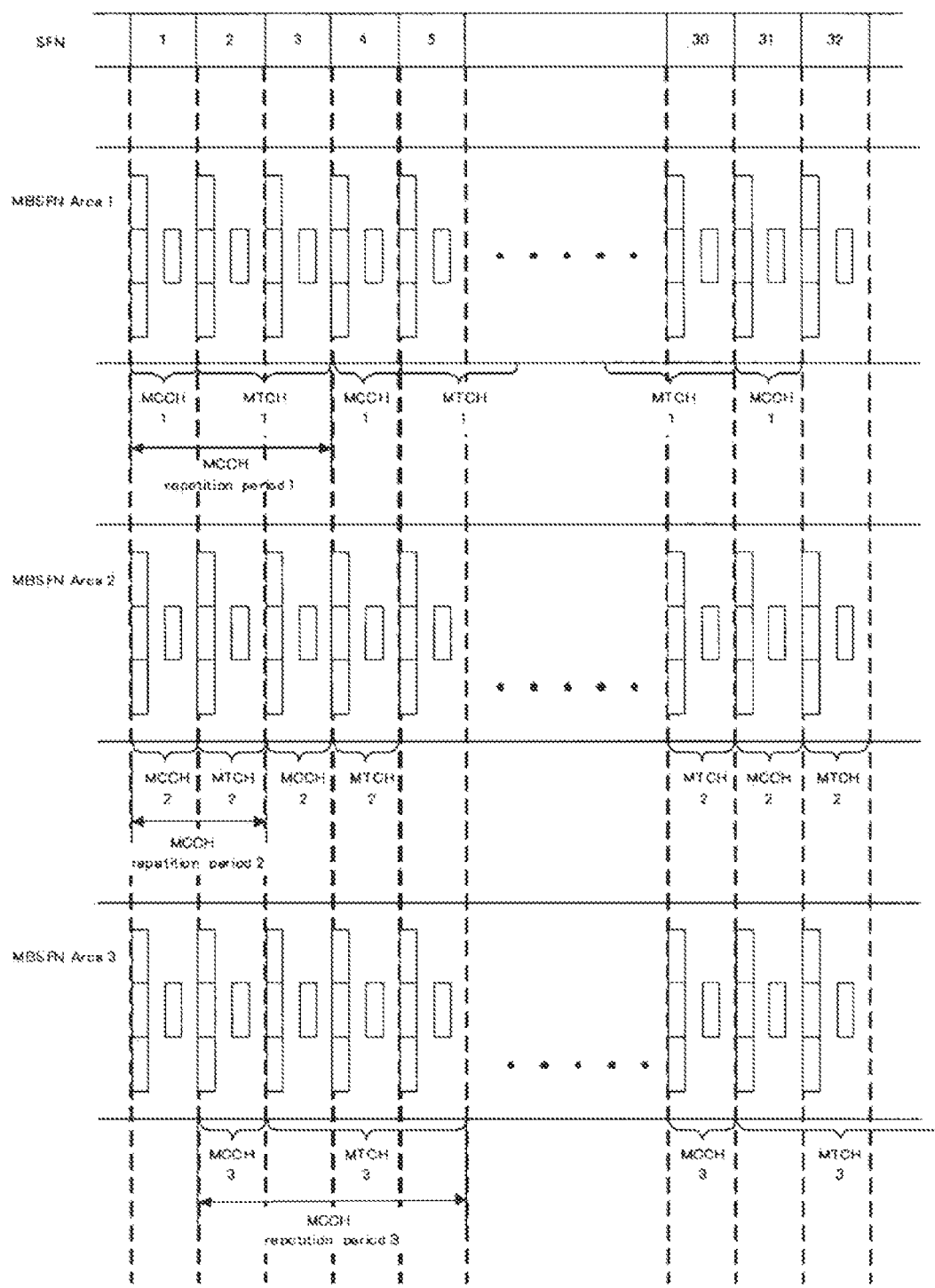
FIG. 27 is a conceptual diagram of mapping to a physical channel in the MBSFN synchronization area when code division multiplexing of MBSFN areas is carried out.

Next, a case in which code division multiplexing (CDM: Code Division Multiplexing) of MBSFN areas is carried out will be explained. A conceptual diagram showing the location of a base station in a case in which two or more MBSFN areas exist is the same as that in the case of time division multiplexing (TDM). FIG. 27 is a conceptual diagram of mapping to a physical channel in the MBSFN synchronization area when code division multiplexing of MBSFN areas is carried out. In FIG. 27, it is assumed that an MBMS service (an MCCH and an MTCH) is transmitted continuously in each of the MBSFN areas. In such a case, an MBSFN frame cluster does not have to be defined. A case in which an MBSFN frame cluster is shorter than the MCCH repetition period length will be explained. Because an example of a P-SCH (primary synchronization channel), an S-SCH (secondary synchronization channel), and a BCCH is the same as that in the case of time division multiplexing (TDM), an explanation of the example will be omitted hereafter. In the present invention, it is considered that a starting point value of a time at which an MCCH is mapped and the MCCH repetition period length are informed as the scheduling of the MCCH. More concretely, the number of radio frames is used for the indication of the MCCH repetition period length. An SFN (System Frame Number) is used for the indication of the starting point value. Something other than the number of radio frames can be used for the indication of the MCCH repetition period length. As a concrete example, the number of subframes can be used for the indication of the MCCH repetition period length. Something other than an SFN can be used for the indication of the starting point value. As a concrete example, an offset value from a certain reference value can be used for the indication of the starting point value. In a case in which the MCCH is mapped onto some subframes in a radio frame, an SFN, a subframe number, and so on can be informed as the starting point. A concrete computation expression for calculating the starting point value is expressed by (the starting point value= (the SFN number of the leading one of system frames onto which the MCCH is mapped) mod (the MCCH repetition period length)). In FIG. 27, the MCCH starting point value of the MBSFN area 1 is 1 mod 3=1, 4 mod 3=1, or . . . , and the parameters of the MCCH scheduling of the MBSFN area 1 are the MCCH repetition period length 1 of "3" and the starting point value of "1". The MCCH starting point value of the MBSFN area 2 is 1 mod 2=1, 3 mod 2=1, or . . . , and the parameters of the MCCH scheduling of the MBSFN area 1 are the MCCH repetition period length 2 of "2" and the starting point value of "1". The MCCH starting point value of the MBSFN area 3 is 2 mod 4=2, or . . . , and the parameters of the MCCH scheduling of the MBSFN area 3 are the MCCH repetition period length 3 of "4" and the starting point value of "2".

That is, data which are transmitted from each base station belonging to the MBSFN area 1 are provided as follows. The P-SCH (primary synchronization channel) which is the sequence intended for the frequency layer dedicated to MBMS transmission (the above-mentioned additional sequence for exclusive use), the S-SCH1 (secondary synchronization channel) onto which the MBSFN area ID1 and so on are mapped, a BCCH1 onto which the MCCH starting point value 1 of "1", the MCCH repetition period length 1 of "3", and so on are mapped, and which is multiplied by the scrambling code 1, and an MCCH1 and an MTCH1 of each base station belonging to the MBSFN area 1, each of which is multiplied by the scrambling code 1, are transmitted. Like in the case of the MBSFN area 1, data which are transmitted from each base station belonging to the MBSFN area 2 are provided as follows. The P-SCH (primary synchronization channel) which is the sequence intended for the frequency layer dedicated to MBMS transmission, the S-SCH2 (secondary synchronization channel) onto which the MBSFN area ID2 and so on are mapped, a BCCH2 onto which the MCCH starting point value 2 of "1", the MCCH repetition period length 2 of "2", and so on are mapped, and which is multiplied by the scrambling code 2, and an MCCH2 and an MTCH2 of each base station belonging to the MBSFN area 2, each of which is multiplied by the scrambling code 2, are transmitted. Like in the case of the MBSFN area 1, data which are transmitted from each base station belonging to the MBSFN area 3 are provided as follows. The P-SCH (primary synchronization channel) which is the sequence intended for the frequency layer dedicated to MBMS transmission, the S-SCH3 (secondary synchronization channel) onto which the MBSFN area ID3 and so on are mapped, a BCCH3 onto which the MCCH starting point value 3 of "2", the MCCH repetition period length 3 of "4", and so on are mapped, and which is multiplied by the scrambling code 3, and an MCCH3 and an MTCH3 of each base station belonging to the MBSFN area 3, each of which is multiplied by the scrambling code 3, are transmitted.

For the sake of simplicity, an example in which time division multiplexing of the MCCH and the MTCH is carried out for each radio frame is shown in FIG. 27. However, the present invention can be applied to a case in which another method of multiplexing the MCCH and the MTCH is used, and a case in which the time division multiplexing is carried out for each of units other than each radio frame. Furthermore, as long as the MCCH repetition period length is determined statically (Static) or semi-statically (Semi-Static) in the mobile communication system, any base station does not have to broadcast the MCCH repetition period length. Therefore, because the amount of information to be broadcast decreases, there can be provided an advantage of making effective use of the radio resources. In the case in which code division multiplexing (CDM) of MBSFN areas is carried out, because a different repetition period length can be set up for each of the MBSFN areas, there is provided an advantage of being able to carry out scheduling with high flexibility for MBMS services as compared with the case in which time division multiplexing (TDM) of MBSFN areas is carried out. In addition, because the code division multiplexing is used, even when MTCHs and MCCHs from a plurality of MBSFN areas coincide simultaneously at a mobile terminal, the mobile terminal can separate them from one another (because the mobile terminal can separate them from one another by using the scrambling codes). Therefore, because the mobile communication system can transmit MTCHs and MCCHs from the MBSFN areas 1 to 3 simultaneously, there can be provided an advantage of expanding the frequency and time radio resources which are allocated to one MBSFN area.

Figure 28:
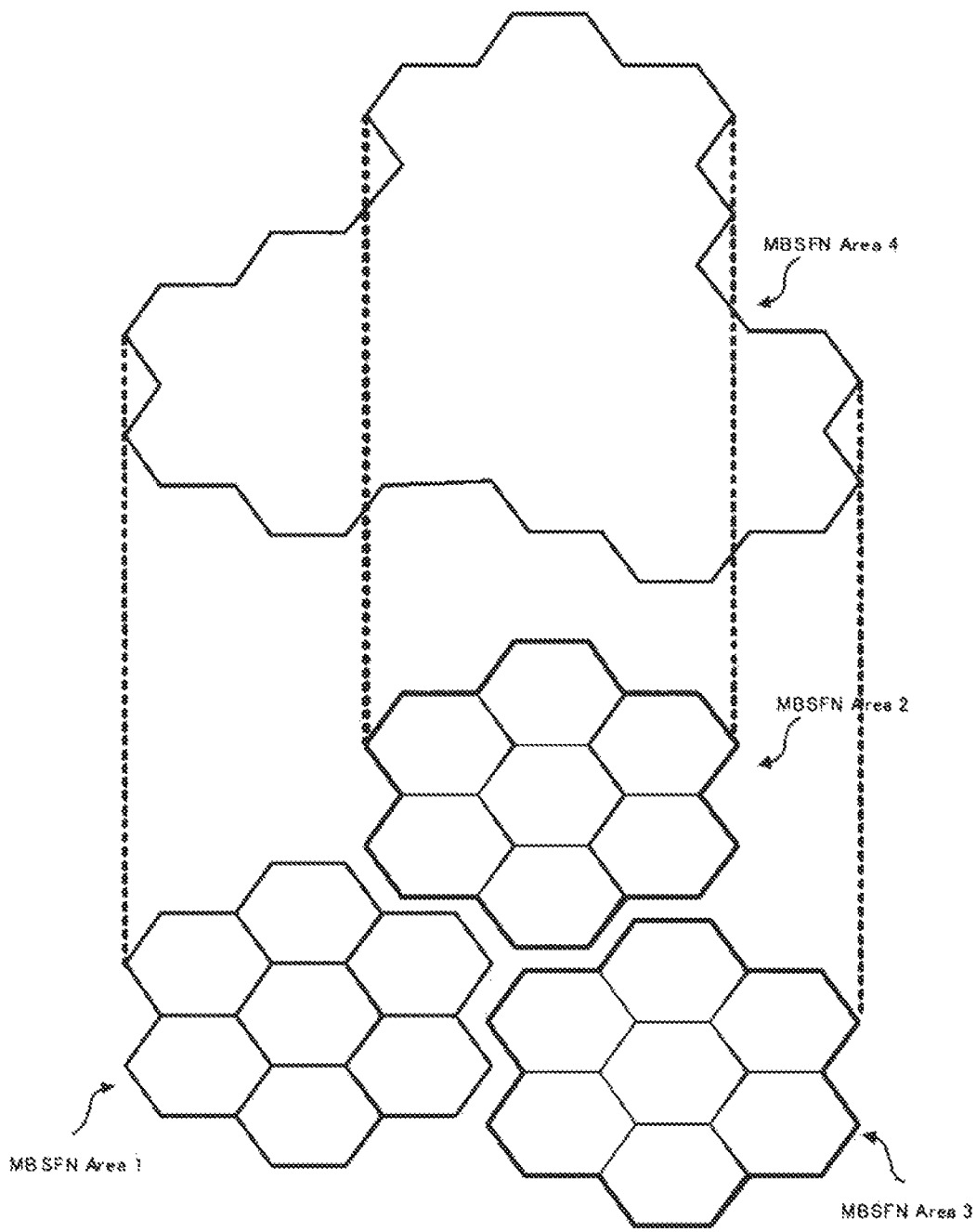
FIG. 28 is an explanatory drawing showing a plurality of MBSFN areas which construct an MBSFN synchronization area, and also showing an MBSFN area covering a plurality of MBSFN areas.

Next, an explanation will be made as to a study to dispose an MBSFN area covering a plurality of MBSFN areas which has been made in the current debate of the 3GPP. FIG. 28 is an explanatory drawing showing a plurality of MBSFN areas which construct an MBSFN synchronization area, and is an explanatory drawing showing an MBSFN area covering a plurality of MBSFN areas. In FIG. 28, four MBSFN areas 1 to 4 exist in a single MBSFN synchronization area (MBSFN Synchronization Area). Among the four MBSFN areas, the MBSFN area 4 covers the MBSFN areas 1 to 3. Although it has been debated that this MBSFN area 4 is accessed via one of the MBSFN areas 1 to 3 covered by the MBSFN area 4, more detailed information has not been decided yet. Therefore, a method of accessing an MBSFN area covering a plurality of MBSFN areas will be explained hereafter.

As previously mentioned, because no more detailed decision has been made as to a multiplexing method of multiplexing MBSFN areas, a case in which time division multiplexing of the MBSFN area 4 and the MBSFN areas 1 to 3 covered by this MBSFN area 4 is carried out, and code division multiplexing of the MBSFN areas 1 to 3 covered by the MBSFN area 4 is then carried out will be explained first. An example of step ST1725 (refer to FIG. 18) in the case in which the MBSFN areas have geographical locations as shown in FIG. 28 will be shown. In a first step, each of the mobile terminals carries out blind detection of a P-SCH (a primary synchronization channel) in the above-mentioned sequence for exclusive use. Therefore, each of the mobile terminals which has blind-detected the P-SCH can carry out 5 ms-timing detection. Furthermore, multi-cell transmission of the P-SCH is carried out. Base stations located in the MBSFN synchronization area are synchronized with one another for multi-cell transmission. Therefore, the multi-cell transmission of the P-SCH is targeted for the base stations included in the synchronization area. In a second step, each of the mobile terminals carries out blind detection of an S-SCH (secondary synchronization channel). Each of the mobile terminals which has blind-detected an S-SCH can detect 10 ms-timing (frame synchronization) and know an MBSFN area ID. Furthermore, the S-SCH is transmitted via a multi-cell transmission. The MBSFN area ID at this time are the one of an MBSFN area covered. In detail, the MBSFN area ID at this time is the one of either one of the covered MBSFN area in which the mobile terminal is being located (i.e., either of the MBSFN areas 1 to 3). Therefore, the multi-cell transmission of the S-SCH is targeted for base stations included in each of the MBSFN areas covered. Each of the mobile terminals receives the BCCH (broadcast control channel) by using the scrambling code related to the MBSFN area ID acquired in the second step. By decoding the BCCH, each of the mobile terminals can acquire the scheduling of an MCCH (multicast control channel). Furthermore, the BCCH is transmitted via a multi-cell transmission. Since the scrambling code acquired in the second step is used, the BCCH is the one from the MBSFN area covered. Therefore, the multi-cell transmission of the BCCH is targeted for base stations included in each of the MBSFN areas covered. Each of the mobile terminals can acquire the scheduling of the MCCH, the system bandwidth at f(MBMS), the number of transmission antennas, etc. by decoding the BCCH.

Figure 29:
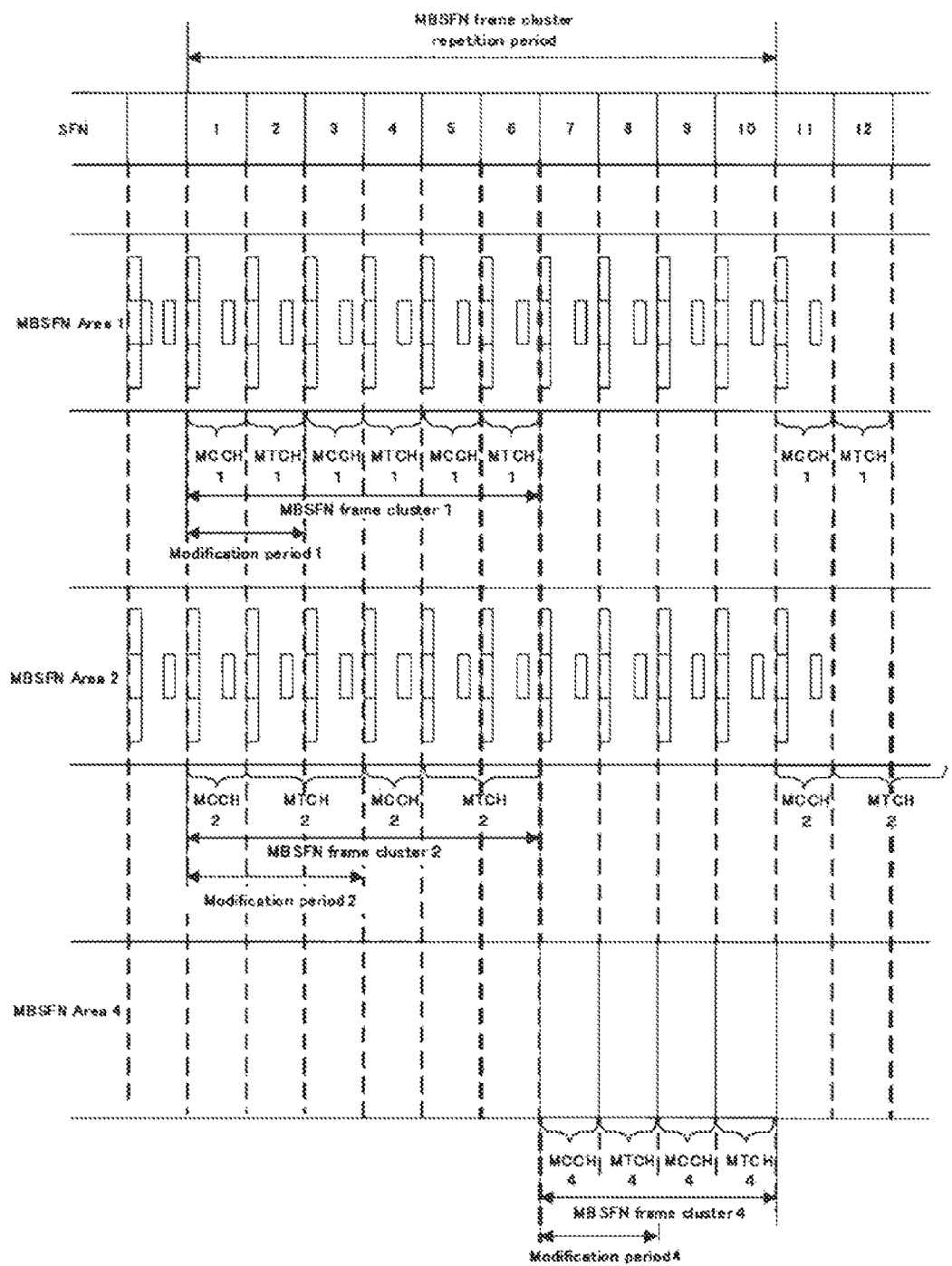
FIG. 29 is an explanatory drawing showing mapping to a physical channel in an MBSFN synchronization area in a case in which time division multiplexing of an MBSFN area covering other MBSFN areas and the other MBSFN areas covered is carried out, and code division multiplexing is used as a multiplexing method of multiplexing the MBSFN areas covered.

Hereafter, the scheduling of the MCCH will be further examined. FIG. 29 is an explanatory drawing showing mapping to a physical channel in the MBSFN synchronization area in a case in which time division multiplexing of the MBSFN area (i.e., the MBSFN area 4) covering the other MBSFN areas, and the other MBSFN areas (i.e., the MBSFN areas 1 to 3) covered is carried out, and code division multiplexing is used as a multiplexing method of multiplexing the MBSFN areas covered. Because the MBSFN synchronization area is synchronous in time, the P-SCH (primary synchronization channel) is transmitted at the same time from MBMS dedicated cells in each of the MBSFN areas 1 to 3. Furthermore, assuming that the above-mentioned sequence exclusively used for the frequency layer dedicated to MBMS transmission (the above-mentioned additional sequence for exclusive use) is used, the sequences of the P-SCHs (the primary synchronization channel) in all the MBSFN areas are the same as one another. Therefore, in the MBSFN synchronization area, identical information is transmitted at the same time by using the P-SCH. As mentioned above, it is considered that an MBSFN area ID is transmitted by using the S-SCH (the secondary synchronization channel). In this case, by using the S-SCH, information different for each MBSFN area is transmitted at the same time in the MBSFN synchronization area. In this case, all the MBMS dedicated cells in each MBSFN area transmit identical information at the same time. It is assumed that at that time, there is no S-SCH specific to the MBSFN area (the MBSFN area 4) covering the other MBSFN areas. The S-SCH uses the same radio resources in frequency and in time in the MBSFN synchronization area. Furthermore, because the S-SCH is used for a search for an MBSFN area ID related to each MBSFN area scrambling code, the S-SCH cannot be multiplied by the scrambling code of each MBSFN area. Non-transmission of the S-SCH to the MBSFN area covering the other MBSFN areas means that what is necessary is just to transmit one type of S-SCH in overlapping MBSFN areas (e.g., the MBSFN areas 1 and 4) in the geographical locations where the plurality of MBSFN areas overlap one another. As a result, the S-SCHs from the plural MBSFN areas can be prevented from interfering with one another. The mobile communication system transmits a BCCH multiplied by the scrambling code related to an MBSFN area ID which the mobile communication system informs by using the S-SCH. Therefore, in this case, by using the BCCH, information different for each MBSFN area covered is transmitted at the same time in the MBSFN synchronization area. The contents of the BCCH are the same in all the MBMS-dedicated base stations in each MBSFN area. By decoding the BCCH, each of the mobile terminals can acquire the scheduling of the MCCH. An example of the scheduling of the MCCH has not been discussed in the 3GPP. In the present invention, an example of the scheduling of the MCCH will be shown.

Referring to FIG. 29, the scheduling of the MCCH in the case in which an MBSFN frame cluster is longer than the MCCH repetition period length will also be explained. As the scheduling of the MCCH of the MBSFN area covering the other MBSFN areas, two steps will be considered. In the following explanation, for the sake of simplicity, a case in which a mobile terminal is located in an MBSFN area 1 which is one MBSFN area covered, and there exists an MBSFN area 4 as an MBSFN area covering the other MBSFN areas including the MBSFN area 1 will be explained. In a first step, the MCCH scheduling of the MBSFN area 1 is informed by using the BCCH of the MBSFN area 1. In the present invention, an example of the scheduling of the MCCH is shown. In the present invention, there is considered a case in which, as the scheduling of the MCCH, the starting point value at the time when the MCCH is mapped and the MBSFN frame cluster repetition period length, and the MCCH transmission frequency during the MBSFN frame cluster repetition period are informed. More concretely, the number of radio frames is used as the MBSFN frame cluster repetition period length. More concretely, an SFN (System Frame Number) is used for the indication of the starting point value. Something other than the number of radio frames can be used for the indication of the MBSFN frame cluster repetition period length. As a concrete example, the number of subframes can be used for the indication of the MBSFN frame cluster repetition period length. Something other than an SFN can be used for the indication of the starting point value. As a concrete example, an offset value from a certain reference value can be used for the indication of the starting point value. In a case in which the MCCH is mapped onto some subframes in a radio frame, an SFN, a subframe number, and so on can be informed as the starting point. A concrete computation expression for calculating the starting point value is expressed by (the starting point value=(the SFN number of the leading one of system frames onto which the MCCH is mapped) mod (the MBSFN FRAME Cluster Repetition Period)). More concretely, the MCCH transmission frequency (referred to as $N_{MCCH}$ from here on) in the MBSFN frame cluster is used as the MCCH transmission frequency within the MBSFN frame cluster repetition period. A concrete computation expression for calculating the $N_{MCCH}$ is expressed by ($N_{MCCH}$=the MBSFN frame cluster length/the MCCH repetition period (MCCH Repetition Period) length. In FIG. 29, the MCCH offset value 1 of the MBSFN area 1 is 1 mod 10=1. The MCCH starting point value 2 of the MBSFN area 2 is 1 mod 10=1. The MCCH starting point value 4 of the MBSFN area 4 is 7 mod 10=7. Next, $N_{MCCH}1$ of the MBSFN area 1 is 6/2=3. Furthermore, $N_{MCCH}2$ of the MBSFN area 2 is 6/3=2. $N_{MCCH}4$ of the MBSFN area 4 is s 4/2=2. Therefore, the parameters of the scheduling of the MCCH of the MBSFN area 1 are the MBSFN frame cluster repetition period length 1 of "10", the starting point value 1 of "1", and $N_{MCCH}1$ of "3". At this time, instead of informing $N_{MCCH}1$ as one of the parameters, the MBSFN frame cluster 1 and the MCCH repetition period length 1 can be informed.

In a second step, the scheduling of the MCCH of the MBSFN area 4 is informed by using the MCCH of the MBSFN area 1. In an example of the scheduling of the MCCH, in addition to the above-mentioned parameters of the MBSFN area 4 (the MBSFN frame cluster repetition period length 4 of "10", the starting point 4 of "7", and $N_{MCCH}4$ of "2"), the MBSFN area ID of the covering MBSFN area (i.e., the MBSFN area 4) is informed. A case of including a single step as the MCCH scheduling of the MBSFN area 4 can be alternatively considered. In detail, there can be considered a method of also informing the above-mentioned MCCH scheduling of the MBSFN area 4 by using the BCCH of the MBSFN area 1. As a result, because a mobile terminal receiving a service of the MBSFN area 4 does not have to carry out the process of receiving and decoding the MCCH of the MBSFN area 1, there can be provided an advantage of reducing the control delay. The method of using, as the MCCH scheduling, the above-mentioned starting point, the MBSFN frame cluster repetition period length, and $N_{MCCH}$ (alternatively, the MBSFN frame cluster length and the MCCH repetition period length) can be applied also to a case in which the MCCH exists multiple times in the MBSFN frame cluster when time division multiplexing of the MBSFN areas is carried out (refer to FIG. 26).

More specifically, data transmitted from each base station belonging to the MBSFN area 1 are provided as follows. The P-SCH (the primary synchronization channel) which is the sequence intended for the frequency layer dedicated to MBMS transmission, the S-SCH1 (the secondary synchronization channel) onto which the MBSFN area ID1 and so on are mapped, a BCCH1 onto which the MCCH starting point value 1 of "1", the MBSFN frame cluster repetition period length 1 of "10", $N_{MCCH}1$ of "3", and so on are mapped, and which is multiplied by the scrambling code 1, and an MCCH1 and an MTCH1 of the MBSFN area 1 each of which is multiplied by the scrambling code 1 are transmitted. By using the MCCH1, the MBSFN area ID (the MBSFN area 4) of the MBSFN area 4, and the MCCH starting point value 4 of "7", the MBSFN frame cluster repetition period length 4 of "10" and $N_{MCCH}4$ of "2", which are the data about the MCCH scheduling of the MBSFN area 4, are transmitted. Like in the case of the MBSFN area 1, data which are transmitted from each base station belonging to the MBSFN area 2 are provided as follows. The P-SCH which is the sequence intended for the frequency layer dedicated to MBMS transmission, the S-SCH2 onto which the MBSFN area ID2 and so on are mapped, a BCCH2 onto which the MCCH starting point value 2 of "1", the MBSFN frame cluster repetition period length 2 of "10", $N_{MCCH}2$ of "2", and so on are mapped, and which is multiplied by the scrambling code 2, and an MCCH2 and an MTCH2 of the MBSFN area 2 each of which is multiplied by the scrambling code 2 are transmitted. By using the MCCH2, the MBSFN area ID (the MBSFN area 4) of the MBSFN area 4, and the MCCH offset value 4 of "7", the MBSFN frame cluster repetition period length 4 of "10" and $N_{MCCH}4$ of "2", which are the data about the MCCH scheduling of the MBSFN area 4, are transmitted.

As explained previously, the data transmission from the MBSFN area 4 does not include transmission of the P-SCH and the S-SCH. In addition, when it is not necessary to inform, as the system information about the MBSFN area 4, any information other than what is transmitted by using the BCCH of each of the covered MBSFN areas (the MBSFN areas 1 to 3), the transmission of the BCCH from the MBSFN area 4 can be omitted. As a result, there can be provided an advantage of making effective use of the radio resources. An MCCH4 and an MTCH4 of the MBSFN area 4 each of which is not multiplied by any scrambling code are transmitted.

For the sake of simplicity, the example in which time division multiplexing of the MCCH and the MTCH is carried out for each radio frame is shown in FIG. 29. However, the present invention can be applied to a case in which another method of multiplexing the MCCH and the MTCH is used, and a case in which the time division multiplexing is carried out for each of units other than each radio frame. The multiplexing method of carrying out time division multiplexing of the MBSFN area (the MBSFN area 4) covering the other MBSFN areas, and the other MBSFN areas (the MBSFN areas 1 to 3) covered, and then carrying out code division multiplexing of the covered MBSFN areas uses code division multiplexing as the multiplexing method of multiplexing the MBSFN areas 1 to 3 which are separated from the viewpoint of their geographical locations. As a result, there can be provided an advantage of making effective use of the radio resources both in frequency and in time. In the code division multiplexing, because the demultiplexing of the MBSFN areas is carried out by using only the scrambling code allocated to each MBSFN area, there is a possibility that transmission data transmitted from the MBSFN areas interfere with one another. In contrast, in accordance with the present multiplexing method, there is provided an advantage of, even if code division multiplexing is used to multiplex transmission data from the MBSFN areas 1 to 3 which are separated from the viewpoint of their geographical locations, making it difficult for interference among transmission data from the MBSFN areas 1 to 3 to occur. Time division multiplexing is used to multiplex transmission data from the MBSFN area 4 and transmission data from the MBSFN areas 1 to 3, the MBSFN area 4 and the MBSFN areas to 3 being not separated from the viewpoint of their geographical locations. As a result, the multiplexing method of multiplexing transmission data from the MBSFN area 4 and transmission data from the MBSFN areas 1 to 3, which originally allows interference to easily occur because the MBSFN area 4 and the MBSFN areas 1 to 3 are not separated from the viewpoint of their geographical locations, can be modified to make it difficult for interference between transmission data from the MBSFN area 4 and transmission data from the MBSFN areas 1 to 3 to occur. By using this multiplexing method, there can be provided an advantage of being able to make effective use of the radio resources while preventing interference among transmission data from the MBSFN areas. Furthermore, in the covering MBSFN area (the MBSFN area 4), the P-SCH, the S-SCH, and the BCCH can be eliminated by not carrying out a search for an MBMS. As a result, there can be provided an advantage of being able to make effective use of the radio resources of the MBSFN area 4.

Next, an example in a case in which time division multiplexing of the MBSFN area (i.e., the MBSFN area 4) covering the other MBSFN areas, and the other MBSFN areas (i.e., the MBSFN areas 1 to 3) covered by the MBSFN area 4 is carried out, and time division multiplexing is also used as the method of multiplexing the covered MBSFN areas will be explained. A conceptual diagram showing the locations of base stations in the case in which the plurality of MBSFN areas exist is the same as that in the case in which time division multiplexing of the MBSFN area (i.e., the MBSFN area 4) covering the other MBSFN areas, and the other MBSFN areas (i.e., the MBSFN areas 1 to 3) covered by the MBSFN area 4 is carried out, and code division multiplexing is used as the method of multiplexing the covered MBSFN areas. Because the explanation about the P-SCH, the S-SCH, and the BCCH is the same as that in the above-mentioned case, the explanation will be omitted. Because an example of the scheduling of the MCCH is much the same as that in the above-mentioned case, an explanation will be made focusing on a different portion. In a first step, the MCCH scheduling of the MBSFN area 1 is informed by using the BCCH of the MBSFN area 1. In the present invention, an example of the scheduling of the MCCH is shown. In the present invention, there is considered a case in which, as the scheduling of the MCCH, the starting point value at the time when the MCCH is mapped and the MCCH repetition period length are informed. The number of radio frames is used for the indication of the MCCH repetition period length. More concretely, an SFN (System Frame Number) is used for the indication of the starting point value. Something other than the number of radio frames can be used for the indication of the MCCH repetition period length. As a concrete example, the number of subframes can be used for the indication of the MCCH repetition period length. Something other than an SFN can be used for the indication of the starting point value. As a concrete example, an offset value from a certain reference value can be used for the indication of the starting point value. In a case in which the MCCH is mapped onto some subframes in a radio frame, an SFN, a subframe number, and so on can be informed as the starting point. A concrete computation expression for calculating the starting point value is given by (the starting point value=(the SFN number of the leading one of system frames onto which the MCCH is mapped) mod (the MCCH repetition period length). In a second step, the scheduling of the MCCH of the MBSFN area 4 is informed by using the MCCH of the MBSFN area 1. In the example of the scheduling of the MCCH, the MBSFN area ID (the MBSFN area 4) of the covering MBSFN area is informed in addition to the parameters of the MBSFN area 4 which are the same as the above-mentioned parameters of the MBSFN area 1. The explanation of the parameters of the MBSFN area 4 will be omitted hereafter.

Next, an example in a case in which code division multiplexing of the MBSFN area (i.e., the MBSFN area 4) covering the other MBSFN areas, and the other MBSFN areas (i.e., the MBSFN areas 1 to 3) covered by the MBSFN area 4 is carried out, and code division multiplexing is also used as the method of multiplexing the covered MBSFN areas will be explained. A conceptual diagram showing the locations of base stations in the case in which the plurality of MBSFN areas exist is the same as that in the case in which time division multiplexing of the MBSFN area (i.e., the MBSFN area 4) covering the other MBSFN areas, and the other MBSFN areas (i.e., the MBSFN areas 1 to 3) covered by the MBSFN area 4 is carried out, and code division multiplexing is used as the method of multiplexing the covered MBSFN areas. Because the explanation about the P-SCH, the S-SCH, and the BCCH is the same as that in the above-mentioned case, the explanation will be omitted. Because an example of the scheduling of the MCCH is much the same as that in the above-mentioned case, an explanation will be made focusing on a different portion. In a first step, the MCCH scheduling of the MBSFN area 1 is informed by using the BCCH of the MBSFN area 1. In the present invention, an example of the scheduling of the MCCH is shown. In the present invention, there is considered a case in which, as the scheduling of the MCCH, the starting point value at the time when the MCCH is mapped and the MCCH repetition period length are informed. The number of radio frames is used for the indication of the MCCH repetition period length. More concretely, an SFN (System Frame Number) is used for the indication of the starting point value. Something other than the number of radio frames can be used for the indication of the MCCH repetition period length. As a concrete example, the number of subframes can be used for the indication of the MCCH repetition period length. Something other than an SFN can be used for the indication of the starting point value. As a concrete example, an offset value from a certain reference value can be used for the indication of the starting point value. In a case in which the MCCH is mapped onto some subframes in a radio frame, an SFN, a subframe number, and so on can be informed as the starting point. A concrete computation expression for calculating the starting point value is given by (the starting point value=(the SFN number of the leading one of system frames onto which the MCCH is mapped) mod (the MCCH repetition period length). In a second step, the scheduling of the MCCH of the MBSFN area 4 is informed by using the MCCH of the MBSFN area 1. In the example of the scheduling of the MCCH, the MBSFN area ID (i.e., the MBSFN area 4) of the covering MBSFN area is informed in addition to the parameters of the MBSFN area 4 which are the same as the above-mentioned parameters of the MBSFN area 1. The explanation of the parameters of the MBSFN area 4 will be omitted hereafter. The scrambling code used in the MBSFN area 4 is determined on the basis of the MBSFN area ID (the MBSFN area 4) informed thereto by using the MCCH1 of the MBSFN area 1.

Next, an example in a case in which code division multiplexing of the MBSFN area (i.e., the MBSFN area 4) covering the other MBSFN areas, and the other MBSFN areas (the MBSFN areas 1 to 3) covered by the MBSFN area 4 is carried out, and time division multiplexing is used as the method of multiplexing the covered MBSFN areas will be explained. A conceptual diagram showing the locations of base stations in the case in which the plurality of MBSFN areas exist is the same as that in the case in which time division multiplexing of the MBSFN area (i.e., the MBSFN area 4) covering the other MBSFN areas, and the other MBSFN areas (i.e., the MBSFN areas 1 to 3) covered by the MBSFN area 4 is carried out, and code division multiplexing is used as the method of multiplexing the covered MBSFN areas. Because the explanation about the P-SCH, the S-SCH, and the BCCH is the same as that in the above-mentioned case, the explanation will be omitted. Because an example of the scheduling of the MCCH is much the same as that in the above-mentioned case, an explanation will be made focusing on a different portion. In a first step, the MCCH scheduling of the MBSFN area 1 is informed by using the BCCH of the MBSFN area 1. In the present invention, an example of the scheduling of the MCCH is shown. In the present invention, there is considered a case in which, as the scheduling of the MCCH, the starting point value at the time when the MCCH is mapped and the MCCH repetition period length are informed. The number of radio frames is used for the indication of the MCCH repetition period length. More concretely, an SFN (System Frame Number) is used for the indication of the starting point value. Something other than the number of radio frames can be used for the indication of the MCCH repetition period length. As a concrete example, the number of subframes can be used for the indication of the MCCH repetition period length. Something other than an SFN can be used for the indication of the starting point value. As a concrete example, an offset value from a certain reference value can be used for the indication of the starting point value. In a case in which the MCCH is mapped onto some subframes in a radio frame, an SFN, a subframe number, and so on can be informed as the starting point. A concrete computation expression for calculating the starting point value is given by (the starting point value=(the SFN number of the leading one of system frames onto which the MCCH is mapped) mod (the MCCH repetition period length). In a second step, the scheduling of the MCCH of the MBSFN area 4 is informed by using the MCCH of the MBSFN area 1. In the example of the scheduling of the MCCH, as the parameters of the MBSFN area 4, the starting point, the MCCH repetition period length, and the MBSFN area ID (the MBSFN area 4) of the covering MBSFN area are informed.

In all of the above-mentioned multiplexing methods of multiplexing the MBSFN areas, the starting point of the MCCH in the MCCH scheduling can be replaced by either an MCH starting point or a PMCH starting point. In a case in which the starting point of the MCCH is replaced by an MCH starting point, instead of the MCCH repetition period length parameter in the MCCH scheduling, an MCH repetition period length is provided. At that time, in a case in which an MCCH is always mapped to each MCH, the MCH repetition period length is equal to the MCCH repetition period length. In contrast, when an MCCH is not always mapped to each MCH, the MCCH repetition period length, together with the MCH repetition period length, can be provided as a parameter. In a case in which the starting point of the MCCH is replaced by a PMCH starting point, instead of the MCCH repetition period length parameter in the MCCH scheduling, a PMCH repetition period length is provided. At that time, in a case in which an MCCH is always mapped to each PMCH, the PMCH repetition period length is equal to the MCCH repetition period length. In contrast, when an MCCH is not always mapped to each PMCH, the MCCH repetition period length, together with the PMCH repetition period length, can be provided as a parameter.

In the 3GPP, a debate has been furthered towards supporting single-cell transmission in a frequency layer dedicated to MBMS transmission. As a method of supporting single-cell transmission, a method of implementing single-cell transmission in an MBSFN area consisting of a single cell has been examined. However, any concrete method of implementing single-cell transmission in an MBSFN area consisting of a single cell has not been examined at all. In order to disclose a method of selecting a desired service in a frequency layer dedicated to MBMS transmission, and a mobile communication system which enables the method to be implemented therein, which are a challenge of the present invention, an example of the method of supporting single-cell transmission will be shown. An concrete example of the implementation in the case in which an MBSFN area covering a plurality of MBSFN areas exists is explained above. By replacing each of cells within the covered MBSFN areas (i.e., the MBSFN areas 1 to 3) with a cell which carries out single-cell (Single-cell) transmission and further replacing the MBSFN area (i.e., the MBSFN area 4) covering the other MBSFN areas with a cell which carries out multi-cell (multi-cell) transmission in the above-mentioned method, single-cell transmission can be implemented in an MBSFN area consisting of a single cell.

Next, "MBMS area information acquisition" described in Embodiment 1 will be explained more concretely with reference to steps ST1726 and ST1727 of FIG. 18, and steps ST1728 and ST1729 of FIG. 19. It is assumed that the MCCH (multicast control channel) of each MBSFN area is transmitted via a multi-cell transmission scheme. Therefore, an MCE, in step ST1726, transmits information about allocation of radio resources for transmitting the contents of the MCCH and the MCCH to base stations in the MBSFN area. Each MBMS-dedicated base station, in step ST1727, receives the information about allocation of radio resources for transmitting the contents of the MCCH and the MCCH from the MCE. Each base station, in step ST1728, carries out multi-cell transmission of control information, such as MBMS area information, discontinuous reception (DRX) information, and the number K of paging groups, by using the MCCH according to the radio resources allocated thereto by the MCE. Each of the mobile terminals, in step ST1729, receives the MCCH from each base station in the MBSFN area. Each of the mobile terminals uses the scheduling of the MCCH received from the network side in step ST1725 for the reception of the MCCH.

An example of the receiving method will be explained. As a typical example, a case in which a plurality of base stations are arranged as shown in FIG. 25, and time division multiplexing of each MBSFN area is carried out as shown in FIG. 26 will be explained. A case in which each of the mobile terminals is located within the MBSFN area 1 will be explained. Each of the mobile terminals decodes the BCCH1 (broadcast control channel) of the MBSFN area 1 to receive, as the scheduling parameters of the MCCH1, the starting point value 1 of "1" and the MCCH repetition period (MCCH Repetition Period) length 1 of "7". Furthermore, if an SFN (System Frame Number) is mapped onto the BCCH, each of the mobile terminals can know the SFN number by decoding the BCCH. Each of the mobile terminals can determine the SFN number onto which the MCCH is mapped according to the following equation.

$$SFN = \text{the } MCCH \text{ repetition period length } 1 \times \alpha + \text{the starting point value } 1 (\alpha \text{ is a positive integer}).$$

Each of the mobile terminals can receive the MCCH1 by receiving and decoding the radio resources of the SFN number onto which the MCCH1 is mapped. Control information for MBMS service which is transmitted via a multi-cell transmission scheme from the MBSFN area 1 is mapped onto the MCCH1. As an example of the control information, there are MBMS area information, DRX information, parameters for discontinuous reception at the time of MBMS reception, etc.

In addition, an example of the MBMS area information will be explained with reference to FIG. 26. As the MBMS area information, there can be considered the frame structure of each area (an MBSFN frame cluster (MBSFN frame Cluster), an MBSFN subframe, etc.), contents of services, modulation information about the MTCH, etc. As the MBSFN frame cluster 1, the number of frames included in a set of frames allocated to the MBSFN area 1 during one MBSFN frame cluster repetition period is informed. As the MBSFN subframe 1, the number of a subframe onto which MBMS data (MTCH and/or MCCH data) are actually mapped in one radio frame within the MBSFN frame cluster 1 is informed. In a case of offering an MBMS service using an MBMS-dedicated base station, it is not necessary to share radio resources with unicast data, unlike in a case of using an MBMS/Unicast-mixed cell. Therefore, MBMS data can be mapped onto all the subframes in one radio frame (however, except portions onto which a P-SCH, an S-SCH, or a BCCH is mapped). In a case of mapping MBMS data onto all the subframes, it is not necessary to inform the parameter about MBSFN subframes from the network side to the mobile terminal side. As a result, effective use of the radio resources can be made. As an alternative, because by using a method of statically mapping MBMS data onto all the subframes at the time of transmission of MBMS data from an MBMS dedicated cell in the radio communication system, it becomes able to transmit large-volume MBMS data and it becomes unnecessary to also inform the parameter about MBSFN subframes, effective use of the radio resources can be made. As the contents of services, the contents of MBMS services being ongoing in the MBMS area 1 are informed. When a plurality of MBMS services (a movie, sports live broadcasting, etc.) are ongoing in the MBSFN area 1, the contents of the plurality of MBMS services and parameter for multiplexing about these services are informed.

Figure 30:
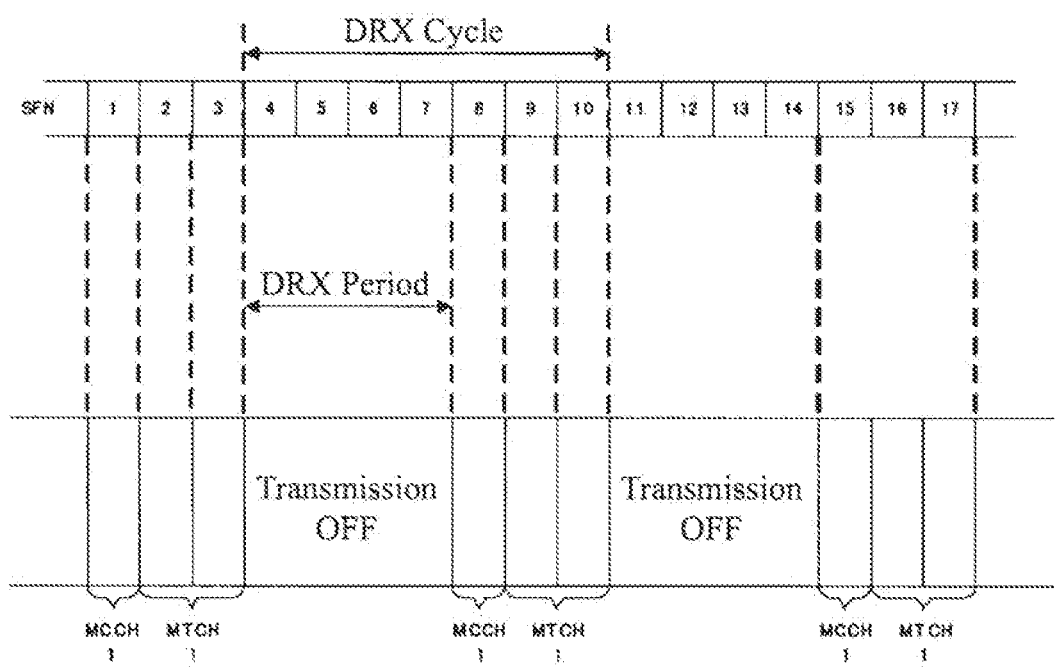
FIG. 30 is an explanatory drawing showing a relation between a discontinuous reception period during which transmission of MBMS data to a mobile terminal is discontinued and the mobile terminal is not doing any receiving operation of receiving MBMS data, and a discontinuous reception cycle in which the discontinuous reception is repeated.

FIG. 30 is an explanatory drawing showing a relationship between a DRX period during which transmission of MBMS data to a mobile terminal is discontinued and the mobile terminal does not perform its receiving operation of receiving the MBMS data, and a DRX cycle which is a cycle in which the DRX period is repeated. In addition, an example of DRX (Discontinuous reception) information will be explained with reference to FIG. 30. In order to inform a paging signal to a mobile terminal currently using an MBMS service in an MBMS transmission dedicated cell, which is a challenge of the present invention, the mobile terminal currently receiving the MBMS service in the MBMS transmission dedicated cell needs to carry out a location registration into the network via either a unicast cell or an MBMS/Unicast-mixed cell, and so on. To this end, a measurement of either the unicast cell or the MBMS/Unicast-mixed cell and a location registration (a re-selection of a serving base station (a cell re-selection)) are required. As a result, there can be provided an advantage of becoming able to ensure the mobility in the MBMS dedicated cells in which no uplink exists via the unicast/mixed cell. Therefore, there is provided an advantage of enabling even a mobile terminal currently receiving an MBMS service in a frequency layer dedicated to MBMS transmission to receive a paging signal. Therefore, even a mobile terminal currently receiving an MBMS service in an MBMS transmission dedicated cell needs to carry out a measurement of a unicast cell and an MBMS/Unicast-mixed cell at constant periods (or cycles). According to a conventional method (3GPP W-CDMA), the length of a measurement cycle is an integral multiple of the length of a discontinuous reception cycle, and is informed from the network side to each mobile terminal by way of an upper layer.

A problem is therefore that, assuming that a mobile terminal currently receiving an MBMS service in an MBMS transmission dedicated cell carries out a measurement of an unicast cell and an MBMS/Unicast-mixed cell at measurement periods (or cycles) of the length informed from an upper layer by using the conventional method, because a base station which constructs an MBSFN synchronization area of a frequency layer dedicated to MBMS transmission, and a base station which constructs a unicast/mixed frequency layer are asynchronous to each other (asynchronous), the mobile terminal has to interrupt the MBMS reception in order to carry out the measurement.

Therefore, in accordance with the present invention, as a solution of the above-mentioned problem, one DRX period is disposed in the MBSFN synchronization area (refer to FIG. 30). A DRX period in this Embodiment 1 means a time period during which transmission of MBMS data about the MBMS services of all the MBSFN areas in the MBSFN synchronization area from the network side to a mobile terminal is discontinued and is not carried out, i.e., a time period during which reception of MBMS data is not carried out when viewed from the mobile terminal side. Therefore, a mobile terminal currently using an MBMS service in a frequency layer dedicated to MBMS transmission is provided an advantage of eliminating the necessity to interrupt the use of the MBMS service by carrying out a measurement of a unicast cell and an MBMS/Unicast-mixed cell during the DRX period during which no MBMS data are transmitted from the network side. Furthermore, by disposing a DRX period in the MBSFN synchronization area, each mobile terminal is enabled to simultaneously receive MBMS data from MBSFN areas in the MBSFN synchronization area without adding any control operation.

Next, the DRX cycle as shown in FIG. 30 will be explained. The DRX cycle means a cycle in which a DRX period explained previously is repeated. According to a conventional method, a measurement period length is set (informed) to each mobile terminal by the network side. In a case in which this method is applied also to LTE, if a mobile terminal currently receiving an MBMS service in a frequency layer dedicated to MBMS transmission carries out a measurement in a unicast/mixed frequency layer during a DRX period, the information about the length of the DRX cycle and the length of the DRX period in the frequency layer dedicated to MBMS transmission needs to be notified, via one of routes, to a control device (a base station, an MME, a PDNGW, or the like) on a side of a unicast cell or an MBMS/Unicast-mixed cell. Furthermore, because base stations which construct the unicast/mixed frequency layer are configured in such a way as to be fundamentally asynchronous to one another, there is a necessity to inform both the DRX cycle length and the DRX period length in the frequency layer dedicated to MBMS transmission to each unicast cell or each MBMS/Unicast-mixed cell. This method makes the mobile communication system become complicated, and therefore is not preferred. Therefore, in the present invention, the following method will be disclosed.

One or more measurement periods in the unicast/mixed frequency layer are made to be included in one DRX period in the frequency layer dedicated to MBMS transmission. As a result, even if any measurement period length is informed (set) to the mobile terminal from a unicast cell or an MBMS/Unicast-mixed cell, when the mobile terminal carries out a measurement of the unicast/mixed frequency layer during a DRX period which is provided in the DRX cycle in the frequency layer dedicated to MBMS transmission, the measurement period length informed from the network side can be satisfied. By using this method, any control device of an MBMS transmission dedicated cell (a base station, an MCE, an MBMS gateway, an eBNSC, and so on) does not have to inform the DRX cycle length and the DRX period length in the MBMS transmission dedicated cell to control devices of a unicast cell and an MBMS/Unicast-mixed cell. Therefore, there is provided an advantage of enabling a mobile terminal currently receiving an MBMS service in a frequency layer dedicated to MBSFN transmission to carry out a measurement at measurement periods of a length which a unicast cell or an MBMS/Unicast-mixed cell has informed (set) to the mobile terminal while preventing the mobile communication system from becoming complicated, that is, avoiding addition of signaling onto a wireless interface or into the network.

The DRX cycle in the MBMS transmission dedicated cell has a length which is either a minimum of the measurement period length which can be provided in a unicast cell and in a unicast/mixed cell, or an integral submultiple of the minimum. In a case in which the measurement period length which a unicast cell or an MBMS/Unicast-mixed cell can set to a mobile terminal currently receiving an MBMS service in the frequency layer dedicated to MBMS transmission differs from the measurement period length which can be provided in the unicast/mixed frequency layer, the DRX cycle has a length which is equal to that of the measurement period length which can be set to a mobile terminal currently receiving an MBMS service in the frequency layer dedicated to MBMS transmission, which is a minimum of the above-mentioned measurement period length, or which is an integral submultiple of the minimum of the above-mentioned measurement period length. As a result, even if any measurement period length is informed (set) to the mobile terminal from a unicast cell or an MBMS/Unicast-mixed cell, when the mobile terminal carries out a measurement of the unicast/mixed frequency layer during a DRX period which is provided in the DRX cycle in the frequency layer dedicated to MBMS transmission, the measurement period length informed from the network side can be satisfied. By using this method, any control device of an MBMS transmission dedicated cell (a base station, an MCE, an MBMS gateway, an eBNSC, and so on) does not have to inform the DRX cycle length and the DRX period length in the MBMS transmission dedicated cell to control devices of a unicast cell and an MBMS/Unicast-mixed cell. Therefore, there is provided an advantage of enabling a mobile terminal currently receiving an MBMS service in a frequency layer dedicated to MBSFN transmission to carry out a measurement at measurement periods of a length which a unicast cell or an MBMS/Unicast-mixed cell has informed (set) to the mobile terminal while preventing the mobile communication system from becoming complicated, that is, avoiding addition of signaling onto a wireless interface or into the network. Furthermore, the mobile terminal can acquire broadcast information from a serving cell in the unicast/mixed frequency layer during the above-mentioned DRX period. For example, when the broadcast information in the serving cell is modified, the mobile terminal can deal with the modification. The above-mentioned determining method of determining a DRX period in a frequency layer dedicated to MBMS transmission, and the above-mentioned determining method of determining a DRX cycle in a frequency layer dedicated to MBMS transmission can also be used in the subsequent embodiments.

A concrete example of the parameters about the DRX information will be explained with reference to FIG. 30. Concretely, as the parameters about the DRX information, the DRX period length, the DRX cycle length, and the starting point value (DRX) can be considered. Concretely, the number of radio frames is used for the indication of each of the DRX period length and the DRX cycle length. In FIG. 30, the DRX period length is "4" radio frames (during a period between SFN 4 to SFN 7). Furthermore, the DRX cycle length is "7" radio frames (during a period between SFN 4 to SFN 10). In addition, an SFN is used for the indication of the starting point value (DRX) at which the DRX period starts. Something other than the number of radio frames can be used for the indication of each of the DRX period length and the DRX cycle length. As a concrete example, the number of subframes can be used for the indication of each of the DRX period length and the DRX cycle length. Something other than an SFN can be used for the indication of the starting point value. As a concrete example, an offset value from a certain reference value can be used for the indication of the starting point value. In a case in which an MCCH is mapped onto some subframes in a radio frame, an SFN, a subframe number, and so on can be informed as the starting point. A concrete computation expression for calculating the starting point value (DRX) is given by (the starting point value (DRX)=(the SFN number of the leading system frame at which the DRX period starts) mod (the DRX cycle length). In FIG. 30, the starting point value (DRX) is 4 mod 7=4, 11 mod 7=4, or .... The example in which an SFN is used for the indication of the starting point value (DRX) is shown above. Furthermore, in the example, one DRX period is provided in the MBSFN synchronization area, as previously explained. Therefore, the starting point value (DRX) is also common in base stations in the MBSFN synchronization area. A case in which an SFN is used as the starting point value (DRX) will be considered. It is assumed that the same number is transmitted from base stations in the MBSFN synchronization area at the same time. In the above-mentioned example, the DRX information is mapped onto an MCCH and is transmitted from a base station in an MBSFN area to mobile terminals, as previously explained. Similarly, the DRX information can be mapped onto a BCCH and can be transmitted from a base station in an MBSFN area to mobile terminals. In this case, the same advantages are provided. As an alternative, the DRX information can be mapped onto a BCCH and can be transmitted from a serving base station to mobile terminals. In this case, the same advantages are provided. Furthermore, even when the DRX information is determined statically (Static) or semi-statically (Semi-Static), the same advantages are provided. As a result, because it becomes unnecessary to broadcast the DRX information, there can also be provided an advantage of making effective use of the radio resources.

An example of the parameter for discontinuous reception at the time of MBMS reception will be explained. As previously mentioned, nonpatent reference 1 discloses that a paging group is informed by using an L1/L2 signaling channel (a PDCCH). Whether or not to make an L1/L2 signaling channel exist in radio resources transmitted from an MBMS dedicated cell has not been determined yet. In this embodiment, it is assumed that no L1/L2 signaling channel exists in radio resources transmitted from an MBMS dedicated cell. However, it is preferable that a paging informing method is unified as much as possible for a unicast cell, an MBMS/Unicast-mixed cell, and an MBMS transmission dedicated cell which exist within the same mobile communication system which is called LTE. This is because by unifying a paging informing method, the mobile communication system can be prevented from becoming complicated. In the following explanation, the number of paging groups (referred to as $K_{MEMS}$ from here on) is considered as the parameter for discontinuous reception at the time of MBMS reception. Next, a case in which a plurality of base stations are arranged as shown in FIG. 25, and code division multiplexing of each MBSFN area is carried out as shown in FIG. 27 will be explained. In this case, because the DRX information is the same as that in the above-mentioned case in which time division multiplexing of MBSFN areas is carried out, the explanation of the DRX information will be omitted.

Next, the "MBMS service selection", which is described in Embodiment 1 with reference to FIG. 19, will be explained more concretely. The mobile terminal, in step ST1730, checks the contents of a service included in the MBMS area information in order to know whether or not a service which the user desires is provided in a corresponding MBMS area. That is, the mobile terminal determines whether or not a desired service is provided. When the service which the user desires is provided in the MBMS area in question, the mobile terminal makes a transition to step ST1731. In contrast, when the service which the user desires is not provided in the corresponding MBMS area, the mobile terminal makes a transition to step ST1733. The mobile terminal, in step ST1731, receives a reference signal (RS) with a radio resource of the MBSFN area in question, and measures the received power (RSRP) of the reference signal. The mobile terminal then determines whether or not the received power is equal to or higher than a threshold which is determined statically or semi-statically. The fact that the received power is equal to or higher than the above-mentioned threshold shows that the mobile terminal has high sensitivity enough to receive the MBMS service, whereas the fact that the received power is lower than the threshold shows that the mobile terminal does not have high sensitivity enough to receive the MBMS service. When the received power is equal to or higher than the above-mentioned threshold, the mobile terminal makes a transition to step ST1732, whereas when the received power is lower than the above-mentioned threshold, the mobile terminal makes a transition to step ST1733. The mobile terminal, in step ST1732, acquires a frequency f(MBMS) dedicated to MBMS transmission and an MBSFN area ID which are required for the user to receive the desired MBMS service. On the other hand, the mobile terminal, in step ST1733, determines whether or not another MBMS area receivable within the same frequency band (f(MBMS)) exists. This step ST1733 is effective particularly when an MBSFN area (an MBSFN area 4) covering other MBSFN areas as shown in FIG. 28 exists. When another MBMS area receivable within the same frequency band (f(MBMS)) exists, the mobile terminal returns to step ST1730 and repeats the process. In contrast, when any other MBMS area receivable within the same frequency band (f(MBMS)) does not exist, the mobile terminal makes a transition to step ST1734. The mobile terminal, in step ST1734, determines whether or not another frequency exists in the frequency list of the receivable MBSFN synchronization area, which the mobile terminal receives in step ST1708. When another frequency exists in the frequency list, the mobile terminal returns to step ST1722 and switches its synthesizer to the new frequency (f2(MBMS)), and then repeats the process. In contrast, when any other frequency does not exist in the frequency list, the mobile terminal returns to step ST1720 and repeats the process. Instead of receiving the reference signal and measuring the received power in step 1731, the mobile terminal can actually receive the MBMS service (an MTCH and/or an MCCH) in the MBSFN area in question. In this case, the user can determine whether the mobile terminal provides receive sensitivity which he or she can permit by hearing or viewing decoded data. When the mobile terminal provides receive sensitivity which he or she can permit, the mobile terminal makes a transition to step ST1732, whereas when the mobile terminal does not provide receive sensitivity which he or she can permit, the mobile terminal makes a transition to step ST1733. Because the permissible receive sensitivity has differences among individuals, there can be provided an advantage of making mobile terminals be further suited for users.

Figure 19:
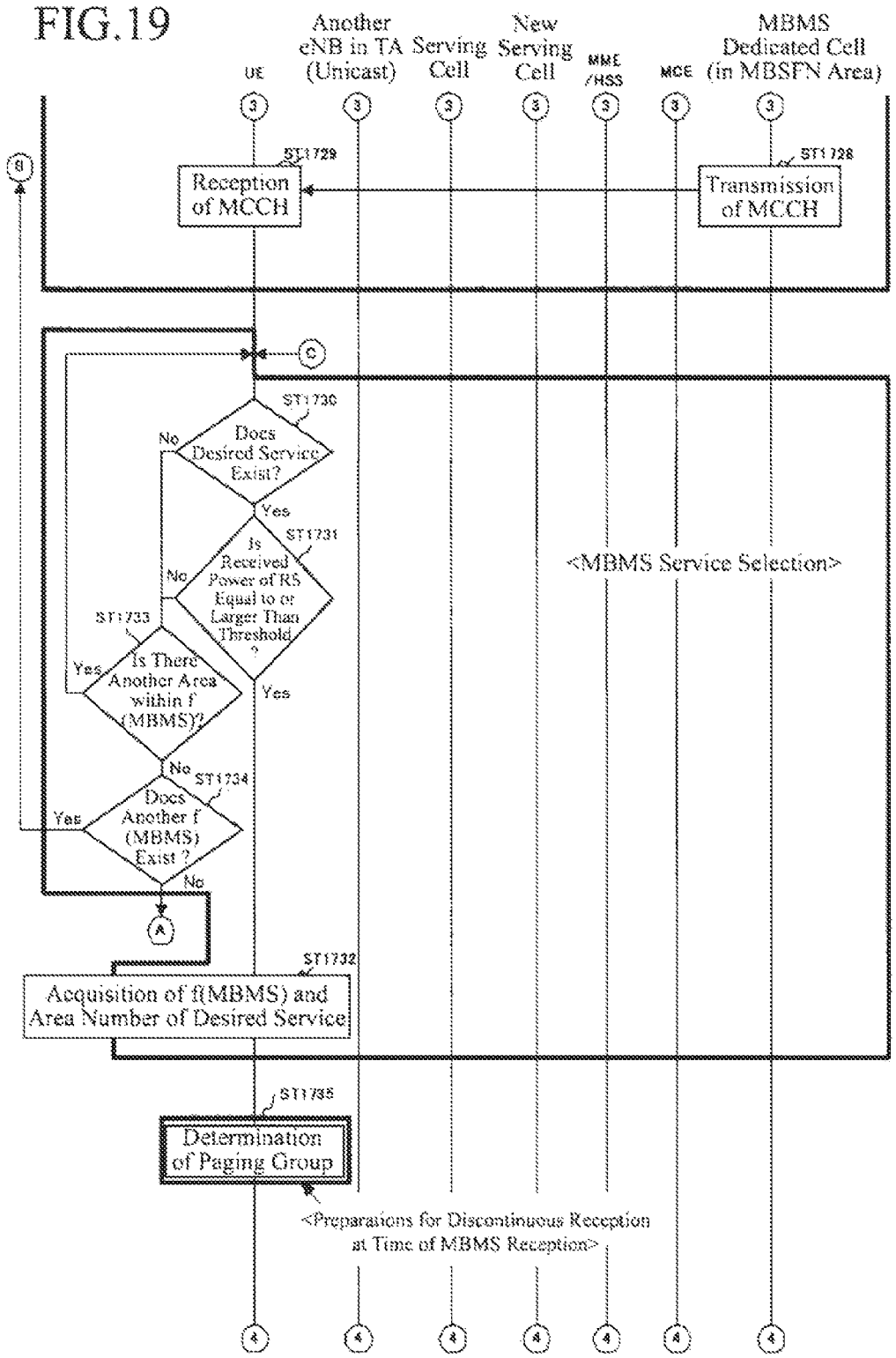
FIG. 19 is a flow chart showing an MBMS service selection process.

Step 1735 of FIG. 19 is a process of making "preparations for discontinuous reception at the time of MBMS reception" as described in Embodiment 1. The mobile terminal, in step ST1735, makes preparations for discontinuous reception at the time of MBMS reception by using the parameter for discontinuous reception at the time of MBMS reception which the mobile terminal receives in step ST1729. Concretely, the mobile terminal determines the paging group of the mobile terminal itself by using the number $K_{MBMS}$ of paging groups which the mobile terminal receives in step ST1729. The mobile terminal uses an identification ID (UE-ID, IMSI) of the mobile terminal for the determination of the paging group. The paging group can be expressed as IMSI mod $K_{MEMS}$.

Figure 20:
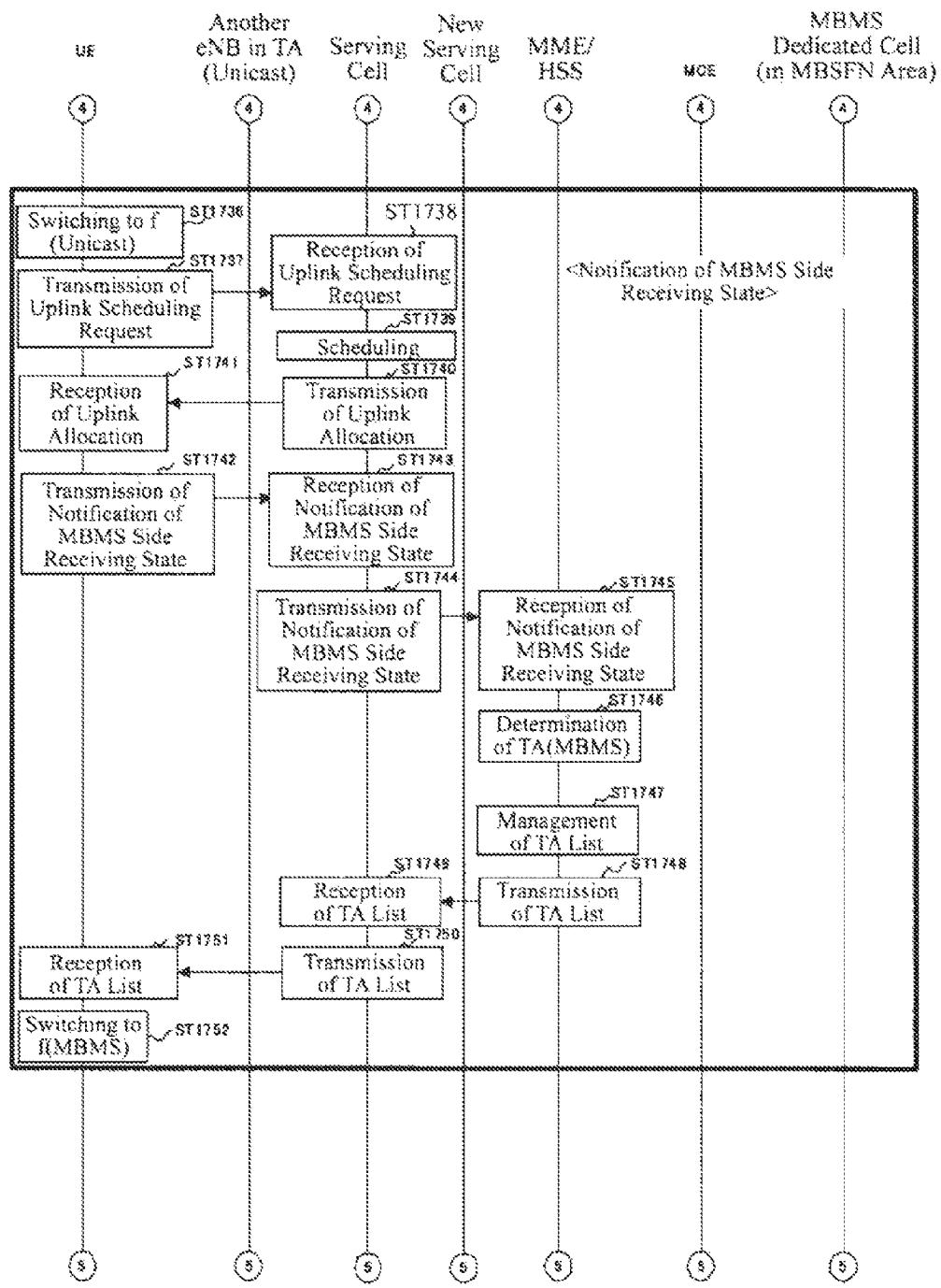
FIG. 20 is a flow chart showing a process of notifying an MBMS side receiving state.

FIG. 20 is a flow chart explaining a process of informing an MBMS side receiving state. This process will be a more-concretely explanation of the "notification of the MBMS side receiving state" described in Embodiment 1 with reference to FIG. 17. In FIG. 20, the mobile terminal, in step ST1736, changes the frequency set to the frequency converting unit 1107 thereof to change its center frequency to a frequency in the unicast/mixed frequency layer (referred to as f(unicast) from here on), so that the mobile terminal moves to the unicast/mixed frequency layer. The mobile terminal, in step ST1737, transmits an uplink scheduling request (a UL Scheduling Request) to a serving cell. The serving cell, in step ST1738, receives the uplink scheduling request from the mobile terminal. The serving cell, in step ST1739, carries out uplink scheduling (UL Scheduling) so as to allocate an uplink radio resource to the mobile terminal. The serving cell, in step ST1740, transmits allocation of an uplink radio resource to the mobile terminal (referred to as UL allocation or Grant), which is the result of the uplink scheduling in step ST1739, to the mobile terminal. The mobile terminal, in step ST1741, receives the UL allocation from the serving cell (i.e., receives the allocation of an uplink radio resource). The mobile terminal, in step ST1742, transmits the "notification of the MBMS side receiving state" to the serving cell according to the UL allocation which the mobile terminal receives in step ST1741. As an example of the parameters included in the "notification of the MBMS side receiving state", an identifier (UE-ID, IMSI, S-TMSI, or the like) of the mobile terminal, the frequency (f(MBMS)) at which the mobile terminal receives the MBMS service, and the MBSFN area number (ID) are included.

Furthermore, the "notification of the MBMS receiving state" of step ST1742 can be made like in the case of an "attach request" shown in ST1710, or as a type of "attach request". As an alternative, the "notification of the MBMS receiving state" can be made like in the case of "tracking area update (Tracking Area Update: TAU)", or as a type of "tracking area update". Parameters to be notified in this case includes an identifier (UE-ID, IMSI, S-TMSI, or the like) of the mobile terminal, the frequency (f(MBMS)) at which the mobile terminal receives the MBMS service, and the MBSFN area number (ID), like in the above-mentioned case. As a result, the network side is enabled to grasp the MBMS receiving state of the mobile terminal in the MBMS dedicated cell without adding any new message. Therefore, there can be provided an advantage of being able to avoid the complexity of the mobile communication system. Information showing that the "tracking area update" includes the "notification of the MBMS receiving state" can be included in the "tracking area update". As a concrete method, the "notification of the MBMS receiving state" can be added to the type (TYPE) information of TAU. The type information can be expressed as a numerical value. A 1-bit indicator showing whether or not to aim to make the "notification of the MBMS receiving state" can be formed on the TAU request message. Information showing that the "attach request" message includes the "notification of the MBMS receiving state" can be included in the "attach request" message. As a concrete method, the "notification of the MBMS receiving state" can be added to the type information of the attach request. The type information can be expressed as a numerical value. A 1-bit indicator showing whether or not to aim to make the "notification of the MBMS receiving state" can be formed on the attach request message. As a result, in the former case, the conventional "tracking area update" can be distinguished from the "tracking area update" used in order to inform the "MBMS receiving state". Furthermore, in the latter case, the conventional "attach request" can be distinguished from the "attach request" used in order to inform the "MBMS receiving state". As a result, there can be provided an advantage of preventing a control delay time from occurring in the mobile communication system.

The serving cell, in step ST1743, carries out a receiving process of receiving the various parameters transmitted from the mobile terminal through the "MBMS receiving state notification" process of step ST1742. The network side, in step ST1743, can know that the mobile terminal in question is receiving the MBMS service in the frequency layer dedicated to MBMS transmission without adding any uplink channel to the MBMS dedicated cell, i.e., without increasing the complexity of the mobile communication system. As a result, there is provided an advantage of enabling the general configuration in which the network side informs paging signals to be changed into the configuration of carrying out discontinuous reception at the time of MBMS reception. The serving cell, in step ST1744, transmits the parameters transmitted thereto through the "notification of the MBMS receiving state" made by the mobile terminal in step ST1742 to an MME. The MME, in step ST1745, receives these parameters.

The MME, in step ST1746, determines a tracking area (referred to as a TA(MBMS) from here on) in which the mobile terminal in question is receiving the MBMS service at the frequency dedicated to MBMS transmission. The MME determines the tracking area on the basis of the notification of the MBMS side receiving state (the parameters of the MBMS receiving state, f(MBMS), and the MBSFN area number) informed via the serving cell from the mobile terminal in step ST1742. The MME, in step ST1747, updates the tracking area list of the mobile terminals in question. The MME, in step ST1747, carries out management (storage, addition, update, and deletion) of the TA list including a TA(unicast) and/or a TA(MBMS). The TA(unicast) is a tracking area of the mobile terminal in question in the unicast/mixed frequency layer.

FIG. 31 is an explanatory drawing explaining the details of the tracking area list. Hereafter, an example of the management of the tracking area list will be explained with reference to FIG. 31. The tracking area list is managed for each mobile terminal as shown in FIG. 31(*a*). In the example of FIG. 31(*a*), a UE#1 has a TA(unicast) #1 and a TA(unicast) #2, and a UE#2 has a TA(unicast) #1 and a TA(MBMS) #1. The MME also manages base stations included in each tracking area (TA (unicast)). The management of base stations will be explained with reference to FIG. 31(*b*). MBMS/Unicast-mixed cells having cell (Cell) IDs of 1, 2, 3, 4, and 5 are included in the TA(unicast) #1. MBMS/Unicast-mixed cells having cell IDs of 23, 24, and 25 are included in the TA(unicast) #2. Next, the management of base stations will be explained with reference to FIG. 31(*c*). The TA(MBMS) #1 corresponds to the MBSFN area ID of the MBSFN area in which the mobile terminal in question is receiving the MBMS service in the frequency layer dedicated to MBMS transmission. More specifically, in accordance with the present invention, the mobile terminal, in step ST1742, transmits the parameters through the "notification of the MBMS side receiving state", and the MME, in step ST1745, determines the TA(MBMS) by using f(MBMS) and the MBSFN area ID which are the parameters.

The details of the management of the TA list of step ST1747 will be explained. The MME searches for the TA(MBMS) number which is managed within the MME on the basis of f(MBMS) and the MBSFN area ID which the MME receives in step ST1745 (for example, by using FIG. 31(*c*)). Next, the MME determines whether the TA(MBMS) which has been searched for as the result of the search exists in the TA list of the mobile terminal in question. When the TA(MBMS) exists in the TA list, the MME stores the current TA list. In contrast, when the TA(MBMS) does not exist in the TA list, the MME adds the above-mentioned TA(MBMS) to the TA list of mobile terminal in question. The MME can manage (or register) multiple tracking areas (Multi-TA). The MME can also manage the TA(MBMS) and the TA(Unicast) as the multi-tracking area. The MME can separately manage the TA(MBMS) and the TA(Unicast), or can separately manage the tracking area list for the TA(MBMS) and the tracking area list for the TA (Unicast). The MME, in step ST1748, transmits a response signal Ack showing that the MME has received the notification of the MBMS side receiving state to the serving cell. It is possible to include the TA list of the mobile terminal in question in this response signal. One or more tracking areas (Multi-TA) can be included in the single TA list. The TA(MBMS) and the TA(Unicast) can be included in the single TA list. The TA list for the TA(MBMS) and the TA list for the TA(Unicast) can be separately provided.

The serving cell, in step ST1749, receives the Ack to the notification of the MBMS side receiving state from the MME, and, in step ST1750, transmits the Ack to the notification of the MBMS side receiving state to the mobile terminal. The mobile terminal, in step ST1751, receives the Ack to the notification of the MBMS side receiving state from the serving cell. The mobile terminal, in step ST1752, moves to the frequency layer dedicated to MBMS transmission by changing the frequency set to the frequency converting unit 1107 thereof to change the center frequency to the frequency (f(MBMS)) in the frequency layer dedicated to MBMS transmission.

Figure 21:
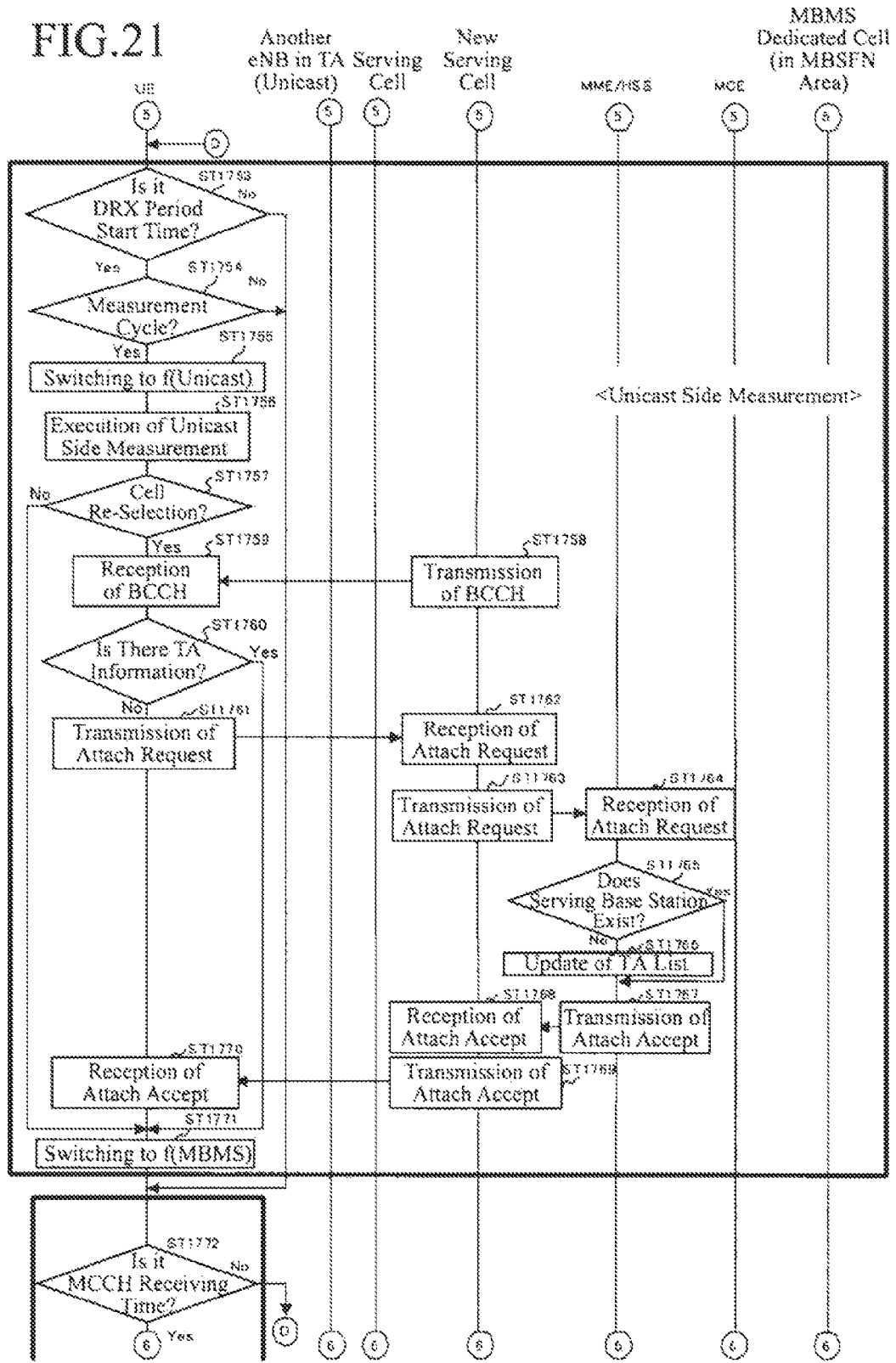
FIG. 21 is a flow chart explaining a unicast side measurement process.

FIG. 21 is a flowchart showing a unicast side measurement process. Hereafter, the "unicast side measurement", which is described in Embodiment 1 with reference to FIG. 21, will be explained more concretely. The mobile terminal, in step ST1753, determines whether a DRX period start time of the MBMS service has come by using the DRX information which the mobile terminal receives in step ST1729 of FIG. 19. As a concrete example, the mobile terminal determines the SFN number of the leading system frame at which a DRX period starts by using the DRX cycle length and the starting point value (DRX) which are an example of the parameters which the mobile terminal receives in step ST1729, and determines whether or not a DRX period start time has come on the basis of the SFN mapped onto the BCCH (broadcast control channel) or the like. A concrete example of the computation is expressed as SFN=the DRX cycle length×α+the starting point value (DRX), where α is a positive integer. When no DRX period start time has come yet, the mobile terminal makes a transition to step ST1772. In contrast, when a DRX period start time has come, the mobile terminal makes a transition to step ST1754. The mobile terminal, in step ST1754, determines whether or not the DRX period start time is in a measurement period in the MBMS/Unicast-mixed cell received in step ST1705. When the DRX period start time is not in a measurement period, the mobile terminal makes a transition to step ST1772. In contrast, when the DRX period start time is in a measurement period, the mobile terminal makes a transition to step ST1755. The mobile terminal, in step ST1755, receives a downlink signal of the MBMS/Unicast-mixed cell by changing the frequency set to the frequency converting unit 1107 thereof (the synthesizer) to change the center frequency to f (Unicast). The mobile terminal, in step ST1756, carries out a measurement on the side of the unicast (i.e., a measurement of a unicast cell and/or an MBMS/Unicast-mixed cell). As values which the mobile terminal actually measures, the RSRPs, RSSIs, etc. of the serving cell and a neighboring cell can be considered. The information about the neighboring cell can be broadcast, as neighboring cell information (a list), from the serving cell.

The mobile terminal, in step ST1757, judges whether or not a re-selection (a cell re-selection) of the serving cell is needed according to the result of the measurement in step ST1756. As an example of a criterion of the judgment, there can be considered whether the result of the measurement of one cell among neighboring cells exceeds the result of the measurement of the serving cell. When no re-selection is needed, the mobile terminal makes a transition to step ST1771. In contrast, when a re-selection is needed, steps ST1758 and ST1759 are carried out. A base station (a new serving cell: New serving cell) which is newly selected as the serving cell in step 1758 broadcasts the measurement period length, the discontinuous reception cycle length, and the tracking area information (the TA information) to mobile terminals being served thereby by using the BCCH (broadcast control channel), like in the case of step ST1705. The mobile terminal, in step ST1759, receives and decodes the BCCH from the new serving cell to receive the measurement period length, the discontinuous reception cycle length, and the TA information. The mobile terminal, in step ST1760, checks to see whether or not the TA information of the serving base station received in step ST1759 is included in the current tracking area list (TA List) which is stored in the protocol processing unit 1101 or the control unit 1110 thereof. When the TA information is included in the current tracking area list, the mobile terminal makes a transition to step ST1771. In contrast, when the TA information is not included in the current tracking area list, the mobile terminal performs step ST1761. An explanation of steps ST1761 to ST1770 will be omitted because it is the same as that of steps ST1710 to ST1719. The mobile terminal, in step ST1771, moves to the frequency layer dedicated to MBMS transmission by changing the frequency set to the frequency converting unit 1107 thereof to change the center frequency to f(MBMS).

Through the "unicast side measurement" process in steps ST1753 to ST1771, the mobile terminal can carry out a measurement of a unicast cell and/or an MBMS/Unicast-mixed cell even if the mobile terminal is receiving an MBMS service in the frequency layer dedicated to MBMS transmission. Accordingly, there is provided an advantage of making it possible for a mobile terminal currently receiving an MBMS service in a frequency layer dedicated to MBMS transmission to ensure the mobility in unicast cells and/or MBMS/Unicast-mixed cells. As a result, there can be provided an advantage of becoming able to ensure the mobility in MBMS dedicated cells in which no uplink channel exists by way of an MBMS/Unicast-mixed cell. Therefore, there is provided an advantage of enabling even a mobile terminal currently receiving an MBMS service in a frequency layer dedicated to MBMS transmission to receive a paging signal. Furthermore, a mobile terminal currently receiving a service in a frequency layer dedicated to MBSFN transmission carries out downlink synchronization establishment with a unicast cell or an MBMS/Unicast-mixed cell through a measurement at measurement periods. As a result, there can be provided an advantage of enabling a mobile terminal which has received a paging signal in a frequency layer dedicated to MBMS transmission in which no uplink channel exists to implement even transmission of a response to the paging signal in a unicast cell or an MBMS/Unicast-mixed cell with a short control delay time, which is presented as a challenge of the present invention.

Figure 22:
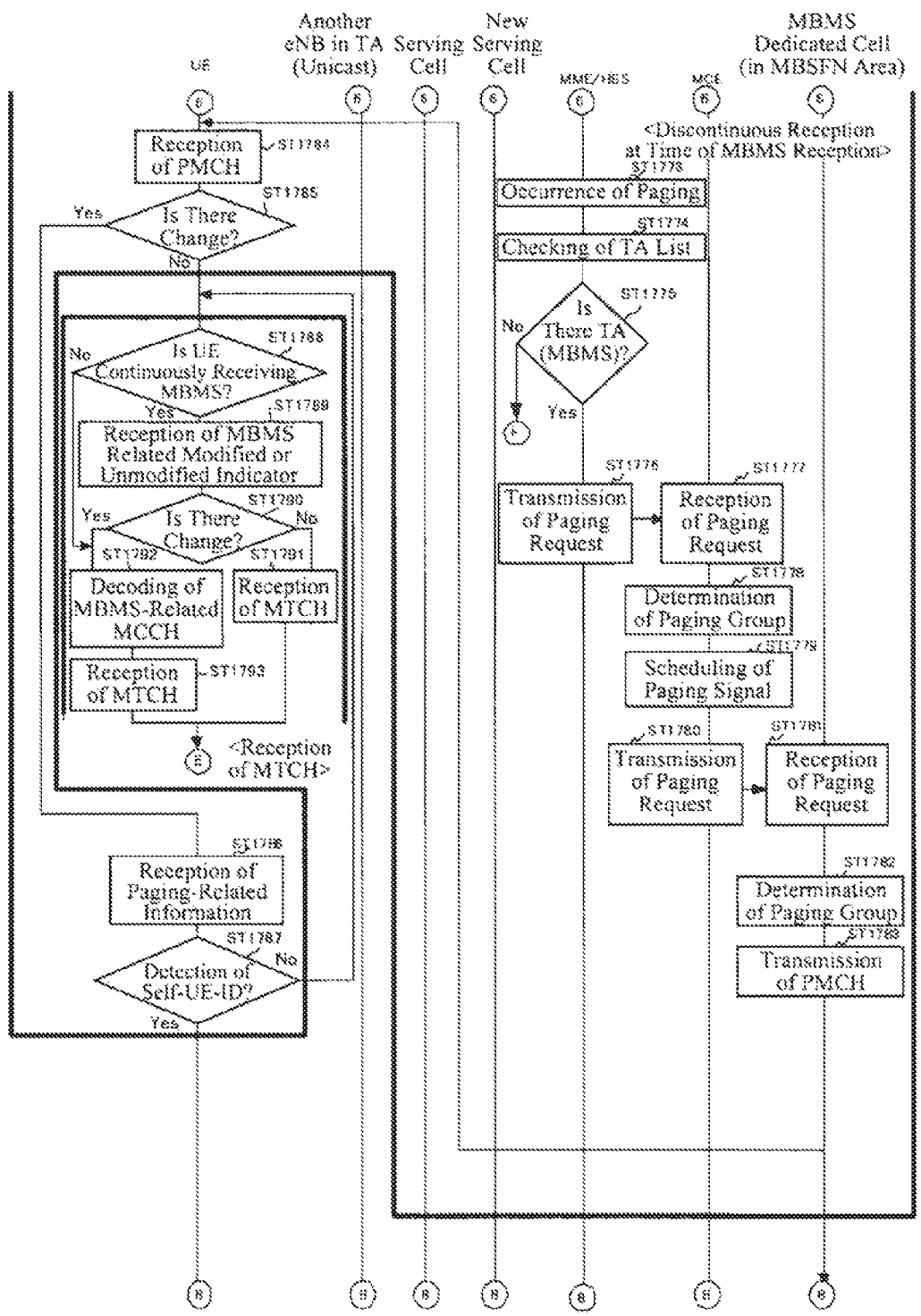
FIG. 22 is a flow chart explaining a discontinuous reception process at the time of MBMS reception.

FIG. 22 is a flow chart showing the discontinuous reception process at the time of MBMS reception, and explains the "discontinuous reception at the time of MBMS reception" which is described in Embodiment 1 with reference to FIG. 17 more concretely. The mobile terminal, in step ST1772 of FIG. 21, determines whether the current time is a time of receiving the MCCH of the number of the MBSFN area from which the mobile terminal is receiving an MBMS from the MCCH scheduling information of the MBMS area information. That is, the mobile terminal determines whether the current time is a time of receiving the MCCH by using the scheduling of the MCCH (multicast control channel) received in step ST1725. More specifically, the mobile terminal determines the SFN number of the leading one of system frames onto which the MCCH is mapped by using the MCCH repetition period length and the starting point value which are examples of the parameters which the mobile terminal receives in step ST1725, and determines whether or not it is the leading one of system frames onto which the MCCH is mapped on the basis of an SFN mapped onto the BCCH or the like to determine whether it is the SFN number of the leading one of system frames onto which the MCCH is mapped. When the current time is not the one of the leading one of system frames onto which the MCCH is mapped, the mobile terminal makes a transition to step ST1753. In contrast, when the current time is the one of the leading one of system frames onto which the MCCH is mapped, the mobile terminal makes a transition to step ST1784. As an alternative, in a case of FIG. 26, for example, the determination of step ST1772 can be carried out every MCCH repetition period 1.

In step ST1772, the time of receiving the MCCH (the SFN number of the leading one of system frames onto which the MCCH is mapped), and the discontinuous reception cycle length at the time of MBMS reception can be different. By making them different, it becomes able to "lengthen" or "shorten" the discontinuous reception cycle length at the time of MBMS reception according to the network conditions or the like, and the mobile communication system can be configured in such a way as to have higher flexibility. In step ST1707, the discontinuous reception cycle length at the time of MBMS reception can be mapped onto the BCCH and informed from the serving cell to the mobile terminal. As an alternative, in step ST1723, the discontinuous reception cycle length at the time of MBMS reception can be mapped onto the BCCH, and informed from the MBMS dedicated cell to the mobile terminal. As an alternative, in step ST1728, the discontinuous reception cycle length at the time of MBMS reception can be mapped onto the MCCH, and informed from the MBMS dedicated cell to the mobile terminal. More specifically, the mobile terminal determines whether or not the current time is a discontinuous reception timing at the time of MBMS reception in step ST1772, and, when the current time is a discontinuous reception timing, makes a transition to step 1784. In contrast, when the current time is not a discontinuous reception timing, the mobile terminal determines whether or not the current time is a receiving one of receiving the MCCH, and, when the current time is a receiving one of receiving the MCCH, the mobile terminal makes a transition to step ST1788. In contrast, when the current time is not a receiving one of receiving the MCCH, the mobile terminal makes a transition to step ST1753 of FIG. 21.

When, in step ST1773, paging to the mobile terminal in question occurs, the MME, in step ST1774, checks the tracking area (TA) list of the mobile terminal in question on the basis of an identifier (UE-ID, IMSI, S-TMSI, or the like) of the mobile terminal which is the destination of the paging. The MME, in step ST1775, determines whether or not the TA(MBMS) is included in the tracking area list of the mobile terminal in question. As an example, the MME searches through the tracking area list of the mobile terminal in question, such a list as shown in FIG. 31(*a*), on the basis of the UE-ID. In a case in which the mobile terminal in question is the UE#1 (UE-ID#1) of FIG. 31(*a*), the MME determines that the TA(MBMS) is not included is the tracking area list. In contrast, in a case in which the mobile terminal in question is the UE#2 (UE-ID#2) of FIG. 31(*a*), the MME determines that the TA(MBMS) is included is the tracking area list because the TA(MBMS)#1 is included in the list. When the TA(MBMS) is not included in the tracking area list, the MME makes a transition to step ST1814. In contrast, when the TA(MBMS) is included in the tracking area list, the MME makes a transition to step ST1776. The MME, in step ST1776, transmits a paging request (Paging Request) to MCEs. More specifically, the MME 103 of FIG. 10 transmits a paging request to MCEs 801 by using interfaces between MME and MCE. As the MCEs to which the MME transmits a paging request, there can be considered all MCEs each of which manages base stations which geographically overlap the base stations managed by the MME.

As an example of parameters included in the paging request, there can be considered an identifier (UE-ID, IMSI, S-TMSI, or the like) of the mobile terminal, the TA(MBMS) number, and so on. At this time, instead of the TA(MBMS) number, both f(MBMS) and the MBSFN area ID or only the MBSFN area ID can be provided. Each of the MCEs, in step ST1777, receives the paging request. Among the MCEs each of which receives the paging request in step ST1778, an MCE which controls the MBSFN area ID which is informed thereto as a parameter included in the paging request, and which is related to the TA(MBMS) number makes preparations for paging transmission. In contrast, an MCE which does not control the MBSFN area ID related to the TA(MBMS) number does not make preparations for paging transmission. As an example of the preparations for paging transmission, an MCE which controls the MBSFN area ID determines the paging group of the mobile terminal in question by using both the number $K_{MBMS}$ of paging groups of the base stations managed thereby (the MBSFN area to which the base stations belong), and the received paging request. When determining the paging group, the MCE uses the same computation expression as that used by the mobile terminal (Paging group=IMSI mod $K_{MBMS}$). As mentioned above, because the method of managing the correspondence between the TA(MBMS) number (the MBSFN area) and MCEs, which each MCE receiving the paging request uses, enables a relationship between the MBSFN area ID and MCEs each of which controls the MBSFN area to be built within only the architecture of the MBMS service, that is, because the method can be implemented regardless of the MME, there can be provided an advantage of being able to configure the mobile communication system in such a way as to have high flexibility.

Furthermore, there is considered a case in which the MME manages the MBSFN area ID related to the TA(MBMS) number as shown in FIG. 31(c), and also manages the MBSFN area ID and the number of an MCE which controls the MBSFN area as shown in FIG. 31(d). In this case, the MME, in step ST1776, transmits the paging request only to an MCE which manages the MBSFN area ID related to the TA(MBMS) number. As an example of a parameter included in the paging request at that time, there can be considered an identifier of the mobile terminal, or the like. The MCE which receives the paging request in step ST1778 makes preparations for paging transmission, like in the above-mentioned case. As mentioned above, because the method (FIG. 31(d)) of managing the relationship between an MBSFN area ID and an MCE which controls the MBSFN area in the MME reduces the number of MCEs to which the paging request is transmitted from the MME, there is provided an advantage of being able to make effective use of the resources. Furthermore, because the amount of information to be informed decreases, there is provided an advantage of being able to make effective use of the resources.

Furthermore, there is considered a case in which the MME manages the MBSFN area ID related to the TA(MBMS) number as shown in FIG. 31(c), and also manages the MBSFN area ID and the cell IDs of the MBMS dedicated cell and/or the MBMS/Unicast-mixed cell which is included in the MBSFN area ID as shown in FIG. 31(e). In this case, the MME, in step ST1776, transmits the paging request to the cells whose IDs are included in MBSFN area ID which is not managed by an MCE but by the MME. A new interface is disposed between the MME and each MBMS dedicated cell. The MME transmits the above-mentioned paging request to each MBMS dedicated cell included in the MBSFN area having the MBSFN area ID by using the new interface. As an example of a parameter included in the paging request at that time, there can be considered an identifier of the mobile terminal, or the like. As mentioned above, the method of managing the relationship between an MBSFN area ID and cells whose IDs area included in the MBSFN area ID in the MME (FIG. 31(e)) eliminates the necessity for an MCE to carry out processes regarding the transmission of a paging signal to the mobile terminal. Because this results in elimination of the necessity to add any function to each MCE, there can be provided an advantage of being able to avoid the complexity of each MCE. Furthermore, there can be provided an advantage of being able to reduction the processing load on each MCE.

FIG. 32 is an explanatory drawing explaining an example of the structure of a channel onto which a paging signal in a frequency layer dedicated to MBMS transmission is mapped.

FIG. 32(a) is a view showing a configuration including MBMS-related information and a paging signal on a PMCH (Physical multicast channel). The MBMS-related information is mapped onto logical channels MTCH and MCCH for MBMS. The MBMS-related information and the paging signal can exist as information elements in the MTCH and the MCCH respectively, or time-division multiplexing of physical areas (resources) onto which the MBMS-related information and the paging signal are mapped respectively can be carried out. Each of all cells in an MBSFN area carries out multi-cell transmission of an MCCH periodically in this MBSFN area by using a PMCH corresponding to the MBSFN area. On the other hand, a mobile terminal which is receiving or trying to receive an MBMS service transmitted via a multi-cell transmission scheme from cells in the above-mentioned MBSFN area receives the above-mentioned MCCH at regular intervals and also receives the contents of the MBMS service, information about the frame structure, etc., so that the mobile terminal can receive the MBMS service.

By including the paging signal in this MCCH, a mobile terminal which is receiving or trying to receive an MBMS service is enabled to receive the paging information when receiving the MCCH. As a result, because the mobile terminal does not have to receive the paging separately at a time other than the time of receiving the MCCH, the mobile terminal can receive the paging without interrupting the reception of the MBMS service. Furthermore, during a time period during which the mobile terminal is not receiving the MCCH, and during a time period during which the mobile terminal is not receiving the MBMS service, the mobile terminal can carry out a DRX operation (discontinue the receiving operation), thereby reducing its power consumption. Furthermore, the MCCH and the PCCH onto which the paging signal is mapped can be configured in the same MBSFN subframes, and an MBSFN subframe onto which the MCCH is mapped and an MBSFN subframe on which the paging signal is mapped can be arranged in such a way as to be adjacent to each other in time. In the case in which they are configured in this way, a mobile terminal which is receiving or trying to receive an MBMS service is enabled to receive the paging signal continuously when receiving the MCCH. As a result, because the mobile terminal does not have to carry out any reception for the reception of the paging at a time other than the time of receiving continuous MBSFN subframes onto which the MCCH and the paging signal are mapped, the mobile terminal can receive the paging signal without interrupting the reception of the MBMS service. Furthermore, during a time period during which the mobile terminal is not receiving the MCCH and the paging signal, and during a time period during which the mobile terminal is not receiving the MBMS service, the mobile terminal can carry out a DRX operation, thereby reducing its power consumption.

A configuration of disposing an indicator indicating whether or not the MBMS control information has been changed, and an indicator indicating whether or not the paging signal has been transmitted is disclosed in FIG. 32(b). In FIG. 32(b), the indicator 1 indicates whether the paging signal has been transmitted, and is referred to as the paging signal presence or absence indicator. The indicator 2 indicates whether or not the MBMS control information has been changed, and is referred to as the MBMS-related information modified or unmodified indicator. A physical area onto which each of the indicators is mapped can be disposed in an MBSFN subframe via which the PMCH is transmitted. As an alternative, a physical area onto which each of the indicators is mapped can be the one adjacent in time to an MBSFN subframe via which the PMCH is transmitted. By configuring the physical area onto which each of the indicators is mapped in this way, the mobile terminal can receive and decode the MCCH which is mapped onto the PMCH and the paging signal immediately after receiving the indicators. Concretely, 1-bit (bit) information is defined as each of the indicators. Each of the indicators is multiplied by an MBSFN-area-specific scrambling code or the like, and is mapped onto a predetermined physical area. As an alternative method, for example, each of the indicators can be formed of an MBSFN-area-specific sequence, and can be mapped onto a predetermined physical area. When an incoming call to the mobile terminal is occurring, the paging signal presence or absence indicator is set to "1", for example, whereas when no incoming call thereto is occurring, the mobile terminal sets the paging signal presence or absence indicator to "0". Furthermore, for example, when the MBMS control information which is mapped onto the MCCH has been changed due to change in the contents of the MBMS service transmitted in the MBSFN area, or the like, the mobile terminal sets the MBMS-related information modified or unmodified indicator to "1", for example. The mobile terminal determines the length of a time period (referred to as an MBMS modification period) during which the MBMS-related information including the MBMS control information and the MBMS-related information modified or unmodified indicator can be modified one or more times, and the base station repeatedly transmits the MBMS-related information modified or unmodified indicator "1" within this time period. The length of the MBMS modification period, the start timing (the SFN and the starting point), etc. can be predetermined. As an alternative, they can be informed via broadcast information from either a serving cell for unicast service or an MBMS dedicated cell. When there is no further modification in the MBMS-related information after the expiration of the MBMS modification period, the mobile terminal sets the MBMS-related information modified or unmodified indicator to "0", for example. The mobile terminal can determine whether or not there is a modification in the MBMS-related information which exists in the MCCH and whether or not the paging signal exists by receiving the indicators in the MCCH of a desired MBSFN area, and performing de-spreading and so on each of the indicators to determine whether or not each of the indicators is 1 or 0.

By thus disposing each of the indicators, when there is no modification in the MBMS control information and when no paging signal exists, the mobile terminal does not have to receive and/or decode all the information on the PMCH. Therefore, it becomes able to reduce the power for receiving of the mobile terminal. By further determining the length of the time period during which the MBMS-related information can be modified, and enabling identical MBMS control information to be transmitted one or more times within a single time period having the length, the mobile terminal becomes able to receive the identical MBMS control information one or more times. Therefore, the error rate of reception of the MBMS control information can be reduced, and the quality of reception of the MBMS service can be improved. The physical area onto which the MBMS-related information modified or unmodified indicator indicating whether the MBMS control information has been modified is mapped can be the first one of one or more MBSFN subframes onto which the MBMS control information is mapped. As an alternative, the physical area onto which the MBMS-related information modified or unmodified indicator indicating whether the MBMS control information has been modified is mapped can be a first OFDM symbol of the above-mentioned first MBSFN subframe. As a result, the mobile terminal becomes able to determine whether a modification has occurred in the MBMS control information by receiving the first OFDM symbol.

Furthermore, the physical area onto which the paging signal presence or absence indicator indicating whether or not the paging signal exists is mapped can be the first one of one or more MBSFN subframes onto which the paging signal is mapped. As an alternative, the physical area onto which the paging signal presence or absence indicator indicating whether or not the paging signal exists is mapped can be an OFDM symbol at the head of the above-mentioned first MBSFN subframe. As a result, the mobile terminal becomes able to determine whether or not the paging signal exists by receiving the first OFDM symbol. By mapping each indicator onto such a physical area as mentioned above, when there is no modification in the MBMS control information and when no paging signal exists, the mobile terminal does not have to receive and/or decode subsequent OFDM symbols. Therefore, it becomes able to further reduce the power for receiving of the mobile terminal. Furthermore, because the mobile terminal can determine whether there is no modification in the MBMS control information or whether a paging signal exists at an earlier time from the first MBSFN subframe or the OFDM symbol at the head of the first MBSFN subframe, the mobile terminal can receive the MBMS control information immediately or can receive the paging signal immediately, it becomes able to reduce the control delay in the mobile terminal.

The MBMS-related information modified or unmodified indicator and the paging signal presence or absence indicator can be mapped onto an identical physical area, or can be mapped onto different physical areas. In a case in which the indicators are mapped onto an identical physical area, what is necessary is just to implement an OR logical operation on the indicators. As a result, the mobile terminal has only to receive a single indicator, there is provided an advantage of being able to simplify the receiving circuit configuration. In contrast, in a case in which the indicators are mapped onto different physical areas, the mobile terminal has only to receive only a required one of the indicators without having to receive the other indicator. Therefore, the power for receiving of the mobile terminal can be further reduced, and the delay occurring in the reception of the required information can be further reduced. For example, a mobile terminal which is set so as not to receive a paging signal while receiving an MBMS service has only to receive the MBMS-related information modified or unmodified indicator, and can eliminate the necessity to receive the paging signal presence or absence indicator. Furthermore, in the case in which the MBMS-related information modified or unmodified indicator and the paging signal presence or absence indicator are mapped onto different physical areas, when, in step ST1772, the receiving time of receiving the MCCH (the SFN number of the leading one of system frames onto which the MCCH is mapped) or the length of an MBMS-related modified or unmodified indicator repetition period, and the length of a paging signal presence or absence indicator repetition period are set to different values, the mobile terminal can receive and/or decode only the MBMS-related information modified or unmodified indicator at the MCCH receiving time or during an MBMS-related modified or unmodified indicator repetition period, and can receive and/or decode the paging signal presence or absence indicator during a paging signal presence or absence indicator repetition period. As a result, there can be provided an advantage of reducing the processing time of the mobile terminal and being able to establish low power consumption in the mobile terminal.

The lengths of the repetition periods of the indicators can be the same as each other, or can be different from each other. The length of the repetition period of each of the indicators can be the same as that of the MCCH, or can be different from that of the MCCH. For example, the length of the repetition period of the MBMS-related information modified or unmodified indicator is set to be the same as the length of the repetition period of the MCCH (the length of the MCCH Repetition Period), and the length of the repetition period of the paging signal presence or absence indicator is set to be n times as long as the length of the repetition period of the MCCH (n is an integer greater than or equal to 2). By thus setting the repetition period lengths, it becomes able to "lengthen" or "shorten" the discontinuous reception cycle length at the time of MBMS reception according to the network conditions or the like, and the mobile communication system can be configured in such a way as to have higher flexibility. The lengths of the repetition periods of the indicators are referred to as the paging signal presence or absence indicator repetition period (Repetition period) and the MBMS-related modified or unmodified indicator repetition period (Repetition period). The start timing (the SFN and the starting point) of the MBSFN subframe in which the indicator exists, the subframe number, the repetition period lengths of the indicators, and so on can be informed via broadcast information from a serving cell for unicast service, can be informed via broadcast information from an MBMS dedicated cell, or can be predetermined. In this case, the mobile terminal carries out step ST1772, ST1788, or ST1789 during each MBMS-related modified or unmodified indicator repetition period. A channel dedicated to the MBMS-related information modified or unmodified indicator can be an MICH (MBMS Indicating CHannel), for example. Furthermore, the paging signal presence or absence indicator can be formed in the MICH. The length of the repetition periods at which the MICH is repeated is referred to as the "MICH repetition period" (MICH Repetition period). The repetition period length of the paging signal presence or absence indicator can be the same as that of the MICH, or can be different from that of the MICH. The notification of the indicators can be made by using the same method as that described previously. In this case, the mobile terminal carries out step ST1772 or ST1784 during each paging signal presence or absence indicator repetition period. As a result, the time when each indicator is transmitted is not limited to the time when the MCCH is transmitted, and therefore it becomes able to flexibly design the system.

In a case in which the paging signal is included in the PMCH, there arises a problem that when the number of mobile terminals for each of which an incoming call is occurring becomes huge, it takes too much time for each mobile terminal to detect a paging signal destined for the mobile terminal itself. A further problem is that any area onto which the paging signals for all the mobile terminals for each of which an incoming call is occurring are to be mapped cannot be ensured in a certain physical area onto which the paging signals are to be mapped. In order to solve these problems, a method of carrying out paging grouping will be disclosed hereafter. The method of carrying out paging grouping is shown in FIG. 32(*c*). All mobile terminals are divided into K groups, and a paging signal presence or absence indicator is disposed for each of the groups. The physical area used for the paging signal presence or absence indicator in the MCCH is divided into K parts, and the paging signal presence or absence indicators of the K groups are mapped onto the K divided parts of the physical area respectively. In this case, K can have a value ranging from 1 to the number of all the mobile terminals. When an incoming call to a mobile terminal is occurring, the paging signal presence or absence indicator of the group to which this mobile terminal belongs is set to "1". When no incoming call to any of all the mobile terminals belonging to a group is occurring, the paging signal presence or absence indicator of this group is set to "0". Repetition or the like of the paging signal presence or absence indicator value can be carried out so that each of the mobile terminals satisfies a desired error rate of reception. The physical area onto which paging signals are mapped is also divided into K parts, and these K parts are brought into correspondence with the above-mentioned K groups respectively. As a paging signal destined for each mobile terminal, an identifier of the mobile terminal (an identification number or an identification code) can be provided. Each of the K divided pieces of the physical area is the sum of the corresponding group's mobile terminals' physical areas in each of which paging signal data required by one mobile terminal is accommodated. The number of mobile terminals in each group can be identical to that in any other group, or can be different from that in any other group.

The number of mobile terminals in each group is calculated by using, for example, a method of calculating the average of the number of mobile terminals for each of which an incoming call has occurred simultaneously. As an alternative, a method of defining the number of mobile terminals which can be allocated to one OFDM symbol in the entire frequency band as the number of mobile terminals in each group, and then bringing a plurality of OFDM symbols into correspondence with the plurality of groups respectively can be used. When an incoming call to a mobile terminal is occurring, "1" is set to the paging signal presence or absence indicator of the group to which this mobile terminal belongs, and the paging signal presence or absence indicator is mapped onto the physical area corresponding to this group and used for the paging signal presence or absence indicator. In addition, the paging signal destined for the mobile terminal for which an incoming call is occurring is mapped onto the physical area of the paging signal corresponding to the group to which this mobile terminal belongs. The mapping of the paging signal to the physical area is carried out by using a method of multiplying the paging signal destined for each mobile terminal by an identification code specific to the mobile terminal. The paging signal destined for each mobile terminal can be an identifier of the mobile terminal. In this case, the control operation of multiplying the paging signal destined for each mobile terminal by the above-mentioned identification code specific to the mobile terminal can be omitted. Each mobile terminal determines whether an incoming call destined for the group to which the mobile terminal itself belongs is occurring by receiving the paging signal presence or absence indicator of the group to which the mobile terminal itself belongs. When determining that an incoming call is occurring, each mobile terminal receives and decodes the physical area onto which the paging signal brought into correspondence with the group onto which the mobile terminal belongs is mapped. After decoding the physical area, each mobile terminal carries out an operation of calculating a correlation with the identification code specific to the mobile terminal to carry out blind detection to specify the paging signal destined for the mobile terminal itself. As a result, each mobile terminal becomes able to determine that an incoming call to the mobile terminal itself is occurring. When each mobile terminal has not detected the paging signal destined therefor, the mobile terminal itself determines that no incoming call thereto is occurring.

By grouping all the mobile terminals into the K groups, the necessity for each of the mobile terminals to receive all of the area dedicated to paging signals can be eliminated, and each of the mobile terminals has only to receive only a required area, i.e., a physical area corresponding to the group to which the mobile terminal itself belongs. Therefore, the length of time required for each of the mobile terminals to detect the paging signal destined therefor can be shortened. Furthermore, because each of the mobile terminals does not have to receive a physical area corresponding to any other group to which the mobile terminal itself does not belong, the power for receiving of each of the mobile terminals can be reduced. In addition, by using the paging signal presence or absence indicator corresponding to each group, also when there are many mobile terminals, the paging signal presence or absence indicators can be provided with a small amount of physical resources. Furthermore, each of the mobile terminals has only to receive an area dedicated to paging signals as needed. Therefore, while the power for receiving of each of the mobile terminals can be reduced, the control delay can also be reduced because each of the mobile terminals can make a transition to the next operation immediately when it does not have to receive the paging signal.

In above-mentioned Embodiment, each of the K divided pieces of the physical area onto which paging signals are mapped is the sum of the corresponding group's mobile terminals' physical areas in each of which paging signal data required by one mobile terminal is accommodated. However, because the required physical area becomes very large and the overhead for transmitting the MBMS service increases greatly as the number of mobile terminals becomes huge, the transmission rate of the MBMS service data decreases. In order to prevent this problem, the paging signal destined for each of the mobile terminals is multiplied by an identification code specific to the mobile terminal itself. As a result, because each of the mobile terminals becomes able to carry out blind detection (Blind Detection) of whether or not it is information destined for the mobile terminal itself by using the identification code specific to the mobile terminal, it becomes unnecessary to fix the physical area onto which the paging signal destined for each of the mobile terminals is mapped in advance. Therefore, there is no necessity to provide a physical area used for the paging signals destined for all the mobile terminals, and a physical area which is large enough to map paging signals destined for a certain number of mobile terminals for each of which an incoming call is predicted to actually occur has only to be provided. As an example, there is a method of defining the average of the number of mobile terminals for each of which an incoming call has occurred simultaneously as the number of mobile terminals to be included in each group. By using this method, it becomes able to use the limited amount of physical resources effectively. Furthermore, by using the above-mentioned method, the mobile communication system can flexibly deal with even a case in which the number of mobile terminals for each of which an incoming call is occurring becomes larger than a predicted number through scheduling in a base station. For example, the mobile communication system can transmit a paging signal destined for a mobile terminal receiving a new incoming call on the next PMCH.

When the number of all the mobile terminals is small, only the paging signal presence or absence indicators can be transmitted by setting the value of K to be equal to the number of the all mobile terminals. In this case, there is no necessity to ensure the paging-related physical area, and what is necessary is just to ensure a physical area used for the paging signal presence or absence indicators and corresponding to the number of all the mobile terminals. Therefore, the efficiency of the radio resources can be improved. Furthermore, in this case, there exists a physical area used for a paging signal presence or absence indicator and corresponding to each mobile terminal. Therefore, each of the mobile terminals can determine the presence or absence of an incoming call without receiving the area for paging signals by simply receiving and decoding the physical area used for a paging signal presence or absence indicator and corresponding to the mobile terminal itself, thereby being able to reduce the control delay occurring when performing the paging operation.

Figure 33:
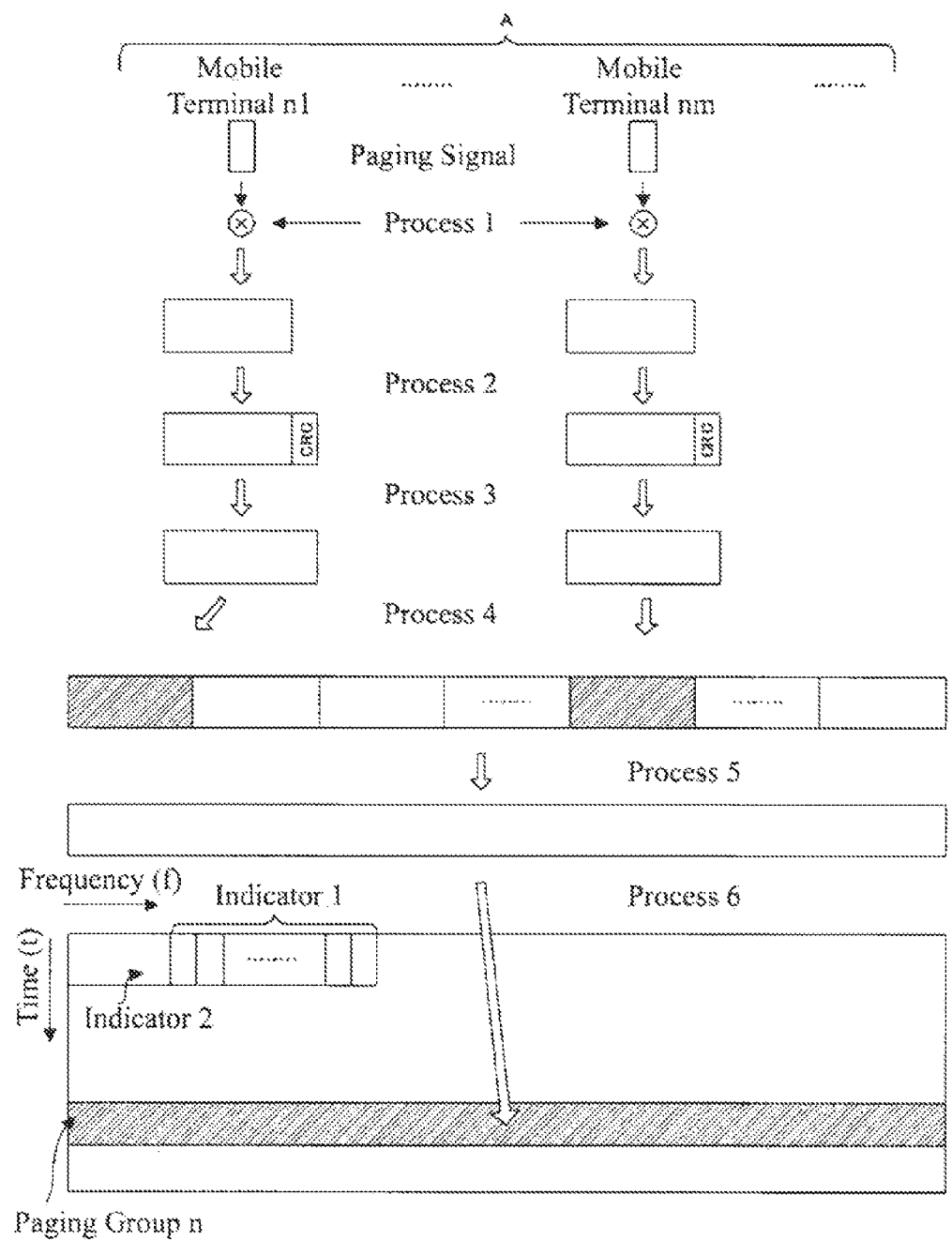
FIG. 33 is an explanatory drawing showing an example of a method of mapping a paging signal onto a physical area on a physical multicast channel (PMCH) onto which the paging signal is to be mapped.

An example of the method of mapping paging signals onto a physical area on the PMCH onto which the paging signals are to be mapped is shown in FIG. 33. Paging signals destined for mobile terminals n1, n2, and so on for each of which an incoming call is occurring, among mobile terminals (shown by A in FIG. 33) belonging to a paging group n, are mapped onto a physical area corresponding to this group n. A base station multiplies the paging signal destined for each of the mobile terminals by an identification code specific to this mobile terminal (a number or a sequence) (process 1), carries out CRC addition (process 2), and carries out a process including encoding and rate matching (process 3). When the paging signal destined for each of the mobile terminals is an identifier of the mobile terminal, the control operation of multiplying the paging signal by the above-mentioned mobile-terminal-specific identification code can be omitted. The result of the series of processes carried out is allocated to an information element unit having a size corresponding to the size of the physical area onto which the paging signal is to be mapped (process 4), and a plurality of information element units whose number is equal to that of the mobile terminals for each of which an incoming call is occurring are connected to one another. The connected result is subjected to a scrambling process using an MBSFN-area-specific scrambling code, a modulation process, etc. (process 5). The modulation process can be specific to the MBSFN area. The result of carrying out these processes is mapped onto the physical area corresponding to the paging group n (process 6). In this case, the base station sets "1" to the paging signal presence or absence indicator (indicator 1) of the paging group n, and then maps it onto the physical area corresponding to the paging group n of the paging signal presence or absence indicator. The physical area corresponding to the paging group n can be predetermined, or can be informed, as broadcast information, from either a unicast side serving cell or an MBMS dedicated cell to the base station. Each of the mobile terminals receives the paging signal presence or absence indicator of the paging group to which the mobile terminal itself belongs, and, when the paging signal presence or absence indicator has a value of "1", receives the physical area for paging signal corresponding to this paging group. Each of the mobile terminals receives the physical area for paging signal, carries out demodulation and descrambling using the MBSFN-area-specific scrambling code, and divides the result of the demodulation and descrambling into parts each corresponding to an information element unit. Each of the mobile terminals carries out blind detection of the paging signal destined for the mobile terminal itself by performing a process including decoding on each of the divided parts each corresponding to an information element unit, and then carrying out a correlation operation with the mobile-terminal-specific identification number. When the result of the correlation operation is larger than a certain threshold, each of the mobile terminals determines that there is paging destined for the mobile terminal itself, and starts an operation of receiving a paging incoming call with the paging signal. In contrast, when the result of the correlation operation is equal to or smaller than the certain threshold, each of the mobile terminals determines that there is no paging destined for the mobile terminal itself, and makes a transition to reception of MBMS-related information or makes a transition to a DRX operation if there is no necessity to receive any MBMS-related information. To which group each of the mobile terminals belongs can be determined by using a predetermined determining method, or can be informed, as broadcast information, from either a serving cell for unicast service or an MBMS dedicated cell to the mobile terminal via an upper layer.

In the above-mentioned example, the paging signal destined for each of the mobile terminals is allocated to a control information element unit having a size corresponding to the size of the physical area onto which the paging signal is to be mapped. As an alternative, the paging signal destined for each of the mobile terminals can be allocated to a transport block unit. In the case in which the paging signal destined for each of the mobile terminals is allocated to a transport block unit, the physical resource to which the paging signal is allocated can be increased or decreased according to the amount of information, and the allocation to the physical area can be carried out with flexibility.

Furthermore, in the above-mentioned example, the base station carries out the process 1 of multiplying the paging signal destined for each of the mobile terminals by an identification code specific to this mobile terminal. The base station can alternatively use another processing method of adding the paging signal destined for each of the mobile terminals and an identification number specific to this mobile terminal. In this case, each of the mobile terminals receives the physical area for paging signal, carries out demodulation and descrambling using an MBSFN-area-specific scrambling code, and divides the result of the demodulation and descrambling into parts each corresponding to an information element unit, and performs a process including decoding on each of the divided parts each corresponding to an information element unit. Each of the mobile terminals then determines whether the identification number specific to the mobile terminal itself exists in the information on which the mobile terminal itself has performed the process including decoding to detect the paging signal destined therefor.

Furthermore, when mapping the paging signals onto the PMCH, in order to distinguish this PMCH from other information, e.g., an MCCH and an MTCH, the base station can multiply each of them by a specific identifier (ID) different according its information type. Because an identifier specific to each information type is used in MBSFN subframes which are transmitted via a multi-cell transmission scheme, unlike in the case of unicast communications, it is necessary to transmit an identical specific identifier from a plurality of cells each of which carries out multi-cell transmission. For example, an identifier specific to each identical information type is used in each MBSFN area. As an example, an MBMS dedicated cell multiplies paging signals by an identifier for paging signals and transmits them using the PMCH. A mobile terminal which needs to receive a paging signal, among mobile terminals being served by the MBMS dedicated cell, carries out blind detection by using the identifier for paging signals. As a result, there can be provided an advantage of enabling such a mobile terminal to receive required information when the mobile terminal requires the information. Accordingly, there can be provided an advantage of reducing the power consumption of the mobile terminal. There can be provided a further advantage of preventing a control delay time from occurring in the mobile terminal. The identifier different for each information type can be predetermined, or can be broadcast via broadcast information from a serving cell. As an alternative, the identifier different for each information type can be broadcast from an MBMS dedicated cell. Furthermore, because each of the mobile terminals becomes able to carry out blind detection when the paging signal is multiplied by or added to a mobile-terminal-specific identifier, it becomes unnecessary to fix the physical area onto which the paging signal destined for each of the mobile terminals is mapped in advance. Therefore, the mapping can be carried out with flexibility, and there is provided an advantage of improving the use efficiency of the physical resources.

Figure 34:
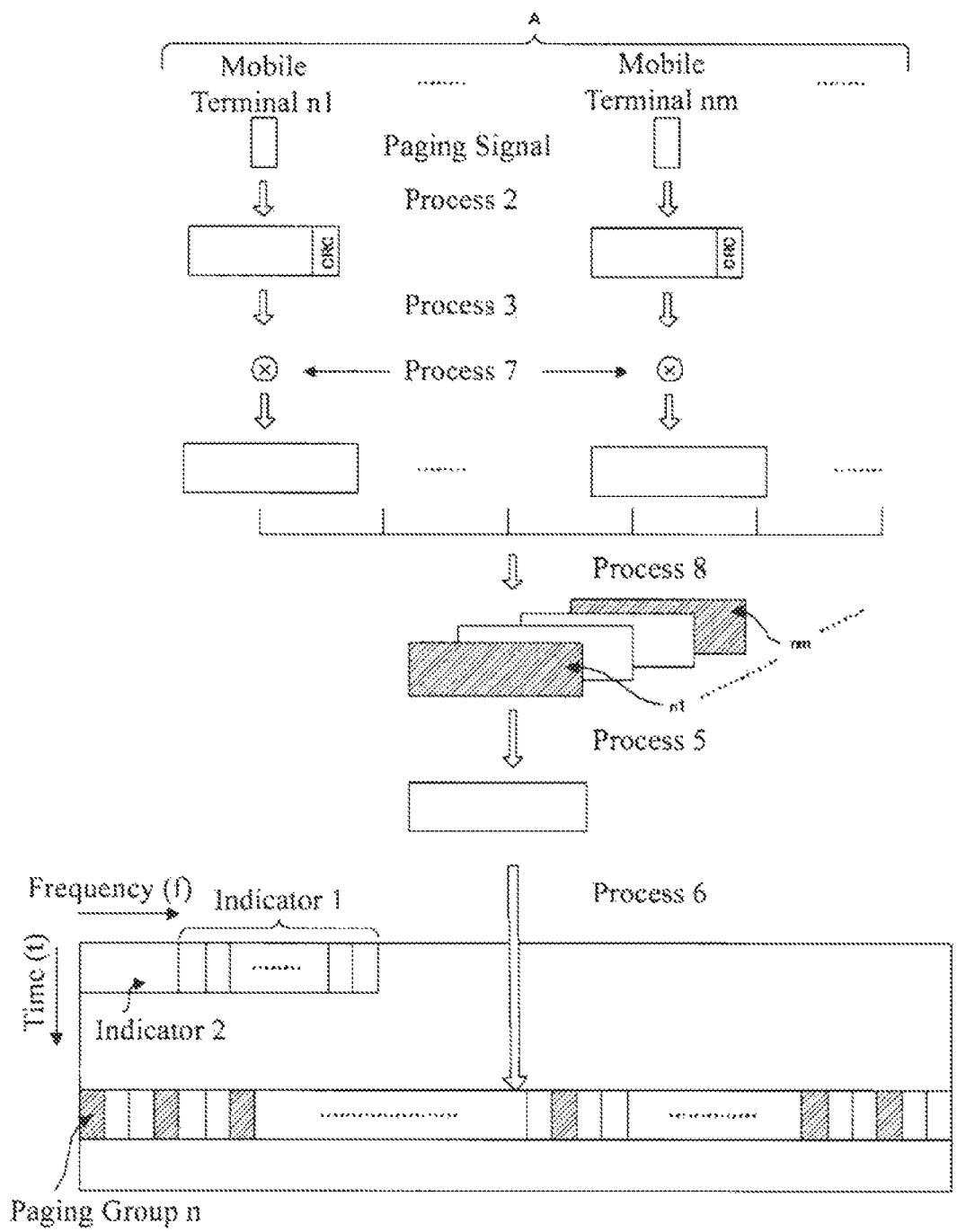
FIG. 34 is an explanatory drawing showing an example of the method of mapping a paging signal onto a physical area on a physical multicast channel (PMCH) onto which the paging signal is to be mapped.

Another example of the method of mapping paging signals onto the physical area on the PMCH onto which the paging signals are to be mapped is shown in FIG. 34. In FIG. 34, the same reference numerals as those in FIG. 33 denote the same processes or like processes. Paging signals to mobile terminals n1, n2, and so on for each of which an incoming call is occurring, among mobile terminals belonging to a paging group n, are mapped onto a physical area corresponding to this group n. A base station performs CRC (Cyclic Redundancy Check) addition on the paging signal destined for each of the mobile terminals (process 2), and carries out a process including encoding and rate matching (process 3). The result of these processes performed on the paging signal is multiplied by an identification code (number) specific to the above-mentioned mobile terminal (process 7). This mobile-terminal-specific identification code is a scrambling code having orthogonality which is established among the results of the processes by the scrambling codes of mobile terminals. The base station carries out multiplexing of the results of the processes by the scrambling codes, the number of the multiplexed results of the processes by the scrambling codes being equal to the number of mobile terminals for each of which an incoming call is occurring (process 8). The base station then performs a scrambling process using an MBSFN-area-specific scrambling code, a modulation process, etc. on the result of the multiplexing (process 5). The modulation process can be specific to the MBSFN area. The result of carrying out these processes is mapped onto the physical area corresponding to the paging group n (process 6). In this case, the base station sets "1" to the paging signal presence or absence indicator (indicator 1) of the paging group n, and then maps it onto a physical area corresponding to the paging group n of the paging signal presence or absence indicator. The physical area corresponding to the paging group n can be predetermined, or can be informed, as broadcast information, from either a unicast side serving cell or an MBMS dedicated cell to the base station.

Each of the mobile terminals receives the paging signal presence or absence indicator of the paging group to which the mobile terminal itself belongs, and, when the paging signal presence or absence indicator has a value of "1", receives the physical area for paging signal corresponding to this paging group. Each of the mobile terminals receives the physical area for paging signal, and carries out demodulation and descrambling using the MBSFN-area-specific scrambling code. Each of the mobile terminals carries out blind detection of the paging signal destined for the mobile terminal itself by carrying out an operation of calculating a correlation with the identification number specific to the mobile terminal itself. When the result of the correlation operation is larger than a certain threshold, each of the mobile terminals determines that there is paging destined for the mobile terminal itself, and starts an operation of receiving a paging with the decoded paging signal. In contrast, when the result of the correlation operation is equal to or smaller than the certain threshold, each of the mobile terminals determines that there is no paging destined for the mobile terminal itself, and makes a transition to reception of MBMS-related information or makes a transition to a DRX operation if there is no necessity to receive any MBMS-related information. To which group each of the mobile terminals belongs can be determined by using a predetermined determining method, or can be informed, as broadcast information, from either a serving cell for unicast service or an MBMS dedicated cell to the mobile terminal itself via an upper layer. Instead of the paging signals described in FIGS. 33 and 34, a transport channel onto which the paging signals are mapped can be provided. This method can also be applied to the subsequent embodiments. What is necessary is to use information on which the paging signals are carried, the information being paging-related information which each mobile terminal requires when receiving a paging.

Some methods of mapping paging signals onto an area on the PMCH on which the paging signals are to be mapped are disposed, though the mapping can be alternatively performed in such a way that the above-mentioned area onto which the paging signals are to be mapped is an arbitrary predetermined area, a localized area (a physical area continuous on the frequency axis), or distributed areas (physical areas distributed on the frequency axis).

In the above-mentioned example, the base station is configured in such a way as to multiply the paging signal destined for each mobile terminal by a mobile-terminal-specific identification number or a scrambling code. Because the base station is configured in this way, when the amount of information of the paging signal is the same at each of the mobile terminals, it becomes able to equalize the sizes of the areas of the information element units to be allocated by making the process including encoding and rate matching be common among the mobile terminals. Therefore, because the sizes of the areas of the information element units on which each mobile terminal performs blind detection are limited to a single one, the number of times that blind detection is carried out can be reduced and the time required for blind detection can also be shortened. Therefore, there is provided an advantage of accomplishing reduction in the circuit configuration of each mobile terminal, reduction in the power consumption of each mobile terminal, and reduction in the control delay of each mobile terminal.

By multiplying the paging signal destined for each of the mobile terminals by the mobile-terminal-specific identification number or the scrambling code, and then mapping it onto the area of the PMCH onto which the paging signal is mapped for each paging group, as mentioned above, the necessity for each of the mobile terminals to receive all of the area for paging signals can be eliminated, and each of the mobile terminals has only to receive only a required area, i.e., a physical area corresponding to the group to which the mobile terminal itself belongs. Therefore, the length of time required for each of the mobile terminals to detect the paging signal destined therefor can be shortened. Furthermore, because each of the mobile terminals does not have to receive the physical area corresponding to any other group to which the mobile terminal itself does not belong, the power for receiving of each of the mobile terminals can be reduced. In addition, by using the paging signal presence or absence indicator corresponding to each group, also when there are many mobile terminals, the paging signal presence or absence indicators can be provided with a small amount of physical resources. Furthermore, each of the mobile terminals has only to receive an area dedicated to paging signals as needed.

Therefore, while the power for receiving of each of the mobile terminals can be reduced, the control delay can also be reduced because each of the mobile terminals can make a transition to the next operation immediately when it does not have to receive the paging signal. As a result, because each of the mobile terminals becomes able to carry out blind detection (Blind Detection) of whether or not it is information destined for the mobile terminal itself by using the identification code specific to the mobile terminal or the scrambling code, it becomes unnecessary to fix the physical area onto which the paging signal destined for each of the mobile terminals is mapped in advance. Therefore, there is no necessity to provide a physical area used for paging signals destined for all the mobile terminals, and a physical area which is large enough to map paging signals destined for a certain number of mobile terminals for each of which an incoming call is predicted to actually occur has only to be provided. By using this method, it becomes able to use the limited amount of physical resources effectively. Furthermore, by using the above-mentioned method, the mobile communication system can flexibly deal with even a case in which the number of mobile terminals for each of which an incoming call is occurring becomes larger than a predicted number through scheduling in a base station. For example, the mobile communication system can transmit a paging signal destined for a mobile terminal receiving anew incoming call on the PMCH onto which the next MCCH is mapped.

In the above-mentioned example, the base station multiplies the paging signal destined for each mobile terminal by a mobile-terminal-specific identification number. As an alternative, the base station can use a method of multiplying a CRC, instead of the paging signal, by a mobile-terminal-specific identification number. The method of multiplying a CRC by a mobile-terminal-specific identification number is effective for a case in which the amount of information of the paging signal destined for each mobile terminal differs. By using the method of carrying paging signals on the PMCH which is disclosed above, the mobile communication system can transmit the paging signals destined for all mobile terminals each of which is receiving or trying to receive an MBMS service from an MBMS dedicated cell to make it possible for each of the above-mentioned mobile terminals to receive the paging signal from the MBMS dedicated cell.

Hereafter, the structure of a channel onto which paging signals in a frequency layer dedicated to MBMS transmission are mapped will be explained with reference to an example shown in FIGS. 32(c) and 33. An MCE, in step ST1779, carries out scheduling of the paging signal destined for a mobile terminal in question. More specifically, the MCE determines to the how-manyth one of information elements mapped onto the physical area allocated to the number of the paging group of the mobile terminal in question determined in step ST1778 an identifier of the mobile terminal in question is allocated. By making the MCE carry out this scheduling, an identifier of the mobile terminal in question is transmitted from the same physical resources of base stations included in the MBSFN area. As a result, there can be provided an advantage of enabling each mobile terminal to receive a paging signal benefiting from an SFN gain by receiving the PMCH which is transmitted via a multi-cell transmission scheme in the MBSFN area. The MCE, in step ST1780, transmits a paging request for the mobile terminal in question to the base stations in the MBSFN area. The MCE transmits the paging request for the mobile terminal in question to the base stations included in the TA(MBMS). The MCE transmits the paging request for the mobile terminal in question to an MBMS dedicated cell included in the TA(MBMS). As an example of parameters included in the paging request, an identifier (UE-ID, IMSI, S-TMSI, or the like) of the mobile terminal, the result of the scheduling of the paging signal carried out in step ST1779 (concretely, an SFN, an MBSFN subframe number, and an information element number), etc. can be considered. Each of the base stations in the MBSFN area, in step ST1781, receives the paging request from the MCE.

Instead of disposing only an IF between MME and MCE between the MME 103 and the MCE 801, as shown in FIG. 10, an MME-MBMS GW interface can also be disposed between the MME 103 and an MBMS GW 802 (in more detail, an MBMS CP 802-1). Furthermore, the processes of steps ST1776 to ST1780, which are carried out by the MCE, can be carried out by the MBMS GW on behalf of the MCE. In this variant, the same advantages as those provided by the present invention are provided.

Each of the base stations in the MBSFN area, in step ST1782, determines the paging group of the mobile terminal in question. As an example of the determining method, there is a method of determining the paging group of the mobile terminal in question by using the number $K_{MBMS}$ of paging groups of the base station itself (the MBSFN area to which the base stations belong), and the received paging request. When determining the paging group of the mobile terminal in question, each of the base stations uses the same computation expression as that used by the mobile terminal side (paging group=IMSI mod $K_{MBMS}$). When the MCE, in step ST1780, also informs the paging group of the mobile terminal in question, step ST1782 can be omitted. As a result, there can be provided an advantage of reducing the control load on each base station in the MBSFN area, and so on. In contrast, in accordance with the method of, in step ST1782, determining the paging group in each base station in the MBSFN area without informing the paging group of the mobile terminal in question in step ST1780, there can be provided an advantage of being able to reduce the amount of information notified from the MCE to each base station in the MBSFN area, and making effective use of the resources. Each of the base stations in the MBSFN area, in step ST1783, transmits the PMCH on which the paging signal is mapped by using the identifier of the mobile terminal in question received in step ST1781, the result of the scheduling of the paging signal, the paging group of the mobile terminal in question determined in step ST1782, etc. More specifically, each of the base stations maps the UE-ID of the mobile terminal in question onto a specified information element number of the corresponding group of the paging-related PMCH, and sets an indicator showing the presence or absence of a paging-related change in the corresponding group to "presence of change". The previously-explained methods can be used as the mapping method of mapping the UE-ID to the paging-related area in the PMCH at that time and a concrete mapping method of mapping the UE-ID to a physical channel, etc.

The mobile terminal, in step ST1784, receives a paging-related modified or unmodified indicator in the PMCH, the indicator corresponding to the paging group determined in step ST1735 of the mobile terminal itself. The mobile terminal, in step ST1785, determines whether or not there is a change in the paging-related modified or unmodified indicator. When there is no change in the paging-related modified or unmodified indicator, the mobile terminal makes a transition to step ST1788. In contrast, when there is a change in the paging-related modified or unmodified indicator, the mobile terminal makes a transition to step ST1786. The mobile terminal then, in step ST1786, receives and decodes the physical area onto which the paging-related information of the paging group of the mobile terminal itself is mapped. At that time, the mobile terminal carries out blind detection by carrying out an operation of calculating a correlation with the mobile-terminal-specific identification code. The mobile terminal, in step ST1787, determines whether it has detected the identifier of the mobile terminal itself through the blind detection carried out in step ST1786. When the mobile terminal has not detected the identifier of the mobile terminal itself, the mobile terminal makes a transition to step ST1788. In contrast, when the mobile terminal has detected the identifier of the mobile terminal itself, the mobile terminal makes a transition to step ST1814. The processes explained in above-mentioned steps ST1773 to ST1787 are an example of the "discontinuous reception configuration at the time of MBMS reception" described in Embodiment 1. As a result, there can be disclosed a method of transmitting a paging signal to a mobile terminal currently receiving an MBMS service in a frequency layer dedicated to MBMS transmission, and a mobile communication system which enables the method to be implemented therein, which are a challenge of the present invention. Therefore, there is provided an advantage of enabling even a mobile terminal currently receiving an MBMS service in a frequency layer dedicated to MBMS transmission to receive a paging signal.

Next, the "MTCH reception", which is described in Embodiment 1 with reference to FIG. 17, will be explained more concretely with reference to FIGS. 22 and 23. The mobile terminal, in step ST1788, determines whether it is continuously receiving an MBMS service in the MBSFN area in question. When the mobile terminal is not continuously receiving an MBMS service in the MBSFN area, the mobile terminal makes a transition to step ST1792. In contrast, when the mobile terminal is continuously receiving an MBMS service in the MBSFN area, the mobile terminal makes a transition to step ST1789. The mobile terminal, in step ST1789, receives an MBMS-related modified or unmodified indicator in the PMCH. The mobile terminal, in step ST1790, determines whether or not there is a change in the MBMS-related modified or unmodified indicator. When there is no change in the MBMS-related modified or unmodified indicator, the mobile terminal makes a transition to step ST1791. In contrast, when there is a change in the MBMS-related modified or unmodified indicator, the mobile terminal makes a transition to step ST1792. Because there is no change in the MCCH at the receiving time of receiving the MCCH, the mobile terminal, in step ST1791, does not carry out reception and/or decoding of the MBMS-related information in the MCCH. The mobile terminal carries out reception and decoding of the MTCH without updating the control information (MCCH). The mobile terminal, in step ST1792, carries out reception and decoding of the MBMS-related information in the MCCH to update the control information. The mobile terminal, in step ST1793, carries out reception and decoding of the MTCH according to the control information received in step ST1792.

Figure 23:
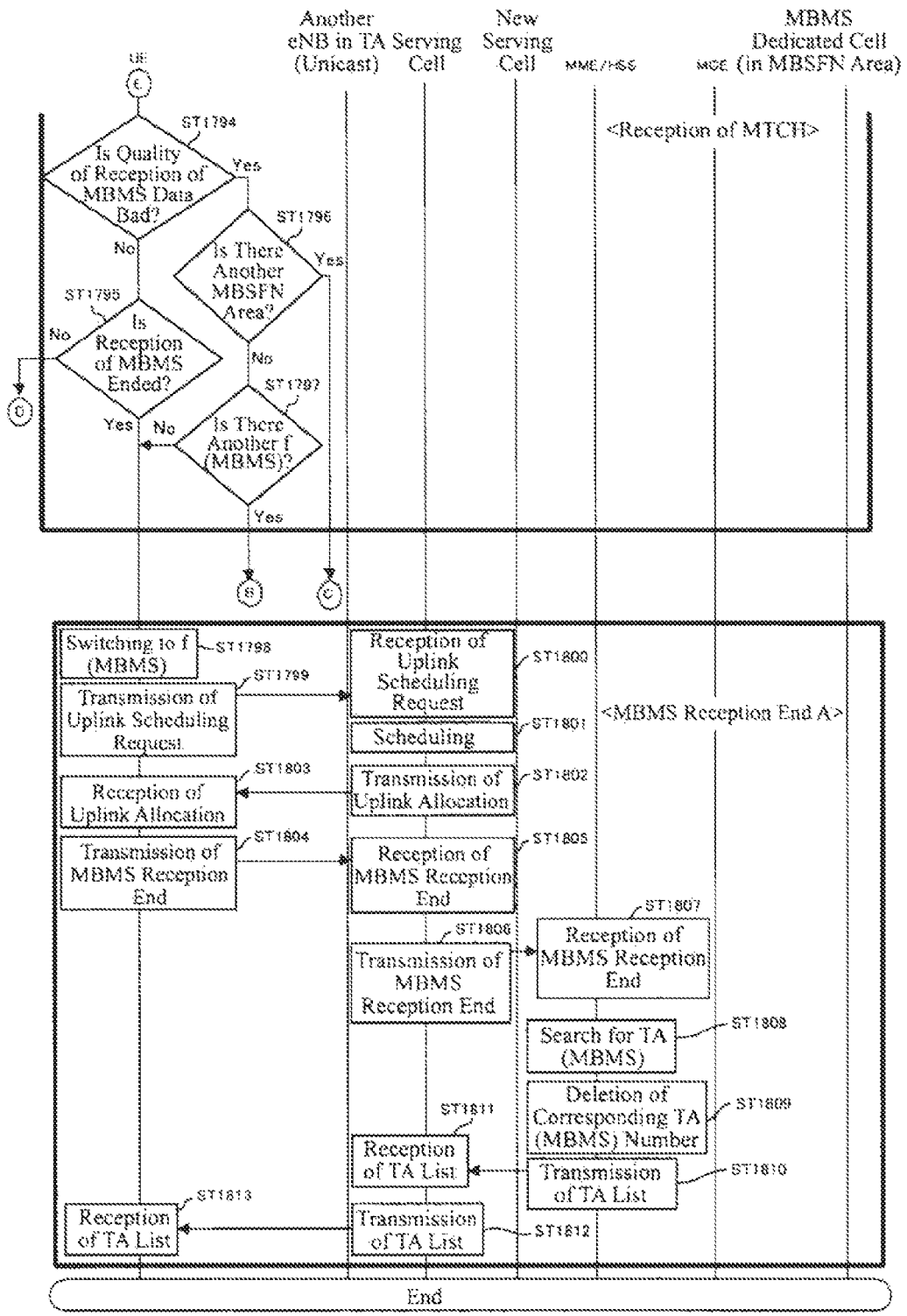
FIG. 23 is a flow chart showing an MTCH receiving process and an MBMS reception end process.

The mobile terminal, in step ST1794 of FIG. 23, measures the quality of reception of the MBMS service which the mobile terminal is receiving. The mobile terminal receives a reference signal (RS) with the radio resources of the MBSFN area in question, and measures the received power (RSRP). The mobile terminal then determines whether or not the received power is equal to or higher than a threshold determined statically or semi-statically. The fact that the received power is equal to or higher than the above-mentioned threshold shows that the mobile terminal has high sensitivity enough to receive the MBMS service, whereas the fact that the received power is lower than the threshold shows that the mobile terminal does not have high sensitivity enough to receive the MBMS service. When the received power is equal to or higher than the above-mentioned threshold, the mobile terminal makes a transition to step ST1795, whereas when the received power is lower than the above-mentioned threshold, the mobile terminal makes a transition to step ST1796. Instead of receiving the reference signal and measuring the received power in step 1794, the mobile terminal can actually receive and decode the MBMS service (an MTCH and/or an MCCH) of the MBSFN area in question. In this case, the user can determine whether the mobile terminal provides receive sensitivity which he or she can permit by hearing or viewing decoded data. When the mobile terminal provides receive sensitivity which he or she can permit, the mobile terminal makes a transition to step ST1795, whereas when the mobile terminal does not provide receive sensitivity which he or she can permit, the mobile terminal makes a transition to step ST1796. Because the permissible receive sensitivity has differences among individuals, there can be provided an advantage of making mobile terminals be further suited for users. The mobile terminal, in step ST1795, checks to see the user's intention. When the user desires to succeedingly receive the MBMS service which the mobile terminal is receiving, the mobile terminal makes a transition to step ST1753. In contrast, when the user desires to end the reception of the MBMS service which the mobile terminal is receiving, the mobile terminal makes a transition to step ST1798. The mobile terminal, in step ST1796, determines whether there exists another MBMS area in which the mobile terminal can receive the MBMS service within the same frequency band (f(MBMS)). This step ST1796 is effective particularly when an MBSFN area covering other MBSFN areas exists. When another MBMS area receivable within the same frequency band exists, the mobile terminal returns to step ST1730 and repeats the process. In contrast, when any other MBMS area receivable within the same frequency band does not exist, the mobile terminal makes a transition to step ST1797.

However, after that, unless any other receivable MBSFN area which the user desires is found, the mobile terminal performs an "MBMS reception end A" process in step ST1798 and subsequent steps. Accordingly, the network side can know that the mobile terminal in question ends the reception of the MBMS service in the frequency layer dedicated to MBMS transmission. Therefore, the network side can discontinue the configuration of transmitting the paging signal to the mobile terminal in question in the frequency layer dedicated to MBMS transmission. As a result, the mobile communication system becomes able to discontinue the transmission of the paging signal to the mobile terminal in question from the frequency layer dedicated to MBMS transmission which the mobile terminal in question does not receive. Therefore, there is provided an advantage of making a effective use of the radio resources. The mobile terminal, in step 1797, determines whether or not there is another frequency in the frequency list of the receivable MBSFN synchronization area received in step ST1708. When there is another frequency in the frequency list, the mobile terminal returns to step ST1722, and switches the synthesizer to a new frequency (f2(MBMS)) and repeats the process. In contrast, when there is no other frequency in the frequency list, the mobile terminal makes a transition to step ST1798.

Next, the "MBMS reception end A" process described in Embodiment 1 with reference to FIG. 23 will be explained more concretely. The mobile terminal, in step ST1798, moves to an MBMS/Unicast-mixed cell by changing the frequency set to the frequency converting unit 1107 thereof to change the center frequency to f(unicast). Because the explanation of steps ST1799 to ST1803 is the same as that of steps ST1737 to ST1741, the explanation of steps ST1799 to ST1803 will be omitted. The mobile terminal, in step ST1804, transmits an "MBMS reception end" notification to the serving cell according to UL (Uplink) allocation received in step ST1803. As an example of the parameters included in the "MBMS reception end" notification, an identifier (UE-ID, IMSI, S-TMSI, or the like) of the mobile terminal, the frequency (f(MBMS)) at which the mobile terminal ends the reception of the MBMS service, and the MBSFN area number (ID) are included.

Furthermore, the "MBMS reception end" notification of step ST1804 can be made like in the case of an "attach request" shown in ST1710, or as a type of "attach request". As an alternative, the "MBMS reception end" notification can be made like in the case of "tracking area update (Tracking Area Update: TAU)", or as a type of "tracking area update". Parameters to be notified in this case includes an identifier (UE-ID, IMSI, S-TMSI, or the like) of the mobile terminal, the frequency (f(MBMS)) at which the mobile terminal ends the reception of the MBMS service, and the MBSFN area number (ID), like in the above-mentioned case. As a result, the network side is enabled to know that the mobile terminal has ended the reception of the MBMS in the MBMS dedicated cell without adding any new message. Therefore, there can be provided an advantage of being able to avoid the complexity of the mobile communication system.

Information showing that the "tracking area update" includes the "MBMS reception end" notification can be included in the "tracking area update". As a concrete method, the "MBMS reception end" notification can be added to the type (TYPE) information of TAU. The type information can be expressed as a numerical value. A 1-bit indicator showing whether or not to aim to make the "MBMS reception end" notification is formed on the TAU request message. Information showing that the "attach request" message includes the "MBMS reception end" notification can be included in the "attach request" message. As a concrete method, the "MBMS reception end" notification can be added to the type information of the attach request. The type information can be expressed as a numerical value. A 1-bit indicator showing whether or not to aim to make the "MBMS reception end" notification can be formed on the attach request message. As a result, in the former case, the conventional "tracking area update" can be distinguished from the "tracking area update" used in order to inform the "MBMS reception end". Furthermore, in the latter case, the conventional "attach request" can be distinguished from the "attach request" used in order to inform the "MBMS reception end". As a result, there can be provided an advantage of preventing a control delay time from occurring in the mobile communication system.

The serving cell, in step ST1805, receives the MBMS reception end notification from the mobile terminal. The network side, in step ST1805, can know that the mobile terminal in question has ended the reception of the MBMS service in the frequency layer dedicated to MBMS transmission without adding any uplink channel to the MBMS dedicated cell. As a result, there is provided an advantage of enabling the general configuration in which the network side informs paging signals to be changed into the configuration of carrying out discontinuous reception at the time of MBMS reception. The serving cell, in step ST1806, transmits the MBMS reception end notification to the MME. The MME, in step ST1807, receives the MBMS reception end notification from the serving cell.

The MME, in step ST1808, searches for the TA(MBMS) at which to end the MBMS reception of the mobile terminal in question. Because an example of a relationship between parameters included in the MBMS reception end notification and the TA(MBMS) is the same as that shown in step ST1747, the explanation of the example will be omitted. The MME, in step ST1809, deletes the TA(MBMS) which it has acquired, as the result of the search of step ST1808, from the tracking area list of the mobile terminal in question. The MME, in step ST1810, transmits Ack which is a response signal to the serving cell when receiving a signal informing the MBMS reception end sent thereto via the serving cell. As an example of parameters included in this response signal Ack, the tracking area list of the mobile terminals in question can be considered. The serving cell, in step ST1811, receives the response signal Ack transmitted from the MME. The serving cell, in step ST1812, transmits the received response signal Ack to the mobile terminal. The mobile terminal, in step ST1813, receives the response signal Ack sent thereto from the MME via the serving cell.

Next, "unicast side discontinuous reception" described in Embodiment 1 will be explained more concretely with reference to FIG. 24. The MME in which paging has occurred, in step ST1814, checks to see the tracking area list of the mobile terminals in question on the basis of an identifier (UE-ID, IMSI, S-TMSI, or the like) of the mobile terminal in question for which the paging is destined. The MME then searches through the tracking area list of the mobile terminals in question for the TA(Unicast). As an example, the MME searches through the tracking area list of the mobile terminal in question, such as the list shown in FIG. 31(*a*), on the basis of the UE-ID of the mobile terminal. When the mobile terminal in question is the UE#1 of FIG. 31(*a*), TA(Unicast)s #1 and #2 are included in the tracking area list. Next, the MME searches through the list as shown in FIG. 31(*b*) for the identifiers (cell IDs) of base stations included in the TA (Unicast). When the mobile terminal in question is the UE#1 of FIG. 31(*a*), the cell IDs included in the tracking area list of the mobile terminal in question are the ones of 1, 2, 3, 4, 5, 23, 24, and 25. The MME transmits a paging request to the base stations (including the serving cell) included in the tracking area list of the mobile terminal in question. As an example of parameters included in the paging request, an identifier (UE-ID, IMSI, S-TMSI, or the like) of the mobile terminal, etc. are included. Each of the base stations (including the serving cell) included in the tracking area list (TA(Unicast)) of the mobile terminal in question, in step ST1815, receives the paging request.

Hereafter, a challenge of the present invention will be explained. Also for a mobile terminal being in an idle state (Idle State) in an MBMS/Unicast-mixed cell, no details of any method of notifying a paging message are established. Nonpatent reference 1 discloses that a PCH is mapped onto a PDSCH or a PDCCH. Nonpatent reference 1 also discloses that a paging group uses an L1/L2 signaling channel (PDCCH) and that a precise identifier (UE-ID) of a mobile terminal can be found on a PCH. In contrast, nonpatent reference 1 does not disclose how mobile terminals are divided into paging groups and how a PCH is transmitted to each of the paging groups. Furthermore, nonpatent reference 1 does not disclose how a mobile terminal carries out discontinuous reception in an idle state. It is an object of the present invention to disclose the details of a sending method of sending a paging signal to a mobile terminal in an idle state in a unicast and/or mixed frequency layer, and a mobile communication system which enables the method to be implemented therein.

Therefore, an example of the sending method of sending a paging signal will be disclosed hereafter. Mobile terminals are divided into paging groups. In accordance with a conventional technology (W-CDMA system), the number of S-CCPCHs (Secondary Common Control CHannels) (the number of channelization codes) onto which a PCH is mapped is defined as the number of the groups. However, because an LTE system is not based on a code division multiplexing (CDM) method, an idea of using the number of channelization codes cannot be applied to the present invention. Nonpatent reference 1 provided by the current 3GPP discloses that a paging group uses an L1/L2 signaling channel (PDCCH) and that a precise identifier (UE-ID) of a mobile terminal can be found on a PCH. However, no concrete example is disclosed. $K_{Unicast}$ in a computation expression for determining a paging group (IMSI mod $K_{Unicast}$) is the number of paging groups in an MBMS/Unicast-mixed cell. In an example of the value of K, the L1/L2 signaling channel (PDCCH) is mapped for each subframe. Ten subframes exist in one radio frame. Therefore, the number of paging groups is set to ten. More specifically, each mobile terminal can know onto which subframe in one radio frame the paging information about the paging group to which the mobile terminal itself belongs is mapped from the paging group. As to onto which radio frame the paging information about the group to which each mobile terminal belongs is mapped, a conventional technology (W-CDMA) can be followed. A concrete computation expression is given by "Paging Occasion=(IMSI div K) mod (the discontinuous reception cycle length in a unicast/mixed frequency layer)+n×(the discontinuous reception cycle length in a unicast/mixed frequency layer), where n: 0, 1, 2, . . . , and a maximum of SFN". A concrete computation expression is alternatively given by "Paging Occasion= (IMSI div $K_{Unicast}$) mod (the discontinuous reception cycle length in a unicast/mixed frequency layer)+n×(the discontinuous reception cycle length in a unicast/mixed frequency layer), where n: 0, 1, 2, . . . , and where Paging Occasion a maximum of SFN". SFN is an integer ranging from 0 to the maximum of SFN.

Next, it is disclosed in nonpatent reference 1 provided by the current 3GPP that a precise identifier (UE-ID) of a mobile terminal can be found on a PCH. However, no concrete example is disclosed. In a concrete example of a mapping method of mapping paging information to a PCH, the PCH consists of identification information about a mobile terminal, or is configured in such a way to show a correlation when multiplied by identification information about a mobile terminal. The PCH is mapped onto CCEs on the L1/L2 signaling channel. Furthermore, it is assumed that allocation of downlink radio resources of a control channel which the mobile terminal should receive the next time is included in the PCH. As a result, there can be provided an advantage of eliminating the necessity to carry out downlink allocation for the second time, and being able to reduce the control delay. As an alternative, a method of not sending allocation of downlink radio resources of a control channel which the mobile terminal should receive the next time using the PCH can be used. As this method, there can be considered a method of transmitting a paging indicator on an L1/L2 signaling channel, and making a mobile terminal which carries out blind detection of the paging indicator destined for itself to receive the paging indicator transmit an uplink RACH in order to make a request of a base station for resource allocation. The PCH in which the precise identifier (UE-ID) of a mobile terminal is included can be transmitted on a PDSCH. In this case, information about allocation of radio resources of the PDSCH onto which this PCH which the mobile terminal should receive is mapped, as a paging indicator, onto the L1/L2 signaling channel. In a case in which the paging indicator is configured in such a way to show a correlation when multiplied by the identification information about the mobile terminal, the mobile terminal becomes able to determine whether or not the paging indicator is destined for itself. The mobile terminal which has received the paging indicator destined for itself receives the identification information included in the PCH on the PDSCH on the basis of the allocation information to check to see whether it shows the mobile terminal itself. In the case in which the method is configured in this way, the mobile terminal becomes able to certainly detect whether or not the paging signal is destined for the mobile terminal itself, and can prevent itself from performing an erroneous reception operation.

Each of the base stations (including the serving cell) included in the tracking area list (TA(Unicast)) of the mobile terminal in question, in step ST1816, makes preparations for unicast side discontinuous reception. Concretely, each of the base stations determines a paging group and a paging occasion from the identifier of the mobile terminal in question which each of the base stations receives in step ST1815. An example of a computation expression for determining them is as mentioned above. Each of the base stations (including the serving cell) included in the tracking area list (TA (Unicast)) of the mobile terminal in question, in step ST1817, maps the paging information about the mobile terminal in question onto the PCH according to the paging group and the paging occasion which each of the base stations determines in step ST1816. At this time, each of the base stations can map the paging information to any CCEs as long as these CCEs are included in the L1/L2 signaling channel in the subframe shown by the above-mentioned paging group in the radio frame shown by the above-mentioned paging occasion. As an alternative, each of the base stations can map the paging information onto CCEs which are predetermined to be allocated to the PCH. In a case in which CCEs are predetermined to be allocated to the PCH, because the number of times that the mobile terminal in question carries out blind detection is reduced, there can be provided an advantage of reducing the control delay. Each of the base stations (including the serving cell) included in the tracking area list (TA (Unicast)) of the mobile terminal in question, in step ST1818, transmits the PCH.

The mobile terminal, in step ST1819, moves to the unicast/mixed frequency layer by changing the frequency set to the frequency converting unit 1107 thereof to change the center frequency to f (unicast). The mobile terminal, in step ST1820, makes preparations for unicast side discontinuous reception. Concretely, the mobile terminal determines the paging group and the paging occasion from the identifier of the mobile terminal itself. A computation expression for determining them is the same as that for use in the network side as mentioned above. The mobile terminal, in step ST1821, carries out blind detection of the PCH on the L1/L2 signaling channel according to the paging group and the paging occasion which the mobile terminal determines in step ST1820. The mobile terminal uses the identifier of the mobile terminal itself for the blind detection. The mobile terminal multiplies each of the CCEs of the PCH by the identifier of the mobile terminal itself to acquire a correlation value. When the correlation value is equal to or larger than a threshold, the mobile terminal determines that there is a paging destined for the mobile terminal itself. The mobile terminal, in step ST1822, decodes the PCH to acquire the downlink allocation of the next control channel. According to the allocation, the mobile terminal receives the control information.

In the current 3GPP, it is determined that in a mixed cell, anything other than one or two leading OFDM symbols in each subframe must not be used for unicast transmission in an MBSFN frame (subframe). In other words, anything other than one or two leading OFDM symbols is a resource dedicated to MBMS transmission. An MBSFN frame is a subframe which is not allocated to any of subframes #0 and #5 because an SCH is mapped onto them. In this case, the following problems occur. If the above-mentioned computation expression for determining a paging group and a paging occasion is used, there is a possibility that a paging signal occurs for each radio frame and for each subframe. Because the PCH uses the L1/L2 signaling channel, the PCH can be mapped even onto an MBSFN frame. On the other hand, in a case in which allocation of a downlink radio resource to the next control information using the PCH is carried out in an MBSFN frame, because the downlink radio resource in the same subframe is used exclusively for MBMS transmission, there arises a problem that the control information cannot be allocated to the same subframe. As a solution of the problem, allocation of a downlink radio resource to the next control information using the PCH is aimed at a radio frame other than the subsequent MBSFN frames. As another solution of the problem, a method of allocating the paging signal to one or more subframes excluding subframes which can be MBSFN subframes is used. For example, the number of paging groups is set to be equal to or smaller than the number of subframes excluding subframes which can be MBSFN subframes in one radio frame. As a result, the paging signal does not have to be allocated to an MBSFN subframe. As a concrete example, the number of paging groups is set to 2, and a computation expression for determining the paging group is given by "IMSI mod 2", as will be mentioned below. In a concrete example of group allocation, when the paging group=0, a subframe #0 is allocated. Furthermore, when the paging group=1, a subframe #5 is allocated. As a result, because it becomes able to inform paging information by using only the subframe (#0 or #5) to which no MBSFN subframe is allocated, the above-mentioned problem that allocation of the next control information to a subframe which is the same as that to which the paging signal is allocated cannot be carried out can be solved.

Furthermore, as another solution of the problem, there is a method of not sending allocation of a downlink radio resource to the control channel, which the mobile terminal should receive the next time, by using the PCH. In this method, a paging indicator is transmitted on the L1/L2 signaling channel, and the mobile terminal which has carried out blind detection of the paging indicator destined for itself to receive the paging indicator transmits an uplink RACH to a base station in order to make a request of the base station for resource allocation. Because the method is configured in this way, it is not necessary to carry resource allocation information on the PDSCH for communications after the paging, and therefore it becomes able to transmit and receive the paging signal without any problems even if an MBSFN subframe exists. In this case, the paging indicator is configured in such a way to show a correlation when multiplied by the identification information about the mobile terminal so that the mobile terminal can be identified by using only the paging indicator. In an MBSFN subframe, what is necessary is just to carry the paging indicator on an area which is allocated for unicast, i.e., one or two leading OFDM symbol areas. Also in this case, the paging indicator is similarly configured in such a way to show a correlation when multiplied by the identification information about the mobile terminal so that the mobile terminal can be identified by using only the paging indicator. The mobile terminal side can receive a radio frame or a subframe onto which the paging indicator of the group to which the mobile terminal belongs is mapped, the group being determined from the identification number specific to this mobile terminal, and to carry out blind detection by using the identification number specific to the mobile terminal itself.

As a concrete computation expression for determining a paging group and a paging occasion, the following equation can be used as mentioned above.

IMSI mod K, where K is the number of paging groups in the MBMS/Unicast-mixed cell.

Paging Occasion=(IMSI div K) mod (the discontinuous reception cycle length in a unicast/mixed frequency layer)+ n×(the discontinuous reception cycle length in a unicast/mixed frequency layer), where n: 0, 1, 2, . . . , and where Paging Occasion≤a maximum of SFN. SFN is an integer ranging from 0 to the maximum of SFN.

Because the method is configured in this way, also in the case of the MBMS/Unicast-mixed cell, the paging signal (the paging indicator) can be transmitted with an arbitrary radio frame or subframe regardless of whether or not there exists an MBSFN subframe.

Figure 24:
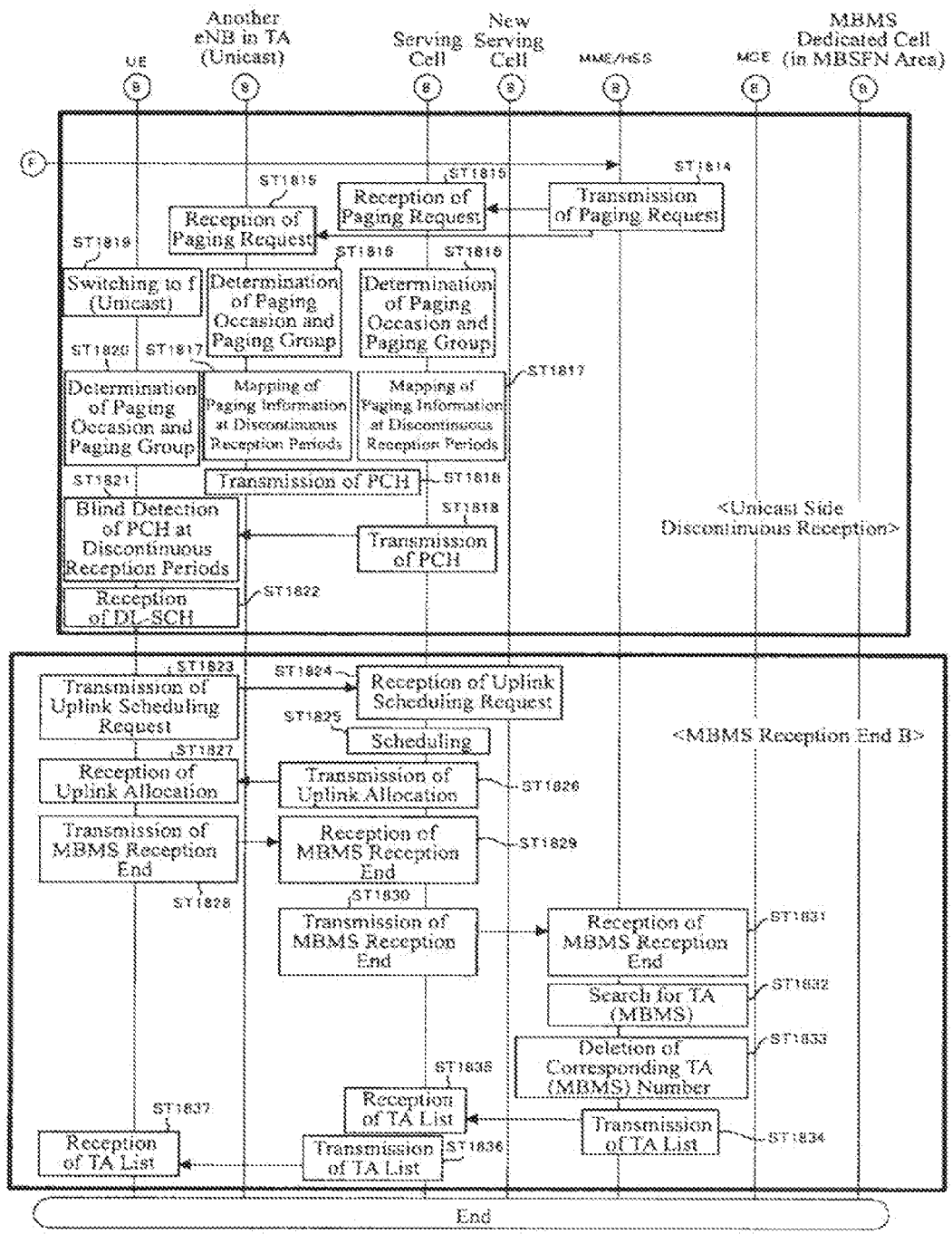
FIG. 24 is a flow chart showing a unicast side discontinuous reception process and an MBMS reception end process.

The details of an MBMS reception end B process are shown in FIG. 24. In FIG. 24, because an explanation of steps ST1823 to ST1837 is the same as that of steps ST1799 to ST1813, the explanation of steps ST1823 to ST1837 will be omitted. The difference is that a "response to paging" is included in step ST1828. Through this MBMS reception end B process, the network side can know that the mobile terminal in question has ended the reception of the MBMS service in the frequency layer dedicated to MBMS transmission without adding any uplink channel to the MBMS dedicated cell. As a result, there is provided an advantage of enabling the discontinuous reception configuration at the time of MBMS reception to be changed to the general configuration of transmitting paging signals.

Furthermore, the "MBMS reception end" notification of step ST1828 can be made like in the case of an "attach request" shown in ST1710, or as a type of "attach request". As an alternative, the "MBMS reception end" notification can be made like in the case of "tracking area update (Tracking Area Update: TAU)", or as a type of "tracking area update". Parameters to be notified in this case includes an identifier (UE-ID, IMSI, S-TMSI, or the like) of the mobile terminal, the frequency (f(MBMS)) at which the mobile terminal ends the reception of the MBMS service, the MBSFN area number (ID), and a response to the paging, like in the above-mentioned case. As a result, the network side is enabled to know that the mobile terminal has ended the reception of the MBMS in the MBMS dedicated cell without adding any new message. Therefore, there can be provided an advantage of being able to avoid the complexity of the mobile communication system. Information showing that the "tracking area update" includes the "MBMS reception end" notification can be included in the "tracking area update". As a concrete method, the "MBMS reception end" notification can be added to the type (TYPE) information of TAU. The type information can be expressed as a numerical value. A 1-bit indicator showing whether or not to aim to make the "MBMS reception end" notification is formed on the TAU request message. Information showing that the "attach request" message includes the "MBMS reception end" notification can be included in the "attach request" message. As a concrete method, the "MBMS reception end" notification can be added to the type information of the attach request. The type information can be expressed as a numerical value. A 1-bit indicator showing whether or not to aim to make the "MBMS reception end" notification is formed on the attach request message.

As a result, in the former case, the conventional "tracking area update" can be distinguished from the "tracking area update" used in order to inform the "MBMS reception end". Furthermore, in the latter case, the conventional "attach request" can be distinguished from the "attach request" used in order to inform the "MBMS reception end". As a result, there can be provided an advantage of preventing a control delay time from occurring in the mobile communication system. Furthermore, the "MBMS reception end notification+response to paging" of step ST1828 can be made like in the case of an "attach request" shown in ST1710, or as a type of "attach request". As an alternative, the "MBMS reception end notification+response to paging" can be made like in the case of "tracking area update (Tracking Area Update: TAU)", or as a type of "tracking area update". Parameters to be notified in this case includes an identifier (UE-ID, IMSI, S-TMSI, or the like) of the mobile terminal, the frequency (f(MBMS)) at which the mobile terminal ends the reception of the MBMS service, and the MBSFN area number (ID), like in the above-mentioned case. As a result, the network side is enabled to know that the mobile terminal has ended the reception of the MBMS in the MBMS dedicated cell without adding any new message. Therefore, there can be provided an advantage of being able to avoid the complexity of the mobile communication system.

Information showing that the "tracking area update" includes the "MBMS reception end notification+response to paging" can be included in the "tracking area update". As a concrete method, the "MBMS reception end notification+response to paging" can be added to the type (TYPE) information of TAU. The type information can be expressed as a numerical value. A 1-bit indicator showing whether or not to aim to make the "MBMS reception end notification+response to paging" is formed on the TAU request message. Information showing that the "attach request" message includes the "MBMS reception end notification+response to paging" can be included in the "attach request" message. As a concrete method, the "MBMS reception end notification+response to paging" can be added to the type information of the attach request. The type information can be expressed as a numerical value. A 1-bit indicator showing whether or not to aim to make the "MBMS reception end notification+response to paging" is formed on the attach request message. As a result, in the former case, the conventional "tracking area update" can be distinguished from the "tracking area update" used in order to inform the "MBMS reception end+response to paging". Furthermore, in the latter case, the conventional "attach request" can be distinguished from the "attach request" used in order to inform the "MBMS reception end+response to paging". As a result, there can be provided an advantage of preventing a control delay time from occurring in the mobile communication system.

In the above-mentioned example, the identifiers of the mobile terminal can include the following ones. In the mobile communication system, the mobile terminal identifiers can include a mobile terminal identifier which is used in the unicast/mixed frequency layer, and a mobile terminal identifier which is used in the frequency layer dedicated to MBSFN transmission. As examples of the mobile terminal identifier which is used in the unicast/mixed frequency layer, there can be considered UE-ID, IMSI, and S-TMSI which are conventionally used, and a mobile terminal identifier allocated for each cell. As an example of the mobile terminal identifier which is used in the frequency layer dedicated to MBSFN transmission, there can be considered an identifier which is allocated in common to a mobile terminal by base stations which carry out multi-cell transmission. As further examples, there can be considered a mobile terminal identifier which is newly disclosed in the present invention, and which is used (or allocated in common) within the TA(MBMS), the mobile terminal identifier being used for the mobile terminal in question, an identifier which is used (or allocated in common) in an MBSFN area in which the mobile terminal in question receives an MBMS service, the identifier being used for the mobile terminal in question, and the mobile terminal identifier which is used (or allocated in common) in an MBSFN synchronization area.

By newly disposing the mobile terminal identifier as mentioned above which is used in the frequency layer dedicated to MBSFN transmission, there can be provided the following advantages. In a case in which a conventional mobile terminal identifier allocated for each cell is used, because there is a possibility that an identifier allocated to a mobile terminal in question differs for each cell, it is impossible to carry out multi-cell transmission of information using the identifier. Therefore, it is impossible to perform SFN combining of information using a mobile terminal identifier allocated for each cell. Furthermore, in a case in which a conventional identifier IMSI or UE-ID is used, it is possible to carry out multi-cell transmission, but there is a problem in the effective use of the radio resources because the amount of information of the identifier IMSI or UE-ID increases. Furthermore, the identifiers IMSI and UE-ID have values statically determined for each mobile terminal, and there is no opportunity to change any of them. Therefore, heavy use of the identifier IMSI or UE-ID in a wireless section increases the opportunity of tapping, etc., and causes a problem with security.

Because an identifier as mentioned above in accordance with the present invention is used in either a TA(MBMS) or an MBSFN area, it is not the one, like an identifier IMSI, statically provided for each mobile terminal, but it has a value which is changed when, for example, the TA(MBMS) is changed. Therefore, even if the identifier encounters tapping, there is an opportunity to change the identifier and strong security is therefore provided. As a result, by using a mobile terminal identifier which is used in the frequency layer dedicated to MBSFN transmission, while the problem with security and the problem with radio resources are solved, it becomes able to carry out multi-cell transmission of information using an identifier as mentioned above in accordance with the present invention (the information can be multiplied by the identifier). Accordingly, there can be provided an advantage of enabling SFN combining of information using the identifier of the mobile terminal which is used in the frequency layer dedicated to MBSFN transmission to be carried out, and reducing receive errors detected in the information received by the mobile terminal. This results in advantages, such as prevention of a control delay time in the whole mobile communication system, and effective use of the radio resources.

An example of the operation will be shown hereafter. The mobile terminal, in step ST1742, transmits a "notification of the MBMS side receiving state" to the serving cell. As an example of parameters included in the "notification of the MBMS side receiving state", an identifier (UE-ID, IMSI, S-TMSI, or the like) of the mobile terminal, the frequency (f(MBMS)) at which the mobile terminal receives the MBMS service, and the MBSFN area number (ID) are included. The MME, in step ST1746, determines a tracking area (referred to as a TA(MBMS) from here on) in which the mobile terminal in question is receiving the MBMS service at the frequency dedicated to MBMS transmission. At that time, the MME derives the identifier of the mobile terminal used in the MBSFN area (can alternatively derive an identification code) by using the mobile-terminal-specific identifier of the mobile terminal, the MBSFN area ID, etc. which are acquired through the "notification of the MBMS side receiving state". As an alternative, the MME can derive the identifier of the mobile terminal used in the TA(MBMS) (can alternatively derive an identification code) by using the mobile-terminal-specific identifier of the mobile terminal, the MBSFN area ID, etc. The derived identifier of the mobile terminal can be allocated to a plurality of mobile terminals (i.e., the identifier is allocated to the group to which the mobile terminal belongs), or can be the one specific to the mobile terminal. On behalf of the MME, an MCE or an MBMS GW can derive the identifier of the mobile terminal.

The derived identifier is transmitted from the MME to the mobile terminal via the serving cell, and is further transmitted from the MME to an MCE. For example, the transmission of the derived identifier from the MME to the mobile terminal via the serving cell can be carried out in steps ST1748 to ST1750. The derived identifier does not necessarily have to be transmitted in these steps, and can be alternatively transmitted via an dedicated signal (a DCCH, a DTCH or the like). The MME, when transmitting a paging request to the MCE, e.g., in ST1776, can inform either the identifier of the mobile terminal used in the TA(MBMS) or the identifier of the mobile terminal used in the MBSFN area. In the transmission from the MCE to the MBMS dedicated cell, the derived identifier can be transmitted together with the paging request of ST1780. Each base station in the MBSFN area, in step ST1783, maps either the identifier of the mobile terminal used in the MBSFN area of the mobile terminal in question, or the identifier of the mobile terminal used in the TA(MBMS) onto a PMCH. The mobile terminal, in step ST1787, determines whether the identifier of the mobile terminal itself is included in the result of receiving and decoding (whether it has detected the identifier). Similarly, in steps ST1710 to ST1719, steps ST1761 to ST1770, steps ST1804 to ST1813, steps ST1814 to ST1815, and steps ST1828 to ST1837, the identifier of the mobile terminal which is used in the frequency layer dedicated to MBSFN transmission can be used.

Furthermore, not only in the case of this Embodiment but in a case in which multi-cell (MC) transmission is carried out for each MBSFN area, in the above-mentioned mobile communication system, the method of including, as identifiers of each mobile terminal, a mobile terminal identifier used in a unicast/mixed frequency layer and a mobile terminal identifier used in a frequency layer dedicated to MBSFN transmission can be used. More specifically, not only in the case of this Embodiment but in a case in which multi-cell (MC) transmission is carried out for each MBSFN area, a mobile terminal identifier used for a mobile terminal in question which is used (or allocated in common) in a TA(MBMS), an identifier used for the mobile terminal in question which is used (or allocated in common) in an MBSFN area where the mobile terminal in question is receiving an MBMS service, or the like can be used for information (the information can be multiplied by each of the identifiers). As a result, there can be provided an advantage of enabling the mobile terminal to carry out SFN combining of the information, and reducing receive errors detected in the information received by the mobile terminal. This results in advantages, such as prevention of a control delay time in the whole mobile communication system, and effective use of the radio resources. Introduction of multi-cell transmission even in a unicast/mixed frequency layer has been also studied. In this case, an identifier used for the mobile terminal in question which is used (or allocated in common) in an MBSFN area where the mobile terminal in question is receiving an MBMS service, or the like can be used, as the identifier of the mobile terminal, for information (the information can be multiplied by each of the identifiers). As a result, there can be provided an advantage of enabling the mobile terminal to carry out SFN combining of the information, and reducing receive errors detected in the information received by the mobile terminal. This results in advantages, such as prevention of a control delay time in the whole mobile communication system, and effective use of the radio resources.

In this Embodiment 2, the case in which a frequency layer dedicated to MBMS transmission consists of an MBMS dedicated cell is described. This Embodiment 2 can be applied to even a case in which a frequency layer dedicated to MBMS transmission consists of an MBMS/Unicast-mixed cell. Embodiments 3, 4, 5 and 6, as well as Embodiment 1, can also be similarly applied to even a case in which a frequency layer dedicated to MBMS transmission consists of an MBMS/Unicast-mixed cell.

Embodiment 3

Figure 35:
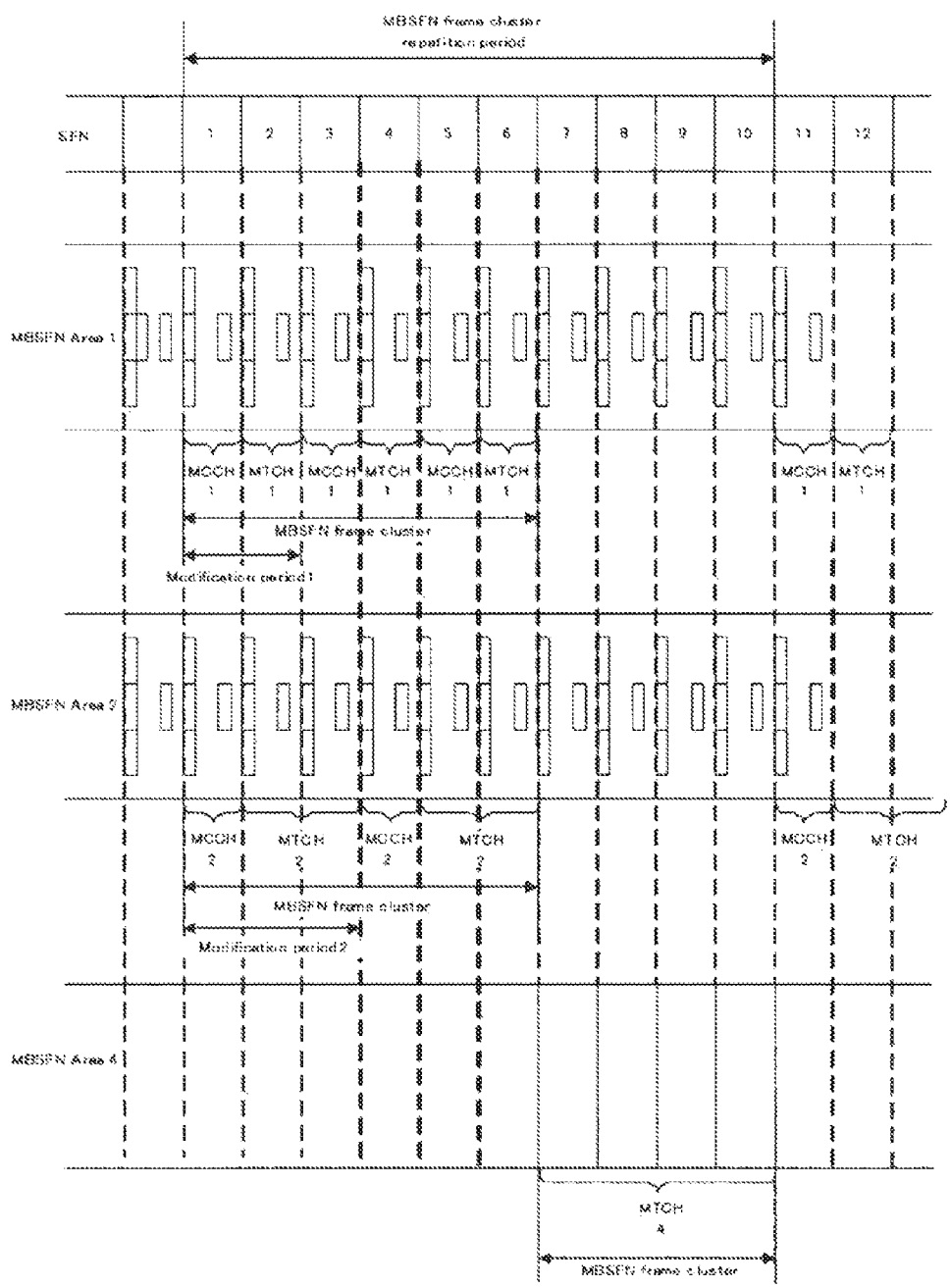
FIG. 35 is an explanatory drawing showing mapping to a physical channel in an MBSFN synchronization area in a case in which time division multiplexing of an MBSFN area covering other MBSFN areas and the other MBSFN areas covered is carried out, and code division multiplexing is used as a multiplexing method of multiplexing the MBSFN areas covered.

In the current 3GPP, existence of an MBSFN (Multimedia Broadcast multicast service Single Frequency Network) area covering a plurality of MBSFN areas has been debated. A conceptual diagram of the geographical locations of base stations in a case in which an MBSFN area covering a plurality of MBSFN areas exists is shown in FIG. 28. Four MBSFN areas 1 to 4 exist in a single MBSFN synchronization area (MBSFN Synchronization Area). The MBSFN area 4 covers the other MBSFN areas 1 to 3. As the contents of the debate about the MBSFN area 4 in the current 3GPP, it is only that access to the MBSFN area (i.e., the MBSFN area 4) covering the other MBSFN areas is carried out via a covered MBSFN area (one of the MBSFN areas 1 to 3). It has not been determined whether to dispose an MCCH (multicast control channel) in the MBSFN area 4 covering the other MBSFN areas 1 to 3. A detailed concrete operation in the case in which an MCCH exists in the MBSFN area 4 is explained in Embodiment 2. In this Embodiment, a case in which no MCCH exists in the MBSFN area covering the other MBSFN areas will be explained. A conceptual diagram is shown in FIG. 35. An explanation will be made focusing on a portion different from FIG. 29 which is referred to in the explanation of Embodiment 2. Portions which will not be explained particularly are the same as those explained in Embodiment 2.

First, as a first difference between FIG. 35 and FIG. 29, there is a difference between a method of transmitting control information (an MCCH) in accordance with this Embodiment and that in accordance with Embodiment 2 because no MCCH exists in the MBSFN area 4 shown in FIG. 28. First, as a method of mapping an MCCH for the MBSFN area 4, there can be considered a method of ensuring areas for the MBSFN areas 1 and 4 in a PMCH (PMCH1) of an MBSFN area covered (the MBSFN area 1).

Figure 36:
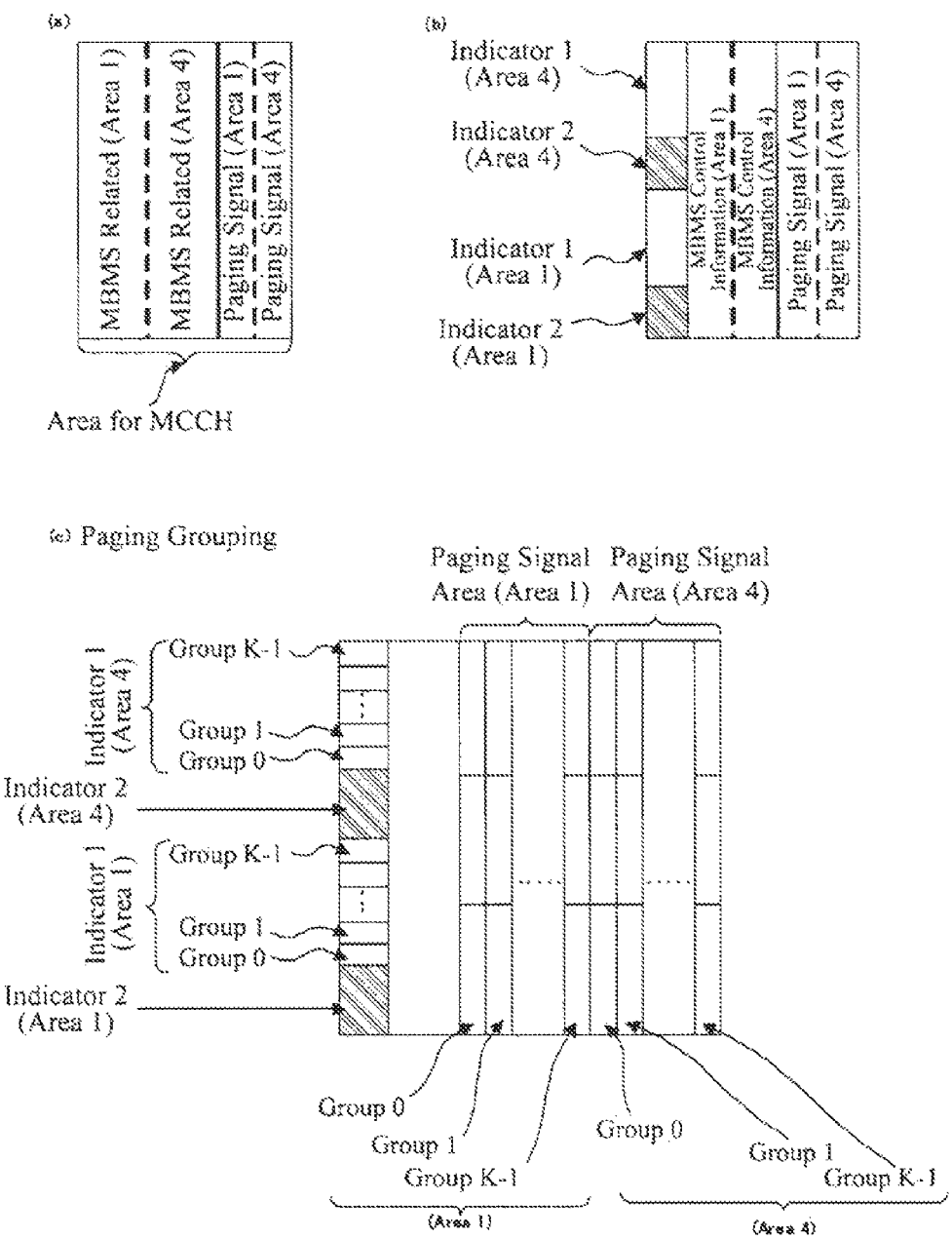
FIG. 36 is an explanatory drawing showing a method of mapping a paging-related signal onto a multicast control channel in order to deliver control information to an MBSFN area including a plurality of MBSFN areas.

A conceptual diagram is shown in FIG. 36. FIG. 36 is an explanatory drawing showing a method of mapping a paging-related signal into a PMCH (PMCH1) onto which a multicast control channel (MCCH1) is mapped in order to send control information to the MBSFN area including the plurality of MBSFN areas. The configuration of the physical MCH (PMCH) in which areas for paging of the MBSFN areas 1 and 4 is disposed is shown in FIG. 36(a). The physical MCH is configured in such a way that MBMS-related information about the MBSFN areas 1 and 4, and paging-related information about the MBSFN areas 1 and 4 are included on the PMCH (PMCH1). The MBMS-related information and the paging signal of each of the MBSFN areas can exist as information elements in an MTCH and an MCCH respectively, or time-division multiplexing of physical areas (resources) onto which the MBMS-related information and the paging signal are mapped respectively can be carried out. A configuration of disposing an indicator indicating whether or not the contents of the MCCH have been changed independently for each of the MBSFN areas 1 and 4 in the physical MCH (PMCH) in which paging-related area of the MBSFN areas 1 and 4 is disposed is shown in FIG. 36(b). In FIG. 36(b), a case in which paging signal presence or absence indicators (indicators 1) each showing presence or absence of paging in a corresponding one of the MBSFN areas 1 and 4, and MBMS-related modified or unmodified indicators (indicators 2) each showing modification or unmodification in MBMS-related information in a corresponding one of the MBSFN areas 1 and 4 are provided as the indicators is shown. A configuration in a case in which the paging-related modified or unmodified indicators (indicators 1) are divided into K groups is shown in FIG. 36(c). When the method of ensuring, in the PMCH (PMCH1) of one covered MBSFN area (the MBSFN area 1), the areas for the MBSFN areas 1 and 4 is used in this way, there can be provided an advantage of carrying out the scheduling of the MCCH1 to be informed via the BCCH1 (broadcast control channel) only for the MBSFN area 1. Because the details of the scheduling method of scheduling the MCCH are the same as those shown in Embodiment 2, the details of the scheduling method will be omitted hereafter.

The scheduling method of scheduling the MCCH will be explained. In addition to the scheduling of the MCCH1 to be informed via the BCCH1, the starting point of a physical area onto which the MCCH4 is mapped has only to be informed. As an alternative, the scheduling to be informed via the BCCH1 can be the one of the PMCH1.

As a second difference between the figures, there is a difference between a method of transmitting a paging signal destined for a mobile terminal currently receiving an MBMS service in the MBSFN area 4 and that used in Embodiment 2 because no MCCH does not exist in the MBSFN area (i.e., the MBSFN area 4) covering the other MBSFN areas. This difference in the method of transmitting a paging signal will be explained. First, there can be considered a method of enabling the network side to inform a paging signal destined for a mobile terminal in question to all of the MBSFN areas 1 to 3 covered by the MBSFN area 4. This method can be implemented also in the case in which no MCCH exists in the MBSFN area 4 without adding any additional control to the concrete method explained in Embodiment 2. This method is effective from the viewpoint of avoiding the complexity of the mobile communication system.

Next, there can be considered a method of enabling the network side to inform a paging signal destined for a mobile terminal in question to an MBSFN area covered by the MBSFN area 4 (either of the MBSFN areas 1 to 3), in which the mobile terminal is being located. A concrete operation will be explained focusing on a point different from that shown in Embodiment 2. A "notification of the MBMS side receiving state" will be explained. The mobile terminal, in step ST1742 of FIG. 20, transmits a "notification of the MBMS side receiving state" to the serving cell according to UL (Uplink) allocation received in step ST1741. As an example of parameters included in the "notification of the MBMS side receiving state", an identifier (UE-ID, IMSI, S-TMSI, or the like) of the mobile terminal, the frequency (f(MBMS)) at which the mobile terminal receives the MBMS service, and the MBSFN area number (ID) are included. In this case, the MBSFN area ID informed to the serving cell is not the MBSFN area ID (MBSFN area 4) of the MBSFN area from which the mobile terminal is actually receiving the MBMS service (MTCH), but is the MBSFN area ID of the MBSFN area in which the mobile terminal is being located, this MBSFN area being covered by the MBSFN area 4. In other words, the mobile terminal informs the MBSFN area ID mapped onto the S-SCH (secondary synchronization channel) which it has received when making an MBSFN search. As a result, the network side can know the covered MBSFN area in which the mobile terminal is being actually located. The mobile terminal further carries out a process of step ST3101 of FIG. 37 before carrying out a process of step ST1794 of FIG. 23.

Figures 37, 38:
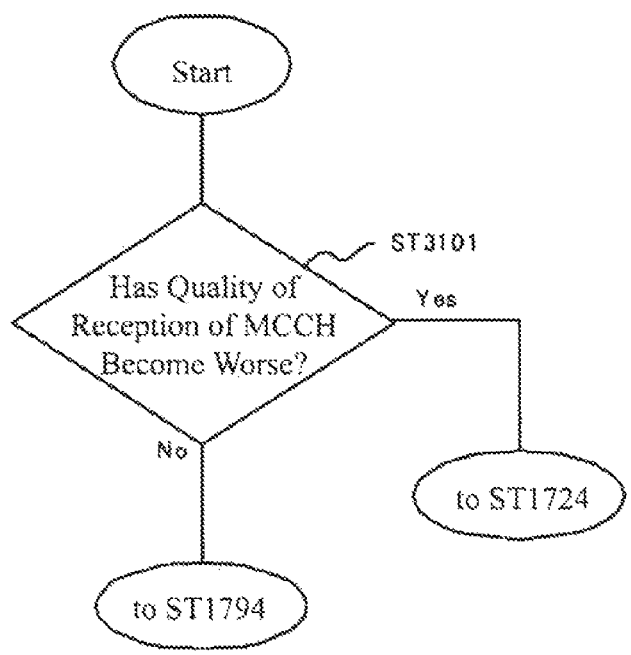
FIG. 37 is a flow chart showing a process of measuring the quality of a multicast control channel currently being received.
FIG. 38 is a table showing a concept of the capability of a mobile terminal.

The mobile terminal, in step ST3101 of FIG. 37, measures the quality of reception of the MCCH which the mobile terminal is receiving. The mobile terminal receives a reference signal (RS) with the radio resources of the MBSFN area in question, and measures the received power (RSRP). The mobile terminal then determines whether or not the received power is equal to or higher than a threshold determined statically or semi-statically. The fact that the received power is equal to or higher than the above-mentioned threshold shows that the mobile terminal has high sensitivity enough to receive the MCCH, whereas the fact that the received power is lower than the threshold shows that the mobile terminal does not have high sensitivity enough to receive the MCCH. When the received power is equal to or higher than the above-mentioned threshold, the mobile terminal makes a transition to step ST1794, whereas when the received power is lower than the above-mentioned threshold, the mobile terminal makes a transition to step ST1724. As a result, the mobile terminal recognizes the mobility between covered MBSFN areas onto which the MCCH is mapped. This method provides more effective features as will be shown below as compared with the method of enabling the network side to inform a paging signal destined for a mobile terminal in question from all of the MBSFN areas 1 to 3 covered by the MBSFN area 4. Because the mobile communication system becomes unnecessary to make any base station other than a base station from which the mobile terminal in question can receive a paging signal geographically (e.g., a base station in the MBSFN area 2 or 3 when the mobile terminal in question is being located in the MBSFN area 1) transmit the paging signal, there is provided an advantage of making effective use of the radio resources. Also in this Embodiment, like in the case of Embodiment 2, the method of including, as identifiers of each mobile terminal, a mobile terminal identifier used in a unicast/mixed frequency layer and a mobile terminal identifier used in a frequency layer dedicated to MBSFN transmission can be used.

In accordance with Embodiment 3, also in a case in which no MCCH exists in an MBSFN area covering a plurality of MBSFN areas, there is provided an advantage of being able to inform a paging signal to a mobile terminal currently receiving an MBMS service in an MBMS transmission dedicated cell, which is a challenge of the present invention. Furthermore, the method of selecting a desired service in an MBMS transmission dedicated cell, which is a challenge of the present invention, can be disclosed. As a result, there is provided an advantage of enabling a mobile terminal to receive a desired service in an MBMS transmission dedicated cell in which no uplink channel exists.

Embodiment 4

The sending method of sending a paging signal when a mobile terminal currently receiving an MBMS service in an MBMS transmission dedicated cell has a low paging reception capability (Capability) is described in Embodiments 1 to 3. Next, a paging signal sending method in a case in which a mobile terminal having a high paging reception capability (a high-capability terminal) and a mobile terminal having a low paging reception capability (a low-capability terminal) coexist will be explained. As an example of a "low-capability terminal" which will be described hereafter, there is a mobile terminal having a single receiver. Another example is a mobile terminal that can only determine a single center frequency by changing the frequency set to the frequency converting unit 1107 thereof. Another example is a mobile terminal that cannot carry out discontinuous reception of an MBMS/Unicast-mixed cell while receiving an MBMS service in an MBMS transmission dedicated cell.

As an example of a "high-capability terminal", there is a mobile terminal having a plurality of receivers (e.g., two receivers). Another example is a mobile terminal that can determine a plurality of center frequencies by changing the frequency set to the frequency converting unit 1107 thereof. Another example is a mobile terminal that can carry out discontinuous reception in an MBMS/Unicast-mixed cell even while receiving an MBMS service in an MBMS transmission dedicated cell. FIG. 38 is a table showing a concept of the capability of a mobile terminal. This capability (Capability) of a mobile terminal is informed, in step ST1710, from the mobile terminal to a serving base station, and is further informed, in step ST1712, from the serving base station to an MME. As a result, the network side can recognize the paging reception capability of the mobile terminal in question. Therefore, it becomes able to change the paging method of transmitting paging to a mobile terminal currently receiving an MBMS service in a frequency layer dedicated to MBMS transmission according to the paging reception capability of the mobile terminal.

A concrete example of operation will be explained with reference to FIGS. 16 and 17. A high-capability terminal carries out a receiving operation of receiving a signal from an MBMS/Unicast-mixed cell, and a receiving operation of receiving a signal from an MBMS transmission dedicated cell in parallel. As an example of the receiving operation of receiving a signal from an MBMS transmission dedicated cell, there are steps ST1601-1, ST1602, ST1603, ST1604, and ST1609. Because a detailed operation in each of the steps is as shown in Embodiment 1, Embodiment 2, or Embodiment 3, the explanation of the detailed operation will be omitted hereafter. A low-capability terminal carries out an operation as explained in Embodiment 1, Embodiment 2, or Embodiment 3. By using this method, while a paging signal sending method of sending a paging signal to a low-capability terminal currently receiving an MBMS service in an MBMS transmission dedicated cell is established, a sending method of sending a paging signal to a high-capability terminal currently receiving an MBMS service in an MBMS transmission dedicated cell can be configured in a general way to send paging signals to a high-capability terminal. As a result, when a high-capability terminal is receiving an MBMS service in a frequency layer dedicated to MBMS transmission, the process carried out by the mobile terminal and the process carried out by the mobile communication system can be simplified. The simplification of the process can provide an advantage of achieving low power consumption in the mobile terminal. Furthermore, because the mobile communication system does not have to make a base station in an MBSFN area transmit a paging signal to a high-capability terminal, there can be provided an advantage of making effective use of the radio resources.

Furthermore, even a high-capability terminal carries out an operation as explained in Embodiment 1, Embodiment 2, or Embodiment 3 according to a user's intention in order to prevent an increase in its power consumption at the time when carrying out a receiving operation of receiving a signal from an MBMS/Unicast-mixed cell, and a receiving operation of receiving a signal from an MBMS transmission dedicated cell in parallel. As a result, even a high-capability terminal does not have to carry out the receiving operations in parallel, and therefore there can be provided an advantage of preventing an increase in its power consumption. The user's intention, as well as the mobile terminal paging reception capability, are informed, in step ST1710, from the mobile terminal to the network side, and the subsequent processes carried out by the mobile communication system including the subsequent processes carried out by the mobile terminal are the same as those shown in Embodiment 2.

Next, a variant will be explained. Nonpatent reference 8 discloses a release indicator (Release indicator) as one parameter of the capability of a mobile terminal. However, nonpatent reference 8 does not describe any variation in the operation of a mobile communication system due to a variation in the release indicator. In this variant, a method of switching between sending methods each of sending a paging signal to a mobile terminal currently receiving an MBMS service in an MBMS transmission dedicated cell according to the capability of the mobile terminal, concretely according to a release indicator which is one parameter of the capability of the mobile terminal is disclosed. Furthermore, each mobile terminal uses, as the receiving method of receiving a paging signal while receiving an MBMS service, a receiving method of receiving a paging signal according to the capability of the mobile terminal itself, concretely according to a release with which the mobile terminal complies. In order to switch between the sending methods each of sending a paging signal to a mobile terminal according to the release with which the mobile terminal complies, information about the capability of the mobile terminal needs to be shared among the mobile terminal, the serving base station, and the network side. To this end, in this variant, the capability (Capability) of the mobile terminal is informed from the mobile terminal to the serving base station, and is further informed from the serving base station to the MME. As an example, this capability (Capability) of the mobile terminal is informed, in step ST1710, from the mobile terminal to the serving base station, and is further informed, in step ST1712, from the serving base station to the MME. As a result, the network side can recognize the paging reception capability of the mobile terminal in question. Therefore, it becomes able to switch between the sending methods each of sending a paging signal to a mobile terminal currently receiving an MBMS service in a frequency layer dedicated to MBMS transmission according to the paging reception capability of the mobile terminal.

Examples of the switching between the sending methods each of sending a paging signal will be disclosed. An example of the switching includes: a step (1) of using, as the sending method of sending a paging signal to a mobile terminal currently receiving an MBMS service from an MBMS dedicated cell, the method shown in any of Embodiments 1 to 3 to send a paging signal from an MBMS dedicated cell to the mobile terminal, and a step (2) of using, as the sending method of sending a paging signal to a mobile terminal currently receiving an MBMS service from an MBMS dedicated cell, a conventional sending method to send a paging signal from a unicast cell or an MBMS/Unicast-mixed cell to the mobile terminal. Another example of the switching includes: a step (1) of using, as the sending method of sending a paging signal to a mobile terminal currently receiving an MBMS service from an MBMS dedicated cell, the method shown in any of Embodiments 1 to 3 to send a paging signal from an MBMS dedicated cell to the mobile terminal, and a step (2) of not sending any paging signal to a mobile terminal currently receiving an MBMS service from an MBMS dedicated cell. Examples of the switching between the sending methods each of sending a paging signal according to a release indicator will be disclosed. There can be considered a case in which whether a mobile terminal can receive a paging signal from an MBMS dedicated cell is determined according to a release with which the mobile terminal complies. For example, a release 8-compliant mobile terminal cannot receive a paging signal from an MBMS dedicated cell, while a release 9-compliant mobile terminal can receive a paging signal from an MBMS dedicated cell.

An example of the switching according to a release indicator includes: a step (1) of, when a release-compliant mobile terminal which can receive a paging signal from an MBMS dedicated cell is receiving an MBMS service from an MBMS dedicated cell, using, as the sending method of sending a paging signal to a mobile terminal, the method shown in any of Embodiments 1 to 3 to send a paging signal from the MBMS dedicated cell to the release-compliant mobile terminal, and a step (2) of, when a release-compliant mobile terminal which cannot receive a paging signal from an MBMS dedicated cell is receiving an MBMS service from an MBMS dedicated cell, using, as the sending method of sending a paging signal to a mobile terminal, a conventional sending method to send a paging signal from a unicast cell or an MBMS/Unicast-mixed cell to the release-compliant mobile terminal. Another example of the switching according to a release indicator includes: a step (1) of, when a release-compliant mobile terminal which can receive a paging signal from an MBMS dedicated cell is receiving an MBMS service from an MBMS dedicated cell, using, as the sending method of sending a paging signal to a mobile terminal, the method shown in any of Embodiments 1 to 3 to send a paging signal from the MBMS dedicated cell to the release-compliant mobile terminal, and a step (2) of, when a release-compliant mobile terminal which cannot receive a paging signal from an MBMS dedicated cell is receiving an MBMS service from an MBMS dedicated cell, not transmitting a paging signal destined for the release-compliant mobile terminal to the release-compliant mobile terminal.

In accordance with variant 1, the mobile communication system can switch between its operations by using conventional parameters without increasing parameters to be informed from each mobile terminal to the network side. As a result, there can be provided an advantage of making effective use of the radio resources. Furthermore, because the mobile communication system does not have to transmit a paging signal from an MBMS dedicated cell to a mobile terminal which cannot receive the paging signal from the MBMS dedicated cell, there can be provided an advantage of making effective use of the radio resources. As a result, there can be provided an advantage of reducing the load on the network side.

Next, another variant will be explained as variant 2. Nonpatent reference 8 discloses MBMS-related parameters (MBMS Related parameters) as one parameter of the capability of a mobile terminal. However, nonpatent reference 8 does not disclose any descriptions of the MBMS-related parameters at all. In this variant, a method of switching between sending methods each of sending a paging signal to a mobile terminal currently receiving an MBMS service in an MBMS transmission dedicated cell according to the capability of the mobile terminal, concretely according to the MBMS-related parameters which are one parameter of the capability of the mobile terminal is disclosed. Furthermore, each mobile terminal uses, as the receiving method of receiving a paging signal destined for the mobile terminal while receiving an MBMS service, a receiving method of receiving a paging signal according to the capability of the mobile terminal itself, concretely according to the MBMS-related parameters. In order to switch between the sending methods each of sending a paging signal to a mobile terminal according to the release with which the mobile terminal complies, information about the capability of the mobile terminal needs to be shared among the mobile terminal, the serving base station, and the network side. To this end, in this variant, the capability (Capability) of the mobile terminal is informed from the mobile terminal to the serving base station, and is further informed from the serving base station to the MME. As an example, this capability (Capability) of the mobile terminal is informed, in step ST1710, from the mobile terminal to the serving base station, and is further informed, in step ST1712, from the serving base station to the MME. As a result, the network side can recognize the paging reception capability of the mobile terminal in question. Therefore, it becomes able to switch between the sending methods each of sending a paging signal to a mobile terminal currently receiving an MBMS service in a frequency layer dedicated to MBMS transmission according to the paging reception capability of the mobile terminal. Because examples of the switching between the sending methods each of sending a paging signal are the same as those of variant 1, the explanation of the examples will be omitted hereafter. An example of the MBMS-related parameters, and an example of the switching between the sending methods each of sending a paging signal according to the parameters will be disclosed.

An example of the parameters will be disclosed. In the MBMS-related parameters, a "low-capability terminal (or single-receiver-equipped terminal)" parameter and a "high-capability terminal (or two-receivers-equipped terminal)" parameter are provided. An example of the switching according to the parameters includes: a step (1) of, when a low-capability mobile terminal is receiving an MBMS service from an MBMS dedicated cell, using, as the sending method of sending a paging signal to a mobile terminal, the method shown in any of Embodiments 1 to 3 to send a paging signal from the MBMS dedicated cell to the low-capability mobile terminal, and a step (2) of, when a high-capability mobile terminal is receiving an MBMS service from an MBMS dedicated cell, using, as the sending method of sending a paging signal to a mobile terminal, a conventional sending method to send a paging signal from a unicast cell or an MBMS/Unicast-mixed cell to the high-capability mobile terminal. Another example of the switching according to the parameters includes: a step (1) of, when a high-capability mobile terminal is receiving an MBMS service from an MBMS dedicated cell, using, as the sending method of sending a paging signal to a mobile terminal, a conventional sending method to send a paging signal from a unicast cell or an MBMS/Unicast-mixed cell to the high-capability mobile terminal, and a step (2) of, when a low-capability mobile terminal is receiving an MBMS service from an MBMS dedicated cell, not sending any paging signal to the low-capability mobile terminal. Another example of the parameters will be disclosed. In the MBMS-related parameters, an "MBMS-dedicated-cell-originated paging signal receivable" parameter and an "MBMS-dedicated-cell-originated paging signal unreceivable" parameter are disposed.

An example of the switching according to the parameters includes: a step (1) of, when a mobile terminal which can receive a paging signal from an MBMS dedicated cell is receiving an MBMS service from an MBMS dedicated cell, using, as the sending method of sending a paging signal to a mobile terminal, the method shown in any of Embodiments 1 to 3 to send a paging signal from the MBMS dedicated cell to the mobile terminal, and a step (2) of, when a mobile terminal which cannot receive a paging signal from an MBMS dedicated cell is receiving an MBMS service from an MBMS dedicated cell, using, as the sending method of sending a paging signal to a mobile terminal, a conventional sending method to send a paging signal from a unicast cell or an MBMS/Unicast-mixed cell to the mobile terminal. Another example of the switching according to the parameters includes: a step (1) of, when a mobile terminal which can receive a paging signal from an MBMS dedicated cell is receiving an MBMS service from an MBMS dedicated cell, using, as the sending method of sending a paging signal to a mobile terminal, the method shown in any of Embodiments 1 to 3 to send a paging signal from the MBMS dedicated cell to the mobile terminal, and a step (2) of, when a mobile terminal which cannot receive a paging signal from an MBMS dedicated cell is receiving an MBMS service from an MBMS dedicated cell, not sending any paging signal to the mobile terminal.

In accordance with variant 2, the mobile communication system can switch between its operations by using conventional parameters without increasing parameters to be informed from each mobile terminal to the network side. As a result, there can be provided an advantage of making effective use of the radio resources. Furthermore, because the mobile communication system does not have to transmit a paging signal from an MBMS dedicated cell to a mobile terminal which cannot receive the paging signal from the MBMS dedicated cell and a mobile terminal which does not have to receive the paging signal from the MBMS dedicated cell, there can be provided an advantage of making effective use of the radio resources. As a result, there can also be provided an advantage of reducing the load on the network side.

Embodiment 5

The sending method of sending a paging signal to a mobile terminal currently receiving an MBMS service in a frequency layer dedicated to MBMS transmission is described in Embodiment 1, Embodiment 2, and Embodiment 3. In this Embodiment 5, a method of enabling a user to select "does not receive paging" according to the user's intention while his or her mobile terminal is receiving an MBMS service in a frequency layer dedicated to MBMS transmission is disclosed. A concrete example of the operation of the mobile terminal at the time of selecting "does not receive paging" according to the user's intention will be explained with reference to FIGS. 16 and 17. The mobile terminal which has selected "does not receive paging" according to the user's intention, in step ST1606, more specifically in a notification of the MBMS side receiving state of step ST1742, informs that it "does not receive paging".

Furthermore, the "notification of the MBMS receiving state" of step ST1742 can be made like in the case of an "attach request" shown in ST1710, or as a type of "attach request". As an alternative, the "notification of the MBMS receiving state" can be made like in the case of "tracking area update (Tracking Area Update: TAU)", or as a type of "tracking area update". Parameters to be notified in this case includes an identifier (UE-ID, IMSI, S-TMSI, or the like) of the mobile terminal, the frequency (f(MBMS)) at which the mobile terminal ends the reception of the MBMS service, the MBSFN area number (ID), the information showing that the mobile terminal does not receive paging, like in the above-mentioned case. As a result, the network side is enabled to know that the mobile terminal has ended the reception of the MBMS in the MBMS dedicated cell without adding any new message. Therefore, there can be provided an advantage of being able to avoid the complexity of the mobile communication system. Information showing that the "tracking area update" includes the "notification of the MBMS receiving state" can be included in the "tracking area update". As a concrete method, the "notification of the MBMS receiving state" can be added to the type (TYPE) information of TAU. The type information can be expressed as a numerical value. A 1-bit indicator showing whether or not to aim to make the "notification of the MBMS receiving state" is formed on the TAU request message.

Information showing that the "attach request" message includes the "notification of the MBMS receiving state" can be included in the "attach request" message. As a concrete method, the "notification of the MBMS receiving state" can be added to the type information of the attach request. The type information can be expressed as a numerical value. A 1-bit indicator showing whether or not to aim to make the "notification of the MBMS receiving state" is formed on the attach request message. As a result, in the former case, the conventional "tracking area update" can be distinguished from the "tracking area update" used in order to make the "notification of the MBMS receiving state". Furthermore, in the latter case, the conventional "attach request" can be distinguished from the "attach request" used in order to make the "notification of the MBMS receiving state". As a result, there can be provided an advantage of preventing control delay from occurring in the mobile communication system. Furthermore, the "notification of the MBMS receiving state+information showing that the mobile terminal does not receive paging" of step ST1828 can be made like in the case of an "attach request" shown in ST1710, or as a type of "attach request". As an alternative, the "notification of the MBMS receiving state+information showing that the mobile terminal does not receive paging" can be made like in the case of "tracking area update (Tracking Area Update: TAU)", or as a type of "tracking area update".

Parameters to be notified in this case includes an identifier (UE-ID, IMSI, S-TMSI, or the like) of the mobile terminal, the frequency (f(MBMS)) at which the mobile terminal ends the reception of the MBMS service, and the MBSFN area number (ID), like in the above-mentioned case. As a result, the network side is enabled to know that the mobile terminal has ended the reception of the MBMS in the MBMS dedicated cell without adding any new message. Therefore, there can be provided an advantage of being able to avoid the complexity of the mobile communication system. Information showing that the "tracking area update" includes the "notification of the MBMS receiving state+information showing that the mobile terminal does not receive paging" can be included in the "tracking area update". As a concrete method, the "notification of the MBMS receiving state+information showing that the mobile terminal does not receive paging" can be added to the type (TYPE) information of TAU. The type information can be expressed as a numerical value. A 1-bit indicator showing whether or not to aim to make the "notification of the MBMS receiving state+information showing that the mobile terminal does not receive paging" is formed on the TAU request message. Information showing that the "attach request" message includes the "notification of the MBMS receiving state+information showing that the mobile terminal does not receive paging" can be included in the "attach request" message. As a concrete method, the "notification of the MBMS receiving state+information showing that the mobile terminal does not receive paging" can be added to the type information of the attach request. The type information can be expressed as a numerical value. A 1-bit indicator showing whether or not to aim to make the "notification of the MBMS receiving state+information showing that the mobile terminal does not receive paging" is formed on the attach request message. As a result, in the former case, the conventional "tracking area update" can be distinguished from the "tracking area update" used in order to make the "notification of the MBMS receiving state+information showing that the mobile terminal does not receive paging". Furthermore, in the latter case, the conventional "attach request" can be distinguished from the "attach request" used in order to make the "notification of the MBMS receiving state+information showing that the mobile terminal does not receive paging". As a result, there can be provided an advantage of preventing a control delay time from occurring in the mobile communication system.

The mobile terminal does not carry out steps ST1605, ST1608, ST1610, and ST1611. The simplification of the process carried out by the mobile terminal can provide an advantage of achieving low power consumption in the mobile terminal. The mobile communication system, in step ST1745, receives the information showing that the mobile terminal in question "does not receive paging". In step ST1746, information showing "stop of notification of paging" to the mobile terminal in question is stored in the TA list of the mobile terminal in question or independently from the TA list. After that, paging to the mobile terminal in question occurs in step ST1773. The MME in which paging has occurred, in step ST1774, checks the tracking area list of the mobile terminal in question on the basis of an identifier (UE-ID, IMSI, S-TMSI, or the like) of the mobile terminal in question for which the paging is destined. The MME then checks the "stop of notification of paging" to the mobile terminal in question. Also in this Embodiment, like in the case of Embodiment 2, the method of including, as identifiers of each mobile terminal, a mobile terminal identifier used in a unicast/mixed frequency layer and a mobile terminal identifier used in a frequency layer dedicated to MBSFN transmission can be used.

The mobile communication system stops a paging generation process of steps ST1775 to ST1783 and ST1814 to ST1818. The MME then informs "paging reception rejection" of the mobile terminal in question to the network side. Accordingly, the mobile communication system can stop the paging generation process for the mobile terminal which "does not receive paging" according to the user's intention. As a result, there is provided an advantage of being able to reduce the processing load on the mobile communication system which is used for a notification of a paging signal which a mobile terminal does not intend to receive, and to reduce the radio resources.

Embodiment 6

In accordance with Embodiments 1 to 4, a mobile terminal is configured in such a way as to carry out discontinuous reception again in an MBMS/Unicast-mixed cell (referred to as two-step discontinuous reception from here on) even when receiving a paging signal destined for the mobile terminal itself in a frequency layer dedicated to MBMS transmission. A base station in an MBMS transmission dedicated cell and a base station in an MBMS/Unicast-mixed cell are asynchronous to each other in principle. Therefore, the two-step discontinuous reception is carried out in order to solve a problem that a base station in an MBMS transmission dedicated cell cannot carry out allocation of radio resources for a downlink control signal after a base station has sent out a paging signal in an MBMS/Unicast-mixed cell. However, the two-step discontinuous reception has a problem that the control delay becomes larger than that in the case of a general configuration of sending paging signals to a mobile terminal other than a mobile terminal currently receiving an MBMS service in a frequency layer dedicated to MBMS transmission. A concrete example of operation will be explained with reference to FIG. 17. A unicast cell or a mixed cell, in step ST1705, informs two different discontinuous reception cycle lengths by using the BCCH. Concretely, they are the one for two-step discontinuous reception, and the one for typical discontinuous reception. More concretely, the discontinuous reception cycle length for two-step discontinuous reception is equal to or shorter than that for typical discontinuous reception. The discontinuous reception period for two-step discontinuous reception can represent continuous reception. Accordingly, the discontinuous reception period for two-step discontinuous reception and that for typical discontinuous reception can be set to have different lengths. As a result, there can be provided an advantage of being able to configure the mobile communication system in such a way as to have high flexibility. There can be provided a further advantage of being able to, even in a case in which a mobile terminal receives a paging signal destined therefor in a frequency layer dedicated to MBMS transmission, reduce the control delay by making the discontinuous reception cycle length for two-step discontinuous reception be equal to or shorter than that for typical discontinuous reception to enable the mobile terminal to carry out discontinuous reception again in an MBMS/Unicast-mixed cell with the discontinuous reception cycle length being reduced.

Embodiment 7

It has been examined that an MBMS dedicated cell is newly disposed in an LTE system. This MBMS dedicated cell does not provide any unicast service for carrying out dedicated communications destined for each terminal. Therefore, it is difficult to apply a method executed in a W-CDMA system which can carry out both an MBMS service and a unicast service, and which is defined by, for example, the release 6 standards of the 3GPP to the MBMS dedicated cell, just as it is. It is necessary to dispose a new paging channel in order for a mobile terminal to receive paging from an MBMS dedicated cell. The present invention provides a method of enabling a mobile terminal which is receiving or trying to receive an MBMS service in a frequency layer dedicated to MBMS transmission to receive a paging signal from an MBMS dedicated cell. The present invention also discloses the structure of a channel and a mapping method used for transmitting a paging signal, and a mobile communication system which has the channel and enables the method to be implemented therein.

Hereafter, a method of carrying a paging signal on a physical multicast channel (Physical multicast channel: PMCH) will be disclosed. FIG. 39 is an explanatory drawing showing the structure of a physical multicast channel disposed for each MBSFN (Multimedia Broadcast multicast service Single Frequency Network) area. In FIG. 39, time division multiplexing (Time Division Multiplexing: TDM) of the PMCHs of MBSFN areas 1 to 3 onto each of which a multicast control channel (Multicast control channel: MCCH) and a multicast traffic channel (Multicast Traffic channel: MTCH), which are downlink logical channels, are mapped is carried out. Furthermore, in FIG. 39, a cell #n1 is one located in the MBSFN area 1, a cell #n2 is one located in the MBSFN area 2, and a cell #n3 is one located in the MBSFN area 3. Because the cell #n1 belongs to the MBSFN area 1, the PMCH corresponding to the MBSFN area is transmitted at a time. Because the PMCH is transmitted via a multi-cell (Multi Cell: MC) transmission scheme in the MBSFN area, the PMCH is transmitted on MBSFN subframes. A set of MBSFN frames to which the MBSFN subframes are allocated is referred to as an "MBSFN frame cluster" (MBSFN frame cluster). In the MBMS dedicated cell, all subframes in an MBSFN frame can be the MBSFN subframes used for multi-cell transmission. The length of each of the repetition periods at which the MBSFN frame cluster is repeated is expressed as the "MBSFN frame cluster repetition period" (MBSFN frame cluster Repetition period).

Figure 7:
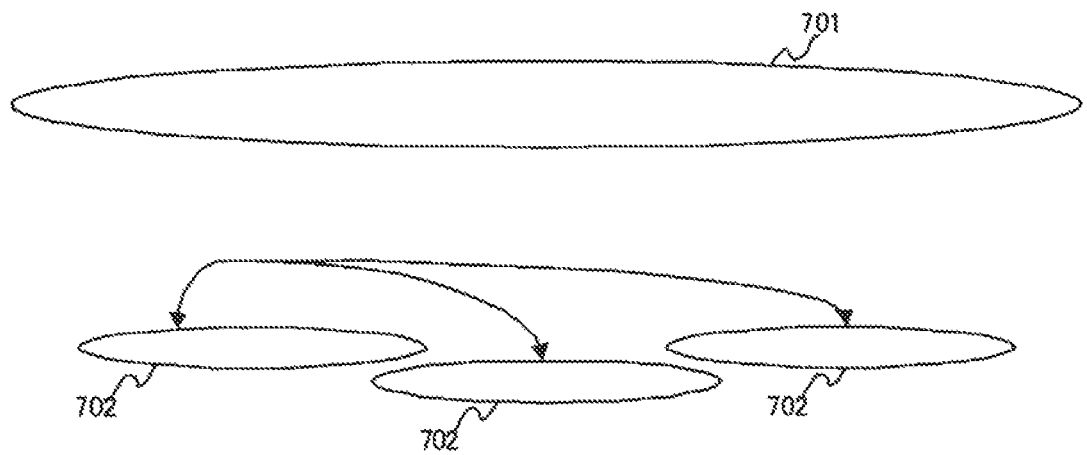
FIG. 7 is an explanatory drawing explaining a relation between an MBSFN synchronization area and MBSFN areas.
Figure 8:
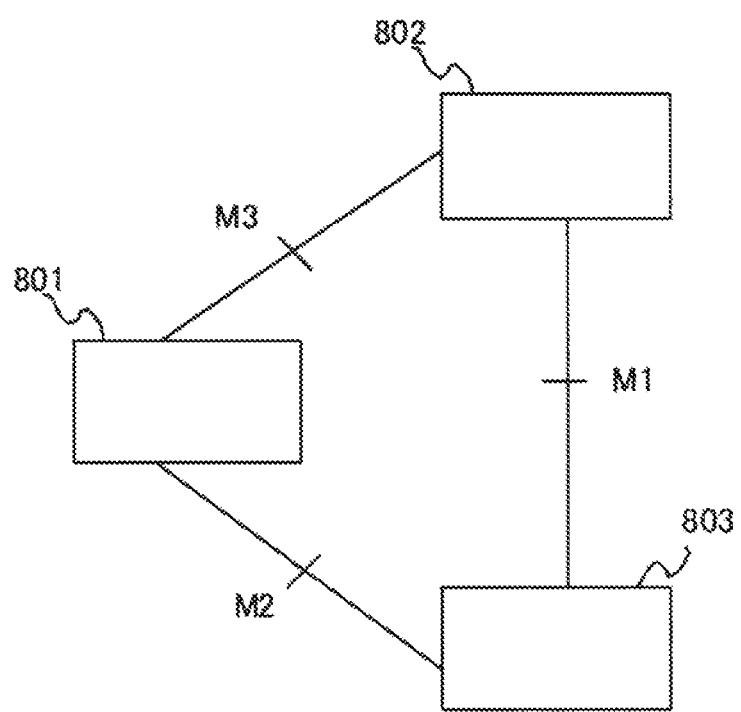
FIG. 8 is an explanatory drawing explaining the logical architecture (Logical Architecture) of E-MBMS.

An MCH which is a transport channel for one or more MBMS services is mapped onto the PMCH, and either or both of the MCCH which is a logical channel for MBMS control information and the MTCH which is a logical channel for MBMS data are mapped onto the MCH. The MCCH and the MICH can be divided in time and mapped onto the PMCH, and can be further divided in time and mapped onto a physical area which is transmitted via a multi-cell transmission scheme. For example, the MCCH and the MTCH can be mapped onto different MBSFN subframes which are the physical area onto which they are mapped. The MCCH can be mapped onto each MBSFN frame cluster, or only the MTCH can be mapped onto each MBSFN frame cluster. In a case in which only the MTCH is mapped onto the PMCH, the repetition period of the MCCH differs from the repetition period of the MBSFN frame cluster. Furthermore, there is a case in which a plurality of MCCHs are mapped onto each MBSFN frame cluster. The length of each of the repetition periods at which the MCCH is repeated is expressed as the "MCCH repetition period" (MCCH Repetition period). In FIG. 39, MCCH1 is MBMS control information for the MBSFN area 1, and MTCH1 is MBMS data for the MBSFN area 1. The cell #n2 belongs to the MBSFN area 2, MCCH2 is MBMS control information for the MBSFN area 2, and MTCH2 is MBMS data for the MBSFN area 2. The cell #n3 belongs to the MBSFN area 3, MCCH3 is MBMS control information for the MBSFN area 3, and MTCH3 is MBMS data for the MBSFN area 3. The repetition period of the MCCH can differ for each MBSFN area. Time division multiplexing of the PMCHs of the MBSFN areas is carried out. Therefore, the orthogonality among the cells of the MBSFN areas is acquired in the MBSFN synchronization area (refer to the MBSFN Synchronization Area as shown in FIG. 7) in which the synchronization among the cells is ensured, and the interference from a cell in another MBSFN area can be prevented. Because the PMCH is transmitted via a multi-cell transmission scheme in each MBSFN area, each cell in each MBSFN area transmits the same data by using the same PMCH. Because, even if one cell belongs to a plurality of MBSFN areas and two or more cells overlap one another, time division multiplexing of the PMCHs of the MBSFN areas is carried out and they are transmitted on MBSFN subframes, the above-mentioned PMCH configuration can be applied with the orthogonality among the MBSFN areas being maintained.

Therefore, a mobile terminal can receive an MBMS service by receiving PMCHs which are transmitted via a multi-cell transmission scheme from a plurality of cells in an MBSFN area in which the mobile terminal itself is being located, and can improve its quality of reception with an SFN gain obtained from the multi-cell transmission. Even in a case in which one cell belongs to a plurality of MBSFN areas, the mobile terminal can receive a plurality of MBMS services by receiving the PMCH of each of the MBSFN areas. Furthermore, a mobile terminal currently receiving the PMCH of a certain desired MBSFN area can carry out a discontinuous reception (Discontinuous Reception: DRX) operation during a time period other than the time of receiving this PMCH because the mobile terminal does not have to receive any PMCH other than the above-mentioned PMCH, and can therefore reduce its power consumption. Because the mobile terminal can carry out the discontinuous reception operation continuously in a case in which the PMCH is transmitted continuously in each MBSFN area with the MBSFN frames being handled as an MBSFN frame cluster, the mobile terminal can further reduce its power consumption.

FIG. 40 is an explanatory drawing showing the structure of a physical multicast channel disposed for each MBSFN (Multimedia Broadcast multicast service Single Frequency Network) area. In FIG. 39, time division multiplexing (Time Division Multiplexing: TDM) of the PMCHs in the MBSFN areas 1 to 3 is carried out. A case in which code division multiplexing (Code Division Multiplexing: CDM) of the PMCHs in the MBSFN areas 1 to 3 is carried out is shown in FIG. 40. A cell #n1 is one located in the MBSFN area 1, a cell #n2 is one located in the MBSFN area 2, and a cell #n3 is one located in the MBSFN area 3. In the cell #n1, the PMCH corresponding to the MBSFN area 1 is transmitted. In this case, this PMCH can be continuous or discontinuous in time. In a case in which the PMCH is discontinuous in time, the length of each of the repetition periods at which the MBSFN frame cluster via which the PMCH corresponding to the MBSFN area is transmitted is repeated becomes equal to the length of the "MBSFN frame cluster repetition period" (MBSFN frame cluster Repetition period). In contrast, in a case in which the PMCH is continuous in time, the MBSFN frame cluster repetition period can be expressed as 0 or it is not necessary to specify this repetition period. The MCCH and the MTCH can be divided in time and mapped onto the PMCH, and can be further divided in time and mapped onto a physical area which is transmitted via a multi-cell transmission scheme. For example, the MCCH and the MTCH can be mapped onto different MBSFN subframes which are the physical area onto which they are mapped as a result. The length of each of the repetition periods at which the MCCH is repeated is expressed as the "MCCH repetition period" (MCCH Repetition period). Similarly, the PMCH corresponding to the MBSFN area 2 is transmitted in the cell #n2, and the PMCH corresponding to the MBSFN area 3 is transmitted in the cell #n3. The repetition period of the MCCH can differ in each of the MBSFN areas. Because data which is multiplied by the MBSFN-area-specific scrambling code is mapped onto the PMCH in each of the MBSFN areas, the interference among the MBSFN areas in the MBSFN synchronization area in which the synchronization among the cells is ensured can be suppressed. Because the multi-cell transmission is used in each of the MBSFN areas, each cell in each of the MBSFN areas transmits the same data, i.e., the data which is multiplied by the MBSFN-area-specific scrambling code (Scrambling Code) with the same PMCH. Even in a case in which one cell belongs to a plurality of MBSFN areas, the above-mentioned PMCH configuration can be applied with the interference among the MBSFN areas being suppressed.

A mobile terminal receives the PMCHs which are transmitted via a multi-cell transmission scheme from a plurality of cells in the MBSFN area in which the mobile terminal itself is being located, and carries out descrambling (Descramble) by using the MBSFN-area-specific scrambling code. As a result, the mobile terminal can receive an MBMS service while removing the influence of the interference from another MBSFN area, and can improve its quality of reception with an SFN gain obtained from the multi-cell transmission. Also in a case in which one cell belongs to a plurality of MBSFN areas, the mobile terminal can receive a plurality of MBMS services by receiving the PMCH of each of the MBSFN areas and carrying out descrambling by using each MBSFN-area-specific scrambling code. Furthermore, in a case in which the PMCH of a certain desired MBSFN area is discontinuous in time, the mobile terminal can carry out a discontinuous reception operation during a time period other than the time of receiving this PMCH, and can therefore reduce its power consumption because the mobile terminal does not have to carry out the reception during the time period other than the time of receiving the above-mentioned PMCH. When two or more services to be mapped onto the PMCH exist and time domain multiplexing of these services on the PMCH is carried out even if the PMCH is continuous in time, the mobile terminal has only to receive a time segment in this PMCH onto which a desired service is mapped, and does not have to receive any other time segments. Therefore, the mobile terminal can carry out a discontinuous reception operation during another time period within this PMCH, and can reduce its power consumption.

Figure 53:
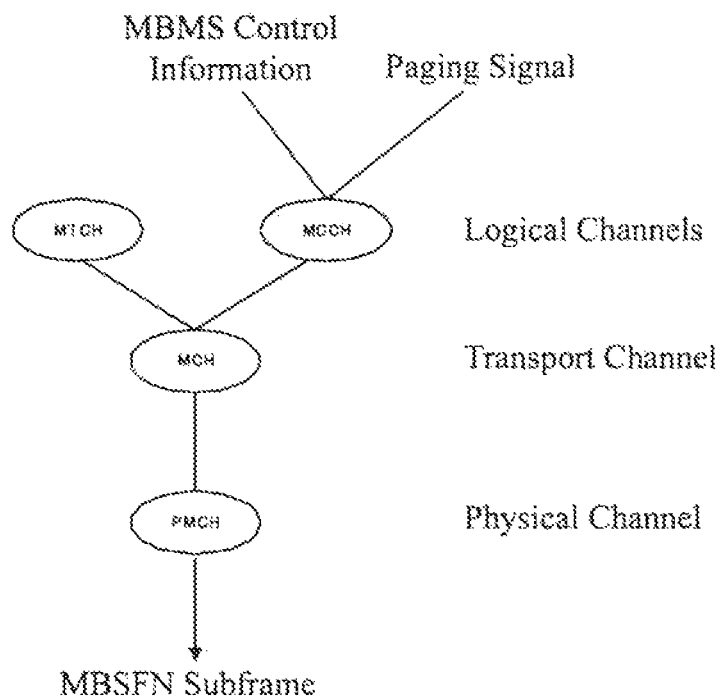
FIG. 53 is an explanatory drawing showing a mapping method in a case of carrying MBMS-related information and a paging signal onto a multicast control channel (MCCH) as information elements.

FIG. 32 is an explanatory drawing showing the structure of a physical multicast channel (PMCH) onto which a paging signal is mapped. The structure of the physical multicast channel (PMCH) onto which a paging signal is mapped is shown in FIG. 32. FIG. 32($a$) is a view showing the PMCH in which an area used for paging signal is disposed, and shows that MBMS-related information and the paging signal are included on the PMCH. The MBMS-related information and the paging signal can exist as information elements in an MTCH and an MCCH respectively, or time-division multiplexing of physical areas (resources) onto which the MBMS-related information and the paging signal are mapped respectively can be carried out. FIG. 53 is an explanatory drawing showing a mapping method in a case of carrying, as information elements, the MBMS-related information and the paging signal onto the multicast control channel (MCCH). MBMS control information included in the MBMS-related information as well as the paging signal are mapped on the logical channel MCCH. The MCCH as well as the MTCH are mapped onto a multicast channel (MCH) which is a transport channel, and the MCH is mapped onto the physical multicast channel (PMCH) which is a physical channel. Thus, a mobile terminal which is receiving or trying to receive an MBMS service is enabled to receive the paging information when receiving the MCCH.

Figure 54:
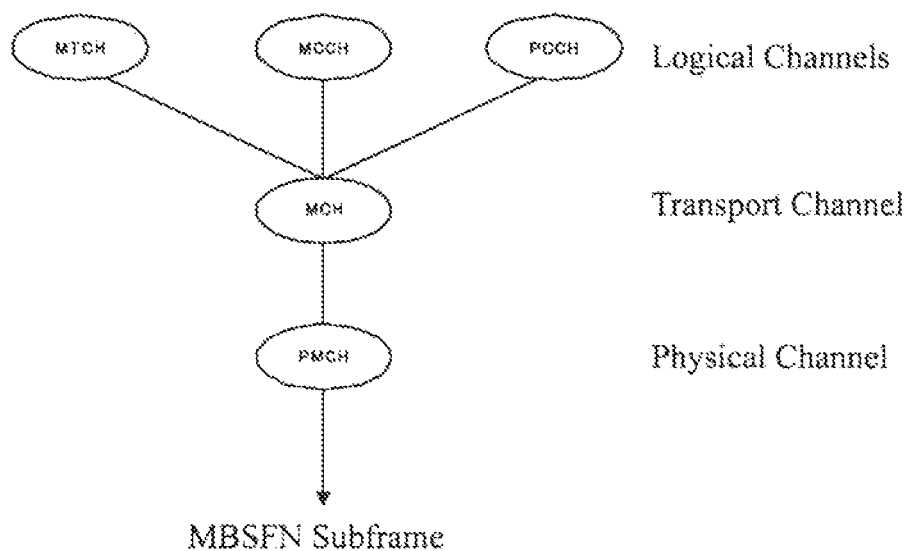
FIG. 54 is an explanatory drawing showing a mapping method in a case of multiplexing a logical channel PCCH with logical channels MTCH and MCCH to map them onto a transport channel MCH.
Figure 55:
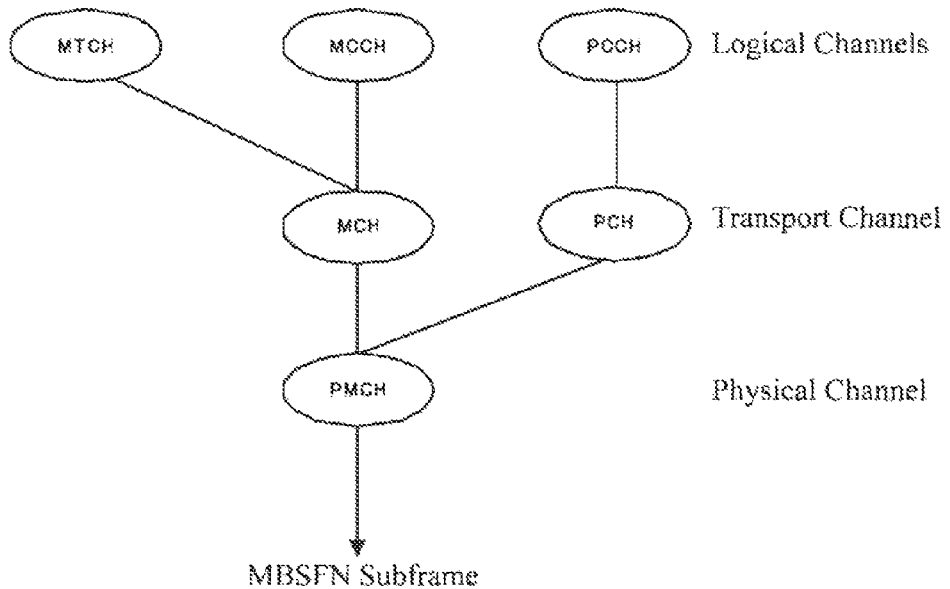
FIG. 55 is an explanatory drawing showing a mapping method in a case of mapping a logical channel PCCH onto a transport channel PCH, carrying out multiplexing of logical channels MTCH and MCCH to map them onto a transport channel MCH, and further multiplexing the PCH and the MCH to map them onto a physical multicast channel.

Another example will be explained. FIG. 54 is an explanatory drawing showing a mapping method in a case of multiplexing a logical channel PCCH and the logical channels MTCH and MCCH to carry them on the transport channel MCH. In FIG. 54, the paging signal is mapped onto the logical channel PCCH, and the MBMS-related information is mapped onto the MTCH and the MCCH. A base station can provide an MBSFN subframe onto which only the MTCH is mapped, and an MBSFN subframe onto which the MCCH and the PCCH are mapped. The base station can also control to provide an MBSFN subframe onto which only the MCCH is mapped, and an MBSFN subframe onto which only the PCCH is mapped. By doing in this way, the base station can transmit the MTCH and, the MCCH and PCCH separately in time from each other, and can further transmit the MCCH and the PCCH separately in time from each other. The mobile terminal has only to receive an MBSFN subframe including necessary information, and can therefore carry out a DRX operation during a time period during which it receives an MBSFN subframe including unnecessary information. Furthermore, an MBSFN subframe onto which the MCCH is carried and an MBSFN subframe onto which the PCCH is mapped can be arranged in such a way as to be adjacent to each other in time. For example, the base station carries out scheduling in such a way that the MBSFN subframe onto which the PCCH is mapped is arranged successively after (or before) the MBSFN subframe onto which the MCCH is mapped. A mobile terminal which is receiving or trying to receive an MBMS can know the receiving times of receiving the MCCH and the PCCH respectively from the MCCH repetition period length by making the MCCH and the PCCH be arranged continuously in order to receive the MCCH. Therefore, a mobile terminal which is receiving or trying to receive an MBMS can receive the paging signal successively at the time of receiving the MCCH. Furthermore, because no MTCH is placed between the MCCH and the PCCH, when the terminal is not receiving the MTCH, the terminal can receive the PCCH without making a transition to a DRX operation. As another example, a method of using the MCH and a PCH is shown in FIG. 55. FIG. 55 is an explanatory drawing showing a mapping method in a case of carrying the logical channel PCCH on the transport channel PCH, carrying out multiplexing of the logical channels MTCH and MCCH to carry them on the transport channel MCH, and further multiplexing the PCH and the MCH to carry them onto the physical multicast channel. In FIG. 55, the paging signal is mapped onto the PCCH and this PCCH is mapped onto the transport channel PCH. Multiplexing of this PCH and the MCH is carried out, and they are mapped onto the PMCH. By doing in this way, the base station can transmit the PCH and the MCH separately in time from each other, and can further perform encoding on them independently from each other. Therefore, the mobile terminal can decode each of the PCH and the MCH independently at the time of reception of them.

All the cells in a certain MBSFN area carry the MCCH corresponding to this MBSFN area on the PMCH, and then carry out multi-cell transmission periodically at the MCCH repetition periods (MCCH repetition periods). A mobile terminal which is receiving or trying to receive an MBMS service which is transmitted via a multi-cell transmission scheme from cells in the above-mentioned MBSFN area receives the above-mentioned MCCH at regular intervals and also receives the contents of the MBMS service, information about the frame structure, etc., so that the mobile terminal can receive the MBMS service. Therefore, as disclosed by FIG. 53, by including the paging signal in this MCCH, a mobile terminal which is receiving or trying to receive an MBMS service is enabled to receive the paging information when receiving the MCCH. As a result, because the mobile terminal does not have to receive the paging separately at a time other than the time of receiving the MCCH, the mobile terminal can receive the paging without interrupting the reception of the MBMS service. Furthermore, during a time period during which the mobile terminal is not receiving the MCCH, and during a time period during which the mobile terminal is not receiving the MBMS service, the mobile terminal can carry out a discontinuous reception operation, thereby being able to reduce its power consumption.

In the case of the mapping method disclosed in FIG. 54, the MCCH and the PCCH can be configured in such a way that they are disposed in an identical MBSFN subframe, and an MBSFN subframe onto which the MCCH is mapped and an MBSFN subframe onto which the paging signal is mapped can be separated from each other in time and can be arranged in such a way as to be adjacent to each other in time. One feature of the present invention is that "a mobile terminal is enabled to, when seeing the MCCH, also see the PCCH". Therefore, when the MCCH and the PCCH are mapped onto an identical MBSFN subframe, the mobile terminal has only to receive the subframe, whereas when time division multiplexing of an MBSFN subframe onto which the MCCH is mapped and a subframe onto which the PCCH is mapped is carried out, it is preferable to make them be adjacent to each other. In the case of the mapping method disclosed in FIG. 55, what is necessary is just to make an MBSFN subframe onto which the MCCH is mapped, and an MBSFN subframe onto which the paging signal is mapped be adjacent in time to each other. For example, the base station carries out scheduling in such a way that an MBSFN subframe onto which the PCCH is mapped is arranged successively after (or before) an MBSFN subframe onto which the MCCH is mapped. In the case in which they are configured in this way, a mobile terminal which is receiving or trying to receive an MBMS service is enabled to receive the paging signal continuously when receiving the MCCH. As a result, because the mobile terminal does not have to separately receive the paging signal at a time other than the time of receiving the subframe onto which the MCCH and the PCCH are mapped, the mobile terminal can receive the paging signal without interrupting the reception of the MBMS service. Furthermore, during a time period during which the mobile terminal is not receiving the MCCH, and during a time period during which the mobile terminal is not receiving the MBMS service, the mobile terminal can carry out a discontinuous reception operation, thereby being able to reduce its power consumption.

The configuration of disposing an indicator indicating whether or not the MBMS control information has been changed, and an indicator indicating whether or not the paging signal has been transmitted is shown in FIG. 32($b$). Either or both of these indicators can be disposed. The indicator indicating whether or not the MBMS control information has been modified is referred to as the "MBMS-related information modified or unmodified indicator", and the indicator indicating whether the paging signal has been transmitted is referred to as the "paging signal presence or absence indicator". A physical area onto which the indicators are mapped can be disposed in an MBSFN subframe via which the PMCH is transmitted. As an alternative, a physical area onto which the indicators are mapped can be the one adjacent in time to the MBSFN subframe via which the PMCH is transmitted. By configuring the physical area onto which the indicators are mapped in this way, each mobile terminal can receive and decode the MCCH and the paging signal which are mapped onto the PMCH immediately after receiving the indicators. For example, 1-bit information is defined as each of the indicators. Each of the indicators is multiplied by an MBSFN-area-specific scrambling code or the like, and is mapped onto a predetermined physical area. In accordance with another method, for example, each of the indicators can be formed of an MBSFN-area-specific sequence, and can be mapped onto a predetermined physical area. When an incoming call to a mobile terminal is occurring, the corresponding paging signal presence or absence indicator is set to "1", whereas when no incoming call to the mobile terminal is occurring, the paging signal presence or absence indicator is set to "0". Furthermore, for example, when the MBMS control information which is mapped onto the MCCH has been changed due to a change in the contents of the MBMS service transmitted in the MBSFN area, or the like, the MBMS-related information modified or unmodified indicator is set to "1". The length of a time period (referred to as an MBMS modification period) during which the MBMS-related information can be modified is determined, and the MBMS-related information modified or unmodified indicator "1" is transmitted repeatedly within this MBMS modification period. This MBMS modification period length, the start timing (the SFN and the starting point), etc. can be predetermined. As an alternative, they can be informed via broadcast information from either the serving cell using a unicast service or the MBMS dedicated cell. When there is no further modification in the MBMS-related information after the expiration of the MBMS modification period, the MBMS-related information modified or unmodified indicator is set to "0".

The mobile terminal can determine whether or not there is a modification in the MBMS-related information which exists in the MCCH and whether or not the paging signal exists by receiving the indicators within either an MBSFN subframe via which the PMCH of a desired MBSFN area is transmitted via a multi-cell transmission scheme, or an adjacent MBSFN subframe, and performing de-spreading and so on each of the indicators to determine whether or not each of the indicators is 1 or 0. By thus disposing the indicators, when there is no modification in the MBMS control information and when no paging signal exists, the mobile terminal does not have to receive and/or decode all the information on the PMCH. Therefore, it becomes able to reduce the power for receiving of the mobile terminal. The physical area onto which the MBMS-related information modified or unmodified indicator indicating whether the MBMS control information has been modified is mapped can be the first one of one or more MBSFN subframes onto which the MBMS control information is mapped. As an alternative, the physical area onto which the MBMS-related information modified or unmodified indicator indicating whether the MBMS control information has been modified is mapped can be an OFDM (Orthogonal Frequency Division Multiplexing) symbol at the head of the above-mentioned first MBSFN subframe. As a result, the mobile terminal becomes able to determine whether a modification has occurred in the MBMS control information by receiving the first OFDM symbol.

Furthermore, the physical area onto which the paging signal presence or absence indicator indicating whether or not the paging signal exists is mapped can be the first one of one or more MBSFN subframes onto which the paging signal is mapped. As an alternative, the physical area onto which the MBMS-related information modified or unmodified indicator indicating whether the MBMS control information has been modified is mapped can be an OFDM symbol at the head of the above-mentioned first MBSFN subframe. As a result, the mobile terminal becomes able to determine whether or not the paging signal exists by receiving the first OFDM symbol. By mapping each indicator onto such a physical area as mentioned above, when there is no modification in the MBMS control information and when no paging signal exists, the mobile terminal does not have to receive and/or decode subsequent OFDM symbols. Therefore, it becomes able to further reduce the power for receiving of the mobile terminal. Furthermore, because the mobile terminal can determine whether there is no modification in the MBMS control information or whether a paging signal exists at an earlier time from the first MBSFN subframe or the OFDM symbol at the head of the first MBSFN subframe, the mobile terminal can receive the MBMS control information immediately or can receive the paging signal immediately, it becomes able to reduce the control delay in the mobile terminal. The MBMS-related information modified or unmodified indicator and the paging signal presence or absence indicator can be mapped onto an identical physical area, or can be mapped onto different physical areas. In the case in which the indicators are mapped onto an identical physical area, what is necessary is just to implement an OR logical operation on the indicators. As a result, each mobile terminal has only to receive a single indicator, there is provided an advantage of being able to simplify the receiving circuit configuration. In contrast, in the case in which the indicators are mapped onto different physical areas, each mobile terminal has only to receive only a required one of the indicators without having to receive the other indicator. Therefore, the power for receiving of the mobile terminal can be further reduced, and the delay time occurring in the reception of the required information can be further reduced. For example, when the mobile terminal is set so as not to receive a paging signal while receiving an MBMS service, the mobile terminal has only to receive the MBMS-related information modified or unmodified indicator, and can therefore eliminate the necessity to receive the paging signal presence or absence indicator. The lengths of the repetition periods of the indicators can be the same as each other, or can be different from each other. The length of the repetition period of each of the indicators can be the same as that of the MCCH, or can be different from that of the MCCH. For example, the MBMS-related information modified or unmodified indicator can be disposed in the PMCH onto which the MCCH is mapped once for every plural times the PMCH is transmitted.

The lengths of the repetition periods of the indicators are referred to as the paging signal presence or absence indicator repetition period (Repetition period) and the MBMS-related modified or unmodified indicator repetition period (Repetition period), respectively. The start timing (the SFN and the starting point) of the MBSFN subframe in which the indicator exists, the subframe number, the repetition period lengths of the indicators, and so on can be informed via broadcast information from the serving cell using a unicast service, can be informed via broadcast information from the MBMS dedicated cell, or can be predetermined. The channel dedicated to the MBMS-related information modified or unmodified indicator can be an MICH (MBMS Indicating CHannel), for example. Furthermore, the paging signal presence or absence indicator can be formed in the MICH. The length of the repetition period of the paging signal presence or absence indicator can be the same as that of the repetition period of the MICH (MICH Repetition period), or can be different from that of the MICH. The notification of the indicators can be made by using the same method as that described previously. As a result, the time when each indicator is transmitted is not limited to the time when the MCCH is transmitted, and therefore it becomes able to design the system with flexibility.

In a case in which the paging signal is included in the PMCH, there arises a problem that when the number of mobile terminals for each of which an incoming call is occurring becomes huge, it takes too much time for each mobile terminal to detect a paging signal destined for the mobile terminal itself. A further problem is that any area onto which the paging signals for all the mobile terminals for each of which an incoming call is occurring are to be mapped cannot be ensured in a certain physical area onto which the paging signals are to be mapped. In order to solve these problems, a method of carrying out paging grouping will be disclosed hereafter. The method of carrying out paging grouping is shown in FIG. 32(c). All the mobile terminals are divided into K groups, and a paging signal presence or absence indicator is disposed for each of the groups. A physical area used for paging signal presence or absence indicator is divided into K parts, and the paging signal presence or absence indicators of the K groups are mapped onto the K divided parts of the physical area respectively. In this case, K can have a value ranging from 1 to the number of all the mobile terminals. When an incoming call to a mobile terminal is occurring, the paging signal presence or absence indicator of the group to which this mobile terminal belongs is set to "1". When no incoming call to any of all the mobile terminals belonging to a group is occurring, the paging signal presence or absence indicator of this group is set to "0". A repetition or the like of the same paging signal presence or absence indicator value can be carried out so that each of corresponding mobile terminals satisfies a desired error rate of reception. The physical area onto which paging signals are mapped is also divided into K parts, and these K parts are brought into correspondence with the above-mentioned K groups respectively. As the paging signal destined for each mobile terminal, an identifier of the mobile terminal (an identification number or an identification code) can be provided. Each of the K divided pieces of the physical area is the sum of the corresponding group's mobile terminals' physical areas in each of which paging signal data required by one mobile terminal is accommodated. The number of mobile terminals in each group can be identical to that in any other group, or can be different from that in any other group.

The number of mobile terminals in each group is calculated by using, for example, a method of calculating the average of measurements of the number of mobile terminals for each of which an incoming call has occurred simultaneously. As an alternative, a method of defining the number of mobile terminals which can be allocated to one OFDM symbol as the number of mobile terminals in each group, and then bringing a plurality of OFDM symbols into correspondence with the plurality of groups respectively can be used. When an incoming call to a mobile terminal is occurring, "1" is set to the paging signal presence or absence indicator of the group to which this mobile terminal belongs, and the paging signal presence or absence indicator is mapped onto the physical area corresponding to this group and used for the paging signal presence or absence indicator. In addition, the paging signal destined for the mobile terminal for which an incoming call is occurring is mapped onto the physical area of the paging signal corresponding to the group to which this mobile terminal belongs. The mapping of the paging signal to the physical area is carried out by using a method of multiplying the paging signal destined for each mobile terminal by an identification code specific to this mobile terminal. The paging signal destined for each mobile terminal can be an identifier of the mobile terminal. In this case, the above-mentioned control operation of multiplying the paging signal destined for each mobile terminal by the identification code specific to the mobile terminal can be omitted.

As the identification code specific to each mobile terminal, a code specific to each cell is used when unicast transmission is performed. A problem is, however, that in a case in which the mobile-terminal-specific identification code is specific to each cell having a frequency layer dedicated to MBMS, the same data is not transmitted from each cell when MC transmission is carried out in an MBSFN area, and therefore each mobile terminal becomes unable to receive the data from the serving cell because a transmission signal from another cell acts as noise and the quality of reception degrades. In order to solve this problem, in accordance with the present invention, the identification code specific to each mobile terminal is defined as to be specific to each MBSFN area. As a concrete example, the mobile terminal identification code is disposed for each MBSFN area, and this mobile terminal identification code is transmitted in advance to mobile terminals to each of which a paging signal can be transmitted from the MBSFN area. As an alternative, the mobile terminal identification code can be derived from an IMSI or an MBSFN area ID. A method of deriving the mobile terminal identification code can be predetermined. The network side and each mobile terminal side can derive the mobile terminal identification code by using an identical parameter and an identical computation expression. Accordingly, it is not necessary to transmit the mobile terminal identification code specific to each MBSFN area from the network side to each mobile terminal. Therefore, there is provided an advantage of being able to reduce the amount of signaling. This mobile-terminal-specific identification code specific to each MBSFN area can be broadcast as broadcast information from neither the unicast cell nor the MBMS dedicated cell because the mobile-terminal-specific identification code is dedicated information. Therefore, what is necessary is just to derive the mobile-terminal-specific identification code by using a mobile-terminal-specific number, such as an MBSFN area ID or an IMSI. What is necessary is to derive the mobile terminal identification number specific to each MBSFN area by using an identical computation expression in both the network side (an MME and an MCE) and each mobile terminal. The computation expression can be predetermined. As a result, it becomes able to use the identification code specific to each MBSFN area as this mobile-terminal-specific identification code, and therefore each mobile terminal becomes able to receive the paging signal destined for the mobile terminal itself.

In accordance with another method, the MME derives the mobile-terminal-specific identification code specific to each MBSFN area by using a specific identification number and the MBSFN area ID of each mobile terminal, transmits the mobile-terminal-specific identification code to each mobile terminal via the serving cell, and further transmits the mobile-terminal-specific identification code to the MCE. For example, the MME transmits the mobile-terminal-specific identification code to each mobile terminal via the serving cell by using attach accept as shown in steps ST1716 to ST1718. The method of transmitting the mobile-terminal-specific identification code to each mobile terminal via the serving cell is not limited to the use of the attach accept. For example, the MME can transmit the mobile-terminal-specific identification code to each mobile terminal by using an dedicated signal (a DCCH, a DTCH, or the like). As an alternative, the MME can transmit the mobile-terminal-specific identification code to each mobile terminal by using a paging request which the MME transmits to the MCE, for example, in ST1776. The MCE can transmit the mobile-terminal-specific identification code to the MBMS dedicated cell, together with the paging request of ST1780. In this case, because the mobile-terminal-specific identification code is transmitted together with the paging request, control operations performed by the MME, the MCE, and the MBMS dedicated cell can be simplified. The MME is allowed to derive the mobile-terminal-specific identification number defined for each MBSFN area by using a specific identification number and the MBSFN area ID of each mobile terminal. The method of making the mobile terminal identification code be specific to each MBSFN area is not applied limitedly to this embodiment. The method of making the mobile terminal identification code be specific to each MBSFN area can also be applied to a case of, when carrying out multi-cell (MC) transmission of data in each MBSFN area, multiplying the data by the mobile-terminal-specific identification code. Two or more mobile-terminal-specific identification codes specific to each mobile terminal can be defined for each MBSFN area. The two or more mobile-terminal-specific identification codes can be put to different uses. For example, two different mobile-terminal-specific identification codes specific to each mobile terminal are provided for each MBSFN area, and one of them is used for the paging signal and the other identification code is used for the MBMS control information. By providing two different mobile-terminal-specific identification codes in this way, the paging signal which is transmitted via an MC transmission scheme in the MBSFN area is separated into parts respectively destined for mobile terminals and each of the mobile terminals can receive the paging signal destined for the mobile terminal itself.

Furthermore, the physical area onto which the indicator showing whether the paging signal has been transmitted (e.g., the paging signal presence or absence indicator) is mapped can be an MBSFN subframe onto which the paging signal is mapped. By thus defining an MBSFN subframe onto which the paging signal is mapped as the physical area onto which the indicator showing whether the paging signal has been transmitted is mapped, both of the information about the scheduling of the MBSFN subframe in which the paging signal presence or absence indicator exists (e.g., the leading one of MBSFN frames, the length of the period of the MBSFN frames, etc.), and the information about the scheduling of the MBSFN subframe in which the paging signal exists do not have to be notified or predetermined, though only one of them can be notified or predetermined. Therefore, it becomes able to simplify a control operation of controlling the paging process, and there is provided another advantage of being able to reduce the amount of signaling between the network side or the base station and each mobile terminal.

Each mobile terminal determines whether an incoming call destined for the group to which the mobile terminal itself belongs is occurring by receiving the paging signal presence or absence indicator of the group to which the mobile terminal itself belongs. Each mobile terminal receives and decodes (Decodes) the physical area onto which the paging signal brought into correspondence with the group onto which the mobile terminal belongs is mapped when determining that an incoming call destined for the group to which the mobile terminal itself belongs is occurring. After decoding the physical area, each mobile terminal carries out an operation of calculating a correlation with the identification code specific to the mobile terminal to carry out blind detection to specify the paging signal destined for the mobile terminal itself. As a result, each mobile terminal becomes able to determine that an incoming call to the mobile terminal itself is occurring. When each mobile terminal has not detected the paging signal destined therefor, the mobile terminal determines that no incoming call thereto is occurring. By grouping all the mobile terminals into the K groups, the necessity for each of the mobile terminals to receive all of the area used for paging signal can be eliminated, and each of the mobile terminals has only to receive only a required area, i.e., a physical area corresponding to the group to which the mobile terminal itself belongs. Therefore, the length of time required for each of the mobile terminals to detect the paging signal destined therefor can be shortened. Furthermore, because each of the mobile terminals does not have to receive a physical area corresponding to any other group to which the mobile terminal itself does not belong, the power for receiving of each of the mobile terminals can be reduced. In addition, by using the paging signal presence or absence indicator corresponding to each group, also when there are many mobile terminals, the paging signal presence or absence indicators can be provided by using a small amount of physical resources. Furthermore, each of the mobile terminals has only to receive an area used for the paging signal as needed. Therefore, while the power for receiving of each of the mobile terminals can be reduced, the control delay time can also be reduced because each of the mobile terminals can make a transition to the next operation immediately when it does not have to receive the paging signal.

In above-mentioned Embodiment, each of the K divided pieces of the physical area onto which paging signals are mapped is the sum of the corresponding group's mobile terminals' physical areas in each of which paging signal data required by one mobile terminal is accommodated. However, because the required physical area becomes very large and the overhead for transmitting the MBMS service increases greatly as the number of mobile terminals becomes huge, the transmission rate of the MBMS service data decreases. In order to prevent this problem, the paging signal destined for each of the mobile terminals is multiplied by an identification code specific to the mobile terminal itself. As a result, because each of the mobile terminals becomes able to carry out blind detection of whether or not it is information destined for the mobile terminal itself by using the identification code specific to the mobile terminal, it becomes unnecessary to fix the physical area onto which the paging signal destined for each of the mobile terminals is mapped in advance. Therefore, there is no necessity to provide a physical area used for the paging signals destined for all the mobile terminals, and a physical area which is large enough to map paging signals destined for a certain number of mobile terminals for each of which an incoming call is predicted to actually occur has only to be provided. As an example, there is a method of defining the average of measurements of the number of mobile terminals for each of which an incoming call has occurred simultaneously as the number of mobile terminals to be included in each group. By using this method, it becomes able to use the limited amount of physical resources effectively. Furthermore, by using the above-mentioned method, the mobile communication system can flexibly deal with even a case in which the number of mobile terminals for each of which an incoming call is occurring becomes larger than a predicted number through scheduling in the base station. For example, the mobile communication system can transmit a paging signal destined for a mobile terminal currently receiving a new incoming call on the next PMCH.

When the number of all the mobile terminals is small, only the paging signal presence or absence indicators can be transmitted by setting the value of K to be equal to the number of all the mobile terminals. In this case, there is no necessity to ensure any paging-related physical area, and what is necessary is just to ensure the physical area used for the paging signal presence or absence indicators and corresponding to the number of all the mobile terminals. Therefore, the efficiency of the radio resources can be improved. Furthermore, in this case, there exists a physical area used for a paging signal presence or absence indicator and corresponding to each mobile terminal. Therefore, each of the mobile terminals can determine the presence or absence of an incoming call without receiving the area used for the paging signal by simply receiving and decoding the physical area used for the paging signal presence or absence indicator and corresponding to the mobile terminal itself, thereby being able to reduce the control delay time occurring when performing the paging operation.

FIG. 33 is an explanatory drawing showing a method of mapping a paging signal onto an area on a physical multicast channel. In FIG. 33, paging signals destined for mobile terminals n1, n2, and so on for each of which an incoming call, such as a voice call, is occurring, among mobile terminals belonging to a paging group n, are mapped onto a physical area corresponding to this group n. The base station multiplies the paging signal destined for each of the mobile terminals by an identification code specific to this mobile terminal (a number or a sequence), carries out CRC (Cyclic Redundancy Check) addition, and carries out a process including encoding (Encode) and rate matching. The result of the series of processes carried out is allocated to control channel elements (CCEs: Control Channel Elements) each having a size corresponding to the size of the physical area onto which the paging signals are mapped, and a plurality of control channel elements whose number is equal to that of the mobile terminals for each of which an incoming call is occurring are connected to one another. The connected result is subjected to a scrambling process using an MBSFN-area-specific scrambling code (Scrambling code), a modulation process, etc. The modulation process can be specific to the MBSFN area. The result of carrying out these processes is mapped onto the physical area corresponding to the paging group n. In this case, the base station sets "1" to the paging signal presence or absence indicator (indicator 1) of the paging group n, and then maps it onto the physical area corresponding to the paging group n of the paging signal presence or absence indicator.

The physical area corresponding to the paging group n can be predetermined, or can be informed, as broadcast information, from either the unicast side serving cell or the MBMS dedicated cell to the base station. Each of the mobile terminals receives the paging signal presence or absence indicator of the paging group to which the mobile terminal itself belongs, and, when the paging signal presence or absence indicator has a value of "1", receives the physical area used for the paging signal corresponding to this paging group. Each of the mobile terminals receives the physical area used for the paging signal, carries out demodulation and descrambling (Descramble) using the MBSFN-area-specific scrambling code, and divides the result of the demodulation and descrambling into parts each corresponding to a control information element unit. Each of the mobile terminals carries out blind detection of the paging signal destined for the mobile terminal itself by performing a process including decoding (Decode) on each of the divided parts each corresponding to a control information element unit, and then carries out an operation of calculating a correlation with the mobile-terminal-specific identification number. When the result of the correlation operation is larger than a certain threshold, each of the mobile terminals determines that there is paging destined for the mobile terminal itself, and starts an operation of receiving a paging incoming call with the paging signal. In contrast, when the result of the correlation operation is equal to or smaller than the certain threshold, each of the mobile terminals determines that there is no paging destined for the mobile terminal itself, and makes a transition to reception of MBMS-related information or makes a transition to a discontinuous reception operation if there is no necessity to receive any MBMS-related information. To which group each of the mobile terminals belongs can be determined by using a predetermined determining method, or can be informed, as broadcast information, from either the serving cell using a unicast service or the MBMS dedicated cell to the mobile terminal itself via an upper layer.

In the above-mentioned example, the paging signal destined for each of the mobile terminals is allocated to a control information element unit having a size corresponding to the size of the physical area onto which the paging signal is to be mapped. As an alternative, the paging signal destined for each of the mobile terminals can be allocated to a transport block unit. In the case in which the paging signal destined for each of the mobile terminals is allocated to a transport block unit, the physical resource to which the paging signal is allocated can be increased or decreased according to the amount of information, and the allocation to the physical area can be carried out with flexibility.

FIG. 34 shows another example of the method of mapping paging signals onto the physical area on the PMCH onto which the paging signals are to be mapped. Paging signals to mobile terminals n1, n2, and so on for each of which an incoming call is occurring, among mobile terminals belonging to a paging group n, are mapped onto a physical area corresponding to this group n. The base station performs CRC addition on the paging signal destined for each of the mobile terminals, and carries out a process including encoding and rate matching. The result of these processes performed on the paging signal is multiplied by an identification code (number) specific to the above-mentioned mobile terminal. This mobile-terminal-specific identification code is a scrambling code having orthogonality which is established among the results of the processes by the scrambling codes of mobile terminals. The base station carries out multiplexing of the results of the processes by the scrambling codes, the number of the multiplexed results of the processes by the scrambling codes being equal to the number of mobile terminals for each of which an incoming call is occurring. The base station then performs a scrambling process using an MBSFN-area-specific scrambling code, a modulation process, etc. on the result of the multiplexing. The modulation process can be specific to the MBSFN area. The result of carrying out these processes is mapped onto the physical area corresponding to the paging group n. In this case, the base station sets "1" to the paging signal presence or absence indicator of the paging group n, and then maps it onto the physical area corresponding to the paging group n of the paging signal presence or absence indicator. The physical area corresponding to the paging group n can be predetermined, or can be informed, as broadcast information, from either the unicast side serving cell or the MBMS dedicated cell to the base station. Each of the mobile terminals receives the paging signal presence or absence indicator of the paging group to which the mobile terminal itself belongs, and, when the paging signal presence or absence indicator has a value of "1", receives the physical area used for the paging signal corresponding to this paging group. Each of the mobile terminals receives the physical area used for the paging signal, and carries out demodulation and descrambling using the MBSFN-area-specific scrambling code. Each of the mobile terminals carries out blind detection of the paging signal destined for the mobile terminal itself by carrying out an operation of calculating a correlation with descrambling and the mobile-terminal-specific identification number. When the result of the correlation operation is larger than a certain threshold, each of the mobile terminals determines that there is paging destined for the mobile terminal itself, and starts an operation of receiving a paging incoming call with the decoded paging signal. In contrast, when the result of the correlation operation is equal to or smaller than the certain threshold, each of the mobile terminals determines that there is no paging destined for the mobile terminal itself, and makes a transition to reception of MBMS-related information or makes a transition to a discontinuous reception operation if there is no necessity to receive any MBMS-related information. To which group each of the mobile terminals belongs can be determined by using a predetermined determining method, or can be informed, as broadcast information, from either the serving cell using a unicast service or the MBMS dedicated cell to the mobile terminal itself via an upper layer. Instead of the paging signals described in FIGS. 33 and 34, a transport channel onto which the paging signals are mapped can be provided. This method can also be applied to the subsequent embodiments. What is necessary is to use information onto which the paging signals are carried, the information being paging-related information which each mobile terminal requires when receiving a paging.

Some methods each of mapping paging signals onto an area on the PMCH on which the paging signals are to be mapped are disclosed, though the mapping can be alternatively performed in such a way that the above-mentioned area onto which the paging signals are to be mapped is an arbitrary predetermined area, a localized area (a physical area continuous on the frequency axis), or distributed areas (physical areas distributed on the frequency axis).

In the above-mentioned example, the base station is configured in such a way as to multiply the paging signal destined for each mobile terminal by a mobile-terminal-specific identification number or a scrambling code. Because the base station is configured in this way, when the amount of information of the paging signal is the same at each of the mobile terminals, it becomes able to equalize the sizes of the areas of the control information element units to be allocated by making the process including encoding (Encode) and rate matching be common among the mobile terminals. Therefore, because the sizes of the areas of the control information element units on which each mobile terminal performs blind detection are limited to a single one, the number of times that the blind detection is carried out can be reduced and the time required for each mobile terminal to perform the blind detection can also be shortened. Therefore, there is provided an advantage of accomplishing reduction in the circuit configuration of each mobile terminal, reduction in the power consumption of each mobile terminal, and reduction in the control delay time occurring in each mobile terminal.

By multiplying the paging signal destined for each of the mobile terminals by the mobile-terminal-specific identification number or the scrambling code, and then mapping it onto the area of the PMCH onto which the paging signal is mapped for each paging group, as mentioned above, the necessity for each of the mobile terminals to receive all of the area used for paging signals can be eliminated, and each of the mobile terminals has only to receive only a required area, i.e., a physical area corresponding to the group to which the mobile terminal itself belongs. Therefore, the length of time required for each of the mobile terminals to detect the paging signal destined therefor can be shortened. Furthermore, because each of the mobile terminals does not have to receive the physical area corresponding to any other group to which the mobile terminal itself does not belong, the power for receiving of each of the mobile terminals can be reduced. In addition, by using the paging signal presence or absence indicator corresponding to each group, also when there are many mobile terminals, the paging signal presence or absence indicators can be provided by using a small amount of physical resources. Furthermore, each of the mobile terminals has only to receive an area used for the paging signal as needed. Therefore, while the power for receiving of each of the mobile terminals can be reduced, the control delay time can also be reduced because each of the mobile terminals can make a transition to the next operation immediately when it does not have to receive the paging signal. As a result, because each of the mobile terminals becomes able to carry out blind detection of whether or not it is information destined for the mobile terminal itself by using the identification code specific to the mobile terminal or the scrambling code, it becomes unnecessary to fix the physical area onto which the paging signal destined for each of the mobile terminals is mapped in advance. Therefore, there is no necessity to provide a physical area used for the paging signals destined for all the mobile terminals, and a physical area which is large enough to map paging signals destined for a certain number of mobile terminals for each of which an incoming call is predicted to actually occur has only to be provided. By using this method, it becomes able to use the limited amount of physical resources effectively. Furthermore, by using the above-mentioned method, the mobile communication system can flexibly deal with even a case in which the number of mobile terminals for each of which an incoming call is occurring becomes larger than a predicted number through scheduling in the base station. For example, the mobile communication system can transmit a paging signal destined for a mobile terminal currently receiving a new incoming call on the PMCH onto which the next MCCH is mapped.

In the above-mentioned example, the base station multiplies the paging signal destined for each mobile terminal by a mobile-terminal-specific identification number. As an alternative, the base station can use a method of multiplying a CRC, instead of the paging signal, by a mobile-terminal-specific identification number. The method of multiplying a CRC by a mobile-terminal-specific identification number is effective for a case in which the amount of information of the paging signal destined for each of the mobile terminals differs.

Furthermore, in the above-mentioned example, by carrying out the process of multiplying the paging signal destined for each of the mobile terminals by the identification code specific to this mobile terminal, the base station enables each of the mobile terminals to carry out blind detection of the paging information destined for the mobile terminal itself. The base station can alternatively use another processing method of adding the paging signal destined for each of the mobile terminals and the identification number specific to this mobile terminal. For example, in the process 1 shown in FIG. 33, the base station can alternatively use the other processing method of adding the paging signal destined for each of the mobile terminals and the identification number specific to this mobile terminal, instead of multiplying the paging signal by the identification number. In this case, each of the mobile terminals receives the physical area used for the paging signal, carries out demodulation and descrambling using the MBSFN-area-specific scrambling code, and divides the result of the demodulation and descrambling into parts each corresponding to an information element unit, and performs a process including decoding on each of the divided parts each corresponding to an information element unit. Each of the mobile terminals then determines whether the mobile-terminal-specific identification number exists in the information on which the mobile terminal itself has performed the process including decoding to detect the paging signal destined therefor. By configuring the processing in this way, the same advantages as those as mentioned above are provided.

In the above-mentioned example, the mapping method of mapping paging signals onto a physical area is disclosed. This method can be applied to also a case of mapping an indicator showing whether or not a paging signal has been transmitted onto a physical area. Furthermore, in the above-mentioned example, the base station multiplies the paging signal destined for each mobile terminal by the identification number specific to the mobile terminal. The base station can multiply the indicator showing whether or not the paging signal has been transmitted by the mobile-terminal-specific identification code (UE-ID or RNTI), or can add the mobile-terminalspecific identification code to the indicator. Furthermore, the base station is configured in such a way as to add a CRC to the indicator showing whether or not the paging signal has been transmitted, and can also use a method of multiplying the CRC by the mobile-terminal-specific identification number. As a result, because each of the mobile terminals becomes able to carry out blind detection of whether or not it is information destined for the mobile terminal itself by using the identification code specific to the mobile terminal, it becomes unnecessary to fix the physical area onto which the indicator showing whether or not the paging signal destined for each of the mobile terminals has been transmitted is mapped in advance. Furthermore, the physical area onto which this indicator can be mapped can be predetermined, or can be broadcast. By thus predetermining or broadcasting the physical area, the physical resources can be used with flexibility. As will be mentioned below, these methods are effective for not a case in which the indicator showing whether the paging signal has been transmitted is 1-bit information, but a case in which the amount of information transmitted to each of the mobile terminals, such as information about allocation of a paging message, differs.

When mapping the paging signal onto the PMCH, it is necessary to distinguish the paging signal from other information, e.g., an MCCH and an MTCH. In the above-mentioned method, by disposing the physical area used for the paging signal, or multiplying the paging signal by the mobile-terminal-specific identification number or adding this identification number to the paging signal, the paging signal is distinguished from other information. In accordance with another method, each information which is to be mapped onto the PMCH can be multiplied by an identifier (ID) specific to the type of the information. As an alternative, only a specific type of information can be multiplied by an identifier specific to the specific type of information. Because an identifier specific to a specific type of information is used for MBSFN subframes which are transmitted via a multi-cell transmission scheme, unlike in the case of unicast communications, an identical identifier specific to a specific type of information needs to be transmitted from a plurality of cells which carry out multi-cell transmission. For example, an identifier specific to each identical information type is used in each MBSFN area. As a concrete example, a case in which a paging signal, an MCCH, and an MTCH are transmitted via the PMCH from the MBMS dedicated cell is considered. The MBMS dedicated cell multiplies the paging signal by an identifier used for the paging signal, multiplies the MCCH by an identifier for the MCCH, multiplies the MCCH by an identifier for the MCCH, and transmits them by using the PMCH. A mobile terminal which needs to receive the paging signal, among mobile terminals being served by the MBMS dedicated cell, carries out blind detection of the paging signal by using the identifier for the paging signal. A mobile terminal which needs to receive the MTCH or MCCH, among the mobile terminals being served by the MBMS dedicated cell, carries out blind detection of the MTCH or MCCH by using the identifier for the MTCH or MCCH. As a result, there can be provided an advantage of enabling such a mobile terminal to receive required information when the mobile terminal requires the information. Accordingly, there can be provided an advantage of reducing the power consumption of the mobile terminal. There can be provided a further advantage of preventing a control delay time from occurring in the mobile terminal. The identifier different for each information type can be predetermined, or can be broadcast via broadcast information from the serving cell. As an alternative, the identifier different for each information type can be broadcast from the MBMS dedicated cell. Furthermore, because each of the mobile terminals becomes able to carry out blind detection when the paging signal is multiplied by or added to the mobile-terminal-specific identifier, it becomes unnecessary to fix the physical area onto which the paging signal destined for each of the mobile terminals is mapped in advance. Therefore, the mapping can be carried out with flexibility, and there is provided an advantage of improving the use efficiency of the physical resources.

By using the method of carrying paging signals on the PMCH which is disclosed above in this Embodiment 7, the mobile communication system can transmit the paging signals destined for all the mobile terminals each of which is receiving or trying to receive an MBMS service from the MBMS dedicated cell to make it possible for each of the above-mentioned mobile terminals to receive the paging signal from the MBMS dedicated cell.

Hereafter, a variant of this Embodiment 7 will be explained. In Embodiment 7, the method of, in order to enable each mobile terminal to receive the paging signal from the MBMS dedicated cell, carrying the paging signal on the PMCH of each MBSFN area is disclosed. The method of, when configuring the PMCH, carrying out either time division multiplexing (TDM) or code division multiplexing (CDM) for the PMCH of each MBSFN area is disclosed above. In the first variant which will be explained hereafter, a method of, when configuring the PMCH, carrying out both time division multiplexing (TDM) and code division multiplexing (CDM) for each MBSFN area.

FIG. 41 is an explanatory drawing showing the configuration of the PMCH disposed for each MBSFN area. In FIG. 41, both time division multiplexing (TDM) and code division multiplexing (CDM) are used for each MBSFN area. A cell #n1 is one located in an MBSFN area 1, a cell #n2 is one located in an MBSFN area 2, and a cell #n3 is one located in an MBSFN area 3. Furthermore, the cells #1, #2, and #3 also belong to an MBSFN area 4. Code division multiplexing of the PMCHs of the MBSFN areas 1, 2, and 3 is carried out, and time division multiplexing of the PMCHs of the MBSFN areas 1, 2, and 3 and the PMCH of the MBSFN area 4 is carried out. Because the cell #n1 belongs to the MBSFN area 1, the PMCH corresponding to the MBSFN area 1 is transmitted at a time. The PMCH is transmitted on an MBSFN subframe because the PMCH is transmitted via a multi-cell transmission scheme in each MBSFN area. A set of MBSFN frames to which MBSFN subframes are allocated is referred to as an "MBSFN frame cluster" (MBSFN frame cluster). In the MBMS dedicated cell, all subframes in an MBSFN frame can be MBSFN subframes used for multi-cell transmission. The length of each of the repetition periods at which the MBSFN frame cluster corresponding to a certain MBSFN area is repeated is expressed as the "MBSFN frame cluster repetition period" (MBSFN frame cluster repetition period). An MCH which is a transport channel for MBMS is mapped onto the PMCH, and either or both of a logical channel MCCH which is control information for MBMS and a logical channel MTCH which is data for MBMS are mapped onto the MCH.

The MCCH and the MTCH can be divided in time and mapped onto the PMCH, or can be divided in time and mapped onto a physical area which is transmitted via a multi-cell transmission scheme. For example, the MCCH and the MTCH can be mapped onto different MBSFN subframes which are the physical area onto which they are finally mapped. The MCCH can be mapped onto each MBSFN frame cluster, or only the MTCH can be mapped onto each MBSFN frame cluster. In a case in which only the MTCH is mapped onto the PMCH, the repetition period of the MCCH differs from the repetition period of the MBSFN frame cluster. Furthermore, there is a case in which a plurality of MCCHs are mapped onto an MBSFN frame cluster. The length of each of the repetition periods at which the MCCH is repeated is expressed as the "MCCH repetition period" (MCCH Repetition period). In FIG. 41, MCCH1 is MBMS control information for the MBSFN area 1, and MTCH1 is MBMS data for the MBSFN area 1. Similarly, MCCH2 is MBMS control information for the MBSFN area 2, MTCH2 are MBMS data for the MBSFN area 2, MCCH3 is MBMS control information for the MBSFN area 3, and MTCH3 is MBMS data for the MBSFN area 3. Code division multiplexing of the PMCH of the cell #n1, the PMCH of the cell #n2, and the PMCH of the cell #n3 is carried out, and they are transmitted at the same time. Because the cell #n1 (or the cell #n2 or #n3) belongs to the MBSFN area 1 (or 2 or 3) and the MBSFN area 4, time division multiplexing of the PMCH of the MBSFN area 1 (or 2 or 3) and the PMCH of the MBSFN area 4 is carried out. Because multi-cell transmission of the PMCH of the MBSFN area 4 is carried out in the MBSFN area 4, the transmission of the PMCH in each of the cells #n1, #n2, and #n3 is carried out at the same time. By thus using the method of carrying out both time division multiplexing and code division multiplexing for the PMCH of each MBSFN area, for example, time division multiplexing can be used for MBSFN areas which overlap one another and code division multiplexing can be used for MBSFN areas which do not overlap one another. Therefore, as compared with the case of using only time division multiplexing, the efficiency of the radio resources can be improved because code division multiplexing is used. Furthermore, as compared with the case of using only code division multiplexing, the mutual interference among MBSFN areas which overlap one another can be reduced and receive errors detected in MBMS data received by each mobile terminal can be reduced.

Next, the configuration of each PMCH which enables each mobile terminal to receive paging from the MBMS dedicated cell will be described. Both time division multiplexing and code division multiplexing are used for each MBSFN area. Therefore, two or more PMCHs transmitted from each cell also exist for each MBSFN area. In order to deal with a case in which two or more PMCHs for each MBSFN area exist in one cell, paging signals are configured in such a way as to be mapped onto the PMCHs corresponding to all the MBSFN areas. The method of including paging signals as shown in FIG. 32 can be applied to the PMCH of each MBSFN area. In accordance with this configuration, a mobile terminal which is being located in an area in which it can receive MBMS services provided by a plurality of MBSFN areas receives the MCCH of either one of the MBSFN areas from which the mobile terminal is receiving or trying to receive an MBMS service, so that the mobile terminal can receive paging when receiving the above-mentioned MCCH. Because the mobile terminal does not have to receive the MCCH of an MBSFN area providing an MBMS service different from the MBMS service which the mobile terminal is receiving, and can therefore carry out discontinuous reception, the mobile terminal can reduce its power consumption. As another method, a configuration of carrying a paging signal on the PMCH of one MBSFN area will be described. For example, the configuration is formed in such a way that an MCCH (P-MCCH) is mapped onto only the PMCH of the smallest one of MBSFN areas to which one cell belongs and no MCCH is mapped onto the PMCH of any other MBSFN area, and the method of carrying a paging signal as shown in FIG. 32 is applied to the PMCH of the smallest MBSFN area. MBMS control information about another MBSFN area is included in the MCCH (P-MCCH) mapped onto the PMCH of the smallest MBSFN area.

Because the configuration is formed in this way, even when, for example, the mobile terminal is receiving an MBMS service from either of the plurality of MBSFN areas, the mobile terminal becomes able to receive paging by receiving the MCCH (P-MCCH) of the smallest MBSFN area when receiving this MCCH (P-MCCH). In addition, the mobile terminal does not have to change the paging repetition period according to a change in the MBMS service to receive, in this case, the MCCH repetition period (MCCH repetition period), and can therefore simplify its control operation. In addition, because it becomes able to map only the MTCH onto the PMCH of another MBSFN area, there is provided an advantage of being able to improve the efficiency of the radio resources in the system. Furthermore, in accordance with an another method, the MCCH corresponding to another MBSFN area can also be mapped onto the PMCH of the smallest MBSFN area. Also in this case, the method of carrying a paging signal as shown in FIG. 32 can be applied to this PMCH. As a result, the same advantage is provided while each MCCH can be time-divided and mapped onto a physical area. Therefore, the mobile terminal can receive the MCCH of a desired MBSFN area, and carry out discontinuous reception of a physical area via which another MCCH is transmitted. A configuration of carrying a paging signal on the PMCH of one MBSFN area will be described as another method. For example, the configuration is formed in such a way that a primary MCCH (P-MCCH) is mapped onto the PMCH of an MBSFN area to which one cell belongs and a secondary MCCH (S-MCCH) is mapped onto the PMCH of another MBSFN area, and the method of carrying a paging signal as shown in FIG. 32 is applied to a PMCH onto which a PCCH is mapped. Because the configuration is formed in this way, even when, for example, the mobile terminal is receiving an MBMS service from either of the plurality of MBSFN areas, the mobile terminal becomes able to receive paging by receiving the P-MCCH when receiving this P-MCCH. In addition, the mobile terminal does not have to change the paging repetition period according to a change in the MBMS service to receive, in this case, the MCCH repetition period (MCCH repetition period), and can therefore simplify its control operation. As the method of mapping a paging signal onto a physical area on a PMCH onto which the paging signal is mapped, the method disclosed in FIG. 33 or 34 can be applied.

In above-mentioned Embodiment 7 and the variant, the case in which a plurality of cells exist in an MBSFN area is shown. The present invention can also be applied to a case in which the number of cells in an MBSFN area is only one. In this single cell, the PMCH configuration as disclosed in FIG. 32 and the method, as disclosed in FIG. 33, of mapping a paging signal onto a physical area on the PMCH onto which the paging signal is mapped can be applied. In the case in which only one cell exists in an MBSFN area, no SFN gain caused by typical multi-cell transmission is acquired even though transmission using the PMCH is carried out, though an MBMS service can be limited to a certain narrow area and it becomes able to provide a so-called spot service. In addition, there can be a case in which only one cell exists in an MBSFN area, and in this single cell, MBMS service data corresponding to this MBSFN area are not transmitted while only MBMS control information is transmitted. In this case, no MTCH is mapped onto the PMCH, but only the MCCH is mapped onto the PMCH. MBMS control information (MCCH) about another MBSFN area to which the single cell belongs can be included in the above-mentioned MCCH. Accordingly, because it becomes unnecessary to map each MCCH onto the PMCH of any other MBSFN area, the efficiency of the radio resources can be improved. In addition, because the mobile terminal receives only the MCCH corresponding to this MBSFN area, the mobile terminal becomes able to receive all MCCHs of one or more receivable MBSFN areas without receiving any other PMCH. Therefore, the mobile terminal can reduce the control delay time at the time of MBMS service reception. Furthermore, when the mobile terminal does not have to receive the MBMS service information about any other MBSFN area, the mobile terminal can carry out a discontinuous reception operation, thereby being able to reduce the power for receiving.

In this embodiment, the configuration of disposing the indicator showing whether or not the paging signal has been transmitted is disclosed. As an alternative, information about the allocation of the paging signal can be provided as this indicator. As a result, when a mobile terminal receives the information about the allocation of the paging signal to the mobile terminal itself, the mobile terminal can judge that paging is occurring. As an example of the information about the allocation of the paging signal, information showing a physical area onto which a paging signal transmitted via the same subframe, e.g., a paging message is mapped can be provided. By thus defining the information about the physical area as the allocation information, the mobile terminal which has received the information about the allocation of the paging message has only to receive only this physical area in order to receive the paging message, and therefore does not have to receive any other physical area. Therefore, the mobile terminal's power consumption at the time of receiving the paging message can be reduced. Furthermore, it becomes unnecessary to transmit beforehand the information about the physical area to which the paging signal is allocated to the mobile terminal via broadcast information or the like, and the amount of signaling can be reduced. Furthermore, because it becomes able to carryout the allocation of the paging signal to the physical area with flexibility, there is provided an advantage of improving the use efficiency of the radio resources.

Embodiment 8

In Embodiment 7, the method of, in order to enable a mobile terminal to receive paging from an MBMS dedicated cell in which any unicast service is not supported, carrying a paging signal onto a physical multicast channel (PMCH) of each MBSFN (Multimedia Broadcast multicast service Single Frequency Network) area is disclosed. In this Embodiment 8, a method of disposing a physical channel dedicated to paging which is transmitted via a multi-cell transmission scheme in an MBSFN area, and carrying a paging signal onto this physical channel will be disclosed.

Figure 56:
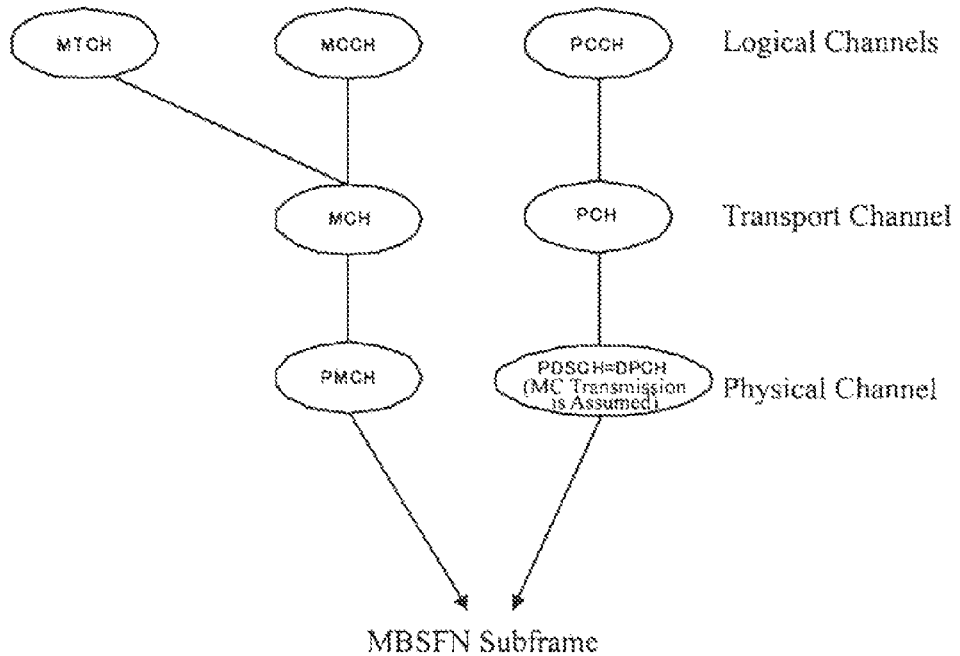
FIG. 56 is an explanatory drawing showing a mapping method in a case of mapping a logical channel PCCH including a paging signal onto a transport channel PCH, carrying out multiplexing of logical channels MTCH and MCCH to map them on a transport channel MCH, and further mapping the PCH onto a physical channel dedicated to paging.

FIG. 42 is an explanatory drawing showing the structure of a physical channel dedicated to paging which is transmitted via a multi-cell transmission scheme in an MBSFN area. A certain cell is configured in such a way that a part of MBSFN subframes corresponding to the MBSFN area to which this cell belongs is defined as a physical channel dedicated to paging (Dedicated Physical Channel: DPCH), and the DPCH is disposed in each subframe. As shown in Embodiment 7, because any unicast service is not supported in an MBMS dedicated channel, all the subframes of an MBSFN frame can be MBSFN subframes. As an example, a method of mapping a paging signal onto the physical channel dedicated to paging is shown in FIG. 56. FIG. 56 is an explanatory drawing showing a mapping method in a case of carrying a logical channel PCCH including a paging signal onto a transport channel PCH, carrying out multiplexing of logical channels MTCH and MCCH to carry them onto a transport channel MCH, and further carrying the PCH onto the physical channel dedicated to paging. The logical channel PCCH onto which the paging signal is mapped is mapped onto the transport channel PCH, and this PCH is further mapped onto the DPCH which is the physical channel dedicated to paging. On the other hand, as usual, MBMS-related information is mapped onto the logical channels MTCH and MCCH, and they are mapped onto the transport channel MCH and this MCH is further mapped onto the physical channel PMCH. The DPCH is configured in such a way as to be transmitted via a multi-cell transmission scheme in the MBSFN area, and the DPCH and the PMCH are multiplexed into an identical MBSFN subframe and are transmitted.

In a case in which the PMCHs of MBSFN areas are configured in such a way as to be code division multiplexed, as shown in, for example, FIG. 40, the PMCHs are transmitted via continuous MBSFN subframes. In this case, the DPCH can be disposed in all the subframes on the time axis. Therefore, as compared with Embodiment 7, the number of times that the paging signal can be transmitted increases. By thus defining a part of each of MBSFN subframes which are transmitted via a multi-cell transmission scheme in an MBSFN area as a DPCH used for transmission of paging signal, the frequency of the transmission of a paging signal is increased in the system, and the number of mobile terminals each of which can receive paging from an MBMS dedicated cell can be increased. Furthermore, because a shortage of the area for paging can be avoided at the time of occurrence of paging to a mobile terminal which can receive the paging, it becomes able to shorten the delay time occurring in the transmission of the paging information. In the above-mentioned example, the case in which the PMCHs of MBSFN areas are configured in such a way as to be code division multiplexed (CDM) is described. In contrast, even in a case in which the PMCHs of MBSFN areas are configured in such a way as to be time division multiplexed (TDM), or even in a case in which both time division multiplexing and code division multiplexing are applied to the PMCHs of MBSFN areas, a DPCH can be disposed in all MBSFN subframes via which a PMCH corresponding to one or more MBSFN areas to which a cell belongs is transmitted. As a result, because the number of times that the paging signal can be transmitted can be increased as compared with Embodiment 7, the same advantage can be provided.

Figure 43:
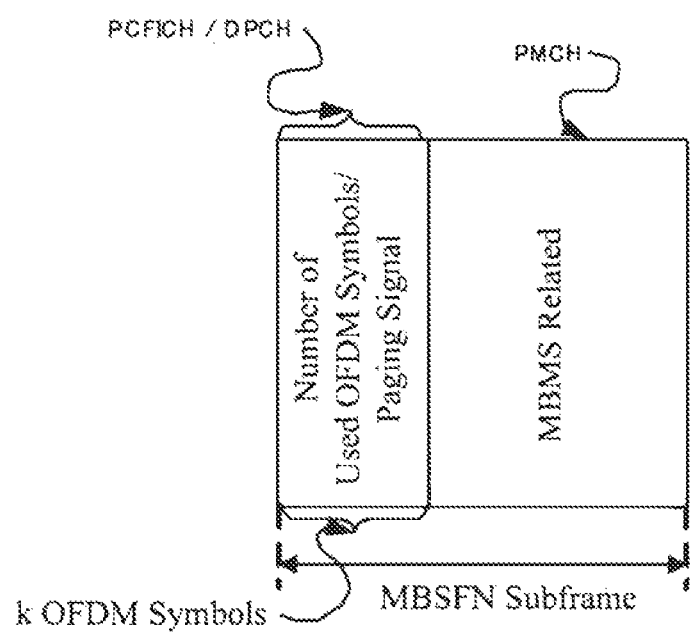
FIG. 43 is an explanatory drawing showing the configuration of an MBSFN subframe.

FIG. 43 is an explanatory drawing showing the configuration of an MBSFN subframe. In FIG. 43, a DPCH and a PMCH are time division multiplexed within an MBSFN subframe. A paging signal is mapped onto the DPCH and MBMS-related information is mapped onto the PMCH. By separately providing the physical channels onto which the paging signal and the MBMS-related information are mapped, abase station can perform encoding operations on the paging signal and the MBMS-related information respectively and a mobile terminal can perform decoding operations on the paging signal and the MBMS-related information respectively when receiving them. Furthermore, because the physical areas can be time division multiplexed, the mobile terminal does not have to receive the PMCH when it is not receiving any MBMS service, but is receiving only the paging information, and can therefore carry out discontinuous reception (Discontinuous Reception) while the PMCH is transmitted thereto, thereby being able to reduce its power consumption. In contrast, when the mobile terminal does not have to receive the paging information, the mobile terminal does not have to receive the DPC and can therefore carry out a discontinuous reception operation while the DPCH is transmitted thereto. Therefore, the mobile terminal can reduce its power consumption. The DPCH is transmitted within k OFDM symbols of each MBSFN subframe. The value of k can be determined beforehand, or can be informed via broadcast information of an MBMS dedicated cell. The value of k can be alternatively informed via broadcast information of a unicast cell.

As an alternative, a PCFICH (Physical control format indicator channel) can be disposed for each subframe as a channel showing the number k of OFDM symbols via which the DPCH is transmitted. The PCFICH is transmitted via the first OFDM symbol of each subframe. Information about the allocation of the physical resource to the PCFICH can be notified to the mobile terminal via broadcast information from the MBMS dedicated cell, or can be notified via broadcast information from the unicast cell while being related to information about the frequency layer of the MBMS dedicated cell. As an alternative, the information about the allocation of the physical resource to the PCFICH can be predetermined. In the case in which the information about the allocation of the physical resource to the PCFICH is predetermined, the amount of information which is required for the notification can be reduced. By thus indicating the value of k for each subframe, it becomes able to change the value of k for each subframe, and it therefore becomes able to dynamically change the transmission area in which the MBMS information is transmitted and the transmission area in which the DPCH is transmitted. The value of k can range from 0 to a maximum number of OFDM symbols in each subframe. For example, k can be set to be equal to the number of OFDM symbols as that included in a PDCCH (Physical downlink control channel) of the unicast cell, i.e., 1, 2, or 3. In this case, the PCFICH is 2 bits in size. For example, k can be set to be equal to the number of OFDM symbols as that included in a PDCCH in an MBSFN subframe of the MBMS/unicast-mixed cell, i.e., 1 or 2. In this case, the PCFICH is 2 bits or 1 bit in size. The PCFICH of the unicast cell is multiplied by a cell specific scrambling code. In contrast to this, in accordance with the present invention, in order to also enable the PCFICH to be transmitted via a multi-cell transmission scheme in the MBSFN area, the PCFICH is configured in such a way as to be multiplied by an MBSFN-area-specific scrambling code. By configuring the PCFICH in the above-mentioned way, the mobile terminal becomes able to carry out decoding (Decode) by using the same method as that which the mobile terminal uses when decoding information from the unicast cell, and can therefore simplify the receiving circuit thereof.

The unicast cell uses a PDSCH or PDCCH in order to transmit a paging signal, while it is necessary to include resource allocation (Resource Allocation) information in the paging signal. This is because the unicast cell needs resource allocation to carry out communications after the paging. A resource for the communications after the paging is transmitted by using the PDSCH. This PDSCH is transmitted via the remaining OFDM symbol areas excluding the OFDM symbol areas via which the PDCCH in each subframe is transmitted. In the paging method in accordance with the present invention, because the communications after the paging is carried out by the unicast cell, only a paging indicator (Paging Indicator: PI) informing the presence or absence of an incoming call can be transmitted as the paging information to be transmitted by using the DPCH. This is because it is not necessary to transmit the resource allocation information for the communications after the paging. In order to make it possible to specify a mobile terminal by using only a paging indicator, what is necessary is just to enable unique determination of an MBSFN frame or an MBSFN subframe in which a paging indicator to a certain mobile terminal exists from an identification number (ID) specific to this mobile terminal. In accordance with another method, the base station is enabled to multiply the paging indicator by the mobile-terminal-specific identification number, and the mobile terminal is enabled to carry out blind detection by using this mobile-terminal-specific identification number. As an alternative, the two above-mentioned methods can be combined. For example, each mobile terminal is classified into a group according to an identification number (ID) specific to this mobile terminal, an MBSFN frame or an MBSFN subframe in which a paging indicator to this group exists is uniquely brought into correspondence with the group, and the paging indicator is multiplied by the mobile-terminal-specific identification number by the base station.

Each mobile terminal can receive an MBSFN frame or an MBSFN subframe onto which the paging indicator to the group to which the mobile terminal belongs is mapped, the group being determined from the identification number specific to this mobile terminal, and can carry out blind detection by using the identification number specific to the mobile terminal itself. A method of determining the MBSFN frame or the MBSFN subframe in which the paging indicator to the mobile terminal or the group to which the mobile terminal belongs exists from the identification number specific to the mobile terminal can be predetermined, or can be informed, as broadcast information, from either the MBMS dedicated cell or the unicast cell to the mobile terminal via an upper layer. The MBSFN frame or the MBSFN subframe in which the paging indicator exists can be made to exist periodically. Because it is not necessary to transmit the resource allocation information, it becomes able to configure the DPCH from a smaller amount of information, and it therefore becomes able to transmit the MBMS-related information with the remaining area in the same subframe. Instead of mapping the paging indicator onto the PCCH as shown in FIG. 56, the paging indicator can be mapped directly onto the DPCH in the physical layer. It also becomes able to transmit the DPCH with all the OFDM symbols in each subframe. For example, in a case in which the number of OFDM symbols in each subframe is 7 at the maximum, an arbitrary number k ranging from 0 to 7 of OFDM symbols can be used for the transmission of the DPCH by making the PCFICH be 3-bit information showing the value of k. It thus becomes able to change and combine the transmission area in which the MBMS information is transmitted and the transmission area in which the DPCH is transmitted for each subframe with flexibility, and therefore the efficiency of the radio resources can be improved.

In the present invention, the case of using an MBMS dedicated cell is described. In the case of using an MBMS/unicast-mixed cell, both a unicast service and an MBMS service can be provided, and therefore paging in the case of using an MBMS/unicast-mixed cell needs resource allocation for communications after the paging. However, because an MBMS service can be carried out in an MBMS/unicast-mixed cell, there exist MBSFN subframes for carrying out MC transmission of broadcast type MBMS data. Because there is no PDSCH in an MBSFN subframe, when the paging method for use in a unicast cell is applied to an MBMS/unicast-mixed cell, there arises a problem that no area onto which the resource allocation information destined for each mobile terminal is mapped can be ensured in each MBSFN subframe. In this case, by using a method of limiting the subframes via which the paging indicator is to be transmitted to subframes in which a PDSCH resides in advance, or a method of transmitting the allocation information by using the PDCCH of a subframe in which a PDSCH exists for the first time after a paging signal has been transmitted, the paging can be carried out in an MBMS/unicast-mixed cell.

In a concrete example of the above-mentioned method of, in an MBMS/unicast-mixed cell, limiting the subframes via which the paging indicator is to be transmitted to the ones in each of which a PDSCH exists in advance, subframes in which a PDSCH onto which the paging signal is mapped exists are defined as the ones via which the paging indicator is to be transmitted. As a result, because it becomes able to adjust the number of subframes onto which the paging signal is mapped in the PDSCH according to the number of mobile terminals being served by the cell, the utilization efficiency of the radio resources is improved. It becomes unnecessary for each mobile terminal to receive all the subframes in each of which the PDSCH exists, each mobile terminal can achieve low power consumption.

In the case of paging using an MBMS/unicast-mixed cell, when the resource allocation information does not have to be mapped onto a PDSCH for communications after the paging, the method of making it possible to specify a mobile terminal by using only a paging indicator as mentioned above can be applied. In this case, what is necessary is just to carry the paging indicator onto an area of a PDCCH. In an MBSFN subframe, what is necessary is just to carry the paging indicator on an area which is allocated for unicast, i.e., one or two leading OFDM symbol areas. As a concrete method, the above-mentioned method of using a paging dedicated channel (DPCH) can be applied. The above-mentioned method of using a PCFICH can be applied also to the number of symbols to be used, and k can be set to 0 or 1. Each mobile terminal has only to receive a radio frame or a subframe onto which the paging indicator of the group to which the mobile terminal belongs is mapped, the group being determined from the identification number specific to this mobile terminal, and to carry out blind detection by using the identification number specific to the mobile terminal itself. In a case in which, in the paging using an MBMS/unicast-mixed cell, the resource allocation information does not have to be mapped onto a PDSCH for communications after the paging, there can be provided, for example, a method of enabling each mobile terminal to transmit an uplink RACH to a base station in order to make a request of the base station for resource allocation after the mobile terminal has received the paging indicator. When the method configured in this way is provided, the base station does not have to carry the resource allocation information on the PDSCH in the same subframes onto which the paging indicator is mapped. Because the method is configured in this way, also in the case of the paging using an MBMS/Unicast-mixed cell, the paging signal (the paging indicator) can be transmitted with arbitrary radio frames or subframes regardless of whether or not there exists an MBSFN subframe.

Figure 44:
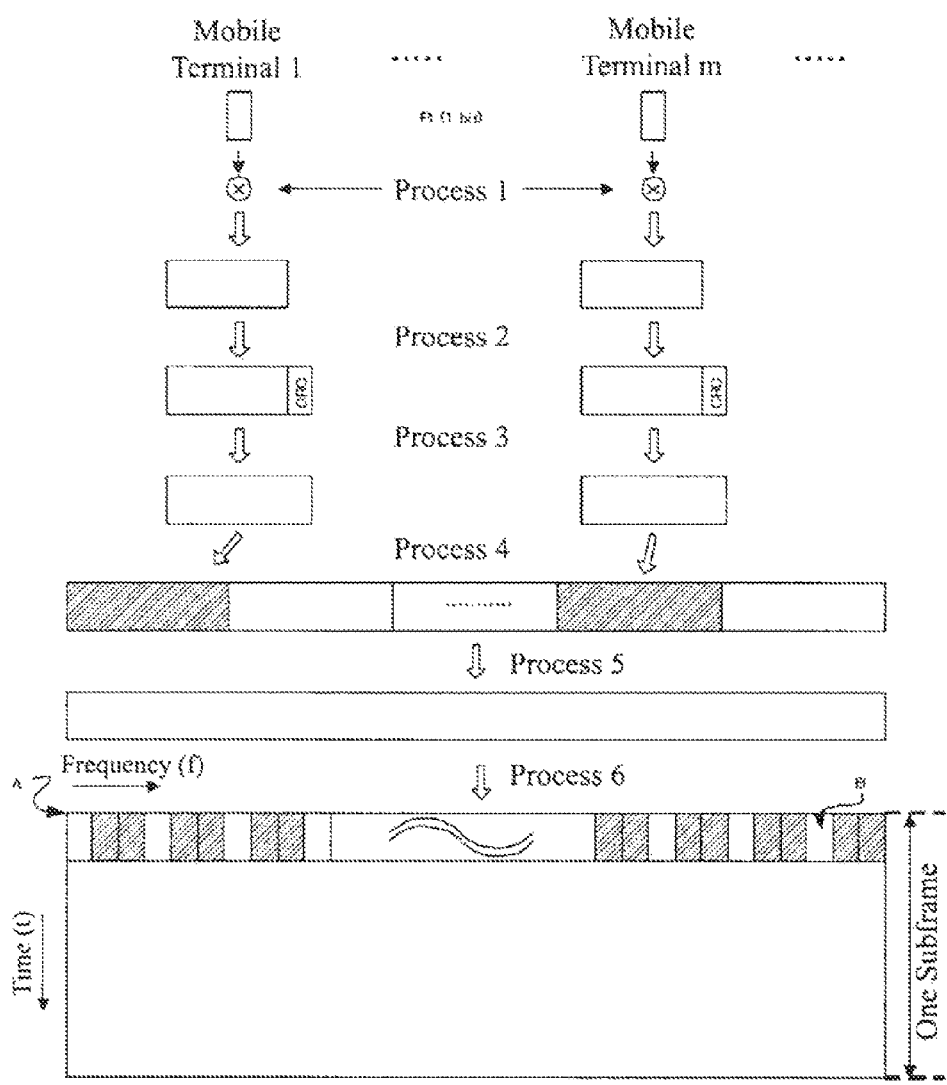
FIG. 44 is an explanatory drawing showing a method of mapping a paging signal onto a paging dedicated channel (DPCH)

FIG. 44 is an explanatory drawing showing a method of mapping a paging signal onto a paging dedicated channel (DPCH). FIG. 44 shows only a paging indicator (Paging Indicator: PI) as the paging signal. The paging indicator is paging information which is expressed as a 1-bit number having a value of 1 or 0, and shows the presence or absence of an incoming call. The base station sets "1" to the paging indicator for a mobile terminal for which an incoming call is occurring, and maps the paging indicator onto the paging dedicated physical channel. The base station multiplies the paging indicator destined for each mobile terminal m for which an incoming call is occurring by an identification number specific to this mobile terminal (process 1). Next, the base station performs CRC (Cyclic Redundancy Check) addition on the result of this multiplication (process 2), and carries out a process including encoding (Encode), rate matching, and interleaving (process 3). The base station then allocates the result of the series of processes which it has carried out to a control information element having a size corresponding to the size of the physical area onto which the paging indicator is to be mapped, and connects a plurality of control information elements whose number is equal to that of the mobile terminals for each of which an incoming call is occurring to one another (process 4). The base station performs a scrambling process using an MBSFN-area-specific scrambling code (Scrambling Code), a modulation process, etc. on the connected result (process 5). The modulation process can be specific to the MBSFN area. The result of carrying out these processes is mapped onto k leading OFDM symbols (process 6). At that time, the base station derives the number k of required OFDM symbols on the basis of the result of the connection of the plurality of control information elements whose number is equal to that of the mobile terminals for each of which an incoming call is occurring, and performs a process including encoding on the indicator corresponding to the number k and then maps the indicator onto the PCFICH. These processes are carried out by using the same method in all the cells in the MBSFN area, and multi-cell transmission of the paging indicator is carried out in the MBSFN area. In this embodiment, a case in which the number (k) of OFDM symbols via which the DPCH is transmitted is set to 1 will be shown. The DPCH is mapped onto the first OFDM symbol of each subframe together with the PCFICH and a reference symbol. In FIG. 44, A shows one OFDN symbol, and B shows the PCFICH and the reference symbol.

A mobile terminal which has received a signal which is transmitted thereto via a multi-cell transmission scheme determines the number of OFDM symbols used for the paging on the basis of the result of decoding the received PCFICH, and then carries out a demodulation process, a descrambling (Descrambling) process, and so on. After performing those processes, the mobile terminal divides the result of the processes into parts each corresponding to a certain area, and successively performs deinterleaving, decoding (Decoding), error detection, a correction process, etc. on each of the parts to carry out blind detection of the terminal-specific identification number. After the mobile terminal detects the identification number specific to the mobile terminal itself through the blind detection, the mobile terminal can determine that paging is occurring. The PCFICH, the reference symbol, and so on are mapped onto a physical resource by using, for example, a predetermined method. As an alternative, the same method as that used by the unicast cell can be used. By using the same method as that used by the unicast cell, it becomes able to simplify the configuration of the base station and the configuration of the receiving circuit of each mobile terminal. In the case in which each mobile terminal receives the same amount of information, like in the case in which the paging signal is only the paging indicator, the control information element units to each of which the result of the encoding is allocated can be set to have only one size. By making all mobile terminals which receive paging carry out identical processing including an identical encoding process, the control information element units which are obtained after the encoding can be set to have only one size. As a result, when carrying out blind detection of the mobile-terminal-specific identification number, each mobile terminal has only to a process including decoding on each of the control information element units having an only one size.

Therefore, each mobile terminal can reduce the length of time required to carry out the blind detection and can therefore improve its detection speed. Instead of multiplying the paging indicator by the mobile-terminal-specific identification number, a code specific to each mobile terminal can be provided as the paging indicator. In this case, the same advantage can be provided.

In the above-mentioned example, the paging signal destined for each of the mobile terminals is allocated to a control information element unit having a size corresponding to the size of the physical area onto which the paging signal is to be mapped. As an alternative, the paging signal destined for each of the mobile terminals can be allocated to a transport block unit. In the case in which the paging signal destined for each of the mobile terminals is allocated to a transport block unit, the physical resource to which the paging signal is allocated can be increased or decreased according to the amount of information, and the allocation to the physical area can be carried out with flexibility.

Furthermore, in the above-mentioned example, the base station carries out the process 1 of multiplying the paging signal destined for each of the mobile terminals by an identification code specific to this mobile terminal. The base station can alternatively use another processing method of adding the paging signal destined for each of the mobile terminals and an identification number specific to this mobile terminal. In this case, each of the mobile terminals receives the physical area for paging signal, carries out demodulation and descrambling using an MBSFN-area-specific scrambling code, and divides the result of the demodulation and descrambling into parts each corresponding to an information element unit, and performs a process including decoding on each of the divided parts each corresponding to an information element unit. Each of the mobile terminals then determines whether the identification number specific to the mobile terminal itself exists in the information on which the mobile terminal itself has performed the process including decoding to detect the paging signal destined therefor.

Figure 45:
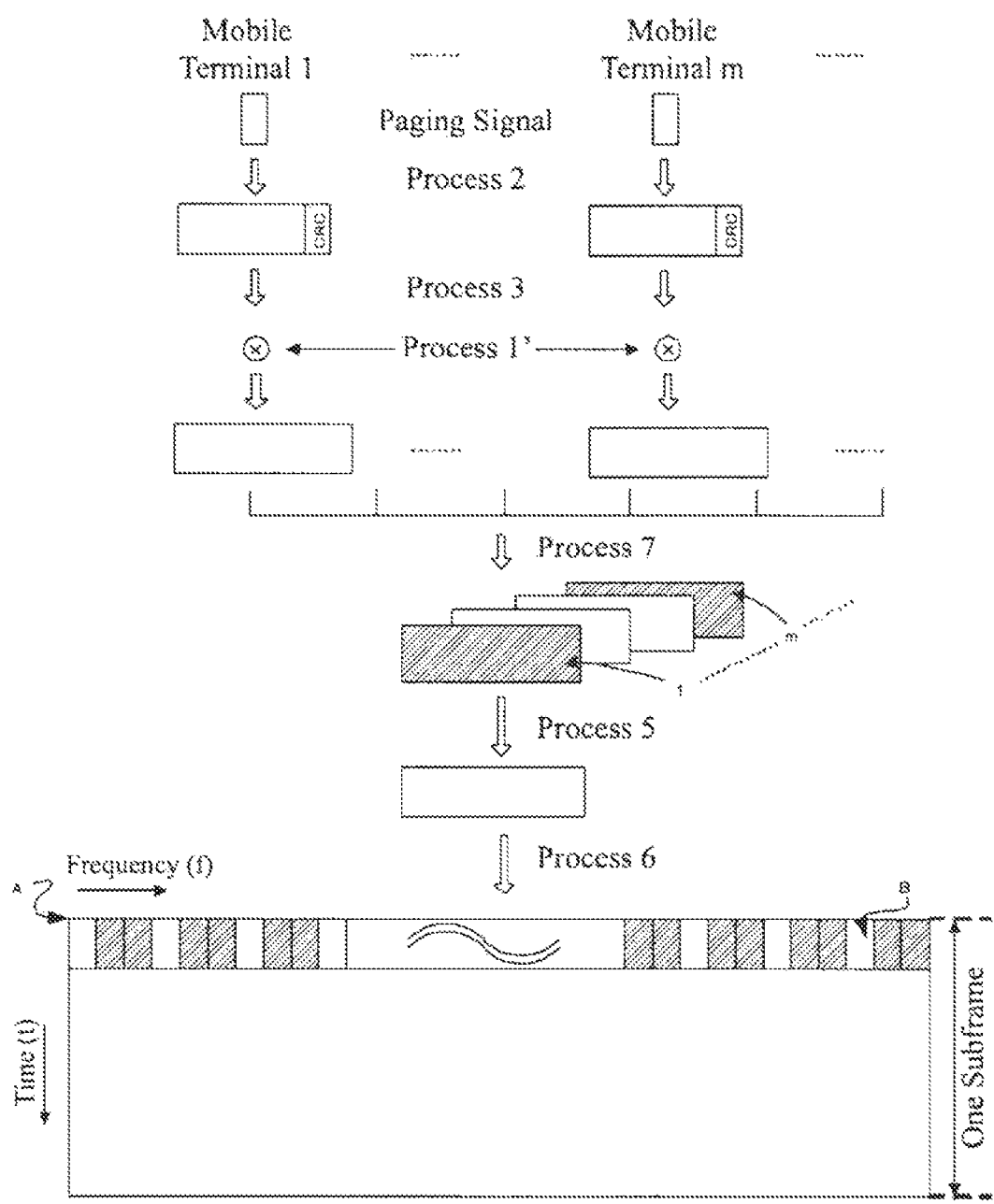
FIG. 45 is an explanatory drawing showing the method of mapping a paging signal onto a paging dedicated channel (DPCH)

FIG. 45 is an explanatory drawing showing a method of mapping a paging signal onto a paging dedicated channel (DPCH). FIG. 45 shows a paging indicator (PI) as the paging signal. In FIG. 45, the same reference numerals as those in FIG. 44 denote the same processes or like processes. The paging indicator is paging information which is expressed as a 1-bit number having a value of 1 or 0, and shows the presence or absence of an incoming call. A base station sets "1" to the paging indicator to each of mobile terminals for which an incoming call is occurring, and maps the paging indicator onto the paging dedicated physical channel. The base station performs CRC addition on the paging signal destined for each of the mobile terminals (process 2), and carries out a process including encoding (Encode), rate matching, and interleaving (process 3). The base station multiplies the result of carrying out these processes by an identification code (number) specific to this mobile terminal (process 1'). This mobile-terminal-specific identification code is a scrambling code having orthogonality which is established among the results of the processed by the scrambling codes of mobile terminals. The base station carries out multiplexing of the results of the processes by the scrambling codes, the number of the multiplexed results of the processes by the scrambling codes being equal to the number of mobile terminals for each of which an incoming call is occurring (process 7). The base station then performs a scrambling process using an MBSFN-area-specific scrambling code (Scrambling Code), a modulation process, etc. on the result of the multiplexing (process 5). The modulation process can be specific to the MBSFN area. The result of carrying out these processes is mapped onto k leading OFDM symbols (process 6). When the number of mobile terminals is large, the base station divides them into a plurality of groups and carries out multiplexing of the results of the processes by scrambling codes specific to mobile terminals included in each group, the number of the multiplexed results of the processes by the scrambling codes being equal to the number of the mobile terminals, in such a way that orthogonality is established among the mobile terminals included in each group, and then carries out a spreading process using an MBSFN-area-specific scrambling code, a modulation process, etc. After carrying out these processes for each group, the base station can map them onto different OFDM symbols. At that time, the base station derives the number k of required OFDM symbols on the basis of the result of the multiplexing of the results of the processes by the scrambling codes, the number of the multiplexed results of the processes by the scrambling codes being equal to that of the mobile terminals for each of which an incoming call is occurring, and performs a process including encoding on the indicator corresponding to k and then maps the indicator onto the PCFICH. These processes are carried out by using the same method in all the cells in the MBSFN area, and multi-cell transmission of the paging indicator is carried out in the MBSFN area. In this embodiment, a case in which the number (k) of OFDM symbols via which the DPCH is transmitted is set to 1 will be shown. The DPCH is mapped onto the first OFDM symbol of each subframe together with the PCFICH and a reference symbol. A mobile terminal which has received a signal which is transmitted thereto via a multi-cell transmission scheme determines the number of OFDM symbols used for the paging from the received physical resource on the basis of the result of decoding the received PCFICH, and then carries out a demodulation process, a descrambling process, and so on. After performing those processes, the mobile terminal divides the result of the processes into parts each corresponding to a certain area, and carries out an operation of calculating a correlation with the terminal-specific identification number to carry out blind detection of the terminal-specific identification number. After the mobile terminal has detected the identification code of the mobile terminal through the blind detection, the mobile terminal can determine that paging is occurring. The mobile terminal then carries out deinterleaving, decoding, error detection, a correction process, etc. to receive the paging signal.

Some methods each of mapping paging signals onto the paging dedicated channel (DPCH) are disclosed, though the mapping can be alternatively performed in such a way that the above-mentioned paging dedicated area onto which the paging signals are to be mapped is an arbitrary predetermined area, a localized area (a physical area continuous on the frequency axis), or distributed areas (physical areas distributed on the frequency axis).

The physical area onto which the paging signals are mapped can be a physical area specific to each MBSFN area. The physical area specific to each MBSFN area can be predetermined, or can be derived from the MBSFN-area-specific number (MBSFN area ID) or the like. In this case, the physical area can be derived by using a common computation expression in the network side, the base station side, and each mobile terminal. Furthermore, a part of the paging signals can be mapped onto the physical area specific to each MBSFN area, and the remainder can be mapped onto a physical area which is not specific to each MBSFN area. In a concrete example, the information showing the presence or absence of an incoming call which is included in the paging signal (e.g., 1-bit information showing the presence or absence of an incoming call, or information about allocation of a paging message) is mapped onto the physical area specific to each MBSFN area, and other paging information (e.g., a paging message) is mapped onto a physical area not specific to each MBSFN area. In a case in which other paging information is mapped onto a physical area not specific to each MBSFN area, it becomes able to determine to which physical area the other paging information is allocated on the basis of the information about allocation of a paging message mapped onto the physical area specific to each MBSFN area. As the method of multiplexing the paging signals destined for mobile terminals in the physical area specific to each MBSFN area, there is a method of multiplying each of the paging signals or a CRC to be added to each of the paging signals by the mobile-terminal-specific identification number, as mentioned above. Each of the mobile terminals can determine whether or not the paging signal is destined therefor and becomes able to receive the paging signal by carrying out a correlation operation with the mobile-terminal-specific identification number. Accordingly, because each of the mobile terminals has only to receive the physical area of only the MBSFN area which is providing the MBMS service which each of the mobile terminals is receiving, and therefore does not have to receive any other physical area, there is provided an advantage of being able to achieve low power consumption in each of the mobile terminals.

As an alternative, the information showing the presence or absence of an incoming call which is included in the paging signal can be mapped not to the physical area specific to each MBSFN area, but to a physical area specific to each MBSFN synchronization area. In this case, the same advantage as that as mentioned above can be provided. In this case, an MBSFN synchronization area specific number (an MBSFN synchronization area ID) can be used instead of the MBSFN-area-specific number. A physical area within MBSFN subframes (e.g., a frequency domain #m of a symbol #n) is determined as a concrete example of the physical area specific to each MBSFN synchronization area. By determining the physical area specific to each MBSFN synchronization area in this way, the paging signal can be mapped onto the physical area which is common within MBSFN subframes of each MBSFN area (e.g., a frequency domain #m of a symbol #n). As a result, there is no necessity to determine the physical area onto which the paging signals are mapped for each MBSFN area, and what is necessary is just to determine one physical area for each MBSFN synchronization area. Therefore, there is provided an advantage of being able to simplify the method of deriving this physical area used by the network side, the base station, and each mobile terminal, and to reduce their circuit scales.

This embodiment is applied not only to the case in which the PMCHs of MBSFN areas are configured in such a way as to be code division multiplexed, but also a case in which the PMCHs of MBSFN areas are configured in such a way as to be time division multiplexed, and a case in which both time division multiplexing and code division multiplexing are applied to the PMCHs of MBSFN areas.

Each of the mobile terminals needs to know if the paging signal destined for the mobile terminal itself is mapped onto the DPCH of an MBSFN frame or an MBSFN subframe at what time. As a method of enabling each of the mobile terminals to know if the paging signal destined for the mobile terminal itself is mapped onto the DPCH of an MBSFN frame or an MBSFN subframe at what time, a predetermined method can be used to derive the MBSFN frame or MBSFN subframe. The MBSFN frame or MBSFN subframe can be informed, as broadcast information, to each mobile terminal from the serving cell using a unicast service or the MBMS dedicated cell via an upper layer. The time can be periodic. Because the paging signal is transmitted at certain periods (or cycles), during a time period during which this paging signal is not transmitted, the mobile terminal can carry out a discontinuous reception operation when not receiving any MBMS service. Therefore, the power consumption of each of the mobile terminals can be reduced.

As a result, because each of the mobile terminals becomes able to carry out blind detection of whether or not it is information destined for the mobile terminal itself by using the identification code specific to the mobile terminal or the scrambling code, it becomes unnecessary to fix the physical area onto which the paging signal destined for each of the mobile terminals is mapped in advance. Therefore, there is no necessity to provide a physical area used for paging signals destined for all the mobile terminals, and a physical area which is large enough to map paging signals destined for a certain number of mobile terminals for each of which an incoming call is predicted to actually occur has only to be provided. By using this method, it becomes able to use the limited amount of physical resources effectively. In the above-mentioned example, the base station multiplies the paging signal destined for each of the mobile terminals by a mobile-terminal-specific identification number. As an alternative, the base station can use a method of multiplying a CRC, instead of the paging signal, by a mobile-terminal-specific identification number. The method of multiplying a CRC by a mobile-terminal-specific identification number is effective for a case in which the amount of information of the paging signal destined for each of the mobile terminals differs.

The case in which only the paging indicator for informing the presence or absence of an incoming call is provided as the paging information to be transmitted by using the paging dedicated channel is described above, though the information about allocation of a paging message can be provided as another concrete example of the paging information to be transmitted by using the paging dedicated channel. It can be used when the paging information needs to be transmitted as information other than the information for informing the presence or absence of an incoming call. The presence or absence of an incoming call can be informed to each mobile terminal with the information about allocation of a paging message. As a result, when a mobile terminal receives the information about allocation of a paging message to the mobile terminal itself, the mobile terminal can judge that paging is occurring. As an example of the information about allocation of a paging message, information showing a physical area onto which, for example, a paging message transmitted via the same subframe is mapped can be provided. The paging message is paging information too, and is transmitted while being mapped onto the paging dedicated channel. By thus defining the information about the physical area as the allocation information, the mobile terminal which has received the information about allocation of a paging message has only to receive only this physical area in order to receive the paging message, and therefore does not have to receive any other physical area. Therefore, the mobile terminal's power consumption at the time of receiving the paging message can be reduced. Furthermore, it becomes unnecessary to transmit beforehand the information about the physical area to which the paging signal is allocated to the mobile terminal via broadcast information or the like, and the amount of signaling can be reduced. Furthermore, because it becomes able to carryout the allocation of the paging signal to the physical area with flexibility, there is provided an advantage of improving the use efficiency of the radio resources.

In the case of using the method, disclosed in Embodiment 7, of carrying a paging signal onto the PMCH of each MBSFN area, the frequency with which the PMCH onto which a paging signal can be mapped is transmitted decreases in time. Therefore, there arises a problem that paging signals destined for a large number of mobile terminals or all mobile terminals have to be mapped onto the PMCH which is transmitted once and onto which the paging signals are mapped. In order to solve this problem, in Embodiment 7, the paging grouping method and so on are disclosed. In accordance with this Embodiment 8, the above-mentioned problem can be solved by disposing a physical channel dedicated to paging which is transmitted via a multi-cell transmission scheme in an MBSFN area, and carrying paging signals onto this physical channel. Furthermore, because the mobile communication system can transmit a paging signal destined for a mobile terminal which is receiving or trying to receive an MBMS service from an MBMS dedicated cell, the mobile terminal becomes able to receive the paging signal in the MBMS dedicated cell.

In the example shown in this Embodiment, a certain cell is configured in such a way that a part of MBSFN subframes corresponding to the MBSFN area to which this cell belongs is defined as a physical channel dedicated to paging (also referred to as a DPCH), and the DPCH is disposed in each subframe. Instead of transmitting the DPCH every subframe, the DPCH can be transmitted periodically. For example, the DPCH can be transmitted every two subframes, the DPCH can be transmitted every radio frame, or a part of MBSFN subframes corresponding to each MBSFN area can be transmitted as the physical channel dedicated to paging (also referred to as the DPCH). On the basis the number of mobile terminals to which paging can be transmitted simultaneously, the number of mobile terminals depending upon the number of mobile terminals which is taken into consideration by the system, and the frequency of paging, the repetition period of the transmission of the paging as the DPCH of each MBSFN area can be determined. As a result, subframes via which the DPCH is not transmitted can be defined as a data region for MBMS service, and MBMS services can be speeded up.

Embodiment 9

In Embodiment 8, the method of disposing a physical channel dedicated to paging which is transmitted via a multi-cell transmission scheme in an MBSFN (Multimedia Broadcast multicast service Single Frequency Network) area, and carrying a paging signal onto this physical channel is disclosed. Hereafter, in Embodiment 9, a method of disposing a physical channel which is transmitted via a multi-cell (multi cell) transmission scheme in an MBSFN synchronization area, and carrying a paging signal onto this physical channel is disclosed.

FIG. 46 is an explanatory drawing showing the structure of a physical channel (referred to as a main PMCH) which is transmitted via a multi-cell transmission scheme in an MBSFN synchronization area. A case in which both time division multiplexing and code division multiplexing are applied to a PMCH disposed for each MBSFN area is shown. A cell #n1 is one located in an MBSFN area 1, a cell #n2 is one located in an MBSFN area 2, and a cell #n3 is one located in an MBSFN area 3. Furthermore, the cells #1, #2, and #3 also belong to an MBSFN area 4. Code division multiplexing of the PMCHs of the MBSFN areas 1, 2, and 3 is carried out, and time division multiplexing of the PMCHs of the MBSFN areas 1, 2, and 3 and the PMCH of the MBSFN area 4 is carried out. Time division multiplexing of the main PMCH and the PMCH of each MBSFN area is carried out. In the cell #n1, time division multiplexing of the PMCH1 and the PMCH4 is carried out and time division multiplexing of the main PMCH and them is further carried out because the cell #n1 belongs to the MBSFN area 1 and the MBSFN area 4. The same goes for each of the cells #2 and #3. Because the main PMCH is transmitted via a multi-cell transmission scheme in the MBSFN synchronization area, it is transmitted on an MBSFN subframe which is SFN-combined. A set of MBSFN frames to which MBSFN subframes are allocated is referred to as an "MBSFN frame cluster". In an MBMS dedicated cell, all subframes in an MBSFN frame can be MBSFN subframes used for multi-cell transmission. The length of each of the repetition periods at which the main PMCH is repeated is referred to as the "main PMCH repetition period" (main PMCH repetition period). An MCH which is a transport channel for MBMS is mapped onto the main PMCH. Either or both of an MCCH which is a logical channel used for transmission of MBMS control information and an MTCH which is a logical channel used for transmission of MBMS data are mapped onto the MCH. The MCCH and the MTCH can be divided in time and mapped onto the main PMCH, or can be divided in time and mapped onto a physical area which is transmitted via a multi-cell transmission scheme.

For example, the MCCH and the MTCH can be mapped onto different MBSFN subframes which are the physical area onto which they are finally mapped. The MCCH can be mapped onto MBSFN frame clusters via which the main PMCH is transmitted, or only the MTCH can be mapped onto the MBSFN frame clusters. In a case in which only the MTCH exists in the main PMCH, the repetition period of the MCCH differs from the repetition period of the main PMCH. Furthermore, there is a case in which a plurality of MCCHs are mapped onto the MBSFN frame clusters via which the main PMCH is transmitted. The length of each of the repetition periods at which the MCCH is repeated is expressed as the "MCCH repetition period" (MCCH Repetition period). In FIG. 46, the MCCH1 (or the MCCH2, 3, or 4) transmits MBMS control information for the MBSFN area 1 (or the MBSFN area 2, 3, or 4), and the MTCH1 (or the MTCH2, 3, or 4) transmits MBMS data for the MBSFN area 1 (or the MBSFN area 2, 3, or 4). The MCCHs can be mapped onto the PMCHs respectively, or only the MTCHs can be mapped onto the PMCHs respectively. In the case in which only the MTCHs exist on the PMCHs respectively, the MCCH of each MBSFN area can be mapped onto the main PMCH. As an alternative, the MCCH of each MBSFN area can be included as an information element of the MCCH mapped onto the main PMCH. Because the main PMCH is transmitted via a multi-cell transmission scheme in the MBSFN synchronization area, the main PMCH cannot be multiplied by an MBSFN-area-specific scrambling code (Scrambling Code), like the PMCH of each MBSFN area. This is because the main PMCH is transmitted from a cell in a different MBSFN area at the same time, and therefore, when the main PMCH is multiplied by an MBSFN-area-specific scrambling code, the phase of this main PMCH transmitted from each MBSFN area becomes random in the receiver of each mobile terminal, and the receiver becomes unable to carry out SFN combining of the main PMCH. Therefore, as shown above, by carrying out time division multiplexing of the main PMCH and the PMCH of each MBSFN area, the multiplication by the scrambling code specific to each MBSFN area can be carried out on a per subframe basis while the multiplication of only the main PMCH by the scrambling code specific to each MBSFN area can be avoided. As a result, the main PMCH can be transmitted via a multi-cell transmission scheme in the MBSFN synchronization area, and, even if each mobile terminal is receiving or trying to receive any MBMS service in this MBSFN synchronization area, the mobile terminal can receive the main PMCH and can also acquire an SFN gain. The main PMCH is not multiplied by the scrambling code specific to each MBSFN area, as mentioned above, though the main PMCH can be multiplied by the MBSFN synchronization area specific scrambling code. In this case, the interference from any cell in any other MBSFN synchronization area can be suppressed, and receive errors detected in the MBMS service received by each mobile terminal can be reduced.

FIG. 47 is an explanatory drawing showing the configuration of a radio frame via which the main PMCH is transmitted. In FIG. 47, the subframes via which the main PMCH is transmitted are the ones #k1 to #k2 (the numbers k1 to k2 are neither 1 nor 5) excluding the subframes #0 and #5. It has been examined that in an MBMS dedicated cell, a synchronization channel (Synchronization Channel: SCH) is transmitted via the subframes #0 and #5 in one radio frame. It has been also examined that a broadcast channel (Broadcast Channel: BCH) is transmitted via the subframe #0. It has been considered that either a cell specific sequence or an MBSFN-area-specific sequence is included in the synchronization channel (SCH), and the broadcast channel (BCH) is multiplied by either a cell specific scrambling code or an MBSFN-area-specific scrambling code. Therefore, by selecting, as the subframes via which the main PMCH is transmitted, the ones excluding the subframes #0 and #5, the main PMCH can be transmitted via a multi-cell transmission scheme in the MBSFN synchronization area, and, even if each mobile terminal is receiving or trying to receive any MBMS service in this MBSFN synchronization area, the mobile terminal can receive the main PMCH and can also acquire an SFN gain. In the example shown in the figure, the subframes via which the main PMCH is transmitted are continuous, though they can be discontinuous. By selecting the continuous subframes excluding the subframes #0 and #5, during a time period during which each mobile terminal does not have to receive any other subframes, the mobile terminal can carry out a discontinuous reception operation, thereby being able to reduce the power for receiving. The main PMCH does not have to be transmitted on a per radio frame basis. For example, the main PMCH can be transmitted periodically, e.g., every two radio frames or every ten radio frames. The length of each of the repetition periods at which the main PMCH is repeated is referred to as the "main PMCH repetition period" (main PMCH repetition period). As a result, the PMCH in subframes via which the main PMCH is not transmitted can be defined as a data area for MBMS service, and MBMS services can be speeded up. The radio frame in which the main PMCH exists, the start timing (the SFN and the starting point) of the subframes, the subframe numbers, and the main PMCH repetition period length can be informed via broadcast information from the serving cell using a unicast service, can be informed via broadcast information from the MBMS dedicated cell, or can be predetermined. Because the main PMCH is transmitted via a multi-cell transmission scheme, the subframes in which the main PMCH exists can be MBSFN subframes and the radio frame in which the main PMCH exists is an MBSFN frame.

Figure 48:
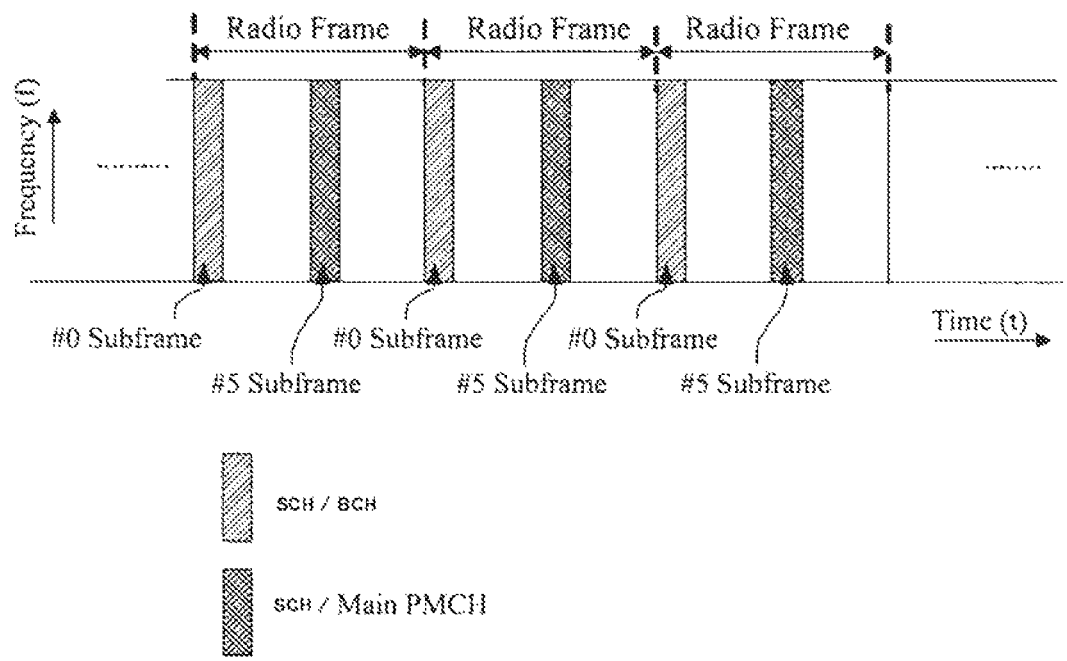
FIG. 48 is an explanatory drawing showing the configuration of a radio frame via which a main PMCH is transmitted within the same subframe as that within which a synchronization channel SCH is transmitted.

FIG. 48 is an explanatory drawing showing the configuration of a radio frame via which the main PMCH is transmitted within the same subframes as those within which the synchronization channel SCH exists. In FIG. 48, the configuration in which the subframe via which the main PMCH is transmitted is the one #5, and the main MCH is mapped onto an area other than an area onto which the synchronization channel SCH is mapped is shown. In FIG. 47, the configuration in which the main PMCH is mapped onto the subframes excluding the subframes #0 and #5 is shown. As a result, all the OFDM symbols in the subframes can be transmitted via a multi-cell transmission scheme in the MBSFN synchronization area. Therefore, the transmitter of the base station and the receiver of each mobile terminal can be simplified. In FIG. 48, the main PMCH is formed in all or part of the area of the subframe #5 excluding the physical area of the subframe #5 onto which the synchronization channel SCH is mapped. As previously mentioned, the synchronization channel SCH is transmitted via the subframes #0 and #5 in one radio frame in the MBMS dedicated cell. In this case, because the broadcast channel BCH is not transmitted via the subframe #5, it is not necessary to multiply the broadcast channel BCH by either a cell specific scrambling code or an MBSFN-area-specific scrambling code. Therefore, all or part of the area of the subframe #5 excluding the physical area of the subframe #5 onto which the synchronization channel SCH is mapped can be used for the main PMCH. For example, in a case in which the SCH is mapped onto the 6th and 7th OFDM symbols of the subframe #5, the 1st to 5th OFDM symbols and 8th to last OFDM symbols are defined as the area used for the main PMCH. By doing in this way, the main PMCH can be transmitted via a multi-cell transmission scheme in the MBSFN synchronization area, and, even if each mobile terminal is receiving or trying to receive any MBMS service in this MBSFN synchronization area, the mobile terminal can receive the main PMCH and can also acquire an SFN gain. By making it possible to use the subframe #5 also for the main PMCH, the flexibility of the system can be improved and the efficiency of the radio resources can also be improved.

FIG. 49 is an explanatory drawing showing the configuration of the main PMCH in which an area for a paging signal is disposed. FIG. 49($a$) is a view showing the configuration of the main PMCH including MBMS-related information and a paging signal thereon. The MBMS-related information and the paging signal can exist as information elements in an MTCH and an MCCH respectively, or time division multiplexing of physical areas (resources) onto which the MBMS-related information and the paging signal are mapped respectively can be carried out. As a mapping method in the case of carrying the MBMS-related information and the paging signal on the MTCH and the MCCH respectively as information elements, the method disclosed in FIG. 53 can be applied as an example. In this case, the physical channel PMCH shown in FIG. 53 can be assumed to be the main PMCH. The paging signal as well as MBMS control information included in the MBMS-related information are mapped onto the logical channel MCCH as information elements. The MCCH as well as the MTCH are mapped onto a multicast channel (MCH) which is a transport channel, and the MCH is mapped onto the main PMCH which is a physical channel. Thus, a mobile terminal which is receiving or trying to receive an MBMS service is enabled to receive the paging signal when receiving the MCCH. In another example, the method disclosed in FIG. 54 can be applied. In this case, the PMCH shown in FIG. 54 which is a physical channel can be assumed to be the main PMCH. The logical channel PCCH onto which the paging signal is mapped are multiplexed with the logical channels MTCH and MCCH onto which the MBMS-related information is mapped, and the multiplexed channels are mapped onto the transport channel MCH. The base station can provide an MBSFN subframe onto which only the MTCH is mapped, and an MBSFN subframe onto which the MCCH and the PCCH are mapped. The base station can also control to provide an MBSFN subframe onto which only the MCCH is mapped, and an MBSFN subframe onto which only the PCCH is mapped. By doing in this way, the base station can transmit them separately in time from one another. Furthermore, an MBSFN subframe onto which the MCCH is mapped and an MBSFN subframe onto which the PCCH is mapped can be arranged in such a way as to be adjacent to each other in time. Thus, a mobile terminal which is receiving or trying to receive an MBMS service is enabled to receive the paging signal when receiving the MCCH.

Figure 57:
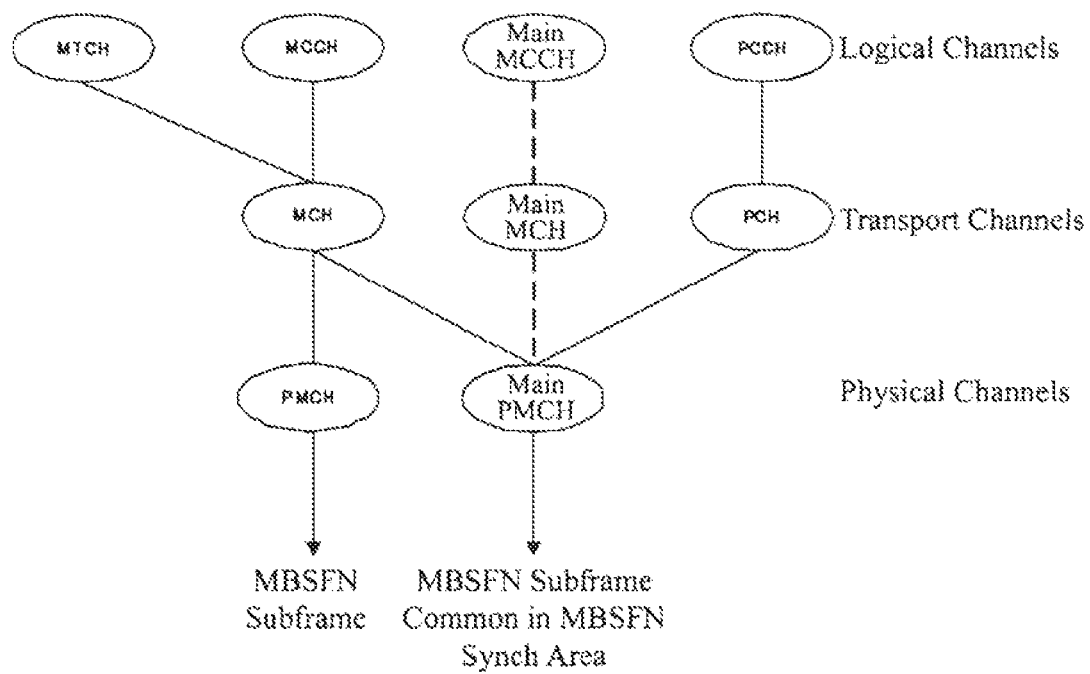
FIG. 57 is an explanatory drawing showing a mapping method at the time of disposing a main PMCH as a physical channel common in an MBSFN synchronization area.

In a further example, the method disclosed in FIG. 55 can be applied. In this case, the physical channel PMCH shown in FIG. 55 can be assumed to be the main PMCH. The PCCH onto which the paging signal is mapped is mapped onto the transport channel PCH, and this transport channel PCH is multiplexed with the MCH and the multiplexed channels are mapped onto the main PMCH. By doing in this way, the base station can transmit the PCH and the MCH separately in time from each other, and can further perform encoding on them independently from each other. Therefore, each mobile terminal can decode the PCH and the MCH independently at the time of reception of them. The above-mentioned example differs from Embodiment 7 in that the MTCH, MCCH, and PCCH which are mapped onto the main PMCH are transmitted via a multi-cell transmission scheme not in an MBSFN area but in an MBSFN synchronization area. Therefore, the PMCH transmitted via a multi-cell transmission scheme in an MBSFN area, and the main PMCH transmitted via a multi-cell transmission scheme in an MBSFN synchronization area can be separated clearly from each other. FIG. 57 is an explanatory drawing showing a mapping method in the case of disposing the main PMCH as a physical channel common to MBSFN synchronization areas. Mapping in the case of disposing the PMCH and the main PMCH is disclosed in FIG. 57. In this example, a case in which the MCH and PCH shown in FIG. 55 are used is shown. The MTCH and MCCH which are MBMS-related information transmitted to the MBSFN area are mapped onto the transport channel MCH, and this transport channel MCH is mapped onto the physical channel PMCH. The PMCH is transmitted via an MBSFN subframe corresponding to the MBSFN area. The MTCH and MCCH which are MBMS-related information transmitted to the MBSFN synchronization area are mapped onto the transport channel MCH, and this transport channel MCH is mapped onto the main PMCH which is a physical channel. The PCCH onto which the paging signal transmitted to the MBSFN synchronization area is mapped is mapped onto the transport channel PCH, and this transport channel PCH is mapped onto the main PMCH which is a physical channel. The main PMCH is transmitted via an MBSFN subframe transmitted via a multi-cell transmission scheme in the MBSFN synchronization area.

Furthermore, the logical channel and/or the transport channel can be disposed for each of the MBSFN area and the MBSFN synchronization area. For example, a case in which the MBMS-related information transmitted to the MBSFN synchronization area is only the MBMS control information is shown by a dashed line of FIG. 57. For example, the logical channel MCCH transmitted to the MBSFN synchronization area can be defined as a main MCCH, and the transport channel MCH transmitted to the MBSFN synchronization area can be defined as a main MCH. The main MCH is mapped onto the main PMCH which is a physical channel. By thus disposing the logical channel and the transport channel for each of the MBSFN area and the MBSFN synchronization area, the base station can carry out scheduling, a HARQ (Hybrid Automatic Repeat reQuest) process, an encoding process, an AMC (Adaptive Modulation Coding) process, etc. individually for each of the MBSFN synchronization area and the MBSFN area. The system therefore becomes able to deal with variations in an radio wave environment between the base station and mobile terminals with flexibility, and can improve the efficiency of the radio resources. The MCCH transmitted via a multi-cell transmission scheme in the MBSFN synchronization area includes service information about services in each MBSFN area included in the MBSFN synchronization area, and frame structure information. The MCCH can further include control information for MBMS service about each MBSFN area. In this case, because it is not necessary to transmit the MCCH by using the PMCH of each MBSFN area, it becomes able to enlarge the data area for MBMS, and can achieve an improvement in the speed of MBMS transmission. The MCCH transmitted via a multi-cell transmission scheme in the MBSFN synchronization area is periodically transmitted via a multi-cell transmission scheme in each MBSFN synchronization area at the main PMCH repetition period (Main PMCH repetition period).

On the other hand, a mobile terminal which is receiving or trying to receive an MBMS service which is transmitted via a multi-cell transmission scheme from cells in an MBSFN area receives the MCCH on the main PMCH at regular intervals and also receives the contents of the MBMS service, information about the frame structure, etc., so that the mobile terminal can receive the MBMS service. Therefore, after the mobile terminal receives and decodes the MCCH on the main PMCH, when there is no desired service, the mobile terminal becomes able to carry out a discontinuous reception operation until it receives the next main PMCH without receiving the PMCH corresponding to any other MBSFN area. Therefore, the power consumption of each mobile terminal can be reduced. In addition, by including the paging signal in this MCCH, a mobile terminal which is receiving or trying to receive an MBMS service is enabled to receive the paging signal when receiving the MCCH. As a result, because the mobile terminal does not have to receive the paging separately at a time other than the time of receiving the MCCH, the mobile terminal can receive the paging without interrupting the reception of the MBMS service. Furthermore, during a time period during which the mobile terminal is not receiving the MCCH, and during a time period during which the mobile terminal is not receiving the MBMS service, the mobile terminal can carry out a discontinuous reception operation, thereby reducing its power consumption. In the case in which the method disclosed to FIG. 54 is applied, the MCCH and the PCCH can be configured in the same MBSFN subframe. As an alternative, an MBSFN subframe onto which the MCCH is mapped and an MBSFN subframe onto which the paging signal is mapped can be arranged in such a way as to be adjacent to each other in time. In the case in which the method disclosed to FIG. 55 is applied, an MBSFN subframe onto which the MCCH is mapped and an MBSFN subframe onto which the paging signal is mapped can be arranged in such a way as to be adjacent to each other in time. In the case in which they are configured in this way, a mobile terminal which is receiving or trying to receive an MBMS service is enabled to receive the paging signal continuously when receiving the MCCH. As a result, because the mobile terminal does not have to separately receive the paging signal at a time other than the time of receiving the MBSFN subframes onto which the MCCH and the PCCH are mapped, the mobile terminal can receive the paging signal without interrupting the reception of the MBMS service. Furthermore, during a time period during which the mobile terminal is not receiving the MCCH, and during a time period during which the mobile terminal is not receiving the MBMS service, the mobile terminal can carry out a discontinuous reception operation, thereby reducing its power consumption.

In FIG. 49(b), a configuration in which an indicator 1 which is a "paging signal presence or absence indicator" indicating whether the paging signal has been transmitted, an indicator 2 which is an "MBMS-related information modified or unmodified indicator" indicating whether or not the MBMS control information has been changed are provided is disclosed. A physical area onto which the indicators are mapped can be disposed in an MBSFN subframe via which the main PMCH is transmitted. As an alternative, a physical area onto which the indicators are mapped can be the one adjacent in time to an MBSFN subframe via which the main PMCH is transmitted. By configuring the physical area onto which the indicators are mapped in this way, each mobile terminal can receive and decode the MCCH and the paging signal which are mapped onto the main PMCH immediately after receiving the indicators. For example, 1-bit information is defined as each of the indicators. Each of the indicators is encoded or multiplied by an MBSFN synchronization area specific scrambling code, and is mapped onto a predetermined physical area. For example, when an incoming call to a mobile terminal is occurring, the corresponding paging signal presence or absence indicator is set to "1", whereas when no incoming call to the mobile terminal is occurring, the paging signal presence or absence indicator is set to "0". Furthermore, for example, when the MBMS control information which is mapped onto the MCCH has been changed due to a change in the contents of the MBMS service transmitted in the MBSFN synchronization area, or the like, the MBMS-related information modified or unmodified indicator is set to "1". The length of a time period (referred to as an MBMS modification period) during which the MBMS-related information can be modified is determined, and the MBMS-related information modified or unmodified indicator "1" is transmitted repeatedly within the MBMS modification period. The length of the time period (the MBMS modification period) during which the MBMS-related information can be modified, the start timing (the SFN and the starting point), etc. can be predetermined. As an alternative, they can be informed via broadcast information from either the serving cell using a unicast service or the MBMS dedicated cell. When there is no further modification in the MBMS-related information after the expiration of the above-mentioned time period (the MBMS modification period), the MBMS-related information modified or unmodified indicator is set to "0".

Each mobile terminal can determine whether or not there is a modification in the MBMS-related information which exists in the MCCH and whether or not the paging signal exists by receiving the indicators in either the MBSFN subframe via which the main PMCH is transmitted via a multi-cell transmission scheme or another MBSFN subframe adjacent to the MBSFN subframe, and performing de-spreading and the like on each of the indicators to determine whether or not each of the indicators is 1 or 0. By thus disposing the indicators, when there is no modification in the MBMS control information and when no paging signal exists, each mobile terminal does not have to receive and/or decode all the information on the PMCH. Therefore, it becomes able to reduce the power for receiving of each mobile terminal. The physical area onto which the MBMS-related information modified or unmodified indicator indicating whether the MBMS control information has been modified is mapped can be the first one of one or more MBSFN subframes onto which the MBMS control information is mapped. As an alternative, the physical area onto which the MBMS-related information modified or unmodified indicator indicating whether the MBMS control information has been modified is mapped can be an OFDM symbol at the head of the above-mentioned first MBSFN subframe. As a result, each mobile terminal becomes able to determine whether a modification is occurring in the MBMS control information by receiving the first OFDM symbol. Furthermore, the physical area onto which the paging signal presence or absence indicator indicating whether or not the paging signal exists is mapped can be the first one of one or more MBSFN subframes onto which the paging signal is mapped. As an alternative, the physical area onto which the paging signal presence or absence indicator indicating whether or not the paging signal exists is mapped can be an OFDM symbol at the head of the above-mentioned first MBSFN subframe. As a result, each mobile terminal becomes able to determine whether or not the paging signal exists by receiving the first OFDM symbol.

By mapping each indicator onto such a physical area as mentioned above, when there is no modification in the MBMS control information and when no paging signal exists, each mobile terminal does not have to receive and/or decode subsequent OFDM symbols. Therefore, it becomes able to further reduce the power for receiving of each mobile terminal. Furthermore, because each mobile terminal can determine whether there is no modification in the MBMS control information or whether the paging signal exists at an earlier time from the first MBSFN subframe or the OFDM symbol at the head of the first MBSFN subframe, each mobile terminal can receive the MBMS control information immediately or can receive the paging signal immediately, it becomes able to reduce the control delay time occurring in each mobile terminal. The MBMS-related information modified or unmodified indicator and the paging signal presence or absence indicator can be mapped onto different physical areas, or can be mapped onto different physical areas. In the case in which the indicators are mapped onto an identical physical area, what is necessary is just to implement an OR logical operation on the indicators. As a result, each mobile terminal has only to receive a single indicator, there is provided an advantage of being able to simplify the receiving circuit configuration. In contrast, in the case in which the indicators are mapped onto different physical areas, each mobile terminal has only to receive only a required one of the indicators without having to receive the other indicator. Therefore, the power for receiving of each mobile terminal can be further reduced, and the delay time occurring in the reception of the required information can be further reduced. For example, a mobile terminal which is set so as not to receive a paging signal while receiving an MBMS service has only to receive the MBMS-related information modified or unmodified indicator, and can eliminate the necessity to receive the paging signal presence or absence indicator. The lengths of the repetition periods of the indicators can be the same as each other, or can be different from each other. The length of the repetition period of each of the indicators can be the same as that of the main PMCH, or can be different from that of the main PMCH. For example, the MBMS-related information modified or unmodified indicator can be disposed in the main PMCH once for every plural times the main PMCH is transmitted. The lengths of the repetition periods of the indicators are referred to as the "paging signal presence or absence indicator repetition period" and the "MBMS-related modified or unmodified indicator repetition period". The start timing (the SFN and the starting point) of the MBSFN subframe in which the indicators exist, the subframe number, the repetition period lengths of the indicators, and so on can be informed via broadcast information from the serving cell using a unicast service, can be informed via broadcast information from the MBMS dedicated cell, or can be predetermined.

In addition, a channel intended for the MBMS-related information modified or unmodified indicator can be formed on the main PMCH. For example, the channel can be configured as an MICH (MBMS Indicating CHannel). The paging signal presence or absence indicator is formed in the MICH, and the length of the repetition periods at which the MICH is repeated is referred to as the "MICH repetition period" (MICH Repetition period). The length of the repetition period of the paging signal presence or absence indicator can be the same as that of the MICH, or can be different from that of the MICH. The notification of the indicator can be made by using the same method as that described previously. As a result, the time when each of the indicators is transmitted is not limited to the time when the MCCH is transmitted, and therefore it becomes able to design the system with flexibility. In the case in which the indicators are configured as mentioned above, only the detection of the above-mentioned indicators cannot clarify whether the MBMS service being transmitted in the desired MBSFN area has been changed because the MBMS-related information modified or unmodified indicator simply shows whether the MBMS control information on the main PMCH has been changed. Each mobile terminal has to receive and decode the MBMS control information on the main PMCH in order to know whether the MBMS service being transmitted in the desired MBSFN area has been changed. As the MBMS control information on the main PMCH, an indicator showing whether an MBMS service being transmitted in which MBSFN area has been changed can be further disposed. A physical area used for this indicator can be disposed just before the MBSFN subframe onto which the MBMS control information on the main PMCH is mapped. By providing the above-mentioned indicator in this way, each mobile terminal can detect whether the MBMS service being transmitted in the desired MBSFN area has been changed without having to receive and decode all of the MBMS control information on the main PMCH. Therefore, it becomes able to reduce the control delay time occurring in each mobile terminal.

In a case in which the paging signal is mapped onto the PMCH, there arises a problem that when the number of mobile terminals for each of which an incoming call is occurring becomes huge, it takes too much time for each of the mobile terminals to detect the paging signal destined for the mobile terminal itself. A further problem is that any area onto which the paging signals for all the mobile terminals for each of which an incoming call is occurring are to be mapped cannot be ensured in a certain physical area onto which the paging signals are to be mapped. In order to solve these problems, a method of carrying out paging grouping will be disclosed hereafter. An example of the configuration of paging signal presence or absence indicators is shown in FIG. 49(c). All the mobile terminals are divided into K groups, and a paging signal presence or absence indicator is disposed for each of the groups. The physical area used for the paging signal presence or absence indicators is divided into K parts, and the paging signal presence or absence indicators of the K groups are mapped onto the K divided parts of the physical area respectively. In this case, K can have a value ranging from 1 to the number of all the mobile terminals. When an incoming call to a mobile terminal is occurring, the paging signal presence or absence indicator of the group to which this mobile terminal belongs is set to "1". When no incoming call to any of all the mobile terminals belonging to a group is occurring, the paging signal presence or absence indicator of this group is set to "0". A repetition or the like of repeatedly mapping the same paging signal presence or absence indicator value of "1" (or "0") onto the physical area can be carried out so that each of the mobile terminals satisfies a desired error rate of reception. The physical area onto which paging signals are mapped is also divided into K parts, and these K parts are brought into correspondence with the above-mentioned K groups respectively. As the paging signal destined for each mobile terminal, an identifier of the mobile terminal (an identification number or an identification code) can be provided. Each of the K divided pieces of the physical area is the sum of the corresponding group's mobile terminals' physical areas in each of which paging signal data required by one mobile terminal is accommodated. The number of mobile terminals in each group can be identical to that in any other group, or can be different from that in any other group. The number of mobile terminals in each group is calculated by using, for example, a method of calculating the average of measurements of the number of mobile terminals for each of which an incoming call has occurred simultaneously. As an alternative, a method of defining the number of mobile terminals which can be allocated to one OFDM symbol as the number of mobile terminals in each group, and then bringing a plurality of OFDM symbols into correspondence with the plurality of groups respectively can be used.

When an incoming call to a mobile terminal is occurring, "1" is set to the paging signal presence or absence indicator of the group to which this mobile terminal belongs, and the paging signal presence or absence indicator is mapped onto the physical area corresponding to this group and used for the paging signal presence or absence indicator. In addition, the paging signal destined for the mobile terminal for which an incoming call is occurring is mapped onto the paging-related physical area corresponding to the group to which this mobile terminal belongs. The mapping of the paging signal to the physical area is carried out by using a method of multiplying the paging signal destined for each mobile terminal by an identification code specific to the mobile terminal. The paging signal destined for each mobile terminal can be an identifier of the mobile terminal. In this case, the above-mentioned control operation of multiplying the paging signal destined for each mobile terminal by the identification code specific to the mobile terminal can be omitted. Each mobile terminal determines whether an incoming call destined for the group for which the mobile terminal itself belongs is occurring by receiving the paging signal presence or absence indicator of the group to which the mobile terminal itself belongs. When determining that an incoming call is occurring, each mobile terminal receives and decodes the physical area onto which the paging signal brought into correspondence with the group onto which the mobile terminal belongs is mapped. After decoding the physical area, each mobile terminal carries out an operation of calculating a correlation with the identification code specific to the mobile terminal to carry out blind detection to specify the paging signal destined for the mobile terminal itself. As a result, each mobile terminal becomes able to determine that an incoming call to the mobile terminal itself is occurring. When each mobile terminal has not detected the paging signal destined therefor, the mobile terminal itself determines that no incoming call thereto is occurring. By grouping all the mobile terminals into the K groups, the necessity for each of the mobile terminals to receive all of the area dedicated to paging signals can be eliminated, and each of the mobile terminals has only to receive only a required area, i.e., a physical area corresponding to the group to which the mobile terminal itself belongs.

Therefore, it becomes able to reduce the power for receiving of each mobile terminal. In addition, by using the paging signal presence or absence indicator corresponding to each group, also when there are many mobile terminals, the paging signal presence or absence indicators can be provided with a small amount of physical resources. Furthermore, each of the mobile terminals has only to receive an area dedicated to paging signals as needed. Therefore, while the power for receiving of each of the mobile terminals can be reduced, the control delay time can also be reduced because each of the mobile terminals can make a transition to the next operation immediately when it does not have to receive the paging signal.

As the method of mapping an indicator showing whether or not a paging signal has been transmitted onto a physical area, the method of mapping a paging signal onto a physical area shown in Embodiment 7 can be applied too. Furthermore, in this case, the base station can multiply the indicator showing whether or not a paging signal has been transmitted by a mobile-terminal-specific identification code (UE-ID or RNTI). Furthermore, the base station is configured in such a way as to add a CRC to the indicator showing whether or not a paging signal has been transmitted, and can also use a method of multiplying the CRC by a mobile-terminal-specific identification number. As a result, each of the mobile terminals becomes able to carry out blind detection of whether or not it is information destined for the mobile terminal itself by using the mobile-terminal-specific identification code. Therefore, it becomes unnecessary to fix the physical area onto which the indicator showing whether the paging signal destined for each of the mobile terminals has been transmitted is mapped in advance. The physical area onto which this indicator can be mapped can be predetermined, or can be broadcast. By thus predetermining or broadcasting the physical area, the physical resources can be used with flexibility. As will be mentioned below, these methods are effective for not a case in which the indicator showing whether a paging signal has been transmitted is 1-bit information, but a case in which the amount of information transmitted to each mobile terminal, such as information about allocation of a paging message, differs.

In above-mentioned Embodiment, each of the K divided pieces of the physical area onto which paging signals are mapped is the sum of the corresponding group's mobile terminals' physical areas in each of which paging signal data required by one mobile terminal is accommodated. However, because the required physical area becomes very large and the overhead for transmitting the MBMS service increases greatly as the number of mobile terminals becomes huge, the transmission rate of the MBMS service data decreases. In order to prevent this problem, the paging signal destined for each of the mobile terminals is multiplied by an identification code specific to the mobile terminal itself. As a result, because each of the mobile terminals becomes able to carry out blind detection of whether or not it is information destined for the mobile terminal itself by using the identification code specific to the mobile terminal, it becomes unnecessary to fix the physical area onto which the paging signal destined for each of the mobile terminals is mapped in advance. Therefore, there is no necessity to provide a physical area required for the paging signals destined for all the mobile terminals, and a physical area which is large enough to map paging signals destined for a certain number of mobile terminals for each of which an incoming call is predicted to actually occur has only to be provided. As an example, there is a method of defining the average of measurements of the number of mobile terminals for each of which an incoming call has occurred simultaneously as the number of mobile terminals to be included in each group. By using this method, it becomes able to use the limited amount of physical resources effectively. Furthermore, by using the above-mentioned method, the mobile communication system can flexibly deal with even a case in which the number of mobile terminals for each of which an incoming call is occurring becomes larger than a predicted number through scheduling in a base station. For example, the mobile communication system can transmit a paging signal destined for a mobile terminal receiving a new incoming call on the next main PMCH.

When the number of all the mobile terminals is small, only the paging signal presence or absence indicators can be transmitted by setting the value of K to be equal to the number of all the mobile terminals. In this case, there is no necessity to ensure the physical area used for paging signals, and what is necessary is just to ensure a physical area used for the paging signal presence or absence indicators and corresponding to the number of all the mobile terminals. Therefore, the efficiency of the radio resources can be improved. Furthermore, in this case, there exists a physical area used for a paging signal presence or absence indicator and corresponding to each mobile terminal. Therefore, each of the mobile terminals can determine the presence or absence of an incoming call without receiving the area used for paging signals by simply receiving and decoding the physical area for a paging signal presence or absence indicator and corresponding to the mobile terminal itself, thereby being able to reduce the control delay time occurring when performing the paging operation.

Furthermore, in the above-mentioned example, the base station carries out the process of multiplying the paging signal destined for each of the mobile terminals by an identification code specific to this mobile terminal. The base station can alternatively use another method of adding the paging signal destined for each of the mobile terminals and an identification number specific to this mobile terminal. In this case, each of the mobile terminals can detect the paging signal destined for the mobile terminal itself by determining whether the mobile-terminal-specific identification number exists in the received information on which the mobile terminal itself has performed the process including decoding.

In this embodiment, the configuration of disposing the indicator showing whether or not the paging signal has been transmitted is disclosed. As an alternative, the information about allocation of the paging signal can be provided as this indicator. As a result, when each mobile terminal receives the information about allocation of the paging signal to the mobile terminal itself, the mobile terminal can judge that paging is occurring. As an example of the information about allocation of the paging signal, information showing the physical area onto which the paging signal transmitted via the same subframe, e.g., a paging message is mapped can be provided. By thus defining the information about the physical area as the allocation information, each mobile terminal which has received the information about allocation of the paging message has only to receive only this physical area in order to receive the paging message, and therefore does not have to receive any other physical area. Therefore, each mobile terminal's power consumption at the time of receiving the paging message can be reduced. Furthermore, it becomes unnecessary to transmit beforehand the information about the physical area to which the paging signal is allocated to each mobile terminal via broadcast information or the like, and the amount of signaling can be reduced. Furthermore, because it becomes able to carryout the allocation of the paging signal to the physical area with flexibility, there is provided an advantage of improving the use efficiency of the radio resources.

As the method of mapping the paging signal onto the paging-related physical area of the main PMCH, the method disclosed in Embodiment 7 can be applied. For example, the method shown in FIG. 33 or 34 can be applied. However, in the modulation process, the descrambling process, etc., the step of multiplying the result of the multiplexing by an MBSFN-area-specific scrambling code cannot be applied, and it is necessary not to multiply the result of the multiplexing by an MBSFN-area-specific scrambling code, or it is necessary to multiply the result of the multiplexing by an MBSFN synchronization area specific scrambling code.

As to a mobile-terminal-specific identification code which is used by this embodiment, the same method as that described in Embodiment 7 is used. According to this embodiment, an identification code specific to each MBSFN synchronization area is defined as a mobile-terminal-specific identification code. The method of defining an identification code specific to each MBSFN synchronization area as a mobile-terminal-specific identification code is not limitedly applied to this embodiment, and can be applied to a case of multiplying the result of the multiplexing by a mobile-terminal-specific identification code when carrying out multi-cell (MC) transmission in an MBSFN synchronization area. Two or more mobile-terminal-specific identification codes can be defined for each MBSFN synchronization area. The two or more mobile-terminal-specific identification codes can be put to different uses. For example, two different mobile-terminal-specific identification codes specific to each mobile terminal are provided for each MBSFN synchronization area, and one of them is used for the paging signal and the other identification code is used for the MBMS control information. By providing two different mobile-terminal-specific identification codes in this way, the paging signal which is transmitted via an MC transmission scheme in the MBSFN synchronization area is separated into parts respectively destined for mobile terminals and each of the mobile terminals can receive the paging signal destined for the mobile terminal itself.

In the above-mentioned example, the methods disclosed in Embodiment 7 are applied as the configuration of the main PMCH and the method of mapping a paging signal onto the main PMCH. Similarly, in a case in which, for example, the frequency with which the main PMCH is transmitted is high in time, the methods disclosed in Embodiment 8 can be applied as the configuration of the main PMCH and the method of mapping a paging signal onto the main PMCH.

By using the method of disposing a physical channel transmitted via a multi-cell transmission scheme in the MBSFN synchronization area, and carrying a paging signal on this physical channel, which is disclosed above in this Embodiment 9, the mobile communication system can transmit the paging signals destined for all mobile terminals each of which is receiving or trying to receive an MBMS service from an MBMS dedicated cell to make it possible for each of the above-mentioned mobile terminals to receive the paging signal from the MBMS dedicated cell.

Embodiment 10

In the above-mentioned embodiments, the method of providing a paging signal in such a way that the paging signal is transmitted via a multi-cell transmission scheme from all cells in either an MBSFN area or an MBSFN synchronization area is disclosed. It can be considered that either an MBSFN area or an MBSFN synchronization area is a huge area geographically. In such a case, transmission of a paging signal destined for a mobile terminal from a cell which does not contribute to SFN combining in the mobile terminal causes wasted radio resources and hence reduction in the system capacity. Therefore, there is a necessity to limit the cells each of which transmits a paging signal to a mobile terminal to a cell in which the mobile terminal is being located, and neighboring cells. In the case of limiting the cells each of which transmits a paging signal to a mobile terminal to a cell in which the mobile terminal is being located, and neighboring cells, a cell which transmits a paging signal to a mobile terminal and a cell which does not transmit any paging signal to the mobile terminal exist within either an identical MBSFN area or an identical MBSFN synchronization area, and signals different between the cells are transmitted to the mobile terminal via a transmission scheme which is not a multi-cell transmission one. Because each mobile terminal cannot limit the cells from each of which it receives a paging signal selectively, each mobile terminal also receives a signal which is not transmitted via a multi-cell transmission scheme and this results in a receive error being caused therein. A different signal transmitted from a cell which does not transmit any paging signal causes degradation in the quality of reception of the desired paging signal. Particularly, a mobile terminal being located in the vicinity of a boundary between a cell which transmits a paging signal and a cell which does not transmit any paging signal has an increasing number of receive errors, and therefore has a problem of becoming unable to receive the paging signal. Therefore, in accordance with this embodiment, a configuration of providing both a cell which transmits a paging signal and a cell which does not transmit any paging signal is disclosed.

In order to reduce receive errors occurring in each mobile terminal when receiving a paging signal, the method of mapping a paging signal is changed between a cell which transmits a paging signal, and a cell which does not transmit any paging signal. FIG. 50 is an explanatory drawing showing a method of transmitting a paging signal to some cells in either an MBSFN area or an MBSFN synchronization area. As shown in FIG. 50, in a cell which transmits a paging signal, a base station multiplies a signal by an identification number specific to a mobile terminal in question (process 1), adds a CRC to the result of the multiplication (process 2), and carries out a process including encoding and rate matching (process 3), as explained with reference to FIG. 33 or 44. The base station then allocates the result of the series of processes which it has carried out to a control information element unit (process 8), and carries out a process of connecting a plurality of control information elements whose number is equal to that of mobile terminals for each of which an incoming call is occurring to one another. In contrast, in a cell which does not transmit any paging signal, a base station does not carry out the above-mentioned processes. As a physical area onto which the paging signal is mapped, there are a PMCH, a DPCH, or a main PMCH as shown in the above-mentioned embodiments. In a case in which a cell which transmits a paging signal to a mobile terminal for which an incoming call is occurring, and a cell which does not transmit any paging signal to the mobile terminal exist within either an MBSFN area or an MBSFN synchronization area, a base station connects a switch 2401 thereof shown in the figure to a terminal a in the cell which transmits a paging signal to the mobile terminal. The base station then multiplies the paging signal to the mobile terminal by an identification number specific to the mobile terminal, adds a CRC to the result of the multiplication, and carries out a process including encoding and rate matching. Because the switch 2401 is connected to the terminal a, information processed as above for each mobile terminal is allocated to a control information element unit.

In the above-mentioned example, the paging signal destined for each of the mobile terminals is allocated to a control information element unit having a size corresponding to the size of the physical area onto which the paging signal is to be mapped. As an alternative, the paging signal destined for each of the mobile terminals can be allocated to a transport block unit. In the case in which the paging signal destined for each of the mobile terminals is allocated to a transport block unit, the physical resource to which the paging signal is allocated can be increased or decreased according to the amount of information, and the allocation to the physical area can be carried out with flexibility.

In contrast, in the cell which does not transmit any paging signal, a base station connects a switch 2401 thereof shown in the figure to a terminal b. A code for padding for each cell is provided without using the paging signal destined for each mobile terminal, and this code for padding is allocated to a control information element unit. In this case, the area of a control information element unit allocated to a mobile terminal is the same for both the cell which transmits a paging signal and the cell which does not transmit any paging signal. Accordingly, each base station can easily switch between pieces of information to be allocated by using the switch in the cell which transmits a paging signal and the cell which does not transmit any paging signal. In addition, by making the size of the area of a control information element unit allocated to a mobile terminal be equal for each of all the mobile terminals, the length of the code for padding defined for each cell can be predetermined. As a result, a control operation of embedding the code for padding can be simplified. In contrast, a mobile terminal which is receiving or trying to receive an MBMS service transmitted via a multi-cell transmission scheme from cells in either an MBSFN area or an MBSFN synchronization area receives a PMCH, a DPCH, or a main PMCH onto which a paging signal destined therefor is mapped, carries out a demodulation process, a descrambling, and so on, and divides the result of the demodulation and descrambling into parts each corresponding to a control information element unit. The mobile terminal then carries out blind detection of the paging signal destined for the mobile terminal itself by performing a process including decoding on each of the divided parts each corresponding to a control information element unit, and then carrying out an operation of calculating a correlation with an identification number specific to the mobile terminal. When the result of the correlation operation is larger than a certain threshold, the mobile terminal determines that there is paging destined for the mobile terminal itself, and starts an operation of receiving a paging incoming call with the paging signal. In contrast, when the result of the correlation operation is equal to or smaller than the certain threshold, the mobile terminal determines that there is no paging destined for the mobile terminal itself, and makes a transition to reception of MBMS-related information or makes a transition to a discontinuous reception operation if there is no necessity to receive any MBMS-related information.

When a transmission signal from the cell which does not transmit any paging signal differs from a transmission signal from the cell which transmits a paging signal, the transmission of these transmission signals is not multi-cell transmission and no SFN gain can be obtained from multi-cell transmission, while the transmission signal from the cell which does not transmit any paging signal acts as noise and an increasing number of errors occurs in the correlation operation result in each mobile terminal. As disclosed in this embodiment, by predetermining a code for padding (embedding or setting) in a cell which does not transmit any paging signal, and then embeds this code for padding to an area onto which the paging signal destined for each mobile terminal is mapped, errors occurring in the correlation operation by each mobile terminal can be reduced. FIG. 51 is an explanatory drawing showing an example of the code for padding for each cell which is disposed in a cell which does not transmit any paging signal. For example, in a cell which does not transmit any paging signal, the code for padding is set to "all 0s" (all 0s). In this case, in all cells each of which does not transmit any paging signal, the same code, i.e., the code set to "all 0s" is provided. By providing the code for padding in this way, each mobile terminal can cancel components of "0" transmitted from a cell which does not transmit any paging signal by using an interference elimination function, such as an interference canceller, in the receiver thereof, becomes able to carry out SFN combining of only the paging signal transmitted from a cell which transmits the paging signal, and can therefore reduce receive errors occurring in the paging signal in the correlation operation carried out thereby. As an alternative, in a cell which does not transmit any paging signal, the code for padding is set to "all 1s" (all 1s). In this case, in all cells each of which does not transmit any paging signal, the same code, i.e., the code set to "all 1s" is provided. Also in this case, each mobile terminal can cancel components of "1" transmitted from a cell which does not transmit any paging signal by using an interference elimination function, such as an interference canceller, and can therefore reduce receive errors occurring in the paging signal received thereby. In each cell which does not transmit any paging signal, the code for padding can be alternatively set to a known specific code other than all 0s and all 1s. The code for padding in each cell which does not transmit any paging signal can be alternatively set to a random value. In this case, a random value is derived for each cell, and padding with this random value is carried out. By configuring the code for padding in this way, because the signals transmitted from cells each of which does not transmit any paging signal are random signals which differ from one another, they are canceled out in each mobile terminal and therefore the paging signal component transmitted from the cell which transmits the paging signal becomes strong relatively. Therefore, it becomes able to reduce receive errors occurring in the paging signal in the correlation operation.

A code for paging transmission cell identification can be used for distinguishing between the cell which transmits a paging signal and the cells each of which does not transmit any paging signal. The code for paging transmission cell identification can be an orthogonal code or a pseudo orthogonal code. As an alternative, the code for paging transmission cell identification can be a scrambling code or a scrambling code. FIG. 52 is an explanatory drawing showing a method of using the code for paging transmission cell identification. The base station multiplies the paging signal by a code for mobile terminal identification (process 1), carries out a coding (Coding) process including CRC addition, encoding, rate matching, and MCS (Modulation Coding Scheme) reflection (process 2), and multiplies the result of the process by the code for paging transmission cell identification (process 3). As the code for paging transmission cell identification, a scrambling code for paging signal transmission cell is used in the cell which transmits a paging signal. In each of the cells which does not transmit any paging signal, a scrambling code for paging signal untransmission cell is used as the code for paging transmission cell identification. The scrambling code for paging signal transmission cell identification and the scrambling code for paging signal untransmission cell, which are the codes for paging transmission cell identification, are orthogonal to each other. A process of allocating the result of the multiplication by each of these codes for paging transmission cell identification to a control information element unit, and connecting a plurality of control information elements whose number is equal to that of mobile terminals for each of which an incoming call is occurring to one another is carried out (process 4). In contrast, a mobile terminal which is receiving or trying to receive an MBMS service transmitted via a multi-cell transmission scheme from cells in either a certain MBSFN area or an MBSFN synchronization area receives a PMCH, a DPCH, or a main PMCH onto which a paging signal destined therefor is mapped, carries out a demodulation process, a descrambling, and so on, and divides the result of the demodulation and descrambling into parts each corresponding to a control information element unit. The mobile terminal then performs descrambling on each of the divided parts each corresponding to a control information element unit by using the scrambling code for paging signal transmission cell. Because the transmission signals are transmitted after they have been multiplied, in the same physical area, by the scrambling codes, which are orthogonal to each other, by both the cell which transmits the paging signal and each of the cells which does not transmit any paging signal, the mobile terminal becomes able to eliminate the influence of the transmission signal from each of the cells which does not transmit any paging signal by carrying out the descrambling by using the scrambling code for paging signal transmission cell, and therefore can reduce the occurrence of receive errors.

The mobile terminal then carries out blind detection of the paging signal destined for the mobile terminal itself by using the identification code specific to the mobile terminal itself by performing a process including decoding on the descrambled data. When the result of the correlation operation is larger than a certain threshold, the mobile terminal determines that there is paging destined for the mobile terminal itself, and starts an operation of receiving a paging incoming call with the paging signal. In contrast, when the result of the correlation operation is equal to or smaller than the certain threshold, the mobile terminal determines that there is no paging destined for the mobile terminal itself, and makes a transition to reception of MBMS-related information or makes a transition to a discontinuous reception operation if there is no necessity to receive any MBMS-related information. Each of the codes for paging transmission cell identification can be predetermined, or can be informed via broadcast information of an MBMS dedicated cell or broadcast information of an unicast cell. By thus multiplying transmission signals by the scrambling codes, which are orthogonal to each other, in the cell which transmits a paging signal and each of the cells which does not transmit any paging signal, and making the receive side carry out the descrambling on them, the influence of the signal from each of the cells which does not transmit any paging signal can be eliminated, and it becomes able to extract the paging signal from the cell which transmits the paging signal with a lower number of receive errors. In the present invention, the order in which the multiplication by the code for mobile terminal identification and the multiplication by the code for paging transmission cell identification are carried out can be reversed. In a case in which the multiplication by the code for mobile terminal identification is carried out after the multiplication by the code for paging transmission cell identification, the mobile terminal carries out an operation of calculating a correlation with the identification number specific to the mobile terminal itself previously, thereby providing an advantage of becoming able to determine whether there is a paging signal destined for the mobile terminal itself at an earlier time.

In the above-mentioned example, the process of multiplying the paging signal destined for each of the mobile terminals by the identification code specific to the mobile terminal itself in the process 1 disclosed with reference to FIGS. 50 and 52 is carried out. The base station can alternatively use another processing method of adding the paging signal destined for each of the mobile terminals and an identification number specific to this mobile terminal. In this case, each of the mobile terminals receives the physical area used for the paging signal, carries out demodulation and descrambling using an MBSFN-area-specific scrambling code, and divides the result of the demodulation and descrambling into parts each corresponding to an information element unit, and performs a process including decoding on each of the divided parts each corresponding to an information element unit. Each of the mobile terminals then determines whether the mobile-terminal-specific identification number exists in the information on which the mobile terminal itself has performed the process including decoding to detect the paging signal destined therefor.

In this embodiment, each cell can define either a code for padding or a code for paging transmission cell identification as a code which the cell transmits when not transmitting any paging signal at the initial setting time. Only when receiving a notification of paging occurrence which accompanies a paging request from an MME, an MCE, or an MBMS-GW, each cell can transmit either the code for padding or the code for paging transmission cell identification, as a code with which the cell transmits a paging signal, only to a mobile terminal to which is a destination of this notification. Using this configuration, because it becomes unnecessary to transmit a notification that paging has not occurred from the MME, the MCE, or the MBMS-GW to each cell, the amount of signaling can be reduced.

As a concrete example of the configuration of disposing both a cell which transmits a paging signal, and a cell which does not transmit any paging signal, the method of transmitting a code for padding from the cell which does not transmit any paging signal is disclosed. In a case in which the physical area onto which a paging signal is mapped is determined, the transmission power required for transmission of this physical area from the cell which does not transmit any paging signal can be set to 0. Nothing can be transmitted via this physical area. Because the physical area onto which a paging signal is mapped is determined in the base station in the cell which does not transmit any paging signal, the transmission power of the above-mentioned physical area can be reduced. The transmission power can be set to 0, or nothing can be transmitted. Therefore, in a cell which does not transmit any paging signal, a paging signal does not have to be a code for padding and can be any code. As a result, the interference which occurs when different signals are transmitted between cells each of which carries out MC transmission in an MBSFN area or an MBSFN synchronization area, i.e., the interference to the cell which transmits a paging signal from another cell which does not transmit any paging signal can be eliminated. Furthermore, in a cell which does not transmit any paging signal, the base station can increase the power required for transmission of another physical area by a reduction down to zero in the power required for transmission of the above-mentioned physical area. Furthermore, in a cell which does not transmit any paging signal, the base station can achieve a reduction in its low power consumption because the base station reduces the power required for transmission of the above-mentioned physical area to zero. The physical area onto which all of a paging signal is mapped does not have to be determined. For example, this method can be applied to a case in which the physical area onto which a part of a paging signal (e.g., information showing the presence or absence of paging) is mapped is determined. Furthermore, this method can also be applied to a case in which the physical area onto which a paging signal presence or absence indicator disclosed in Embodiment 7 or 9 is mapped is determined.

Using the configuration as mentioned in this embodiment, it becomes able to dispose both a cell which transmits a paging signal and a cell which does not transmit any paging signal, and, even in a case in which either an MBSFN area or an MBSFN synchronization area is a huge area geographically, it becomes able to limit the cells each of which transmits a paging signal to a mobile terminal to a cell in which the mobile terminal is being located, and neighboring cells. Even in the case of limiting the cells each of which transmits a paging signal to a mobile terminal to a cell in which the mobile terminal is being located, and neighboring cells, there is provided an advantage of making it possible for each mobile terminal to receive the paging signal destined therefor without causing degradation in the quality of reception of the desired paging signal due to a different signal transmitted from another cell which does not transmit any paging signal. Particularly, there is provided another advantage of making it possible for a mobile terminal being located in the vicinity of a boundary between a cell which transmits a paging signal and a cell which does not transmit any paging signal to receive a high-quality paging signal. In addition, in a case of, for example, transmitting a paging signal to only cells in one or more MBSFN areas which are geographically close to the tracking area of a unicast cell, an MME which has received a paging request does not have to transmit a paging request signal to all MCEs respectively corresponding to all MBSFN areas in the MBSFN synchronization area, and has only to transmit the paging request signal only to an MCE which controls the above-mentioned one or more MBSFN areas. Therefore, the MCE which has received the paging request signal is enabled to transmit the paging signal to the cells in the MBSFN areas which the MCE controls, while another MCE which has not received the paging request signal is enabled not to transmit any paging signal in the MBSFN areas which the other MCE controls. Therefore, there is provided an advantage of being able to reduce the amount of signaling between the MME and the MCEs. In addition, by limiting the cells each of which transmits a paging signal to a mobile terminal to a cell in which the mobile terminal is being located, and neighboring cells, it becomes able to use the physical resource used for transmission of a paging signal destined for a mobile terminal for transmission of a paging signal destined for another mobile terminal at a geographically distant location, and therefore the efficiency of the radio resources can be improved.

In above-mentioned Embodiments 1 to 10, the method of transmitting a paging signal via a multi-cell transmission scheme from cells in a frequency layer dedicated to MBMS transmission by carrying the paging signal onto an MBSFN subframe is disclosed. Hereafter, a method of transmitting a paging signal via an MBSFN subframe in a cell in a unicast/MBMS mixed frequency layer will be disclosed. In a cell in a unicast/MBMS mixed frequency layer, an MBSFN subframe is provided in order to carry out MC transmission. The method disclosed in any of Embodiments 1 to 10 is applied to this MBSFN subframe so as to transmit a paging signal. As a concrete example, Embodiment 7 can be applied to the MBSFN subframe, and a paging signal or a paging signal presence or absence indicator can be mapped onto a PMCH in the MBSFN subframe. As an alternative, Embodiment 8 can be applied to the MBSFN subframe, and a channel (DPCH) dedicated to paging can be formed in the MBSFN subframe and a paging signal (a paging message or information for informing the presence or absence of paging) can be mapped onto this channel dedicated to paging. As an alternative, Embodiment 9 can be applied to the MBSFN subframe, and a main PMCH can be provided in an MBSFN subframe transmitted in an MBSFN synchronization area and a paging signal or a paging signal presence or absence indicator can be mapped onto this main PMCH. Furthermore, in a case in which a paging signal is transmitted only to some cells in a unicast/MBMS mixed frequency layer in either an MBSFN area or an MBSFN synchronization area, the method shown in Embodiment 10 can be applied.

As mentioned above, the use of the method of transmitting a paging signal by using an MBSFN subframe in a cell in a unicast/MBMS mixed frequency layer makes it possible to use a PDSCH and an MBSFN subframe for transmission of a paging signal. Therefore, the method of deriving a paging occasion does not have to handle only a subframe in which the PDSCH exists, except subframes which can be MBSFN subframes, and therefore there can be provided an advantage of making effective use of the radio resources, and reducing the delay time occurring in the incoming call process. Mobile terminals being served by a cell in a unicast/MBMS mixed frequency layer include mobile terminals each of which is receiving an MBMS (MBMS-related information, an MCCH, and an MTCH), and mobile terminals each of which is not receiving an MBMS. Because a mobile terminal which is not receiving an MBMS does not have to receive an MBSFN subframe, a paging signal can be transmitted to this mobile terminal with a subframe in which the PDSCH exists while a paging signal can be transmitted to a mobile terminal which is receiving an MBMS with the PDSCH and an MBSFN subframe. As the method of mapping a paging signal onto an MBSFN subframe, the above-mentioned method can be used. Accordingly, each mobile terminal becomes able to receive a paging signal with a subframe according to its reception capability. Furthermore, because a mobile terminal which is receiving an MBMS receives an MBSFN subframe, a paging signal destined for the mobile terminal currently receiving the MBMS can be mapped onto an MBSFN subframe by using the above-mentioned method. As a result, the mobile terminal currently receiving the MBMS can receive the paging signal without waiting for a paging cycle for unicast (a DRX cycle), and therefore there is provided an advantage of being able to reduce the delay time occurring before the reception.

A paging signal destined for a mobile terminal which has carried out counting when carrying out MBMS reception can be mapped onto an MBSFN subframe. The counting is an operation of transmitting information showing that a mobile terminal will receive an MBMS from the mobile terminal to the network side. Because the network side becomes able to acquire information about an identification number (UE-ID or the like) of a mobile terminal which has carried out the counting, the network side has only to transmit the paging signal destined for the mobile terminal which has carried out the counting by carrying the paging signal onto an MBSFN subframe on the basis of this information. Because the network side can recognize that the mobile terminal which has carried out the counting will receive an MBMS, the network side certainly becomes able to transmit the paging signal to this mobile terminal with an MBSFN subframe. In a case in which the counting is carried out for each MBMS service, what is necessary is just to map a paging signal onto an MBSFN subframe via which an MBMS service for which the counting has been carried out is transmitted to transmit the paging signal.

In a case of carrying a paging signal on the PMCH in an MBSFN subframe, a part of the paging signal can be transmitted by using a symbol for L1/L2 control signal of this MBSFN subframe and the remainder of the paging signal can be transmitted by using the PMCH of this MBSFN subframe. As a concrete example, information showing the existence of the paging signal is mapped onto the symbol for L1/L2 control signal and a paging message is mapped onto the PMCH, and they are transmitted to the corresponding mobile terminal. As the information showing the existence of the paging signal, either a 1-bit information showing the presence or absence of the paging signal or information about allocation of the paging signal can be used. Scheduling information (paging occasion) of the information showing the existence of the paging signal can be predetermined, or can be transmitted, via a BCCH, from the serving cell. The network side and the mobile terminal side can derive the scheduling information of the information showing the existence of the paging signal by using an identical parameter and an identical computation expression. Using this configuration, the amount of signaling between the mobile terminal and the network can be reduced. The information showing the existence of the paging signal can be multiplied by the identification code specific to the mobile terminal itself. Using this configuration, the mobile terminal can carry out blind detection of the paging signal destined for the mobile terminal itself. Because the mobile terminal can know the presence or absence of the paging signal and the area to which the paging signal is allocated even if the paging signal presence or absence indicator is not mapped onto the PMCH, the mobile terminal has only to receive this paging signal only when the paging signal exists, whereas the mobile terminal does not have to perform the operation of receiving the paging signal when the paging signal does not exist. Therefore, there is provided an advantage of being able to achieve low power consumption in the mobile terminal.

When a tracking area for paging in a unicast differs from a tracking area at the time of multi-cell transmission in an MBMS in a unicast/MBMS mixed frequency layer, there arises a problem that a part of a paging signal which is transmitted via a unicast transmission scheme by using a symbol for L1/L2 control signal, and the remaining paging signal which is transmitted via a multi-cell transmission scheme by using a PMCH are not transmitted from an identical cell. There occurs a state in which only information showing the existence of paging is transmitted from a cell included only in a tracking area for unicast transmission while only a remaining paging message is transmitted from a cell included only in a tracking area for multicast transmission. In order to solve this problem, a tracking area for unicast is made to be the same as a tracking area for multi-cell transmission in an MBMS. A single tracking area can be used both for unicast transmission and for multi-cell transmission. As an alternative, there can be provided two tracking areas to each of which the same cells belong. The tracking areas can be managed by either an MME or an MCE. As an alternative, the tracking areas can be managed by both of them. Using this configuration, an identical cell can transmit a part of a paging signal by using a symbol for L1/L2 control signal and can also transmit the remaining paging signal by using a PMCH in the same MBSF subframe. Therefore, because the decoding of the paging signal becomes simplified in the MME, the MCE, the base station, and each mobile terminal, there is provided an advantage of reducing the complexity of the paging signal reception control and speeding up the processing.

Embodiment 11

FIG. 10 is a block diagram showing the whole configuration of a mobile communication system in accordance with the present invention. In FIG. 10, a mobile terminal 101 carries out transmission and reception of control data (C-plane) and user data (U-plane) to and from a base station 102. Base stations 102 are classified into unicast cells 102-1 each of which handles only transmission and reception of unicast, mixed cells 102-2 each of which handles transmission and reception of unicast and MBMS services (MTCH and MCCH), and MBMS dedicated cells 102-3 each of which handles only transmission and reception of MBMS services. Each of a unicast cell 102-1 handling transmission and reception of unicast and an MBMS/Unicast-mixed cell (a mixed cell) 102-2 handling transmission and reception of unicast is connected to an MME 103 via an interface S1_MME. Each of a unicast cell 102-1 handling transmission and reception of unicast and a mixed cell 102-2 handling transmission and reception of unicast is also connected to an S-GW 104 via an interface S1_U for transmission and reception of unicast user data. The MME 103 is connected to a PDNGW (Packet Data Network Gateway) 902 via an interface S11. An MCE 801 allocates radio resources to all base stations 102 existing in an MBSFN area in order to carry out multi-cell (MC) transmission. For example, a case in which both an MBSFN area #1 consisting of one or more MBMS/Unicast-mixed cells 102-2, and an MBSFN area #2 consisting of one or more MBMS dedicated cells 102-3 exist will be considered. An MBMS/Unicast-mixed cell 102-2 is connected to an MCE 801-1 that allocates radio resources for all the base stations existing in the MBSFN area #1 via an interface M2. Furthermore, an MBMS dedicated cell 102-3 is connected to an MCE 801-2 that allocates radio resources for all the base stations existing in the MBSFN area #2 via an interface M2.

An MBMS GW 802 can be divided into an MBMS CP 802-1 that handles control data, and an MBMS UP 802-2 that handles user data. Each of an MBMS/Unicast-mixed cell 102-2 and an MBMS dedicated cell 102-3 is connected to the MBMS CP 802-1 via an interface M1 for transmission and reception of MBMS-related control data. Each of an MBMS/Unicast-mixed cell 102-2 and an MBMS dedicated cell 102-3 is connected to the MBMS UP 802-2 via an interface M1_U for transmission and reception of MBMS-related user data. The MCE 801 is connected to the MBMS CP 802-1 via an interface M3 for transmission and reception of MBMS-related control data. The MBMS UP 802-2 is connected to an eBMSC 901 via an interface SGimb. The MBMS GW 802 is connected to the eBMSC 901 via an interface SGmb. The eBMSC 901 is connected to a content provider. The eBMSC 901 is connected to a PDNGW 902 via an interface SGi. The MCE 801 is connected to an MME 103 via an interface (IF) between MME and MCE which is a new interface.

FIG. 11 is a block diagram showing the configuration of a mobile terminal 101 for use in the system in accordance with the present invention. In FIG. 11, a transmitting process of the mobile terminal 101 is performed as follows. First, control data from a protocol processing unit 1101 and user data from an application unit 1102 are stored in a transmission data buffer unit 1103. The data stored in the transmission data buffer unit 1103 are delivered to an encoder unit 1104, and are subjected to an encoding process such as an error correction. There can exist data which are outputted directly from the transmission data buffer unit 1103 to a modulating unit 1105 without being encoded. A modulation process is performed on the data on which the encoding process has been performed by the encoder unit 1104 by the modulating unit 1105. After the modulated data are converted into a baseband signal, the baseband signal is outputted to a frequency converting unit 1106 and is converted into a transmission signal having a radio transmission frequency by the frequency converting unit 1106. After that, the transmission signal is transmitted to a base station 102 via an antenna 1107. The mobile terminal 101 also performs a receiving process as follows. A radio signal from a base station 102 is received by the antenna 1107. The received signal having a radio reception frequency is converted into a baseband signal by the frequency converting unit 1106, and a demodulation process is performed on the baseband signal by a demodulating unit 1108. Data which are obtained through the demodulating process are delivered to a decoder unit 1109, and are subjected to a decoding process such as an error correction. Control data included in the decoded data are delivered to the protocol processing unit 1101 while user data included in the decoded data are delivered to the application unit 1102. The series of processes carried out by the mobile terminal are controlled by a control unit 1110. Therefore, although not shown in the drawing, the control unit 1110 is connected to each of the units (1101 to 1109).

FIG. 12 is a block diagram showing the configuration of a base station 102. The base station 102 performs a transmitting process as follows. An EPC communication unit 1201 transmits and receives data between the base station 102 and an EPC (an MME 103 and an S-GW 104). An other base station communicating unit 1202 transmits and receives data to and from another base station. Each of the EPC communication unit 1201 and the other base station communicating unit 1202 carries out reception and transmission of information from and to a protocol processing unit 1203. Control data from the protocol processing unit 1203, and user data and control data from the EPC communication unit 1201 and the other base station communicating unit 1202 are stored in a transmission data buffer unit 1204. The data stored in the transmission data buffer unit 1204 are delivered to an encoder unit 1205, and subjected to an encoding process such as an error correction. There can exist data which are outputted directly from the transmission data buffer unit 1204 to a modulating unit 1206 without being encoded. The modulating unit 1206 performs a modulation process on the encoded data. After the modulated data are converted into a baseband signal, the baseband signal is outputted to a frequency converting unit 1207 and is converted into a transmission signal having a radio transmission frequency by the frequency converting unit 1207. After that, the transmission signal is transmitted from an antenna 1208 to one or more mobile terminals 101. The base station 102 also performs a receiving process as follows. A radio signal from one or more mobile terminals 101 is received by the antenna 1208. The received signal having a radio reception frequency is converted into a baseband signal by the frequency converting unit 1207, and a demodulation process is performed on the baseband signal by a demodulating unit 1209. Data which are obtained through the demodulating process are delivered to a decoder unit 1210, and are subjected to a decoding process such as an error correction. Control data among the decoded data are delivered to the protocol processing unit 1203 or the EPC communication unit 1201 and the other base station communicating unit 1202, and user data among the decoded data are delivered to the EPC communication unit 1201 and the other base station communicating unit 1202. The series of processes carried out by the base station 102 are controlled by a control unit 1211. Therefore, although not shown in the drawing, the control unit 1211 is connected to each of the units (1201 to 1210).

FIG. 13 is a block diagram showing the configuration of an MME (Mobility Management Entity). A PDN GW communication unit 1301 carries out transmission and reception of data between the MME 103 and a PDN GW 902. A base station communication unit 1302 carries out transmission and reception of data between the MME 103 and a base station 102 via an S1_MME interface. When data received from the PDN GW 902 is user data, the user data is delivered from the PDN GW communication unit 1301 to the base station communication unit 1302 via a user plane processing unit 1303, and is then transmitted to one or more base stations 102. When data received from a base station 102 is user data, the user data is delivered from the base station communication unit 1302 to the PDN GW communication unit 1301 via the user plane processing unit 1303, and is then transmitted to the PDN GW 902. An MCE communication unit 1304 carries out transmission and reception of data between the MME 103 and an MCE 801 via an IF between MME and MCE.

When data received from the PDN GW 902 is control data, the control data is delivered from the PDN GW communication unit 1301 to a control plane control unit 1305. When data received from a base station 102 is control data, the control data is delivered from the base station communication unit 1302 to the control plane control unit 1305. Control data received from an MCE 801 is delivered from the MCE communication unit 1304 to the control plane control unit 1305. The results of a process carried out by the control plane control unit 1305 are transmitted to the PDN GW 902 via the PDN GW communication unit 1301, are then transmitted, via an S1_MME interface, to one or more base stations 102 by way of the base station communication unit 1302, and are then transmitted, via an IF between MME and MCE, to one or more MCEs 801 by way of the MCE communication unit 1304. A NAS security unit 1305-1, an SAE bearer control unit 1305-2, and an idle state (Idle State) mobility managing unit 1305-3 are included in the control plane control unit 1305, and the control plane control unit carries out general processes for control plane. The NAS security unit 1305-1 carries out security work for a NAS (Non-Access Stratum) message, etc. The SAE bearer control unit 1305-2 carries out management of a bearer of SAE (System Architecture Evolution), etc. The idle state mobility managing unit 1305-3 carries out mobility management of an idle state (an LTE-IDLE state, simply referred to as idle), generation and control of a paging signal at the time of an idle state, addition, deletion, update, and retrieval of a tracking area (TA) of one or more mobile terminals 101 being served by a base station, management of a tracking area list (TA List), etc. The MME starts a paging protocol by transmitting paging messages to cells belonging to a tracking area (tracking area: TA) in which UEs are registered (registered). The series of processes carried out by the MME 103 are controlled by a control unit 1306. Therefore, although not shown in the drawing, the control unit 1306 is connected to each of the units (1301 to 1305).

FIG. 14 is a block diagram showing the configuration of an MCE (Multi-cell/multicast Coordination Entity). An MBMS GW communication unit 1401 carries out transmission and reception of control data between the MCE 801 and an MBMS GW 802 via an M3 interface. A base station communication unit 1402 carries out transmission and reception of control data between the MCE 801 and a base station 102 via an M2 interface. An MME communication unit 1403 carries out transmission and reception of control data between the MCE 801 and an MME 103 via an IF between MME and MCE. An MC transmission scheduler unit 1404 carries out scheduling of multi-cell transmission of one or more MBSFN areas which the MC transmission scheduler unit manages by using control data from the MBMS GW 802 delivered thereto via the MBMS GW communication unit 1401, control data from a base station 102 in an MBSFN (Multimedia Broadcast multicast service Single Frequency Network) area, which are delivered thereto via the base station communication unit 1402, and control data from the MME 103 which are delivered thereto via the MME communication unit 1403. As an example of the scheduling, radio resources (time, frequency, etc.) of a base station, a radio configuration (a modulation method, a code, etc.), etc. can be provided. The results of the scheduling of multi-cell transmission are delivered to the base station communication unit 1402, and are then transmitted to one or more base stations 102 in the MBSFN area. The series of processes carried out by the MCE 801 are controlled by a control unit 1405. Therefore, although not shown in the drawing, the control unit 1405 is connected to each of the units (1401 to 1404).

FIG. 15 is a block diagram showing the configuration of an MBMS gateway. In FIG. 15, an eBMSC communication unit 1501 of the MBMS GW 802 carries out transmission and reception of data (user data and control data) between the MBMS GW 802 and an eBMSC 901. The MCE communication unit 1502 carries out transmission and reception of control data between the MBMS GW 802 and an MCE 801 via an M3 interface. Control data received from the eBMSC 901 are delivered to an MBMS CP unit 1503 via the eBMSC communication unit 1501, and, after being processed by the MBMS CP unit 1503, are transmitted to one or more MCEs 801 via the MCE communication unit 1502. Control data received from the MCE 801 are delivered to the MBMS CP unit 1503 via the MCE communication unit 1502, and after being processed by the MBMS CP unit 1503, are transmitted to the eBMSC901 and/or the MCE 801 via the eBMSC communication unit 1501. A base station communication unit 1504 transmits user data (also referred to as traffic data) to the MBMS GW 802 and one or more base stations via an M1_U interface. User data received from the eBMSC 901 are delivered to an MBMS UP unit 1505 via the eBMSC communication unit 1501, and, after being processed by the MBMS UP unit 1505, are transmitted to one or more base stations 102 via the base station communication unit 1504. The MBMS CP unit 1503 and the MBMS UP unit 1505 are connected to each other. The series of processes carried out by the MBMS GW 802 is controlled by a control unit 1506. Therefore, although not shown in the drawing, the control unit 1506 is connected to each of the units (1501 to 1506).

Next, an example of a flow of processing carried out by the mobile communication system in accordance with the present invention will be shown in FIG. 16. FIG. 16 is a flow chart showing an outline of processing including from a process of starting using an MBMS to a process of ending the use of the MBMS, which is carried out by a mobile terminal in the communication system which uses an LTE method. The mobile terminal, in step ST1601 of FIG. 16, carries out a cell selection of a serving cell in an MBMS/Unicast-mixed cell. Hereafter, the process of step 1601 will be referred to as a "unicast side cell selection". A network side, in step ST1601-1, carries out a process of "broadcasting information about a receivable MBMS" to the mobile terminal. More specifically, the network side informs the mobile terminal that a currently-available MBMS service exists, or about information regarding frequencies of the MBMS service (a list of frequencies). Because through the process of ST1601-1, the mobile terminal can know that a currently-available MBMS service exists, and know the information about frequencies of the MBMS service, the mobile terminal does not have to search for a receivable frequency in a round-robin manner. As a result, there is provided an advantage of shortening a control delay time occurring before the mobile terminal receives a service at a frequency other than a currently-selected frequency.

The mobile terminal, in step ST1602, carries out a search process of searching for an MBMS transmission dedicated cell on the basis of the information transmitted thereto from the network side in step ST1601. As an example of the search process, there is provided acquisition of timing synchronization (synchronization with radio frame timing), and system information, such as a system bandwidth, the number of transmission antennas, an MBSFN area identifier (ID) (also referred to as an MBSFN area number), and MCCH (multi-cast control channel)-related information, etc. Hereafter, the process of step 1602 will be referred to as a "search for MBMS". The mobile terminal, in step ST1603, receives information used for receiving an MBMS service (an MCCH and an MTCH) in the MBMS transmission dedicated cell from the network side. Hereafter, the process of step 1603 will be referred to as "MBMS area information acquisition". The user (mobile terminal), in step ST1604, selects an MBMS service which the user desires by using the information used for receiving the MBMS service received from the network side in step ST1603. Hereafter, the process of step 1604 will be referred to as "MBMS service selection".

It has been examined that in a communication system based on an LTE method, only a downlink for transmitting broadcast data provided by an MBMS service to mobile terminals is disposed while any uplinks are omitted, and a cell dedicated to MBMS transmission which implements a simple system configuration is disposed. In the above-mentioned explanation of steps ST1601-1 to ST1604, the method of selecting an MBMS service using such an MBMS transmission dedicated cell is disclosed. Therefore, there is provided an advantage of enabling the mobile terminal to receive a desired MBMS service by means of the MBMS transmission dedicated cell through the previously-explained series of processes.

The mobile terminal, in step ST1605, makes preparations for carrying out discontinuous reception of MBMS data from the MBMS transmission dedicated cell by using the information used for receiving an MBMS service received from the network side in step ST1603. Hereafter, the process of step 1605 will be referred to as "preparations for discontinuous reception at the time of MBMS reception". The mobile terminal, in step ST1606, carries out an "MBMS side receiving state notification" process of notifying the state of receiving the MBMS in the MBMS transmission dedicated cell to the network side. Because the MBMS transmission dedicated cell does not have any uplink disposed therein, any mobile terminal currently receiving MBMS data in the MBMS dedicated cell cannot carry out location registration into the network side. In this case, because the network side cannot specify the cell in which the mobile terminal is being located, it is difficult for the network side to transmit a paging signal to the mobile terminal when an incoming call destined for the mobile terminal occurs. Because the network side, in this step ST1606, can know that the mobile terminal is receiving an MBMS service in the MBMS transmission dedicated cell, and becomes able to keep track of the mobile terminal, when an incoming call destined for the mobile terminal currently using the MBMS service in the MBMS transmission dedicated cell occurs, the network side can transfer paging information to the MBMS transmission dedicated cell via an MME 103 and an MCE 801-1 to notify that a dedicated incoming call destined for the mobile terminal currently using the MBMS service is occurring. Therefore, the problem about paging to a mobile terminal currently using an MBMS service in an MBMS transmission dedicated cell can be solved.

The mobile terminal, in step ST1607, carries out a measurement (measurement) process including a measurement of the electric field intensity of a unicast cell (102-1 in FIG. 10) and/or that of an MBMS/Unicast-mixed cell (102-2 in FIG. 10), and a cell selection. This process will be referred to as a "unicast side measurement". By performing this step ST1607, the mobile terminal which is receiving an MBMS service in the frequency layer dedicated to MBMS transmission becomes able to carryout a measurement of a unicast/mixed frequency layer. As a result, there can be provided an advantage of being able to carry out management of the mobility of the mobile terminal via the unicast/mixed frequency layer even if the mobile terminal is receiving an MBMS service in the frequency layer dedicated to MBMS transmission comprised of an MBMS-dedicated base station for which no uplink exists. The mobile terminal which is receiving an MBMS service in the frequency layer dedicated to MBMS transmission, in step ST1608, carries out discontinuous reception for reception of a paging signal. The network side transmits a paging signal destined for the mobile terminal which is receiving an MBMS service in the frequency layer dedicated to MBMS transmission with the discontinuous reception configuration at the time of MBMS reception. Hereafter, the process of step 1608 will be referred as to the "discontinuous reception at the time of MBMS reception". In steps ST1605 to ST1608, the method of transmitting a paging signal, and the mobile communication system which enables the method to be implemented therein can be disclosed for a mobile terminal which is receiving an MBMS service in the frequency layer dedicated to MBMS transmission. As a result, there is provided an advantage of enabling even a mobile terminal which is receiving an MBMS service in the frequency layer dedicated to MBMS transmission to receive a paging signal. The mobile terminal which has not received the paging signal through the "discontinuous reception at the time of MBMS reception" of step ST1608 makes a transition to step ST1609.

The mobile terminal, in step ST1609, receives MBMS traffic data (an MTCH) transmitted thereto from the frequency layer dedicated to MBMS transmission. Hereafter, the process of step ST1609 will be referred to as "MTCH reception". The mobile terminal which is carrying out the "MTCH reception" makes a transition to step ST1607 at the time of the "unicast side measurement". As an alternative, the mobile terminal which is carrying out the "MTCH reception" makes a transition to step ST1602 or ST1604 when the receive sensitivity becomes worse. The mobile terminal which has received the paging signal through the "discontinuous reception at the time of MBMS reception" of step ST1608 makes a transition to step ST1610. The mobile terminal, in step ST1610, moves from the frequency layer dedicated to MBMS transmission to the unicast/mixed frequency layer, and carries out transmission and reception of control data to and from either a unicast cell or a mixed cell. Hereafter, the process of step ST1610 will be referred to as the "unicast side discontinuous reception". As a result, the mobile terminal in question becomes able to transmit uplink data to the network side by using the unicast/mixed frequency layer. Therefore, the method of enabling a mobile terminal which has received a paging signal in the frequency layer dedicated to MBMS transmission for which no uplink exists to transmit a response to the paging signal in the unicast/mixed frequency layer, and the mobile communication system which enables the method to be implemented therein can be disclosed.

The mobile terminal, in steps ST1611, informs the network side that the mobile terminal will end the reception of the MBMS in the frequency layer dedicated to MBMS transmission. Hereafter, the process of step ST1611 will be referred to as the "MBMS reception end notification". By performing this step ST1611, the mobile terminal enables the network side to know that the mobile terminal in question will end the reception of the MBMS service in the frequency layer dedicated to MBMS transmission. Therefore, the network side can discontinue the configuration of transmitting the paging signal to the mobile terminal in question in the frequency layer dedicated to MBMS transmission. As a result, the mobile communication system becomes able to stop the transmission of the paging signal, which the mobile terminal in question will not receive, to the mobile terminal in question from the frequency layer dedicated to MBMS transmission. Therefore, there is provided an advantage of making effective use of the radio resources.

Hereafter, a detailed concrete example of a flow of the processing carried out by the mobile communication system, which is described with reference to FIG. 16, will be explained with reference to FIG. 17. FIG. 17 is a flow chart explaining a cell selection on a side of unicast. Each of a unicast cell and an MBMS/Unicast-mixed cell (simply refers to a mixed cell (Mixed cell)), in step ST1701, broadcasts a primary synchronization channel (Primary Synchronization Channel: P-SCH) and a secondary synchronization channel (Secondary Synchronization Channel: S-SCH), and a reference signal (also referred to as a reference symbol, Reference Symbol: RS) to mobile terminals being served thereby. Each of the mobile terminals, in step ST1702, receives the P-SCH, the S-SCH, and the RS from the base station (the unicast cell or/and the mixed cell). Each of the mobile terminals, in step ST1703, carries out an initial cell searching operation by using the P-SCH, the S-SCH, and the RS received thereby. The details of the cell searching operation which have been being debated in the 3GPP will be explained. In a first step, each of the mobile terminals carries out blind detection of the primary synchronization channel (P-SCH) for which three types of specification sequences exist in the mobile communication system. The P-SCH is mapped onto central 72 subcarriers of the system bandwidth in frequency, and is mapped onto the 1st (#0) and 6th (#5) subframes of each radio frame in time. Therefore, each of the mobile terminals which has blind-detected the P-SCH can detect 5 ms-timing and know cell groups (first to third groups corresponding to the above-mentioned three types of sequences of P-SCH). In a second step, each of the mobile terminals carries out blind detection of the secondary synchronization channel (S-SCH). The mapping positions of the S-SCH are the same as those of the P-SCH. Each of the mobile terminals which has blind-detected the S-SCH can detect 10 ms-timing (frame synchronization) and the cell identifier (Cell ID).

Each of the mobile terminals, in step ST1704, carries out a cell selection. The cell selection is a process of selecting one base station which satisfies the requirements for becoming a serving base station (cell) by using the results of a measurement of the downlink receive sensitivity of each of a plurality of base stations, which is carried out by each of the mobile terminals. As an example of the requirements for becoming a serving base station, there can be considered a case in which the base station to be selected has the best one of the downlink receive sensitivities of the plurality of base stations, or a case in which the base station to be selected has a receive sensitivity exceeding a minimum threshold of the receive sensitivity of a serving base station. As a value which each of the mobile terminals actually measures, there is reference symbol received power (Reference Symbol received power: RSRP), or an E-UTRA carrier received signal strength indicator (E-UTRA carrier received signal strength indicator: RSSI). A serving base station is a base station which takes charge of scheduling of the mobile terminal in question. Even a base station other than the serving base station for the mobile terminal in question can become a serving base station for other mobile terminals. That is, each of all base stations each of which is a unicast cell or an MBMS/Unicast-mixed cell has a scheduling function, and can become a serving base station for some mobile terminals. Each of the unicast cell and the MBMS/Unicast-mixed cell, in step ST1705, transmits broadcast information by using a broadcast control channel (BCCH) which is one of the logical channels. The broadcast information includes, as an example, a measurement period length, a discontinuous reception cycle length, and tracking area information (TA information). The measurement period length is informed from the network side to the mobile terminals being served thereby, and each of the mobile terminals measures a field intensity and so on at periods (cycles) of this period length. The discontinuous reception cycle length is the length of each of periods at which each of the mobile terminals monitors a paging signal periodically in order to receive a paging signal in an idle state (Idle State). The TA information is the information about a "tracking area" (Tracking Area). By sending a paging message to each eNB belonging to the tracking area in which UEs are registered, an MME starts a paging process (see TS36.300 19.2.2.1). Each of the mobile terminals, in step ST1706, receives the measurement period length, the discontinuous reception cycle length, the TA information, etc., via the BCCH, from the serving base station.

Each of the unicast cell and the MBMS/Unicast-mixed cell, in step ST1707, broadcasts one or more frequencies of an available MBMS service, i.e., one or more frequencies of a receivable MBSFN synchronization area (MBSFN Synchronization Area) (referred to as one or more frequencies f(MBMS) s) to the mobile terminals by using the BCCH. In a W-CDMA communication system, a parameter called preferred frequency information (Preferred frequency information: PL information) exists. The PL information is mapped onto a multicast control channel (MCCH), which is a logical channel, in the network side, and is broadcasted to the mobile terminals being served by the network side. A problem is, however, that in an LTE system, a unicast cell which does not provide any MBMS service is planned to be disposed, and this unicast cell cannot use the method of broadcasting a frequency f(MBMS) by using the MCCH which is a channel for MBMS.

Each of the mobile terminals, in step ST1708, receives the frequency f(MBMS) transmitted thereto by using the BCCH from the serving base station. By receiving the frequency f(MBMS), each of the mobile terminals does not have to search for a frequency at which a service can be provided therefor, other than a currently-selected frequency, in a round-robin manner. As a result, there is provided an advantage of shortening a control delay time occurring before the mobile terminal receives a service at a frequency other than a currently-selected frequency. Steps ST1707 and ST1708 are a detailed example of the "broadcasting information about a receivable MBMS" described in Embodiment 11. In this case, if each f(MBMS) is determined statically (Static) or semi-statically (Semi-Static) in the mobile communication system, there can be provided an advantage of shortening the control delay time occurring before each of the above-mentioned mobile terminals receives a service at a frequency other than the currently-selected frequency without broadcasting each frequency f(MBMS) from the base station. In addition, because it becomes unnecessary to broadcast each frequency f(MBMS), an advantage of making effective use of the radio resources can also be provided.

As an alternative, the base station, in steps ST1707 and ST1708, can also broadcast the system bandwidth and the number of transmission antennas in each f(MBMS) by using the BCCH in addition to each frequency f(MBMS). As a result, each of the mobile terminals does not have to acquire the system information (the system bandwidth and the number of transmission antennas) in the frequency layer dedicated to MBMS transmission by receiving each frequency f(MBMS) transmitted by using the BCCH from the serving base station, in step ST1708. Therefore, there can be provided an advantage of shortening the control delay time. This is because even if the amount of information (the system bandwidth and the number of transmission antennas) increases, the length of processing time required for each of the mobile terminals to perform the processing does not increase so much because each of the mobile terminals needs to receive the BCCH from the serving base station in the unicast/frequency layer in order to receive each frequency f(MBMS), while because each of the mobile terminals needs to receive the information in the frequency layer dedicated to MBMS transmission in order to acquire the system information of the frequency layer dedicated to MBMS transmission after switching to the frequency layer dedicated to MBMS transmission, and each of the mobile terminals therefore requires a decoding process of decoding another channel newly, a control delay time occurs.

Each of the mobile terminals, in step ST1709, checks to see whether or not the TA information of the serving base station received in step ST1706 is included in the current tracking area list (TA List) which each of the mobile terminals stores in the protocol processing unit 1101 or the control unit 1110 thereof. When the TA information is included in the current tracking area list, each of the mobile terminals makes a transition to step ST1720 of FIG. 18. When the TA information is not included in the current tracking area list, each of the mobile terminals performs step ST1710. Each of the mobile terminals, in step ST1710, transmits an "attach request" (Attach Request) to the serving base station to inform that the TA information is not included in the current tracking area list. As information included in the "attach request", there are an identifier (IMSI (International Mobile Subscriber Identity)) or S-TMSI (S-Temporary Mobile Subscriber Identity, S-TMSI may be simply referred to as Temporary Mobile Subscriber Identity (TMSI)) of each of the mobile terminals, and the capability (Capability) of each of the mobile terminals. The serving base station which has received the "attach request" in step ST1711, in step ST1712, transmits the "attach request" to an MME (Mobility Management Entity) or an HSS (Home Subscriber Server). The MME, in step ST1713, receives the "attach request". The idle state mobility managing unit 1305-3 of the MME manages the tracking area list of each of the mobile terminals. The MME, in step ST1714, checks whether or not the serving base station of the mobile terminal in question is included in the tracking area list which is managed by the mobile terminal in question. When the serving base station of the mobile terminal in question is included in the tracking area list, the MME makes a transition to step ST1716 of FIG. 18. When the serving base station of the mobile terminal in question is not included in the tracking area list, the MME performs step ST1715. The idle state mobility managing unit 1305-3 of the MME, in step

1715, carries out a process of adding the TA information of the serving base station of the mobile terminal in question to the tracking area list which is managed by the mobile terminal in question (or updating the tracking area list). The MME, in step ST1716, informs an "attach accept" (Attach Accept) to the serving base station. The "attach accept" includes information such as the tracking area list, and an identifier (S-TMSI or the like) which is provided to the mobile terminal. The serving base station which, in step ST1717, has received the "attach accept", in step ST1718, informs the "attach accept" to the mobile terminal in question. The mobile terminal, in step ST1719, receives the "attach accept".

FIG. 18 is a flow chart showing an MBMS search process. Steps 1720 to 1725 of FIG. 18 are a concrete example of the "search for MBMS" described in Embodiment 11. Each of the mobile terminals, in step ST1720, checks to see whether it has received an frequency of a receivable MBSFN synchronization area (or a frequency of the frequency layer dedicated to MBMS transmission) in step ST1708. That is, each of the mobile terminals checks to see whether it has received one or more frequencies f(MBMS)s. When there exists no frequency, each of the mobile terminals ends the process. When there exists one or more frequencies, each of the mobile terminals performs step ST1721. Each of the mobile terminals, in step ST1721, checks to see whether the user has an intention of receiving an MBMS service at f(MBMS). As an example of the checking, when the user has an intention of receiving an MBMS service at f(MBMS), he or she uses a user interface to send a command to each of the mobile terminals, and each of the mobile terminals stores information showing the user's intention in the protocol processing unit 1101. Each of the mobile terminals, in step ST1721, checks to see whether or not the information showing the user's intention of receiving an MBMS service is stored in the protocol processing unit 1101. When the information showing the user's intention of receiving an MBMS service is not stored, each of the mobile terminals repeats the process of step ST1721. As a method of repeating the process, each of the mobile terminals uses a method of carrying out the determination of step ST1721 at constant periods (cycles), or a method of carrying out step ST1721 or ST1720 when receiving a notification showing a change in the user's intention of receiving an MBMS service from the user by way of the user interface. In contrast, when the information showing the user's intention of receiving an MBMS service is stored, each of the mobile terminals makes a transition to step ST1722. Each of the mobile terminals, in step ST1722, changes the frequency set to the frequency converting unit 1107 (synthesizer) thereof and changes its center frequency to f(MBMS) to start the searching operation of searching for an MBMS. Changing the frequency set to the frequency converting unit 1107 to change its center frequency is referred to as re-tune (re-tune). The MBMS dedicated cell, in step ST1723, broadcasts a primary synchronization channel (Primary Synchronization Signal: P-SCH) and a secondary synchronization channel (Secondary Synchronization Signal: S-SCH), a reference signal (RS (MBMS)), and a BCCH to the mobile terminals being served thereby. Each of the mobile terminals, in step ST1724, receives the P-SCH, the S-SCH, the RS (MBMS), and the BCCH (broadcast control channel) from the MBMS dedicated cell.

Each of the mobile terminals, in step ST1725, performs the searching operation of searching for an MBMS. The searching operation in the frequency layer dedicated to MBMS transmission which has been debated in the 3GPP will be explained. A sequence exclusively used in the frequency layer dedicated to MBMS transmission is added to the P-SCH. It is assumed that the additional sequence for exclusive use is defined statically. In a first step, each of the mobile terminals carries out blind detection of the P-SCH in the additional sequence for exclusive use. The P-SCH is mapped onto central 72 subcarriers of the system bandwidth in frequency, and is mapped onto the 1st (#0) and 6th (#5) subframes of each radio frame in time. Therefore, each of the mobile terminals which has blind-detected the P-SCH can carry out 5 ms-timing detection. Furthermore, the P-SCH is transmitted via a multi-cell transmission scheme. In a second step, each of the mobile terminals carries out blind detection of the S-SCH. The mapping positions of the S-SCH are the same as those of the P-SCH. Each of the mobile terminals which has blind-detected the S-SCH can detect 10 ms-timing (frame synchronization) and know the MBSFN area ID. Furthermore, the S-SCH is transmitted via a multi-cell transmission scheme. Each of the mobile terminals receives the BCCH by using the scrambling code (Scrambling Code) related to the MBSFN area ID acquired in the second step. Each of the mobile terminals can acquire the scheduling of the MCCH (multicast control channel) by decoding the BCCH. In this decoding process, each of the mobile terminals uses the scrambling code (Scrambling Code) related to the above-mentioned MBSFN area ID. Furthermore, the BCCH is transmitted via a multi-cell transmission scheme. In the present invention, it is assumed that each of the mobile terminals can acquire the system bandwidth at f(MBMS) and the number of transmission antennas at f(MBMS) by further decoding the BCCH. In a case in which in the mobile communication system, the system bandwidth and the number of transmission antennas at f(MBMS) are determined statically (Static) or semi-statically (Semi-Static), there can be provided an advantage of being able to eliminate the necessity to broadcast the system bandwidth and/or the number of transmission antennas at f(MBMS) from a base station to make effective use of the radio resources. Furthermore, because the necessity to change the decoding and the parameters (the system bandwidth and/or the number of transmission antennas at f(MBMS)) can be eliminated, there can be provided an advantage of achieving low power consumption in each mobile terminal, and a reduction of the control delay time.

In the present invention, the scheduling of the MCCH, which is carried out in step ST1725, will be further studied. According to the current standards of the 3GPP, it is defined that an MBSFN synchronization area (Multimedia Broadcast multicast service Single Frequency Network Synchronization Area f(MBMS)) can support one or more MBSFN areas (MBSFN Areas) (refer to FIG. 7). In contrast, it has not been decided how to multiplex a plurality of MBSFN areas with f(MBMS) which is a single frequency (Single Frequency). Hereafter, the "MBMS search" process in accordance with the present invention which is adapted in such a way as to support several different methods of multiplexing MBSFN areas will be explained in the case of using each of the different multiplexing methods.

Figure 60:
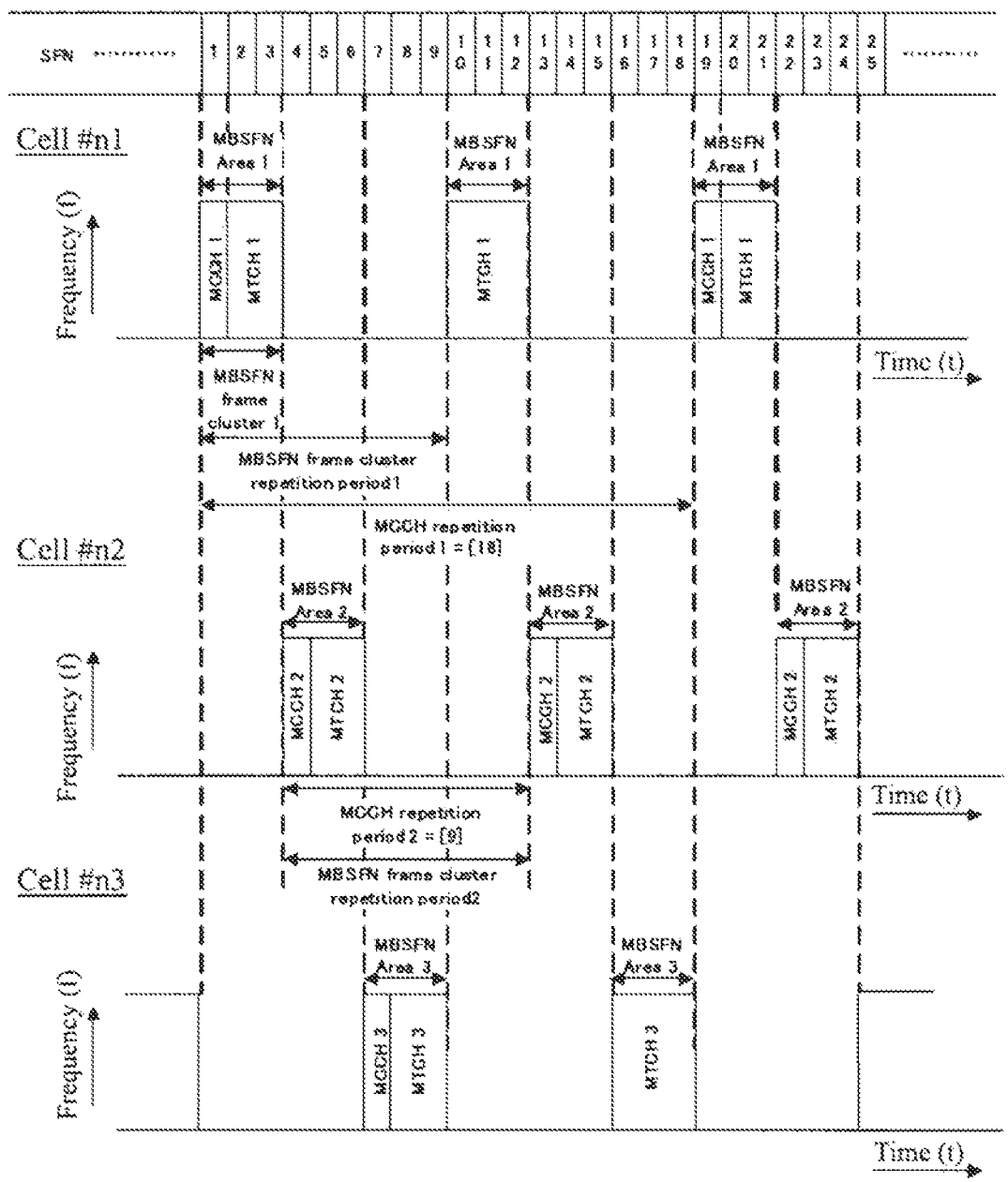
FIG. 60 is an explanatory drawing showing the configuration of a PMCH for each MBSFN area.

The configuration of a PMCH provided for each MBSFN area is shown in FIG. 60. In the example of FIG. 60, time division multiplexing (TDM) of MBSFN areas is carried out. A cell #n1 (or a cell #n2 or a cell #n3) is a one included in an MBSFN area 1 (or an MBSFN area 2 or an MBSFN area 3). In the current 3GPP, a debate about allocation of MBSFN subframes in a mixed cell has been made as shown in nonpatent reference 2. However, because no subframe for unicast exists in an MBMS dedicated cell, all subframes are MBSFN subframes. Therefore, the debate made in nonpatent reference 2 cannot be applied just as it is. However, it is important to unify the configuration of a mixed cell and that of an MBMS dedicated cell as much as possible from the viewpoint of preventing the mobile communication system from becoming complicated. To this end, a method of carrying out scheduling in an MBMS dedicated cell following the concept about the "MBSFN frame cluster" (MBSFN frame Cluster) disclosed by nonpatent reference 2 will be disclosed hereafter. In addition, the present invention differs from nonpatent reference 2 in that the present invention discloses the scheduling of the MCCH in an MBSFN subframe which is not touched by nonpatent reference 2. An example of the scheduling of the MCCH has not been discussed in nonpatent reference 2. In the present invention, an example of the scheduling of the MCCH will be shown.

Because the cell #n1 belongs to the MBSFN area 1, the PMCH corresponding to the MBSFN area is transmitted at a time. The PMCH is transmitted on an MBSFN subframe because the PMCH is transmitted via a multi-cell transmission scheme in each MBSFN area. A set of MBSFN frames to which the MBSFN subframes are allocated is referred to as an "MBSFN frame cluster" (MBSFN frame cluster). In the MBMS dedicated cell, all subframes in an MBSFN frame can be the MBSFN subframes used for multi-cell transmission. The length of each of the repetition periods at which the MBSFN frame cluster is repeated is expressed as the "MBSFN frame cluster repetition period" (MBSFN frame cluster Repetition period). An MCH which is a transport channel for one or more MBMS services is mapped onto the PMCH, and either or both of the MCCH which is a logical channel for MBMS control information and the MTCH which is a logical channel for MBMS data are mapped onto the MCH. The MCCH and the MTCH can be divided in time and mapped onto the PMCH, and can be further divided in time and mapped onto a physical area which is transmitted via a multi-cell transmission scheme. For example, the MCCH and the MTCH can be mapped onto different MBSFN subframes which are the physical area onto which they are mapped. The MCCH can be mapped onto each MBSFN frame cluster, or only the MTCH can be mapped onto each MBSFN frame cluster. In a case in which only the MTCH exists, the repetition period of the MCCH differs from the repetition period of the MBSFN frame cluster. Furthermore, there is a case in which a plurality of MCCHs are mapped onto each MBSFN frame cluster.

In FIG. 60, the cell #n1 (or the cell #n2 or #n3) belongs to the MBSFN area 1 (or the MBSFN area 2 or 3), and the PMCH corresponding to each MBSFN area is transmitted at a time. MCCH1 (or MCCH2 or MCCH3) is MBMS control information for the MBSFN area 1 (or the MBSFN area 2 or 3), and MTCH1 (or MTCH2 or MTCH3) is MBMS data for the MBSFN area 1 (or the MBSFN area 2 or 3). The repetition period of the MCCH can differ for each MBSFN area. In the figure, the MCCH repetition period of the cell #n1 (or the cell #n2) is expressed as the "MCCH Repetition period 1 (or 2)". Time division multiplexing of the PMCHs of the MBSFN areas is carried out. Therefore, the orthogonality among the cells of the MBSFN areas is acquired in the MBSFN synchronization area in which the synchronization among the cells is ensured, and the interference from a cell in another MBSFN area can be prevented. Because the PMCH is transmitted via a multi-cell transmission scheme in each MBSFN area, each cell in each MBSFN area transmits the same data by using the same PMCH. Because, even if a plurality of MBSFN areas exist overlappedly in one cell, the above-mentioned PMCH configuration can be applied with the orthogonality among the MBSFN areas being maintained.

The details of the scheduling of the MCCH will be explained. A case in which an MBSFN frame cluster is shorter than the MCCH repetition period length will be explained. A case in which an MBSFN frame cluster is longer than the MCCH repetition period length will be explained below. Hereafter, it will be considered that a starting point value of a time at which the MCCH is mapped and the MCCH repetition period length are informed as the scheduling of the MCCH. More concretely, an SFN (System Frame Number) is used for the indication of the starting point value. A concrete computation expression for calculating the MCCH starting point value is given as follows.

The *MCCH* starting point value=(the *SFN* number of the leading one of system frames onto which the *MCCH* is mapped)mod(the *MCCH* Repetition Period length)

In FIG. 60, the MCCH starting point value 1 of the MBSFN area 1 is 1 mod 18=1, 19 mod 8=1, or . . . , and the parameters of the MCCH scheduling of the MBSFN area 1 are the MCCH repetition period length 1 of "18" and the starting point value 1 of "1". The MCCH starting point value 2 of the MBSFN area 2 is 4 mod 9=4, 13 mod 9=4, 22 mod 9=4, or . . . , and the parameters of the MCCH scheduling of the MBSFN area 2 are the MCCH repetition period length 2 of "9" and the starting point value 2 of "4". As to the MBSFN area 3, the same parameters are provided. The system frame number SFN at this time is broadcast for each subframe if mapped onto the BCCH, and is effective also when receiving the MCCH from the MCCH starting point value. Furthermore, in a case in which the MCCH is mapped onto some subframes in a radio frame, the SFN, the subframe numbers, etc. can be informed as the starting point.

That is, data which are transmitted from each base station (cell) belonging to the MBSFN area 1 are provided as follows. The P-SCH which is the sequence exclusively used for the frequency layer dedicated to MBMS transmission, the S-SCH1 onto which the MBSFN area ID1 and so on are mapped, a BCCH1 onto which the MCCH starting point value 1 of "1", the MCCH repetition period length 1 of "18", and so on are mapped, and which is multiplied by the scrambling code 1 (Scrambling code 1), and an MCCH1 and an MTCH1 of the MBSFN area 1 are transmitted. The resources of an MCCH2 or 3 and an MTCH2 or 3 from each base station belonging to the MBSFN area 2 or 3 are in a discontinuous transmission (DTX: Discontinuous transmission) state. Each of the MCCH1 and the MTCH2 can be multiplied by the scrambling code 1. By multiplying each of the MCCH1 and the MTCH1 by the scrambling code, there can be provided an advantage of unifying a process to be performed on MBSFN-area-specific data (BCCH, MCCH, and MTCH). In contrast, because the MCCHs and the MTCHs of the areas are subjected to time division multiplexing (TDM), it is not necessary to multiply each of the MCCH and the MTCH by the MBSFN-area-specific scrambling code. In the case of not multiplying each of the MCCH1 and the MTCH1 by the scrambling code, there can be provided an advantage of reducing the load of encoding processing on each base station side and the load of decoding process on each mobile terminal side, and hence reducing the delay time occurring before data reception.

Like in the case of the MBSFN area 1, data which are transmitted from each base station belonging to the MBSFN area 2 are provided as follows. The P-SCH which is the sequence exclusively used for the frequency layer dedicated to MBMS transmission, the S-SCH2 onto which the MBSFN area ID2 and so on are mapped, a BCCH2 onto which the MCCH starting point value 2 of "4", the MCCH repetition period length 2 of "9", and so on are mapped, and which is multiplied by the scrambling code 2, and the MCCH2 and the MTCH2 of each base station belonging to the MBSFN area 2 are transmitted. The MCCH1 or 3 and the MTCH1 or 3 from each base station belonging to the MBSFN area 1 or 3 are in a discontinuous transmission (DTX: Discontinuous transmission) state. The same goes for the MBSFN area 3. For the sake of simplicity, the example in which time division multiplexing of the MCCH and the MTCH is carried out for each subframe is shown in FIG. 60. However, the present invention can be applied to a case in which another method of multiplexing the MCCH and the MTCH is used, and a case in which the time division multiplexing is carried out for each of units other than each subframe. Furthermore, as long as the MCCH repetition period length is determined statically (Static) or semi-statically (Semi-Static) in the mobile communication system, each base station does not have to broadcast the MCCH repetition period length. Therefore, because the amount of information to be broadcast decreases, there can be provided an advantage of making effective use of the radio resources.

Figure 61:
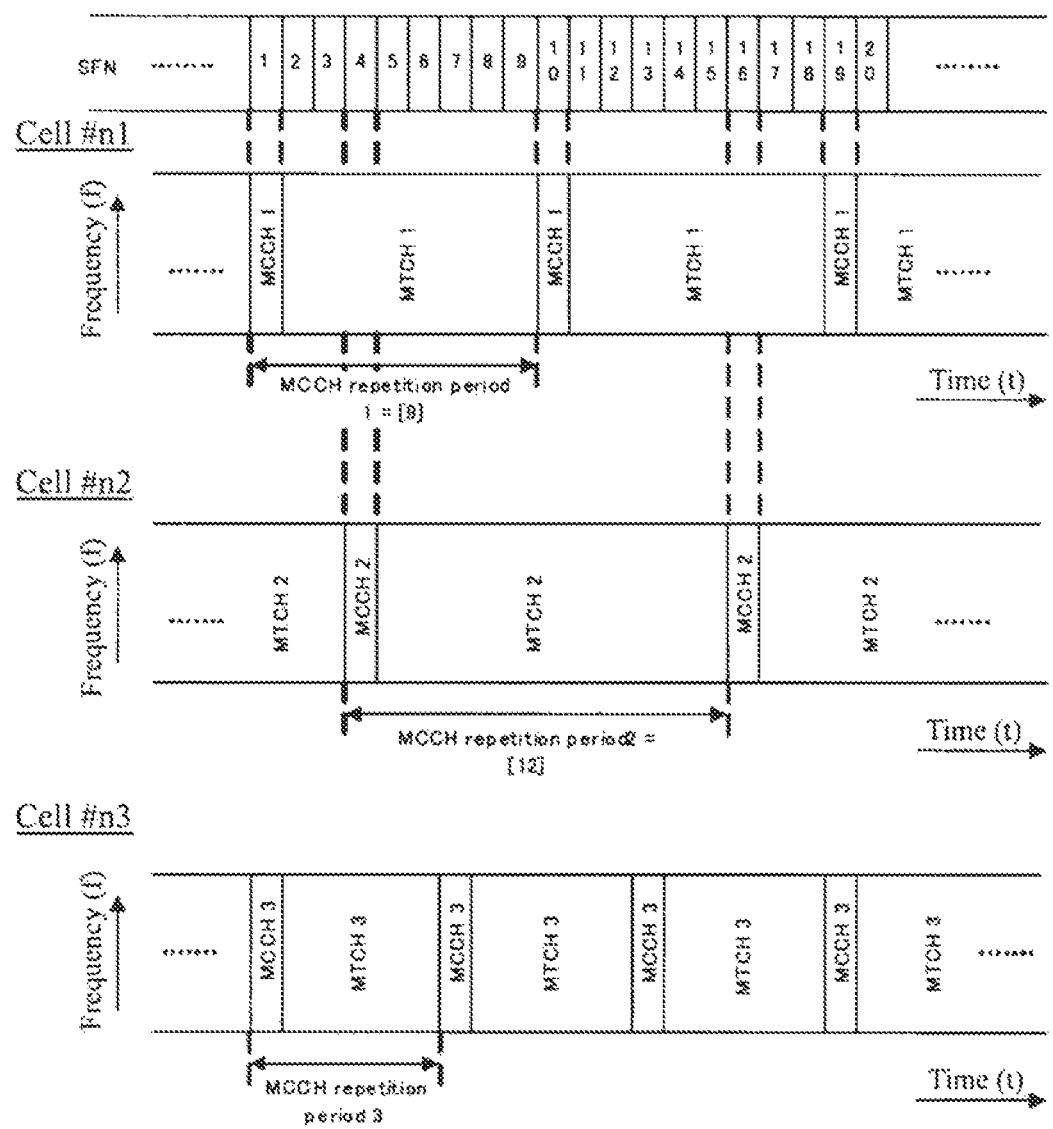
FIG. 61 is an explanatory drawing showing the configuration of a PMCH for each MBSFN area.

The configuration of the PMCH provided for each MBSFN area is shown in FIG. 61. In FIG. 61, code division multiplexing (Code Division Multiplex) of the PMCHs of each MBSFN area is carried out. The cell #n1 (or the cell #n2 or #n3) is a one included in the MBSFN area 1 (or the MBSFN area 2 or 3). In the cell #n1, the PMCH corresponding to the MBSFN area 1 is transmitted. In this case, this PMCH can be continuous or discontinuous in time. In a case in which the PMCH is discontinuous in time, the length of the MBSFN frame cluster repetition period (MBSFN frame cluster Repetition period) becomes equal to the length of each of the repetition periods at which an MBSFN frame cluster via which the PMCH corresponding to the MBSFN area is transmitted is repeated. In contrast, in a case in which the PMCH is continuous in time, the MBSFN frame cluster repetition period can be expressed as 0. As an alternative, it is not necessary to inform the MBSFN frame cluster repetition period explicitly in the case in which the PMCH is continuous in time. The MCCH and the MTCH can be divided in time and mapped onto the PMCH, and can be further divided in time and mapped onto a physical area which is transmitted via a multi-cell transmission scheme. For example, the MCCH and the MTCH can be mapped onto different MBSFN subframes which are the physical area onto which they are mapped as a result. The length of each of the repetition periods at which the MCCH is repeated is expressed as the MCCH repetition period 1.

Similarly, the PMCH corresponding to the MBSFN area 2 (or the MBSFN area 3) is transmitted in the cell #n2 (or the cell #n3). The repetition period of the MCCH can differ in each of the MBSFN areas. The length of each of the repetition periods at which the MCCH of the cell #n2 (or the cell #n3) is repeated is expressed as the MCCH repetition period 2 (or the MCCH repetition period 3). Because data which is multiplied by the MBSFN-area-specific scrambling code is mapped onto the PMCH in each of the MBSFN areas, the interference among the MBSFN areas in the MBSFN synchronization area in which the synchronization among the cells is ensured can be suppressed. Because the multi-cell transmission is used in each of the MBSFN areas, each cell in each of the MBSFN areas transmits the same data, i.e., the data which is multiplied by the MBSFN-area-specific scrambling code by using the same PMCH. Even in a case in which a plurality of MBSFN areas exist overlappedly in one cell, the above-mentioned PMCH configuration can be applied with the interference among the MBSFN areas being suppressed.

An explanation about the data (P-SCH, S-SCH, and BCCH) transmitted from each MBSFN area will be omitted hereafter because the data are the same as those explained in the case of time division multiplexing described previously. A concrete example of the scheduling of the MCCH is the same as that explained in the case of time division multiplexing described previously. In the present invention, it is considered that a cell informs the "starting point value at the time when the MCCH is mapped" and the "MCCH repetition period length" to terminals in order to use them for the scheduling of the MCCH. More concretely, an SFN (System Frame Number) is used for the indication of an offset value. A concrete computation expression for calculating the starting point value is expressed by the following equation. The MCCH starting point value=(the SFN number of the leading one of system frames onto which the MCCH is mapped) mod (the MCCH Repetition Period length)

In FIG. 61, the MCCH starting point value of the MBSFN area 1 is 1 mod 9=1, 10 mod 9=1, or . . . , and the parameters of the MCCH scheduling of the MBSFN area 1 are the MCCH repetition period length 1 of "9" and the starting point value 1 of "1". The MCCH starting point value of the MBSFN area 2 is 4 mod 12=4, 16 mod 12=4, or . . . , and the parameters of the MCCH scheduling of the MBSFN area 1 are the MCCH repetition period length 2 of "12" and the starting point value 2 of "4". As to the MBSFN area 3, the same parameters are provided. Furthermore, in a case in which the MCCH is mapped onto some subframes in a radio frame, the SFN, the subframe numbers, etc. can be informed as the starting point.

That is, data which are transmitted from each base station (cell) belonging to the MBSFN area 1, e.g., the cell #n1 include the P-SCH which is the sequence exclusively used for the frequency layer dedicated to MBMS transmission, the S-SCH1 onto which the MBSFN area ID1 and so on are mapped, the MCCH starting point value 1 of "1", and the MCCH repetition period length 1 of "9". These data are mapped onto the BCCH1, the MCCH1, and the MTCH1, and are further scrambled with the scrambling code 1 and are transmitted. The same goes for the MBSFN areas 2 and 3. For the sake of simplicity, the example in which time division multiplexing of the MCCH and the MTCH is carried out for each subframe is shown in FIG. 61. However, the present invention can be applied to a case in which another method of multiplexing the MCCH and the MTCH is used, and a case in which the time division multiplexing is carried out for each of units other than each subframe. Furthermore, as long as the MCCH repetition period length is determined statically (Static) or semi-statically (Semi-Static) in the mobile communication system, each base station does not have to broadcast the MCCH repetition period length. Therefore, because the amount of information to be broadcast decreases, there can be provided an advantage of making effective use of the radio resources. Furthermore, in the case in which code division multiplexing of MBSFN areas is carried out, because a different repetition period length can be set up for each of the MBSFN areas, there is provided an advantage of being able to carry out scheduling with high flexibility for MBMS services as compared with the case in which time division multiplexing of MBSFN areas is carried out. In addition, because the code division multiplexing is used, even when receiving MTCHs and MCCHs from a plurality of MBSFN areas, each mobile terminal can separate them from one another. Therefore, because the mobile communication system can transmit MTCHs and MCCHs from the MBSFN areas 1 to 3 simultaneously, there can be provided an advantage of expanding the frequency and time radio resources which are allocated to one MBSFN area.

Next, the "MBMS area information acquisition" of step ST1603 of FIG. 16 will be explained more concretely with reference to FIGS. 18 and 19 as needed. It is assumed that the MCCH (multicast control channel) of each MBSFN area is transmitted via a multi-cell transmission scheme. Therefore, an MCE, in step ST1726 of FIG. 18, transmits information about allocation of radio resources for transmitting the contents of the MCCH and the MCCH to base stations in the MBSFN area. Each MBMS-dedicated base station, in step ST1727, receives the information about allocation of radio resources for transmitting the contents of the MCCH and the MCCH from the MCE. Each base station, in step ST1728 of FIG. 19, carries out multi-cell transmission of control information, such as MBMS area information, discontinuous reception (DRX) information, and the parameter for discontinuous reception at the time of MBMS reception (in a concrete example, the number K of paging groups), by using the MCCH according to the radio resources allocated thereto by the MCE. Each of the mobile terminals, in step ST1729, receives the MCCH from each base station in the MBSFN area. Each of the mobile terminals uses the scheduling of the MCCH received from the network side in step ST1725 for the reception of the MCCH.

A concrete example of the receiving method will be explained. As a typical example, a case in which time division multiplexing of MBSFN areas is carried out as shown in FIG. 60 will be explained. A case in which each of the mobile terminals is located within the cell #1 belonging to the MBSFN area 1 will be explained. Each of the mobile terminals decodes the BCCH1 (broadcast control channel) to receive, as the scheduling parameters of the MCCH1, the starting point value 1 of "1" and the MCCH repetition period (MCCH Repetition Period) length 1 of "7". Furthermore, if an SFN (System. Frame Number) is mapped onto the BCCH, each of the mobile terminals can know the SFN number by decoding the BCCH. Each of the mobile terminals can determine the SFN number onto which the MCCH is mapped according to the following equation.

SFN=the MCCH repetition period length 1×α+the starting point value 1 (α is a positive integer).

Each of the mobile terminals can receive the MCCH1 by receiving and decoding the radio resources of the SFN number onto which the MCCH1 is mapped. Control information for MBMS service which is transmitted via a multi-cell transmission scheme from the MBSFN area 1 is mapped onto the MCCH1. As a concrete example of the control information, there are MBMS area information, DRX information, a parameter for discontinuous reception at the time of MBMS reception, etc.

In addition, an example of the MBMS area information will be explained with reference to FIG. 60. As the MBMS area information, there can be considered the frame structure of each area (the structure of an MBSFN frame cluster (MBSFN frame Cluster) and an MBSFN subframe), contents of services, modulation information about the MTCH, etc. As the MBSFN frame cluster 1, the number of frames included in a set of frames allocated to the MBSFN area 1 during one MBSFN frame cluster repetition period is informed. As the MBSFN subframe 1, the number of a subframe onto which MBMS data (MTCH and/or MCCH data) are actually mapped in one radio frame within the MBSFN frame cluster 1 is informed. In a case of offering an MBMS service using an MBMS-dedicated base station, it is not necessary to share radio resources with unicast data, unlike in a case of using an MBMS/Unicast-mixed cell. Therefore, MBMS data can be mapped onto all the subframes in one radio frame (however, except portions onto which a P-SCH, an S-SCH, or a BCCH is mapped). In a case of mapping MBMS data onto all the subframes, it is not necessary to inform the parameter about MBSFN subframes from the network side to the mobile terminal side. As a result, effective use of the radio resources can be made. As an alternative, because by using a method of statically mapping MBMS data onto all the subframes at the time of transmission of MBMS data from an MBMS dedicated cell in the radio communication system, it becomes able to transmit large-volume MBMS data and it becomes unnecessary to also inform the parameter about MBSFN subframes, effective use of the radio resources can be made. As the contents of services, the contents of MBMS services being ongoing in the MBMS area 1 are informed. When a plurality of MBMS services (a movie, sports live broadcasting, etc.) are ongoing in the MBSFN area 1, the contents of the plurality of MBMS services and parameter for multiplexing about these services are informed.

Figure 62:
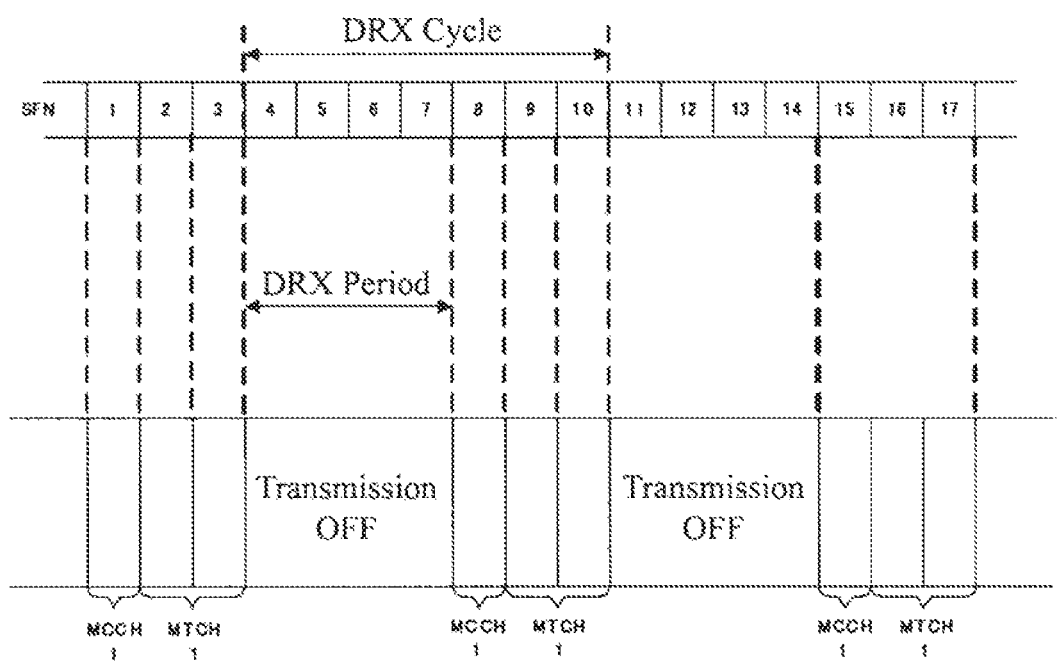
FIG. 62 is an explanatory drawing showing a relation between a discontinuous reception period during which transmission of MBMS data to a mobile terminal is discontinued and the mobile terminal is not doing any receiving operation of receiving MBMS data, and a discontinuous reception cycle in which the discontinuous reception is carried out.

FIG. 62 is an explanatory drawing showing a relationship between a DRX period during which transmission of MBMS data to a mobile terminal is discontinued and the mobile terminal does not perform its receiving operation of receiving the MBMS data, and a DRX cycle which is a cycle in which the DRX period is repeated. In addition, an example of the DRX (Discontinuous reception) information will be explained with reference to FIG. 62. As a solution for enabling the management of mobility of mobile terminals even in an MBMS transmission dedicated frequency layer which consists of base stations dedicated to MBMS, which is a challenge of the present invention, a measurement of a unicast/mixed frequency layer which is carried out even if a mobile terminal is receiving an MBMS service in a frequency layer dedicated to MBMS transmission will be disclosed. As a result, there can be provided an advantage of becoming able to ensure the mobility in the MBMS dedicated cells in which no uplink exists via the unicast/mixed cell. Therefore, even a mobile terminal currently receiving an MBMS service in an MBMS transmission dedicated cell needs to carry out a measurement of a unicast cell and an MBMS/Unicast-mixed cell at constant periods (or cycles). According to a conventional method (3GPP W-CDMA), the length of measurement cycle is an integral multiple of the length of a discontinuous reception cycle, and is informed from the network side to each mobile terminal by way of an upper layer.

A problem is therefore that, assuming that a mobile terminal currently receiving an MBMS service in an MBMS transmission dedicated cell carries out a measurement of an unicast cell and an MBMS/Unicast-mixed cell at measurement periods (or cycles) of the length informed from an upper layer by using the conventional method, because a base station which constructs an MBSFN synchronization area of a frequency layer dedicated to MBMS transmission and a base station which constructs a unicast/mixed frequency layer are asynchronous to each other (asynchronous), the mobile terminal has to interrupt the MBMS reception in order to carry out the measurement.

Therefore, in accordance with the present invention, as a solution of the above-mentioned problem, one DRX period is provided in the MBSFN synchronization area (refer to FIG. 62). A DRX period means a time period during which transmission of MBMS data about the MBMS services of all the MBSFN areas in the MBSFN synchronization area from the network side to each mobile terminal is discontinued and is not carried out, i.e., a time period during which reception of MBMS data is not carried out when viewed from the mobile terminal side. Therefore, a mobile terminal currently using an MBMS service in a frequency layer dedicated to MBMS transmission has an advantage of eliminating the necessity to interrupt the use of the MBMS service by carrying out a measurement of a unicast cell and an MBMS/Unicast-mixed cell during a DRX period during which no MBMS data are transmitted from the network side. Furthermore, by disposing a DRX period in the MBSFN synchronization area, each mobile terminal is enabled to simultaneously receive MBMS data from MBSFN areas in the MBSFN synchronization area without adding any control operation.

Next, the DRX cycle as shown in FIG. 62 will be explained. The DRX cycle means a cycle in which the DRX period explained previously is repeated. According to a conventional method, a measurement period length is set (informed) to each mobile terminal by the network side. In a case in which this conventional method is applied also to LTE, if a mobile terminal currently receiving an MBMS service in a frequency layer dedicated to MBMS transmission carries out a measurement in a unicast/mixed frequency layer during the DRX period, the mobile terminal needs to send information about the DRX cycle length and the DRX period length in the frequency layer dedicated to MBMS transmission, via one of routes, to a control device (a base station, an MME, a PDNGW, or the like) on a side of a unicast cell or an MBMS/Unicast-mixed cell. Furthermore, because base stations which construct the unicast/mixed frequency layer are configured in such a way as to be fundamentally asynchronous to one another, there is a necessity to inform both the DRX cycle length and the DRX period length in the frequency layer dedicated to MBMS transmission to each unicast cell or each MBMS/Unicast-mixed cell. This method makes the mobile communication system become complicated, and therefore is not preferred. Therefore, in accordance with the present invention, the following method will be disclosed.

One or more measurement periods in the unicast/mixed frequency layer are made to be included in one DRX period in the frequency layer dedicated to MBMS transmission. As a result, even if any measurement period length is informed (set) to each mobile terminal from a unicast cell or an MBMS/Unicast-mixed cell, when each mobile terminal carries out a measurement of the unicast/mixed frequency layer during the DRX period which is provided in the DRX cycle in the frequency layer dedicated to MBMS transmission, the measurement period length informed from the network side can be satisfied. By using this method, any control device of an MBMS transmission dedicated cell (a base station, an MCE, an MBMS gateway, an eBNSC, or the like) does not have to inform the DRX cycle length and the DRX period length in the MBMS transmission dedicated cell to control devices of a unicast cell and an MBMS/Unicast-mixed cell. Therefore, there is provided an advantage of enabling a mobile terminal currently receiving an MBMS service in a frequency layer dedicated to MBSFN transmission to carry out a measurement at measurement periods of a length which a unicast cell or an MBMS/Unicast-mixed cell has informed (set) to the mobile terminal without interrupting the reception of the MBMS service, while preventing the mobile communication system from becoming complicated, that is, avoiding addition of signaling onto the wireless interface or into the network.

The DRX cycle in the MBMS transmission dedicated cell has a length which is either a minimum of the measurement period length which can be provided in a unicast cell and in a unicast/mixed cell, or an integral submultiple of the minimum. In a case in which the measurement period length which a unicast cell or an MBMS/Unicast-mixed cell can set to a mobile terminal currently receiving an MBMS service in the frequency layer dedicated to MBMS transmission differs from the measurement period length which can be provided in the unicast/mixed frequency layer, the DRX cycle has a length which is equal to that of the measurement period length which can be set to a mobile terminal currently receiving an MBMS service in the frequency layer dedicated to MBMS transmission, which is a minimum of the above-mentioned measurement period length, or which is an integral submultiple of the minimum of the above-mentioned measurement period length. As a result, even if any measurement period length is informed (set) to the mobile terminal from a unicast cell or an MBMS/Unicast-mixed cell, when the mobile terminal carries out a measurement of the unicast/mixed frequency layer during the DRX period which is provided in the DRX cycle in the frequency layer dedicated to MBMS transmission, the measurement period length informed from the network side can be satisfied. By using this method, any control device of an MBMS transmission dedicated cell (a base station, an MCE, an MBMS gateway, an eBNSC, and so on) does not have to inform the DRX cycle length and the DRX period length in the MBMS transmission dedicated cell to control devices of a unicast cell and an MBMS/Unicast-mixed cell. Therefore, there is provided an advantage of preventing the mobile communication system from becoming complicated, that is, avoiding addition of signaling onto the wireless interface or into the network. Furthermore, the mobile terminal can acquire broadcast information from a serving cell in the unicast/mixed frequency layer during the above-mentioned DRX period. For example, when the broadcast information in the serving cell is modified, the mobile terminal can deal with the modification.

A concrete example of the parameters about the DRX information will be explained with reference to FIG. 62. Concretely, as the parameters about the DRX information, the DRX period length, the DRX cycle length, and the starting point value (DRX) can be considered. Concretely, the number of radio frames is used for the indication of each of the DRX period length and the DRX cycle length. In FIG. 62, the DRX period length is "4" radio frames (during a period between SFN 4 to SFN 7). Furthermore, the DRX cycle length is "7" radio frames (during a period between SFN 4 to SFN 10). In addition, an SFN is used for the indication of the starting point value (DRX) at which the DRX period starts. Something other than the number of radio frames can be used for the indication of each of the DRX period length and the DRX cycle length. As a concrete example, the number of subframes can be used for the indication of each of the DRX period length and the DRX cycle length. Something other than an SFN can be used for the indication of the starting point value. As a concrete example, an offset value from a certain reference value can be used for the indication of the starting point value. In a case in which the DRX period corresponds to some subframes in a radio frame, an SFN, a subframe number, and so on can be informed as the starting point. A concrete computation expression for calculating the starting point value (DRX) is given by (the starting point value $(DRX)$=(the $SFN$ number of the leading system frame at which the $DRX$ period starts)mod(the $DRX$ cycle length).

In FIG. 62, the starting point value (DRX) is 4 mod 7=4, 11 mod 7=4, or .... The example in which an SFN is used for the indication of the starting point value (DRX) is shown above. Furthermore, in the example, one DRX period is provided in the MBSFN synchronization area, as previously explained. Therefore, the starting point value (DRX) is also common in base stations in the MBSFN synchronization area. A case in which an SFN is used as the starting point value (DRX) will be considered. It is assumed that the same number is transmitted from base stations in the MBSFN synchronization area at the same time. In the above-mentioned example, the DRX information is mapped onto an MCCH and is informed from a base station in an MBSFN area to mobile terminals, as previously explained. Similarly, the DRX information can be mapped onto a BCCH and can be transmitted from a base station in an MBSFN area to mobile terminals. In this case, the same advantages are provided. As an alternative, the DRX information can be mapped onto a BCCH and can be transmitted from a serving base station to mobile terminals. In this case, the same advantages are provided. Furthermore, even when the DRX information is determined statically (Static) or semi-statically (Semi-Static), the same advantages are provided. As a result, because it becomes unnecessary to broadcast the DRX information, there can also be provided an advantage of making effective use of the radio resources.

An example of the parameter for discontinuous reception at the time of MBMS reception will be explained. Nonpatent reference 1 discloses that a paging group is informed by using an L1/L2 signaling channel (a PDCCH). Whether or not to make an L1/L2 signaling channel exist in radio resources transmitted from an MBMS dedicated cell has not been determined yet. In this embodiment, it is assumed that no L1/L2 signaling channel exists in radio resources transmitted from an MBMS dedicated cell. However, it is preferable that a paging informing method is unified as much as possible for a unicast cell, an MBMS/Unicast-mixed cell, and an MBMS transmission dedicated cell which exist within the same mobile communication system which is called LTE. This is because by unifying a paging informing method, the mobile communication system can be prevented from becoming complicated. In the following explanation, the number of paging groups (referred to as $K_{MBMS}$ from here on) is considered as the parameter for discontinuous reception at the time of MBMS reception.

Figure 9:
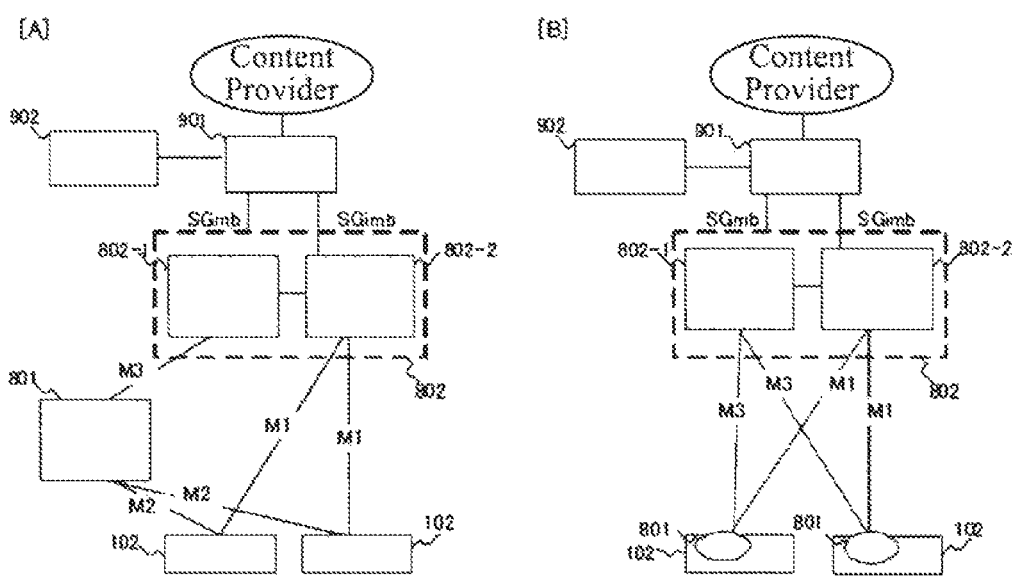
FIG. 9 is an explanatory drawing explaining the architecture (Architecture) of E-MBMS.

Next, the "MBMS service selection", which is described with reference to FIG. 16, will be explained more concretely. The mobile terminal, in step ST1730 of FIG. 9, checks the contents of a service included in the MBMS area information in order to know whether or not a service which the user desires is provided in a corresponding MBMS area. When the service which the user desires is provided in the MBMS area in question, the mobile terminal makes a transition to step ST1731. In contrast, when the service which the user desires is not provided in the corresponding MBMS area, the mobile terminal makes a transition to step ST1733. The mobile terminal, in step ST1731, receives a reference signal (RS) with a radio resource of the MBSFN area in question, and measures the received power (RSRP) of the reference signal. The mobile terminal then determines whether or not the received power is equal to or higher than a threshold determined statically or semi-statically. The fact that the received power is equal to or higher than the above-mentioned threshold shows that the mobile terminal has high sensitivity enough to receive the MBMS service, whereas the fact that the received power is lower than the threshold shows that the mobile terminal does not have high sensitivity enough to receive the MBMS service. When the received power is equal to or higher than the above-mentioned threshold, the mobile terminal makes a transition to step ST1732, whereas when the received power is lower than the above-mentioned threshold, the mobile terminal makes a transition to step ST1733. The mobile terminal, in step ST1732, acquires a frequency f(MBMS) dedicated to MBMS transmission and an MBSFN area ID which are required for the user to receive the desired MBMS service. On the other hand, the mobile terminal, in step ST1733, determines whether or not another MBMS area receivable within the same frequency band (f(MBMS)) exists. When another MBMS area receivable within the same frequency band (f(MBMS)) exists, the mobile terminal returns to step ST1730 and repeats the process. In contrast, when any other MBMS area receivable within the same frequency band (f(MBMS)) does not exist, the mobile terminal makes a transition to step ST1734. The mobile terminal, in step ST1734, determines whether or not another frequency exists in the frequency list of the receivable MBSFN synchronization area, which the mobile terminal receives in step ST1708. When another frequency exists in the frequency list, the mobile terminal returns to step ST1722 and switches its synthesizer to the new frequency (f2(MBMS)), and then repeats the process. In contrast, when any other frequency does not exist in the frequency list, the mobile terminal returns to step ST1720 and repeats the process. Instead of receiving the reference signal and measuring the received power in step 1731, the mobile terminal can actually receive the MBMS service (an MTCH and/or an MCCH) in the MBSFN area in question. In this case, the user can determine whether the mobile terminal provides receive sensitivity which he or she can permit by hearing or viewing decoded data. When the mobile terminal provides receive sensitivity which he or she can permit, the mobile terminal makes a transition to step ST1732, whereas when the mobile terminal does not provide receive sensitivity which he or she can permit, the mobile terminal makes a transition to step ST1733. Because the permissible receive sensitivity has differences among individuals, there can be provided an advantage of making mobile terminals be further suited for users.

Figure 58:
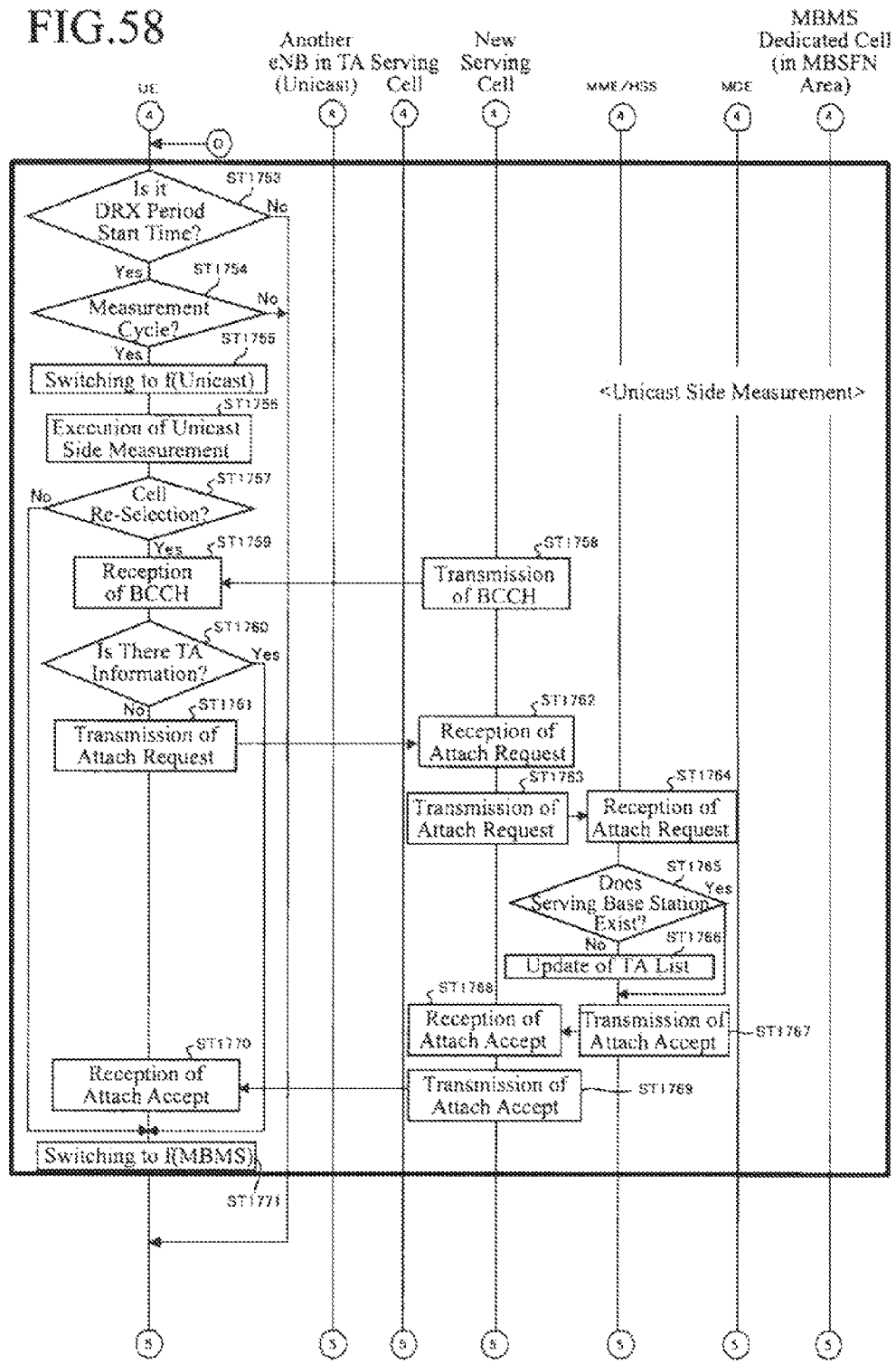
FIG. 58 is a flow chart showing a unicast side measurement process.

FIG. 58 is a flow chart showing a unicast side measurement process. The mobile terminal, in step ST1753 of FIG. 58, determines whether a DRX period start time of the MBMS service has come by using the DRX information which the mobile terminal receives in step ST1729 of FIG. 19. As a concrete example, the mobile terminal determines the SFN number of the leading system frame at which the DRX period starts by using the DRX cycle length and the starting point value (DRX) which are an example of the parameters which the mobile terminal receives in step ST1729, and determines whether or not a DRX period start time has come on the basis of the SFN mapped onto the BCCH (broadcast control channel) or the like. When no DRX period start time has come yet, the mobile terminal makes a transition to step ST1772. In contrast, when a DRX period start time has come, the mobile terminal makes a transition to step ST1754. The mobile terminal, in step ST1754, determines whether or not the DRX period start time is in a measurement period in the MBMS/Unicast-mixed cell received in step ST1705. When the DRX period start time is not in a measurement period, the mobile terminal makes a transition to step ST1772. In contrast, when the DRX period start time is in a measurement period, the mobile terminal makes a transition to step ST1755. The mobile terminal, in step ST1755, receives a downlink signal of the MBMS/Unicast-mixed cell by changing the frequency set to the frequency converting unit 1107 thereof (the synthesizer) to change the center frequency to f(Unicast). The mobile terminal, in step ST1756, carries out a measurement on the side of the unicast (i.e., a measurement of a unicast cell and/or an MBMS/Unicast-mixed cell). As values which the mobile terminal actually measures, the RSRPs, RSSIs, etc. of the serving cell and a neighboring cell can be considered. The information about the neighboring cell can be broadcast, as neighboring cell information (a list), from the serving cell.

The mobile terminal, in step ST1757, judges whether or not a re-selection (a cell re-selection) of the serving cell is needed according to the result of the measurement in step ST1756. As an example of a criterion of the judgment, there can be considered whether the result of the measurement of one cell among neighboring cells exceeds the result of the measurement of the serving cell. When no re-selection is needed, the mobile terminal makes a transition to step ST1771. In contrast, when a re-selection is needed, steps ST1758 and ST1759 are carried out. A base station (a new serving cell: New serving cell) which is newly selected as the serving cell in step ST1758 broadcasts the measurement period length, the discontinuous reception cycle length, and the tracking area information (the TA information) to mobile terminals being served thereby by using the BCCH (broadcast control channel), like in the case of step ST1705. The mobile terminal, in step ST1759, receives and decodes the BCCH from the new serving cell to receive the measurement period length, the discontinuous reception cycle length, and the TA information. The mobile terminal, in step ST1760, checks to see whether or not the TA information of the serving base station received in step ST1759 is included in the current tracking area list (TA List) which is stored in the protocol processing unit 1101 or the control unit 1110 thereof. When the TA information is included in the current tracking area list, the mobile terminal makes a transition to step ST1771. In contrast, when the TA information is not included in the current tracking area list, the mobile terminal performs step ST1761. An explanation of steps ST1761 to ST1770 will be omitted because it is the same as that of steps ST1710 to ST1719. The mobile terminal, in step ST1771, moves to the frequency layer dedicated to MBMS transmission by changing the frequency set to the frequency converting unit 1107 thereof to change the center frequency to f(MBMS).

Through the "unicast side measurement" process in steps ST1753 to ST1771, the mobile terminal can carry out a measurement of a unicast cell and/or an MBMS/Unicast-mixed cell even if the mobile terminal is receiving an MBMS service in the frequency layer dedicated to MBMS transmission. Accordingly, there is provided an advantage of making it possible for a mobile terminal currently receiving an MBMS service in a frequency layer dedicated to MBMS transmission to ensure the mobility in unicast cells and/or MBMS/Unicast-mixed cells. As a result, there can be provided an advantage of becoming able to ensure the mobility in MBMS dedicated cells in which no uplink channel exists by way of an MBMS/Unicast-mixed cell. Furthermore, a mobile terminal currently receiving a service in a frequency layer dedicated to MBMS transmission becomes able to carryout downlink synchronization establishment through a measurement with a unicast cell or an MBMS/Unicast-mixed cell at measurement periods, too. As a result, there can be provided an advantage of enabling a mobile terminal to implement even transmission of a message in a unicast/mixed frequency layer with a short control delay time.

Next, the "MTCH reception", which is described with reference to FIG. 16, will be explained more concretely. The mobile terminal, in step ST1772 of FIG. 59, determines whether the current time is an MCCH receiving one of the number of the MBSFN area from which the mobile terminal is receiving an MBMS from the MCCH scheduling information. That is, the mobile terminal determines whether the current time is an MCCH receiving one by using the scheduling of the MCCH (multicast control channel) received in step ST1725. More specifically, the mobile terminal determines the SFN number of the leading one of system frames onto which the MCCH is mapped by using the MCCH repetition period length and the starting point value which are an example of the parameters which the mobile terminal receives in step ST1725, and determines whether or not it is the leading one of system frames onto which the MCCH is mapped on the basis of an SFN mapped onto the BCCH or the like to determine whether it is the SFN number of the leading one of system frames onto which the MCCH is mapped. When the current time is a one of receiving the MCCH, the mobile terminal makes a transition to step ST1840. In contrast, when the current time is not a one of receiving the MCCH, the mobile terminal makes a transition to step ST1841. The mobile terminal, in step ST1840, carries out reception and decoding of the MCCH. After that, the mobile terminal makes a transition to step ST1842. The mobile terminal, in step ST1841, determines whether the current time is a one of receiving the MTCH by using the scheduling of the MCCH received in step ST1725 and/or the MBMS area information received in step ST1729. When the current time is a one of receiving the MTCH, the mobile terminal makes a transition to step ST1843. In contrast, when the current time is not a one of receiving the MTCH, the mobile terminal makes a transition to step ST1753. The mobile terminal, in step ST1842, determines whether the current time is a one of receiving the MTCH by using the scheduling of the MCCH received in step ST1725 and/or the MBMS area information received in step ST1729. When the current time is a one of receiving the MTCH, the mobile terminal makes a transition to step ST1843. In contrast, when the current time is not a one of receiving the MTCH, the mobile terminal makes a transition to step ST1794. The mobile terminal, in step ST1843, carries out reception and decoding of the MTCH. After that, the mobile terminal makes a transition to step ST1794.

Figure 59:
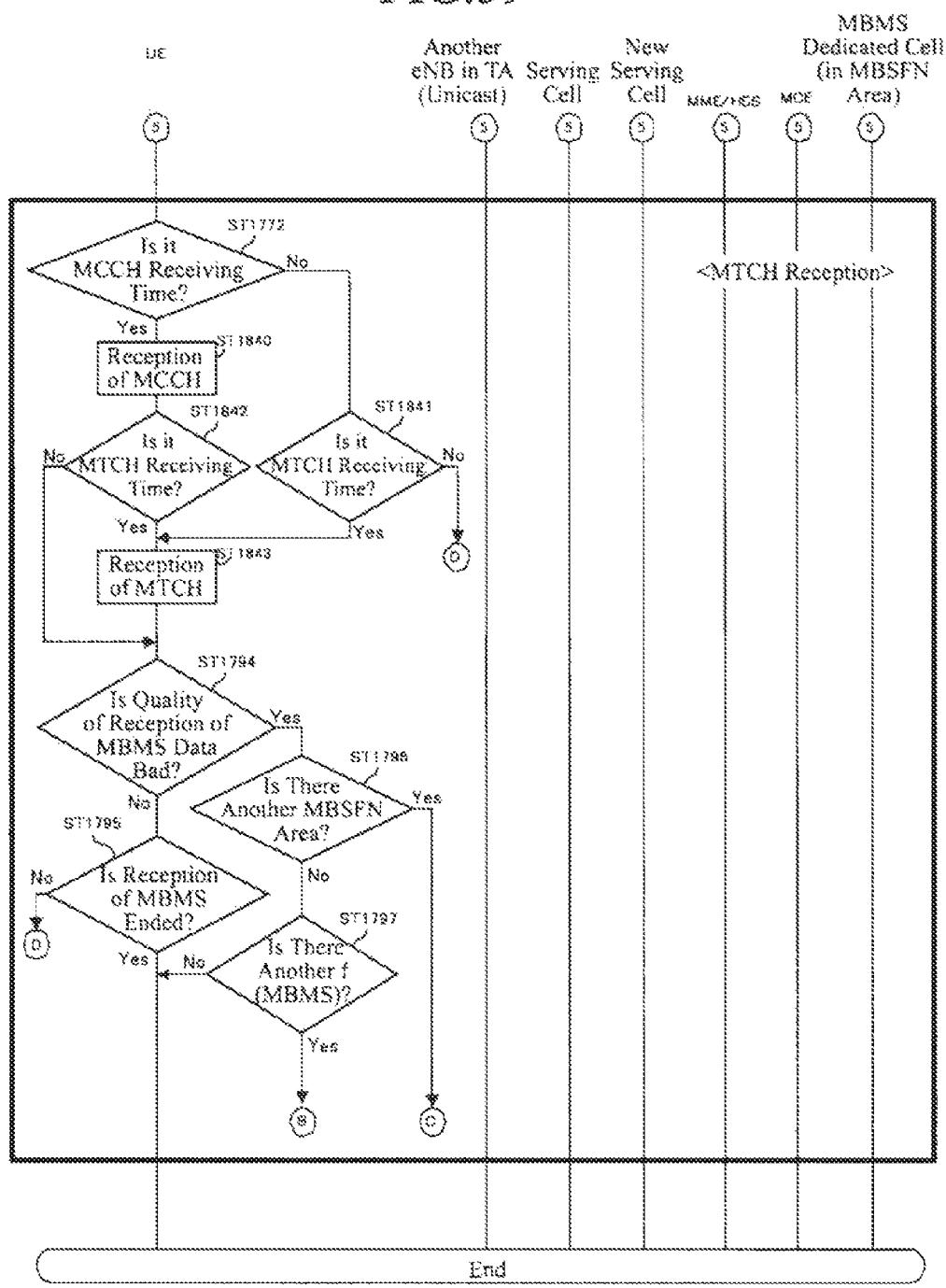
FIG. 59 is a flow chart showing an MTCH receiving process.

The mobile terminal, in step ST1794 of FIG. 59, measures the quality of reception of the MBMS service which the mobile terminal is receiving. The mobile terminal receives a reference signal (RS) with the radio resources of the MBSFN area in question, and measures the received power (RSRP). The mobile terminal then determines whether or not the received power is equal to or higher than a threshold determined statically or semi-statically. The fact that the received power is equal to or higher than the above-mentioned threshold shows that the mobile terminal has high sensitivity enough to receive the MBMS service, whereas the fact that the received power is lower than the threshold shows that the mobile terminal does not have high sensitivity enough to receive the MBMS service. When the received power is equal to or higher than the above-mentioned threshold, the mobile terminal makes a transition to step ST1795, whereas when the received power is lower than the above-mentioned threshold, the mobile terminal makes a transition to step ST1796. Instead of receiving the reference signal and measuring the received power in step 1794, the mobile terminal can actually receive and decode the MBMS service (an MTCH and/or an MCCH) of the MBSFN area in question. In this case, the user can determine whether the mobile terminal provides receive sensitivity which he or she can permit by hearing or viewing decoded data. When the mobile terminal provides receive sensitivity which he or she can permit, the mobile terminal makes a transition to step ST1795, whereas when the mobile terminal does not provide receive sensitivity which he or she can permit, the mobile terminal makes a transition to step ST1796. Because the permissible receive sensitivity has differences among individuals, there can be provided an advantage of making mobile terminals be further suited for users. The mobile terminal, in step ST1795, checks to see the user's intention. When the user desires to succeedingly receive the MBMS service which the mobile terminal is receiving, the mobile terminal makes a transition to step ST1753. In contrast, when the user desires to end the reception of the MBMS service which the mobile terminal is receiving, the mobile terminal ends the processing. The mobile terminal, in step ST1796, determines whether there exists another MBMS area in which the mobile terminal can receive the MBMS service within the same frequency band (f(MBMS)). When another MBMS area receivable within the same frequency band exists, the mobile terminal returns to step ST1730 and repeats the process. In contrast, when any other MBMS area receivable within the same frequency band does not exist, the mobile terminal makes a transition to step ST1797. The mobile terminal, in step 1797, determines whether or not there is another frequency in the frequency list of the receivable MBSFN synchronization area received in step ST1708. When another frequency exists in the frequency list, the mobile terminal returns to step ST1722 and switches its synthesizer to a new frequency (f2(MBMS)), and then repeats the process. In contrast, when any other MBMS area receivable within the same frequency band does not exist, the mobile terminal ends the processing. Also in this Embodiment, like in the case of Embodiment 2, the method of including, as identifiers of each mobile terminal, a mobile terminal identifier used in a unicast/mixed frequency layer and a mobile terminal identifier used in a frequency layer dedicated to MBSFN transmission can be used.

In accordance with the mobile communication system disclosed above, the method of selecting a desired service in a frequency layer dedicated to MBMS transmission and the mobile communication system which enables the method to be implemented therein can be disclosed.

Next, a variant (variant 1) will be explained. In the 3GPP, it has been debated that a base station (cell) in an MBSFN synchronization area can construct a plurality of MBSFN areas. However, as mentioned previously, any detailed decision about a method of multiplexing MBSFN areas has not been made in the current 3GPP. In this variant 1, a concrete example of the multiplexing method of multiplexing MBSFN areas in such a case will be described with the object of disclosing the method of selecting a desired service in a frequency layer dedicated to MBMS transmission and the mobile communication system which enables the method to be implemented therein, which are a challenge of the present invention. An explanation will be made focusing on a portion different from Embodiment 11, and the explanation of the same portion as Embodiment 11 will be omitted hereafter.

Figure 63:
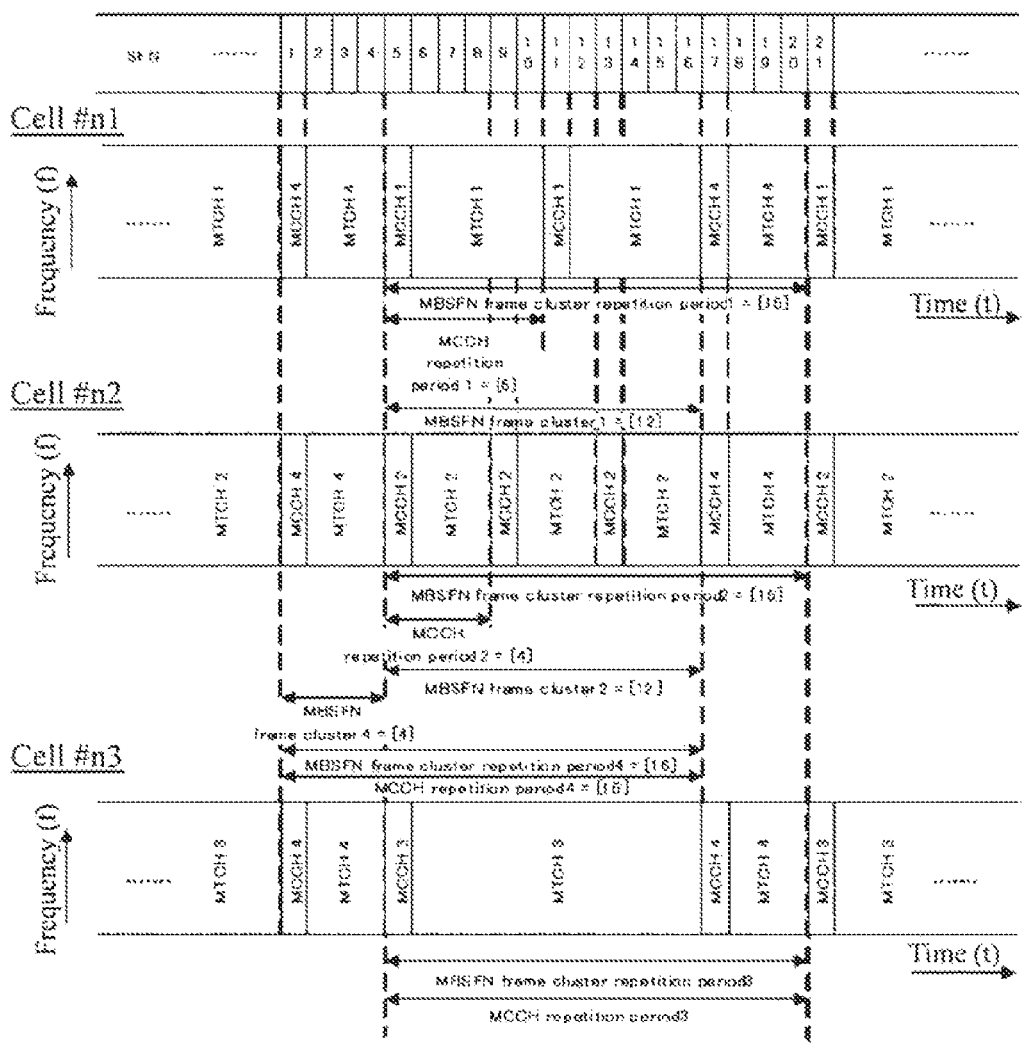
FIG. 63 is an explanatory drawing showing the configuration of a PMCH for each MBSFN area.

In Embodiment 11, the method of, when configuring the PMCH of each MBSFN area, carrying out either time division multiplexing (TDM) or code division multiplexing (CDM) for the PMCH of each MBSFN area is disclosed above. In this variant 1, a method of, when configuring the PMCH of each MBSFN area, carrying out both time division multiplexing (TDM) and code division multiplexing (CDM) for each MBSFN area. The configuration of the PMCH provided for each MBSFN area is shown in FIG. 63. In FIG. 63, both time division multiplexing (TDM) and code division multiplexing (CDM) are used for each MBSFN area. A cell #n1 is one located in the MBSFN area 1, a cell #n2 is one located in the MBSFN area 2, and a cell #n3 is one located in the MBSFN area 3. Furthermore, the cells #1, #2, and #3 also belong to an MBSFN area 4. FIG. 28 is an explanatory drawing showing a plurality of MBSFN areas which construct an MBSFN synchronization area, and is an explanatory drawing showing an MBSFN area covering a plurality of MBSFN areas. In FIG. 28, four MBSFN areas 1 to 4 exist in a single MBSFN synchronization area (MBSFN Synchronization Area). Among the four MBSFN areas, the MBSFN area 4 covers the MBSFN areas 1 to 3. Code division multiplexing of the PMCHs of the MBSFN areas 1, 2, and 3 is carried out, and time division multiplexing of the PMCHs of the MBSFN areas 1, 2, and 3 and the PMCH of the MBSFN area 4 is carried out. Because the cell #n1 belongs to the MBSFN area 1, the PMCH corresponding to the MBSFN area 1 is transmitted at a time. The PMCH is transmitted on an MBSFN subframe because the PMCH is transmitted via a multi-cell transmission scheme in each MBSFN area.

A set of MBSFN frames to which MBSFN subframes are allocated is referred to as an "MBSFN frame cluster" (MBSFN frame cluster). In the MBMS dedicated cell, all subframes in an MBSFN frame can be MBSFN subframes used for multi-cell transmission. The length of each of the repetition periods at which the MBSFN frame cluster corresponding to a certain MBSFN area is repeated is expressed as the "MBSFN frame cluster repetition period" (MBSFN frame cluster repetition period). An MCH which is a transport channel for MBMS is mapped onto the PMCH, and either or both of a logical channel MCCH which is control information for MBMS and a logical channel MTCH which is data for MBMS are mapped onto the MCH. The MCCH and the MTCH can be divided in time and mapped onto the PMCH, and can be further divided in time and mapped onto a physical area which is transmitted via a multi-cell transmission scheme. For example, the MCCH and the MTCH can be mapped onto different MBSFN subframes which are the physical area onto which they are mapped as a result. The MCCH can be mapped onto each MBSFN frame cluster, or only the MTCH can be mapped onto each MBSFN frame cluster. In a case in which only the MTCH is mapped onto the PMCH, the repetition period of the MCCH differs from the repetition period of the MBSFN frame cluster. Furthermore, there is a case in which a plurality of MCCHs are mapped onto each MBSFN frame cluster. The length of each of the repetition periods at which the MCCH is repeated is expressed as the "MCCH repetition period 1".

In FIG. 63, MCCH1 is MBMS control information for the MBSFN area 1, and MTCH1 is MBMS data for the MBSFN area 1. Because the cell #n1 belongs to the MBSFN area 1 and the MBSFN area 4, time division multiplexing of the PMCH of the MBSFN area 1 and the PMCH of the MBSFN area 4 is carried out. Similarly, because the cell #n2 belongs to the MBSFN area 2 and the MBSFN area 4, time division multiplexing of the PMCH of the MBSFN area 2 and the PMCH of the MBSFN area 4 is carried out, and because the cell #n3 belongs to the MBSFN area 3 and the MBSFN area 4, time division multiplexing of the PMCH of the MBSFN area 3 and the PMCH of the MBSFN area 4 is carried out. Because multi-cell transmission of the PMCH of the MBSFN area 4 is carried out in the MBSFN area 4, the transmission of the PMCH in each of the cells #n1, #n2, and #n3 is carried out at the same time. By thus using the method of carrying out both time division multiplexing and code division multiplexing for the PMCH of each MBSFN area, for example, time division multiplexing can be used for MBSFN areas which overlap one another and code division multiplexing can be used for MBSFN areas which do not overlap one another. Therefore, as compared with the case of using only time division multiplexing, the efficiency of the radio resources can be improved because code division multiplexing is used. Furthermore, as compared with the case of using only code division multiplexing, the mutual interference among MBSFN areas which overlap one another can be reduced and receive errors detected in MBMS data received by each mobile terminal can be reduced.

Hereafter, a concrete example of step ST1725 of FIG. 18 will be shown. In a first step, each of the mobile terminals carries out blind detection of a P-SCH (a primary synchronization channel) in the above-mentioned sequence for exclusive use. Therefore, each of the mobile terminals which has blind-detected the P-SCH can carry out 5 ms-timing detection. Furthermore, the P-SCH is transmitted via a multi-cell transmission scheme. Base stations located in the MBSFN synchronization area are synchronized with one another for transmission of the P-SCH is targeted for the base stations included in the synchronization area. In a second step, each of the mobile terminals carries out blind detection of an S-SCH. Each of the mobile terminals which has blind-detected the S-SCH can know 10 ms-timing detection (frame synchronization) and the MBSFN area ID. Furthermore, the S-SCH is transmitted via a multi-cell transmission scheme. In this variant, each base station belongs to a plurality of MBSFN areas. Therefore, a problem is that which MBSFN area is shown by the ID of the MBSFN area mapped onto the S-SCH. In this variant, it is assumed that the ID of the MBSFN area mapped onto the S-SCH is the one of either one of MBSFN areas to which each base station belongs. It is further assumed that the ID is the one of the smallest (covered) one of the plurality of MBSFN areas to which each base station belongs. Therefore, the multi-cell transmission of the S-SCH is targeted for base stations included in each covered MBSFN area. Each of the mobile terminals receives the BCCH by using the scrambling code related to the MBSFN area ID acquired in the second step. By decoding the BCCH, each of the mobile terminals can acquire the scheduling of the MCCH. Furthermore, the BCCH is transmitted via a multi-cell transmission scheme. Since each of the mobile terminals uses the scrambling code acquired in the second step, the BCCH is the one from each covered MBSFN area. Therefore, the multi-cell transmission of the BCCH is targeted for base stations included in each covered MBSFN area. Each of the mobile terminals can acquire the scheduling of the MCCH, the system bandwidth at f(MBMS), the number of transmission antennas at f(MBMS), etc. by decoding the BCCH.

Hereafter, the scheduling of the MCCH will be further examined. Because the MBSFN synchronization area is synchronous in time, the P-SCH is transmitted at the same time within of the MBMS dedicated cell in the MBSFN area 1, the MBMS dedicated cell in the MBSFN area 2, and the MBMS dedicated cell in the MBSFN area 3. Furthermore, assuming that the above-mentioned sequence exclusively used for the frequency layer dedicated to MBMS transmission is used, the sequences of the P-SCHs in all the MBSFN areas are the same as one another. Therefore, in the MBSFN synchronization area, identical information is transmitted at the same time by using the P-SCH. As mentioned above, it is considered that an MBSFN area ID is transmitted by using the S-SCH. In this case, by using the S-SCH, information different for each MBSFN area is transmitted at the same time in the MBSFN synchronization area. In this case, all the MBMS dedicated cells in each MBSFN area transmit identical information at the same time. The S-SCH uses the same radio resources in frequency and in time in the MBSFN synchronization area. Furthermore, because the S-SCH is used for a search for an MBSFN area ID related to each MBSFN area scrambling code, the S-SCH cannot be multiplied by the scrambling code of each MBSFN area. The configuration of making each base station belong to a plurality of MBSFN areas while following such the functions of the S-SCH can be implemented by setting the ID of the MBSFN area mapped onto the S-SCH to the ID of the smallest one of the plurality of MBSFN areas to which each base station belongs, as mentioned above, by assuming that there is no S-SCH specific to an MBSFN area covering other MBSFN areas.

Furthermore, non-transmission of the S-SCH to the MBSFN area covering the other MBSFN areas means that what is necessary is just to transmit only one type of S-SCH in overlapping MBSFN areas (e.g., the MBSFN areas 1 and 4) in the geographical locations where the plurality of MBSFN areas overlap one another. As a result, the S-SCHs from the plural MBSFN areas can be prevented from interfering with one another. The mobile communication system transmits a BCCH multiplied by the scrambling code related to an MBSFN area ID which the mobile communication system informs by using the S-SCH. Therefore, in this case, by using the BCCH, information different for each MBSFN area covered is transmitted at the same time in the MBSFN synchronization area. The contents of the BCCH are the same in all the MBMS-dedicated base stations in each MBSFN area. By decoding the BCCH, each of the mobile terminals can acquire the scheduling of the MCCH. An example of the scheduling of the MCCH has not been discussed in the 3GPP. In the present invention, an example of the scheduling of the MCCH will be shown.

Referring to FIG. 63, the scheduling of the MCCH in the case in which an MBSFN frame cluster is longer than the MCCH repetition period length will also be explained. As the scheduling of the MCCH of the MBSFN area covering the other MBSFN areas, e.g., the scheduling of the MCCH of the MBSFN area 4 of FIG. 28, two steps will be considered. In the following explanation, for the sake of simplicity, a case in which a mobile terminal is being served by a base station belonging to the MBSFN area 1 and the MBSFN area 4 will be explained. In a first step, the MCCH scheduling of the MBSFN area 1 is informed by using the BCCH of the MBSFN area 1. In the present invention, an example of the scheduling of the MCCH will be shown. In the present invention, it is assumed that the "starting point value at the time when the MCCH is mapped", the "MBSFN frame cluster repetition period length", and the "MCCH transmission frequency during the MBSFN frame cluster repetition period" are informed from a cell to each terminal for the scheduling of the MCCH. More concretely, an SFN (System Frame Number) is used for the indication of the starting point value. A concrete computation expression for calculating the starting point value is given as follows.

The starting point value=(the SFN number of the leading one of system frames onto which the MCCH is mapped in the MBSFN frame cluster) mod (the MBSFN frame cluster repetition period length)

More concretely, the MCCH transmission frequency (referred to as $N_{MCCH}$ from here on) in the MBSFN frame cluster is used as the MCCH transmission frequency within the MBSFN frame cluster repetition period. A concrete computation expression for calculating $N_{MCCH}$ is expressed as follows.

$N_{MCCH}$=the MBSFN frame cluster length/the MCCH repetition period length

In FIG. 63, the starting point value 1 of the MBSFN area 1 is 5 mod 16=5, 21 mod 16=5, or . . . . The starting point value 2 of the MBSFN area 2 is 5 mod 16=5, 21 mod 16=5, or . . . . The starting point value of the MBSFN area 3 is the same as that of the MBSFN area 2. Then, $N_{MCCH}1$ of the MBSFN area 1 is 12/6=2, and $N_{MCCH}2$ of the MBSFN area 2 is 12/4=3. In the case of the MBSFN area 3, $N_{MCCH}$ is determined similarly. Therefore, the parameters of the scheduling of the MCCH of the MBSFN area 1 are the MBSFN frame cluster repetition period length 1 of "16", the starting point value 1 of "5", and $N_{MCCH}1$ of "2". At this time, instead of informing $N_{MCCH}1$ as one of the parameters, the MBSFN frame cluster 1 and the MCCH repetition period length 1 can be informed.

In a second step, the scheduling of the MCCH of the MBSFN area 4 is informed by using the MCCH of the MBSFN area 1. The method of determining the parameters of the scheduling of the MCCH is the same as that in the case of FIG. 60 because the MBSFN frame cluster is smaller than the MCCH repetition period length. The starting point value 4 of the MBSFN area 4 is 1 mod 16=1, 17 mod 16=1, or . . . . In the concrete example of the scheduling of the MCCH, the MBSFN area ID of the MBSFN area 4 covering the other MBSFN areas, as well as the parameters of the above-mentioned MBSFN area 4 (the MCCH repetition period length 4 of "16" and the starting point 4 of "1"), are informed. Because it is assumed that no S-SCH dedicated to the MBSFN area 4 exists, it is necessary to also inform the MBSFN area ID at this time.

More specifically, data transmitted from the MBSFN area 1 are provided as follows. The P-SCH which is the sequence exclusively used for the frequency layer dedicated to MBMS transmission, the S-SCH1 onto which the MBSFN area ID1 and so on are mapped, a BCCH1 onto which the MCCH starting point value 1 of "5", the MBSFN frame cluster repetition period length 1 of "16", $N_{MCCH}1$ of "2", and so on are mapped, and which is multiplied by the scrambling code 1, and an MCCH1 and an MTCH1 of the MBSFN area 1 each of which is multiplied by the scrambling code 1 are transmitted. By using the MCCH1, the MBSFN area ID (the MBSFN area 4), and the MCCH starting point value 4 of "1" and the MCCH repetition period length 4 of "16", which are the data about the MCCH scheduling of the MBSFN area 4, are transmitted.

Like in the case of the MBSFN area 1, data which are transmitted from the MBSFN area 2 are provided as follows. The P-SCH which is the sequence exclusively used for the frequency layer dedicated to MBMS transmission, the S-SCH2 onto which the MBSFN area ID2 and so on are mapped, a BCCH2 onto which the MCCH starting point value 2 of "5", the MBSFN frame cluster repetition period length 2 of "16", $N_{MCCH}2$ of "3", and so on are mapped, and which is multiplied by the scrambling code 2, and an MCCH2 and an MTCH2 of the MBSFN area 2 each of which is multiplied by the scrambling code 2 are transmitted. By using the MCCH2, the MBSFN area ID (the MBSFN area 4), and the MCCH starting point value 4 of "1" and the MCCH repetition period length 4 of "16", which are the data about the MCCH scheduling of the MBSFN area 4, are transmitted. As explained previously, the data transmission from the MBSFN area 4 does not include transmission of the P-SCH and the S-SCH. In addition, when it is not necessary to inform, as the system information about the MBSFN area 4, any information other than what is transmitted by using the BCCH of each of the covered MBSFN areas (the MBSFN areas 1 to 3), the transmission of the BCCH from the MBSFN area 4 can be omitted. As a result, there can be provided an advantage of making effective use of the radio resources. An MCCH4 and an MTCH4 of the MBSFN area 4 each of which is not multiplied by any scrambling code are transmitted. Each of the MCCH4 and the MTCH4 can be multiplied by a scrambling code specific to the MBSFN area 4. There can be provided an advantage of suppressing the interference among the MBSFN areas. In this case, it is assumed that the scrambling code specific to the MBSFN area 4 is related with the MBSFN area ID of the MBSFN area 4, which is informed via the MCCH of the MBSFN area 1, 2, or 3. Accordingly, there can be provided an advantage of eliminating the necessity to carry out further signaling.

For the sake of simplicity, the example in which time division multiplexing of the MCCH and the MTCH is carried out for each subframe is shown in FIG. 63. However, the present invention can be applied to a case in which another method of multiplexing the MCCH and the MTCH is used, and a case in which the time division multiplexing is carried out for each of units other than each subframe. Even in the case in which each base station constructs a plurality of MBSFN areas in the mobile communication system explained above, the method of selecting a desired service in a frequency layer dedicated to MBMS transmission and the mobile communication system which enables the method to be implemented therein, which are a challenge of the present invention, can be disclosed.

In the above-mentioned example, the service contents of the MBSFN area 4 are included in the MBMS area information in the MCCH4. In this case, when transmitting the MCCH scheduling information about the MBSFN area covering the other MBSFN areas (i.e., the MBSFN area 4, and refer to FIG. 28) by using the MCCHs of the covered MBSFN areas (the MBSFN areas 1 to 3, and refer to FIG. 28), the service contents of the MBSFN area 4, as well as the scheduling information, can be informed. Accordingly, each mobile terminal (user) becomes able to grasp the service contents of the plurality of MBSFN areas to which the base station belongs at the time of decoding the MCCHs of the covered MBSFN areas. Therefore, there can be provided an advantage of eliminating the necessity for each mobile terminal to receive and decode in turn the MCCHs of the plurality of MBSFN areas to which the base station belongs to make a selection of an MBMS service, thereby reducing the control delay time occurring in each mobile terminal. Concretely, each mobile terminal, in step ST1729 of FIG. 19, receives the service contents of the covered MBSFN areas (the MBSFN areas 1 to 3, and refer to FIG. 28), and the service contents of the MBSFN area covering the other MBSFN areas (the MBSFN area 4, and refer to FIG. 28) by way of the MCCHs of the covered MBSFN areas (the MBSFN areas 1 to 3, and refer to FIG. 28). As a result, each mobile terminal can grasp the contents of receivable MBMS services at the current location (location). Each mobile terminal, in step ST1730 of FIG. 19, checks an MBSFN area in which the content of a desired MBMS service is being transmitted.

Furthermore, there can be considered a method of informing the service contents of the MBSFN area 4 by using the BCCH of the MBSFN area 1 for the MCCH scheduling of the MBSFN area 4. As a result, because a mobile terminal receiving a service of the MBSFN area 4 does not have to carry out the process of receiving and decoding the MCCH of the MBSFN area 1, there can be provided an advantage of reducing the control delay time occurring in the mobile terminal. The method of using, as the MCCH scheduling, the above-mentioned starting point, the MBSFN frame cluster repetition period length, and $N_{MCCH}$ (alternatively, the MBSFN frame cluster length and the MCCH repetition period length) can be applied also to a case in which the MCCH exists multiple times in the MBSFN frame cluster when time division multiplexing of the MBSFN areas is carried out (refer to FIG. 60).

Variant 2

In Embodiment 11, the service contents of each MBSFN area are included in the MBMS area information in the MCCH. As an alternative, the service contents of each MBSFN area, as well as the scheduling of the MCCH, can be informed by using the BCCH. As a result, each mobile terminal (user) can grasp the service contents of the MBSFN areas to which the base station belongs at the time of decoding the BCCH. As a result, because each mobile terminal can determine whether a desired service exists before receiving and decoding the MCCH and does not have to carry out the process of receiving and decoding the MCCH of any MBSFN area in which the desired service is ongoing, there can be provided an advantage of reducing the control delay time occurring in each mobile terminal. Concretely, each mobile terminal, in step ST1725 of FIG. 18, receives the service contents of the MBSFN areas. As a result, each mobile terminal can grasp the contents of receivable MBMS services at the current location (location). After that, each mobile terminal checks to see whether or not the service which the user desires is ongoing in the MBSFN area in question prior to step ST1729 of FIG. 19. When the desired service is ongoing, each mobile terminal makes a transition to step ST1729. Each mobile terminal makes a transition to step ST1731 after step ST1729. In contrast, when the desired service is not ongoing, each mobile terminal omits the processes of steps ST1729 and ST1731, and then makes a transition to step ST1733.

Furthermore, the MBMS area information, the DRX information, and the parameter for discontinuous reception at the time of MBMS reception mapped, which are mapped onto MCCH, can also be informed by using the BCCH. As a result, the MCCH becomes unnecessary, and the efficiency of the radio resources can be improved. Therefore, it becomes unnecessary to inform the scheduling of the MCCH by using the BCCH, and the efficiency of the radio resources can be further improved. This variant 2 can also be applied to variant 1. In this case, the same advantages can be provided.

In the 3GPP, it has been also examined that single-cell transmission (Single-cell transmission) is applied in a frequency layer dedicated to MBMS transmission. As a method of applying single-cell transmission in a frequency layer dedicated to MBMS transmission, there can be considered a method of implementing single-cell transmission in an MBSFN area having a one-cell configuration. However, a concrete method of implementing single-cell transmission in an MBSFN area having a one-cell configuration has not been decided. Assuming that only one base station belongs to an MBSFN area in the above-mentioned explanation, a mobile communication system in which single-cell transmission is implemented in an MBSFN area having a one-cell configuration can be disclosed.

Embodiment 12

In this Embodiment 12, a mobile communication system which differs from Embodiment 11 mainly in an MBMS search will be disclosed. A flow of processing carried out by the mobile communication system in accordance with this Embodiment 12 is nearly the same as that shown in FIGS. 16 and 17 of Embodiment 11. An explanation of the flow will be made focusing on a portion different from Embodiment 11. Each unicast cell or each MBMS/Unicast-mixed cell, in step ST1707 of FIG. 17, broadcasts one or more frequencies at which an MBMS service is ongoing, other than those in the current unicast/mixed frequency layer, to mobile terminals being served thereby by using the BCCH. That is, each unicast cell or each MBMS/Unicast-mixed cell broadcasts one or more frequencies (f(MBMS)s) of a receivable MBSFN synchronization area. In addition, each unicast cell or each MBMS/Unicast-mixed cell broadcasts either or both of the system bandwidth at each frequency f(MBMS) and the number of transmission antennas at each frequency f(MBMS). Each of the mobile terminals, in step ST1708 of FIG. 17, receives either or both of the system bandwidth at each frequency f(MBMS) and the number of transmission antennas at each frequency f(MBMS) by receiving and decoding the BCCH from the serving base station. Information showing whether or not each frequency f(MBMS) falls within either the frequency layer constructed of a unicast/MBMS mixed cell or the frequency layer constructed of an MBMS dedicated cell can also be informed to each of the mobile terminals. As a result, each of the mobile terminals becomes able to change its operation between the frequency layer constructed of a unicast/MBMS mixed cell, and the frequency layer constructed of an MBMS dedicated cell. A concrete example of the operation is an MBMS search operation. In a unicast/MBMS mixed cell, since a unicast service is provided, it is difficult to reduce the P-SCH, the S-SCH, and so on which are used for the unicast service. Therefore, the method explained in Embodiment 11 is used for the MBMS search operation in the frequency layer constructed of a unicast/MBMS mixed cell. In contrast, in an MBMS dedicated cell, since no unicast service is provided, there are fewer limitations on the MBMS dedicated cell as compared with a unicast/MBMS mixed cell. Therefore, a process as will be explained hereafter is applied to the MBMS search operation in the frequency layer constructed of an MBMS dedicated cell.

Figure 64:
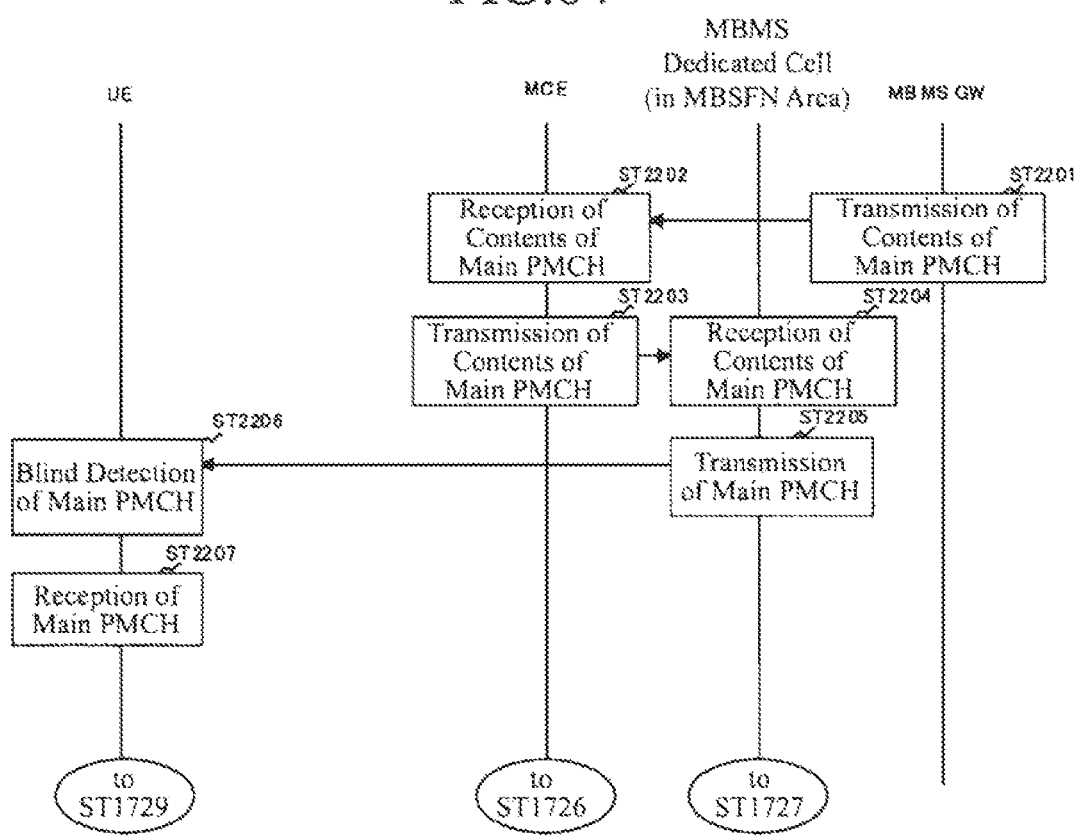
FIG. 64 is a flow chart showing a search method of searching for an MBMS which is explained in Embodiment 12.

In Embodiment 12, steps ST1723 to ST1725 of FIG. 18 are changed as shown in FIG. 64. FIG. 64 is a flow chart showing a method of searching for an MBMS. In FIG. 64, an MBMS GW 802, more specifically, an MBMS CP 802-1, in step ST2201, informs the contents of a physical channel (referred to as a main PMCH) which is transmitted via a multi-cell transmission scheme in an MBSFN synchronization area to an MCE 801. Since the main PMCH is transmitted via a multi-cell transmission scheme in an MBSFN synchronization area, the same information needs to be transmitted by using the same radio resources from a base station in the MBSFN synchronization area. Therefore, the MBMS GW informs scheduling information such as radio resources (a frequency, a time, etc.), as well as the notification of the contents of the main PMCH in step ST2201.

Figure 65:
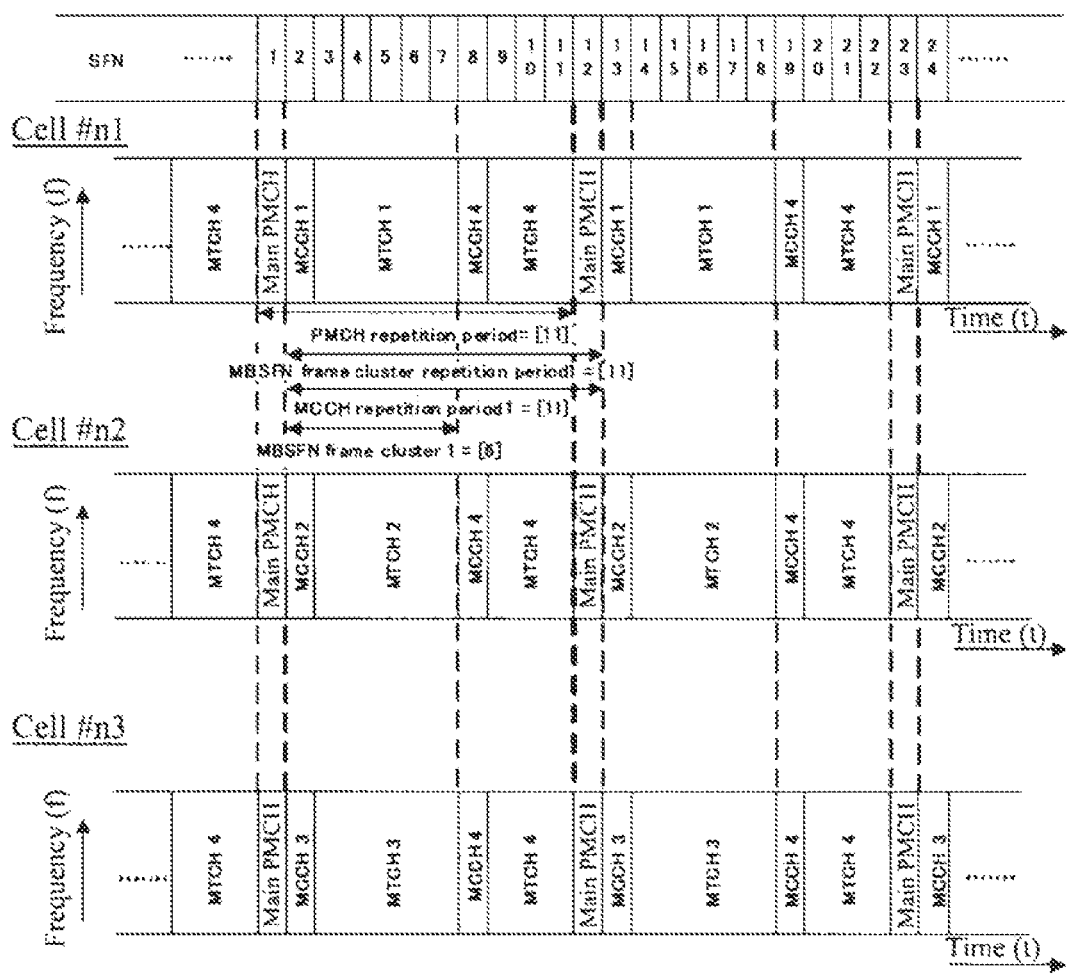
FIG. 65 is an explanatory drawing showing the configuration of a main PMCH in an MBSFN synchronization area.

FIG. 65 is an explanatory drawing showing the configuration of the main PMCH in an MBSFN synchronization area. FIG. 65 shows a case where PMCHs respectively provided for MBSFN areas are multiplexed by using time division multiplexing and code division multiplexing. A cell #n1 is one located in an MBSFN area 1, a cell #n2 is one located in an MBSFN area 2, and a cell #n3 is one located in an MBSFN area 3. Furthermore, the cells #1, #2, and #3 also belong to an MBSFN area 4. Code division multiplexing of the PMCHs of the MBSFN areas 1, 2, and 3 is carried out, and time division multiplexing of the PMCHs of the MBSFN areas 1, 2, and 3 and the PMCH of the MBSFN area 4 is carried out. Time division multiplexing of the main PMCH and the PMCH of each MBSFN area is carried out. In the cell #n1, time division multiplexing of the PMCH1 and the PMCH4 is carried out and time division multiplexing of the main PMCH and them is further carried out because the cell #n1 belongs to the MBSFN area 1 and the MBSFN area 4. The same goes for each of the cells #2 and #3. Because the main PMCH is transmitted via a multi-cell transmission scheme in the MBSFN synchronization area, it is transmitted on an MBSFN subframe which is SFN-combined. A set of MBSFN frames to which MBSFN subframes are allocated is referred to as an "MBSFN frame cluster". In the MBMS dedicated cell, all subframes in an MBSFN frame can be MBSFN subframes used for multi-cell transmission. The length of each of the repetition periods at which the main PMCH is repeated is expressed to as the main PMCH repetition period.

An MCH which is a transport channel for MBMS is mapped onto the main PMCH. An MCCH which is a logical channel used for MBMS control information and an MTCH which is a logical channel used for MBMS data are mapped onto the MCH. The MCCH and the MTCH can be divided in time and mapped onto the main PMCH, and can be further divided in time and mapped onto a physical area which is transmitted via a multi-cell transmission scheme. For example, the MCCH and the MTCH can be mapped onto different MBSFN subframes which are the physical area onto which they are mapped as a result. The MCCH can be mapped onto each MBSFN frame cluster via which the main PMCH is transmitted, or only the MTCH can be mapped onto the MBSFN frame clusters. In a case in which only the MTCH exists in the main PMCH, the repetition period of the MCCH differs from the repetition period of the main PMCH. Furthermore, there is a case in which a plurality of MCCHs are mapped onto the MBSFN frame clusters via which the main PMCH is transmitted.

In FIG. 65, MCCH1 is MBMS control information for the MBSFN area 1, and MTCH1 is MBMS data for the MBSFN area 1. MCCH2 is MBMS control information for the MBSFN area 2, and MTCH2 is MBMS data for the MBSFN area 2. MCCH3 is MBMS control information for the MBSFN area 3, and MTCH3 is MBMS data for the MBSFN area 3. MCCH4 is MBMS control information for the MBSFN area 4, and MTCH4 is MBMS data for the MBSFN area 4. The MCCHs can be mapped onto the PMCHs respectively, or only the MTCHs can be mapped onto the PMCHs respectively. In the case in which only the MTCHs exist in the PMCHs respectively, the MCCH of each MBSFN area can be mapped onto the main PMCH. As an alternative, the MCCH of each MBSFN area can be included as an information element of the MCCH mapped onto the main PMCH. Because the main PMCH is transmitted via a multi-cell transmission scheme in the MBSFN synchronization area, the main PMCH cannot be multiplied by an MBSFN-area-specific scrambling code in such a way that the PMCH is scrambled in each MBSFN area. This is because the main PMCH is transmitted from a cell in a different MBSFN area at the same time, and therefore, when the main PMCH is multiplied by an MBSFN-area-specific scrambling code, the phase of this main PMCH transmitted from each MBSFN area becomes random in the receiver of each mobile terminal, and the receiver becomes unable to carry out SFN combining of the main PMCH. Therefore, as shown above, by carrying out time division multiplexing of the main PMCH and the PMCH of each MBSFN area, the multiplication by the scrambling code specific to each MBSFN area can be carried out on a per subframe basis while the multiplication of only the main PMCH by the scrambling code specific to each MBSFN area can be avoided. As a result, the main PMCH can be transmitted via a multi-cell transmission scheme in the MBSFN synchronization area, and, even if each mobile terminal is receiving or trying to receive any MBMS service in this MBSFN synchronization area, the mobile terminal can receive the main PMCH and can also acquire an SFN gain. The main PMCH is not multiplied by the scrambling code specific to each MBSFN area, as mentioned above, though the main PMCH can be multiplied by the MBSFN synchronization area specific scrambling code. In this case, the interference from any cell in any other MBSFN synchronization area can be suppressed, and receive errors detected in the MBMS service received by each mobile terminal can be reduced. The MBSFN synchronization area specific scrambling code can be defined statically (Static) or semi-statically (Semi-Static), and can be then mapped onto the BCCH from the serving base station and informed to each of the mobile terminals in step ST1705.

Furthermore, the scheduling of the radio resources (a frequency, a time, etc.) of the main PMCH in step ST2201 of FIG. 64 will be explained. A frequency, a band, etc. are provided as a concrete example of the scheduling of the frequency. A concrete example of the scheduling of the time will be explained with reference to FIG. 65. Hereafter, it will be considered that the starting point value of the time when the main PMCH is mapped and the main PMCH repetition period length are informed for the scheduling of the main PMCH. More concretely, an SFN (System Frame Number) is used for the indication of the starting point value. A concrete computation expression for calculating the starting point value of the main PMCH is given as follows. The starting point value of the main PMCH=(the SFN number of the leading one of system frames onto which the main PMCH is mapped) mod (the main PMCH repetition period length)

In FIG. 65, the starting point value of the main PMCH is 1 mod 11=1, 12 mod 11=1, or . . . , and the parameters of the scheduling of the main PMCH are the main PMCH repetition period length 1 of "11" and the main PMCH starting point value of "1".

Next, a concrete example of the contents of the main PMCH in step ST2201 of FIG. 64 will be explained. As a concrete example of the information informed via the main PMCH, the numbers (IDs or identifiers) of all the MBSFN areas existing in the MBSFN synchronization area, the scheduling of the MCCH of each MBSFN area, DRX information, etc. can be provided. Because an explanation of the details of the DRX information is the same as that shown in Embodiment 11, the explanation of the details of the DRX information will be omitted hereafter. The DRX information can be transmitted via the MCCH of each MBSFN area, and the same advantages can be provided. As an alternative, the DRX information can be mapped onto the BCCH of the serving cell and transmitted to each of the mobile terminals in step ST1705 of FIG. 17, and the same advantages can be provided. Furthermore, even when the DRX information is determined statically, the same advantages can be provided. When the DRX information is determined statically, because it becomes unnecessary to broadcast the DRX information from the network side to each of the mobile terminals, there can be provided an advantage of making effective use of the radio resources. The scheduling of the MCCH of each MBSFN area is also carried out, like in the case of Embodiment 11. In FIG. 65, the scheduling information (parameters) of the MCCH of the MBSFN area 1 are the MCCH repetition period 1 of "11" and the MCCH starting point value 1 of "2". The scheduling information (parameters) of the MCCH of each of the MBSFN areas 2, 3, and 4 is the same as that of the MBSFN area 1. By mapping the MCCH schedulings of all the MBSFN areas in the MBSFN synchronization area onto the main PMCH, it becomes able to transmit the main PMCH via a multi-cell transmission scheme in the MBSFN synchronization area.

The MCE, in step ST2202 of FIG. 64, receives the contents and scheduling information of the main PMCH from the MBMS GW. The MCE, in step ST2203, transmits the contents and scheduling information of the main PMCH to each base station belonging to an MBSFN area which the MCE controls. Each base station, in step ST2204, receives the contents and scheduling information of the main PMCH. Each base station, in step ST2205, transmits the main PMCH according to the scheduling from the MCE.

Each of the mobile terminals, in step ST2206, makes a search for an MBMS. Each of the mobile terminals especially, in step ST2206, carries out timing synchronization. Prescribed information is mapped onto a part of the main PMCH. Accordingly, each of the mobile terminals establishes timing synchronization by carrying out blind detection of the prescribed information mapped on the above-mentioned main PMCH.

Prescribed information (or a symbol or a sequence) can be mapped onto a physical radio resource which is a part of the main PMCH. Accordingly, each of the mobile terminals can establish timing synchronization by carrying out blind detection of the prescribed information (or a symbol or a sequence) mapped onto the physical radio resource. As an alternative, the prescribed information (or a symbol or a sequence) can be mapped onto a physical radio resource adjacent in time to or separate in time by a fixed offset from the main PMCH. Accordingly, each of the mobile terminals can establish timing synchronization by carrying out blind detection of the prescribed information (or a symbol or a sequence) mapped onto the physical radio resource.

In Embodiment 11, the timing synchronization is carried out by using the P-SCH and S-SCH in a frequency layer dedicated to MBMS transmission. In contrast, in this Embodiment 12, the timing synchronization can be implemented without using the P-SCH and S-SCH. Therefore, the use of the MBMS search method in accordance with this Embodiment 12 makes it possible to reduce the P-SCH and S-SCH in a frequency layer dedicated to MBMS transmission (an MBMS-dedicated base station). Accordingly, there can be provided an advantage of making effective use of the radio resources. Each of the mobile terminals, in step ST2207, carries out reception and decoding of the main PMCH detected in step ST2206. Each of the mobile terminals receives all the MBSFN area IDs, the scheduling of the MCCH of each MBSFN area, and the DRX information which are mapped onto the main PMCH.

Furthermore, the information mapped onto the BCCH in Embodiment 11 includes the scheduling of the MCCH, the system bandwidth at f(MBMS), the number of transmission antennas at f(MBMS), and the SFN. In accordance with Embodiment 12, the MCCH scheduling is mapped onto the main PMCH. Furthermore, the scheduling of the MCCH, the system bandwidth at f(MBMS) and the number of transmission antennas at f(MBMS) are mapped onto the BCCH in each of the unicast cell and the unicast/MBMS mixed cell. By mapping the SFN onto the main PMCH, it becomes able to reduce the frequency of BCCH transmission from the frequency layer dedicated to MBMS transmission (the MBMS dedicated cell). Accordingly, there can be provided an advantage of making effective use of the radio resources. Furthermore, it becomes unnecessary to receive the BCCH which is a channel different from the main PMCH in order to receive the SFN. Therefore, there can be provided an advantage of reducing the control load on each of the mobile terminals, reducing the control delay time occurring in each of the mobile terminals, and achieving low power consumption in each of the mobile terminals. Because the processes in step ST1726 and subsequent steps of FIG. 18 are the same as those of Embodiment 11, the detailed explanation of them will be omitted hereafter. The control information for MBMS service which each of the mobile terminals, in step ST1729 of FIG. 19, acquires by receiving and decoding the MCCH of each MBSFN area includes MBMS area information and a parameter for discontinuous reception at the time of MBMS reception. As a concrete example of the MBMS area information, there can be considered information about the frame structure of each area (i.e., the structure of an MBSFN frame cluster and an MBSFN subframe), service contents, and modulation information about the MTCH, etc.

Steps ST1723 to ST1725 of FIG. 18 explained in Embodiment 11 can be used. In this case, the scheduling information of the main PMCH can be notified, instead of the scheduling of the MCCH shown in Embodiment 11, by using the BCCH from the frequency layer dedicated to MBMS transmission. Accordingly, the blind detection in step ST2206 of FIG. 64 becomes unnecessary. As a result, there can be provided an advantage of reducing the processing load on each of the mobile terminals, and achieving low power consumption in each of the mobile terminals.

Next, variant 1 of this Embodiment will be explained. In Embodiment 12, the service contents of each MBSFN area are included in the MBMS area information in the MCCH. As an alternative, the service contents of each MBSFN area, as well as the scheduling of the MCCH, can be informed by using the main PMCH. As a result, each mobile terminal (user) can grasp the service contents of each MBSFN areas at the time of decoding the main PMCH. As a result, because each mobile terminal can determine whether a desired service exists before receiving and decoding the MCCH and does not have to carry out the process of receiving and decoding the MCCH of any MBSFN area in which the desired service is ongoing, there can be provided an advantage of reducing the control delay time occurring in each mobile terminal. Concretely, each mobile terminal, in step ST2207 of FIG. 64, receives the service contents of each MBSFN area. Accordingly, each mobile terminal can grasp the service contents of each MBSFN area. After that, each mobile terminal searches for an MBSFN area in which the service which the user desires is ongoing prior to step ST1729 of FIG. 19. When an MBSFN area in which the service which the user desires is ongoing exists, each mobile terminal carries out step ST1729 according to the MCCH scheduling of the MBSFN area so as to receive the MCCH of the MBSFN area. In contrast, when an MBSFN area in which the service which the user desires is ongoing does not exist, each mobile terminal omits the processes of steps ST1729, ST1730, and ST1733 of FIG. 19, and then makes a transition to step ST1734.

Figure 66:
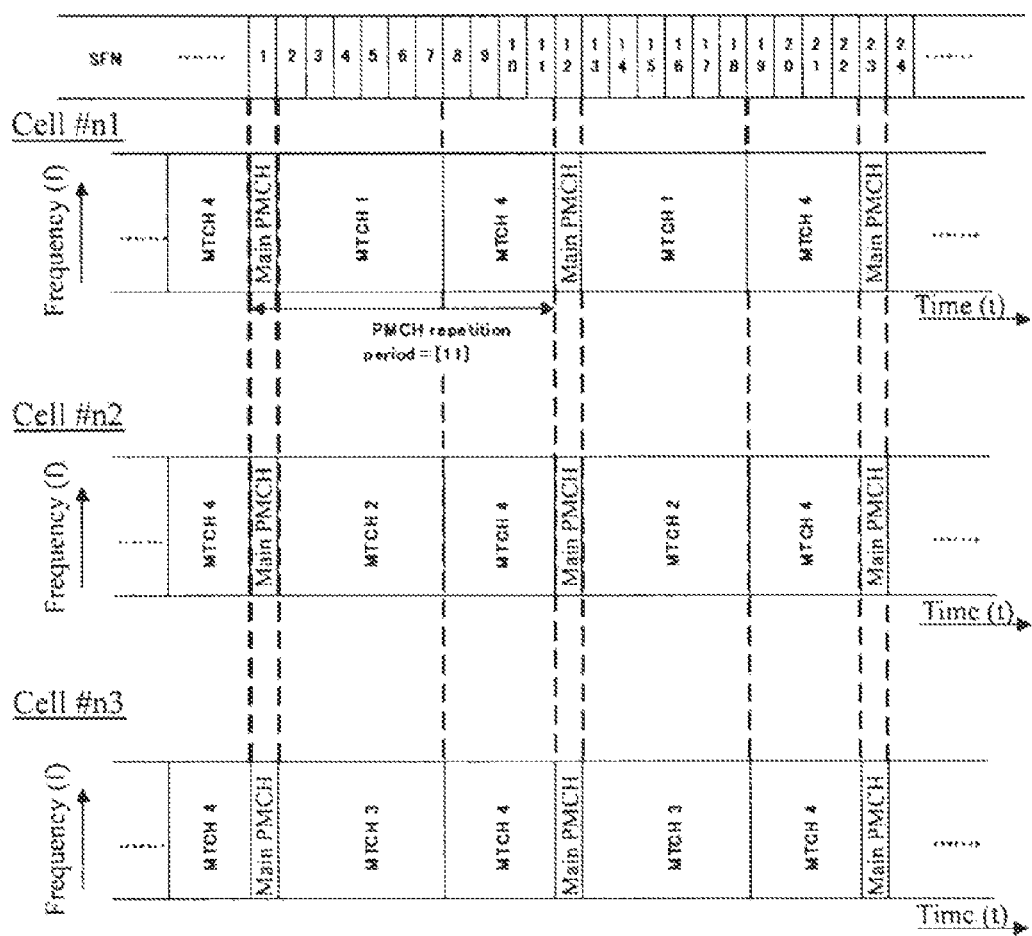
FIG. 66 is an explanatory drawing showing the configuration of a main PMCH in an MBSFN synchronization area.

Furthermore, the MBMS area information, and the parameter for discontinuous reception at the time of MBMS reception mapped, which are mapped onto each MCCH, can also be informed by using the main PMCH. As a result, the MCCH of each MBSFN area becomes unnecessary, and the efficiency of the radio resources can be improved (refer to FIG. 66). Therefore, it becomes unnecessary to inform the scheduling of the MCCH of each MBSFN area by using the main PMCH, and the efficiency of the radio resources can be further improved. Furthermore, because each mobile terminal does not have to receive the MCCH of each MBSFN area, there can be provided an advantage of reducing the load on each of the mobile terminals and achieving low power consumption in each of the mobile terminals.

Figure 67:
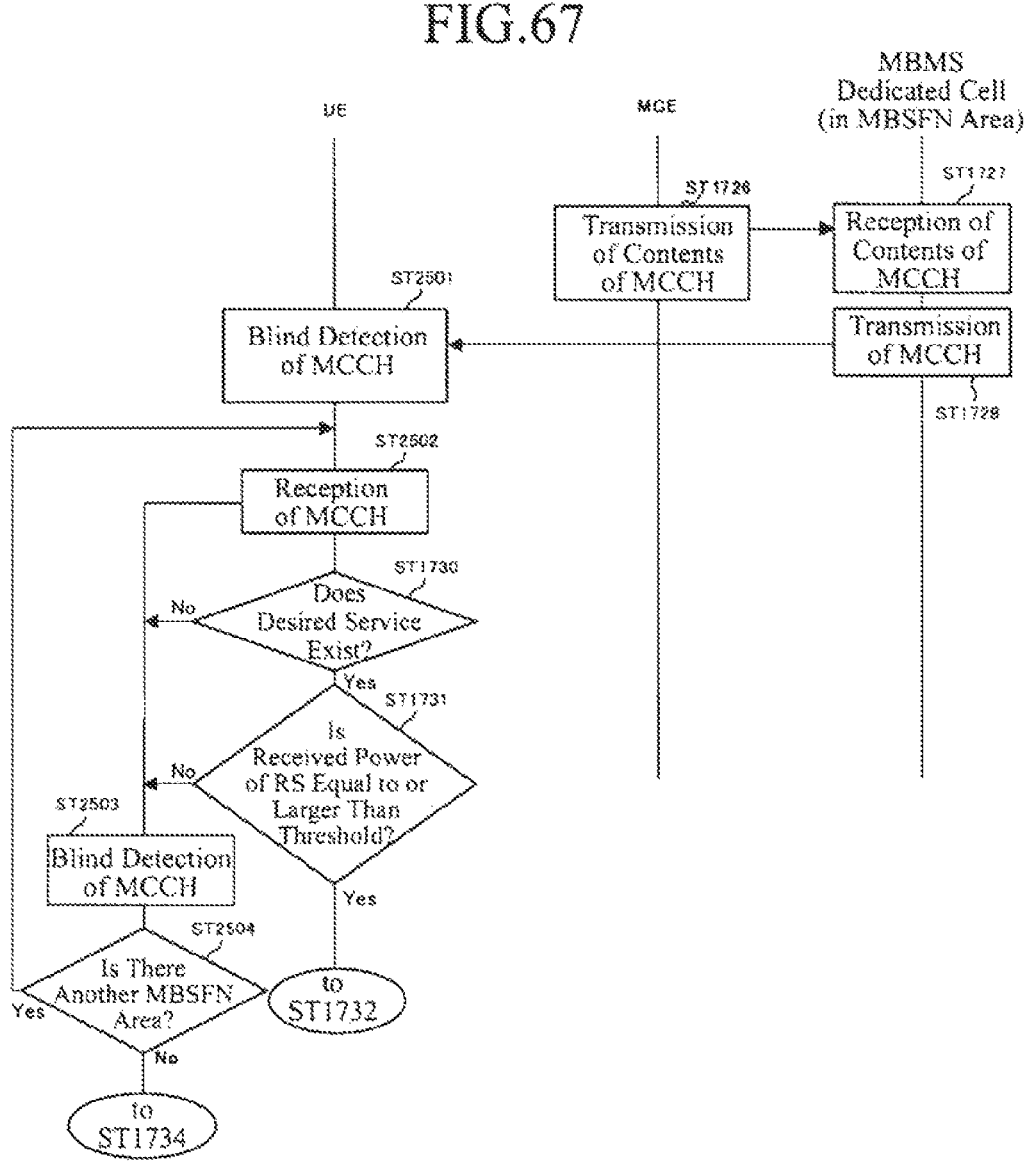
FIG. 67 is a flow chart showing the search method of searching for an MBMS which is explained in Embodiment 12.

Next, variant 2 of this Embodiment will be explained. Instead of steps ST2201 to ST2207 of FIG. 64 in Embodiment 12, the following processes are carried out in variant 2. A flow of processing carried out by a mobile communication system in accordance with this variant 2 is nearly the same as that explained in Embodiment 12. An explanation of the flow will be made focusing on a portion different from Embodiment 12. In variant 2, steps ST2201 to ST2207 of FIG. 64 are changed as shown in FIG. 67. Because an explanation of steps ST1726 to ST1728 is the same as that of steps ST1726 to ST1728 shown in FIGS. 18 and 19, the explanation of steps ST1726 to ST1728 of variant 2 will be omitted hereafter. Each of the mobile terminals, in step ST2501 of FIG. 67, makes a search for an MBMS. Each of the mobile terminals, in step ST2501, carries out timing synchronization. Prescribed information is mapped onto a part of the MCCH of each MBSFN area. Accordingly, each of the mobile terminals establishes timing synchronization by carrying out blind detection of the prescribed information about each MBSFN area. Prescribed information (or a symbol or a sequence) is mapped onto a physical radio resource which is a part of an MBSFN subframe onto which the MCCH of each MBSFN area is mapped. Accordingly, each of the mobile terminals can establish timing synchronization by carrying out blind detection of the prescribed information (or a symbol or a sequence) mapped onto the physical radio resource. As an alternative, the prescribed information (or a symbol or a sequence) can be mapped onto a physical radio resource adjacent in time to or separate in time by a fixed offset from the MCCH of each MBSFN area. Accordingly, each of the mobile terminals can establish timing synchronization by carrying out blind detection of the prescribed information (or a symbol or a sequence) mapped onto the physical radio resource. The prescribed information used for the blind detection is not multiplied by a scrambling code specific to each MBSFN area. As a result, each of the mobile terminals becomes able to carry out the blind detection. Therefore, the multiplexing method of multiplexing MBSFN areas has a high degree of compatibility with this variant 2 when the multiplexing method is a time division multiplexing one (refer to FIG. 60). In Embodiment 11, the timing synchronization is carried out by using the P-SCH and S-SCH in a frequency layer dedicated to MBMS transmission. In contrast, in this Embodiment 12, the timing synchronization can be implemented without using the P-SCH and S-SCH. Therefore, the use of the MBMS search method in accordance with this Embodiment 12 makes it possible to reduce the P-SCH and S-SCH in a frequency layer dedicated to MBMS transmission (an MBMS-dedicated base station). Furthermore, in Embodiment 12, the timing synchronization is carried out by using the main PMCH. In contrast, in this variant 2, the timing synchronization is carried out by using the MCCH of each MBSFN area. As a result, the timing synchronization is carried out by using only the MCCH of an MBSFN area which each mobile terminal can receive at the current location (location). Therefore, as compared with Embodiment 11 and Embodiment 12, the frequency with which it is determined, in step ST1731, that each mobile terminal does not have high sensitivity enough to receive the MBMS service is reduced. As a result, there can be provided an advantage of being able to reduce the control delay time occurring in the mobile communication system. Each of the mobile terminals, in step ST2502 of FIG. 67, carries out reception and decoding of the MCCH of the MBSFN area detected in step ST2501. Each of the mobile terminals receives the control information for MBMS service which is mapped onto the MCCH. As an example of the control information, there are MBMS area information, a parameter for discontinuous reception at the time of MBMS reception, etc. As the MBMS area information, there can be considered the frame structure of each area (the structure of an MBSFN frame cluster and an MBSFN subframe), service contents, modulation information about the MTCH, etc.

Each of the mobile terminals, in step ST1730 of FIG. 19, checks service contents included in the MBMS area information. When the service which the user desires is ongoing in the MBMS area in question, each of the mobile terminals makes a transition to step ST1731. In contrast, when the service which the user desires is not ongoing in the MBMS area, each of the mobile terminals makes a transition to step ST2503. Each of the mobile terminals, in step ST1731, receives an RS with a radio resource of the MBSFN area in question, and measures the received power (RSRP) of the RS. Each of the mobile terminals then determines whether or not the received power is equal to or higher than a threshold determined statically or semi-statically. The fact that the received power is equal to or higher than the above-mentioned threshold shows that each of the mobile terminals has high sensitivity enough to receive the MBMS service, whereas the fact that the received power is lower than the threshold shows that each of the mobile terminals does not have high sensitivity enough to receive the MBMS service. When the received power is equal to or higher than the threshold, each of the mobile terminals makes a transition to step ST1732, whereas when the received power is lower than the threshold, each of the mobile terminals makes a transition to step ST2503. Each of the mobile terminals, in step ST2503, makes a search for an MBMS by using the same method as that shown in step ST2501. Each of the mobile terminals, in step ST2504, determines whether or timing synchronization is established with either another MBSFN area for which the determination that the desired service is not ongoing is made in step 1730, or another MBSFN area other than the MBSFN area for which the determination that each mobile terminal does not have high sensitivity enough to receive the MBMS service is made in step ST1731. In a case in which timing synchronization with another MBSFN area is established, each of the mobile terminals makes a transition to step ST2502. In contrast, in a case in which no timing synchronization with another MBSFN area is established, each of the mobile terminals makes a transition to step ST1734. Furthermore, the DRX information, the SFN and so on, which are mapped onto the main PMCH, can also be informed by using each MCCH. As a result, the main PMCH becomes unnecessary, and the efficiency of the radio resources can be improved.

Embodiment 13

Figure 68:
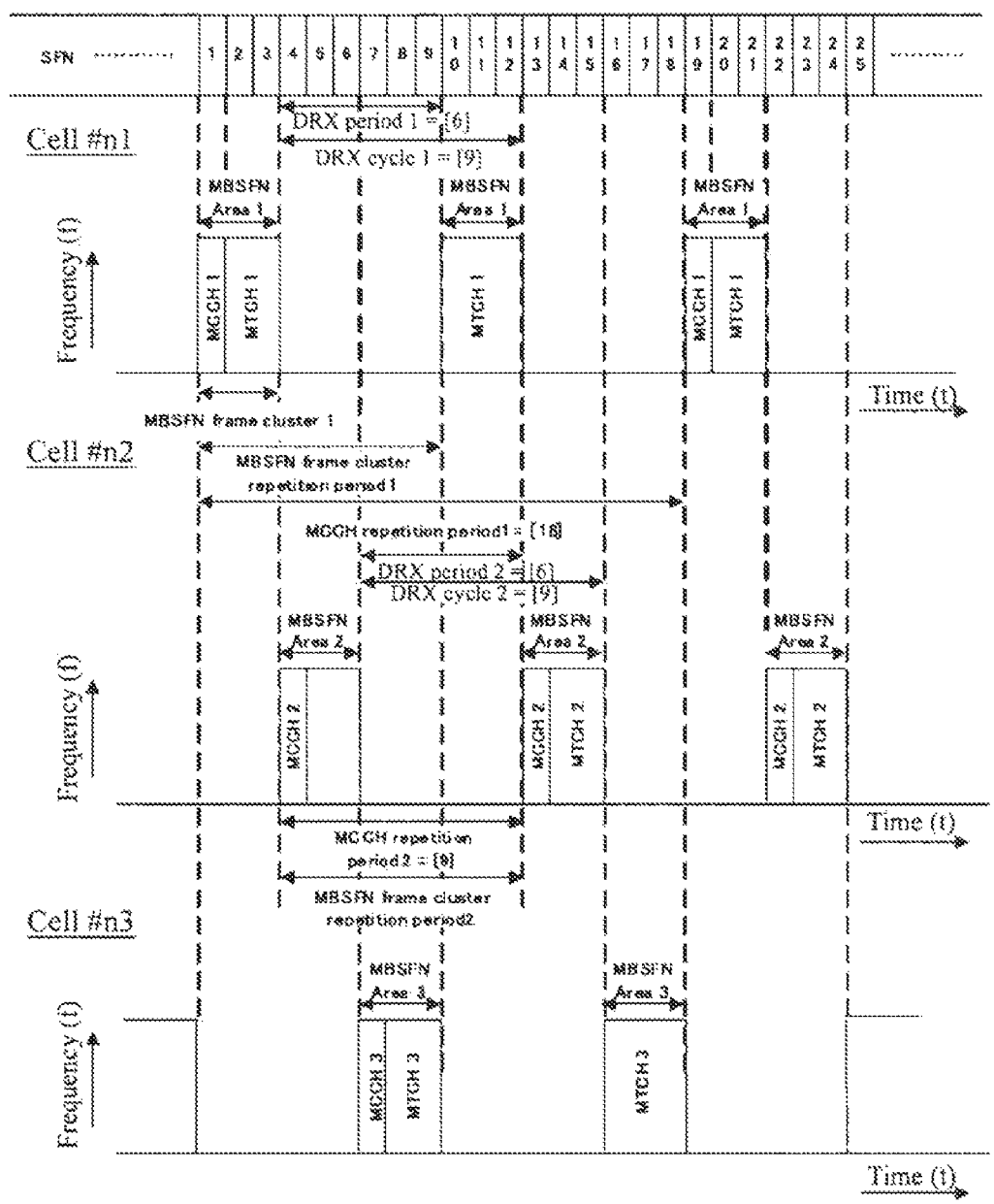
FIG. 68 is an explanatory drawing showing the configuration of a PMCH for each MBSFN area.

In this Embodiment 13, a mobile communication system which differs from that of Embodiment 11 mainly in DRX information will be disclosed. A flow of processing carried out by the mobile communication system in accordance with this Embodiment 13 is nearly the same as that shown in FIGS. 16 and 17 of Embodiment 11. An explanation of the flow will be made focusing on a portion different from Embodiment 11. In Embodiment 11, one DRX period is provided in an MBSFN synchronization area (refer to FIG. 62). In contrast, in this Embodiment 13, one DRX period is provided in an MBSFN area. A DRX period in accordance with this Embodiment 13 means a time period during which transmission of an MBMS service from a corresponding MBSFN area is in an off state. A concrete example of DRX information will be explained with reference to FIGS. 68 and 69. First, an explanation will be made with reference to FIG. 68. FIG. 68 is an explanatory drawing showing the configuration of a PMCH of each MBSFN area. The length of a DRX period and that of a DRX cycle for a mobile terminal currently receiving an MBMS service from an MBSFN area 1 are expressed as the DRX period length 1 and the DRX cycle length 1 respectively. A concrete example of parameters of the DRX information will be explained. Concretely, the DRX period length, the DRX cycle length, and a starting point value (DRX) can be considered as the parameters. The DRX period length 1 is "6" radio frames. Furthermore, the DRX cycle length 1 is "9" radio frames. In addition, an SFN is used for the indication of the starting point value (DRX) at which the DRX period starts. A concrete computation expression for calculating the starting point value (DRX) is given as follows.

The starting point value (DRX)=(the SFN number of the leading system frame at which the DRX period starts) mod (the DRX cycle length), and the starting point value 1 (DRX) is 4 mod 9=4, 13 mod 9=4, or . . . .

The length of a DRX period and that of a DRX cycle for a mobile terminal currently receiving an MBMS service from an MBSFN area 2 are expressed as the DRX period length 2 and the DRX cycle length 2 respectively. The DRX period length 2 is "6" radio frames. Furthermore, the DRX cycle length 2 is "9" radio frames. The starting point value 2 (DRX) is 7 mod 9=7, 16 mod 9=7, or . . . . Similar DRX information is provided for a mobile terminal currently receiving an MBMS service from an MBSFN area 3.

Figure 69:
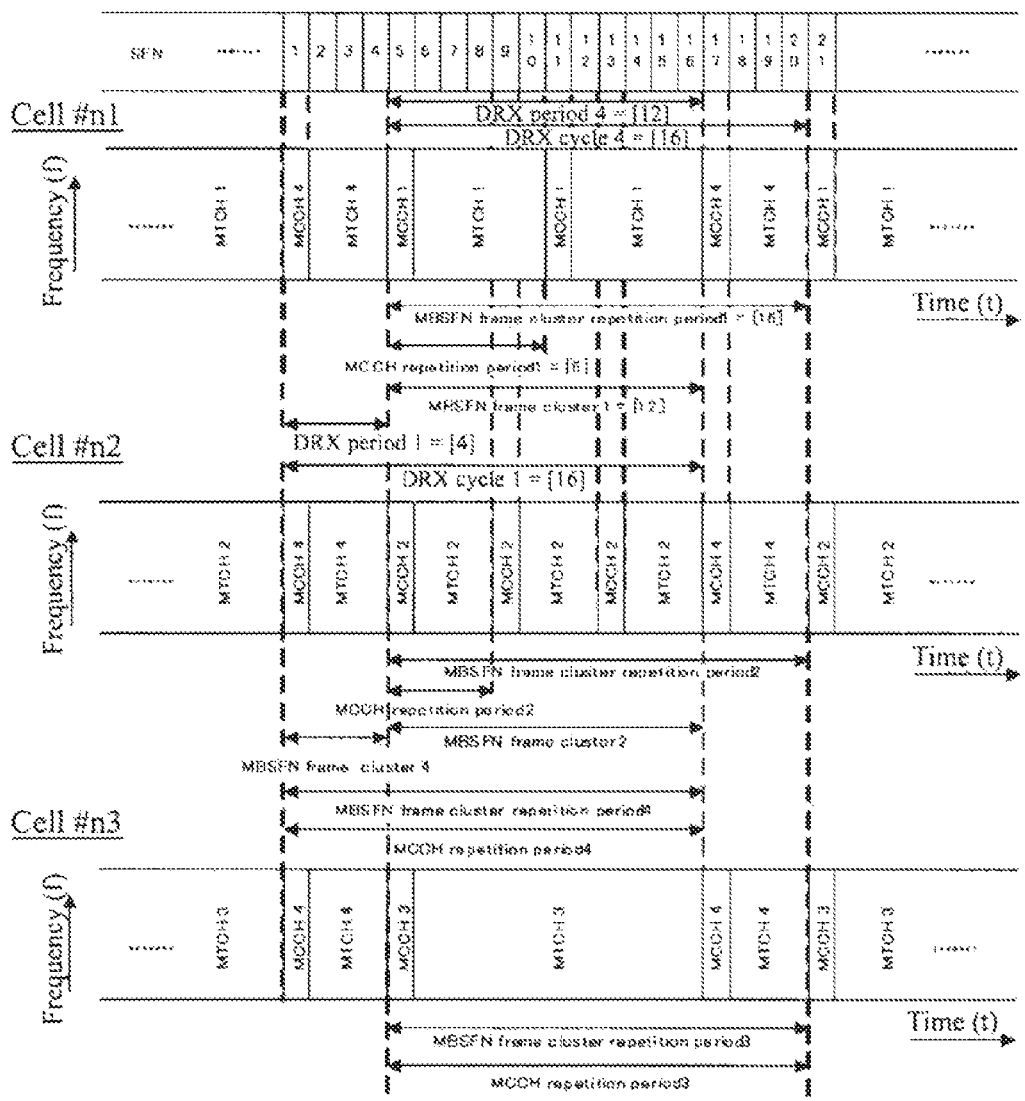
FIG. 69 is an explanatory drawing showing the configuration of a PMCH for each MBSFN area.

Next, an explanation will be made with reference to FIG. 69. The length of a DRX period and that of a DRX cycle for a mobile terminal currently receiving an MBMS service from the MBSFN area 1 are expressed as the DRX period length 1 and the DRX cycle length 1 respectively. The DRX period length 1 is "4" radio frames. Furthermore, the DRX cycle length 1 is "16" radio frames. The starting point value 1 (DRX) is 1 mod 16=1, 17 mod 16=1, or . . . . Similar DRX information is provided for a mobile terminal currently receiving an MBMS service from either the MBSFN area 2 or the MBSFN area 3. The length of a DRX period and that of a DRX cycle for a mobile terminal currently receiving an MBMS service from an MBSFN area 4 are expressed as the DRX period length 4 and the DRX cycle length 4 respectively. The DRX period length 4 is "12" radio frames. Furthermore, the DRX cycle length 4 is "16" radio frames. The starting point value 4 (DRX) is 5 mod 16=5, 21 mod 16=5, or . . . . Because in a case in which there is a main PMCH as explained in Embodiment 12, even a mobile terminal currently receiving an MBMS service of either of the MBSFN areas needs to receive the main PMCH, a time period during which the main PMCH is transmitted is removed from the DRX period of each MBSFN area.

Each mobile terminal becomes able to carry out a measurement of a unicast/mixed frequency layer by using a DRX period provided for each MBSFN area. Accordingly, there can be provided an advantage of being able to carry out management of the mobility of each mobile terminal via the unicast/mixed frequency layer even if each mobile terminal is receiving an MBMS service in a frequency layer dedicated to MBMS transmission comprised of an MBMS-dedicated base station for which no uplink exists, which is a challenge of the present invention.

Furthermore, in order to enable the length of each of periods at which to carryout a measurement of the unicast/mixed frequency layer, the length being informed from a network side, to be satisfied without transmitting information about the DRX cycle length and the DRX period length in the frequency layer dedicated to MBMS transmission, via one of routes, to a control device (a base station, an MME, a PDNGW, or the like) on a side of the unicast/mixed frequency layer and without interrupting the reception of the MBMS service, the following method will be disclosed in the present invention, like in the case of Embodiment 11.

One or more measurement periods in the unicast/mixed frequency layer are made to be included in a DRX period in the frequency layer dedicated to MBMS transmission. As a result, even if any measurement period length is informed (set) to each mobile terminal from a unicast cell or an MBMS/Unicast-mixed cell, when each mobile terminal carries out a measurement of the unicast/mixed frequency layer during the DRX period which is provided in the DRX cycle in the frequency layer dedicated to MBMS transmission, the measurement period length informed from the network side can be satisfied. By using this method, any control device of an MBMS transmission dedicated cell (a base station, an MCE, an MBMS gateway, an eBNSC, or the like) does not have to inform the DRX cycle length and the DRX period length in the MBMS transmission dedicated cell to control devices of a unicast cell and an MBMS/Unicast-mixed cell. Therefore, there is provided an advantage of enabling a mobile terminal currently receiving an MBMS service in a frequency layer dedicated to MBSFN transmission to carry out a measurement at measurement periods of a length which a unicast cell or an MBMS/Unicast-mixed cell has informed (set) to the mobile terminal without interrupting the reception of the MBMS service, while preventing the mobile communication system from becoming complicated, that is, avoiding addition of signaling onto the wireless interface or into the network. The DRX cycle in the frequency layer dedicated to MBSFN transmission has a length which is either a minimum of the measurement period length which can be provided in the unicast/mixed frequency cell, or an integral submultiple of the minimum. In a case in which the measurement period length which can be set to a mobile terminal currently receiving an MBMS service in the frequency layer dedicated to MBMS transmission differs from the measurement period length which can be provided in the unicast/mixed frequency layer, the DRX cycle has a length which is equal to that of the measurement period length which can be set to a mobile terminal currently receiving an MBMS service in the frequency layer dedicated to MBMS transmission, which is a minimum of the above-mentioned measurement period length, or which is an integral submultiple of the minimum of the above-mentioned measurement period length. Accordingly, a problem of the present invention can be solved.

Each mobile terminal, in step ST1729 of FIG. 19, receives DRX information. Because the DRX information differs for each MBSFN area, the mapping of the DRX information onto an MCCH of each MBSFN area can prevent each mobile terminal from receiving unnecessary information (the DRX information of another MBSFN area). As a result, there can be provided an advantage of reducing the processing load on each mobile terminal, and achieving low power consumption in each mobile terminal. However, the mapping of the DRX information onto either a BCCH in the frequency layer dedicated to MBMS transmission or the main PMCH can provide the same advantages as those provided by Embodiment 13.

Compared with the mobile communication system disclosed in Embodiment 11, the mobile communication system in accordance with Embodiment 13 can provide the following advantages. In Embodiment 11, one DRX period is provided in an MBSFN synchronization area (refer to FIG. 62). In accordance with the method in accordance with Embodiment 11, a DRX period is defined as a time period during which the transmission of an MBMS service from any of all MBSFN areas in an MBSFN synchronization area is in an off state. In contrast, in accordance with Embodiment 13, a DRX period is provided for each MBSFN area. More specifically, a DRX period 1 of an MBSFN area 1 is defined as a time period during which any MBMS service is in an off state in the MBSFN area 1 while the DRX period 1 is a time period during which any MBMS service can be carried out in another MBSFN area 2. That is, it is not necessary to turn off MBMS services in all MBSFN areas in an MBSFN synchronization area. Therefore, compared with Embodiment 11, Embodiment 13 can provide the advantage of making further effective use of the radio resources.

Figure 70:
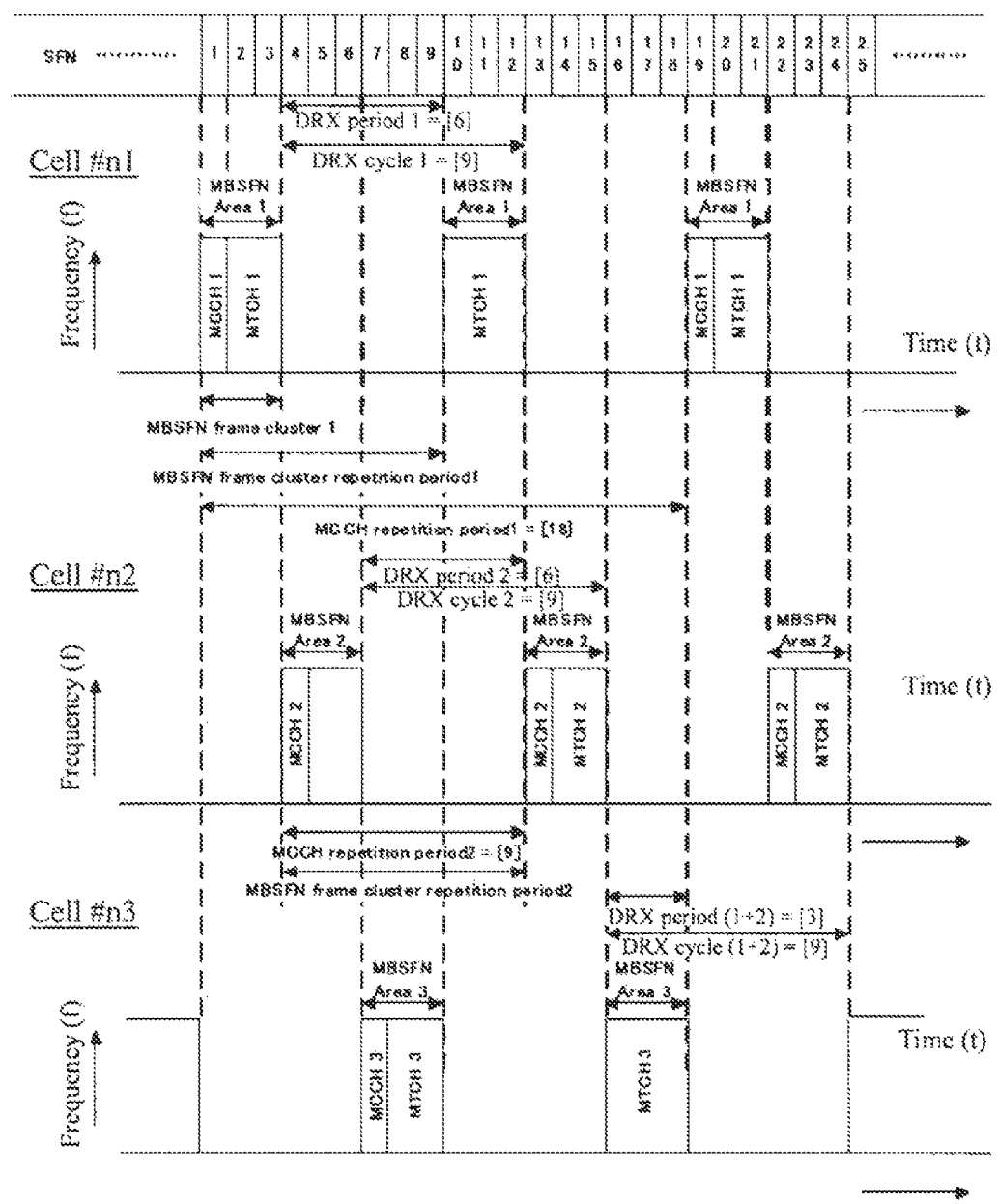
FIG. 70 is an explanatory drawing showing the configuration of a PMCH for each MBSFN area.

Next, variant 1 of this Embodiment will be explained. Since one DRX period is provided in an MBSFN synchronization area in Embodiment 11, each mobile terminal becomes able to simultaneously receive MBMS data from MBSFN areas in an MBSFN synchronization area without adding any control. In other words, when simultaneously receiving an MBMS service from each MBSFN area, each mobile terminal (user) can freely select a method of combining MBSFN areas. However, in accordance with Embodiment 13, each mobile terminal cannot simultaneously receive MBMS services from MBSFN areas. A concrete example will be explained with reference to FIG. 70. The length of a DRX period and that of a DRX cycle for a mobile terminal currently receiving an MBMS service from an MBSFN area 1 are expressed as the DRX period length 1 and the DRX cycle length 1 respectively. The DRX period length 1 is "6" radio frames. Furthermore, the DRX cycle length 1 is "9" radio frames. The starting point value 1 (DRX) at which the DRX period starts is equal to "4". When a mobile terminal carries out a measurement of a unicast/mixed frequency layer by using the DRX period length 1, like in the case of Embodiment 11, the mobile terminal cannot receive any MBMS service from each of an MBSFN area 2 and an MBSFN area 3, which is transmitted from a base station during a time period which overlaps the DRX period 1. Similarly, a mobile terminal currently receiving an MBMS service from the MBSFN area 2 cannot receive any MBMS service from each of the MBSFN area 1 and the MBSFN area 3 when carrying out a measurement of the unicast/mixed frequency layer by using the method in accordance with Embodiment 13. The same goes for a mobile terminal currently receiving an MBMS service from the MBSFN area 3.

As to a problem that each mobile terminal cannot simultaneously receive an MBMS service from each MBSFN area in a case in which one DRX period is provided in each MBSFN area, a solution will be disclosed as follows. The network side informs simultaneously-receivable MBSFN areas to each mobile terminal. Furthermore, the network side transmits the DRX information of each of the simultaneously-receivable MBSFN areas to each mobile terminal. A concrete example of the DRX information will be explained with reference to FIG. 70. In a case in which each mobile terminal receives an MBMS service from each of the MBSFN area 1 and the MBSFN area 2, the DRX period has a length equal to the DRX period lengths (1+2)=[3]. In this case, the DRX cycle has a length equal to the DRX cycle lengths (1+2)=[9]. Furthermore, the starting point value (1+2) (DRX) at which the DRX period starts is 7 mod 9=7 or 16 mod 9=7, and the starting point value 1+2 (DRX) is equal to [7]. In a case in which each mobile terminal receives an MBMS service from each of the MBSFN area 1 and the MBSFN area 3, the DRX period has a length equal to the DRX period lengths (1+3)= [3]. In this case, the DRX cycle has a length equal to the DRX cycle lengths (1+3)=[9]. Furthermore, the starting point value (1+3) (DRX) at which the DRX period starts is 4 mod 9=4 or 13 mod 9=4, and the starting point value (1+3) (DRX) is equal to [4].

Each mobile terminal, in step ST1729 of FIG. 19, receives the DRX information. A concrete example of the DRX information which each mobile terminal receives in step ST1729 is summarized in FIG. 71. FIG. 71[a] shows a concrete example of the DRX information mapped onto the MCCH of the MBSFN area 1. FIG. 71[b] shows a concrete example of the DRX information mapped onto the MCCH of the MBSFN area 2. FIG. 71[c] shows a concrete example of the DRX information mapped onto the MCCH of the MBSFN area 3. In this case, each of the DRX period length and the DRX cycle length is expressed as a number of subframes. As an alternative, each of them can be expressed as a number of elements other than subframes. Furthermore, the starting point value (DRX) is expressed as an SFN number. As an alternative, the starting point value can be set by using another specifying method.

Furthermore, in order to enable the length of each of periods at which to carry out a measurement of the unicast/mixed frequency layer, the length being informed from the network side, to be satisfied without sending information about the DRX cycle length and the DRX period length in the frequency layer dedicated to MBMS transmission, via one of routes, to a control device (a base station, an MME, a PDNGW, or the like) on a side of the unicast/mixed frequency layer and without interrupting the reception of the MBMS service, the following method will be disclosed in the present invention, like in the case of Embodiments 11 and 13. One or more measurement periods in the unicast/mixed frequency layer are made to be included in a DRX period in the frequency layer dedicated to MBMS transmission. Furthermore, the DRX cycle in the frequency layer dedicated to MBSFN transmission has a length which is either a minimum of the measurement period length which can be provided in the unicast/mixed frequency cell, or an integral submultiple of the minimum. In a case in which the measurement period length which can be set to a mobile terminal currently receiving an MBMS service in the frequency layer dedicated to MBMS transmission differs from the measurement period length which can be provided in the unicast/mixed frequency layer, the DRX cycle has a length which is equal to that of the measurement period length which can be set to a mobile terminal currently receiving an MBMS service in the frequency layer dedicated to MBMS transmission, which is a minimum of the above-mentioned measurement period length, or which is an integral submultiple of the minimum of the above-mentioned measurement period length. Accordingly, the problem of the present invention can be solved.

Since the network side transmits the information about simultaneously-receivable MBSFN areas to each mobile terminal, each mobile terminal can simultaneously receive an MBMS service from each MBSFN area. The network side can provide an advantage of being able to solve the problem of the present invention by transmitting, as well as the information about simultaneously-receivable MBSFN areas, the DRX information at that time to each mobile terminal.

In this variant 1, the method of mapping the information about simultaneously-receivable MBSFN areas and the DRX information at that time onto the MCCH of each MBSFN area is disclosed. Instead of mapping the information about simultaneously-receivable MBSFN areas and the DRX information at that time onto the MCCH of each MBSFN area, they can be mapped onto the BCCH in the frequency layer dedicated to MBMS transmission. In this case, the same advantages as provided by variant 1 can be offered. As an alternative, the information about simultaneously-receivable MBSFN areas and the DRX information at that time can be mapped onto the main PMCH. In this case, the same advantages as provided by variant 1 can be offered.

Variant 2

Figures 72, 73:
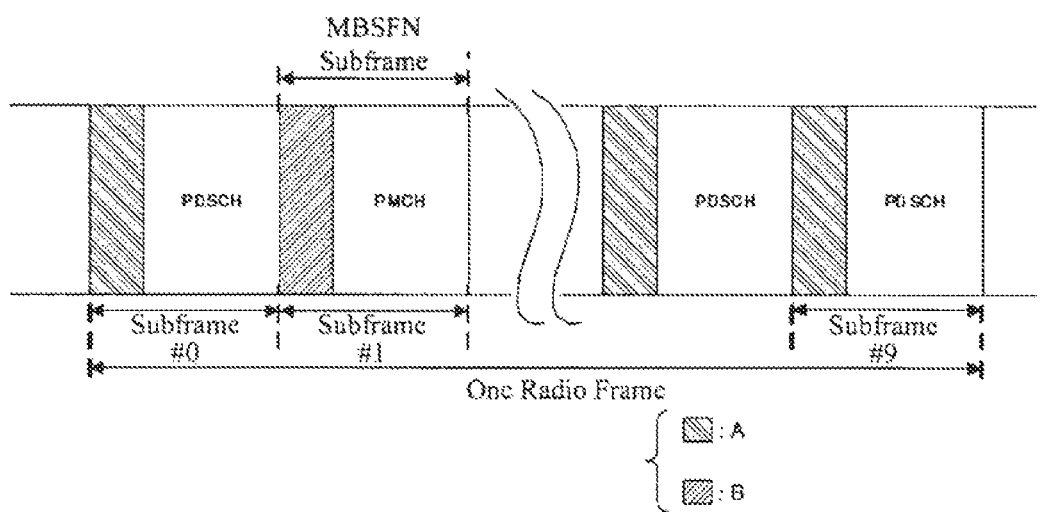
FIG. 72 is an explanatory drawing showing an example of discontinuous reception information.
FIG. 73 is an explanatory drawing showing a problem of the present invention.

As to the problem that each mobile terminal cannot simultaneously receive an MBMS service from each MBSFN area in a case in which one DRX period is provided in each MBSFN area, a solution different from variant 1 will be disclosed as follows. The network side transmits the DRX information of each MBSFN area to each mobile terminal, and each mobile terminal determines the DRX information of an MBSFN area from which each mobile terminal desires to receive simultaneously. Each mobile terminal, in step ST1729, receives the DRX information. FIG. 72 shows a concrete example of the DRX information mapped onto the MCCH of each MBSFN area which is transmitted from the network side to each mobile terminal in variant 2 in the case of FIG. 70. As a concrete example of the DRX information, the MBSFN area number (ID), the service contents, the MBSFN frame cluster length, the MBSFN frame cluster repetition period length, and the starting point of the MBSFN frame cluster of each MBSFN area are informed. Accordingly, there can be provided an advantage of enabling each mobile terminal to determine the DRX information. In this case, in addition to the DRX information, the service contents of each MBSFN area can be informed. Accordingly, there can be provided an advantage of enabling each mobile terminal to select an MBSFN area which the user desires and from which each mobile terminal receives simultaneously by receiving and decoding the MCCH from one MBSFN area.

Each mobile terminal, in step ST1730, determines the DRX information of an MBSFN area which the user of each mobile terminal desires and from which each mobile terminal receives simultaneously. A concrete example will be explained with reference to FIG. 72. For example, when the user of each mobile terminal desires simultaneous reception of a "weather forecast" service and a "news" service, each mobile terminal determines the DRX information in simultaneous reception of the MBSFN area 1 and the MBSFN area 2. A DRX period will be explained. In order to receive the MBSFN area 1 and the MBSFN area 2, a time period during which transmission of the MBSFN area 1 and that of the MBSFN area 2 are not carried out is expressed as a DRX period (1+2). A DRX cycle in which a DRX period (1+2)=3 is repeated will be explained with reference to FIGS. 70 and 72. In order to receive the MBSFN area 1 and the MBSFN area 2, a cycle in which a time period during which transmission of the MBSFN area 1 and that of the MBSFN area 2 are not carried out is repeated is expressed as a DRX cycle (1+2). The DRX cycle (1+2) has a length equal to the MBSFN frame cluster repetition period length 3, i.e., 9. The starting point of DRX will be explained. In order to receive the MBSFN area 1 and the MBSFN area 2, the starting point value of the period during which transmission of the MBSFN area 1 and that of the MBSFN area 2 are not carried out is expressed as the starting point (1+2)(DRX). The starting point (1+2)(DRX) is equal to 7.

Furthermore, in order to enable the length of each of periods at which to carryout a measurement of the unicast/mixed frequency layer, the length being informed from the network side, to be satisfied without sending information about the DRX cycle length and the DRX period length in the frequency layer dedicated to MBMS transmission, via one of routes, to a control device (a base station, an MME, a PDNGW, or the like) on a side of the unicast/mixed frequency layer and without interrupting the reception of the MBMS service, the following method will be disclosed. Each mobile terminal selects multiplexing of MBSFN areas in such a way that one or more measurement periods in the unicast/mixed frequency layer are included in a DRX period in the frequency layer dedicated to MBMS transmission. Each mobile terminal also selects multiplexing of MBSFN areas in such a way that the DRX cycle in the MBMS transmission dedicated cell has a length which is either a minimum of the measurement period length which can be provided in the unicast/mixed frequency layer, or an integral submultiple of the minimum. In other words, each mobile terminal determines the DRX information, and does not select any combination of MBSFN areas in which the DRX cycle does not satisfy the above-mentioned requirements. In a case in which the measurement period length which can be set to a mobile terminal currently receiving an MBMS service in the frequency layer dedicated to MBMS transmission differs from the measurement period length which can be provided in the unicast/mixed frequency layer, the DRX cycle has a length which is equal to that of the measurement period length which can be set to a mobile terminal currently receiving an MBMS service in the frequency layer dedicated to MBMS transmission, which is a minimum of the above-mentioned measurement period length, or which is an integral submultiple of the minimum of the above-mentioned measurement period length. Accordingly, the problem can be solved.

This variant 2 can provide the same advantages as those provided by variant 1. Furthermore, in a case in which the number of MBSFN areas is large and the number of combinations of MBSFN areas is large, variant 2 requires a smaller amount of DRX information which is transmitted from the network side to each mobile terminal as compared with variant 1. Accordingly, there can be provided an advantage of making effective use of the radio resources.

In this variant 2, the method of mapping the information about simultaneously-receivable MBSFN areas and the DRX information at that time onto the MCCH of each MBSFN area is disclosed. Instead of mapping the information about simultaneously-receivable MBSFN areas and the DRX information at that time onto the MCCH of each MBSFN area, they can be mapped onto the BCCH in the frequency layer dedicated to MBMS transmission. The same advantages as provided by variant 2 can be offered. As an alternative, the information about simultaneously-receivable MBSFN areas and the DRX information at that time can be mapped onto the main PMCH. In this case, the same advantages as provided by variant 2 can be offered.

Each of this Embodiment 13 and its variants can be applied to Embodiment 11 and the variants of this embodiment, and Embodiment 12 and the variants of this embodiment.

Embodiment 14

A problem to be solved by this invention will be explained with reference to FIG. 73. In FIG. 73, A denotes an L1/L2 signaling channel, and B denotes a resource for unicast transmission. Allocation of MBSFN subframes in an MBMS/unicast-mixed cell has been studied as disclosed in nonpatent reference 2. Multiplexing of a channel used for MBSFN (Multimedia Broadcast multicast service Single Frequency Network) and a channel used for other than MBSFN is carried out for each subframe, as disclosed in nonpatent reference 1. Hereafter, a subframe used for MBSFN transmission is referred to as an MBSFN subframe (MBSFN subframe). In the current 3GPP, it is determined that a mixed cell must not use one or two leading OFDM symbols of each subframe for unicast transmission in an MBSFN frame (subframe). In other words, anything other than one or two leading OFDM symbols is a resource dedicated to MBMS transmission. In FIG. 73, this resource is expressed as a PMCH. On the other hand, nonpatent reference 1 discloses that a PCH is mapped onto a PDSCH or a PDCCH. Nonpatent reference 1 also discloses that a paging group uses an L1/L2 signaling channel (PDCCH) and that a precise identifier (UE-ID) of a mobile terminal can be found on a PCH. Therefore, because a PCH uses an L1/L2 signaling channel, even an MBSFN frame can be mapped onto the PCH. On the other hand, in a case in which allocation of a downlink radio resource to the next control information using the PCH is carried out in an MBSFN frame, because the downlink radio resource in the same subframe is used exclusively for MBMS transmission, there arises a problem that the control information cannot be allocated to the same subframe.

Nonpatent reference 3 has the following description on transmission of a paging signal to a mobile terminal. A PICH (Paging Indicator channel) showing that a paging signal destined for a mobile terminal belonging to a paging group is occurring is transmitted by using an L1/L2 signaling channel. In order to determine whether or not the paging signal is the one destined therefor, the mobile terminal decodes the paging signal. The PCH can have one or more paging signals. The PICH is transmitted by using an L1/L2 signaling channel. In other words, the PICH is positioned at one to three leading OFDM symbols of each subframe. On the other hand, the PCH is mapped onto the PDSCH in the same subframes as those at which the PICH is positioned. The problem to be solved by the present invention also arises in the paging signal transmitting procedure disclosed in nonpatent reference 3. That is, in a case in which an MBSFN subframe is formed in an MBMS/unicast-mixed cell, the same subframes at those at which the PICH is positioned is a resource dedicated to MBMS transmission even if the PICH is transmitted with the one or two leading OFDM symbols of each of MBSFN subframes. Therefore, it is impossible to transmit the PCH onto which a paging signal for enabling each mobile terminal to determine whether or not the paging signal is destined therefor is mapped.

Nonpatent reference 4 has the following description about an equation used for determining a time when paging occurs (i.e., paging occasion: Paging occasion). This reference describes that in order to determine a paging occasion, two parameters: a paging interval length (corresponding to a discontinuous reception cycle length in a mixed frequency layer in accordance with the present invention), and the number of paging occasions during the paging interval are necessary, and there are no other necessary parameters. Furthermore, the reference describes that a subframe in a radio frame in which a paging occasion occurs has a fixed value. However, nonpatent reference 4 has no description about a method of determining a subframe in a radio frame for paging occasion onto which a paging signal is mapped. Furthermore, nonpatent reference 4 has no description about a relationship between a subframe in a radio frame for paging occasion and an MBSFN subframe.

OFDM symbols other than the one or two leading OFDM symbols of each MBSFN subframe are a resource dedicated to MBMS transmission. In a case in which a subframe in a radio frame for paging occasion is also a target for allocation of an MBSFN subframe, any OFDM symbols other than the one or two leading OFDM symbols of the MBSFN subframe are a resource dedicated to MBMS transmission and cannot be used for paging processing. Because MBSFN subframes are not taken into consideration at all in the conventional paging processing method, there arises a problem that it is impossible to apply the conventional paging processing method to paging processing in an MBMS/unicast-mixed cell. In order to solve this problem, in this Embodiment 14, a determining method of determining a radio frame for paging occasion in consideration of an MBSFN subframe will be disclosed.

Figure 1:
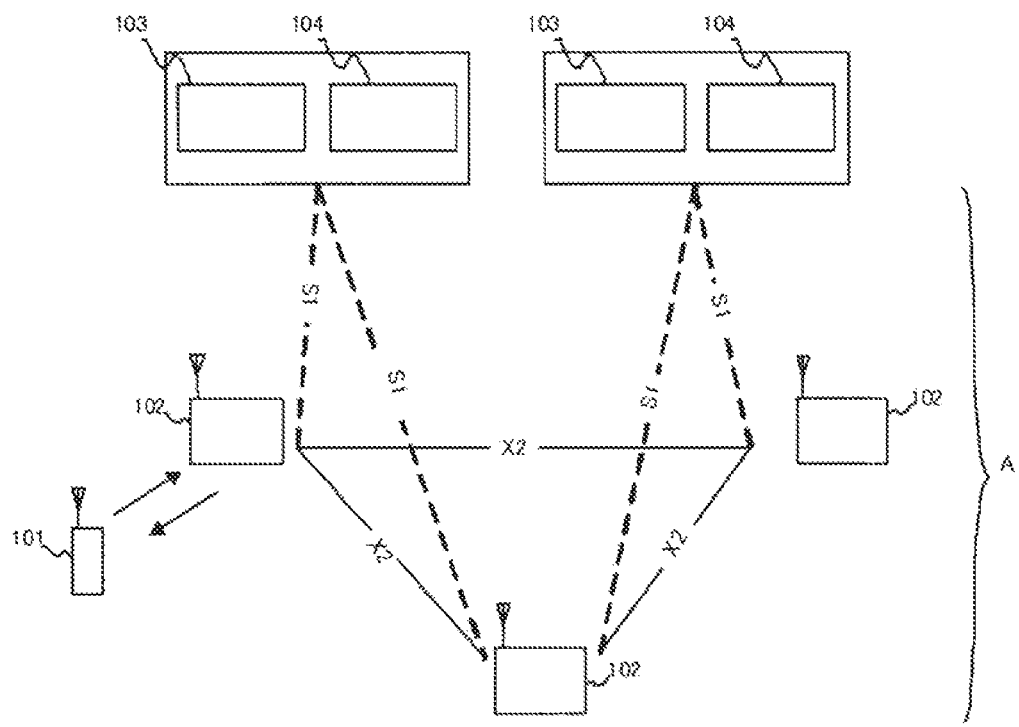
FIG. 1 is an explanatory drawing showing the configuration of a communication system which uses an LTE method.
Figure 2:
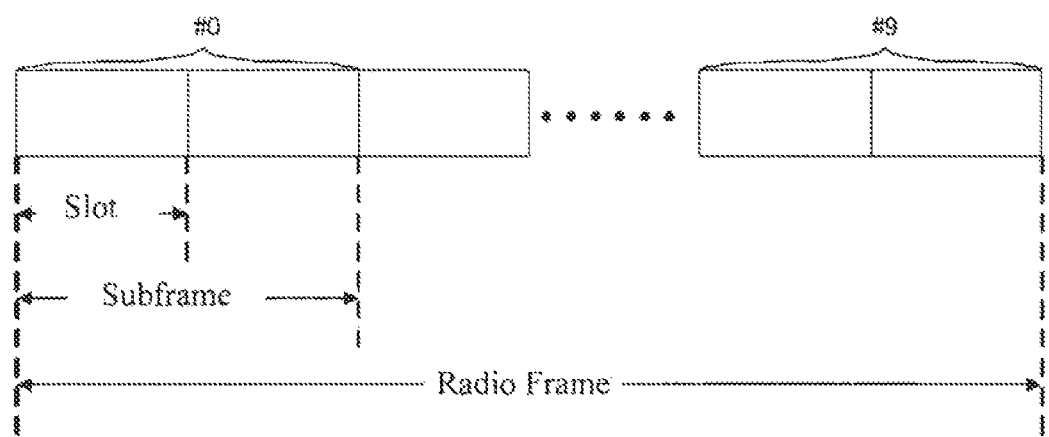
FIG. 2 is an explanatory drawing showing the configuration of a radio frame for use in the communication system which uses an LTE method.
Figure 3:
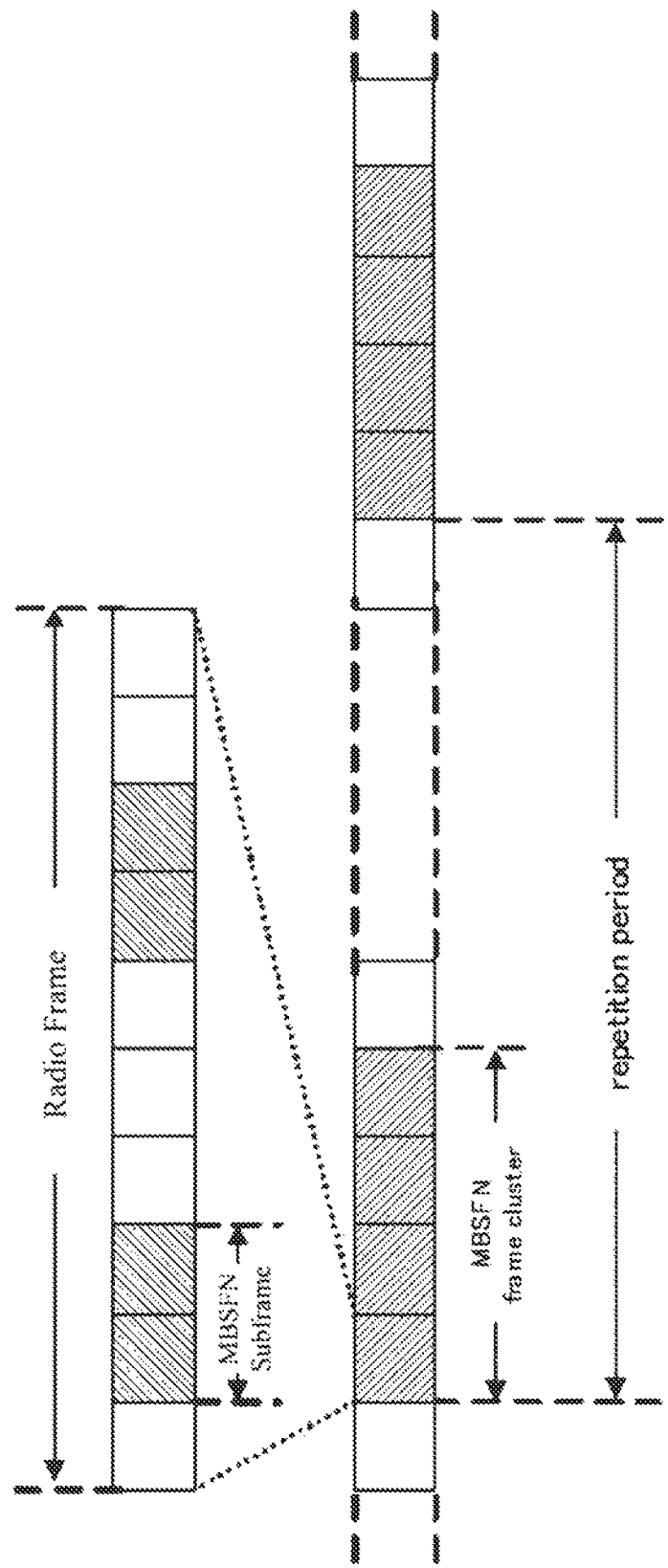
FIG. 3 is an explanatory drawing showing the configuration of an MBSFN (Multimedia Broadcast multicast service Single Frequency Network) frame.
Figure 4:
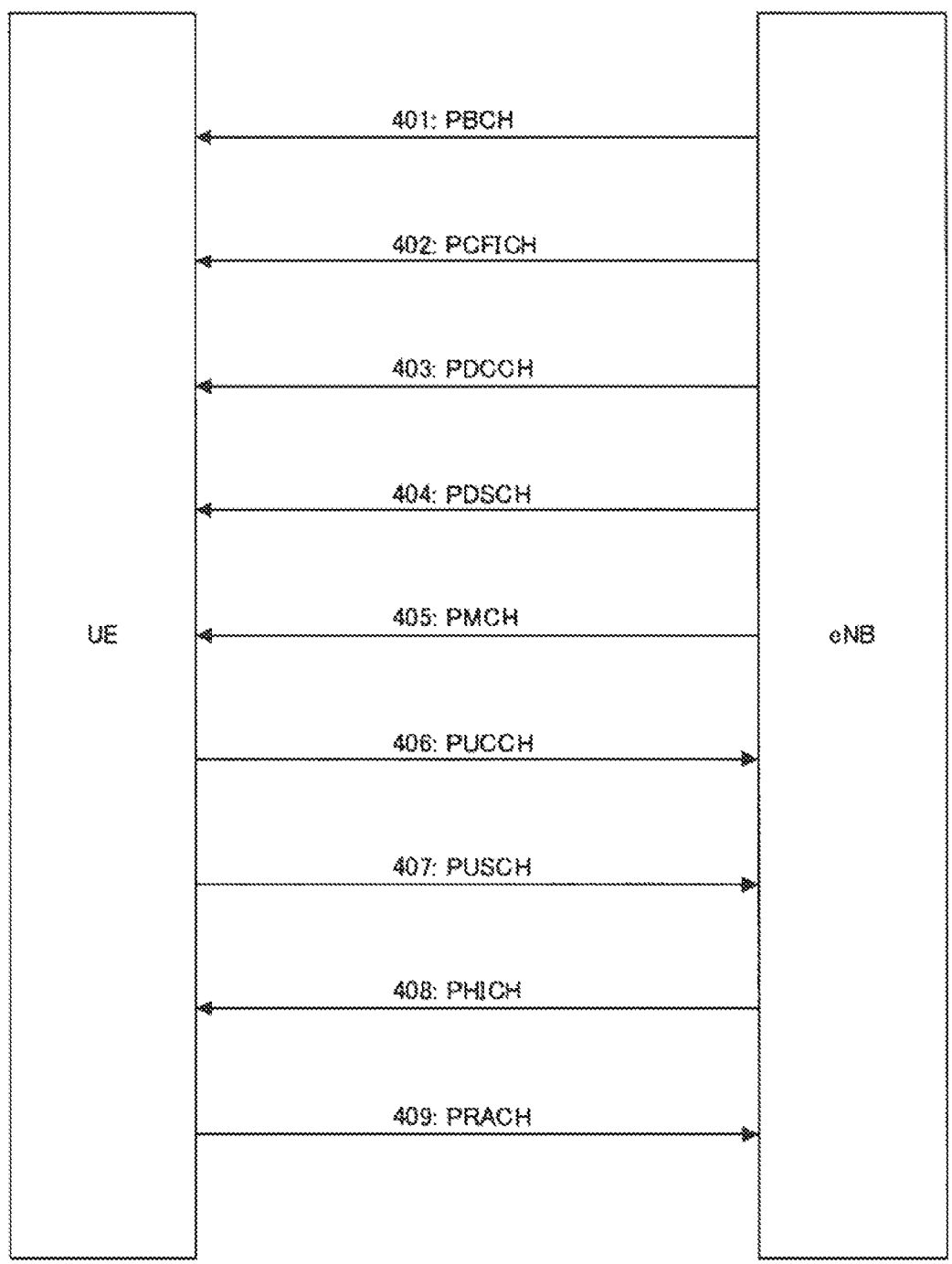
FIG. 4 is an explanatory drawing explaining physical channels for use in the communication system which uses an LTE method.

MBSFN subframes are configured, as shown in FIG. 3, in such a way as to be allocated to each MBSFN frame (MBSFN frame). A repetition period (Repetition Period) is provided for MBSFN frame clusters, and an MBSFN frame cluster (MBSFN frame Cluster) is scheduled within each repetition period. MBSFN subframes allocated to each MBSFN frame can be the same as one another, or can be different from one another. An allocation pattern of MBSFN subframes within each repetition period (Repetition Period) is determined according to an MBSFN frame cluster. This allocation pattern of MBSFN subframes is repeated at the above-mentioned repetition periods. In the example shown in the figure, the allocation pattern of MBSFN subframes to each MBSFN frame is the same, and this results in a smaller number of bits required to show the subframe numbers of the MBSFN subframes compared with a case in which the allocation pattern of MBSFN subframes to each MBSFN frame is not the same.

Furthermore, although it is assumed that continuous MBSFN frames are provided in the example shown in the figure, they are not necessarily continuous. In a case in which the MBSFN frames are continuous, the number of bits required to show the frame numbers of the MBSFN frames can be reduced compared with the case in which the MBSFN frames are not continuous.

The length of each of the repetition periods at which an MBSFN frame cluster is repeated, and the allocation pattern of MBSFN frames and that of MBSFN subframes within each of these repetition periods are mapped onto a broadcast control channel (BCCH) which is a logical channel, and this broadcast control channel is further mapped onto a broadcast channel (BCH) which is a transport channel and a physical broadcast channel (PBCH) which is a physical channel, and is then informed to each mobile terminal. Furthermore, self-cell information is mapped onto the broadcast control channel (BCCH) which is a logical channel, and this channel is further mapped onto a downlink shared channel (DL-SCH) which is a transport channel and a physical downlink shared channel (PDSCH) which is a physical channel, and is then informed to each mobile terminal. On the other hand, the following computation expression can be considered as a determining method of determining a radio frame for paging occasion.

"Paging occurrence radio frame" (Paging Occasion)=an identifier of each mobile terminal (IMSI or the like) mod X+n×(the discontinuous reception cycle length), where n: 0, 1, 2, or ..., and Paging Occasion≤the maximum of SFN. SFN is an integer ranging from 0 to its maximum. X is the number of radio frames in which paging occurs within a discontinuous reception cycle, and satisfies the following inequality: X≤the discontinuous reception cycle length (a number of radio frames). The value of X (a remainder value at X) is associated with a radio frame number (SFN).

As shown from the above-mentioned equation, in a radio frame associated with the number X of paging occurrence radio frames, a paging occasion will occur within a discontinuous reception cycle. In other words, occurrence of a paging occasion is repeated at discontinuous periods with a pattern of radio frames being associated with X. Parameters required to derive a paging occasion, the identifier of each mobile terminal, the discontinuous reception cycle length, X, and so on are mapped onto the broadcast control channel (BCCH) which is a logical channel, and this broadcast control channel is further mapped onto the broadcast channel (BCH) which is a transport channel and the physical broadcast channel (PBCH) which is a physical channel, and are then informed to each mobile terminal. Furthermore, self-cell information is mapped onto the broadcast control channel (BCCH) which is a logical channel, and this channel is further mapped onto the downlink shared channel (DL-SCH) which is a transport channel and the physical downlink shared channel (PDSCH) which is a physical channel, and is then informed to each mobile terminal.

As mentioned above, because any OFDM symbols other than the one or two leading OFDM symbols of each MBSFN subframe are a resource dedicated to MBMS transmission, MBSFN subframes cannot be used for paging processing. Therefore, because MBSFN subframes are not taken into consideration at all in the conventional paging processing method, there arises a problem that it is impossible to apply the conventional paging processing method to paging processing in an MBMS/unicast-mixed cell. In order to solve this problem, a method of preventing an MBSFN frame and a frame in which a paging occasion occurs from being always the same radio frame will be disclosed hereafter. Concretely, the length of each of the repetition periods (Repetition Periods) at which an MBSFN frame cluster is repeated differs from the discontinuous reception cycle length. More specifically, the length of the repetition period of MBSFN frame clusters is made not to be equal to the discontinuous reception cycle length, or they are made not to have an integral multiple relationship.

An example will be shown below. Conventionally, the discontinuous reception cycle length is defined as $2^a \times$radio frame (the unit is a number or time), where a is a positive integer. The value of a is determined by a base station or the network, and is informed to each mobile terminal through a serving cell. In this case, the length of each of the repetition periods (Repetition Periods) at which an MBSFN frame cluster is repeated is given by the following deriving equation.

$2^b \times$radio frame (the unit is a number or time), where b is a positive integer.

In this case, a≠b.

Using these definitions, the period length and the cycle length are prevented from becoming equal to each other, and, also when an initial radio frame number which is allocated for the first time (an offset value) is the same, an MBSFN frame and a paging occasion can be prevented from always occurring at the same radio frame. Accordingly, the paging processing can be carried out in an MBMS/unicast-mixed cell in which MBSFN subframes exist. In the above-mentioned example, an MBSFN frame and a paging occasion can be prevented from always occurring at the same radio frame. However, because the equations for deriving both the period length and the cycle length are given by 2m×radio frame (m=a and b), they have an integral multiple relationship, and therefore an MBSFN frame and a paging occasion occur at the same radio frame once for every plural times an MBSFN frame cluster is repeated.

In order to avoid this problem, the following equation for deriving each of the period length and the cycle length can be provided as another example.

$S^m \times$radio frame (the unit is a number or time), where S is a prime number and m is a positive integer.

For the length of the repetition period of MBSFN frame clusters and the discontinuous reception cycle length, different S values are used. Because S is a prime number, an MBSFN frame and a paging occasion can be prevented from occurring at the same radio frame by using Ss having different values for the period length and the cycle length respectively. Therefore, the frequency with which a frame in which an MBSFN frame occurs and a frame in which a paging occasion occur are the same can be further reduced.

If an MBSFN frame and a paging occasion occurs at the same radio frame, a base station or the network makes the MBSFN frame a higher priority than the paging occasion at the radio frame to give a higher priority to communications of information for MBMS to transmit this information. By predetermining such priorities assigned to an MBSFN frame and a paging occasion, each mobile terminal can also understand which information is transmitted thereto via a radio frame in which an MBSFN frame and a paging occasion occur simultaneously, and can receive and decode the information. A higher priority can be assigned to either of an MBSFN frame and a paging occasion which occur simultaneously. In a case in which a higher priority is assigned to an MBSFN frame, each mobile terminal can receive an MBMS service without loss of MBMS data and without delay time. In a case in which a higher priority is assigned to a paging occasion, the length of time required to carry out an incoming call process of sending an incoming call to each mobile terminal can be reduced, and a delay time occurring at the time of occurrence of an incoming call can be reduced.

The equation for deriving each of the period length and the cycle length in these examples can be determined statically. Two or more types of equations can be prepared beforehand to derive each of the period length and the cycle length, and which one of them should be selected can be determined. As an alternative, a parameter indicating which one of the two or more types of the equation for deriving each of the period length and the cycle length should be selected can be provided. Each parameter used for selecting a deriving equation for each of the period length and the cycle length can be determined statically, or can be determined semi-statically or dynamically. When each parameter is determined semi-statically or dynamically, each parameter is determined by a base station or the network and is informed, via the serving cell, to each mobile terminal by using a BCCH, an MCCH, or L1/L2 signaling. In a case in which two types of equations are prepared beforehand to derive each of the period length and the cycle length, 1-bit information can be sent as each parameter used for selecting a deriving equation for each of the period length and the cycle length, so that each parameter can be informed to each mobile terminal from a base station or the network with a minimum amount of information, and the use efficiency of the radio resources is improved.

Figure 74:
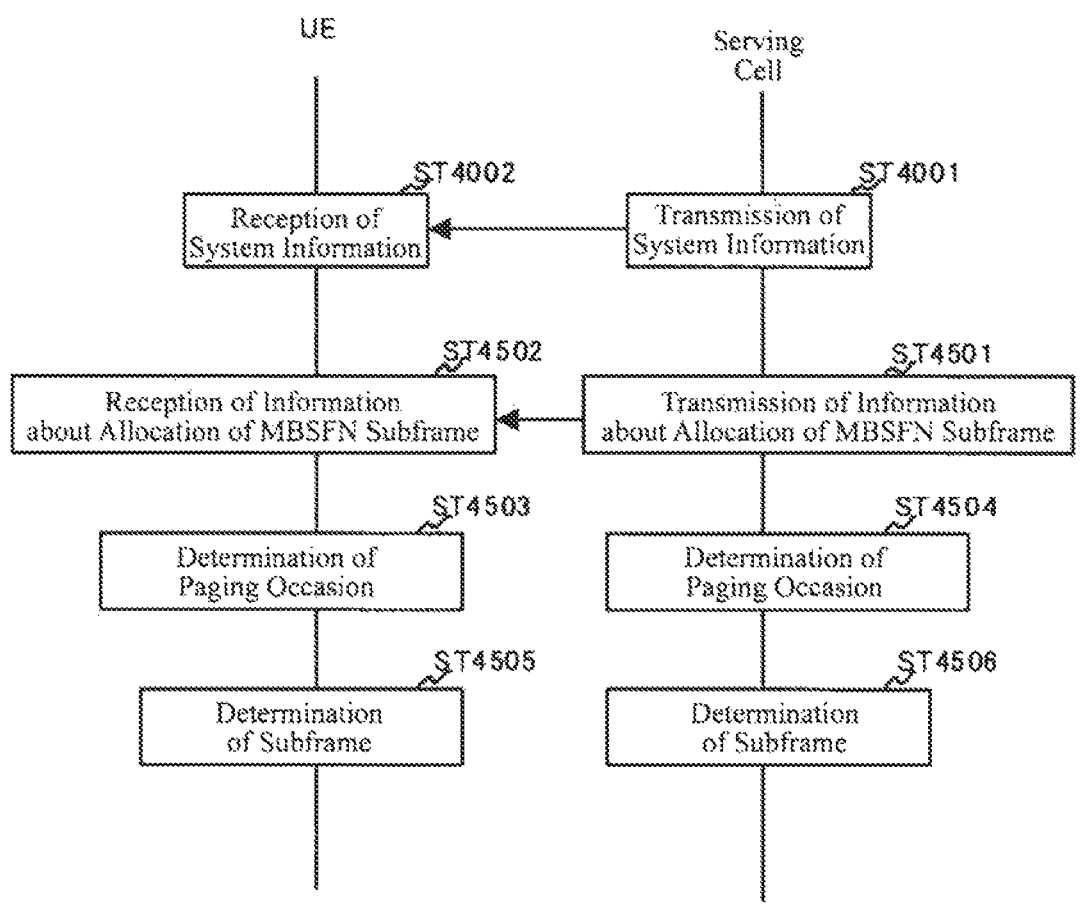
FIG. 74 is a sequence diagram in a case of deriving a paging occasion onto which a notification of allocation information about MBSFN subframes and a paging signal are mapped.

A concrete example of a sequence diagram in a case of making a notification of information about allocation of MBSFN subframes and deriving a paging occasion onto which a paging signal is mapped is shown in FIG. 74. The serving cell, in step ST4001, transmits the system information about the cell itself to mobile terminals being served thereby. A concrete example of the system information transmitted to the mobile terminals includes a measurement period length, tracking area information (TA information), and a discontinuous reception cycle length. A parameter for discontinuous reception is included in the system information about the cell itself. By using the determining method, as disclosed above, of determining a paging occasion occurrence radio frame, the discontinuous reception cycle length is derived from this parameter for discontinuous reception. A concrete example of the parameter for discontinuous reception includes parameters for deriving the discontinuous reception cycle length. The parameters for deriving the discontinuous reception cycle length include a, m, S, the information showing which deriving equation is used, the number (X) of paging occasions (or the number of paging groups) within a discontinuous reception cycle, a relationship between the value of X (a remainder value at X) and a radio frame number (SFN). As a concrete example of the indication of the discontinuous reception cycle length, the number of radio frames can be used. Each mobile terminal, in step ST4002, receives the system information about the self-cell from the serving cell. The serving cell, in step ST4501, transmits the information about allocation of MBSFN subframes. In the current 3GPP, the following regarding allocation of MBSFN subframes has been discussed. The mapping position of a reference signal in an MBSFN subframe as a radio resource differs from that of a reference signal in a subframe which is not an MBSFN subframe as a radio resource. It has been debated that in order to carry out a more correct measurement using a reference signal, even a mobile terminal having no capability of receiving an MBMS service needs to grasp the information about allocation of MBSFN subframes in the serving cell (non-patent reference 2). As a concrete example of the information about allocation of MBSFN subframes, a parameter for deriving the repetition period of MBSFN frame clusters and an MBSFN subframe allocation pattern within this repetition period can be considered. By using the determining method, as disclosed above, of determining the repetition period of MBSFN frame clusters, the repetition period of MBSFN frame clusters is derived from the above-mentioned parameter for deriving the repetition period of MBSFN frame clusters. A concrete example of the parameter for deriving the repetition period of MBSFN frame clusters includes b, m, S, and the information showing which deriving equation is used which are the parameters for deriving the repetition period. A concrete example of the MBSFN subframe allocation pattern within this repetition period includes an MBSFN frame number and/or an MBSFN subframe number within this repetition period. Each mobile terminal, in step ST4502, receives the information about allocation of MBSFN subframes from the serving cell. Each mobile terminal, in step ST4503, determines a paging occasion. Each mobile terminal and the serving cell, in steps ST4503 and ST4504, determine a radio frame for paging occasion by using the same method respectively, as the mobile communication system. Each mobile terminal, in step ST4505, determines a subframe in the radio frame for paging occasion. The serving cell, in step ST4506, determines the subframe in the radio frame for paging occasion by using the same method as that which each mobile terminal uses, as the mobile communication system.

As disclosed in this Embodiment 14, by preventing an MBSFN frame and a frame in which a paging occasion occurs from being always the same radio frame, the problem of the present invention can be solved and therefore a paging process in an MBMS/unicast-mixed cell in which MBSFN subframes exist can be carried out.

Next, variant 1 of this embodiment will be explained. In Embodiment 14, the length of the repetition period of MBSFN frame clusters is set in such a way as to differ from the discontinuous reception cycle length for paging occasion. The pattern of MBSFN frames within a repetition period of an MBSFN frame cluster can be configured in such a way as not to be the same as that of occurrence of a radio frame for paging occasion within a discontinuous reception cycle. For example, the length of the repetition period of MBSFN frame clusters is set to 32 radio frames. The MBSFN frames within a repetition period having this length are the ones #0 to #7 (the first radio frame within a repetition period having the length is the one #0). In this case, for example, by using the above-mentioned method of deriving a paging occasion, the discontinuous reception cycle length is set to 32 radio frames, the number X of paging occurrence radio frames is set to 4, and the relationship between the remainder value at X and the radio frame number is determined as follows.

The radio frame number is #8 when the remainder value of X=zero, the radio frame number is #14 when the remainder value of X=1, the radio frame number is #20 when the remainder value of X=2, and the radio frame number is #26 when the remainder value of X=3.

In this case, the radio frame number of the first radio frame within a discontinuous reception cycle is #0.

In the case in which the remainder value of X is brought into correspondence with the radio frame number in this way, the pattern of MBSFN frames within a repetition period of an MBSFN frame cluster can be configured in such a way as not to be the same as that of occurrence of a radio frame for paging occasion within a discontinuous reception cycle. Therefore, because even if the length of the repetition period of MBSFN frame clusters is the same as the discontinuous reception cycle length for paging occasion, the pattern of MBSFN frames within a repetition period of an MBSFN frame cluster differs from that of occurrence of a radio frame for paging occasion within a discontinuous reception cycle, an MBSFN frame and a paging occasion can be prevented from always occurring at the same radio frame.

In this variant, although a radio frame in which a paging occasion occurs is determined on the basis of an MBSFN frame, the MBSFN frame can be inversely determined on the basis of the radio frame in which a paging occasion occurs. For example, what is necessary is just to statically determine a radio frame in which a paging occasion occurs, and, when determining an MBSFN frame semi-statically or dynamically, make a radio frame within a discontinuous reception cycle which is different from the radio frame in which a paging occasion occurs be the MBSFN frame. By determining the MBSFN frame in this way, it becomes able to determine MBSFN subframes flexibly according to the data volume of MBMS, and it also becomes able to increase the use efficiency of the radio resources. This method of statically determining a radio frame in which a paging occasion occurs, and then determining an MBSFN frame semi-statically or dynamically can be applied to Embodiment 14 and variant 2. Furthermore, as the method of informing the parameters in accordance with this variant, the method described in Embodiment 14 can be applied.

By using the method of this variant 1, there is provided an advantage of allowing the length of the repetition period of MBSFN frame clusters to be the same as the discontinuous reception cycle length in addition to the advantages provided by Embodiment 14. By making the length of the repetition period of MBSFN frame clusters be the same as the discontinuous reception cycle length, the parameters informed from a base station or the network to each mobile terminal can be reduced and the use efficiency of the radio resources can be improved.

In the above-mentioned example, a pattern of MBSFN frames within a repetition period of an MBSFN frame cluster is used. As an alternative, a pattern of allocation of MBSFN subframes within a repetition period (Repetition Period) can be provided. In this case, what is necessary is just to let an MBSFN frame in which these MBSFN subframes are included be a pattern of MBSFN frames within a repetition period of an MBSFN frame cluster. Accordingly, the same advantages are provided.

Embodiment 15

In Embodiment 2, the method of transmitting a paging signal from a base station during each MCCH repetition period (MCCH repetition period) or during each paging signal presence or absence indicator repetition period, and allowing a mobile terminal which receives the paging signal to carry out a discontinuous reception operation during either of those repetition periods. Hereafter, another new method will be disclosed as a method of transmitting a paging signal. As also described is Embodiment 2, in accordance with a conventional technology (W-CDMA system), the method has the step of defining the number of S-CCPCHs (the number of channelization codes) onto which a PCH is mapped as the number of groups, and determining a time at which paging indication is transmitted, i.e., SFN (System Frame Number) by using an identifier (UE-ID or IMSI) of each mobile terminal, and discontinuous reception timing. However, there is still no disclosure of any method of transmitting a paging signal in a frequency layer dedicated to MBMS transmission in an LTE system. In a frequency layer dedicated to MBMS transmission, because transmission is carried out via a multi-cell transmission scheme, and an arbitrary cell is also allowed to belong to a plurality of MBSFN areas, a method of transmitting a paging indication based on a conventional technology cannot be applied to a method of mapping a paging signal onto which radio frame or which subframe. Furthermore, because an LTE system is not a CDM method, there is no concept of the number of channelization codes, and it is therefore impossible to apply the conventional technology. Therefore, a method of transmitting a paging signal in a frequency layer dedicated to MBMS transmission of an LTE system will be disclosed hereafter. An explanation will be made focusing on a portion different from Embodiment 2. Portions which will not be explained specifically are the same as those explained in Embodiment 2

As a method of enabling an MBMS dedicated cell to transmit a paging signal in a frequency layer dedicated to MBMS transmission of an LTE system, a configuration of transmitting a paging signal via a radio frame corresponding to an MBSFN area to which this cell belongs is provided. As a concrete example, a method of transmitting a paging signal in a case in which no overlapping (or covering) MBSFN areas exist in each cell and MBSFN subframes corresponding to MBSFN areas are CDM-multiplexed, as shown in FIG. 40, will be disclosed. First, a computation expression for determining a paging group will be disclosed. Ksf in the computation expression for determining a paging group (IMSI mod Ksf) is the number of paging groups. A concrete example of the value of Ksf is the number of MBSFN subframes in one radio frame. In a case in which the number of MBSFN subframes in one radio frame is 10, Ksf is equal to 10. In contrast, in a case in which the value of Ksf is the number of MBSFN subframes in one radio frame excluding MBSFN subframes #0 and #5 onto which an SCH is mapped, Ksf is equal to 8. By bringing the value of Ksf (a remainder value at Ksf) into correspondence with subframe numbers in one radio frame, each mobile terminal is enabled to know onto which subframe in one radio frame the paging information about the paging group to which the mobile terminal itself belongs is mapped from the value of the paging group determined according to the above-mentioned equation.

Next, a correspondence about onto which radio frame the paging signal destined for the group to which the mobile terminal itself belongs is mapped is established. A concrete example of a computation expression for determining the radio frame is given as follows.

"Paging occurrence radio frame" (Paging Occasion)= (IMSI or Ksf) mod (the discontinuous reception cycle length in the frequency layer dedicated to MBMS transmission)+n× (the discontinuous reception cycle length in the MBMS transmission frequency layer), where n: 0, 1, 2, or . . . , and Paging Occasion≤the maximum of SFN. SFN is an integer ranging from 0 to the maximum of SFN.

The "paging occurrence radio frame" (referred to as the paging occasion) shows SFN onto which the paging signal is mapped. As can be seen from this equation, the paging occasion can have any of all possible values ranging from zero to the maximum of SFN. Therefore, compared with the method disclosed in Embodiment 2, the number of MBSFN subframes onto which a paging signal is mapped, and the number of radio frames having the MBSFN subframes can be increased. Therefore, it becomes able to reduce the number of mobile terminals which are mapped onto one MBSFN subframe, and therefore the physical area required to carry paging signals whose number is equal to the number of mobile terminals onto one MBSFN subframe can be reduced. Furthermore, because it is not necessary to determine the discontinuous reception cycle length in the MBMS transmission frequency layer depending on the length of each of the periods at which the MCCH is transmitted, the system becomes able to set up the discontinuous reception cycle length with flexibility. Next, the physical area onto which a paging signal is mapped will be described. A paging signal is configured in such a way as to be transmitted via all radio frames corresponding to an MBSFN area to which a cell belongs. The method, as disclosed in Embodiment 8, of providing a physical channel dedicated to paging (DPCH) which is transmitted via a multi-cell transmission scheme in an MBSFN area, and carrying a paging signal on this physical channel is applied. As shown in FIG. 42, the DPCH for carrying a paging signal is provided in a part of MBSFN subframes corresponding to the MBSFN area. The DPCH can be formed in all the radio frames corresponding to the MBSFN area and formed in all the MBSFN subframes in one radio frame, or can be formed in MBSFN subframes in one radio frame excluding MBSFN subframes #0 and #5 onto which an SCH is mapped. In the case in which the DPCH can be formed in all the MBSFN subframes in one radio frame, Ksf can be set to 10. In contrast, in the case in which the DPCH can be formed in MBSFN subframes in one radio frame excluding MBSFN subframes #0 and #5 onto which an SCH is mapped, Ksf can be set to 8. When Ksf is the number of subframes in one radio frame, Ksf can have another value. Because the methods disclosed in Embodiment 8 can be applied to a paging signal on the paging dedicated channel and the method of mapping the paging signal onto the paging signal dedicated channel, the explanation of them will be omitted hereafter.

By thus providing the method of transmitting a paging signal, and the channel structure for carrying the paging signal, as mentioned above, there is provided an advantage of being able to transmit a paging signal via all radio frames corresponding to an MBSFN area to which an MBMS dedicated cell belongs, and enable the MBMS dedicated cell to transmit the paging signal in a frequency layer dedicated to MBMS transmission of an LTE system.

Figure 75:
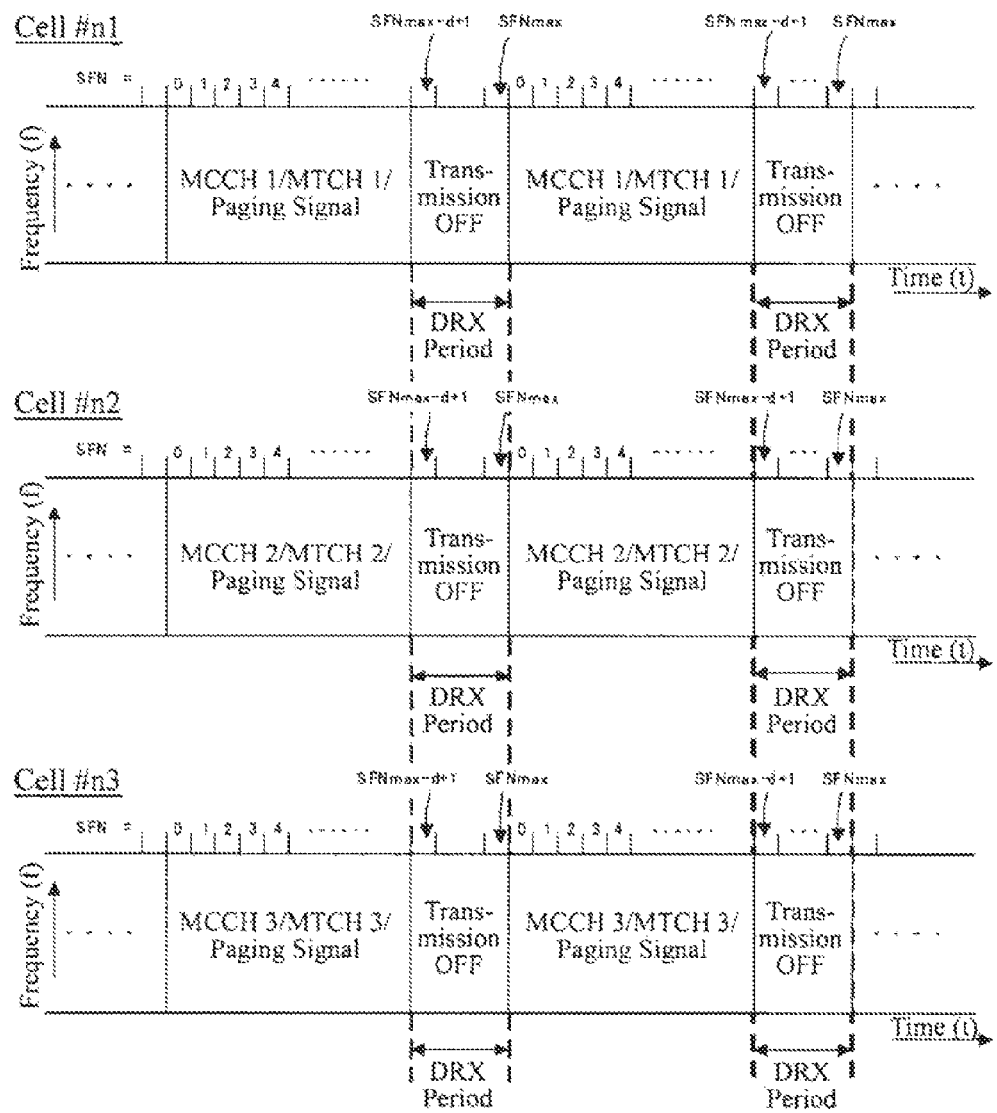
FIG. 75 is a view explaining the configuration of MBSFN subframes for each MBSFN area in each cell in a case in which a DRX period is also taken into consideration.

As another concrete example, a method of transmitting a paging signal in a case of taking a DRX period into consideration will be disclosed. In Embodiment 2, the method of providing a DRX period for measurements in a unicast/mixed frequency layer is disclosed in order to enable synchronization maintenance, acquisition of broadcast information, and cell re-selection in the unicast/mixed frequency layer to transmit a paging signal in an MBMS transmission dedicated cell. Hereafter, the method of transmitting a paging signal in the case in which the DRX period is provided and this DRX period is taken into consideration will be shown. Because the detailed explanation about this DRX period is disclosed in Embodiment 2, the detailed explanation will be omitted hereafter. In this concrete example, it is assumed that one DRX period for measurements in a unicast/mixed frequency layer is provided in an MBSFN synchronization area (MBSFN Synchronization Area). An example of the configuration of MBSFN subframes of each MBSFN area in each cell in the case of also taking the DRX period into consideration is shown in FIG. 75. SFN is set to a value ranging from 0 to SFNmax, and the DRX period length is set to d radio frames. Each cell transmits data for MBMS via radio frames SFN=0 to SFNmax-d. The radio frames SFN=SFNmax-d+1 to SFNmax correspond to the DRX period, and the transmission is in an off state during this period. It is assumed that one DRX period is provided in an MBSFN synchronization area, as mentioned above. Therefore, cells belonging to each MBSFN area enter the transmission off state at the same time (SFN). A paging signal is transmitted via the radio frames SFN=0 to SFNmax-d via which data for MBMS is also transmitted while being mapped onto a DPCH disclosed in Embodiment 8. First, a computation expression for determining a paging group will be disclosed. The computation expression for determining a paging group is shown below.

IMSI mod Ksf

Ksf is the number of paging groups. A concrete example of the value of Ksf is the number of MBSFN subframes in one radio frame. In a case in which the number of MBSFN subframes in one radio frame is 10, Ksf is equal to 10. In contrast, in a case in which the value of Ksf is the number of MBSFN subframes in one radio frame excluding MBSFN subframes #0 and #5 onto which an SCH is mapped, Ksf is equal to 8. By bringing the value of Ksf into correspondence with subframe numbers in one radio frame, each mobile terminal is enabled to know onto which subframe in one radio frame the paging information about the paging group to which the mobile terminal itself belongs is mapped from the paging group.

Next, as to onto which radio frame the paging signal destined for the group to which the mobile terminal itself belongs is mapped, two methods will be disclosed as concrete examples of a computation expression for determining the radio frame. First, a first one of them will be disclosed. A paging occasion (Paging Occasion) is defined as follows.

Paging occasion=(IMSI div Ksf) mod (SFNmax−ΣDRX), the discontinuous reception cycle length in the frequency layer dedicated to MBMS transmission=SFNmax, where it is assumed that the paging occasion has a value which is obtained by renumbering the radio frames except those corresponding to the DRX periods.

In this case, SFNmax is the maximum of SFN, and DRX is the sum of the lengths of all DRX periods which exist within the radio frames SFN=0 to SFNmax. That is, (SFNmax−ΣDRX) shows the number of radio frames except those corresponding to the DRX periods. Therefore, as can be seen from this equation, SFN onto which the paging signal is mapped can have the value of a radio frame, except those corresponding to the DRX periods, in which MBSFN subframes of each MBSFN area exist. Furthermore, because the discontinuous reception cycle length is set to SFNmax, for each mobile terminal, a paging occasion occurs once during a time period corresponding to the radio frames SFN ranging from zero to SFNmax. By using the method configured in this way, a paging signal can be disposed in an MBSFN subframe corresponding to an MBSFN area from which a mobile terminal is receiving or trying to receive an MBMS, and the mobile terminal can therefore receive the paging signal when receiving or trying to receive the MBMS. Because the above-mentioned methods can be applied as a method of configuring a physical area onto which the paging signal is mapped, and a method of mapping the paging signal onto a paging signal dedicated channel, the explanation of them will be omitted hereafter.

As to onto which radio frame the paging signal destined for the group to which the mobile terminal itself belongs is mapped, the second method will be disclosed. The second method is the one of providing two different discontinuous reception cycles in the frequency layer dedicated to MBMS transmission. One of them is a discontinuous reception cycle in which discontinuous reception is repeated within the maximum of SFN, and the other one is a discontinuous reception cycle in which discontinuous reception is repeated for every maximum of SFN. A concrete paging occasion (Paging Occasion) is given as follows.

Paging Occasion=(IMSI div Ksf) mod (a discontinuous reception cycle length #1 in the frequency layer dedicated to MBMS transmission)+n×(the discontinuous reception cycle length #1 in the frequency layer dedicated to MBMS transmission), The discontinuous reception cycle length #1≤(SFNmax−ΣDRX) in the frequency layer dedicated to MBMS transmission, and a discontinuous reception cycle length #2 in the frequency layer dedicated to MBMS transmission=SFNmax, where n: 0, 1, 2, or . . . , and ∀Paging Occasion≤(SFNmax−ΣDRX). It is assumed that the paging occasion has a value which is obtained by renumbering the radio frames except those corresponding to the DRX periods.

In this case, the discontinuous reception cycle length #1 in the frequency layer dedicated to MBMS transmission is the length of the discontinuous reception cycle in which discontinuous reception is repeated within the maximum of SFN. The discontinuous reception cycle length #2 in the frequency layer dedicated to MBMS transmission is the length of the discontinuous reception cycle in which discontinuous reception is repeated for every maximum of SFN. The discontinuous reception cycle length #2 in the frequency layer dedicated to MBMS transmission is set up in such a way that the pattern of the values of radio frames between 0 and SFNmax which are determined in the discontinuous reception cycle #1 in the frequency layer dedicated to MBMS transmission is repeated for every maximum of SFN in the discontinuous reception cycle #2 in the frequency layer dedicated to MBMS transmission. By determining n in such a way that all the values which the result of the determination the paging occasion can have become equal to or smaller than (SFNmax−ΣDRX), an opportunity to transmit paging is provided equally to each mobile terminal. If an opportunity to transmit paging does not have to be provided equally to each mobile terminal, n can be determined to be n: 0, 1, 2, or . . . , where Paging Occasion (SFNmax−ΣDRX).

By determining n in this way, there occurs a difference in the paging opportunity for each mobile terminal, though there is no radio frame which is not used for a notification of a paging signal, and each mobile terminal becomes able to have as many opportunities as possible to receive a paging signal, and becomes able to reduce receive errors occurring in the paging signal, a delay time occurring its incoming call operation, etc.

A concrete example of the setting of the discontinuous reception cycle length #1 in the frequency layer dedicated to MBMS transmission will be shown.

For example, $a \times 2^{(k-1)} \leq$ SFNmax-ΣDRX, where a and k are positive integers, and a, $a \times 2$, $a \times 2^2$, . . . , and $a \times 2^{(k-1)}$ are provided as candidates for the discontinuous reception cycle length #1 in the frequency layer dedicated to MBMS transmission and one candidate can be selected from among them. The values of a and k can be selected in an upper layer, and can be informed to each mobile terminal via broadcast information from a cell in the unicast/mixed frequency layer or via broadcast information from a cell in the MBMS dedicated frequency layer, or via an MCCH corresponding to an MBMS service in an MBSFN area which each mobile terminal is receiving or trying to receive, and each mobile terminal can determine the discontinuous reception cycle length on the basis of the informed values. Also in this method, because the above-mentioned methods can be applied as a method of configuring a physical area onto which a paging signal is mapped, and a method of mapping the paging signal onto a paging signal dedicated channel, the explanation of them will be omitted hereafter.

A concrete example of the method of transmitting a paging signal in the case of taking a DRX period into consideration is disclosed above. In the method of transmitting a paging signal in the case of taking a DRX period into consideration, the paging signal can be mapped onto MBSFN subframes of a radio frame excluding MBSFN subframes corresponding to the DRX periods. These MBSFN subframes can be all the MBSFN subframes of a radio frame excluding MBSFN subframes corresponding to the DRX periods, or can be some MBSFN subframes of a radio frame excluding MBSFN subframes corresponding to the DRX periods.

A concrete example of the method of transmitting a paging signal in the case of taking a DRX period into consideration is disclosed above. The method of providing two different discontinuous reception cycles in the frequency layer dedicated to MBMS transmission can be applied to also a case in which MBSFN subframes corresponding to an MBSFN area are TDM-multiplexed. For example, in a case in which no overlapping MBSFN areas exist in each cell, and MBSFN subframes corresponding to an MBSFN area are TDM-multiplexed and there is a DRX period, as shown in FIG. 39, the number of radio frames each having MBSFN subframes corresponding to an MBSFN area to which each cell belongs can be provided instead of (SFNmax-ΣDRX), and the number of MBSFN subframes in one radio frame can be defined as Ksf. For example, in a case in which overlapping MBSFN areas exist in each cell, MBSFN subframes corresponding to an MBSFN area which does not overlap any other MBSFN area are CDM-multiplexed, and MBSFN subframes corresponding to an overlapping MBSFN area are TDM-multiplexed and there is a DRX period, as shown in FIG. 41, some methods can be considered.

In a case in which a paging signal is transmitted on one MBSFN area to which each cell belongs, the number of radio frames each having MBSFN subframes corresponding to the MBSFN area can be provided instead of (SFNmax-ΣDRX), and the number of MBSFN subframes in one radio frame can be defined as Ksf, like in the above-mentioned case. In a case in which a paging signal is transmitted also in an MBSFN area (area 4) covering other MBSFN areas, a DPCH can be provided in the subframes #0 and #5 of the covering MBSFN area, and can be transmitted after multiplied by the scrambling code of a covered MBSFN area (e.g., area 1). As disclosed in Embodiment 2, because an SCH is transmitted via the subframes #0 and #5 of MBSFN subframes corresponding to a covered MBSFN area, the scrambling code or the reference signal (RS) of the MBSFN area 1 can be used. Therefore, by providing a DPCH in the subframes #0 and #5 of the covering MBSFN area, and transmitting the DPCH after multiplying the DPCH by the scrambling code of the MBSFN area 1, it becomes able to provide a DPCH in all the radio frames excluding the radio frames corresponding to the DRX periods. Therefore, (SFNmax-ΣDRX) can be used juts as it is, and Ksf can be set to two (corresponding to the subframes #0 and #5).

When there is no subframe by which the scrambling code of the MBSFN area (e.g., area 1) covered by the covering MBSFN area (area 4) is multiplied, it is impossible to transmit the same paging signal via all the radio frames excluding the radio frames corresponding to the DRX periods. Therefore, a DPCH is provided in MBSFN subframes of only the MBSFN area 1 or the MBSFN area 4, and the paging signal is transmitted. In this case, the number of radio frames each having MBSFN subframes corresponding to either one of the MBSFN areas can be provided instead of (SFNmax-ΣDRX), and the number of MBSFN subframes in one radio frame can be defined as Ksf, like in the case in which a paging signal is transmitted on one MBSFN area.

Furthermore, this method of transmitting a paging signal can be applied to also the case in which MBSFN subframes corresponding to an MBSFN area are TDM-multiplexed, as previously explained. The method can be applied to even a case in which a DRX period is provided in the above-mentioned case. By thus providing the method of transmitting a paging signal, and the channel structure for carrying the paging signal, as mentioned above, there is provided an advantage of being able to, even in a case in which a DRX period is provided in a frequency layer dedicated to MBMS transmission of an LTE system, enable an MBMS dedicated cell to transmit a paging signal in the frequency layer dedicated to MBMS transmission. Furthermore, although the case in which a DRX period is provided for a use which enables synchronization maintenance, acquisition of broadcast information, and cell re-selection in a unicast/mixed frequency layer is described above, the uses of a DRX period are not limited to this example. Because the method of transmitting a paging signal and the channel structure for carrying the paging signal, which are disclosed in this embodiment, can be applied to also another case in which a DRX period is provided, the unicast/mixed frequency layer, the frequency layer dedicated to MBMS transmission, and, furthermore, another system can be made to coexist or can be shared, and there is provided an advantage of being able to construct and make use of the mobile communication system with flexibility.

A flow of the processing carried out by the mobile communication system described in this embodiment will be explained. A portion different from the method disclosed in Embodiment 2 will be mainly shown. First, in addition to information about the scheduling of an MCCH, such as an MCCH repetition period (MCCH repetition period) length, and DRX information for measurement in a unicast/mixed frequency layer, parameters for the time of discontinuous reception at the time of MBMS reception, more specifically, the discontinuous reception cycle length in the frequency layer dedicated to MBMS transmission, the discontinuous reception cycle lengths #1 and #2 in the frequency layer dedicated to MBMS transmission, a, k, and Ksf have to be informed to each mobile terminal. All of these pieces of information do not have to be transmitted, and necessary parameters have only to be informed according to the paging group used and the computation expression for determining a paging occasion (paging occasion). These parameters for the time of discontinuous reception at the time of MBMS reception, as well as the information about the scheduling of the MCCH, can be informed to each mobile terminal, via a BCCH, from the MBMS dedicated cell in steps ST1723 and ST1724. As an alternative, the parameters for the time of discontinuous reception at the time of MBMS reception, as well as the MBMS area information, the DRX information for measurement in the unicast/mixed frequency layer, and the number of paging groups, can be informed to each mobile terminal, via an MCCH, from the MBMS dedicated cell in steps ST1728 and ST1729. In this case, the parameters required for the paging occasion determining computation expression have only to be informed, though this embodiment is not limited to the parameters. A parameter showing which timing (SFN) each mobile terminal should receive when performing a discontinuous reception operation can be informed instead. As a concrete example, an explicit receiving timing (SFN) and a discontinuous reception cycle length can be informed.

Figure 76:
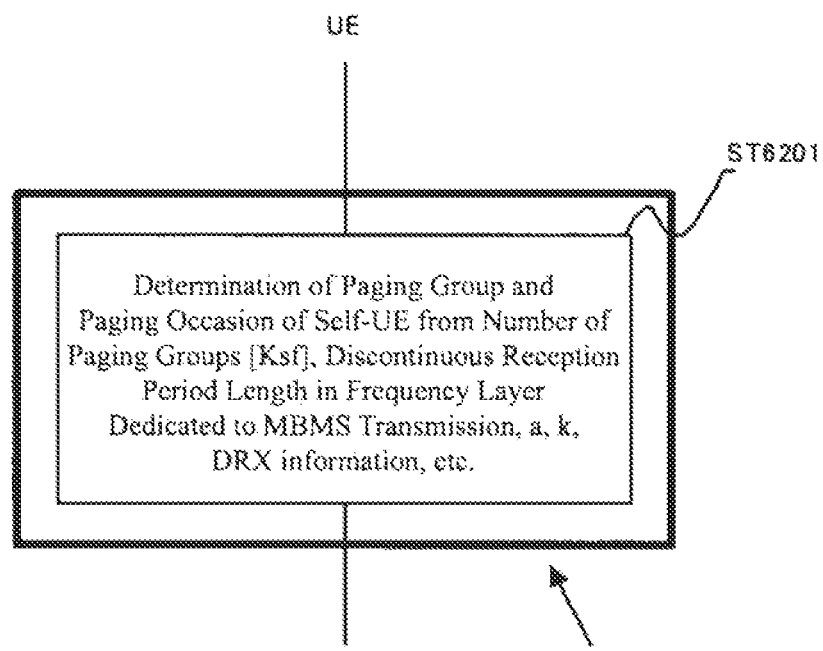
FIG. 76 is a flow chart explaining a discontinuous reception preparation process at the time of MBMS reception in Embodiment 15.

Next, a discontinuous reception preparing operation performed by each mobile terminal will be explained. The discontinuous reception preparing operation performed by each mobile terminal in this embodiment is shown in FIG. 76. ST6201 is carried out instead of ST1735 shown in FIG. 19.

Each mobile terminal, in ST6201, makes preparations for discontinuous reception at the time of MBMS reception by using the parameters for the time of discontinuous reception at the time of MBMS reception received in step ST1729. Concretely, each mobile terminal determines the above-mentioned paging group and paging occasion of the mobile terminal itself by using the number Ksf of paging groups, the discontinuous reception cycle lengths in the frequency layer dedicated to MBMS transmission, a, k, the DRX information, etc. which are received in step ST1729. Furthermore, each mobile terminal uses an identification ID (UE-ID or IMSI) of the mobile terminal itself for the determination of the paging group and paging occasion. SFNmax has only to be predetermined in the system, and the predetermined value is used.

Next, the discontinuous reception process at the time of MBMS reception will be explained. The discontinuous reception process at the time of MBMS reception in this embodiment is shown in FIG. 77. Each mobile terminal, in step ST6301, determines whether the current time is a time of receiving a paging signal from the result of the determination of the paging occasion carried out in step ST6201. More concretely, each mobile terminal determines whether or not it is the SFN number of the paging occasion destined for the mobile terminal itself. When it is not the SFN number of the paging occasion, each mobile terminal makes a transition to ST6306. Each mobile terminal, in ST6306, determines whether the current time is a time of receiving the MCCH by using the scheduling of the MCCH received in ST1725. More concretely, each mobile terminal determines whether it is the SFN number of the leading one of system frames onto which the MCCH is mapped. More specifically, each mobile terminal determines the SFN number of the leading one of system frames onto which the MCCH is mapped by using the MCCH repetition period length and the starting point value which are an example of the parameters which the mobile terminal receives in step ST1725, and determines whether or not it is the leading one of system frames onto which the MCCH is mapped on the basis of an SFN mapped onto the BCCH or the like to determine whether it is the SFN number of the leading one of system frames onto which the MCCH is mapped. When the current time is not the one of the leading one of system frames onto which the MCCH is mapped, each mobile terminal makes a transition to step ST1753. In contrast, when the current time is the one of the leading one of system frames onto which the MCCH is mapped, each mobile terminal makes a transition to step ST1788. Furthermore, in a case of FIG. 26, the determination of step ST1772 can be carried out every MCCH repetition period 1. Furthermore, for example, in a case of FIG. 27 or 29, the determination can be carried out every MCCH repetition period. When the current time is the SFN number of the paging occasion in ST6301, each mobile terminal makes a transition to ST6302.

Paging to the mobile terminal in question occurs in step ST6307. An MME in which paging has occurred, in step ST6308, checks the TA (Tracking Area) list of the mobile terminal in question on the basis of an identifier (UE-ID, IMSI, S-TMSI, or the like) of the mobile terminal for which the paging is destined. The MME, in step ST6309, determines whether or not a TA(MBMS) is included in the TA list of the mobile terminal in question. As a concrete example, the MME searches through the tracking area list of the mobile terminal in question, such as a list as shown in FIG. 31[*a*], on the basis of the UE-ID. In a case in which the mobile terminal in question is the UE#1 (UE-ID#1) of FIG. 31[*a*], the MME determines that the TA(MBMS) is not included in the tracking area list. In contrast, in a case in which the mobile terminal in question is the UE#2 (UE-ID#2) of FIG. 31[*a*], the MME determines that the TA(MBMS) is included is the tracking area list because the TA(MBMS) #1 is included in the list. When the TA(MBMS) is not included in the tracking area list, the MME makes a transition to step ST1814. In contrast, when the TA(MBMS) is included in the tracking area list, the MME makes a transition to step ST6310. The MME, in step ST6310, transmits a paging request (Paging Request) to MCEs. As the MCEs to which the MME transmits a paging request, there can be considered all MCEs each of which manages base stations which geographically overlap the base stations managed by the MME. As an example of parameters included in the paging request, there can be considered an identifier (UE-ID, IMSI, S-TMSI, or the like) of the mobile terminal, the TA(MBMS) number, and so on. At this time, instead of the TA(MBMS) number, either f(MBMS) and MBSFN area IDs or only MBSFN area IDs can be provided.

Each of the MCEs, in step ST6311, receives the paging request. Among the MCEs each of which receives the paging request in step ST6312, an MCE which controls the MBSFN area ID related to the TA(MBMS) number informed thereto as a parameter included in the paging request makes preparations for paging transmission. As an example of the preparations for paging transmission, the MCE which controls the MBSFN area ID determines the paging group and the paging occasion (paging occasion) of the mobile terminal in question by using the parameters for the time of discontinuous reception at the time of MBMS reception. Concretely, the parameters for the time of discontinuous reception at the time of MBMS reception are the number Ksf of paging groups of the self-base station (the MBSFN area to which the base stations belong), the discontinuous reception cycle lengths in the frequency layer dedicated to MBMS transmission, a, k, the DRX information, etc. When determining the paging group and the paging occasion, the same computation expression as that used by the mobile terminal side is used. Because the concrete computation expression for determining the paging group and the paging occasion is mentioned above, the explanation of the concrete computation expression will be omitted hereafter. As mentioned above, in accordance with the method of managing a correspondence between TA(MBMS) numbers (MBSFN Areas) and MCEs which is carried out by an MCE which receives a paging request, because a relation between an MBSFN area ID and an MCE which controls the MBSFN area can be provided only within the architecture of MBMS services, that is, because the relation can be provided regardless of the MME, there can be provided an advantage of becoming able to make the mobile communication system have a high degree of flexibility.

Furthermore, there is considered a case in which the MME manages the MBSFN area ID related to the TA(MBMS) number as shown in FIG. 31[*c*], and also manages the MBSFN area ID and the number of an MCE which controls the MBSFN area as shown in FIG. 31[*d*]. In this case, the MME, in step ST6310, transmits the paging request only to an MCE which manages the MBSFN area ID related to the TA(MBMS) number. As an example of the parameter included in the paging request at that time, there can be considered an identifier of the mobile terminal, or the like. The MCE which receives the paging request in step ST6311 makes preparations for paging transmission, like in the above-mentioned case. As mentioned above, because the method (FIG. 31[*d*]) of managing the relation between an MBSFN area ID and an MCE which controls the MBSFN area in the MME reduces the number of MCEs to which the paging request is transmitted from the MME, there is provided an advantage of being able to make effective use of the resources. Furthermore, because the amount of information to be transmitted decreases, there is provided an advantage of being able to make effective use of the resources.

Furthermore, there is considered a case in which the MME manages the MBSFN area ID related to the TA(MBMS) number as shown in FIG. 31[*c*], and also manages the MBSFN area ID and the cell IDs of an MBMS dedicated cell and an MBMS/Unicast-mixed cell which are included in the MBSFN area ID as shown in FIG. 31[*e*]. In this case, the MME, in step ST6310, transmits the paging request to the cells whose IDs are included in the MBSFN area ID which is managed not by an MCE but by the MME. As an example of the parameter included in the paging request at that time, there can be considered an identifier of the mobile terminal, or the like. As mentioned above, the method of managing the relation between an MBSFN area ID and cells whose IDs area included in the MBSFN area ID in the MME (FIG. 31 [e]) eliminates the necessity for an MCE to carry out processes regarding the transmission of a paging signal to the mobile terminal. Because this results in elimination of the necessity to add any function to each MCE, there can be provided an advantage of being able to avoid the complexity of each MCE. Furthermore, there can be provided an advantage of being able to reduce the processing load on each MCE.

Actually, the channel structure of a paging dedicated channel (DPCH) disclosed in Embodiment 8 and the method of mapping a paging signal onto the paging signal dedicated channel can be applied to an example of the structure of a channel onto which a paging signal in the frequency layer dedicated to MBMS transmission is mapped. The configuration and the method are shown in FIGS. 43, 44, and 45. Because the detailed explanation of the configuration and the method is disclosed in Embodiment 8, the explanation will be omitted hereafter.

Hereafter, the structure of a channel onto which a paging signal in a frequency layer dedicated to MBMS transmission is mapped will be explained with reference to an example shown in FIGS. 43 and 44. An MCE, in step ST6313, carries out scheduling of a paging signal destined for a mobile terminal in question. More specifically, the MCE determines the value of a PCFICH from the physical area for paging signal (the number of OFDM symbols) which is required according to the number of mobile terminals for each of which paging is occurring. Furthermore, the MCE determines to the howmanyth one of information elements mapped onto the physical area for paging signal on the MBSFN subframe number of the system frame of the SFN number acquired from the paging group number and the paging occasion of the mobile terminal in question determined in step ST6312 an identifier of the mobile terminal in question is allocated. By making the MCE carry out this scheduling, an identifier of the mobile terminal in question is transmitted from the same physical resources of base stations included in the MBSFN area. As a result, there can be provided an advantage of enabling each mobile terminal to receive a paging signal benefiting from an SFN gain by receiving the DPCH which is transmitted via a multi-cell transmission scheme in the MBSFN area. The MCE, in step ST6314, transmits a paging request for the mobile terminal in question to the base stations in the MBSFN area. As an example of parameters included in the paging request, an identifier (UE-ID, IMSI, S-TMSI, or the like) of the mobile terminal, the result of the scheduling of the paging signal carried out in step ST6313 (concretely, an SFN, an MBSFN subframe number, an information element number, and a PCFICH value), etc. can be considered. Each of the base stations in the MBSFN area, in step ST6315, receives the paging request from the MCE.

Instead of disposing only an IF between MME and MCE between the MME 103 and the MCE 801, an MME-MBMS GW interface can also be disposed between the MME 103 and an MBMS GW 802 (in more detail, an MBMS CP 802-1). Furthermore, the processes of steps ST6311 to ST6314, which are carried out by the MCE, can be carried out by the MBMS GW on behalf of the MCE. In this variant, the same advantages as those provided by the present invention are provided.

Each of the base stations in the MBSFN area, in step ST6316, determines the paging group and paging occasion of the mobile terminal in question. When determining them, each of the base stations uses the same computation expression as that used by the mobile terminal side. When the paging group and paging occasion of the mobile terminal in question are also informed in step ST6314, step ST6316 can be eliminated. As a result, there can be provided an advantage of reducing the control load on each base station in the MBSFN area. In contrast, in accordance with the method of, in step ST6316, determining the paging group and paging occasion in each base station in the MBSFN area without informing the paging group or paging occasion of the mobile terminal in question in step ST6314, there can be provided an advantage of being able to reduce the amount of information notified from the MCE to each base station in the MBSFN area, and making effective use of the resources. Each base station in the MBSFN area, in step ST6317, derives the radio frame number and the MBSFN subframe numbers via which to transmit the paging signal by using the identifier of the mobile terminal in question received in step ST6315, the result of the scheduling of the paging signal, etc. Each base station, in step ST6318, maps the PCFICH value onto the physical area of the PCFICH having the derived radio frame number and the derived MBSFN subframe numbers, and allocates the identifier of the mobile terminal in question to the information element number to map the identifier onto the physical area of the DPCH of the derived radio frame number and the derived MBSFN subframe numbers and transmit the identifier. The paging signal is transmitted to each base station in the MBSFN area. As the mapping method of mapping the identifier onto the paging-related area in the DPCH and the mapping method of mapping the identifier onto the concrete physical channel, etc. which are used at that time, the methods disclosed in Embodiment 8 can be used.

The mobile terminal, in step ST6302, receives the PCFICH in the MBSFN subframes of the group to which the mobile terminal belongs and which are acquired from the result of the determination of the paging group. The mobile terminal, in step ST6303, determines the number of OFDM symbols for the DPCH from the PCFICH. The mobile terminal, in step ST6304, receives and decodes the physical area onto which the DPCH in the same MBSFN subframes is mapped on the basis of the determined number of OFDM symbols for the DPCH. At that time, the mobile terminal carries out blind detection by carrying out an operation of calculating a correlation with the mobile-terminal-specific identification code. The mobile terminal, in step ST6305, determines whether it has detected the identifier of the mobile terminal itself through the blind detection carried out in step ST6304. When the mobile terminal has not detected the identifier of the mobile terminal itself, the mobile terminal makes a transition to step ST1788. In contrast, when the mobile terminal has detected the identifier of the mobile terminal itself, the mobile terminal makes a transition to step ST1819.

As a result, there can be disclosed a method of transmitting a paging signal to a mobile terminal currently receiving an MBMS service in a frequency layer dedicated to MBMS transmission, and a mobile communication system which enables the method to be implemented therein, which are a challenge of the present invention. Therefore, there is provided an advantage of enabling even a mobile terminal currently receiving an MBMS service in the frequency layer dedicated to MBMS transmission to receive a paging signal.

By using the method of transmitting a paging signal in a frequency layer dedicated to MBMS transmission, which is disclosed in this embodiment, the number of MBSFN subframes onto which a paging signal is mapped, and the number of radio frames having the MBSFN subframes can be increased. Therefore, it becomes able to reduce the number of mobile terminals which are mapped onto one MBSFN subframe, and therefore the physical area required to carry paging signals whose number is equal to the number of mobile terminals onto one MBSFN subframe can be reduced. Furthermore, because it is not necessary to determine the discontinuous reception cycle length in the MBMS transmission frequency layer depending on the length of each of the periods at which the MCCH is transmitted, the system becomes able to set up the discontinuous reception cycle length with flexibility.

As the method of transmitting a paging signal, the one in the case in which a paging occasion exists in each of all the radio frames excluding radio frames corresponding to the DRX periods is described above. As an alternative, a paging occasion can exist in one or more of all the radio frames excluding radio frames corresponding to the DRX periods. As a result, there is no necessity to provide a paging dedicated channel (DPCH) for carrying a paging signal in all the radio frames, it becomes able to transmit data for MBMS service via a radio frame onto which any paging signal is not mapped, and MBMS services can be speeded up and can increase in volume. A concrete method of allowing a paging occasion to exist in one or more of all the radio frames excluding radio frames corresponding to the DRX periods will be disclosed. A computation expression for determining the paging group is similarly given by IMSI mod K, where K is the number of paging groups.

A concrete example of the value of K is the number of MBSFN subframes in one radio frame. For example, in a case in which the number of MBSFN subframes in one radio frame is 10, K is equal to 10. In contrast, in a case in which the value of K is the number of MBSFN subframes in one radio frame excluding MBSFN subframes #0 and #5 onto which an SCH is mapped, K is equal to 8. By bringing the value of K (a remainder value at K) into correspondence with subframe numbers in one radio frame, each mobile terminal is enabled to know onto which subframe in one radio frame the paging information about the group to which the mobile terminal itself belongs is mapped from the value of the paging group determined according to the above-mentioned equation. Next, a correspondence about onto which radio frame the paging signal destined for the group to which the mobile terminal itself belongs is mapped is established. A concrete example of a computation expression for determining the radio frame is given as follows. First, a case in which there is no DRX period will be disclosed.

"Paging occurrence radio frame" (Paging Occasion)= (IMSI or K) mod X+n×(the discontinuous reception cycle length in the MBMS transmission frequency layer), where n: 0, 1, 2, or . . . , and Paging Occasion≤the maximum of SFN. SFN is an integer ranging from 0 to the maximum of SFN. X is the number of radio frames in each of which paging has occurred within a discontinuous reception cycle in the MBMS transmission frequency layer, and satisfies the following inequality: X≤the discontinuous reception cycle length (a number of radio frames) in the MBMS transmission frequency layer. The value of X (a remainder value at X) is associated with a radio frame number (SFN).

When the paging occurrence radio frame is determined in this way, paging can be made to occur in each of the X radio frames within a discontinuous reception cycle in the MBMS transmission frequency layer, and the value of the paging occasion determined according to the above-mentioned equation shows onto which radio frame the paging information destined for the mobile terminal itself is mapped. No paging occasion occurs in radio frames other than the radio frames associated with the value of X, and data for the MBMS service can be transmitted via the radio frames. In a case in which a radio frame in which paging occurs is periodic, the paging occurrence radio frame can be given by the following equation when, for example, the cycle length is TX.

"Paging occurrence radio frame" (Paging Occasion)= ((IMSI div K) mod (Int(T/TX)))×TX+n×(the discontinuous reception cycle length in the MBMS transmission frequency layer), where n: 0, 1, 2, or . . . , and Paging Occasion≤the maximum of SFN. SFN is an integer ranging from 0 to the maximum of SFN. TX satisfies the following inequality: TX≤the discontinuous reception cycle length (a number of radio frames) in the MBMS transmission frequency layer.

Because it becomes unnecessary to associate the above-mentioned value of X (the remainder value at X) with the radio frame number (SFN) by making a radio frame in which paging occurs periodic, the equation for determining the paging occasion can be simplified. Next, a case in which there is a DRX period will be disclosed.

"Paging occurrence radio frame" (Paging Occasion)= (IMSI div K)mod X+n×(the discontinuous reception cycle length in the MBMS transmission frequency layer), where n: 0, 1, 2, or . . . , and Paging Occasion≤the maximum of SFN. SFN is an integer ranging from 0 to the maximum of SFN. X is the number of radio frames in each of which paging occurs within a discontinuous reception cycle in the MBMS transmission frequency layer, and satisfies the following inequality: X≤(SFNmax-ΣDRX). The value of X (a remainder value of X) is associated with a radio frame number (SFN).

As an alternative, "paging occurrence radio frame" (Paging Occasion)=(IMSI div K) mod (Int(T/TX)))×TX+n×(the discontinuous reception cycle length in the MBMS transmission frequency layer), where n: 0, 1, 2, or . . . , and Paging Occasion≤the maximum of SFN. SFN is an integer ranging from 0 to the maximum of SFN. TX≤(SFNmax-ΣDRX). The paging occasion has a value which is obtained by renumbering the radio frames except those corresponding to the DRX periods.

Required ones of the above-mentioned parameters for the time of discontinuous reception at the time of MBMS reception have only to be informed according to the used computation expression for determining the paging group and paging occasion (paging occasion). For example, in the above-mentioned computation expression for determining the paging occasion, the parameters for the time of discontinuous reception at the time of MBMS reception include the discontinuous reception cycle length in the frequency layer dedicated to MBMS transmission, X, the correspondence between the value of X (the remainder value of X) and a radio frame number (SFN), TX, K, and the correspondence between the value of K (the remainder value of K) and a subframe. These parameters for the time of discontinuous reception at the time of MBMS reception, as well as the information about the scheduling of the MCCH, can be informed to the mobile terminal by using the BCCH from the MBMS dedicated cell in steps ST1723 and ST1724. Furthermore, the parameters for the time of discontinuous reception at the time of MBMS reception, as well as the MBMS area information, the DRX information for measurement in the unicast/mixed frequency layer, and the number of paging groups, can be informed to the mobile terminal by using the MCCH from the MBMS dedicated cell in steps ST1728 and ST1729. In this case, although the parameters required for the computation expression for determining the paging occasion have only to be informed, a parameter showing at which time (SFN) should be received when the mobile terminal performs a discontinuous reception operation can be used instead of the parameters required for the equation for determining the paging occasion. As a concrete example, an explicit receiving timing (SFN) and a discontinuous reception cycle length can be provided. Instead of including the correspondence between the value of X (the remainder value of X) and a radio frame number (SFN), and the correspondence between the value of K (the remainder value of K) and a subframe into the parameters, they can be predetermined. For example, in a casein which the number of subframes onto which the paging signal is mapped is expressed as K, the case in which the remainder value of K is 0 is associated with the first one of the subframes in one radio frame onto which the paging signal is mapped, the case in which the remainder value of K is 1 is associated with the second one of the subframes in one radio frame onto which the paging signal is mapped, . . . , and the case in which the remainder value of K is K−1 is associated with the K-th one of the subframes in one radio frame onto which the paging signal is mapped. By defining the correspondence between the value of K and a subframe in this way, the amount of signaling can be reduced and the capacity of transmission of MBMS services can be increased.

As the paging signal transmitting method, the method of allowing a paging occasion to exist in one or more of all the radio frames excluding radio frames corresponding to the DRX periods is shown above. This method can also be applied to a case in which MBSFN subframes corresponding to an MBSFN area is TDM-multiplexed. As previously mentioned, in the case in which MBSFN subframes corresponding to an MBSFN area is TDM-multiplexed, instead of (SFN-max-ΣDRX), the number of radio frames each having MBSFN subframes corresponding to the above-mentioned MBSFN area can be provided.

As mentioned above, the method of providing a physical channel dedicated to paging (DPCH), as disclosed in Embodiment 8, which is transmitted via a multi-cell transmission scheme in an MBSFN area, and carrying a paging signal onto this physical channel can be applied to a physical area onto which the paging signal is mapped. In this case, the DPCH does not have to be formed in all the radio frames corresponding to the MBSFN area, and has only to be formed in a radio frame in which a paging occasion occurs. As an alternative, the DPCH can be formed in all the MBSFN subframes in a radio frame, or can be formed in K MBSFN subframes in a radio frame. As a result, because it becomes able to transmit data for MBMS service via a radio frame in which the DPCH is not formed, MBMS services can be speeded up and can increase in volume. By thus providing the method of transmitting a paging signal, there is provided an advantage of being able to, even in a case in which a DRX period is provided in a frequency layer dedicated to MBMS transmission of an LTE system, enable an MBMS dedicated cell to transmit a paging signal in the frequency layer dedicated to MBMS transmission. In the paging method in accordance with the present invention, because communications are carried out by a unicast cell after paging, only a paging indicator (Paging Indicator: PI) informing the presence or absence of an incoming call can be transmitted as the paging information to be transmitted by a base station. Also in this case, the configuration of the DPCH disclosed in Embodiment 8 can be applied.

Embodiment 16

In Embodiment 2, the method of transmitting a paging signal from all cells in an MBSFN area transmitting an MBMS service which a mobile terminal is receiving or trying to receive is disclosed. In this embodiment, in order to enable a mobile terminal to receive a paging signal in a frequency layer dedicated to MBMS irrespective of whether an MBSFN area covering a plurality of MBSFN areas exists, a method of transmitting a paging signal from all cells in an MBSFN synchronization area (MBSFN Synchronization Area) by using a main PMCH will be disclosed. An explanation will be made focusing on a portion different from Embodiment 2. Portions which will not be explained specifically are the same as those explained in Embodiment 2.

As a physical channel onto which a paging signal is mapped, a main PMCH used for multi-cell transmission in all cells in an MBSFN synchronization area is used. A description about the main PMCH is made in Embodiment 9. The main PMCH is configured in such a way that synchronization is established in all the cells in the MBSFN synchronization area, and is subjected to SFN combining. One MBSFN area to which all the cells in the MBSFN synchronization area belong can be provided, and MBSFN subframes corresponding to this MBSFN area can be provided as the main PMCH. In this embodiment, a case in which time division multiplexing and code division multiplexing coexist for a PMCH provided for each MBSFN area will be explained as an example. The configuration of the physical channel (i.e., the main PMCH) which is transmitted via a multi-cell transmission scheme in the MBSFN synchronization area (MBSFN Synchronization area) is shown in FIG. 46. A cell #n1 is one located in an MBSFN area 1, a cell #n2 is one located in an MBSFN area 2, and a cell #n3 is one located in an MBSFN area 3. Furthermore, the cells #1, #2, and #3 also belong to an MBSFN area 4. The main PMCH is provided while being time-division-multiplexed with MBSFN subframes for other MBSFN areas, and is transmitted at a main PMCH repetition period. Because a concrete configuration of the main PMCH is disclosed in Embodiment 9, the explanation of the concrete configuration will be omitted.

A flow of the processing carried out by the mobile communication system described in this embodiment will be explained. Because a paging signal is mapped onto the main PMCH which is transmitted via a multi-cell transmission scheme in all the cells in the MBSFN synchronization area, the method of transmitting a paging signal to a mobile terminal differs from that shown in Embodiment 2. The portion different from the method disclosed in Embodiment 2 will be mainly shown. First, in addition to information about the scheduling of an MCCH, such as an MCCH repetition period length, information about the scheduling of the main PMCH has to be transmitted to each mobile terminal. Concretely, as the information about the scheduling of the main PMCH, the start timing of the main PMCH (an SFN and a starting point), a main PMCH repetition period length, a subframe number, a paging signal presence or absence indicator repetition period length, an MBMS-related modified or unmodified indicator repetition period length, the start timings (SFNs and starting points) of MBSFN subframes in which these indicators exist, subframe numbers, and so on are provided. The information about the scheduling of the main PMCH, as well as the information about the scheduling of the MCCH, can be transmitted from a MBMS dedicated cell to each mobile terminal by using a BCCH in steps ST1723 and ST1724. As an alternative, the information about the scheduling of the main PMCH, as well as MBMS area information, DRX information for measurement in a unicast/mixed frequency layer, and the number of paging groups, can be informed from an MBMS dedicated cell to each mobile terminal by using the MCCH in steps ST1728 and ST1729.

Because an MCH and a PCH mapped onto the main PMCH and a scrambling code used in the main PCH are transmitted via a multi-cell transmission scheme in the MBSFN synchronization area, the scrambling code differs from that corresponding to an MBSFN area (e.g., an MBSFN area 1) to which the MBMS dedicated cell which has made a search belongs. Therefore, this scrambling code also needs to be informed to each mobile terminal. This scrambling code, as well as the information about the scheduling of the main PMCH, can be informed from the MBMS dedicated cell to each mobile terminal by using the BCCH in steps ST1723 and ST1724. As an alternative, the scrambling code can be informed from the MBMS dedicated cell to each mobile terminal by using the MCCH in steps ST1728 and ST1729. Each mobile terminal receives the main PMCH on the basis of the main PMCH scheduling information received in step ST1724 or ST1729, and becomes able to descramble (descramble) the main PMCH by using this scrambling code received in step ST1724 or ST1729 to decode (decode) the main PMCH. Because this scrambling code is used in all the cells in the MBSFN synchronization area, it can be predetermined or can be transmitted from a serving cell to each mobile terminal together with a receivable f(MBMS) within the self-cell in the broadcasting of a receivable MBMS in steps ST1707 and ST1708. The number K of paging groups (referred to as Kmp) which is explained in Embodiment 9 and which is used in the channel structure of the main PMCH is transmitted, in steps ST1728 and ST1729, from the MBMS dedicated cell to each mobile terminal while being included in the MCCH of an MBSFN area (e.g., the MBSFN area 1) to which the MBMS dedicated cell which has made a search belongs, like in the case of Embodiment 2. Each mobile terminal, in step ST1735, determines a paging group, as discontinuous reception preparations at the time of MBMS reception, by using this number Kmp of paging groups.

Next, a tracking area (TA) list at a frequency dedicated to MBMS transmission will be explained. Because the main PMCH is transmitted via a multi-cell transmission scheme in all the cells in the MBSFN synchronization area, all of the MBSFN synchronization area can be made to be a range of transmission of a paging signal to each mobile terminal. Therefore, the tracking area of the MBMS transmission dedicated cell can be made to be all of the MBSFN synchronization area. In Embodiment 2, a TA list of each mobile terminal is shown in FIG. 31[a], and a table showing a correspondence between a TA(unicast) in the unicast/mixed frequency layer and cells belonging is shown in FIG. 31[b]. These TA list and table can be applied also to this embodiment. Next, in this embodiment, a table for associating a tracking area (TA) at a frequency dedicated to MBMS transmission with an MBSFN synchronization area is newly provided. A concrete example of tables showing a tracking area (TA) at a frequency dedicated to MBMS transmission is shown in FIG. 78. A table showing MBSFN area IDs and an f(MBMS) number, and an MBSFN synchronization area number (ID) to which they belong is shown in FIG. 78[a]. By using this table, an MBSFN synchronization area number is associated with MBSFN area IDs and an f(MBMS) number. A table showing a relation between an MBSFN synchronization area ID and a TA(MBMS) number is shown in FIG. 78[b]. By using this table, a TA(MBMS) number in the frequency layer dedicated to MBMS to which an MBSFN area from which a mobile terminal is receiving belongs is associated with an MBSFN synchronization area ID.

The details of management of a TA list will be explained. The method in the receiving state on the side of MBMS, which is disclosed in Embodiment 2, can be applied. As shown in FIG. 20, a mobile terminal, in step ST1742, transmits a "notification of the MBMS side receiving state" to a serving cell according to UL (Uplink) allocation received in step ST1741. As an example of parameters included in the "notification of the MBMS side receiving state", an identifier (UE-ID, IMSI, S-TMSI, or the like) of the mobile terminal, a frequency (f(MBMS)) at which the mobile terminal receives an MBMS service, and an MBSFN area number (ID) are included. The serving cell, in step ST1743, receives the MBMS side receiving state notification from the mobile terminal. The network side, in step ST1743, can know that the mobile terminal in question is receiving the MBMS service in the frequency layer dedicated to MBMS transmission without adding any uplink channel to the MBMS dedicated cell, i.e., without increasing the complexity of the mobile communication system. As a result, there is provided an advantage of enabling the general configuration in which the network side informs paging signals to be changed into the configuration of carrying out discontinuous reception at the time of MBMS reception. The serving cell, in step ST1744, transmits the MBMS side receiving state notification to an MME. The MME, in step ST1745, receives the MBMS side receiving state notification from the serving cell. The MME, in step ST1746, determines a tracking area (referred to as a TA(MBMS) from here on) in which the mobile terminal in question is receiving the MBMS service at the frequency dedicated to MBMS transmission. The MME determines the tracking area on the basis of the notification of the MBMS side receiving state, more specifically, the parameters of the MBMS side receiving state, more concretely, f(MBMS) and the MBSFN area number included in the parameters.

In a case in which there is a point-to-point correspondence between f(MBMS) and an MBSFN synchronization area, it is not necessary to use any MBSFN area number. Concretely, MBSFN area IDs are excluded from the table of FIG. 78[a]. Furthermore, no MBSFN area number is included in the parameters about the MBMS side receiving state in steps ST1742 to ST1745. By configuring the table and the parameters in this way, it becomes able to reduce the amount of signaling between each mobile terminal and each serving cell, between serving cells, and between MMES, and the efficiency of the radio resources can be improved.

The MME, in step ST1747, updates the tracking area lists of the mobile terminals in question. In the current 3GPP, it has been decided that a plurality of tracking areas (each referred to as a TA(unicast) from here on) is provided for each mobile terminal in a unicast/mixed frequency layer. However, in the current stage in which it has not decided whether to transmit a paging signal destined for a mobile terminal from an MBMS dedicated cell or in a frequency layer dedicated to MBMS transmission, an MBMS dedicated cell and a frequency layer dedicated to MBMS transmission as to a plurality of tracking areas are not taken into consideration. The MME, in step ST1747, carries out management (storage, addition, update, and deletion) of the TA list including a TA(unicast) and/or a TA(MBMS). The details of the management of the TA list of step ST1747 will be explained. The MME searches for the TA(MBMS) number which is managed within the MME on the basis of f(MBMS) and the MBSFN area IDs which the MME receives in step ST1745. In a concrete searching method, the tables as shown in FIG. 78 are used. The MME searches for the corresponding MBSFN synchronization area number (ID) by using FIG. 78[*a*] from f(MBMS) and the MBSFN area IDs received thereby, and further searches for the corresponding TA(MBMS) number by using FIG. 78 [b]. Next, the MME determines whether the TA(MBMS) which has been searched for as the result of the search exists in the TA list of the mobile terminal in question.

When the TA(MBMS) exists in the TA list, the MME stores the current TA list. In contrast, when the TA(MBMS) does not exist in the TA list, the MME adds the above-mentioned TA(MBMS) to the TA list of mobile terminal in question. The MME, in step ST1748, transmits a response signal Ack showing that the MME has received the notification of the MBMS side receiving state to the serving cell. As an example of the parameter included in Ack showing that the MME has received the notification of the MBMS side receiving state, the TA list of the mobile terminal in question can be considered. The serving cell, in step ST1749, receives the Ack to the notification of the MBMS side receiving state from the MME. The serving cell, in step ST1750, transmits the Ack to the notification of the MBMS side receiving state to the mobile terminal. The mobile terminal, in step ST1751, receives the Ack to the notification of the MBMS side receiving state from the serving cell. The mobile terminal, in step ST1752, moves to the frequency layer dedicated to MBMS transmission by changing the frequency set to the frequency converting unit 1107 thereof to change the center frequency to the frequency (f(MBMS)) in the frequency layer dedicated to MBMS transmission.

Next, the details of a process at a time when paging for the mobile terminal in question occurs in this embodiment will be explained. Paging for the mobile terminal in question occurs in step ST1773. The MME in which paging has occurred, in step ST1774, checks to see the TA list of the mobile terminal in question on the basis of an identifier (UE-ID, IMSI, S-TMSI, or the like) of the mobile terminal in question for which the paging is destined. The MME, in step ST1775, determines whether or not the TA(MBMS) is included in the TA list of the mobile terminal in question. As a concrete example, the MME searches through the TA list of the mobile terminal in question, such a list as shown in FIG. 31[*a*], on the basis of UE-ID. In a case in which the mobile terminal in question is the UE#1 (UE-ID#1) of FIG. 31[*a*], the MME determines that the TA(MBMS) is not included is the tracking area list. In contrast, in a case in which the mobile terminal in question is the UE#2 (UE-ID#2) of FIG. 31[*a*], the MME determines that the TA(MBMS) is included is the tracking area list because the TA(MBMS)#1 is included in the list. When the TA(MBMS) is not included in the tracking area list, the MME makes a transition to step ST1814. In contrast, when the TA(MBMS) is included in the tracking area list, the MME makes a transition to step ST1776. The MME, in step ST1776, transmits a paging request to MCEs. As the MCEs to which the MME transmits a paging request, there can be considered all MCEs each of which manages base stations which geographically overlap the base stations managed by the MME. As an example of parameters included in the paging request, there can be considered an identifier (UE-ID, IMSI, S-TMSI, or the like) of the mobile terminal, the TA(MBMS) number, and so on. At this time, instead of the TA(MBMS) number, either both f(MBMS) and MBSFN area IDs or an MBSFN synchronization area ID can be provided.

Each of the MCEs, in step ST1777, receives the paging request. Among the MCEs each of which receives the paging request in step ST1778, an MCE which controls either the MBSFN synchronization area ID or both f(MBMS) and the MBSFN area IDs which are informed thereto as a parameter included in the paging request and which are related to the TA(MBMS) number makes preparations for paging transmission. As an example of the preparations for paging transmission, an MCE which controls either the MBSFN synchronization area ID or both f(MBMS) and the MBSFN area IDs determines the paging group of the mobile terminal in question by using both the number Kmp of paging groups used for the main PMCH and the received paging request. When determining the paging group, the MCE uses the same computation expression as that used by the mobile terminal. As a concrete example, the MCE uses the same equation as that in step ST1735, i.e., paging group=IMSI mod Kmp. As mentioned above, because the MCE which has received the paging request has the information, as shown in, for example, the table of FIG. 78, for bringing a TA(MBMS) number into correspondence with an MCE, and the method of managing the correspondence can provide a relation between an MBSFN synchronization area ID or both f(MBMS) and MBSFN area IDs, and an MCE which controls them only within the architecture of MBMS services, that is, because the relation can be provided regardless of the MME, there can be provided an advantage of becoming able to make the mobile communication system have a high degree of flexibility.

Furthermore, there is considered a case in which the MME manages f(MBMS) and the MBSFN area IDs related to the TA(MBMS) number as shown in FIG. 78, and also manages f(MBMS) and the MBSFN area IDs and the number of an MCE which controls them as shown in FIG. 79[*a*]. In this case, the MME, in step ST1776, transmits the paging request only to an MCE which manages f(MBMS) and the MBSFN area IDs related to the TA(MBMS) number. As an example of a parameter included in the paging request at that time, there can be considered an identifier of the mobile terminal, or the like. Although the table showing the correspondence between f(MBMS) and MBSFN area IDs, and an MCE that controls them is shown in FIG. 79[*a*], a table showing a correspondence between an MBSFN synchronization area ID, instead of f(MBMS) and MBSFN area IDs, and the number of an MCE which controls it can be used. The MCE which receives the paging request in step ST1778 makes preparations for paging transmission, like in the above-mentioned case. As mentioned above, because the method of managing the relation between both f(MBMS) and MBSFN area IDs, and an MCE which controls them in the MME reduces the number of MCEs to which the paging request is transmitted from the MME, there is provided an advantage of being able to make effective use of the resources. Furthermore, because the amount of information to be transmitted decreases, there is provided an advantage of being able to make effective use of the resources.

Furthermore, there is considered a case in which the MME manages both f(MBMS) and MBSFN area IDs related to a TA(MBMS) number as shown in FIG. 78, and also manages both f(MBMS) and an MBSFN area ID, and the cell IDs of an MBMS dedicated cell and/or a mixed cell which is included in the MBSFN area ID as shown in FIG. 79[*b*]. In this case, the MME, in step ST1776, transmits the paging request to the cells whose IDs are included in MBSFN area ID which is not managed by an MCE but by the MME. As an example of a parameter included in the paging request at that time, there can be considered an identifier of the mobile terminal, or the like. Also in this case, a table showing a correspondence between an MBSFN synchronization area ID, instead of f(MBMS) and an MBSFN area ID, and the cell IDs of an MBMS dedicated cell and/or a mixed cell included in the MBSFN synchronization area can be provided instead of the table as shown in FIG. 79[b], like in the case of FIG. 79[a]. As mentioned above, the method of managing the relation between f(MBMS) and an MBSFN area ID, and cells whose IDs area included in the MBSFN area ID in the MME eliminates the necessity for an MCE to carry out processes regarding the transmission of a paging signal to the mobile terminal. Because this results in elimination of the necessity to add any function to each MCE, there can be provided an advantage of being able to avoid the complexity of each MCE. Furthermore, there can be provided an advantage of being able to reduce the processing load on each MCE. Because the method disclosed in Embodiment 9 can be applied to the structure of a channel onto which a paging signal in the frequency layer dedicated to MBMS transmission is mapped, the explanation of the method will be omitted hereafter.

An MCE, in step ST1779, carries out scheduling of a paging signal destined for a mobile terminal in question. More specifically, the MCE determines to the how-manyth one of information elements mapped onto the physical area allocated to the number of the paging group of the mobile terminal in question determined in step ST1778 an identifier of the mobile terminal in question is allocated. In this case, the physical area onto which the paging signal is mapped is the one for the main PMCH which is transmitted via a multi-cell transmission scheme in the MBSFN synchronization area, unlike in the case of using the method disclosed in Embodiment 2. By making the MCE which controls either the MBSFN synchronization area ID or both f(MBMS) and the MBSFN area IDs, which are related to the TA(MBMS) received in ST1777 carry out this scheduling, an identifier of the mobile terminal in question is transmitted from the same physical resources of base stations included in the MBSFN synchronization area. As a result, there can be provided an advantage of enabling each mobile terminal to receive a paging signal benefiting from an SFN gain by receiving the PMCH which is transmitted via a multi-cell transmission scheme in the MBSFN synchronization area. The MCE, in step ST1780, transmits a paging request for the mobile terminal in question to the base stations in the MBSFN area. As an example of parameters included in the paging request, an identifier (UE-ID, IMSI, S-TMSI, or the like) of the mobile terminal, the result of the scheduling of the paging signal carried out in step ST1779 (concretely, the SFN of the main PMCH, an MBSFN subframe number, and an information element number), etc. can be considered. Each of the base stations in the MBSFN area, in step ST1781, receives the paging request from the MCE.

In the scheduling of the paging signal destined for the mobile terminal, the paging signal can be mapped onto all the subframes via which the main PMCH is transmitted, or can be mapped onto some of the subframes via which the main PMCH is transmitted. For example, the paging signal can be mapped onto subframes onto which an MCCH or a main MCCH is mapped in the main PMCH. In the case in which the paging signal is mapped onto some of the subframes via which the main PMCH is transmitted, the subframes can be predetermined or can be broadcast from a unicast/mixed cell or an MBMS dedicated cell. As an alternative, the subframes can be derived by the network side (an MME and an MCE), the base station, and each mobile terminal by using an identical computation expression and identical parameters. These parameters and this computation expression can be predetermined, or can be broadcast from a unicast/mixed cell or an MBMS dedicated cell. By carrying the paging signal on all the subframes, paging to many mobile terminals can be carried out with a shorter delay time. In contrast, in the case in which the paging signal is mapped onto some subframes, a terminal which desires to receive the paging signal does not have to receive all the subframes via which the main PMCH is transmitted and has only to receive only the part of the subframes via which the paging signal is transmitted, and can therefore achieve its low power consumption. Furthermore, by carrying the paging signal on the subframes onto which the MCCH or the main MCCH is mapped, because each mobile terminal becomes able to receive the paging signal via the same subframes as those via which to receive the MCCH or the main MCCH, a mobile terminal which is receiving an MBMS becomes able to receive the paging with a shorter delay time.

Each of the base stations in the MBSFN area, in step ST1782, determines the paging group of the mobile terminal in question. As an example of the determining method, there is a method of determining the paging group of the mobile terminal in question by using the number Kmp of paging groups used for the main PMCH and the received paging request. When determining the paging group of the mobile terminal in question, each of the base stations uses the same computation expression as that used by the mobile terminal. As a concrete example, the MCE uses the same equation as that in step ST1735, i.e., paging group=IMSI mod Kmp. When the MCE, in step ST1780, also informs the paging group of the mobile terminal in question, step ST1782 can be omitted. As a result, there can be provided an advantage of reducing the control load on each base station in the MBSFN area, and so on. In contrast, in accordance with the method of, in step ST1782, determining the paging group in each base station in the MBSFN area without informing the paging group of the mobile terminal in question in step ST1780, there can be provided an advantage of being able to reduce the amount of information notified from the MCE to each base station in the MBSFN area, and making effective use of the resources. Each of the base stations in the MBSFN area, in step ST1783, transmits, instead of a PMCH, the main PMCH onto which the paging signal is mapped by using the identifier of the mobile terminal in question received in step ST1781, the result of the scheduling of the paging signal, the paging group of the mobile terminal in question determined in step ST1782, etc. The methods explained in Embodiment 9 can be used as the method of mapping to the paging-related region in the main PMCH at that time and the concrete method of mapping to the physical channel, etc.

The mobile terminal, in step ST1784, receives a paging-related modified or unmodified indicator not in a PMCH but in the main PMCH, the indicator corresponding to the paging group determined in step ST1735 of the mobile terminal itself. The mobile terminal, in step ST1785, determines whether or not there is a change in the paging-related modified or unmodified indicator. When there is no change in the paging-related modified or unmodified indicator, the mobile terminal makes a transition to step ST1788. In contrast, when there is a change in the paging-related modified or unmodified indicator, the mobile terminal makes a transition to step ST1786. The mobile terminal then, in step ST1786, receives and decodes the physical area onto which the paging-related information of the paging group of the mobile terminal itself is mapped. At that time, the mobile terminal carries out blind detection by carrying out an operation of calculating a correlation with the mobile-terminal-specific identification code. The mobile terminal, in step ST1787, determines whether it has detected the identifier of the mobile terminal itself through the blind detection carried out in step ST1786. When the mobile terminal has not detected the identifier of the mobile terminal itself, the mobile terminal makes a transition to step ST1788. In contrast, when the mobile terminal has detected the identifier of the mobile terminal itself, the mobile terminal makes a transition to step ST1814. By configuring the method as mentioned above, each mobile terminal becomes able to receive the paging signal in the frequency layer dedicated to MBMS irrespective of whether an MBSFN area covering a plurality of MBSFN areas exists.

In this embodiment, the method of transmitting a paging request from an MME to an MCE, like that shown in Embodiment 2, is shown. As another method, a paging request can be transmitted from an MME to an MBMS GW, instead of transmitting a paging request from an MME to an MCE. More concretely, a paging request can be transmitted from an MME to an MBMS CP in an MBMS GW. This is because the channel onto which the paging signal is mapped is transmitted via a multi-cell transmission scheme in the MBSFN synchronization area. The MBMS CP which has received the paging request transmits the paging request directly to an eNB without making it pass through an MCE. In this case, what is necessary is just to newly provide an IF between the MME 103 and the MBMS GW802 or the MBMS CP 802-1 in the whole architecture of the mobile communication system as disclosed in FIG. 10 which is used in the present invention. By using this IF, the above-mentioned paging request is transmitted from the MME to the MBMS GW or the MBMS CP. The MBMS GW or the MBMS CP which has received the paging request transmits the paging request signal to all eNBs in the MBSFN synchronization area by using an IF M1.

Next, a process at a time when paging for the mobile terminal in question occurs in this case will be explained. In step ST1773, paging to the mobile terminal in question occurs. The MME in which paging has occurred, in step ST1774, checks to see the TA list of the mobile terminal in question on the basis of an identifier (UE-ID, IMSI, S-TMSI, or the like) of the mobile terminal in question for which the paging is destined. The MME, in step ST1775, determines whether or not the TA(MBMS) is included in the TA list of the mobile terminal in question. When the TA(MBMS) is not included in the tracking area list, the MME makes a transition to step ST1814. In contrast, when the TA(MBMS) is included in the tracking area list, the MME makes a transition to step ST1776. The MME, in step ST1776, transmits a paging request not to MCEs but to MBMS CPs. As the MBMS CPs to which the MME transmits a paging request, there can be considered all MBMS CPs each of which manages a frequency layer dedicated to MBMS transmission which the base stations managed by the MME can receive. As an example of parameters included in the paging request, there can be considered an identifier (UE-ID, IMSI, S-TMSI, or the like) of the mobile terminal, the TA(MBMS) number, and so on. At this time, instead of the TA(MBMS) number, either both f(MBMS) and MBSFN area IDs or an MBSFN synchronization area ID can be provided. Each of the MBMS CPs, instead of MCEs, in step ST1777, receives the paging request. Among the MBMS CPs each of which receives the paging request in step ST1778, an MBMS CP which controls either the MBSFN synchronization area ID or both f(MBMS) and the MBSFN area IDs which are informed thereto as a parameter included in the paging request and which are related to the TA(MBMS) number makes preparations for paging transmission. As an example of the preparations for paging transmission, an MBMS CP which controls either the MBSFN synchronization area ID or both f(MBMS) and the MBSFN area IDs determines the paging group of the mobile terminal in question by using both the number Kmp of paging groups used for the main PMCH and the received paging request.

When determining the paging group of the mobile terminal in question, the MBMS CP uses the same computation expression as that used by the mobile terminal.

As a concrete example, the MBMS CP uses the same equation as that in step ST1735, i.e., paging group=IMSI mod Kmp. Because the method disclosed in Embodiment 9 can be applied to the structure of a channel onto which a paging signal in the frequency layer dedicated to MBMS transmission is mapped, the explanation of the method will be omitted hereafter. The MBMS CP, in step ST1779, carries out scheduling of the paging signal destined for the mobile terminal in question. More specifically, the MBMS CP determines to the how-manyth one of information elements mapped onto the physical area allocated to the number of the paging group of the mobile terminal in question determined in step ST1778 an identifier of the mobile terminal in question is allocated. By making the MBMS CP carry out this scheduling, an identifier of the mobile terminal in question is transmitted from the same physical resources of base stations included not in the MBSFN area but in the MBSFN synchronization area. As a result, there can be provided an advantage of enabling each mobile terminal to receive a paging signal benefiting from an SFN gain by receiving the main PMCH which is transmitted via a multi-cell transmission scheme in the MBSFN synchronization area. The MBMS CP, in step ST1780, transmits a paging request for the mobile terminal in question to the base stations in the MBSFN synchronization area. As an example of parameters included in the paging request, an identifier (UE-ID, IMSI, S-TMSI, or the like) of the mobile terminal, the result of the scheduling of the paging signal carried out in step ST1779 (concretely, an SFN, an MBSFN subframe number, and an information element number), etc. can be considered. Each of the base stations in the MBSFN synchronization area, in step ST1781, receives the paging request from the MBMS CP.

Each of the base stations in the MBSFN synchronization area, in step ST1782, determines the paging group of the mobile terminal in question. As an example of the determining method, there is a method of determining the paging group of the mobile terminal in question by using the number Kmp of paging groups used for the main PMCH and the received paging request. When determining the paging group of the mobile terminal in question, each of the base stations uses the same computation expression as that used by the mobile terminal. As a concrete example, each of the base stations uses the same equation as that in step ST1735, i.e., paging group=IMSI mod Kmp. When the MBMS CP, in step ST1780, also informs the paging group of the mobile terminal in question, step ST1782 can be omitted. As a result, there can be provided an advantage of reducing the control load on each base station in the MBSFN synchronization area, and so on. In contrast, in accordance with the method of, in step ST1782, determining the paging group in each base station in the MBSFN synchronization area without informing the paging group of the mobile terminal in question in step ST1780, there can be provided an advantage of being able to reduce the amount of information notified from the MBMS CP to each base station in the MBSFN synchronization area, and making effective use of the resources. Each of the base stations in the MBSFN synchronization area, in step ST1783, transmits the main PMCH onto which the paging signal is mapped by using the identifier of the mobile terminal in question received in step ST1781, the result of the scheduling of the paging signal, the paging group of the mobile terminal in question determined in step ST1782, etc. The methods explained in Embodiment 9 can be used as the method of mapping to the paging-related region in the main PMCH at that time and the concrete method of mapping to the physical channel, etc.

The mobile terminal, in step ST1784, receives a paging-related modified or unmodified indicator not in a PMCH but in the main PMCH, the indicator corresponding to the paging group determined in step ST1735 of the mobile terminal itself. The mobile terminal, in step ST1785, determines whether or not there is a change in the paging-related modified or unmodified indicator. When there is no change in the paging-related modified or unmodified indicator, the mobile terminal makes a transition to step ST1788. In contrast, when there is a change in the paging-related modified or unmodified indicator, the mobile terminal makes a transition to step ST1786. The mobile terminal then, in step ST1786, receives and decodes the physical area onto which the paging-related information of the paging group of the mobile terminal itself is mapped. At that time, the mobile terminal carries out blind detection by carrying out an operation of calculating a correlation with the mobile-terminal-specific identification code. The mobile terminal, in step ST1787, determines whether it has detected the identifier of the mobile terminal itself through the blind detection carried out in step ST1786. When the mobile terminal has not detected the identifier of the mobile terminal itself, the mobile terminal makes a transition to step ST1788. In contrast, when the mobile terminal has detected the identifier of the mobile terminal itself, the mobile terminal makes a transition to step ST1814.

By configuring the method as mentioned above, each mobile terminal becomes able to receive the paging signal in the frequency layer dedicated to MBMS irrespective of whether an MBSFN area covering a plurality of MBSFN areas exists. Although the case in which the MME and the MBMS CP exist separately is shown above, the MBMS CP can have the function of the MME. Because any long-distance physical IF does not have to be disposed between the MME (or EPC) and the MBMS GW or the MBMSCP by making the MBMS CP have the function of the MME, the system can be configured in such a way as to offer a high level of security at a low cost, and a delay time occurring in a signal transmitted between the MME (or EPC) and the MBMS GW or MBMS CP can also be reduced. Therefore, it becomes able to reduce a control delay time, in this case, a delay time occurring in the paging control.

As shown in this embodiment and Embodiment 2, the method of deriving a TA(MBMS) number in an MME and adding this TA(MBMS) number to the TA list of each mobile terminal in a case in which the tracking area in the frequency layer dedicated to MBMS transmission is an MBSFN synchronization area or an MBSFN area is disclosed above. The present invention is not limited to the TA list, and a list including mobile terminals, and f(MBMS) and an MBSFN area ID which each of the mobile terminals receives can be directly formed instead of the TA list. In this case, the MME, in step ST1774, has only to check to see the directly-formed list instead of the TA list of the UE in question. Furthermore, in this case, the MME, in steps ST1776 and ST1777, has only to transmit and receive f(MBMS) and the MBSFN area ID, instead of transmitting and receiving the TA(MBMS). The MME can transmit and receive f(MBMS) and the MBSFN area ID because the TA is provided not for each cell, but for each MBSFN area or each MBSFN synchronization area.

In this embodiment, the case in which time division multiplexing and code division multiplexing coexist for a PMCH provided for each MBSFN area is explained as an example, though this embodiment can also be applied to a case in which no overlapping MBSFN areas exist, and either TDM or CDM exists for a PMCH provided for each MBSFN area.

As a result, there can be disclosed a method of transmitting a paging signal to a mobile terminal currently receiving an MBMS service in a frequency layer dedicated to MBMS transmission, and a mobile communication system which enables the method to be implemented therein, which are a challenge of the present invention. Therefore, there is provided an advantage of enabling even a mobile terminal currently receiving an MBMS service in the frequency layer dedicated to MBMS transmission to receive a paging signal.

By using the method of transmitting a paging signal in a frequency layer dedicated to MBMS transmission, which is disclosed in this embodiment, each mobile terminal is enabled to receive a paging signal by receiving MBSFN subframes onto which a main PMCH is mapped in a similar way even if the mobile terminal is receiving or trying to receive an MBMS service in any MBSFN area. Therefore, there is provided an advantage of being able to simplify the process also when each mobile terminal changes the MBSFN area which the mobile terminal receive to receive the MBMS service.

Embodiment 17

In Embodiment 2, the method of transmitting a paging signal from all cells in an MBSFN area each of which transmits an MBMS service which a mobile terminal is receiving or trying to receive is disclosed. Furthermore, in Embodiment 16, the method of transmitting a paging signal from all cells in an MBSFN synchronization area is disclosed. However, it can also be expected that an MBSFN area and an MBSFN synchronization area are huge areas geographically. In such a case, transmission of a paging signal destined for a mobile terminal from a cell which does not contribute to SFN combining in the mobile terminal causes wasted radio resources and hence reduction in the system capacity. Therefore, there is a necessity to limit the cells each of which transmits a paging signal to a mobile terminal to a cell in which the mobile terminal is being located, and neighboring cells. In order to satisfy this necessity, a method of defining a serving cell on a unicast side of a mobile terminal and an arbitrary MBMS dedicated cell geographically corresponding to the mobile terminal as a tracking area of the mobile terminal, and transmitting a paging signal from some cells in an MBSFN area (or in an MBSFN synchronization area) belonging to this tracking area will be disclosed hereafter. An explanation will be made focusing on a portion different from Embodiment 2. Portions which will not be explained specifically are the same as those explained in Embodiment 2.

Figures 80, 81:
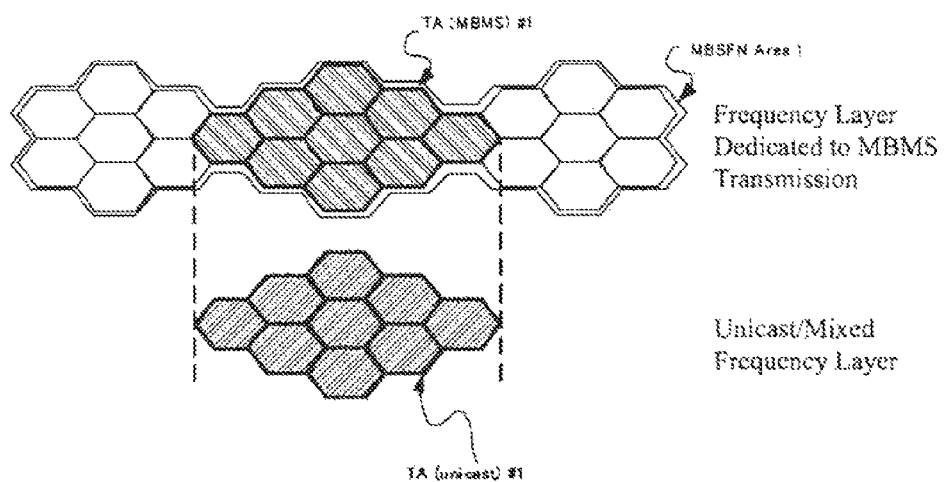
FIG. 80 is a view explaining an arbitrary MBMS dedicated cell in one MBSFN area being determined as a tracking area.
FIG. 81 is a view explaining the details of a tracking area list in Embodiment 17.

In order to limit the cells each of which transmits a paging signal to a mobile terminal to a cell in which the mobile terminal is being located, and neighboring cells, arbitrary MBMS dedicated cells geographically corresponding to a tracking area on a unicast side of the mobile terminal and located in an MBSFN area or an MBSFN synchronization area from which the mobile terminal is receiving or trying to receive an MBMS are defined as a tracking area. A base station for a frequency layer dedicated to MBMS has an arrangement position which is shared with a cell in a unicast/mixed frequency layer in such a way as to be located at the same position as the cell, though the base station is configured in such a way as to have both devices (an antenna and so on) used for the frequency layer dedicated to MBMS, and those used for the unicast/mixed frequency layer. In order to offer an MBMS service in spot, the base station for the frequency layer dedicated to MBMS can be disposed in a part of a cell in the unicast/mixed frequency layer. In order to bring the tracking area on the unicast side into geographical correspondence with the tracking area of the MBMS dedicated cell, a cell for the frequency layer dedicated to MBMS which is the same as a cell in the tracking area in the unicast/mixed frequency layer has only to be defined as a cell in the tracking area in the former case. In the latter case, a cell for the frequency layer dedicated to MBMS existing in the tracking area in the unicast/mixed frequency layer has only to be defined as a cell in the tracking area. FIG. 80 shows a view in which arbitrary MBMS dedicated cells in one MBSFN area are defined as a tracking area as an example. In one MBSFN area (MBSFN area 1) in the frequency layer dedicated to MBMS transmission, MBMS dedicated cells (a tracking area TA(MBMS) #1 in the frequency layer dedicated to MBMS transmission) shown by sloped lines, and MBMS dedicated cells which are not shown by any sloped lines are configured. In the figure, the TA(MBMS) is configured in such a way as to geographically correspond to the tracking area (TA(unicast) #1) in the unicast/mixed frequency layer. Each MBMS dedicated cell in TA(MBMS) #1 transmits a paging signal, and any other MBMS dedicated cell does not transmit a paging signal. In this case, a cell which transmits a paging signal to a mobile terminal and a cell which does not transmit any paging signal to the mobile terminal may exist within an identical MBSFN area (or an identical MBSFN synchronization area), and signals different between the cells may be transmitted to the mobile terminal via a transmission scheme which is not a multi-cell transmission one. Because each mobile terminal cannot selectively limit the cells from each of which it receives a paging signal, each mobile terminal also receives a signal which is transmitted via a transmission scheme which is not a multi-cell transmission scheme and this results in a receive error being caused therein.

A different signal transmitted from a cell which does not transmit any paging signal causes degradation in the quality of reception of the desired paging signal. Particularly, a mobile terminal being located in the vicinity of a boundary between a cell which transmits a paging signal and a cell which does not transmit any paging signal has an increasing number of receive errors, and therefore has a problem of becoming unable to receive the paging signal therefor. The configuration of a channel for paging signal to solve these problems is disclosed in Embodiment 10. Hereafter, the method disclosed in Embodiment 10 is applied to the channel configuration for paging signal. A case in which code division multiplexing is performed on a PMCH provided for each MBSFN area will be explained as an example. The configuration of a PMCH provided for each MBSFN area is shown in FIG. 40. A cell #n1 is one located in an MBSFN area 1, a cell #n2 is one located in an MBSFN area 2, and a cell #n3 is one located in an MBSFN area 3. In the cell #n1, the PMCH corresponding to the MBSFN area 1 is transmitted, in the cell #n2, the PMCH corresponding to the MBSFN area 2 is transmitted, and in the cell #n3, the PMCH corresponding to the MBSFN area 3 is similarly transmitted. In this case, the PMCH can be continuous or discontinuous in time. In a case in which the PMCH is discontinuous in time, the length of each of repetition periods at which an MBSFN frame cluster (MBSFN frame cluster) via which the PMCH corresponding to the MBSFN area is transmitted is repeated is expressed as the MBSFN frame cluster repetition period length. In contrast, in a case in which the PMCH is continuous in time, the MBSFN frame cluster repetition period length can be set to 0 or it is not necessary to specify this repetition period. An MCCH and an MTCH can be divided in time and mapped onto the PMCH, and can be further divided in time and mapped onto a physical area which is transmitted via a multi-cell transmission scheme. For example, the MCCH and the MTCH can be mapped onto different MBSFN subframes which are a physical area onto which they are mapped as a result. The length of each of repetition periods at which the MCCH is repeated is expressed as the MCCH repetition period length.

As to the configuration of a physical area for paging signal, the method of carrying a paging signal, as well as an MCCH, onto a PMCH, as disclosed in FIG. 46, the method of mapping a paging signal onto a PMCH as one information element of an MCCH, the method of using an indicator, the method of dividing mobile terminals into paging groups, the method of providing a paging dedicated channel and carrying a paging signal onto the paging dedicated channel, as disclosed in FIG. 42, or the method of providing a main PMCH and carrying a paging signal onto the main PMCH, as disclosed in FIG. 49, can be applied. A cell which transmits a paging signal and a cell which does not transmit any paging signal are made to use different methods when mapping a paging signal onto a physical area onto which the paging signal is mapped. For example, in a case in which a cell which transmits a paging signal to a mobile terminal for which an incoming call is occurring, and a cell which does not transmit any paging signal to the mobile terminal exist within an MBSFN area, more specifically, in a cell which transmits a paging signal to a mobile terminal for which an incoming call is occurring, a base station connects a switch 2401 thereof to a terminal a by using this switch, as disclosed in FIG. 50. The base station then multiplies the paging signal to the mobile terminal by an identification number specific to the mobile terminal, adds a CRC to the result of the multiplication, and carries out a process including encoding and rate matching. Because the switch 2401 is connected to the terminal a, information processed as above for each mobile terminal is allocated to a control information element unit. In a cell which does not transmit any paging signal to the mobile terminal for which an incoming call is occurring, abase station connects a switch 2401 thereof to a terminal b by using this switch, as disclosed in FIG. 50. A code for padding for each cell is provided without using the paging signal destined for the mobile terminal, and this code for padding is allocated to a control information element unit.

In this case, a control information element unit allocated to a mobile terminal has an area which is the same for both a cell which transmits a paging signal to the mobile terminal and the cell which does not transmit any paging signal to the mobile terminal. Accordingly, each base station can easily switch between pieces of information to be allocated to a mobile terminal by using the switch thereof according to whether the base station exists in a cell which transmits a paging signal to the mobile terminal or a cell which does not transmit any paging signal to the mobile terminal. In addition, by making the size of the area of a control information element unit allocated to a mobile terminal be equal for each of all mobile terminals, the length of the code for padding defined for each cell can be predetermined. As a result, a control operation of embedding the code for padding can be simplified. As a concrete example of the code for padding for each cell disposed in a cell which does not transmit any paging signal, the code is set to all 0s or all 1s, as shown in FIG. 51. By providing the code for padding in this way, each mobile terminal can cancel components of "0" or "1" transmitted from a cell which does not transmit any paging signal to the mobile terminal by using an interference elimination function, such as an interference canceller, in the receiver thereof, and becomes able to carry out SFN combining of only the paging signal transmitted from a cell which transmits the paging signal. The code for padding can be alternatively set to a random value. In this case, a random value is derived for each cell, and padding with this random value is carried out. By configuring the code for padding in this way, because signals transmitted from cells each of which does not transmit any paging signal to a mobile terminal are random signals which differ from one another, they are canceled out in the mobile terminal and therefore the paging signal component transmitted from a cell which transmits the paging signal to the mobile terminal becomes strong relatively. Therefore, it becomes able to reduce receive errors occurring in the paging signal in the correlation operation. Therefore, even in a case in which a cell which transmits a paging signal to a mobile terminal and a cell which does not transmit any paging signal to the mobile terminal exist in an MBSFN area, the mobile terminal becomes able to receive the paging signal. Because the detailed configuration of the channel for paging signal is explained in Embodiment 10, the explanation of the detailed configuration will be omitted hereafter.

Next, a tracking area (TA) list at a frequency dedicated to MBMS transmission will be explained. In order to limit the cells each of which transmits a paging signal to a mobile terminal to a cell in which the mobile terminal is being located, and neighboring cells, arbitrary MBMS dedicated cells geographically corresponding to a tracking area on a unicast side of the mobile terminal and located in an MBSFN area or an MBSFN synchronization area from which the mobile terminal is receiving or trying to receive an MBMS are defined as a tracking area (TA(MBMS)). In this example, a method of defining arbitrary MBMS dedicated cells in an MBSFN area from which a mobile terminal is receiving or trying to receive an MBMS as a TA will be explained. In Embodiment 2, a TA list of each mobile terminal is shown in FIG. 31[a], and a table showing a correspondence between a tracking area (TA(unicast)) in the unicast/mixed frequency layer and cells belonging is shown in FIG. 31[b]. These TA list and table can be applied also to this embodiment. In Embodiment 2, a table for associating f(MBMS) and an MBSFN area ID with a TA(MBMS) number, as shown in FIG. 31[c], is provided so as to make it possible to derive a tracking area in the frequency layer dedicated to MBMS transmission from f(MBMS) and the ID of an MBSFN area which a mobile terminal is receiving or trying to receive an MBMS. In this embodiment, because a cell which transmits a paging signal to a mobile terminal and a cell which does not transmit any paging signal to the mobile terminal exist in an MBSFN area, a tracking area in the frequency layer dedicated to MBMS transmission cannot be simply brought into correspondence with f(MBMS) and an MBSFN area ID. In order to solve this problem, a table for associating a TA(MBMS) ID with f(MBMS) and a TA (unicast) ID is provided, and a table for associating a TA(MBMS) ID with an MBMS transmission dedicated cell geographically corresponding to a TA(unicast) is further provided. A concrete example of the tables showing a TA(MBMS) is shown in FIG. 81. The table for associating a TA(MBMS) ID with f(MBMS) and a TA(unicast) ID is shown in FIG. 81[a], and the table for associating a TA(MBMS) ID with an MBMS transmission dedicated cell geographically corresponding to a TA (unicast) is shown in FIG. 81[b]. By specifying an MBMS transmission dedicated cell geographically corresponding to a TA (unicast) by using a TA(MBMS), and limiting paging signal transmission to a cell in this TA(MBMS) on the basis of these tables, it becomes able to provide a cell which transmits a paging signal to a mobile terminal and a cell which does not transmit any paging signal to the mobile terminal as cells in an MBSFN area.

The details of management of a TA list will be explained. The method about the MBMS side receiving state, which is disclosed in Embodiment 2, can be applied. In this case, in a process of determining the TA(MBMS) of a mobile terminal in question, an MME, in step ST1746 of FIG. 20, determines the tracking area on the basis of a TA (unicast) ID and a notification of the MBMS side receiving state of the mobile terminal. More specifically, the MME can determine the tracking area on the basis of parameters of the MBMS side receiving state as a concrete example of the notification of the MBMS side receiving state, more concretely, f(MBMS) included in the parameters. In the management of the tracking area list of the mobile terminals in question in step ST1747, the MME searches for a TA(MBMS) number which it manages therein on the basis of f(MBMS) received in step ST1745 and the TA (unicast) determined in steps ST1714 to ST1716 so as to change the tracking area list. As a concrete searching method, the table as shown in FIG. 81[a] is used. Next, the MME determines whether the TA(MBMS) which has been searched for as the result of the search exists in the TA list (FIG. 31[a]) of the mobile terminal in question. When the TA(MBMS) exists in the TA list, the MME stores the current TA list. In contrast, when the TA(MBMS) does not exist in the TA list, the MME adds the above-mentioned TA(MBMS) to the TA list of the mobile terminal in question. By changing a part of the process of making a notification of the MBMS side receiving state disclosed in Embodiment 2 as mentioned above, the management of a TA in accordance with this embodiment can be implemented.

In the above-mentioned example, the mobile terminal, in ST1742, informs the number of an MBSFN area from which it is receiving or trying to receive an MBMS to the serving cell, and the serving cell, in ST1744, informs this MBSFN area number to the MME, like in the case of Embodiment 2. However, in the invention related to this embodiment, the MBSFN area number information is not required in the management of the TA(MBMS). Therefore, there is no necessity to inform the MBSFN area number in steps ST1742 and ST1744, and therefore the amount of signaling between the mobile terminal and the serving cell and between the serving cell and the MME can be reduced.

Next, the details of a process at a time when paging for the mobile terminal in question occurs in this embodiment will be explained. Hereafter, a case of transmitting a paging signal from an arbitrary MBMS dedicated cell geographically corresponding to a serving cell on a unicast side of a mobile terminal and located in an MBSFN area in order to limit the cells each of which transmits a paging signal to the mobile terminal to a cell in which the mobile terminal is being located, and neighboring cells will be explained. In a process of carrying out discontinuous reception at the time of MBMS reception disclosed in Embodiment 2, a tracking area (TA (MBMS)) in a frequency layer dedicated to MBMS transmission is configured in such a way as to be associated with a tracking area (TA (unicast)) in a unicast/mixed frequency layer, as mentioned above. Furthermore, a method of mapping a paging signal is implemented in such a way that it is changed to allocate different pieces of information in a cell according to whether the cell is a cell which transmits a paging signal or a cell which does not transmit any paging signal. An explanation will be made more concretely. Paging for a mobile terminal in question occurs in step ST1773. The MME in which paging has occurred, in step ST1774, checks to see the TA list of the mobile terminal in question on the basis of an identifier (UE-ID, IMSI, S-TMSI, or the like) of the mobile terminal in question for which the paging is destined. The MME, in step ST1775, determines whether or not the TA(MBMS) is included in the TA list of the mobile terminal in question. As a concrete example, the MME searches through the tracking area list of the mobile terminal in question, such as a list as shown in FIG. 31[*a*], on the basis of the UE-ID. In a case in which the mobile terminal in question is the UE#1 (UE-ID#1) of FIG. 31[*a*], the MME determines that the TA(MBMS) is not included in the tracking area list. In contrast, in a case in which the mobile terminal in question is the UE#2 (UE-ID#2) of FIG. 31[*a*], the MME determines that the TA(MBMS) is included is the tracking area list because the TA(MBMS) #1 is included in the list. When the TA(MBMS) is not included in the tracking area list, the MME makes a transition to step ST1814. In contrast, when the TA(MBMS) is included in the tracking area list, the MME makes a transition to step ST1776.

The MME, in step ST1776, transmits a paging request to MCEs. As the MCEs to which the MME transmits a paging request, there can be considered all MCEs each of which manages base stations which geographically overlap the base stations managed by the MME. Furthermore, the MME can be made to have one or more pieces of MCE information corresponding to each frequency layer dedicated to MBMS transmission (f(MBMS)), and can transmit a paging request to one or more MCEs corresponding to f(MBMS) informed from the mobile terminal on the basis of f(MBMS). This method can also be used in Embodiment 2. As an example of parameters included in the paging request, there can be considered an identifier (UE-ID, IMSI, S-TMSI, or the like) of the mobile terminal, the TA(MBMS) number, and so on. At this time, instead of the TA(MBMS) number, both f(MBMS) and a TA(unicast) number can be provided. Each of the MCEs, in step ST1777, receives the paging request. Among the MCEs each of which receives the paging request in step ST1778, an MCE which controls the MBMS dedicated cell which is related to either the TA(MBMS) number or both f(MBMS) and the TA (unicast) number which are informed thereto as a parameter included in the paging request makes preparations for paging transmission. As a concrete example of the paging transmission preparations, the same method as that shown in Embodiment 2 can be applied. The MCE which controls the MBMS dedicated cell determines the paging group of the mobile terminal in question by using the number KMBMS of paging groups of the self-base station (the MBSFN area to which the base stations belong), and the received paging request. When determining the paging group of the mobile terminal in question, the MCE uses the same computation expression as that used by the mobile terminal. As a concrete example, the MCE uses the same equation as that in step ST1735, i.e., paging group=IMSI mod KMBMS. As mentioned above, because the MCE which has received the paging request implements the method of bringing a TA(MBMS) number into correspondence with an MBMS dedicated cell, more specifically, forms the table showing the correspondence information as shown in FIG. 81[*b*] therein in the case of this embodiment, instead of the table as shown in FIG. 31[*c*] in the case of Embodiment 2, and the method of deriving the correspondence can provide a relation between an MBMS dedicated cell and an MCE which controls this cell only within the architecture of MBMS services, that is, because the relation can be provided regardless of the MME, there can be provided an advantage of becoming able to make the mobile communication system have a high degree of flexibility.

The MCE, in step ST1779, carries out scheduling of the paging signal destined for the mobile terminal in question. More specifically, the MCE determines to the how-manyth one of information elements mapped onto the physical area allocated to the number of the paging group of the mobile terminal in question determined in step ST1778 an identifier of the mobile terminal in question is allocated. By making the MCE carry out this scheduling, an identifier of the mobile terminal in question is transmitted from the same physical resources of base stations included in the MBSFN area. As a result, there can be provided an advantage of enabling the mobile terminal to receive the paging signal benefiting from an SFN gain by receiving an MCCH which is transmitted via a multi-cell transmission scheme in the MBSFN area. The MCE, in step ST1780, transmits a paging request for the mobile terminal in question to base stations each of which is an MBMS dedicated cell included in the MBSFN area which the MCE controls. As an example of parameters included in the paging request, in addition to an identifier (UE-ID, IMSI, S-TMSI, or the like) of the mobile terminal, the result of the scheduling of the paging signal carried out in step ST1779 (concretely, SFN, an MBSFN subframe number, and an information element number), etc., which are disclosed in Embodiment 2, paging transmission enable or disable information can be considered. The paging transmission enable or disable information which is newly provided in this embodiment is the information showing whether or not each MBMS dedicated cell transmits a paging signal. As a concrete example of the paging transmission enable or disable information, 1-bit information ("1" or "0") is provided. The MCE, in ST1780, transmits the paging transmission enable information of "1" to each MBMS dedicated cell existing in the table of FIG. 81[*b*] by using this table. In contrast, the MCE transmits the paging transmission disable information of "0" to each MBMS dedicated cell not existing in the table of FIG. 81[*b*]. By disposing the information showing paging transmission enable or disable and then transmitting this information from the MCE to each MBMS dedicated cell, it becomes able to provide a cell which transmits a paging signal and a cell which does not transmit any paging signal.

Each of the base stations in the MBSFN area which the MCE controls, in step ST1781, receives the paging request from the MCE. Each base station which is an MBMS dedicated cell existing in the TA(MBMS) shown in FIG. 81[*b*] receives the paging signal enable information while each base station which is an MBMS dedicated cell not existing in the TA(MBMS) receives the paging signal disable information.

Instead of disposing an IF between MME and MCE between the MME 103 and the MCE 801, an MME-MBMS GW interface can be disposed between the MME 103 and an MBMS GW 802 (in more detail, an MBMS CP 802-1). Furthermore, the processes of steps ST1776 to ST1780, which are carried out by the MCE, can be carried out by the MBMS GW on behalf of the MCE. In this variant, the same advantages as those provided by the present invention are provided.

Furthermore, a case in which the MME manages the cell IDs of an MBMS dedicated cell and/or a mixed cell related to a TA(MBMS) number as shown in FIG. 81[*b*] is considered. In this case, the MME, in step ST1776, transmits the paging request to each MBMS dedicated cell included in MBSFN area which is managed not by an MCE but by the MME. As the parameters included in the paging request at that time, the above-mentioned paging transmission enable or disable information can be provided in addition to an identifier of the mobile terminal, etc. The MME transmits the paging transmission enable information of "1" to each MBMS dedicated cell included in the TA(MBMS) number shown in FIG. 81[*b*], and also transmits the paging transmission disable information of "0" to each MBMS dedicated cell not included in the TA(MBMS) number. As mentioned above, the method (FIG. 81) of managing, in addition to a TA(unicast), the relation between a TA(MBMS) number and cells included in the TA(MBMS) number in the MME eliminates recognition between a cell which transmits a paging signal to a mobile terminal and a cell which does not transmit any paging signal to the mobile terminal in an MCE, and the process of transmitting dedicated paging transmission enable or disable information to each cell according to the results of the recognition. Because this results in elimination of the necessity to add any function to each MCE, there can be provided an advantage of being able to avoid the complexity of each MCE. Furthermore, there can be provided an advantage of being able to reduction the processing load on each MCE.

Each of the base stations in the MBSFN area, in step ST1782, determines the paging group of the mobile terminal in question. As a concrete example of a method of determining the paging group, the same method as that shown in Embodiment 2 can be applied. Each of the base stations determines the paging group of the mobile terminal in question by using the number KMBMS of paging groups of the self-base station (the MBSFN area to which the base stations belong), and the received paging request. When determining the paging group of the mobile terminal in question, each of the base stations uses the same computation expression as that used by the mobile terminal. As a concrete example, the MCE uses the same equation as that in step ST1735, i.e., paging group=IMSI mod KMBMS. When the MCE, in step ST1780, also informs the paging group of the mobile terminal in question, step ST1782 can be omitted. As a result, there can be provided an advantage of reducing the control load on each base station in the MBSFN area. In contrast, in accordance with the method of, in step ST1782, determining the paging group in each base station in the MBSFN area without informing the paging group of the mobile terminal in question in step ST1780, there can be provided an advantage of being able to reduce the amount of information notified from the MCE to each base station in the MBSFN area, and making effective use of the resources. Each of the base stations in the MBSFN area, in step ST1783, transmits a PMCH by carrying the paging signal, the code for padding, or the like onto the PMCH by using the identifier of the mobile terminal in question received in step ST1781, the result of the scheduling of the paging signal, the paging group of the mobile terminal in question determined in step ST1782, etc. A cell which has received the transmission enable information of "1" as the paging transmission enable or disable information, in ST1781, carries the paging signal onto a PMCH, and maps the PMCH onto MBSFN subframes corresponding to the MBSFN area to transmit the PMCH. In contrast, a cell which has received the transmission disable information of "0" as the paging transmission enable or disable information, in ST1781, pads not a paging signal but a code for padding with an identical information element number and maps the code for padding onto MBSFN subframes corresponding to the MBSFN area to transmit the code for padding. Because the method of mapping a paging signal onto a paging related area in a PMCH, and the method of changing the mapping method of mapping a paging signal onto a physical area onto which the paging signal is mapped between a cell which transmits a paging signal and a cell which does not transmit any paging signal are explained in detail in Embodiment 2 and Embodiment 10, the explanation of the methods will be omitted hereafter.

The mobile terminal, in step ST1784, receives a paging-related information presence or absence indicator transmitted from all the cells in the MBSFN area in ST1783. Like in the case of Embodiment 2, each MBMS dedicated cell, in step ST1783, maps the paging-related information presence or absence indicator onto the physical area corresponding to the paging group of the mobile terminal in question determined in ST1782. Therefore, the mobile terminal has only to receive the physical area corresponding to the paging group of the mobile terminal itself which the mobile terminal, in step ST1735, determines by using the same equation. The length of the repetition period of the paging-related information presence or absence indicator and the physical area can be transmitted via broadcast information from a serving cell for unicast service, can be transmitted via broadcast information from an MBMS dedicated cell, or can be predetermined. The mobile terminal, in step ST1785, determines whether or not there is a change in the paging related modified or unmodified indicator. When there is no change in the paging related modified or unmodified indicator, the mobile terminal makes a transition to step ST1788. In contrast, when there is a change in the paging related modified or unmodified indicator, the mobile terminal makes a transition to step ST1786. The mobile terminal then, in step ST1786, receives and decodes the physical area onto which the paging-related information of the paging group of the mobile terminal itself is mapped. At that time, the mobile terminal carries out blind detection by carrying out an operation of calculating a correlation with the mobile-terminal-specific identification code. Because MBSFN subframes are transmitted via a multi-cell transmission scheme in an MBSFN, a transmission signal from a cell which does not transmit any paging signal acts as noise at each mobile terminal when receiving the transmission signal. By using the method as disclosed above, each mobile terminal can cancel the component of a code for padding transmitted from a cell which does not transmit any paging signal by using an interference elimination function, such as an interference canceller, in the receiver thereof, and becomes able to carry out SFN combining of only a paging signal transmitted from a cell which transmits the paging signal. In a case in which the code for padding has a random value, each mobile terminal does not have to have the interference elimination function, such as the interference canceller, in the receiver thereof. In this case, because each cell derives a random value for each cell and carries out padding with this random value, the signals transmitted from cells each of which does not transmit any paging signal are random signals which differ from one another and they are canceled out in each mobile terminal. Therefore, the paging signal component transmitted from a cell which transmits the paging signal becomes strong relatively, and it becomes able to reduce receive errors occurring in the paging signal in the correlation operation. The mobile terminal, in step ST1787, determines whether it has detected the identifier of the mobile terminal itself through the blind detection carried out in step ST1786. When the mobile terminal has not detected the identifier of the mobile terminal itself, the mobile terminal makes a transition to step ST1788. In contrast, when the mobile terminal has detected the identifier of the mobile terminal itself, the mobile terminal makes a transition to step ST1814.

By using the above-mentioned methods, there can be disclosed a method of transmitting a paging signal to a mobile terminal currently receiving an MBMS service in a frequency layer dedicated to MBMS transmission, and a mobile communication system which enables the method to be implemented therein, which are a challenge of the present invention. Therefore, there is provided an advantage of enabling even a mobile terminal currently receiving an MBMS service in the frequency layer dedicated to MBMS transmission to receive a paging signal. Furthermore, even if a cell which transmits a paging signal and a cell which does not transmit any paging signal coexist, it becomes able to lessen the reduction in receive errors occurring at a time of reception of a paging signal in each mobile terminal. Therefore, by providing a cell which transmits a paging signal and a cell which does not transmit any paging signal in the system, it becomes able to limit the cells each of which transmits a paging signal to a mobile terminal to a cell in which the mobile terminal is being located, and neighboring cells, and therefore waste of radio resources can be reduced and the system capacity can be increased.

In the above-mentioned concrete example, the case in which code division multiplexing is performed on the PMCH provided for each MBSFN area is explained. This embodiment can be applied not only to the case in which code division multiplexing is performed on the PMCH provided for each MBSFN area but also to a case in which time division multiplexing is performed on the PMCH provided for each MBSFN area.

Figure 82:
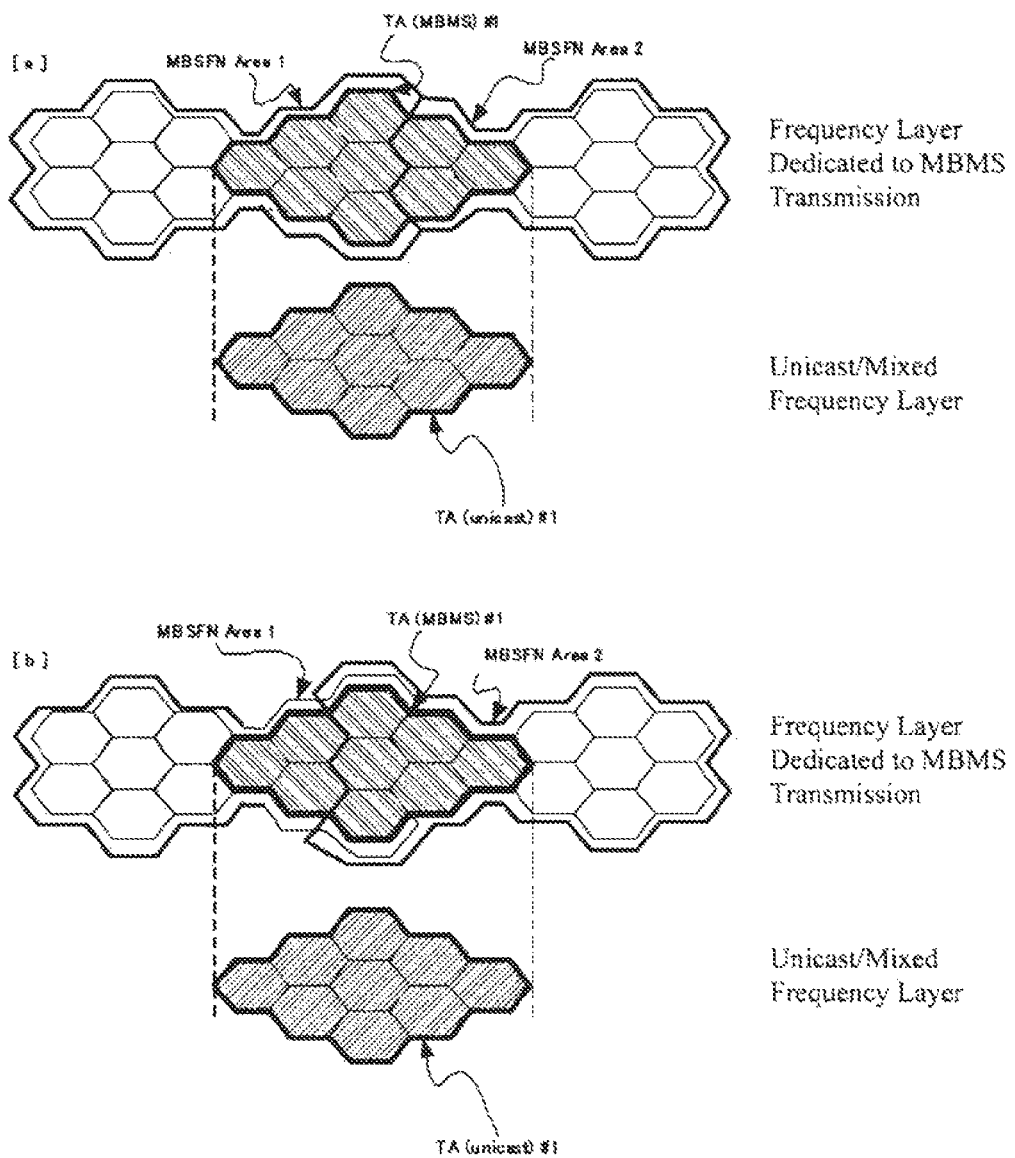
FIG. 82 is a view explaining a tracking area being constructed by an arbitrary MBMS dedicated cell in a plurality of MBSFN areas.

The method disclosed in this embodiment can be applied not only to the case in which the tracking area (TA(MBMS)) is constructed of arbitrary MBMS dedicated cells in one MBSFN area, but also to a case in which the tracking area (TA(MBMS)) is constructed of arbitrary MBMS dedicated cells in a plurality of MBSFN areas as shown in FIG. 82[a]. In this case, among the MCEs each of which receives the paging request in step ST1778, there exist a plurality of MCEs each of which controls an MBMS dedicated cell which is related to either a TA(MBMS) number or both f(MBMS) and a TA (unicast) number which are informed thereto as a parameter included in the paging request. In this case, each mobile terminal does not receive paging signals from all the MBMS dedicated cells in the TA(MBMS), but receives a paging signal from an MBMS dedicated cell in the TA(MBMS) belonging to one or more MBSFN areas from which the mobile terminal itself is receiving or trying to receive an MBMS. The number K of paging groups used in each MBSFN area, in step ST1728, is transmitted from an MBMS dedicated cell belonging to each MBSFN area from which the mobile terminal itself is receiving or trying to receive an MBMS while being mapped onto an MCCH. Each mobile terminal, in step ST1729, receives this number K of paging groups.

Also in a case in which one cell belongs to a plurality of MBSFN areas and the tracking area (TA(MBMS)) is constructed of arbitrary MBMS dedicated cells in a plurality of MBSFN areas, as shown in FIG. 82[b], the above-mentioned method can be applied. In this case, the method disclosed in the variant of Embodiment 7 can be applied as the configuration of a channel onto which a paging signal or a code for padding is mapped, and the method disclosed in Embodiment 10 can be applied as the method of mapping a paging signal or a code for padding onto a physical area on a PMCH onto which the paging signal is mapped.

In the above-mentioned concrete example, the method of forming a TA(MBMS) from arbitrary MBMS dedicated cells in an MBSFN area in order to define a tracking area in a frequency layer dedicated to MBMS transmission geographically corresponding to a serving cell on a unicast side of a mobile terminal as the TA(MBMS) is disclosed. Therefore, in the paging operation shown in this embodiment, the mobile terminal, in steps ST1742 to ST1745, ST1776, and ST1777, does not have to carry out transmission and reception of ID information about an MBSFN area from which the mobile terminal is receiving or trying to receive an MBMS. However, in addition to the information shown in the above-mentioned concrete example, this MBSFN area ID can be further included in the information transmitted and received in steps ST1742 to ST1745, ST1776, and ST1777. When this MBSFN area ID is included in the information transmitted and received in these steps, the MBMS dedicated cells each of which transmits a paging signal can be further limited to the MBSFN area having this MBSFN area ID in the case in which the tracking area (TA(MBMS)) is formed of arbitrary MBMS dedicated cells in a plurality of MBSFN areas and in the case in which one cell belongs to a plurality of MBSFN areas, and the tracking area (TA(MBMS)) is formed of arbitrary MBMS dedicated cells in a plurality of MBSFN areas.

The MCE which has received the paging request also including the MBSFN area ID information in ST1777 can determine whether to transmit the paging request to an MBMS dedicated cell from this MBSFN area ID, and can therefore simplify its control operation. The MCE which controls the MBMS dedicated cell in this MBSFN area ID determines to transmit the paging request to the MBMS dedicated cell, and only this MCE, in ST1780, transmits the paging request to the MBMS dedicated cell. The MBMS dedicated cell which has received the MBMS dedicated cell for the paging request, i.e., the MBMS dedicated cell included in the TA(MBMS) number shown in FIG. 81[b] transmits the paging signal on the basis of the paging transmission enable or disable information, and an MBMS dedicated cell which is not included in the TA(MBMS) number transmits a code for padding instead of the paging signal. By configuring the method in this way, because a cell in an MBSFN area from which each mobile terminal is neither receiving nor trying to receive an MBMS service does not have to transmit a paging signal, there is provided an advantage of being able to reduce use of wasted radio resources and to increase the system capacity.

In the above-mentioned concrete example, the method of providing the paging transmission enable or disable information showing whether each MBMS dedicated cell transmits a paging signal, and enabling an MCE to transmit a paging request to an MBMS dedicated cell in the MBSFN area while including this paging transmission enable or disable information in the paging request is shown. However, as shown in Embodiment 7 to Embodiment 10, in the case in which the physical area onto which the paging signal is mapped is determined, it is not necessary to provide the paging transmission enable or disable information, and the MCE has only to transmit the paging request to an MBMS dedicated cell which transmits the paging signal in the MBSFN area while not transmitting the paging request to an MBMS dedicated cell which does not transmit the paging signal. The MBMS dedicated cell which receives the paging request from the MCE can map the paging signal onto a physical area for mapping the paging signal to transmit the paging signal, whereas the MBMS dedicated cell which does not receive the paging request from the MCE can set the output power of a physical area for mapping the paging signal to 0 to transmit the paging signal. By configuring the method in this way, not only the same advantages as those provided by the above-mentioned concrete example, but also an advantage of eliminating the necessity to transmit the paging request from the MCE to all the cells in the MBSFN area and reducing the amount of signaling in the system are provided.

Figure 98:
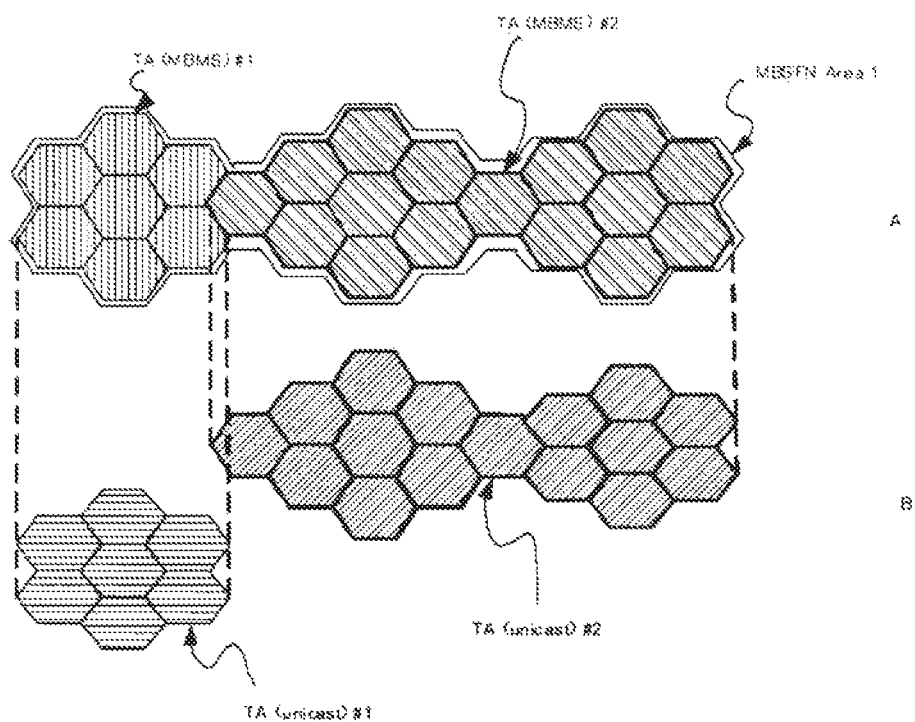
FIG. 98 is a view explaining a case in which two TAs (MBMS) (TA(MBMS) #1 and TA(MBMS) #2) are formed in one MBSFN area.
Figure 99:
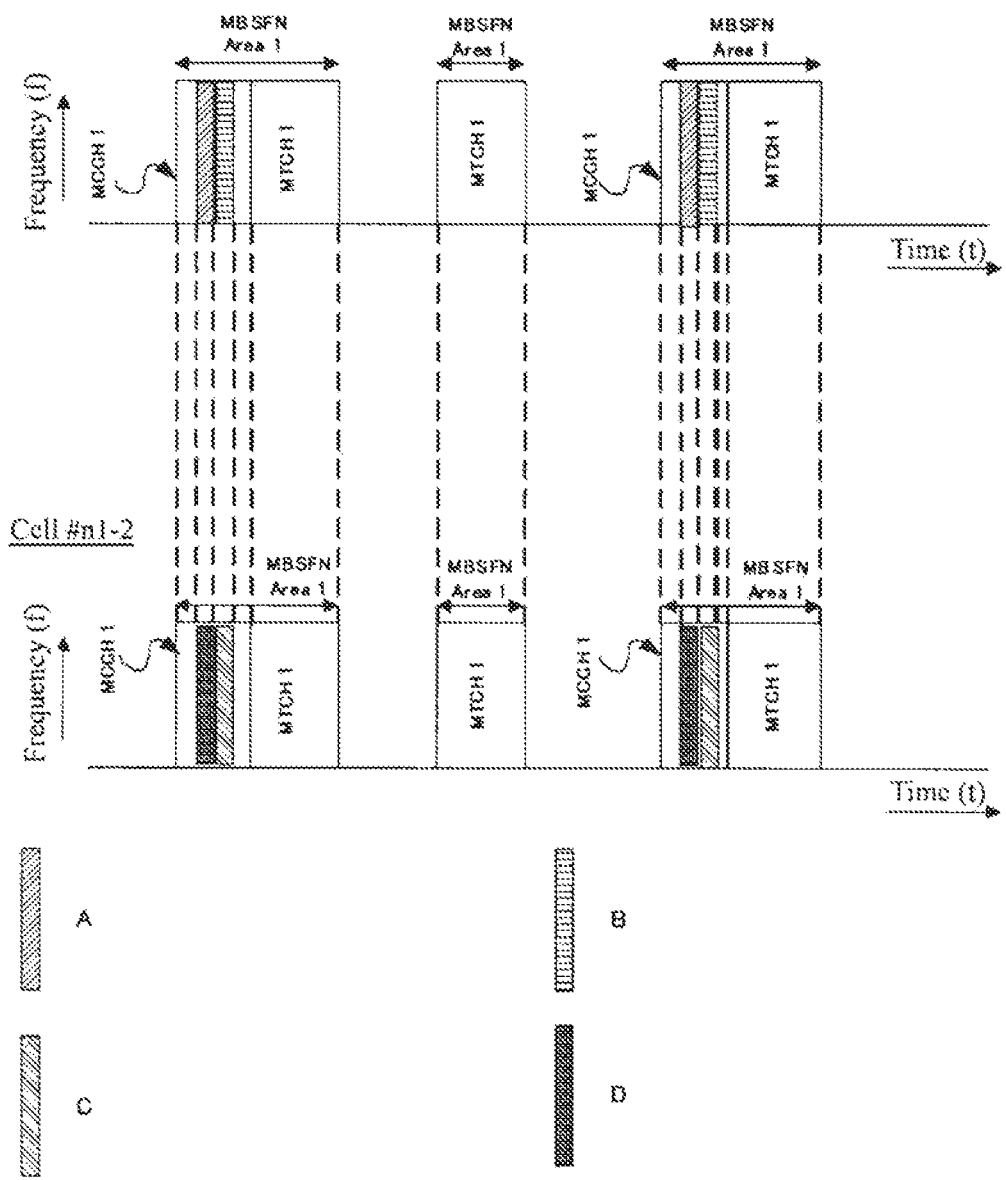
FIG. 99 is a view showing that TDM of a paging signal is carried out for each TA(MBMS), and the paging signal is mapped.

In this embodiment, the method of defining arbitrary MBMS dedicated cells geographically corresponding to a serving cell on a unicast side of a mobile terminal as a tracking area, and transmitting a paging signal from some cells in an MBSFN area (or in an MBSFN synchronization area) belonging to this tracking area is disclosed. As a concrete example, the case in which one tracking area is formed in an MBSFN area (or in an MBSFN synchronization area) is shown. Hereafter, a method of transmitting a paging signal from each cell in an MBSFN area (or in an MBSFN synchronization area) in a case in which a plurality of tracking areas (TA(MBMS)s) is formed in one MBSFN area (or in one MBSFN synchronization area) will be disclosed. In FIG. 98, A denotes a frequency layer dedicated to MBMS transmission, and B denotes a unicast/mixed frequency layer. A case in which two TA(MBMS) s (a TA(MBMS) #1 and a TA(MBMS) #2) are formed in one MBSFN area, as shown in FIG. 98, will be shown. In the case in which two TA(MBMS) s (a TA(MBMS) #1 and a TA(MBMS) #2) are formed in one MBSFN area in this way, an MBMS dedicated cell in the MBSFN area needs to transmit a paging signal different for each of the tracking areas to each mobile terminal being served thereby. In the case in which a plurality of tracking areas (TA(MBMS)s) are formed in one MBSFN area (or in an MBSFN synchronization area), as mentioned above, because an MBMS dedicated cell in the MBSFN area transmits a paging signal different for each of the tracking areas, time division multiplexing (TDM) of MBSFN subframes onto which paging signals for the TA(MBMS)s are mapped respectively is carried out to transmit the paging signals. In order to map the paging signals onto the MBSFN subframes, for example, the configuration of carrying a paging signal onto a PMCH, a DPCH, a main PMCH, or the like, which is disclosed in Embodiment 7 to Embodiment 9, can be applied. FIG. 99 shows a view showing TDM of the paging signals for the TA(MBMS)s and mapping of them. In the FIG. 99, A denotes an "MBSFN subframe onto which the paging signal for the TA(MBMS) #1 is mapped", B denotes an "MBSFN subframe onto which the padding code for the TA(MBMS) #2 is mapped", C denotes an "MBSFN subframe onto which the paging signal for the TA(MBMS) #2 is mapped", and D denotes an "MBSFN subframe onto which the padding code for TA(MBMS) #1 is mapped". A cell #n1-1 is one included in the MBSFN area #1 and belonging to the TA(MBMS) #1, and a cell #n1-2 is one included in the MBSFN area #1 and belonging to the TA(MBMS) #2. As shown in the figure, time division multiplexing of the MBSFN subframe onto which the paging signal transmitted by the cell #n1-1 is mapped, and the MBSFN subframe onto which the paging signal transmitted by the cell #n1-2 is mapped is carried out. In the example shown in the figure, the subframes are adjacent to each other, though they do not have to be adjacent to each other and have only to be separated from each other in time. In the MBSFN subframe onto which the paging signal transmitted by the cell #n1-1 is mapped, the code for padding from the cell #n1-2 is also mapped and transmitted. Furthermore, in the MBSFN subframe onto which the paging signal transmitted by the cell #n1-2 is mapped, the code for padding from the cell #n1-1 is also mapped and transmitted. As the method of transmitting these codes for padding, the method described in Embodiment 10 or this embodiment can be applied. Furthermore, although the code for padding is mapped and is transmitted in the example shown in the figure, in the case in which the physical area onto which the paging signal is mapped is determined within each MBSFN subframe, in the MBSFN subframe onto which the paging signal transmitted by the cell #n1-1 is mapped, the transmission power of the physical area in this MBSFN subframe onto which the paging signal from the cell #n1-2 is mapped can be set to 0. Similarly, in the MBSFN subframe onto which the paging signal transmitted by the cell #n1-2 is mapped, the transmission power of the physical area in this MBSFN subframe onto which the paging signal from the cell #n1-1 is mapped can be set to 0. As these methods, the method described in Embodiment 10 can also be applied.

By configuring the methods in this way, a plurality of tracking areas (TA(MBMS) s) can be formed in one MBSFN area. Therefore, because the system can carry out the management of tracking areas with flexibility, there is no necessity to match the tracking area of a frequency layer dedicated to MBMS with that of a unicast/mixed frequency layer, and to make the tracking area of an MBSFN area be the same as that of the unicast/mixed frequency layer. Therefore, there is provided an advantage of being able to carry out cell arrangement in each layer with flexibility. In the future, even in a case in which a large number of cells in a frequency layer dedicated to MBMS are arranged, a mobile communication system will be able to be constructed by using the methods disclosed in this embodiment.

Embodiment 18

Figure 83:
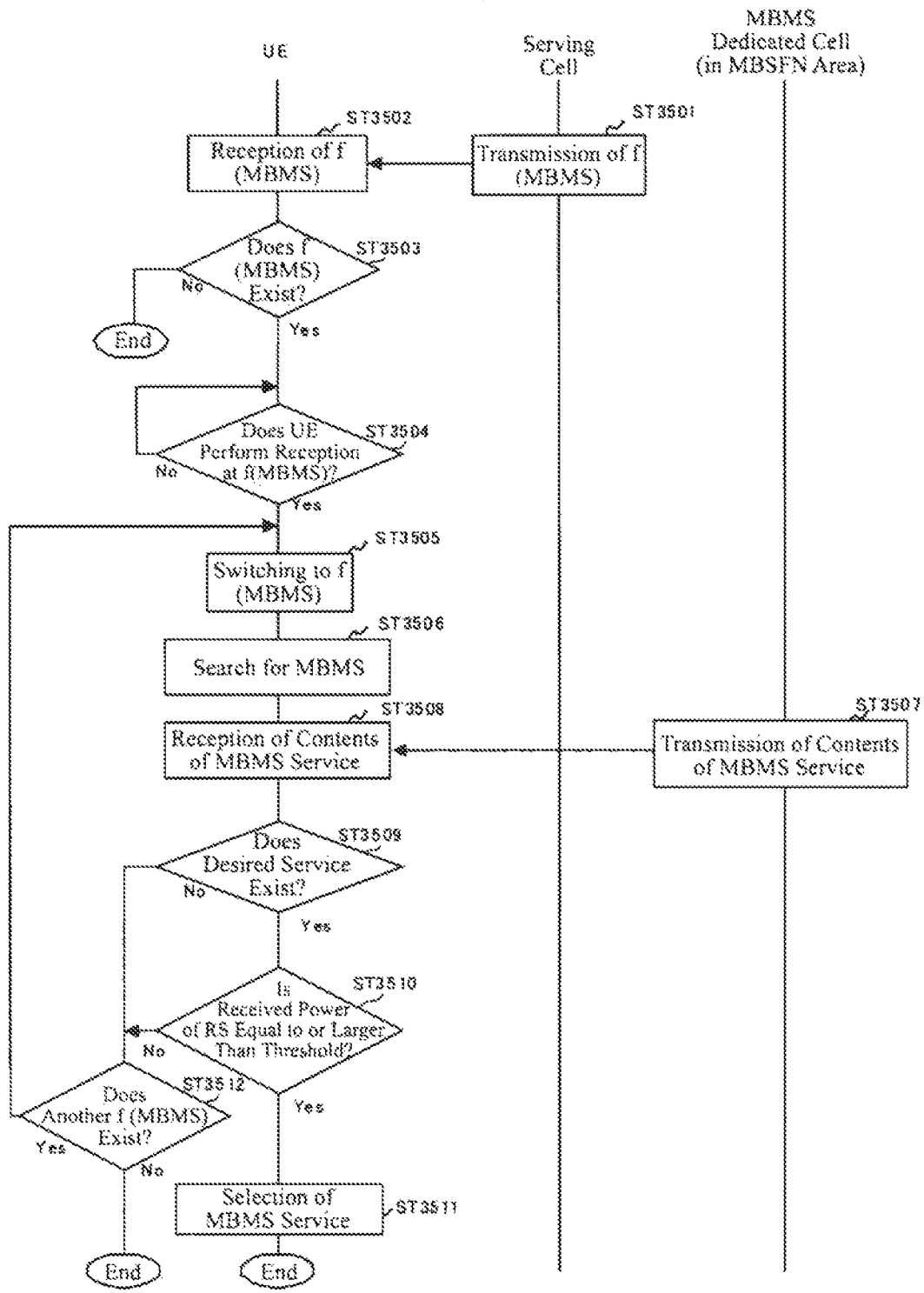
FIG. 83 is a flow chart showing broadcasting regarding a receivable MBMS, an MBMS search, and an MBMS service selecting process.

In this embodiment, with reference to FIG. 83, "broadcasting regarding a receivable MBMS", "search for an MBMS", and "MBMS service selection", among the processes carried out by the mobile communication system described in Embodiment 1 and 2, will be further explained. A serving cell, in step ST3501 of FIG. 83, transmits information about a receivable MBMS to each mobile terminal. Furthermore, the serving cell can transmit information about a receivable MBMS within the self-cell to each mobile terminal. The serving cell is a base station which carries out scheduling (Scheduling) so as to carry out allocation of uplink radio resources and downlink radio resources to a mobile terminal in question. As a base station which can become the serving cell, there is a unicast cell or an MBMS/unicast-mixed cell. As a concrete example of the information about a receivable MBMS, one or more frequencies of one or more available MBMS services, i.e., one or more frequencies of a receivable MBSFN synchronization area (MBSFN Synchronization Area), i.e., one or more frequencies (referred to as one or more f(MBMS)) of a receivable frequency layer dedicated to MBMS transmission are informed. When transmitting the information about a receivable MBMS from the serving cell to each mobile terminal, a broadcast control channel (BCCH) is used. The information about a receivable MBMS is first mapped onto the broadcast control channel (BCCH) which is a logical channel, and this broadcast control channel is further mapped onto a broadcast channel (BCH) which is a transport channel and this broadcast channel is mapped onto a physical broadcast channel (PBCH) which is a physical channel. As an alternative, after the information about a receivable MBMS is mapped onto the broadcast control channel (BCCH) which is a logical channel, the broadcast control channel can be mapped onto a downlink shared channel (DL-SCH) which is a transport channel, and the downlink shared channel can be mapped onto a physical downlink shared channel (PDSCH) which is a physical channel.

Each mobile terminal, in step ST3502, receives f(MBMS) transmitted from the serving cell. In this case, there is an issue of how the serving cell, in step ST3501, acquires the information about a receivable MBMS, which is informed from the serving cell to the mobile terminal. More specifically, if the information about a receivable MBMS is not changed frequently but is determined semi-statically (semi-static), the information about a receivable MBMS can be set to the serving cell every time when it is changed. As an alternative, the information about a receivable MBMS can be transmitted from a control device in a frequency layer dedicated to MBMS transmission to a control device in a unicast/mixed frequency layer when the information is changed or at regular intervals. As a further concrete example, the information about a receivable MBMS is transmitted from an MCE to an MME or a base station. As an alternative, the information about a receivable MBMS can be transmitted from an MBMS GW to an MME or a base station.

Each mobile terminal, in step ST3503, checks to see whether it has received one or more frequencies of the receivable frequency layer dedicated to MBMS transmission in step ST3502. Each mobile terminal ends the process when not having received one or more frequencies. When having received one or more frequencies, each mobile terminal makes a transition to step ST3504. Each mobile terminal, in step ST3504, checks to see whether the user has an intention of receiving an MBMS service in the frequency layer dedicated to MBMS transmission. As an example of the checking, when the user has an intention of receiving an MBMS service, he or she uses a user interface to send a command to his or her mobile terminal, and the mobile terminal stores information showing the user's intention in a protocol processing unit 1101 thereof. Each mobile terminal, in step ST3504, checks to see whether or not the information showing the user's intention of receiving an MBMS service is stored in the protocol processing unit 1101. When the information showing the user's intention of receiving an MBMS service is not stored, each mobile terminal repeats the process of step ST3504. As a method of repeating the process, each mobile terminal uses a method of carrying out the determination of step ST3504 at fixed periods (cycles), or a method of carrying out step ST3504 or ST3503 when receiving a notification showing a change in the user's intention of receiving an MBMS service inputted from the user by way of a user interface. In contrast, when the information showing the user's intention of receiving an MBMS service is stored, each mobile terminal makes a transition to step ST3505. The order of the processes of step ST3503 and step ST3504 can be arbitrary, and they can be simultaneously carried out. Each mobile terminal, in step ST3505, moves to the frequency layer dedicated to MBMS transmission by changing the frequency set to a frequency converting unit 1107 thereof to change the center frequency to f(MBMS). Changing the frequency set to the frequency converting unit 1107 to change its center frequency is referred to as re-tune (re-tune).

Each mobile terminal, in step ST3506, carries out a searching operation of searching for an MBMS. Because the details of the searching operation of searching for an MBMS is described in Embodiment 2, the explanation of the searching operation will be omitted hereafter. Each mobile terminal carries out synchronization establishment with an MBMS dedicated cell, acquisition of system information about the MBMS dedicated cell, acquisition of MCCH scheduling, etc. by carrying out the searching operation of searching for an MBMS. The MBMS dedicated cell, in step ST3507, informs the contents of MBMS services to each mobile terminal. It is described in nonpatent reference 1 that an MCE 801 allocates radio resources to all base stations in an MBSFN area in order to carry out multi-cell MBMS transmission (multi-cell MBMS transmission). It can be expected from this description that MBMS services identical with one anther which can be subjected to SFN combining (Combining) are provided in the MBSFN area. Therefore, the contents of MBMS services are informed in step ST3507 for each MBSFN area by using a channel of each MBSFN area. It is further described in nonpatent reference 1 that an MBSFN synchronization area includes one or more MBSFN areas (MBSFN Areas). According to this description, the contents of MBMS services are informed in step ST3507 for each of all MBSFN areas included in each MBSFN synchronization area by using a channel of the MBSFN synchronization area.

As a concrete example of the contents of MBMS services, there are direct service contents, e.g., "weather forecast", "baseball live broadcast", and "news". Furthermore, instead of direct service contents, service numbers or MBSFN area numbers (IDs) can be provided. In a case in which the contents of MBMS services are informed with service numbers or MBSFN area numbers (IDs), a correspondence (refer to FIG. 84) between service numbers or MBSFN area numbers (IDs) and direct service contents needs to be statically or semi-statically grasped by the network side and the mobile terminal side. In a case in which the correspondence between service numbers and direct service contents is determined semi-statically, the correspondence between service numbers and direct service contents needs to be informed from the network side to the mobile terminal side every time when the correspondence is changed or at periods (or cycles).

The correspondence between service numbers and direct service contents is mapped onto a broadcast control channel (BCCH) which is a logical channel of the MBMS dedicated cell, and the broadcast control channel is further mapped onto a broadcast channel (BCH) which is a transport channel and this broadcast channel is mapped onto a physical broadcast channel (PBCH) which is a physical channel. The correspondence between service numbers and direct service contents can be alternatively mapped onto the broadcast control channel (BCCH) which is a logical channel, and this broadcast control channel can be further mapped onto a downlink shared channel (DL-SCH) which is a transport channel and the downlink shared channel can be mapped onto a physical downlink shared channel (PDSCH) which is a physical channel. As an alternative, the correspondence between service numbers and direct service contents can be mapped onto a multicast control channel (MCCH) which is a logical channel, and the multicast control channel can be mapped onto a multicast channel (MCH) which is a transport channel and the multicast channel can be mapped onto a physical multicast channel (PMCH) which is a physical channel. As an alternative, the correspondence between service numbers and direct service contents can be mapped onto the multicast control channel (MCCH) which is a logical channel, and the multicast control channel can be mapped onto the downlink shared channel (DL-SCH) which is a transport channel and the downlink shared channel can be mapped onto the physical downlink shared channel (PDSCH) which is a physical channel.

Instead of the direct service contents, channel numbers or MBSFN area numbers (IDs) can be informed from the network side to the mobile terminal side. In this case, channel numbers or MBSFN area numbers (IDs) are assumed to be channel numbers of television or the like. In this case, the user needs to get to know a program list of each channel (direct service contents listed in time order) separately. This program list can be informed from the network side to the mobile terminal side every time when the correspondence is changed or at periods (or cycles), or can be published in an existing medium, such as a newspaper. Because a concrete example of channels which are used for informing the program list of each channel from the network side to the mobile terminal side is the same as that in the case of informing the correspondence between service numbers and direct service contents, the explanation of the concrete example will be omitted hereafter. Each mobile terminal, in step ST3508, receives the contents of MBMS services which are transmitted from the MBMS dedicated cell.

Each mobile terminal, in step ST3509, checks the contents of MBMS services received in step ST3508 in order to know whether or not a service which the user desires is ongoing. When the service which the user desires is ongoing, each mobile terminal makes a transition to step ST3510. In contrast, when the service which the user desires is not ongoing, each mobile terminal makes a transition to step ST3512. Each mobile terminal, in step ST3510, receives a reference signal (RS) with a radio resource of the MBSFN area in which the service which the user desires is ongoing, and measures the received power (RSRP) of the reference signal. Each mobile terminal further, in step ST3510, determines whether or not the received power is equal to or higher than a threshold which is determined statically or semi-statically. The fact that the received power is equal to or higher than the above-mentioned threshold shows that each mobile terminal has high quality enough to receive the MBMS service, whereas the fact that the received power is lower than the threshold shows that each mobile terminal does not have high quality enough to receive the MBMS service. When the received power is equal to or higher than the above-mentioned threshold, each mobile terminal makes a transition to step ST3511, whereas when the received power is lower than the above-mentioned threshold, each mobile terminal makes a transition to step ST3512. If each mobile terminal, in step ST3510, can determine whether or not its quality of reception is good enough to receive the MBMS service, each mobile terminal does not have to use the above-mentioned method of measuring the received power of the reference signal (RS). Each mobile terminal, in step ST3511, selects the MBMS service. Concretely, each mobile terminal acquires a frequency f(MBMS) dedicated to MBMS transmission, an MBSFN area ID (number), etc. to receive the MBMS service which the user desires, and then determines them. Each mobile terminal, in step ST3512, determines whether or not there is another frequency (a frequency in the frequency layer dedicated to MBMS transmission different from the current frequency) in the one or more frequencies (a frequency list) of a receivable MBSFN synchronization area received in step ST3502. When another frequency exists in the frequency list, each mobile terminal returns to step ST3505 and switches its set frequency to a new frequency (f2(MBMS)), and then repeats the process. In contrast, when any other frequency does not exist in the frequency list, each mobile terminal ends the process.

In accordance with Embodiment 18, the method of enabling a mobile terminal to move to an MBMS transmission dedicated frequency layer and the method of selecting a desired service, which are a challenge of the present invention, can be provided. In addition, because each mobile terminal can know the existence of an available MBMS service and its frequency at a location where the mobile terminal is being located geographically, each mobile terminal does not have to search for a frequency at which a frequency layer dedicated to MBMS transmission can exist in a round-robin manner when the user of the mobile terminal has an intention of receiving an MBMS service in the frequency layer dedicated to MBMS transmission. As a result, there is provided an advantage of shortening a control delay time occurring before each mobile terminal receives a service at a frequency other than a currently-selected frequency. Accordingly, there can also be provided an advantage of achieving low power consumption in each mobile terminal. Furthermore, compared with Embodiment 19 which will be mentioned below, the amount of information transmitted from the serving cell and required to solve the problem can be reduced. This means that the time required to receive the information from the serving cell, i.e., the receiving time, the decode time required to decode received data, and so on become short compared with Embodiment 19. As a result, there is provided an advantage of shortening a control delay time occurring before each mobile terminal receives a service at a frequency other than a currently-selected frequency. Furthermore, there can be provided an advantage of achieving low power consumption in each mobile terminal.

Variant 1

Hereafter, variant 1 of this embodiment will be explained. In a case in which information about peripheral cells (i.e., peripheral cell information (list) or neighboring cell (neighboring cell) information (list)) is transmitted from the serving cell to each mobile terminal, the information about a receivable MBMS in a neighboring cell can be transmitted from the serving cell. The information about a receivable MBMS in a neighboring cell can be transmitted at the same time when the neighboring cell information is transmitted or the information about a receivable MBMS in a neighboring cell can be transmitted but not at the same time when the neighboring cell information is transmitted. Because a concrete example of the information about a receivable MBMS is the same as that shown in Embodiment 18, the explanation of the concrete example will be omitted hereafter. Variant 1 can provide the following advantages. A case in which the receive sensitivity of a neighboring cell has become good in a unicast/mixed frequency layer, i.e., a time to carry out a handover has come will be considered. When f(MBMS) at which a mobile terminal is currently receiving an MBMS does not exist in the information regarding a receivable MBMS in a base station which is selected newly as a serving cell (a new serving cell: New Serving cell, i.e., a handover destination base station), the mobile terminal can determine that the sensitivity of the reception of the service which it is currently receiving at f(MBMS) will get worse if it continues to move. The result of this determination can be notified to the user through display of it on a display unit, with an alarm, or the like. As a result, when the user gives a higher priority to the current reception of the MBMS service than to the movement, the user becomes able to stop the movement, and there can be provided an advantage of enabling the user to use the mobile terminal according to the user's needs more effectively. Furthermore, when the sensitivity of the reception of the service which the mobile terminal is currently receiving at f1(MBMS) gets worse, if f2 (MBMS) does not exist in the information about a receivable MBMS in the serving cell (self-cell), but exists in the information about a receivable MBMS in a neighboring cell, the mobile terminal can try to carry out an operation of searching for an MBMS at f2 (MBMS), or the like. As a result, there can be provided an advantage of enabling the user to use the mobile terminal according to the user's needs more effectively.

Embodiment 19

Figure 85:
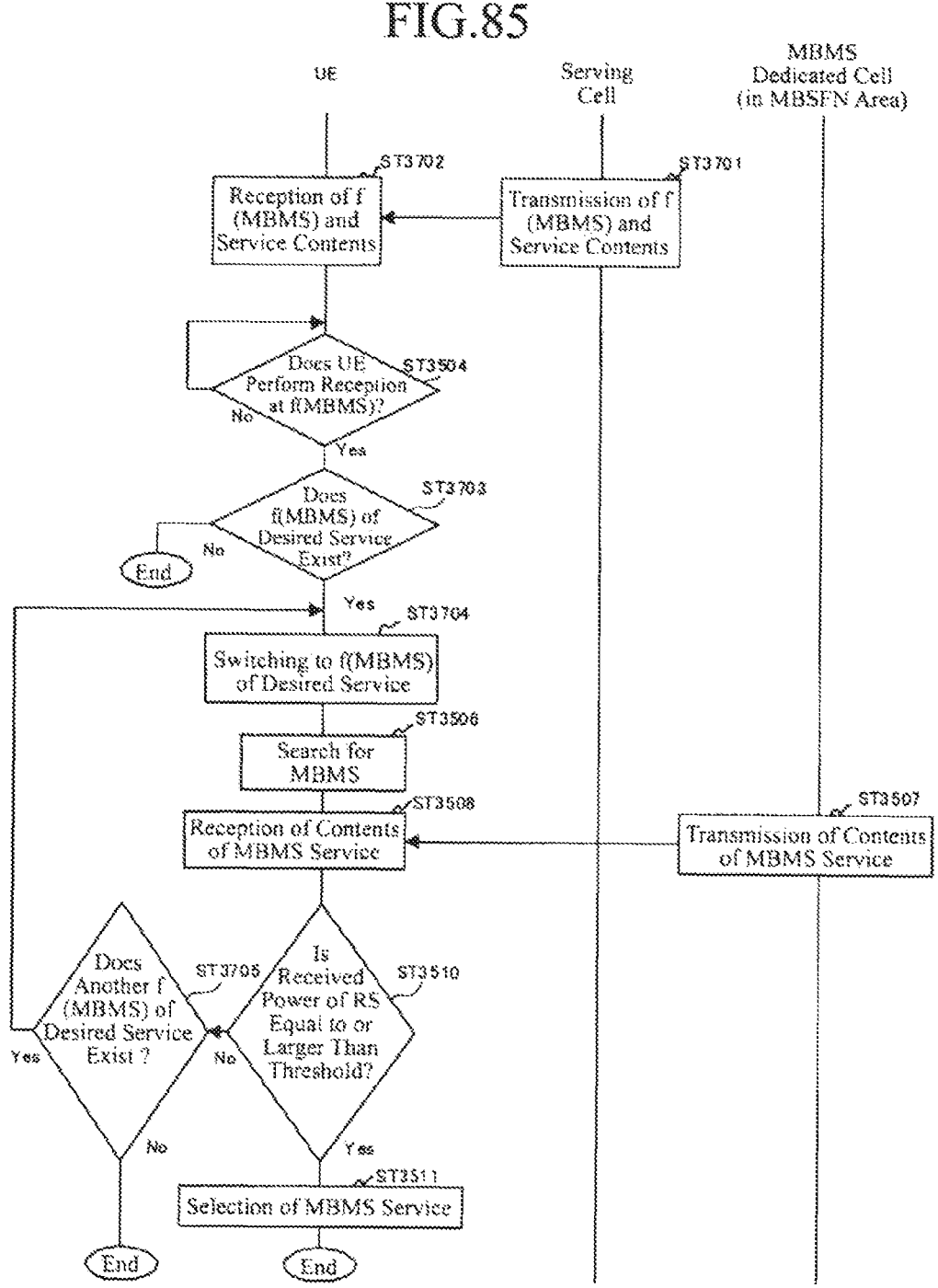
FIG. 85 is a flow chart showing broadcasting regarding a receivable MBMS, an MBMS search, and an MBMS service selecting process.

In this embodiment, with reference to FIG. 85, "broadcasting regarding a receivable MBMS", "search for an MBMS", and "MBMS service selection", among the processes carried out by the mobile communication system described in Embodiment 1 and 2, will be further explained. In FIG. 85, because the same steps as those shown in FIG. 83 denote the same processes as those shown in the figure or like processes, the explanation of the steps will be omitted hereafter. A serving cell, in step ST3701, transmits information about a receivable MBMS to each mobile terminal. Furthermore, the serving cell transmits information about a receivable MBMS within the self-cell to each mobile terminal. As a concrete example of the information about a receivable MBMS, one or more frequencies of one or more available MBMS services, i.e., one or more frequencies of a receivable MBSFN synchronization area (MBSFN Synchronization Area), i.e., one or more frequencies (referred to as one or more f(MBMS)) of a receivable frequency layer dedicated to MBMS transmission are informed. Furthermore, service contents receivable at above-mentioned f(MBMS) can be informed. The above-mentioned f(MBMS) and the service contents receivable at f(MBMS) can be transmitted simultaneously or unsimultaneously. Because a concrete example of a channel used for transmitting the information about a receivable MBMS is the same as that shown in Embodiment 18, the explanation of the concrete example will be omitted hereafter. Furthermore, because a concrete example of the service contents is the same as that shown in Embodiment 18, the explanation of the concrete example will be omitted hereafter. Each mobile terminal, in step ST3702, receives f(MBMS) and the service contents receivable at f(MBMS) which are transmitted from the serving cell. In this case, there is an issue of how the serving cell, in step ST3701, acquires the information about a receivable MBMS, which is transmitted from the serving cell to each mobile terminal. More specifically, if the information about a receivable MBMS is not changed frequently but is determined semi-statically (semi-static), the information about a receivable MBMS can be set to the serving cell every time when it is changed. Furthermore, the information about a receivable MBMS can be transmitted from a control device in a frequency layer dedicated to MBMS transmission to a control device in a unicast/mixed frequency layer when the information is changed or at regular intervals. As a further concrete example, the information about a receivable MBMS is transmitted from an MCE to an MME or a base station. As an alternative, the information about a receivable MBMS can be transmitted from an MBMS GW to an MME or abase station. Each mobile terminal, in step ST3504, checks to see whether the user has an intention of receiving an MBMS service in the frequency layer dedicated to MBMS transmission. When the user has an intention of receiving an MBMS service in the frequency layer dedicated to MBMS transmission, each mobile terminal makes a transition to step ST3703. In contrast, when the user does not have an intention of receiving an MBMS service in the frequency layer dedicated to MBMS transmission, each mobile terminal repeats the process of step ST3504.

Each mobile terminal, in step ST3703, checks to see whether it has received one or more frequencies of a receivable frequency layer dedicated to MBMS transmission, which is carrying out the service which the user desires, in step ST3702. Each mobile terminal ends the process when not having received one or more frequencies. In contrast, when having received one or more frequencies, each mobile terminal makes a transition to step ST3704. For example, it is assumed that one frequency of a receivable frequency layer dedicated to MBMS transmission, which is carrying out the service which the user desires, is fa(MBMS). Each mobile terminal, in step ST3704, moves to the receivable frequency layer dedicated to MBMS transmission which is carrying out the service which the user desires by changing the frequency set to a frequency converting unit 1107 thereof to change the center frequency to fa(MBMS). Each mobile terminal, in step ST3506, carries out a searching operation of searching for an MBMS. The MBMS dedicated cell, in step ST3507, informs the contents of MBMS services to each mobile terminal. Each mobile terminal, in step ST3508, receives the contents of MBMS services from the MBMS dedicated cell. Each mobile terminal, in step ST3510, determines whether the sensitivity of reception of the MBSFN area in which the service which the user desires is ongoing is good enough to receive. When the quality of reception is good enough to receive, each mobile terminal makes a transition to step ST3511. In contrast, when the quality of reception is not good enough to receive, each mobile terminal makes a transition to step ST3705. Each mobile terminal, in step ST3511, selects the MBMS service. Each mobile terminal, in step ST3705, determines whether or not there is another frequency (a frequency in the frequency layer dedicated to MBMS transmission different from the current frequency) at which the service which the user desires is ongoing in the one or more frequencies (a frequency list) of a receivable MBSFN synchronization area received in step ST3702. When another frequency exists in the frequency list, each mobile terminal returns to step ST3704 and changes the frequency set to the synthesizer thereof to a new frequency, e.g., f2(MBMS), and then repeats the process. In contrast, when any other frequency does not exist in the frequency list, each mobile terminal ends the process.

In accordance with Embodiment 19, the method of enabling a mobile terminal to move to an MBMS transmission dedicated frequency layer and the method of selecting a desired service, which are a challenge of the present invention, can be provided. Compared with Embodiment 18, the following advantages in solving the problem can be provided. In Embodiment 18, there is provided no means of enabling each mobile terminal to get to know whether the service which the user desires is ongoing in a frequency layer dedicated to MBMS transmission before changing the frequency and then moving to the frequency layer dedicated to MBMS transmission. Therefore, in Embodiment 18, when the user of a mobile terminal has an intention of receiving an MBMS service in the frequency layer dedicated to MBMS transmission, the mobile terminal needs to carryout a re-tune operation of searching for a frequency of the receivable frequency layer dedicated to MBMS transmission in a round-robin manner to check to see whether or not the service which the user desires is ongoing. In contrast, in Embodiment 19, each mobile terminal can know a frequency of the receivable frequency layer dedicated to MBMS transmission and the service contents receivable at the frequency before the mobile terminal changes its frequency and then moves to the frequency layer dedicated to MBMS transmission. Therefore, each mobile terminal does not have to carry out the processes for any frequency at which the service which the user desires is not ongoing, i.e., the processes of step ST3704 and the subsequent steps in FIG. 85. Thus, in Embodiment 19, each mobile terminal does not have to search for a receivable frequency dedicated to MBMS transmission in a round-robin manner when the user of the mobile terminal has an intention of receiving an MBMS service in the frequency layer dedicated to MBMS transmission. As a result, there is provided an advantage of shortening a control delay time occurring before each mobile terminal receives a service at a frequency other than a currently-selected frequency. Accordingly, there can also be provided an advantage of achieving low power consumption in each mobile terminal.

Next, variant 1 of this embodiment will be explained. The serving cell, in step ST3701 of FIG. 85, transmits information about a receivable MBMS to each mobile terminal. As a concrete example of the information about a receivable MBMS, one or more frequencies of one or more available MBMS services, i.e., one or more frequencies of a receivable MBSFN synchronization area (MBSFN Synchronization Area), i.e., one or more frequencies (referred to as one or more f(MBMS) s) of a receivable frequency layer dedicated to MBMS transmission are informed. Furthermore, service contents receivable at above-mentioned f(MBMS) can be informed. At that time, not all the service contents receivable at f(MBMS), but the service contents currently being ongoing in an MBSFN area having a coverage area which overlaps the coverage area of the serving cell are informed. In Embodiment 19, each mobile terminal does not have a function of getting to know the service contents currently being ongoing in an MBSFN area having a coverage area which overlaps the coverage area of the serving cell. Therefore, the following situation occurs. Even in a case in which a mobile terminal is not being located in the coverage area of the MBSFN area in which the service which the user of the mobile terminal desires is ongoing, the mobile terminal, in step ST3703 of FIG. 85, determines that there exists a frequency (fc(MBMS)) of the receivable frequency layer dedicated to MBMS transmission at which the service which the user of the mobile terminal desires is ongoing, and then, in step ST3704, switches to fc(MBMS). However, because the mobile terminal is being located outside the coverage area of the MBSFN area in which the service which the user of the mobile terminal desires is ongoing, there is a high possibility that it is determined, in step ST3510, that the quality of reception of the MBSFN area (fc(MBMS)) in which the service which the user of the mobile terminal desires is ongoing is not good enough to receive.

Compared with Embodiment 19, variant 1 can provide the following further advantages. Compared with Embodiment 19, in this variant 1, each mobile terminal can receive the service contents currently being ongoing in an MBSFN area having a coverage area which overlaps the coverage area of the serving cell, and, in step ST3703, can check to see whether it has received one or more frequencies of the receivable frequency layer dedicated to MBMS transmission at which the service which the user desires is ongoing in the MBSFN area having a coverage area which overlaps the coverage area of the serving cell. Therefore, the possibility that it is determined, in step ST3510, that the quality of reception of the MBSFN area in which the service which the user desires is ongoing is not good enough to receive becomes low. As a result, there is provided an advantage of shortening a control delay time occurring before each mobile terminal receives a service at a frequency other than a currently-selected frequency. Accordingly, there can also be provided an advantage of achieving low power consumption in each mobile terminal.

Next, variant 2 of this embodiment will be explained. In the case which the neighboring cell (neighboring cell) information (list)) is transmitted from the serving cell to each mobile terminal, the information about a receivable MBMS in a neighboring cell can be transmitted from the serving cell to each mobile terminal. The information about a receivable MBMS in a neighboring cell can be transmitted at the same time when the neighboring cell information is transmitted, or can be transmitted but not at the same time when the neighboring cell information is transmitted. Because a concrete example of the information about a receivable MBMS is the same as that shown in Embodiment 19, the explanation of the concrete example will be omitted hereafter. Variant 2 can provide the following advantages. A case in which the receive sensitivity of a neighboring cell has become good in the unicast/mixed frequency layer, i.e., the time to carry out a handover process is getting close will be considered. When the service contents which a mobile terminal is currently receiving are not included in the information regarding a receivable MBMS in a base station which is selected newly as a serving cell (a new serving cell: New Serving cell, i.e., a handover destination base station), the mobile terminal can determine that the sensitivity of the reception of the service which it is currently receiving will get worse if it continues to move. The result of this determination can be notified to the user through display of it on a display unit, with an alarm, or the like. As a result, when the user gives a higher priority to the current reception of the MBMS service than to the movement, the user becomes able to stop the movement, and there can be provided an advantage of enabling the user to use the mobile terminal according to the user's needs more effectively. Furthermore, when the sensitivity of the reception of the service which the mobile terminal is currently receiving at f1(MBMS) gets worse, if the same service does not exist in the information about a receivable MBMS in the serving cell, but exists at f2 (MBMS) in the information about a receivable MBMS in a neighboring cell, the mobile terminal can try to carry out an operation of searching for an MBMS at f2(MBMS), or the like. As a result, there can be provided an advantage of enabling the user to use the mobile terminal according to the user's needs more effectively. This variant 2 can be applied not only to Embodiment 19 but also to variant 1 of Embodiment 19.

Embodiment 20

In nonpatent reference 3, an event (event) which is used to inform the results of measurements of a serving cell and a peripheral cell from a mobile terminal to a network side (a base station) in the current 3GPP is explained. A measurement within the same frequency as that in a serving cell will be explained hereafter. It is disclosed that each mobile terminal informs an event A1 to the network side (a base station) when the result of a measurement of a serving cell becomes larger than a threshold (threshold). Each mobile terminal informs an event A2 to the network side (a base station) when the result of the measurement of the serving cell becomes smaller than the threshold (threshold). Each mobile terminal informs an event A3 to the network side (a base station) when the result of a measurement of a peripheral cell becomes larger than a value which is an addition of an offset (offset) to the result of the measurement of the serving cell. The event A3 is used for a handover within the same frequency. There is no description about the problems to be solved by the present invention in nonpatent reference 3. Furthermore, there is also no description of provision of two or more thresholds and two or more offsets. In addition, there is also no description of use of two or more thresholds and two or more offsets properly according to the state of each mobile terminal.

Figure 86:
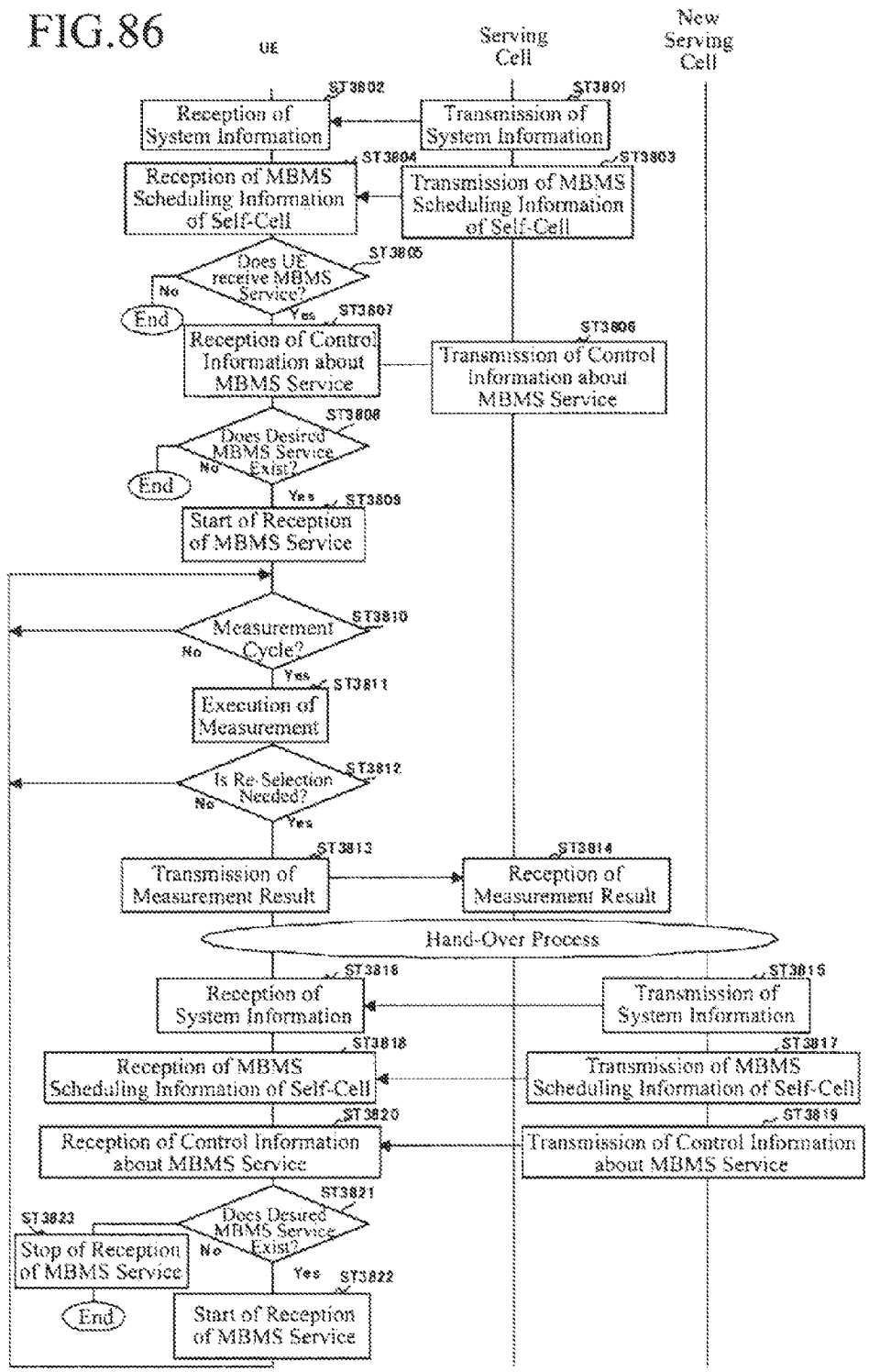
FIG. 86 is a flow chart showing a process, which is carried out by a mobile terminal currently receiving an MBMS service which is transmitted via a multi-cell transmission scheme from unicast/MBMS mixed cells, of carrying out a handover.

A concrete example of a sequence diagram in a case in which a mobile terminal currently receiving an MBMS service, which is transmitted via a multi-cell transmission scheme from unicast/MBMS mixed cells, carries out a handover in a unicast/mixed frequency layer is shown in FIG. 86. A serving cell, in step ST3801, transmits system information about the self-cell to mobile terminals being served thereby. As a concrete example of the system information transmitted to the mobile terminals, there are a measurement period length, a discontinuous reception cycle length, and tracking area information (TA information). The measurement period length is informed from the network side to the mobile terminals being served thereby, and each of the mobile terminals measures a field intensity and so on at periods (cycles) of this period length. When the self-cell information is transmitted from the serving cell to the mobile terminals, this self-cell information is mapped onto a broadcast control channel (BCCH) which is a logical channel, and the broadcast control channel is further mapped onto a broadcast channel (BCH) which is a transport channel and this broadcast channel is mapped onto a physical broadcast channel (PBCH) which is a physical channel. The self-cell information can be alternatively mapped onto the broadcast control channel (BCCH) which is a logical channel, and this broadcast control channel can be further mapped onto a downlink shared channel (DL-SCH) which is a transport channel and the downlink shared channel can be mapped onto a physical downlink shared channel (PDSCH) which is a physical channel.

Each of the mobile terminals, in step ST3802, receives the system information about the self-cell transmitted from the serving cell. The serving cell, in step ST3803, transmits the information about MBMS scheduling of the self-cell to the mobile terminals being served thereby. As a concrete example of the MBMS scheduling information transmitted to the mobile terminals, information about MBSFN subframe allocation (MBSFN subframe allocation), etc. can be considered. Furthermore, when the MBMS scheduling information is transmitted from the serving cell to the mobile terminals, this MBMS scheduling information is mapped onto a broadcast control channel (BCCH) which is a logical channel, and the broadcast control channel is further mapped onto a broadcast channel (BCH) which is a transport channel and this broadcast channel is mapped onto a physical broadcast channel (PBCH) which is a physical channel. The MBMS scheduling information can be alternatively mapped onto the broadcast control channel (BCCH) which is a logical channel, and this broadcast control channel can be further mapped onto a downlink shared channel (DL-SCH) which is a transport channel and the downlink shared channel can be mapped onto a physical downlink shared channel (PDSCH) which is a physical channel. Each of the mobile terminals, in step ST3804, receives the MBMS scheduling information of the self-cell transmitted from the serving cell.

Each of the mobile terminals, in step ST3805, checks to see whether the user has an intention of receiving an MBMS service. When the user has an intention of receiving an MBMS service, each of the mobile terminals makes a transition to step ST3807. In contrast, when the user does not have an intention of receiving an MBMS service, each of the mobile terminals ends the process. The serving cell, in step ST3806, transmits control information about MBMS services to the mobile terminals. Each of the mobile terminals, in step ST3807, receives the control information about MBMS services. As a concrete example of the control information about MBMS services, the contents of MBMS services or the like can be considered. Because a concrete example of the contents of MBMS services is the same as that shown in Embodiment 18, the explanation of the concrete example will be omitted hereafter. Furthermore, when the control information about MBMS services is transmitted from the serving cell to the mobile terminals, this control information about MBMS services is mapped onto a broadcast control channel (BCCH) which is a logical channel, and the broadcast control channel is further mapped onto a broadcast channel (BCH) which is a transport channel and this broadcast channel is mapped onto a physical broadcast channel (PBCH) which is a physical channel. The control information about MBMS services can be alternatively mapped onto the broadcast control channel (BCCH) which is a logical channel, and this broadcast control channel can be further mapped onto a downlink shared channel (DL-SCH) which is a transport channel and the downlink shared channel can be mapped onto a physical downlink shared channel (PDSCH) which is a physical channel. As an alternative, the control information about MBMS services can be mapped onto a multicast control channel (MCCH) which is a logical channel, and the multicast control channel can be mapped onto a multicast channel (MCH) which is a transport channel and the multicast channel can be mapped onto a physical multicast channel (PMCH) which is a physical channel. In the case in which the control information about MBMS services is mapped onto the MCCH, each of the mobile terminals receives data in MBSFN subframes according to the MBMS scheduling information (the information about MBSFN subframe allocation) received in step ST3804.

Each of the mobile terminals, in step ST3808, determines whether or not the service which the user desires is ongoing according to the control information about MBMS services received in step ST3807. When the service which the user desires is ongoing, each of the mobile terminals makes a transition to step ST3809. In contrast, when the service which the user desires is not ongoing, each of the mobile terminals ends the process. Each of the mobile terminals, in step ST3809, starts receiving an MBMS service (an MTCH and an MCCH). When receiving an MBMS service, each of the mobile terminals receives data in MBSFN subframes according to the MBMS scheduling information (the information about MBSFN subframe allocation) received in step ST3804.

Each of the mobile terminals, in step ST3810, determines whether or not the current time is in a measurement period of the measurement period length received in step ST3802. When the current time is in a measurement period, each of the mobile terminals makes a transition to step ST3811. In contrast, when the current time is not in a measurement period, each of the mobile terminals repeats the determination of step ST3810. Each of the mobile terminals, in step ST3811, carries out a measurement. As values which each of the mobile terminals actually measures, the reference symbol received power (Reference Symbol received power: RSRP) of each of the serving cell and the peripheral cell, an E-UTRA carrier received signal strength indicator (E-UTRA carrier received signal strength indicator: RSSI), etc. can be considered. The information about the peripheral cell can be broadcast from the serving cell as peripheral cell information (list) (or referred to neighboring cell (neighboring cells) information (list)). Each of the mobile terminals, in step ST3812, judges whether or not a re-selection (a cell re-selection) of the serving cell is needed according to the result of the measurements in step ST3811. As an example of a criterion of the judgment, there can be considered whether the result of the measurement of the peripheral cell exceeds a value which is an addition of an offset (offset) to the result of the measurement of the serving cell. When no re-selection is needed, each of the mobile terminals makes a transition to step ST3810. In contrast, when a re-selection is needed, each of the mobile terminals makes a transition to step ST3813. Each of the mobile terminals, in step ST3813, informs an event which is used to inform the measurement results to the serving cell. Each of the mobile terminals informs an event A3, as a concrete example of the event in a case in which a re-selection of the serving cell is needed, to the serving cell. The serving cell, in step ST3814, receives the event A3 from each of the mobile terminals. Then, the mobile communication system carries out a handover process, and then makes a transition to step ST3815.

A base station (a new serving cell: New serving cell) which is newly selected as the serving cell, in step 3815, transmits the system information about the self-cell to mobile terminals being served thereby, like in step ST3810. Each of the mobile terminals, in step ST3816, receives the system information about the self-cell from the new serving cell, like in step ST3802. The new serving cell, in step ST3817, transmits the MBMS scheduling information about the self-cell to the mobile terminals being served thereby, like in step ST3803. Each of the mobile terminals, in step ST3818, receives the information about the MBMS scheduling of the self-cell from the new serving cell, like in step ST3804. The new serving cell, in step ST3819, transmits the control information about MBMS services to the mobile terminals, like in step ST3806. Each of the mobile terminals, in step ST3820, receives the control information about MBMS services, like in step ST3807. Each of the mobile terminals, in step ST3821, determines whether or not the service which the user desires is ongoing according to the control information about MBMS services received in step ST3820, like in step ST3808. When the service which the user desires is ongoing, each of the mobile terminals makes a transition to step ST3822. In contrast, when the service which the user desires is not ongoing, each of the mobile terminals makes a transition to step ST3823. Each of the mobile terminals, in step ST3822, starts receiving the MBMS service (an MTCH and an MCCH) according to the MBMS scheduling information (the information about MBSFN subframe allocation) of the new serving base station received in step ST3818. Each of the mobile terminals, in step ST3823, carries out a process of stopping the reception of the MBMS service.

Figure 87:
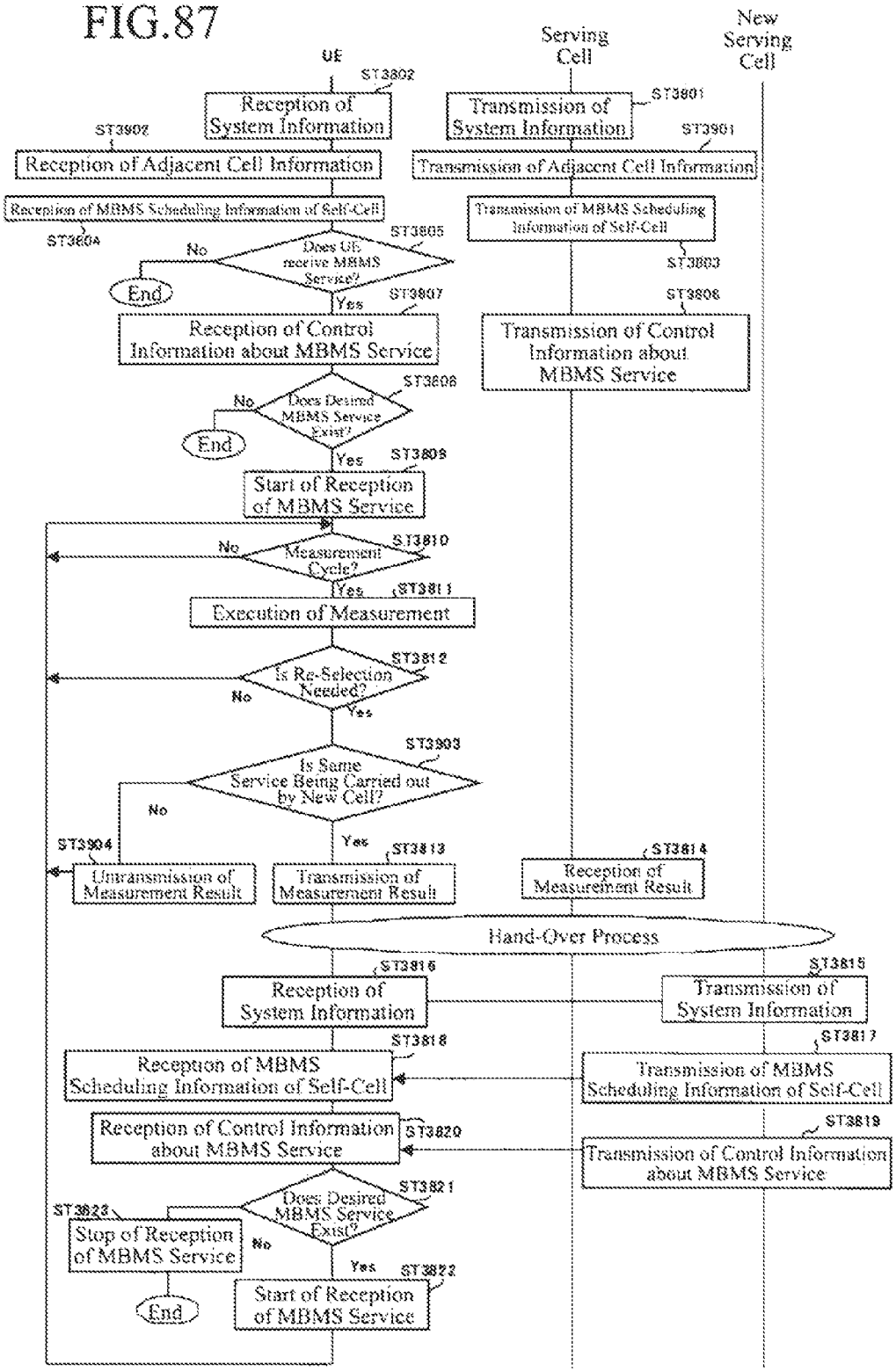
FIG. 87 is a flow chart showing a process, which is carried out by a mobile terminal currently receiving an MBMS service which is transmitted via a multi-cell transmission scheme from unicast/MBMS mixed cells, of carrying out a handover.

As shown in steps ST3821 and ST3823 of FIG. 86, there arises a problem that the reception of the MBMS service is interrupted by a handover. In this Embodiment 20, a solution of the above-mentioned problem will be provided by adding the service contents of MBMS services to the neighboring cell information. A detailed method will be explained with reference to FIG. 87. Because FIG. 87 is similar to FIG. 86, the explanation of the same portion will be omitted. The serving cell, in step ST3901, transmits the neighboring cell information to mobile terminals being served thereby. The service contents of MBMS services in a neighboring cell is newly disposed in the neighboring cell information. Because a concrete example of the service contents is the same as that shown in Embodiment 18, the explanation of the concrete example will be omitted hereafter. Instead of the MBMS service contents of the neighboring cell, the information about MBSFN subframe allocation of the neighboring cell can be provided. If the MBSFN subframe allocation of the neighboring cell is the same as that of the serving cell, it can be determined that the neighboring cell and the serving cell carry out multi-cell transmission of the MBMS service in order to support SFN combining. This is because it can be therefore determined that the neighboring cell and the serving cell are carrying out the same MBMS service. Furthermore, when transmitting the neighboring cell information from the serving cell to the mobile terminals, the neighboring cell information is mapped onto a broadcast control channel (BCCH) which is a logical channel, and the broadcast control channel is further mapped onto a broadcast channel (BCH) which is a transport channel and this broadcast channel is mapped onto a physical broadcast channel (PBCH) which is a physical channel. The neighboring cell information can be alternatively mapped onto the broadcast control channel (BCCH) which is a logical channel, and this broadcast control channel can be further mapped onto a downlink shared channel (DL-SCH) which is a transport channel and the downlink shared channel can be mapped onto a physical downlink shared channel (PDSCH) which is a physical channel.

The serving cell, in step ST3806, can transmit the service contents of each neighboring cell as the control information about MBMS services, instead of adding the service contents of MBMS services to the neighboring cell information. In this case, it is necessary to inform the service contents of each neighboring cell in a form corresponding to its neighboring cell number (ID). The information which is referred to as the "service contents of MBMS services currently being ongoing in the neighboring cells" is transmitted via a multi-cell transmission scheme from unicast/MBMS mixed cells in the unicast/mixed frequency layer. The information is the parameter newly disposed in this Embodiment 20 in order to solve the problem of interruption of MBMS reception which arises when a mobile terminal currently receiving an MBMS service carries out a handover. Therefore, the parameter is effective only for such a mobile terminal currently receiving an MBMS service. Therefore, there is no problem even if the service contents of MBMS services are added to the control information about MBMS services which only a mobile terminal currently receiving an MBMS service receives. As a result, the increase in the amount of information of the BCCH can be prevented, and there can be provided an advantage of preventing a control delay time from occurring in the whole mobile communication system. In addition, each of the mobile terminals can receive and decode the service contents of each neighboring cell added to the control information about MBMS services after the mobile terminal actually starts receiving the MBMS service in step ST3809. In this case, there is an issue of how the serving cell acquires the service contents of each neighboring cell. As a solution, there can be considered a case in which the service contents are informed by using communications between base stations, that is, each neighboring cell informs its service contents to the serving cell. As another solution, there can be considered a case in which each cell informs the service contents to an MME, and the MME then informs the service contents of each cell included in the neighboring cells to the serving cell. As another solution, there can be considered a case in which an MCE informs the service contents of each cell to an MME, and the MME informs the service contents of each cell included in the neighboring cells to the serving cell. As another solution, there can be considered a case in which an MCE informs the service contents of each neighboring cell directly to each serving cell. Each of the mobile terminals, in step ST3902, receives the neighboring cell information.

Each of the mobile terminals, in step ST3903, checks the service contents of MBMS services of each neighboring cell, and determines whether or not the service which the mobile terminal is currently receiving is ongoing in the new serving cell. When the service is ongoing in the new serving cell, each of the mobile terminals makes a transition to step ST3813. In contrast, when the service is not ongoing in the new serving cell, each of the mobile terminals makes a transition to step ST3904. Each of the mobile terminals, in step ST3904, does not inform the event which is used for notification of the measurement result to the serving cell. Concretely, each of the mobile terminals does not inform the event in the case in which a re-selection of the serving cell is needed. More concretely, each of the mobile terminals does not inform the event A3 to the serving cell. As a result, the mobile communication system does not start the handover process, and does not carry out a re-selection of the serving cell. Therefore, there can be provided an advantage of preventing the previously-selected serving cell in which the MBMS service which the user desires is ongoing from being changed, thereby preventing the MBMS service reception from being interrupted. As a result, the problem of an interruption of MBMS service reception occurring in a mobile terminal currently receiving an MBMS service transmitted via a multi-cell transmission scheme from MBMS dedicated cells or unicast/MBMS mixed cells in a unicast/mixed frequency layer due to occurrence of a handover, which is to be solved by the present invention, can be solved.

Furthermore, because it is a fact that each of the mobile terminals, in step ST3812, may judge that a re-selection (a cell re-selection) of the serving cell is needed according to the results of the measurements in step ST3811, the user should stop the movement if he or she does not want to interrupt the MBMS service reception. Therefore, when each of the mobile terminals has stopped the handover process because the desired MBMS service is not ongoing in the new serving cell in spite of having determined that a re-selection of the serving cell is needed, a notification to the effect can be sent to the user through display of it on a display unit, with an alarm, or the like. As a result, when the user gives a higher priority to the current reception of the MBMS service than to the movement, the user becomes able to stop the movement, and there can be provided an advantage of enabling the user to use the mobile terminal according to the user's needs more effectively. Each of the mobile terminals, in step ST3904, instead of not informing the event A3 to the serving cell, can inform the user's intention to the serving cell while informing the event (event A3) in the case in which a re-selection of the serving cell is needed to the serving cell. As a concrete example of the user's intention, a desire for non-execution of a handover can be considered.

In accordance with Embodiment 20, the problem of an interruption of MBMS service reception occurring in a mobile terminal currently receiving an MBMS service transmitted via a multi-cell transmission scheme from unicast/MBMS mixed cells in a unicast/mixed frequency layer due to occurrence of a handover, which is to be solved by the present invention, can be solved.

Embodiment 21

Figure 88:
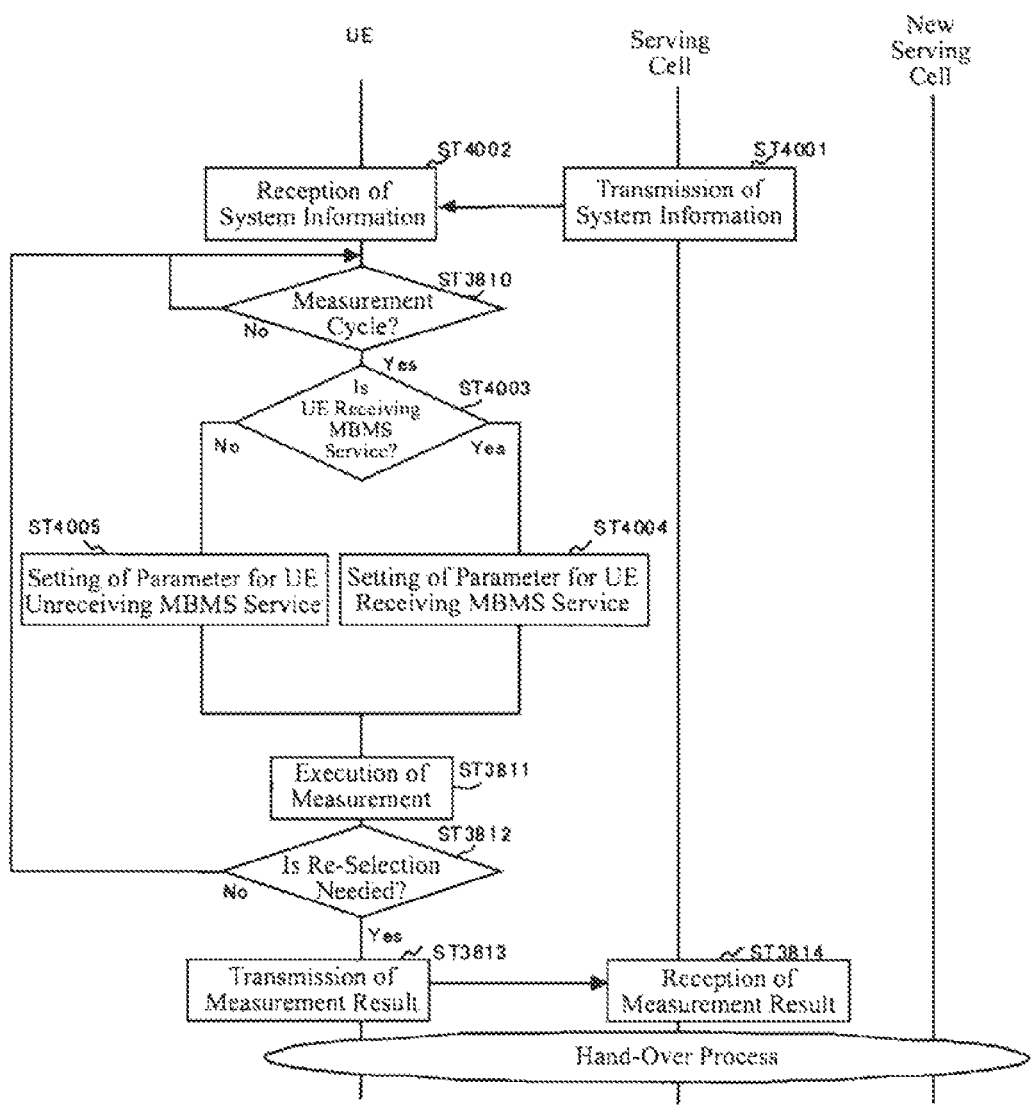
FIG. 88 is a flow chart showing a process, which is carried out by a mobile terminal currently receiving an MBMS service which is transmitted via a multi-cell transmission scheme from unicast/MBMS mixed cells, of carrying out a handover.

A sequence diagram of a mobile communication system which is used in Embodiment 21 is shown in FIG. 88. In FIG. 88, because the same steps as those shown in FIG. 86 denote the same processes as those shown in the figure or like processes, the explanation of the steps will be omitted hereafter. A serving cell, in step ST4001, transmits system information about the self-cell to mobile terminals being served thereby. As a concrete example of the system information transmitted to the mobile terminals, there are a measurement period length, a discontinuous reception cycle length, and tracking area information (TA information). The measurement period length is informed from the network side to the mobile terminals being served by the cell, and each of the mobile terminals measures a field intensity and so on at periods (cycles) of this period length. Measurement reporting parameters (measurement reporting parameters) which are used at the time of measurements of the serving cell and a peripheral cell are included in the system information about the self-cell. As a concrete example of the measurement reporting parameters, a "threshold (threshold)", an "offset (offset)", etc., which are shown in nonpatent reference 3, can be considered. In this Embodiment 21, it is newly considered that the above-mentioned measurement reporting parameters are divided into parameters for mobile terminals each of which is not receiving an MBMS service transmitted via a multi-cell transmission scheme from unicast/MBMS mixed cells in a unicast/mixed frequency layer (simply referred to as MBMS service non-receiving mobile terminals from here on), and parameters for mobile terminals each of which is receiving an MBMS service transmitted via a multi-cell transmission scheme from unicast/MBMS mixed cells in a unicast/mixed frequency layer (simply referred to as MBMS service receiving mobile terminals from here on). In addition, it is considered that the offset is divided into an offset for MBMS service non-receiving mobile terminals and an offset for MBMS service receiving mobile terminals. Furthermore, it is considered that the offset for MBMS service receiving mobile terminals is made to be larger than that for MBMS service non-receiving mobile terminals.

When the self-cell information is transmitted from the serving cell to the mobile terminals, the self-cell information is mapped onto a broadcast control channel (BCCH) which is a logical channel, and the broadcast control channel is further mapped onto a broadcast channel (BCH) which is a transport channel and this broadcast channel is mapped onto a physical broadcast channel (PBCH) which is a physical channel. The self-cell information can be alternatively mapped onto the broadcast control channel (BCCH) which is a logical channel, and this broadcast control channel can be further mapped onto a downlink shared channel (DL-SCH) which is a transport channel and the downlink shared channel can be mapped onto a physical downlink shared channel (PDSCH) which is a physical channel. The "measurement reporting parameters" for MBMS service receiving mobile terminals are established newly in order to solve the problem that when a mobile terminal which is receiving an MBMS service transmitted via a multi-cell transmission scheme from unicast/MBMS mixed cells in a unicast/mixed frequency layer carries out a handover, an MBMS receive interruption can occur. Therefore, the parameters are effective for a mobile terminal which is receiving an MBMS service. Therefore, there is no problem even if the parameters are separated from the other system information and are added to the control information about MBMS services received by a mobile terminal which receives an MBMS service. As a result, the increase in the amount of information of the BCCH can be prevented, and there can be provided an advantage of preventing a control delay time from occurring in the whole mobile communication system. When the control information about MBMS services is transmitted from the serving cell to the mobile terminals, this control information about MBMS services is mapped onto a broadcast control channel (BCCH) which is a logical channel, and the broadcast control channel is further mapped onto a broadcast channel (BCH) which is a transport channel and this broadcast channel is mapped onto a physical broadcast channel (PBCH) which is a physical channel. The control information about MBMS services can be alternatively mapped onto the broadcast control channel (BCCH) which is a logical channel, and this broadcast control channel can be further mapped onto a downlink shared channel (DL-SCH) which is a transport channel and the downlink shared channel can be mapped onto a physical downlink shared channel (PDSCH) which is a physical channel. As an alternative, the control information about MBMS services can be mapped onto a multicast control channel (MCCH) which is a logical channel, and the multicast control channel can be mapped onto a multicast channel (MCH) which is a transport channel and the multicast channel can be mapped onto a physical multicast channel (PMCH) which is a physical channel. Each of the mobile terminals, in step ST4002, receives the system information about the self-cell from the serving cell.

Each of the mobile terminals, in step ST4003, determines whether or not it is receiving an MBMS. Concretely, each of the mobile terminals determines whether or not it is receiving an MBMS service transmitted via a multi-cell transmission scheme from unicast/MBMS mixed cells in a unicast/mixed frequency layer. When each of the mobile terminals is receiving an MBMS, the mobile terminal makes a transition to step ST4004. In contrast, when each of the mobile terminals is not receiving an MBMS, the mobile terminal makes a transition to step ST4005. Each of the mobile terminals, in step ST4004, sets the measurement reporting parameters for MBMS receiving mobile terminals to its measurement reporting parameters. Concretely, each of the mobile terminals sets the offset for MBMS receiving mobile terminals to its offset. Each of the mobile terminals, in step ST4005, sets the measurement reporting parameters for MBMS non-receiving mobile terminals to its measurement reporting parameters. More concretely, each of the mobile terminals sets the offset for MBMS non-receiving mobile terminals to its offset.

In accordance with this Embodiment 21, it becomes able to change the results of measurements of a peripheral cell (a new serving cell) in which a handover process occurs in a mobile terminal currently receiving an MBMS service and a mobile terminal not receiving an MBMS service. Furthermore, by making the offset for MBMS service receiving mobile terminals be larger than the offset for MBMS service non-receiving mobile terminals, the result of the measurement of the peripheral cell in which an MBMS service receiving mobile terminal carries out a handover process can be made to be higher than that of the measurement of the peripheral cell in which an MBMS service non-receiving mobile terminal carries out a handover process. As a result, the possibility that a handover occurs in a mobile terminal which is receiving an MBMS service transmitted via a multi-cell transmission scheme from unicast/MBMS mixed cells in a unicast/mixed frequency layer can be reduced compared with the possibility that a handover occurs in a mobile terminal which is not receiving an MBMS service transmitted via a multi-cell transmission scheme from the unicast/MBMS mixed cells in the unicast/mixed frequency layer when they are geographically located at the same location. Accordingly, a geographical area in which each mobile terminal can receive an MBMS service transmitted via a multi-cell transmission scheme from the unicast/MBMS mixed cells in the unicast/mixed frequency layer from an identical base station can be widened. As a result, there can be provided an advantage of reducing the occurrence of an interruption of MBMS service reception in a mobile terminal which is receiving an MBMS service transmitted via a multi-cell transmission scheme from unicast/MBMS mixed cells in a unicast/mixed frequency layer due to occurrence of a handover. In Embodiment 20, the problem is solved by newly adding the service contents of MBMS services of a neighboring cell to the neighboring cell information. However, it can be expected that the amount of information of the service contents of MBMS services of each neighboring cell increases. In this Embodiment 21, the problem is solved without adding the service contents of MBMS services of a neighboring cell. Therefore, the problem can be solved while reducing the amount of information transmitted from the serving cell to each mobile terminal as compared with Embodiment 20. Therefore, there can be provided an advantage of making further effective use of the radio resources as compared with Embodiment 20.

Figure 89:
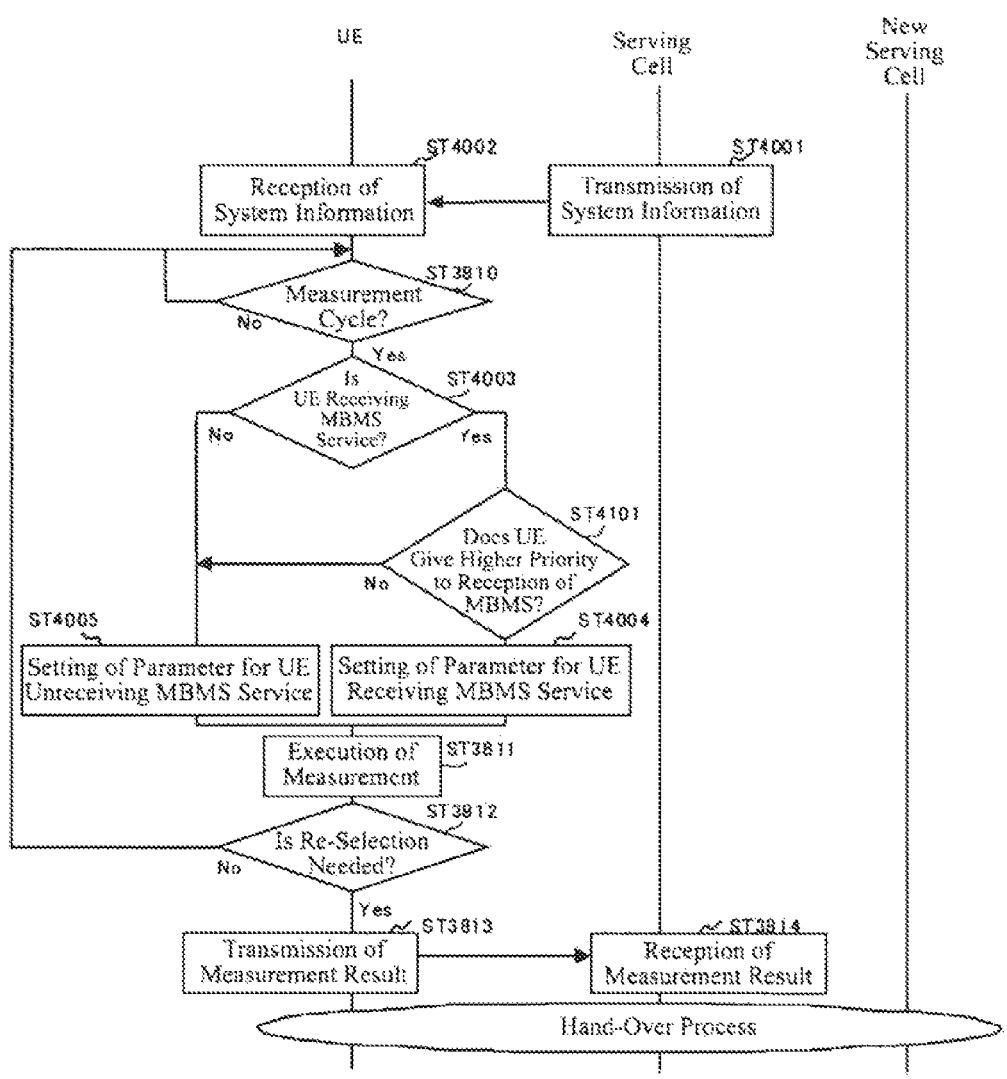
FIG. 89 is a flow chart showing a process, which is carried out by a mobile terminal currently receiving an MBMS service which is transmitted via a multi-cell transmission scheme from unicast/MBMS mixed cells, of carrying out a handover.

Next, variant 1 of this embodiment will be explained. By modifying Embodiment 21 as follows, a further advantage can be provided. A sequence diagram of a mobile communication system which is used in variant 1 of Embodiment 21 is shown in FIG. 89. In FIG. 89, because the same steps as those shown in FIG. 86 or 88 denote the same processes as those shown in the figure or like processes, the explanation of the steps will be omitted hereafter. Each of the mobile terminals, in step ST4003, determines whether or not it is receiving an MBMS. More concretely, each of the mobile terminals determines whether or not it is receiving an MBMS service transmitted via a multi-cell transmission scheme from unicast/MBMS mixed cells in a unicast/mixed frequency layer. When each of the mobile terminals is receiving an MBMS, the mobile terminal makes a transition to step ST4101. In contrast, when each of the mobile terminals is not receiving an MBMS, the mobile terminal makes a transition to step ST4005. Each of the mobile terminals, in step ST4101, checks the user's intention. More concretely, each of the mobile terminals determines whether to give a higher priority to MBMS service reception than to unicast communications. More concretely, each of the mobile terminals determines whether to give priority to reception of an MBMS service transmitted via unicast communications and via a multi-cell transmission scheme from unicast/MBMS mixed cells in a unicast/mixed frequency layer. When each of the mobile terminals gives priority to reception of an MBMS service, the mobile terminal makes a transition to step ST4004. In contrast, when each of the mobile terminals does not give priority to reception of an MBMS service, the mobile terminal makes a transition to step ST4005.

Variant 1 of Embodiment 21 can provide the following further advantages. In the case in which each of the mobile terminals, in step ST4004, sets the offset for MBMS receiving mobile terminals to its offset, even if a mobile terminal which is not receiving an MBMS service starts a handover process of performing a handover to a new serving cell because its receiving state of receiving data from the current serving cell gets worse (even if the mobile terminal informs an event A3 to the serving cell), a mobile terminal currently receiving an MBMS service does not start a handover process even in the same receiving state (in other words, at the same geographical location). This means that a mobile terminal currently receiving an MBMS service stays at the current serving cell even in a case in which a mobile terminal which is not receiving an MBMS service starts a handover process by determining that its receiving state of receiving data from the current serving cell is bad. Therefore, although an interruption of MBMS service reception does not occur in a mobile terminal currently receiving an MBMS service, there may be a case in which such a situation results in degradation in the quality of reception of a unicast service. Therefore, by using this variant, the processing carried out by the mobile communication system can be made to reflect the user's intention of either preventing occurrence of interruptions of MBMS service reception as much as possible, or allowing interruptions of MBMS service reception to prevent the degradation of the quality of reception of a unicast service, and therefore there can be provided an advantage of enabling the user to use his or her mobile terminal according to the user's needs more effectively.

Figure 90:
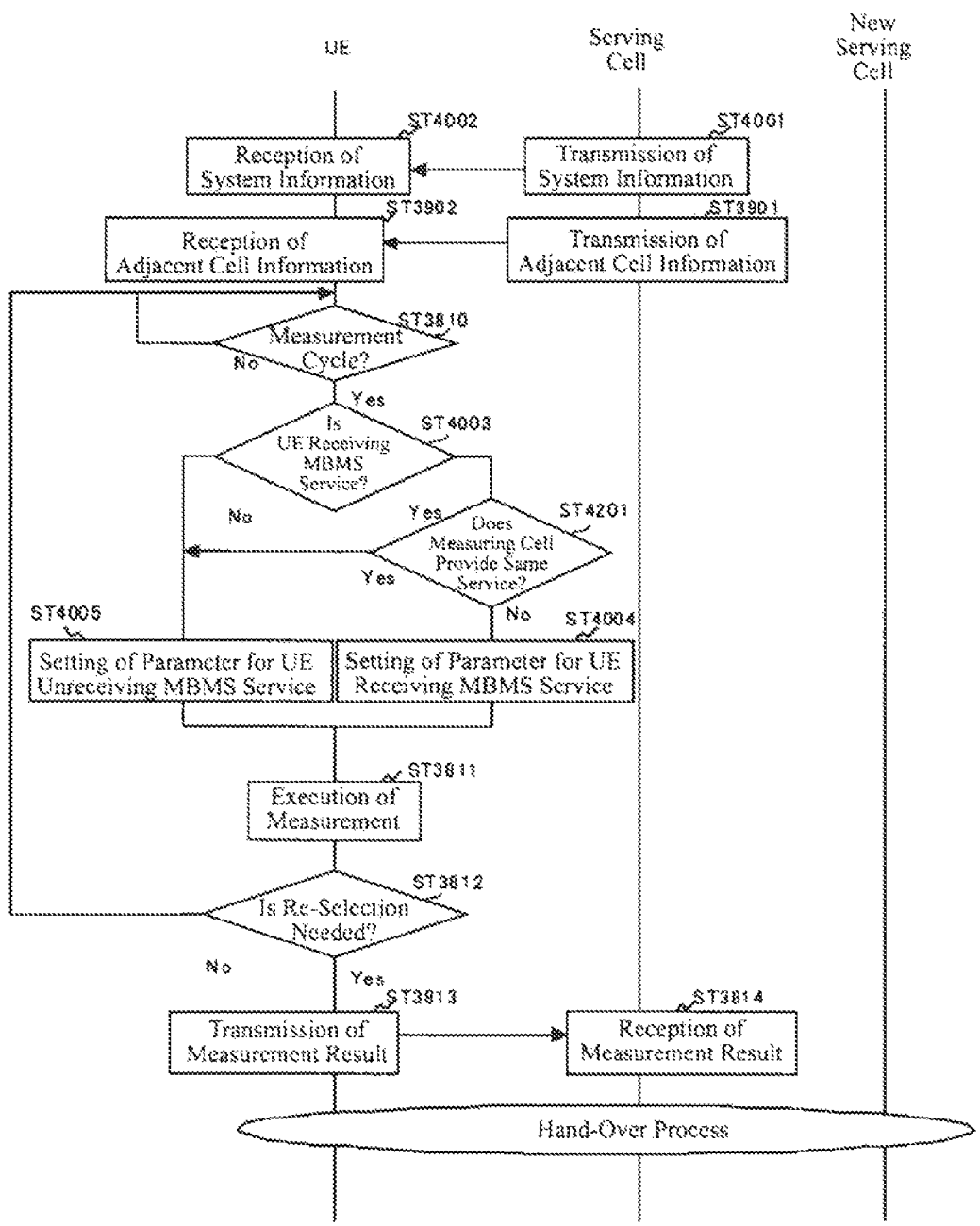
FIG. 90 is a flow chart showing a process, which is carried out by a mobile terminal currently receiving an MBMS service which is transmitted via a multi-cell transmission scheme from unicast/MBMS mixed cells, of carrying out a handover.

Next, variant 2 of this embodiment will be explained. By modifying Embodiment 21 as follows, a further advantage can be provided. A sequence diagram of a mobile communication system which is used in variant 2 of Embodiment 21 is shown in FIG. 90. In FIG. 90, because the same steps as those shown in FIGS. 86 to 40 denote the same processes as those shown in the figure or like processes, the explanation of the steps will be omitted hereafter. Each of the mobile terminals, in step ST4003, determines whether or not it is receiving an MBMS. When each of the mobile terminals is receiving an MBMS, the mobile terminal makes a transition to step ST4201. In contrast, when each of the mobile terminals is not receiving an MBMS, the mobile terminal makes a transition to step ST4005. Each of the mobile terminals, in step ST4201, checks the service contents of MBMS services of a neighboring cell by using neighboring cell information received in step ST3902, as to a peripheral cell which is a measurement object. As to a peripheral cell which is a measurement object, each of the mobile terminals determines whether or not an MBMS service which it is receiving is ongoing in the current serving cell. When an MBMS service which each of the mobile terminals is receiving is ongoing in the current serving cell, the mobile terminal makes a transition to step ST4005. In contrast, when an MBMS service which each of the mobile terminals is receiving is not ongoing in the current serving cell, the mobile terminal makes a transition to step ST4004.

Variant 2 of Embodiment 21 can provide the following further advantages. In a case in which an MBMS service which a mobile terminal is receiving in the current serving cell is ongoing in the new serving cell, the problem of an interruption of MBMS service reception due to occurrence of a handover does not arise. Therefore, in the case in which an MBMS service which a mobile terminal is receiving in the current serving cell is ongoing in the new serving cell, it becomes able to prevent the use of measurement reporting parameters for MBMS service receiving mobile terminals resulting in degradation of the quality of reception of a unicast service (including an MBMS service). Furthermore, variant 1 and variant 2 of Embodiment 21 can be used in combination.

Embodiment 22

Figure 91:
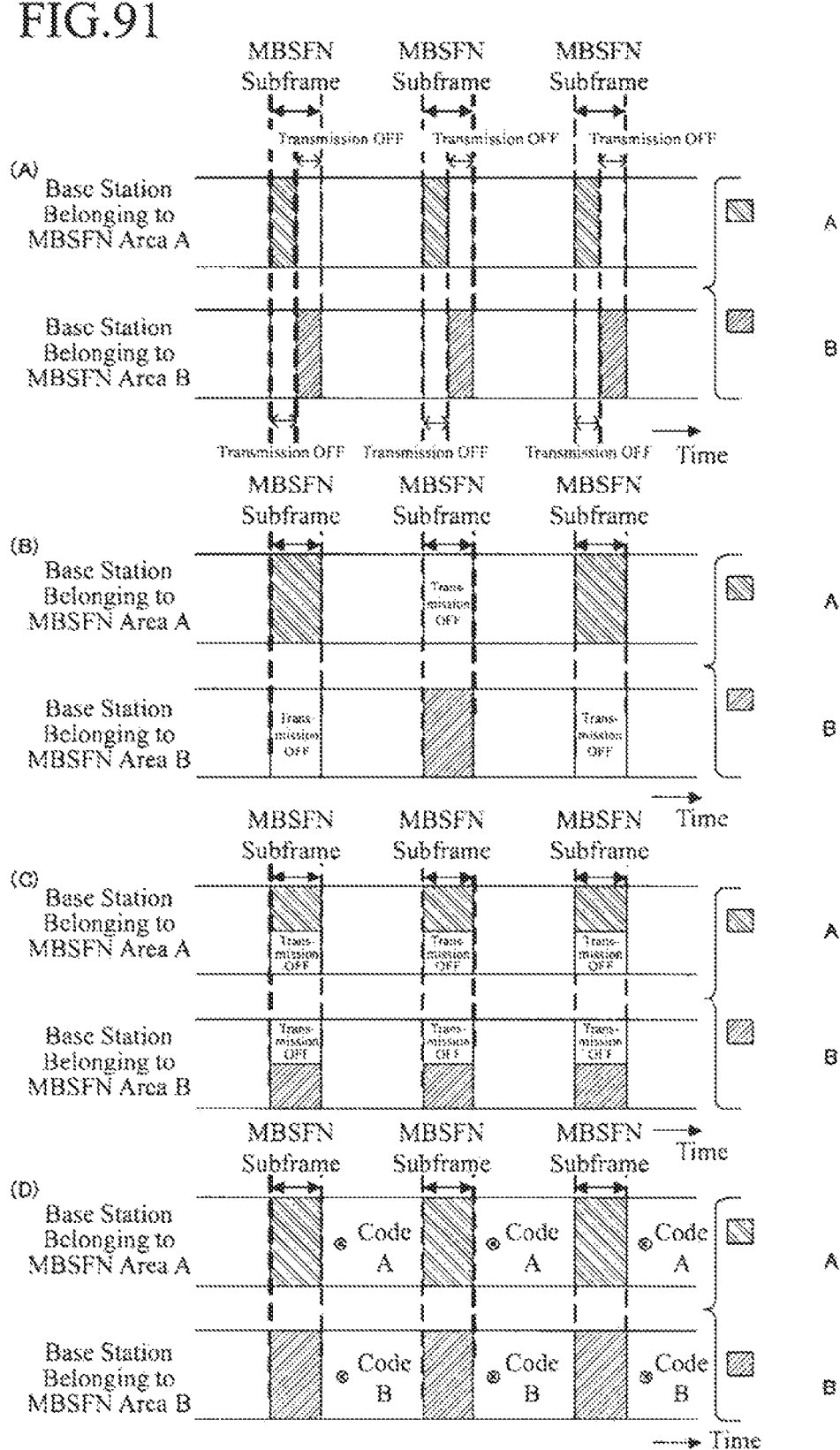
FIG. 91 is an explanatory drawing showing a concept regarding multiplexing of MBSFN subframes in an MBSFN area.

A case in which radio resources which base stations belonging to all MBSFN areas in an MBSFN synchronization area use for multi-cell transmission from a unicast/MBMS mixed cell in a unicast/mixed frequency layer is made to be identical to one another will be considered. More concretely, it will be considered that each of all the MBSFN areas in the MBSFN synchronization area use MBSFN subframes which are used for transmission of an MBMS service (an MCCH and an MTCH). More specifically, radio resources (MBSFN subframes) common in the MBSFN synchronization area are used in such a way that the radio resources are multiplexed in each of the MBSFN areas. Concrete examples of a multiplexing method are shown in FIG. 91. FIG. 91 is an explanatory drawing showing a concept underlying the method of multiplexing MBSFN subframes in each of the MBSFN areas. In FIG. 91, A shows "MBMS service data from a base station belonging to an MBSFN area A", and B shows "MBMS service data from a base station belonging to an MBSFN area B". In FIG. 91(A) (a pattern A), time division multiplexing of radio resources (MBSFN subframes) which the base station belonging to the MBSFN area A and the base station belonging to the MBSFN area B use is carried out. Within each MBSFN subframe, a time period during which the base station belonging to the MBSFN area A transmits an MBMS service is the one during which the base station belonging to the MBSFN area B does not carry out transmission of an MBMS service and a unicast service, i.e., the transmission is in an off state. Furthermore, a time period during which the base station belonging to the MBSFN area B transmits an MBMS service is the one during which the base station belonging to the MBSFN area A does not carry out transmission of an MBMS service and a unicast service, i.e., the transmission is in an off state. Although a pattern B shows a concrete example of time division multiplexing, in the pattern B, each MBSFN subframe is not time-divided, but an MBSFN subframe which is used for each MBSFN area is determined. Also in FIG. 91(B) (the pattern B), within an MBSFN subframe via which the base station belonging to the MBSFN area A transmits an MBMS service, the base station belonging to the MBSFN area B does not carry out transmission of an MBMS service and a unicast service, i.e., the transmission is in an off state, like in the case of the pattern A. Furthermore, within an MBSFN subframe via which the base station belonging to the MBSFN area B transmits an MBMS service, the base station belonging to the MBSFN area A does not carry out transmission of an MBMS service and a unicast service, i.e., the transmission is in an off state.

In FIG. 91(C) (a pattern C), an example in which frequency division multiplexing (FDM: Frequency Division Multiplexing) of radio resources (MBSFN subframes) which the base station belonging to the MBSFN area A and the base station belonging to the MBSFN area B use is carried out is shown. Within each MBSFN subframe, at a frequency at which the base station belonging to the MBSFN area A transmits an MBMS service, the base station belonging to the MBSFN area B does not carry out transmission of an MBMS service and a unicast service, i.e., the transmission is in an off state. Within each MBSFN subframe, at a frequency at which the base station belonging to the MBSFN area B transmits an MBMS service, the base station belonging to the MBSFN area A does not carry out transmission of an MBMS service and a unicast service, i.e., the transmission is in an off state. In FIG. 91(D) (a pattern D), an example in which code division multiplexing of radio resources (MBSFN subframes) which the base station belonging to the MBSFN area A and the base station belonging to the MBSFN area B use is carried out is shown. With the radio resources (each MBSFN subframe) common in the MBSFN synchronization area, the base station belonging to the MBSFN area A multiplies data by a code A and transmits an MBMS service. Furthermore, with the radio resources (each MBSFN subframe) common in the MBSFN synchronization area, the base station belonging to the MBSFN area B multiplies data by a code B and transmits an MBMS service. The example in which base stations belonging to all MBSFN areas in an MBSFN area use identical radio resources (MBSFN subframes) is described above. As an alternative, base stations which construct an MBSFN area and base stations belonging to a neighboring MBSFN area can use identical radio resources.

In accordance with Embodiment 22, there can be provided an advantage of reducing the occurrence of an interruption of MBMS service reception in a mobile terminal which is receiving an MBMS service transmitted via a multi-cell transmission scheme from unicast/MBMS mixed cells in a unicast/mixed frequency layer due to occurrence of a handover. This is because in the mobile communication system as shown in Embodiment 22, base stations belonging to an MBSFN synchronization area provide MBMS services by using identical radio resources (MBSFN subframes). A case in which the current serving cell belongs to the MBSFN area A, and the new serving cell belongs to the MBSFN area B will be considered. In the case of a unicast service, each mobile terminal carries out transmission and reception with the new serving cell having good quality of reception, and the new serving cell carries out scheduling. In contrast, in the case of an MBMS service, each mobile terminal can receive an MBMS service in an MBSFN area in which a service that the user of the mobile terminal desires is ongoing. Furthermore, because an MBMS service is targeted for a base station belonging to an MBSFN synchronization area, it is not necessary to newly add base stations among which synchronization is established in order to implement this embodiment and therefore the complexity of the mobile communication system is not increased. Compared with Embodiment 20, the following advantages can be provided. The service contents of MBMS services of a neighboring cell which are needed in Embodiment 20 become unnecessary. Therefore, compared with Embodiment 20, the problem can be solved while the amount of information transmitted from the serving cell to each mobile terminal is reduced. Therefore, compared with Embodiment 20, there can be provided an advantage of making effective use of the radio resources.

Compared with Embodiment 21, the following advantages can be provided. The measurement reporting parameters which are divided into the ones for mobile terminals each of which is not receiving an MBMS service transmitted via a multi-cell transmission scheme from unicast/MBMS mixed cells in a unicast/mixed frequency layer, and the ones for mobile terminals each of which is receiving an MBMS service transmitted via a multi-cell transmission scheme from unicast/MBMS mixed cells in a unicast/mixed frequency layer, and which are needed in Embodiment 21, become unnecessary. Therefore, compared with Embodiment 21, the problem can be solved while the amount of information transmitted from the serving cell to each mobile terminal is reduced. Therefore, compared with Embodiment 21, there can be provided an advantage of making effective use of the radio resources. Furthermore, in accordance with Embodiment 22, because even a mobile terminal currently receiving an MBMS service becomes able to carry out a handover regardless of whether the MBMS service which the mobile terminal is receiving is ongoing in the new serving cell when its quality of reception of data from the current serving cell is reduced by the same degree as that of a mobile terminal not receiving the MBMS service, there can be provided an advantage of preventing degradation in the quality of reception of a unicast service compared with Embodiment 21.

Embodiment 23

Figure 92:
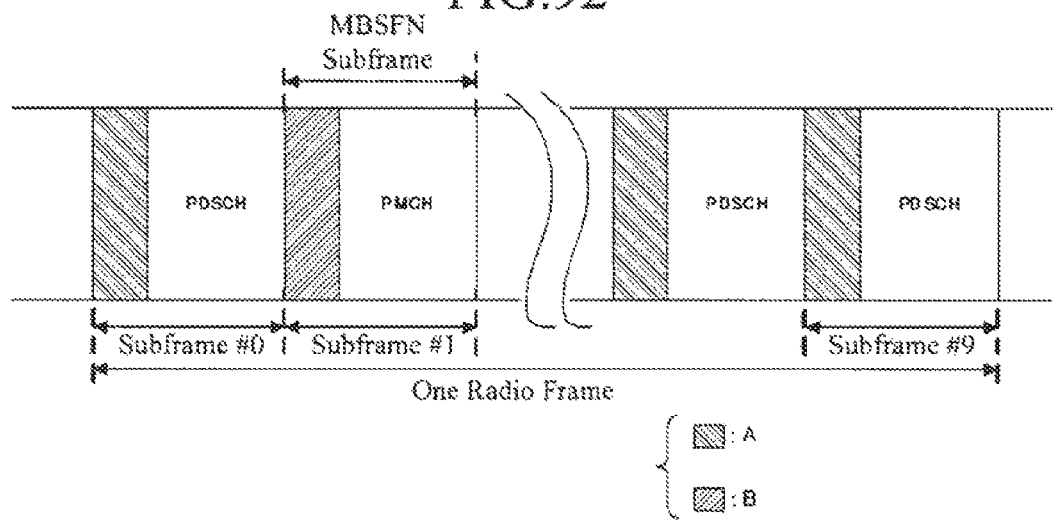

A problem to be solved by this invention will be explained with reference to FIG. 92. A shown in FIG. 92 denotes an L1/L2 signaling channel, and B shown in FIG. 92 denotes a resource for unicast transmission. Allocation of MBSFN subframes in an MBMS/unicast-mixed cell has been studied as disclosed in nonpatent reference 2. Multiplexing of a channel used for MBSFN (Multimedia Broadcast multicast service Single Frequency Network) and a channel used for other than MBSFN is carried out for each subframe, as disclosed in nonpatent reference 1. Hereafter, a subframe used for MBSFN transmission is referred to as an MBSFN subframe (MBSFN subframe). In the current 3GPP, it is determined that a mixed cell must not use one or two leading OFDM symbols of each subframe for unicast transmission in an MBSFN frame (subframe). In other words, anything other than one or two leading OFDM symbols is a resource dedicated to MBMS transmission. In FIG. 92, this resource is expressed as a PMCH. On the other hand, nonpatent reference 1 discloses that a PCH is mapped onto a PDSCH or a PDCCH. Nonpatent reference 1 also discloses that a paging group uses an L1/L2 signaling channel (PDCCH) and that a precise identifier (UE-ID) of a mobile terminal can be found on a PCH. Therefore, because a PCH uses an L1/L2 signaling channel, even an MBSFN frame can be mapped onto the PCH. On the other hand, in a case in which allocation of a downlink radio resource to the next control information using the PCH is carried out in an MBSFN frame, because a downlink radio resource on an identical subframe is used exclusively for MBMS transmission, there arises a problem that the control information cannot be allocated to the identical subframe.

Nonpatent reference 4 has the following description on transmission of a paging signal to a mobile terminal. A PICH (Paging Indicator channel) showing that a paging signal destined for a mobile terminal belonging to a paging group is occurring is transmitted by using an L1/L2 signaling channel. In order to determine whether or not the paging signal is the one destined therefor, the mobile terminal decodes the paging signal. A PCH can have one or more paging signals. The PICH is transmitted by using an L1/L2 signaling channel. In other words, the PICH is positioned at one to three leading OFDM symbols of each subframe. On the other hand, the PCH is mapped onto a PDSCH in the same subframes as those at which the PICH is positioned. The problem to be solved by the present invention also arises in the paging signal transmitting procedure disclosed in nonpatent reference 4. That is, in a case in which MBSFN subframes are formed in an MBMS/unicast-mixed cell, the same subframes as those at which the PICH is positioned are a resource dedicated to MBMS transmission even if the PICH is transmitted with the one or two leading OFDM symbols of each of the MBSFN subframes. Therefore, it is impossible to transmit the PCH onto which a paging signal for enabling each mobile terminal to determine whether or not the paging signal is destined therefor is mapped. There is also no suggestion about the problem to be solved by the present invention in nonpatent reference 4.

Nonpatent reference 5 has the following description about an equation used for determining a time when paging occurs (i.e., paging occasion: Paging occasion). This reference describes that in order to determine a paging occasion, two parameters: a paging interval length (corresponding to a discontinuous reception cycle length in a mixed frequency layer in accordance with the present invention), and the number of paging occasions during the paging interval are needed, and there are no other necessary parameters. Furthermore, the reference describes that a subframe in a radio frame in which a paging occasion occurs has a fixed value. However, nonpatent reference 5 has no description about a method of determining a subframe in a radio frame for paging occasion onto which a paging signal is mapped. Furthermore, nonpatent reference 5 has no description about a relation between a subframe in a radio frame for paging occasion and an MBSFN subframe, and there is also no suggestion about the problem to be solved by the present invention.

Figure 93:
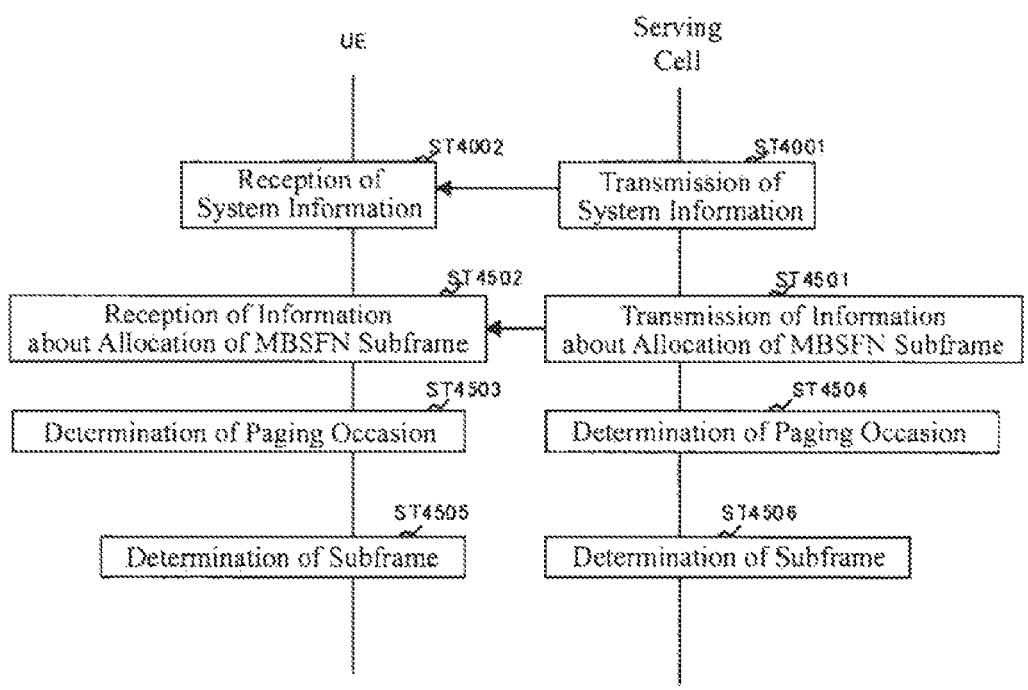
FIG. 93 is an explanatory drawing explaining a problem of the present invention.

OFDM symbols other than the one or two leading OFDM symbols of each MBSFN subframe are a resource dedicated to MBMS transmission. In a case in which the subframe in a radio frame for paging occasion coincides with MBSFN subframe allocation, any OFDM symbols other than the one or two leading OFDM symbols of the subframe are a resource dedicated to MBMS transmission and cannot be used for paging processing. Because MBSFN subframes are not taken into consideration at all in the conventional paging processing method, there arises a problem that it is impossible to apply the conventional paging processing method to paging processing in an MBMS/unicast-mixed cell. In order to solve this problem, in this Embodiment 23, a method of determining which subframe in a radio frame for paging occasion is used for the paging process (transmission of a paging signal (a paging message), a PICH, a PCH, etc.) will be disclosed. A concrete example of a sequence diagram in a case of determining a subframe in a radio frame for paging occasion onto which a paging signal is mapped is shown in FIG. 93. Because processes in the same step numbers as those shown in FIG. 88 are the same as those shown in the figure, the explanation of the processes will be omitted. A serving cell, in step ST4001, transmits system information about the self-cell to mobile terminals being served thereby. As a concrete example of the system information transmitted to the mobile terminals, there are a measurement period length, a discontinuous reception cycle length, and tracking area information (TA information). A parameter for discontinuous reception is included in the system information about the self-cell. As a concrete example of the parameter for discontinuous reception, a discontinuous reception cycle length (T) in a mixed frequency layer, the number (N) of paging occasions within a paging interval (or the number of paging groups), etc. are provided. As a concrete example of the indication of the discontinuous reception cycle length, the number of radio frames can be used. Each mobile terminal, in step ST4002, receives the system information about the self-cell from the serving cell. The serving cell, in step ST4501, transmits information about allocation of MBSFN subframes. In the debate in the current 3GPP regarding MBSFN subframe allocation, the following points have been discussed. The mapping position of a reference signal in an MBSFN subframe as a radio resource differs from that of a reference signal in a subframe which is not an MBSFN subframe as a radio resource. It has been debated that in order to carry out a more correct measurement using a reference signal, even a mobile terminal having no capability of receiving an MBMS service needs to grasp the information about MBSFN subframe allocation in the serving cell (nonpatent reference 2). As a concrete example of the information about MBSFN subframe allocation, the subframe number of a subframe allocated as an MBSFN subframe (e.g., in FIG. 92, subframe number #1) can be considered. Each mobile terminal, in step ST4502, receives the information about allocation of MBSFN subframes from the serving cell.

Each mobile terminal, in step ST4503, determines a paging occasion. In this Embodiment 23, a determining method of determining a subframe in a radio frame for paging occasion to solve the problem will be disclosed. The method disclosed in this Embodiment 23 can be used regardless of a method of determining a paging occasion (a radio frame for paging occasion). The serving cell, in step ST4504, determines a radio frame for paging occasion by using the same method as that which each mobile terminal uses, as the mobile communication system. Each mobile terminal, in step ST4505, determines a subframe in a radio frame for paging occasion. The serving cell, in step ST4506, determines a subframe in a radio frame for paging occasion by using the same method as that which each mobile terminal uses, as the mobile communication system.

The details of the method of determining a subframe in a radio frame of paging occasion in step ST4505 will be explained hereafter. Each mobile terminal determines subframes other than subframes which can be MBSFN subframes as subframes in a radio frame for paging occasion on the basis of the information about MBSFN subframe allocation received in step ST4502. More concretely, each mobile terminal re-numbers the subframes excluding subframes which can be MBSFN subframes. The renumbering will be explained with reference to FIG. 94. In FIG. 94, A denotes an MBSFN subframe. FIG. 94(a) shows a radio frame in which no MBSFN subframe exists. FIG. 94(b) shows an example of the re-numbering of the subframes when an MBSFN subframe is allocated to subframe number #3, for example. The following correspondence between the yet-to-be-renumbered subframe numbers and the renumbered subframe numbers is provided.
(yet-to-be-renumbered subframe number–renumbered subframe number)
(#0-#0 (MBSFN))
(#1-#1 (MBSFN))
(#2-#2 (MBSFN))
(#3-MBSFN subframe)
(#4-#3 (MBSFN))
(#5-#4 (MBSFN))
(#6-#5 (MBSFN))
(#7-#6 (MBSFN))
(#8-#7 (MBSFN))
(#9-#8 (MBSFN))
Hereinafter, each renumbered subframe number is shown while being added with (MBSFN). In FIG. 94(c), a case in which two MBSFN subframes are allocated to one radio frame is shown. Because the details of the renumbering is the same as that in the case in which the number of MBSFN subframes is one, the explanation of the details of the renumbering will be omitted hereafter. A subframe in a radio frame for paging occasion is determined while being brought into correspondence with the number of subframes excluding subframes which can be MBSFN subframes. A correspondence table is shown in FIG. 95 as a concrete example. FIG. 95(a) will be explained. When the number of subframes excluding subframes which can be MBSFN subframes is "9" (that is, one subframe is allocated as an MBSFN subframe in this radio frame), #4(MBSFN) is determined as a subframe in a radio frame for paging occasion. Determination of a subframe in a radio frame for paging occasion using FIG. 95(a) in the case of FIG. 94(c) will be shown. In the case of FIG. 94(c), the number of subframes excluding subframes which can be MBSFN subframes is "8". When a subframe in a radio frame for paging occasion is determined by using FIG. 95(a), #3 (MBSFN) is obtained. A correspondence table taking into consideration a case in which two or more subframes occurs in one radio frame for paging occasion is shown in FIG. 95(b).

For example, in a case in which the number of subframes occurring in one radio frame for paging occasion shown in FIG. 95(b) is "2", each mobile terminal cannot determine which one of the two subframes, which is shown in the column corresponding to the case in which the number of subframes occurring in one radio frame for paging occasion shown in FIG. 95(b) is "2", the mobile terminal itself should receive (monitor) via discontinuous reception. This problem can be solved by using the following method. (The identifier of each mobile terminal mod the number of subframes for paging occasion in one radio frame) is determined. When the number of subframes for paging occasion in one radio frame is "2", the solution of the above-mentioned equation is 0 or 1. Therefore, as a concrete example, when the solution of the above-mentioned equation is "0", the subframe number on the upper side of the correspondence table is specified, whereas when the solution of the above-mentioned equation is "1", the subframe number on the lower side of the correspondence table is specified. As an alternative, the above-mentioned information can be included in the correspondence table. As another solution, each mobile terminal receives (monitors) all of the plurality of subframes for paging occasion existing in one radio frame. As a result, the above-mentioned problem is solved. Furthermore, there can occur a case in which even though a plurality of paging occasions occur in one radio frame, a required number of subframe numbers for paging occasion cannot be determined because of a relation with the MBSFN subframe allocation. More specifically, that case is the one in which the number of subframes for paging occasion occurring in one radio frame, which is shown in FIG. 95(b), is "2" and the number of subframes excluding subframes which can be MBSFN subframes is "1". This problem can be solved by using the following method. The number of paging groups and/or the discontinuous reception cycle length (T) in the mixed frequency layer and/or the MBSFN subframe allocation (the number of allocations) is determined in such a way that the number of paging occasions existing in one radio frame is equal to or smaller than the number of subframes excluding subframes which can be MBSFN subframes. In other words, the number (N) of paging groups, the discontinuous reception cycle length (T) in the mixed frequency layer, or the number of MBSFN subframe allocations can be determined in such a way that the following equation is satisfied: ("the number (N) of paging groups/the discontinuous reception cycle length (T) in the mixed frequency layer=<10(the number of subframes in one radio frame–the number of MBSFN subframe allocations)").

A concrete example of the above-mentioned case in which a plurality of subframes for paging occasion occur in one radio frame will be described hereafter. A case in which nonpatent reference 5 is used in the method of determining a radio frame of paging occasion will be considered. As previously mentioned, it is described in nonpatent reference 5 that in order to determine a paging occasion, two parameters including a paging interval length (corresponding to the discontinuous reception cycle length in the mixed frequency layer in the present invention) (T), and the number (N) of paging occasions during a paging interval are needed, and no other parameters are needed. The case in which a plurality of subframes for paging occasion occur in one radio frame can be shown by the following equation (1<N/T). A concrete example of the method of using FIG. 95 (b) in this case will be shown hereafter.

In the case of 1<N/T=<2, two subframes corresponding to paging occasions of different paging groups exist in one radio frame. Therefore, in the case of 1<N/T=<2, the column corresponding to the case in which the number of subframes for paging occasion occurring in one radio frame, shown in FIG. 95(b), is "2" is used.

The correspondence table as shown in FIG. 95 needs to be shared by the network side and the mobile terminal side. As an alternative, the correspondence table can be determined statically in the mobile communication system. As a result, because the network side does not have to inform the correspondence table to the mobile terminal side, there can be provided a further advantage of making effective use of the radio resources. On the other hand, if the correspondence table can be changed, the correspondence table can be mapped onto a broadcast control channel (BCCH) as a logical channel, and the broadcast control channel can be mapped onto a broadcast channel (BCH) which is a transport channel and the broadcast channel can be mapped onto a physical broadcast channel (PBCH) which is a physical channel. As another concrete example, the correspondence table can be alternatively mapped onto the broadcast control channel (BCCH) as a logical channel, and this broadcast control channel can be mapped onto a downlink shared channel (DL-SCH) which is a transport channel and the downlink shared channel can be mapped onto a physical downlink shared channel (PDSCH) which is a physical channel. By enabling the correspondence table to be changed, there can be provided a further advantage of being able to construct the mobile communication system with flexibility.

In Embodiment 23, the subframes excluding subframes which can be MBSFN subframes are re-numbered, and subframes in a radio frame for paging occasion are determined on the basis of the re-numbered subframe numbers. Therefore, the subframes in one radio frame for paging occasion and the MBSFN subframes are prevented from being identical subframes. Therefore, there can be provided an advantage of being able to solve the problem of the present invention.

In this variant 1, a different method for use in the process of step ST4505 of Embodiment 23 will be shown. Each mobile terminal makes the subframes excluding subframes which can be MBSFN subframes be the subframes in a radio frame for paging occasion on the basis of the information about MBSFN subframe allocation received in step ST4502. More concretely, each mobile terminal renumbers the subframes excluding subframes which can be MBSFN subframes. Because the details of the renumbering is the same as that shown in Embodiment 23, the explanation of the details of the renumbering will be omitted hereafter. In this variant 1, it will be considered that instead of the correspondence table, a relation between the number of subframes excluding subframes which can be MBSFN subframes and the subframes in a radio frame for paging occasion is maintained constant, unlike in Embodiment 23. In other words, an expression showing the relation between the number of subframes excluding subframes which can be MBSFN subframes and the subframes in a radio frame for paging occasion is defined. Concrete examples of the expression showing the relation will be shown hereafter.

An identifier of each mobile terminal (UE-ID, IMSI, S-TMSI, or the like) mod (the number of subframes excluding subframes which can be MBSFN subframes)=the subframes in a radio frame for paging occasion (where they have the re-numbered subframe numbers) (equation 1), and (an identifier of each mobile terminal (UE-ID, IMSI, S-TMSI, or the like) div the number of paging groups (N)) mod the number of subframes excluding subframes which can be MBSFN subframes=the subframes in one radio frame for paging occasion (where they have the re-numbered subframe numbers) (equation 2) can be considered.

In addition to the advantages provided by Embodiment 23, this variant 1 can provide the following advantages. There can be provided an advantage of eliminating the necessity to store a large amount of information of the correspondence table in the network side and the mobile terminal side. There can be provided a further advantage of, even when the correspondence between the number of subframes excluding subframes which can be MBSFN subframes and the subframes in a radio frame for paging occasion is changed, informing only the expression showing the relation from the network side to the mobile terminal side, thereby eliminating the necessity to inform a large amount of information of the correspondence table.

Although the above-mentioned expression showing the relation can be applied regardless of the method of determining a paging occasion (a radio frame for paging occasion), there occurs a case in which subframes to which paging occasions are actually allocated are arranged non-uniformly in one radio frame. It can be considered that a computation expression for determining a paging occasion is given by "paging occasion=(an identifier of each mobile terminal mod the number of paging groups (N))×Int (the discontinuous reception cycle length in the mixed frequency layer (T)/the number of paging groups (N))". In this case, when equation 1 is applied to the determination of the subframes in one radio frame for paging occasion, the subframes to which paging occasions are allocated may be arranged non-uniformly. For example, in a case in which N=3 and the number of subframes excluding subframes which can be MBSFN subframes=3, the subframes to which paging occasions are allocated are arranged non-uniformly. Because N=3, a paging occasion occurs in a radio frame of #0, though an identifier (IMSI or the like) of a mobile terminal allocated to this radio frame is an integral multiple of 3. Therefore, when equation 1 is applied, the subframe in this radio frame to which the paging occasion is allocated is the one of #0 for each of all mobile terminals. Thus, under certain circumstances, there can occur a case in which the subframes in one radio frame to which paging occasions are actually allocated are arranged non-uniformly. Hereafter, a method of preventing the subframes in one radio frame to which paging occasions are actually allocated from being arranged non-uniformly will be disclosed. For example, for the determination of both one radio frame for paging occasion, and subframes, a method of performing a mod arithmetic operation on an identifier of a mobile terminal with N and the number of subframes excluding subframes which can be MBSFN subframes and a method of not performing any mod arithmetic operation on an identifier of a mobile terminal are provided. As a concrete example, when (equation 1) is used as the method of determining subframes, the following method of determining a paging occasion, which is shown in Embodiment 2, is provided.

"Paging Occasion=(IMSI div K) mod (the discontinuous reception cycle length in a unicast/mixed frequency layer)+ n×(the discontinuous reception cycle in the unicast/mixed frequency layer), where n: 0, 1, 2, or . . . , and Paging Occasion≤the maximum of SFN.

SFN is an integer ranging from 0 to the maximum of SFN. K is the number of subframes excluding subframes which can be MBSFN subframes. When (equation 2) is used as the method of determining subframes, the following method of determining a paging occasion is provided.

Paging occasion=(an identifier of each mobile terminal mod the number of paging groups (*N*))×Int (the discontinuous reception cycle length (*T*) in the mixed frequency layer/the number of paging groups (*N*))

When (equation 2) is used as the method of determining subframes, the following method of determining a paging occasion is provided as an another method.

"Paging occurrence radio frame" (Paging Occasion)= (IMSI or K) mod X+n×(the discontinuous reception cycle length in an MBMS transmission frequency layer), where n: 0, 1, 2, or . . . , and Paging Occasion≤the maximum of SFN.

SFN is an integer ranging from 0 to the maximum of SFN. X is the number of radio frames in each of which paging has occurred within a discontinuous reception cycle in the MBMS transmission frequency layer, and satisfies the following inequality: X the discontinuous reception cycle length (a number of radio frames) in the MBMS transmission frequency layer. The value of X (a remainder value at X) is associated with a radio frame number (SFN). By configuring the method in this way, there is provided an advantage of arbitrarily setting up a radio frame in which paging occurs. When (equation 2) is used as the method of determining subframes, the following method of determining a paging occasion is provided as an another method.

"Paging occurrence radio frame" (Paging Occasion)= ((IMSI div K) mod (Int(T/TX)))×TX+n×(the discontinuous reception cycle length in the MBMS transmission frequency layer), where n: 0, 1, 2, or . . . , and Paging Occasion≤the maximum of SFN.

SFN is an integer ranging from 0 to the maximum of SFN. TX satisfies the following inequality: TX≤the discontinuous reception cycle length (a number of radio frames) in the MBMS transmission frequency layer.

Because it becomes unnecessary to associate the above-mentioned value of X (the remainder value at X) with the radio frame number (SFN) by making a radio frame in which paging occurs periodic, the equation for determining a paging occasion can be simplified.

The above-mentioned expression showing the relation can be determined statically. As a result, because the network side does not have to inform the correspondence table to the mobile terminal side, there can be provided a further advantage of making effective use of the radio resources. On the other hand, if the expression showing the relation can be changed, the expression showing the relation can be mapped onto a broadcast control channel (BCCH) as a logical channel, and the broadcast control channel can be mapped onto a broadcast channel (BCH) which is a transport channel and the broadcast channel can be mapped onto a physical broadcast channel (PBCH) which is a physical channel. As another concrete example, the expression showing the relation can be alternatively mapped onto the broadcast control channel (BCCH) as a logical channel, and this broadcast control channel can be mapped onto a downlink shared channel (DL-SCH) which is a transport channel and the downlink shared channel can be mapped onto a physical downlink shared channel (PDSCH) which is a physical channel. By enabling the correspondence table to be changed, there can be provided a further advantage of being able to construct the mobile communication system with flexibility. The concrete example of the above-mentioned expression showing the relation can provide the following advantage. Even if mobile terminals belong to the same paging group, the values of subframes in one radio frame for paging occasion change according to the identifiers of the mobile terminals. As a result, the number of mobile terminals using an identical subframe is reduced. Therefore, there can be provided an advantage of reducing the radio resources used for a PICH and a PCH in one subframe.

In this variant 2, a different method for use in the process of step ST4505 of Embodiment 23 will be shown. In this variant 2, the renumbering of subframes is not carried out. Each mobile terminal determines a subframe in a radio frame for paging occasion while bringing it into correspondence with the information about MBSFN subframe allocation received in step ST4502 (avoiding the allocation). A correspondence table is shown in FIG. 96 as a concrete example. FIG. 96(*a*) will be explained. When the MBSFN subframe allocation shows "#1", the determined subframe in one radio frame for paging occasion is "#4". A correspondence table taking into consideration a case in which two or more subframes occurs in one radio frame for paging occasion is shown in FIG. 96(*b*). For example, in a case in which the number of subframes occurring in one radio frame for paging occasion shown in FIG. 96(*b*) is "2", each mobile terminal cannot determine which one of the two subframes, which is shown in the column corresponding to the case in which the number of subframes occurring in one radio frame for paging occasion shown in FIG. 96(*b*) is "2", the mobile terminal itself should receive (monitor) via discontinuous reception. This problem can be solved by using the following method. (The identifier of each mobile terminal mode the number of subframes for paging occasion in one radio frame) is determined. When the number of subframes for paging occasion in one radio frame is "2", the solution of the above-mentioned equation is 0 or 1. Therefore, as a concrete example, when the solution of the above-mentioned equation is "0", the subframe number on the upper side of each cell of the correspondence table is specified, whereas when the solution of the above-mentioned equation is "1", the subframe number on the lower side of each cell of the correspondence table is specified. As an alternative, the above-mentioned information can be included in the correspondence table. As another solution, each mobile terminal receives (monitors) all of the plurality of subframes for paging occasion existing in one radio frame. As a result, the above-mentioned problem is solved. Furthermore, there can occur a case in which even though a plurality of paging occasions occur in one radio frame, a required number of subframe numbers for paging occasion cannot be determined because of a relation with the MBSFN subframe allocation. This problem can be solved by using the following method. The number of paging groups and/or the discontinuous reception cycle length (T) in the mixed frequency layer and/or the MBSFN subframe allocation (the number of allocations) is determined in such a way that the number of paging occasions existing in one radio frame is equal to or smaller than the number of subframes excluding subframes which can be MBSFN subframes. In other words, the number (N) of paging groups, the discontinuous reception cycle length (T) in the mixed frequency layer, or the number of MBSFN subframe allocations can be determined in such a way that the following equation is satisfied:

("The number (N) of paging groups/the discontinuous reception cycle length (T) in the mixed frequency layer=<10(the number of subframes in one radio frame−the number of MBSFN subframe allocations")).

A concrete example of the above-mentioned case in which a plurality of subframes for paging occasion occur in one radio frame will be described hereafter. A case in which nonpatent reference 5 is used in the method of determining a radio frame for paging occasion will be considered. As previously mentioned, it is described in nonpatent reference 5 that in order to determine a paging occasion, two parameters including a paging interval length (corresponding to the discontinuous reception cycle length in the mixed frequency layer in the present invention) (T), and the number (N) of paging occasions during a paging interval are needed, and no other parameters are needed. The case in which a plurality of subframes for paging occasion occur in one radio frame can be shown by the following equation (1<N/T). A concrete example of the method of using FIG. 96(b) in this case will be shown hereafter. In the case of 1<N/T=<2, two subframes corresponding to paging occasions of different paging groups exist in one radio frame. Therefore, in the case of 1<N/T=<2, the column corresponding to the case in which the number of subframes for paging occasion occurring in one radio frame, shown in FIG. 96(b), is "2" is used.

The correspondence table as shown in FIG. 96 needs to be shared by the network side and the mobile terminal side. As an alternative, the correspondence table can be determined statically in the mobile communication system. As a result, because the network side does not have to inform the correspondence table to the mobile terminal side, there can be provided a further advantage of making effective use of the radio resources. On the other hand, if the correspondence table can be changed, the correspondence table can be mapped onto a broadcast control channel (BCCH) as a logical channel, and the broadcast control channel can be mapped onto a broadcast channel (BCH) which is a transport channel and the broadcast channel can be mapped onto a physical broadcast channel (PBCH) which is a physical channel. As another concrete example, the correspondence table can be alternatively mapped onto the broadcast control channel (BCCH) as a logical channel, and this broadcast control channel can be mapped onto a downlink shared channel (DL-SCH) which is a transport channel and the downlink shared channel can be mapped onto a physical downlink shared channel (PDSCH) which is a physical channel. By enabling the correspondence table to be changed, there can be provided a further advantage of being able to construct the mobile communication system with flexibility.

In variant 2, a subframe in a radio frame for paging occasion is brought into correspondence with the information about MBSFN subframe allocation according to this MBSFN subframe allocation (in such a way that the allocation is avoided). Therefore, a subframe in a radio frame for paging occasion and an MBSFN subframe are prevented from being an identical subframe. Therefore, there can be provided an advantage of being able to solve the problem of the present invention. Compared with Embodiment 23 and variant 1, variant 2 can provide an advantage of being able to eliminate the process of renumbering subframes in both the mobile terminal side and the network side.

In this variant 3, a different method for use in the process of step ST4505 of Embodiment 23 will be shown. In this variant 3, it is considered that instead of the correspondence table, a relation between MBSFN subframe allocation and a subframe in a radio frame for paging occasion is maintained constant, unlike in variant 2. In other words, an expression showing the relation between MBSFN subframe allocation and a subframe in a radio frame for paging occasion is defined. A concrete example of the expression showing the relation will be shown hereafter. An explanation will be made with the subframe numbers of subframes which are not renumbered. However, the concept of this variant can be used even in a case in which the renumbering of subframes is carried out.

The number of a subframe in a radio frame for paging occasion=the MBSFN subframe allocation number+P (P: integer) When the number of a subframe in a radio frame for paging occasion which is determined according to the above-mentioned equation exceeds #9, the number of a subframe in a radio frame for paging occasion is given by (The MBSFN subframe allocation number+P−(9×n)) (P: integer, n: positive integer, and n is incremented by "1" every time when the subframe number exceeds 9).

It can also be expected that the subframe in a radio frame for paging occasion which is determined according to the above-mentioned equation coincides with an MBSFN subframe. This problem can be solved as will be shown below.

The number of the subframe in a radio frame for paging occasion=the MBSFN subframe allocation number+P+(m×Q)−(9×n) (P: integer, n: positive integer, and m=1, 2, 3, . . . , or 10)

The value of m is incremented until the subframe in a radio frame for paging occasion which is determined according to the above-mentioned equation has a value which does not coincide with that of an MBSFN subframe.

Q is an integer which is 1 or an integer which has no factor in common with 10. Concretely, Q=1, 3, 7, 9, or . . . can be considered. At this time, P can be set to be equal to Q.

The above-mentioned expression showing the relation can be determined statically. As a result, because the network side does not have to inform the correspondence table to the mobile terminal side, there can be provided a further advantage of making effective use of the radio resources. On the other hand, if the expression showing the relation can be changed, the expression showing the relation can be mapped onto a broadcast control channel (BCCH) as a logical channel, and the broadcast control channel can be mapped onto a broadcast channel (BCH) which is a transport channel and the broadcast channel can be mapped onto a physical broadcast channel (PBCH) which is a physical channel. As another concrete example, the expression showing the relation can be alternatively mapped onto the broadcast control channel (BCCH) as a logical channel, and this broadcast control channel can be mapped onto a downlink shared channel (DL-SCH) which is a transport channel and the downlink shared channel can be mapped onto a physical downlink shared channel (PDSCH) which is a physical channel. By enabling the correspondence table to be changed, there can be provided a further advantage of being able to construct the mobile communication system with flexibility.

In addition to the advantages provided by variant 2, this variant 3 can provide the following advantages. There can be provided an advantage of eliminating the necessity to store a large amount of information of the correspondence table in the network side and the mobile terminal side. There can be provided a further advantage of, even when the correspondence between MBSFN subframe allocation and a subframe in a radio frame for paging occasion is changed, informing only the expression showing the relation from the network side to the mobile terminal side, thereby eliminating the necessity to inform a large amount of information of the correspondence table.

In this variant 4, a different method for use in the process of step ST4505 of Embodiment 23 will be shown. A subframe excluding subframes which can be MBSFN subframes is defined as a subframe in a radio frame for paging occasion in the mobile communication system. More concretely, #0 and/ or #5 onto which no MBSFN subframe is allocated is defined as a subframe in a radio frame for paging occasion because an SCH is mapped. A subframe in a radio frame for paging occasion can be determined statically. As a result, because the network side does not have to inform the subframe in a radio frame for paging occasion, there can be provided a further advantage of making effective use of the radio resources. On the other hand, if the subframe in a radio frame for paging occasion can be changed, the subframe in a radio frame for paging occasion can be mapped onto a broadcast control channel (BCCH) as a logical channel, and the broadcast control channel can be mapped onto a broadcast channel (BCH) which is a transport channel and the broadcast channel can be mapped onto a physical broadcast channel (PBCH) which is a physical channel. As another concrete example, the subframe in a radio frame for paging occasion can be alternatively mapped onto the broadcast control channel (BCCH) as a logical channel, and this broadcast control channel can be mapped onto a downlink shared channel (DL-SCH) which is a transport channel and the downlink shared channel can be mapped onto a physical downlink shared channel (PDSCH) which is a physical channel. By enabling the correspondence table to be changed, there can be provided a further advantage of being able to construct the mobile communication system with flexibility. In this variant 4, a subframe which avoids the MBSFN subframe allocation is defined as a subframe in a radio frame for paging occasion. Therefore, the determined subframe in a radio frame for paging occasion and an MBSFN subframe are prevented from being an identical subframe. Therefore, there can be provided an advantage of being able to solve the problem of the present invention. Compared with Embodiment 23 and variant 1, variant 2 can provide an advantage of being able to eliminate the process of renumbering subframes in both the mobile terminal side and the network side. Compared with variant 2 and variant 3, variant 4 can provide an advantage of being able to eliminate the process of determining a subframe in a radio frame for paging occasion according to the MBSFN subframe allocation in both the mobile terminal side and the network side.

Figure 97:
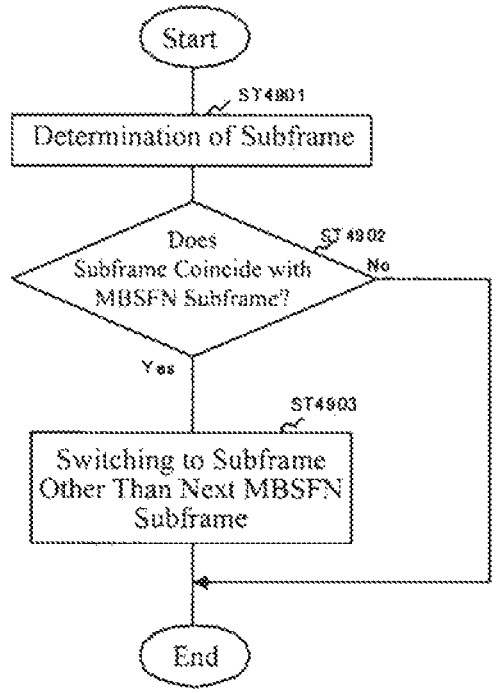
FIG. 97 is a sequence diagram in a case of determining subframes in a radio frame for paging occasion, which is used in variant 5 of Embodiment 23.

In this variant 5, a different method for use in the process of step ST4505 of Embodiment 23 will be shown. Each mobile terminal, in step ST4505, determines a subframe in a radio frame for paging occasion. In this variant 5, instead of step 4505, each mobile terminal carries out a process as shown in FIG. 97. Each mobile terminal, in step ST4901, determines a subframe in a radio frame for paging occasion. In variant 5, a method of determining a subframe in a radio frame for paging occasion in step ST4901 is not specified particularly. A method which does not take the MBSFN subframe allocation into consideration can be used. As a concrete example of the method of determining a subframe in a radio frame for paging occasion, the method described in Embodiment 2, or the method, as described in nonpatent reference 5, of using a fixed value regardless of the MBSFN subframe allocation can be used. Each mobile terminal, in step ST4902, uses the MBSFN subframe allocation received in step ST4502 and the subframe in a radio frame for paging occasion determined in step ST4901 to determine whether or not both the MBSFN subframe and the subframe in a radio frame for paging occasion are an identical subframe. When they are an identical subframe, each mobile terminal makes a transition to step ST4903. In contrast, when they are not an identical subframe, each mobile terminal ends the process without making a transition to step ST4903. More specifically, each mobile terminal uses the subframe in a radio frame for paging occasion determined in step ST4901 just as it is. Each mobile terminal, in step ST4903, changes the subframe in a radio frame for paging occasion determined in step ST4902 to a subframe other than the next subframe which can be an MBSFN subframe. For example, a case in which the subframe in a radio frame for paging occasion determined in step ST4901 is #2, and the MBSFN subframe allocation received in step ST4502 shows #2 will be considered. In this case, it is determined in step ST4902 that both of them are an identical subframe. Therefore, it is determined in step ST4903 that the subframe in a radio frame for paging occasion is the one other than the subframe which can be the next MBSFN subframe, i.e., #3. At this time, the subframe in a radio frame for paging occasion can be changed in step ST4903 to a subframe other than the previous MBSFN subframe, i.e., #1. The determination of step ST4902 can be carried out for each radio frame for paging occasion determined in step ST4503. Furthermore, the determination of step ST4902 can be carried out once when the serving cell in question starts discontinuous reception and/or once when the MBSFN subframe allocation is changed, i.e., a number of times corresponding to the repetition period of MBSFN frame clusters. In this case, if the subframe in a radio frame for either one of paging occasions coincides with the MBSFN subframe allocation, the process of step ST4903 is performed on the subframe in a radio frame for each paging occasion. As an alternative, the process of step ST4903 can be performed on only the subframe in a radio frame for the paging occasion in question (which coincides with the MBSFN subframe allocation). In this case, the process of step ST4903 is performed on the subframe in a radio frame for the paging occasion in question (which coincides with the MBSFN subframe allocation) at the repetition periods of MBSFN frame clusters. The serving cell, in step 4506, carries out the same processes of step ST4901 to ST4903 as those performed by each mobile terminal.

In addition, there can be a case in which the subframe in a radio frame for paging occasion which is determined through the process of step ST4903 is not placed in the same radio frame as that in which the original subframe in a radio frame for paging occasion (the subframe in a radio frame for paging occasion which is determined in step ST4901) is to be placed. A process which is carried out in this case will be described hereafter. The subframe in a radio frame for paging occasion which is determined through the process of step ST4903 can be placed in a radio frame different from that in which the original subframe in a radio frame for paging occasion is to be placed. As an alternative, the subframe in a radio frame for paging occasion which is determined in step ST4901 can have a value which makes the subframe in a radio frame for paging occasion which is determined through the process of step ST4903 be placed in the same radio frame as that in which the original subframe in a radio frame for paging occasion is to be placed. As a concrete example, a case in which the subframe in a radio frame for paging occasion which is determined in step ST4901 is the last one (#9) of the subframes of the radio frame is excluded, or a case in which the subframe in a radio frame for paging occasion which is determined in step ST4901 has a value ranging from a certain specified value to a value corresponding to the last subframe is excluded. As a concrete example of the subframe number having the certain specified value, "the subframe number which is the certain specified value=the last subframe number−the number of continuous allocations of MBSFN subframes" is provided.

In this variant 5, after a subframe in a radio frame for paging occasion is determined without taking MBSFN subframes into consideration, if the subframe in a radio frame for paging occasion coincides with an MBSFN subframe, the subframe in a radio frame for paging occasion is changed to a subframe other than the subframe which can be the next MBSFN subframe. Therefore, the determined subframe in a radio frame for paging occasion can be prevented from being the same subframe as an MBSFN subframe. Therefore, there can be provided an advantage of being able to solve the problem of the present invention.

In this variant 6, a different method for use in the process of step ST4503 of Embodiment 23 will be shown. A case of using the method described in nonpatent reference 5 in step ST4503 will be considered. In this case, a paging occasion is determined by assuming that a paging interval length is equal to the number of paging occasions during the paging interval. As a result, there can be provided an advantage of reducing parameters for determining a paging occasion by one. This results in reduction in the system information about the self-cell in step ST4001. As a result, there can be provided an advantage of making effective use of the radio resources.

Embodiment 23 and variants 1 to 6 can be applied to the "Unicast side discontinuous reception" shown in Embodiment 1 and Embodiment 2.

Embodiment 24

OFDM symbols other than the one or two leading OFDM symbols of each MBSFN subframe are a resource dedicated to MBMS transmission. In a case in which a subframe in a radio frame for paging occasion coincides with MBSFN subframe allocation, any OFDM symbols other than the one or two leading OFDM symbols of each MBSFN subframe are a resource dedicated to MBMS transmission and cannot be used for paging processing. Therefore, in order to solve a problem that inconvenience occurs in a conventional paging processing method, in this Embodiment 24, a processing method of dealing with a case in which a subframe in a radio frame for paging occasion coincides with an MBSFN subframe will be disclosed. In this Embodiment 24, in the case in which a subframe in a radio frame for paging occasion coincides with MBSFN subframe allocation, a radio resource other than the one or two leading OFDM symbols which is used exclusively for MBSFN transmission is not used for unicast transmission, more concretely, for paging processing. Furthermore, in the case in which a subframe in a radio frame for paging occasion coincides with MBSFN subframe allocation, information regarding the paging processing which is transmitted with the radio resource other than the one or two leading OFDM symbols which is used exclusively for MBSFN transmission is transmitted via a subframe other than the subframe which can be the next MBSFN subframe. A concrete example of the processing method will be shown hereafter. A method of processing a paging signal is similar to the process shown in FIG. 97 into which the process of step ST4505 of FIG. 93 is changed. An explanation will be made focusing on a different portion. Each mobile terminal, in step ST4902, uses MBSFN subframe allocation received in step ST4502 and a subframe in a radio frame for paging occasion determined in step ST4901 to determine whether or not they are an identical subframe. When they are an identical subframe, each mobile terminal makes a transition to step ST4903. In Embodiment 24, instead of the process of step ST4903, each mobile terminal carries out the following process. By using the one or two leading OFDM symbols of the subframe in a radio frame for paging occasion determined in step ST4901, each mobile terminal transmits information which the mobile terminal has been scheduled to transmit via the one to three leading OFDM symbols (an L1/L2 signaling channel) when the subframe in a radio frame for paging occasion does not coincide with MBSFN subframe allocation. Each mobile terminal also transmits information, which the mobile terminal has been scheduled to transmit via OFDM symbols (a PDSCH) other than the one to three leading OFDM symbols when the subframe in a radio frame for paging occasion does not coincide with the MBSFN subframe allocation, via OFDM symbols (a PDSCH) other than the one to three leading OFDM symbols of a subframe other than the next subframes which can be MBSFN subframes. In this case in which the information is transmitted via OFDM symbols (a PDSCH) other than the one to three leading OFDM symbols of a subframe other than the subframe which can be the next MBSFN subframe, if allocation of a radio resource in this PDSCH is the same as that when the subframe in a radio frame for paging occasion does not coincide with the MBSFN subframe allocation, there can be provided an advantage of eliminating the necessity to carry out the allocation again and so on, thereby making effective use of the radio resources. When, in step ST4902, determining that the MBSFN subframe and the subframe in a radio frame for paging occasion are not an identical subframe, each mobile terminal ends the processing without making a transition to step ST4903, that is, uses the subframe in a radio frame for paging occasion determined in step ST4901 just as it is.

A concrete example of the information which each mobile terminal transmits by using the one or two leading OFDM symbols of the subframe in a radio frame for paging occasion determined in step ST4901, and which the mobile terminal has been scheduled to transmit via the one to three leading OFDM symbols (an L1/L2 signaling channel) when the subframe in a radio frame for paging occasion does not coincide with the MBSFN subframe allocation will be shown hereafter. Nonpatent reference 1 discloses that a PCH is mapped onto a PDSCH or a PDCCH. Nonpatent reference 1 also discloses that a paging group uses an L1/L2 signaling channel (PDCCH) and that a precise identifier (UE-ID) of a mobile terminal can be found on a PCH. Therefore, a PCH is transmitted by using an L1/L2 signaling channel. On the other hand, nonpatent reference 4 describes that a PICH (Paging Indicator channel) for informing occurrence of a paging signal destined for a mobile terminal belonging to a paging group is transmitted by using an L1/L2 signaling channel.

A concrete example of the information which each mobile terminal has been scheduled to transmit via OFDM symbols (a PDSCH) other than the one to three leading OFDM symbols when the subframe in a radio frame for paging occasion does not coincide with the MBSFN subframe allocation will be shown hereafter. Nonpatent reference 1 shows that when allocation of a downlink radio resource for the next control information is carried out via a PCH, this control information is mapped onto a PDSCH. On the other hand, nonpatent reference 4 describes that a PCH is mapped onto a PDSCH which is in the same subframe as that onto which a PICH is mapped.

In this Embodiment 24, in the case in which a subframe in a radio frame for paging occasion coincides with MBSFN subframe allocation, a radio resource other than the one or two leading OFDM symbols which is used exclusively for MBSFN transmission is not used for unicast transmission, i.e., for the paging processing. Accordingly, even when a subframe in a radio frame for paging occasion coincides with MBSFN subframe allocation, there does not occur a case in which the network side becomes unable to transmit the information necessary for the paging processing to each mobile terminal. Therefore, there can be provided an advantage of being able to solve the problem of the present invention.

Variant 1 will be explained. In variant 1, when determining that the MBSFN subframe allocation received in step ST4502 and the subframe in a radio frame for paging occasion determined in step ST4901 are an identical subframe, each mobile terminal carries out the following processes instead of the processes of Embodiment 24. Each mobile terminal transmits both the information which the mobile terminal has been scheduled to transmit via the one to three leading OFDM symbols (an L1/L2 signaling channel) when the subframe in a radio frame for paging occasion does not coincide with the MBSFN subframe allocation, and the information which the mobile terminal has been scheduled to transmit via OFDM symbols (a PDSCH) other than the one to three leading OFDM symbols when the subframe in a radio frame for paging occasion does not coincide with the MBSFN subframe allocation by using the one or two leading OFDM symbols of the subframe in a radio frame for paging occasion determined in step ST4901.

In this variant 1, in the case in which a subframe in a radio frame for paging occasion coincides with MBSFN subframe allocation, a radio resource other than the one or two leading OFDM symbols which is used exclusively for MBSFN transmission is not used for unicast transmission, i.e., for the paging processing. Accordingly, even when a subframe in a radio frame for paging occasion coincides with MBSFN subframe allocation, there does not occur a case in which the network side becomes unable to transmit the information necessary for the paging processing to each mobile terminal. Therefore, there can be provided an advantage of being able to solve the problem of the present invention.

Embodiment 25

In Embodiment 7, the configuration of carrying an indicator showing whether or not a paging signal has been transmitted and the paging signal onto a PMCH of an MBSFN subframe is shown. On the other hand, in Embodiment 8, the configuration of disposing a channel dedicated to a paging signal in an MBSFN subframe, and mapping all paging signals, such as a paging message, paging message allocation information provided as information for informing the presence or absence of an incoming call, and 1-bit information showing the presence or absence of paging, onto a channel (DPCH) dedicated to a paging signal is disclosed. In this embodiment, a method of mapping a paging signal onto both a PMCH and a paging signal dedicated channel in order to transmit the paging signal from an MBMS dedicated cell will be disclosed. Concretely, a PMCH and a paging signal dedicated channel are disposed in an identical MBSFN subframe, and a part of a paging signal which is to be transmitted via one subframe is mapped onto the PMCH, and the remaining paging signal is mapped onto the paging signal dedicated channel, so that the paging signal is transmitted.

Figure 100:
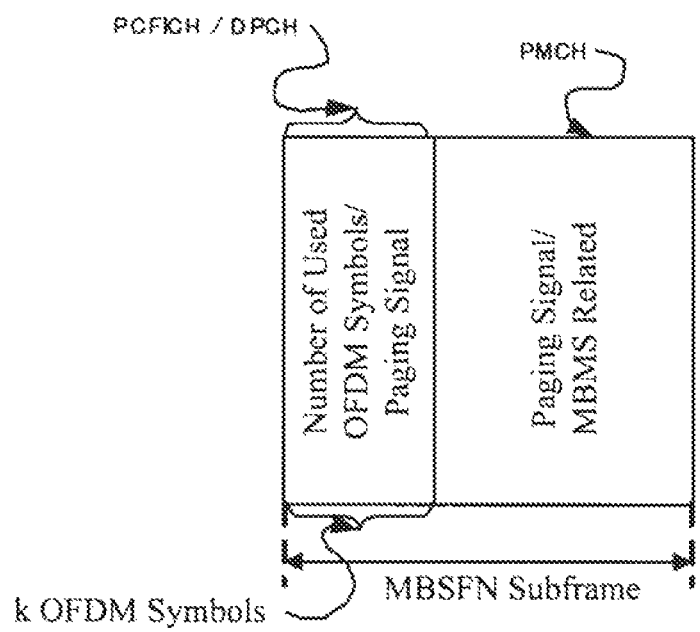
FIG. 100 is a view explaining a structure in which a paging signal dedicated channel and a PMCH are disposed in an identical MBSFN subframe.

An example of the configuration of disposing the paging signal dedicated channel and the PMCH in an identical MBSFN subframe is shown in FIG. 100. The paging signal dedicated channel and the PMCH are disposed in an identical MBSFN subframe. Information showing the presence or absence of an incoming call in the above-mentioned MBSFN subframe is mapped onto the paging signal dedicated channel (DPCH), and the remaining paging signal, e.g., paging message information is mapped onto the PMCH. As the information showing the presence or absence of an incoming call in the above-mentioned MBSFN subframe, for example, information about allocation of a paging message is provided. As the information about allocation of a paging message, information about allocation of the paging signal mapped onto the PMCH can be provided. As shown in the figure, a PCFICH onto which information showing the number (k) of OFDM symbols used for the DPCH is mapped can be provided. In this case, the method disclosed in Embodiment 8 can be applied. The PCFICH does not have to be provided. In this case, one of the methods, as disclosed in Embodiment 8, of determining a physical area in an MBSFN subframe of a DPCH can be applied. For example, the method of making a physical area onto which a paging signal is mapped specific to each MBSFN area, and deriving the physical area from an MBSFN-area-specific number (an MBSFN area ID) or the like can be applied. By making a physical area onto which a paging signal is mapped be an identical physical area for each MBSFN area, there can be provided an advantage of being able to transmit the paging signal via a multi-cell transmission scheme. Accordingly, there can be provided an advantage of making it possible for each mobile terminal to carry out SFN combining of a paging signal, thereby reducing receive errors occurring in the paging signal in each mobile terminal. This results in advantages, such as prevention of a control delay time in the whole mobile communication system, and effective use of the radio resources.

Figure 101:
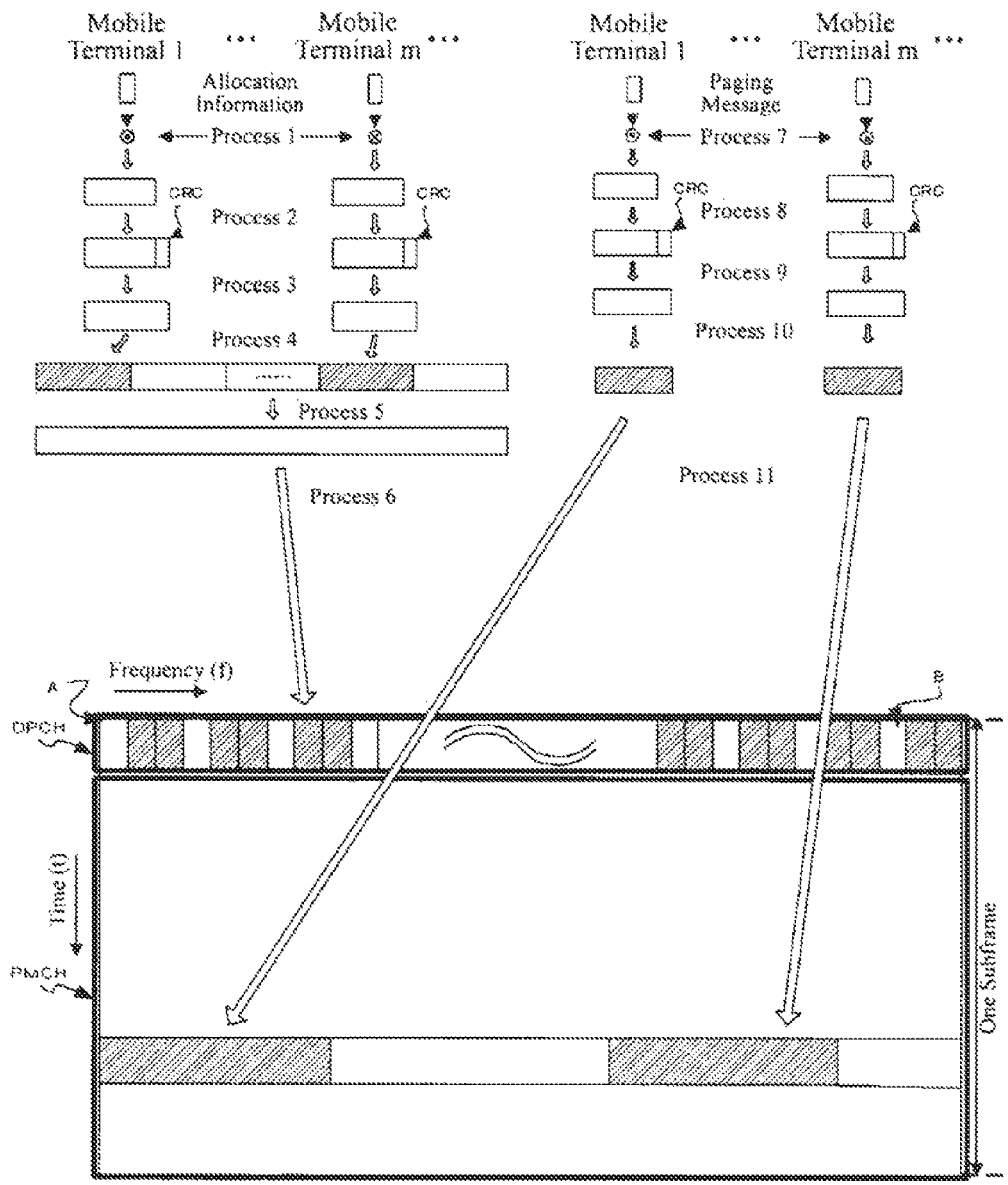
FIG. 101 is a view explaining a method of mapping paging information onto a physical area of each physical channel.

An example of a method of mapping paging information onto the physical area of each physical channel is shown in FIG. 101. As a method of mapping the information about allocation of a paging message onto the paging signal dedicated channel, the method disclosed in Embodiment 8 can be applied. A base station maps the paging message allocation information for a mobile terminal for which an incoming call is occurring onto the paging dedicated physical channel. The base station multiplies the paging message allocation information for each mobile terminal m for which an incoming call is occurring by an identification number specific to this mobile terminal (process 1). Next, the base station performs CRC (Cyclic Redundancy Check) addition on the result of this multiplication (process 2), and carries out a process including encoding (Encode), rate matching, and interleaving (process 3). The base station then allocates the result of the series of processes which it has carried out to control information elements each having a size corresponding to the size of the physical area onto which the paging message allocation information is to be mapped, and connects a plurality of control information elements whose number is equal to that of the mobile terminals for each of which an incoming call is occurring to one another (process 4). The base station performs a scrambling process using an MBSFN-area-specific scrambling code (Scrambling Code), a modulation process, etc. on the connected result (process 5). The modulation process can be specific to the MBSFN area. The result of carrying out these processes is mapped onto k leading OFDM symbols (process 6). At that time, the base station derives the number k of required OFDM symbols on the basis of the result of the connection of the plurality of control information elements whose number is equal to that of the mobile terminals for each of which an incoming call is occurring, and performs a process including encoding on the indicator corresponding to the number k and then maps the indicator onto the PCFICH. These processes are carried out by using the same method in all the cells in the MBSFN area, and multi-cell transmission of the paging message allocation information is carried out in the MBSFN area. In the figure, a case in which the number (k) of OFDM symbols via which the DPCH is transmitted is set to 1 is shown. The DPCH is mapped onto the first OFDM symbol of each subframe together with the PCFICH and a reference symbol.

A mobile terminal which has received a signal which is transmitted thereto via the multi-cell transmission scheme determines the number of OFDM symbols used for the paging on the basis of the result of decoding the received PCFICH, and then carries out a demodulation process, a descrambling (Descrambling) process, and so on. After performing those processes, the mobile terminal divides the result of the processes into parts each corresponding to a certain area, and successively performs deinterleaving, decoding (Decoding), error detection, a correction process, etc. on each of the parts to carry out blind detection with the terminal-specific identification number. After the mobile terminal detects the identification number specific to the mobile terminal itself through the blind detection, the mobile terminal can determine that paging is occurring, and can also receive the allocation information about the paging message destined for the mobile terminal itself. The PCFICH, the reference symbol, and so on are mapped onto a physical resource by using, for example, a predetermined method. As an alternative, the same method as that used by a unicast cell can be used. By using the same method as that used by a unicast cell, it becomes able to simplify the configuration of the base station and the configuration of the receiving circuit of each mobile terminal.

The base station also maps the paging message to a mobile terminal for which an incoming call is occurring onto the paging PMCH. The base station multiplies the paging message to each mobile terminal m for which an incoming call is occurring by an identification code specific to the mobile terminal itself (a number or a sequence) (process 7), carries out CRC (Cyclic Redundancy Check) addition (process 8), and also carries out processes including encoding (Encode) and rate matching (process 9). The base station then performs a spreading process using an MBSFN-area-specific scrambling code (Scrambling code), a modulation process, etc. on the results of the series of processes carried out (process 10). The modulation process can be specific to the MBSFN area. The base station allocates the results of these processes carried out to the physical area in the PMCH shown by the paging message allocation information mapped onto the paging dedicated channel (process 11).

As a method of enabling an MBMS dedicated cell to transmit a paging signal, the method disclosed in Embodiment 2 can be applied. A paging signal is transmitted together with an MCCH of a PMCH in Embodiment 2, whereas in this embodiment, a paging signal is transmitted via the PMCH provided in an MBSFN subframe with which the information about allocation of a paging message is transmitted via the DPCH. As the method of mapping a paging signal onto the PMCH, Embodiment 7 can be applied. In the case of this embodiment, because each mobile terminal does not have to receive a paging signal when receiving an MCCH, unlike in the case of Embodiment 2, there is no necessity to impose a limitation of making the MBSFN subframes onto which an MCCH and a PCCH are mapped respectively adjacent in time to each other. In accordance with this embodiment, each mobile terminal receives an MBSFN subframe onto which the paging signal is mapped separately from an MCCH. To this end, for example, when performing an operation of making preparations for discontinuous reception at the time of MBMS reception in ST1735, each mobile terminal determines, instead of a paging group, an MBSFN frame and an MBSFN subframe onto which the paging message allocation information is mapped. These MBSFN frame and MBSFN subframe can be determined on the basis of a mobile-terminal-specific identification number (UE-ID or the like), a discontinuous reception cycle length, and DRX information according to a computation expression. What is necessary is just to enable the network side, the base station and each mobile terminal to determine them by using the same parameters and the same computation expression. This computation expression can be predetermined. As a method of deriving the above-mentioned MBSFN frame and MBSFN subframe in which the paging signal occurs, the method in accordance with Embodiment 15 can also be applied. When paging occurs, an MCE which, in ST1777, receives a paging request from an MME, ST1778, determines an MBSFN frame and an MBSFN subframe onto which paging message allocation information is mapped, like in ST1735. The MCE, in ST1779, determines an area to which a paging message on a PMCH is allocated, as well as the scheduling of the paging signal. With the paging request signal of ST1780, the MCE transmits information about the scheduling of this paging signal and the paging message allocation information on the PMCH to an MBMS dedicated cell. In the MBSFN frame and the MBSFN subframe which are derived in the above-mentioned step, just like in ST1735, the MBMS dedicated cell, in ST1782, maps the paging message allocation information onto the DPCH and also maps the paging message onto the PMCH of the same subframe on the basis the information transmitted with the paging request which it has received, and then transmits them to mobile terminals being served thereby. On the other hand, each mobile terminal determines whether or not they are the MBSFN frame and the MBSFN subframe which the mobile terminal, in ST1735, has derived separately from the MCCH. This operation is added after ST1772. When it is not the MBSFN subframe onto which the paging signal is mapped, each mobile terminal makes a transition to ST1788. In contrast, when it is the MBSFN subframe onto which the paging signal is mapped, each mobile terminal, in ST1784, receives not the PMCH but the DPCH, and carries out blind detection of the information mapped onto the DPCH with the identification number specific to the mobile terminal itself, as mentioned above. When, in ST1785, detecting that the information is the paging message allocation information destined for the mobile terminal itself through the blind detection, each mobile terminal, in ST1786, receives the paging information on the PMCH according to this paging message allocation information. Each mobile terminal, in ST1787, becomes able to receive the paging message destined for the mobile terminal itself certainly by detecting the paging information on the PMCH with the identification number specific to the mobile terminal itself. When, in ST1785, detecting that the information is not the paging message allocation information destined for the mobile terminal itself through the blind detection, each mobile terminal makes a transition to ST1788.

In the above-mentioned example, the process of multiplying the paging signal destined for each of the mobile terminals by the identification code specific to the mobile terminal itself in the processes 1 and 7 disclosed with reference to FIG. 101 is carried out. The base station can alternatively use another processing method of adding the paging signal destined for each of the mobile terminals and an identification number specific to this mobile terminal, as shown in Embodiment 2, Embodiment 7, Embodiment 8, and so on. In this case, each of the mobile terminals receives either a physical area (in this case, an area excluding the DPFICH and RS in the 1st OFDM symbol) used for the paging signal on the DPCH (in this case, the paging message allocation information) or a physical area (in this case, an area shown by the paging message allocation information) used for the paging signal on the PMCH (in this case, the paging message), carries out demodulation and descrambling using an MBSFN-area-specific scrambling code, and divides the result of the demodulation and descrambling into parts each corresponding to an information element unit, and performs a process including decoding on each of the divided parts each corresponding to an information element unit. Each of the mobile terminals then determines whether the mobile-terminal-specific identification number exists in the information on which the mobile terminal itself has performed the process including decoding to detect the paging signal destined therefor. Each of the mobile terminals does not have to perform the same process on each physical channel, and can alternatively set up either a process of carrying out a multiplication by an identification code specific to the mobile terminal itself, and a process of carrying out an addition of an identification number specific to the mobile terminal itself for each physical channel.

Furthermore, as shown in Embodiment 2 and Embodiment 7, in order to distinguish the physical channel onto which a paging signal is mapped from any other information, this information can be multiplied by an identifier (ID) specific to the type of the information. Because an identifier specific to each information type is used for MBSFN subframes which are transmitted via a multi-cell transmission scheme, unlike in the case of unicast communications, an identical identifier specific to a specific type of information needs to be transmitted from a plurality of cells which carry out multi-cell transmission. For example, an identifier specific to each identical information type is used in each MBSFN area. As an example, an MBMS dedicated cell multiplies a paging signal by an identifier for the paging signal and transmits the paging signal. A mobile terminal which needs to receive the paging signal, among mobile terminals being served by the MBMS dedicated cell, carries out blind detection of the paging signal by using the identifier for the paging signal. As a result, there can be provided an advantage of enabling such a mobile terminal to receive required information when the mobile terminal requires the information. Accordingly, there can be provided an advantage of reducing the power consumption of the mobile terminal. There can be provided a further advantage of preventing a control delay time from occurring in the mobile terminal. The identifier different for each information type can be predetermined, or can be broadcast via broadcast information from a serving cell. As an alternative, the identifier different for each information type can be broadcast from the MBMS dedicated cell. Furthermore, because by multiplying or adding the paging signal by or to the mobile-terminal-specific identifier, each of the mobile terminals becomes able to carry out blind detection, it becomes unnecessary to fix the physical area onto which the paging signal destined for each of the mobile terminals is mapped in advance. Therefore, the mapping can be carried out with flexibility, and there is provided an advantage of improving the use efficiency of the physical resources.

By configuring the method in this way, it becomes able to transmit a paging signal to each mobile terminal from an MBMS dedicated cell by using the method disclosed in this embodiment. In addition, by using the method disclosed in this embodiment, the necessity to map all paging signals onto one physical channel can be eliminated. Therefore, there is provided an advantage of being able to carry out the scheduling of transmission of the DPCH and the PMCH with flexibility, and to improve the use efficiency of the radio resources. Furthermore, the paging message mapped onto the PMCH can be mapped to a physical area in the PMCH with flexibility by mapping the information about allocation of the paging message onto the DPCH. As a result, the use efficiency of the radio resources can be improved.

In this embodiment, Embodiment 8 and Embodiment 15, the dedicated channel onto which a paging signal is mapped is the DPCH, as mentioned above. In a case in which a physical channel via which multi-cell transmission can be carried out, as well as a PMCH, exist in an MBSFN subframe, a paging signal can be alternatively mapped onto this physical channel. Because a paging signal has only to be transmitted via an MBSFN subframe and therefore it is not necessary to provide a new DPCH, there is provided an advantage of simplifying the control operation, reducing the circuit scale, and reducing the power consumption. As an alternative, a physical channel for control information transmission which can be transmitted via a multi-cell transmission scheme can be provided in an MBSFN subframe. Also in this case, because it is not necessary to provide a physical channel dedicated to paging, and therefore a paging signal can be transmitted together with other control information by using the above-mentioned physical channel, there is provided an advantage of simplifying the control operation, reducing the circuit scale, and reducing the power consumption. For example, the other control information can be system information.

When a paging signal is transmitted together with the other control information by using the above-mentioned physical channel, it is necessary to distinguish the paging signal from the other information. Therefore, the information mapped onto this physical channel can be multiplied by an identifier (ID) specific to each information type. As an alternative, only a specific type of information can be multiplied by an identifier specific to the specific type of information. Because an identifier specific to each information type is used for MBSFN subframes which are transmitted via the multi-cell transmission scheme, unlike in the case of unicast communications, an identical identifier specific to a specific type of information needs to be transmitted from a plurality of cells which carry out multi-cell transmission. For example, an identifier specific to each identical information type is used in each MBSFN area. Thus, multi-cell transmission can be supported. As a concrete example of carrying out a multiplication by an identifier specific to each information type, a case in which a paging signal (e.g., paging message allocation information) and system information are transmitted via the above-mentioned physical channel will be considered. The paging message allocation information is multiplied by an identifier for the paging signal and the system information is multiplied by an identifier for the system information, and they are transmitted by using the above-mentioned physical channel. A mobile terminal which needs to receive the paging signal, among the mobile terminals being served by the MBMS dedicated cell in question, carries out blind detection of the paging message allocation information by using the identifier for the paging signal. When the paging message allocation information exists, the mobile terminal receives the paging signal (paging message) in the physical area in the PMCH constructed of, for example, the same frame, the physical area being shown by the paging message allocation information. The mobile terminal which has received the paging signal (paging message) of the physical area shown by the paging message allocation information carries out processes including demodulation and decoding, and determines whether this paging message is destined for the mobile terminal itself by determining whether the identification number specific to the mobile terminal itself exists in the decoded information. By carrying out the determination in this way, the mobile terminal which needs to receive the paging signal can detect and receive only the paging signal. As a result, there can be provided an advantage of enabling such a mobile terminal to receive required information when the mobile terminal requires the information. Accordingly, there can be provided an advantage of reducing the power consumption of the mobile terminal. There can be provided a further advantage of preventing a control delay time from occurring in the mobile terminal. The identifier specific to each information type can be predetermined, or can be broadcast via broadcast information from a serving cell. As an alternative, the identifier specific to each information type can be broadcast from the MBMS dedicated cell. Furthermore, because by multiplying or adding the paging signal by or to the mobile-terminal-specific identifier, each of the mobile terminals becomes able to carry out blind detection, it becomes unnecessary to fix the physical area onto which the paging signal destined for each of the mobile terminals is mapped in advance. Therefore, the mapping can be carried out with flexibility, and there is provided an advantage of improving the use efficiency of the physical resources.

Embodiment 26

In this embodiment, another concrete example of the "MBMS search" operation described in Embodiment 1, Embodiment 2, and so on will be disclosed. An MBSFN area number (ID) informed from a cell in a unicast cell or an MBMS/unicast-mixed cell described in Embodiment 18 and Embodiment 19 to mobile terminals being served by the cell is used for the "MBMS search". The MBSFN area number (ID) informed from a cell in a unicast cell or an MBMS/unicast-mixed cell to mobile terminals being served by the cell is used for establishment of synchronization in a frequency layer dedicated to MBMS. The MBSFN area number (ID) informed from a cell in a unicast cell or an MBMS/unicast-mixed cell to mobile terminals being served by the cell is used for establishment of frame synchronization in the frequency layer dedicated to MBMS.

An MBSFN area number (ID) informed from a serving cell which is a unicast cell or an MBMS/unicast-mixed cell described in Embodiment 18 and Embodiment 19 to mobile terminals being served by the serving cell is used for the "MBMS search". The MBSFN area number (ID) informed from a serving cell which is a unicast cell or an MBMS/unicast-mixed cell to mobile terminals being served by the serving cell is used for establishment of synchronization in a frequency layer dedicated to MBMS. The MBSFN area number (ID) informed from a serving cell which is a unicast cell or an MBMS/unicast-mixed cell to mobile terminals being served by the serving cell is used for establishment of frame synchronization in the frequency layer dedicated to MBMS. A concrete example of a method of informing an MBSFN area ID from a unicast cell, an MBMS/unicast-mixed cell, or a serving cell which is a unicast cell or an MBMS/unicast-mixed cell will be disclosed hereafter. A unicast cell or an MBMS/unicast-mixed cell maps an MBSFN area ID onto a broadcast control channel (BCCH) which is a logical channel, and maps the broadcast control channel onto a broadcast channel (BCH) which is a transport channel and further maps the broadcast channel onto a physical broadcast channel (PBCH) which is a physical channel to inform the MBSFN area ID to mobile terminals being served thereby. As an alternative, the unicast cell or the MBMS/unicast-mixed cell maps the MBSFN area ID onto master information and further maps the master information onto the broadcast control channel (BCCH) which is a logical channel, and maps the broadcast control channel onto the broadcast channel (BCH) which is a transport channel and further maps the broadcast channel onto the physical broadcast channel (PBCH) which is a physical channel to inform the MBSFN area ID to the mobile terminals being served thereby.

As another informing method, the unicast cell or the MBMS/unicast-mixed cell maps the MBSFN area ID onto the broadcast control channel (BCCH) which is a logical channel, and maps the broadcast control channel onto a downlink shared channel (DL-SCH) which is a transport channel and further maps the downlink shared channel onto a physical downlink shared channel (PDSCH) which is a physical channel to inform the MBSFN area ID to the mobile terminals being served thereby. As an alternative, the unicast cell or the MBMS/unicast-mixed cell maps the MBSFN area ID onto system information and further maps the system information onto the broadcast control channel (BCCH) which is a logical channel, and maps the broadcast control channel onto the downlink shared channel (DL-SCH) which is a transport channel and further maps the downlink shared channel onto the physical downlink shared channel (PDSCH) which is a physical channel to inform the MBSFN area ID to the mobile terminals being served thereby. As another informing method, the unicast cell or the MBMS/unicast-mixed cell maps the MBSFN area ID onto either a common control channel (CCCH) which is a logical channel or a dedicated control channel (DCCH), and maps the common control channel or dedicated control channel onto the downlink shared channel (DL-SCH) which is a transport channel and further maps the downlink shared channel onto the physical downlink shared channel (PDSCH) which is a physical channel to inform the MBSFN area ID to the mobile terminals being served thereby.

A concrete example of how to inform an MBSFN area ID will be disclosed. A frequency of an available MBMS service, i.e., a frequency of a receivable MBSFN synchronization area (referred to as f(MBMS)), and an MBSFN area ID are informed. The MBSFN area ID and f(MBMS) can be informed simultaneously or unsimultaneously. As an alternative, instead of broadcasting all MBSFN area IDs included in f(MBMS), only an MBSFN area ID which each mobile terminal being served by the unicast cell in question or the MBMS/unicast-mixed cell in question can receive actually can be broadcast. In other words, only the ID of an MBSFN area which overlaps the unicast cell in question or the MBMS/unicast-mixed cell in question geographically can be broadcast. As a result, only the MBSFN area ID which each mobile terminal can receive can be used for the MBMS search, and therefore there can be provided an advantage of preventing a control delay time from occurring. As an alternative, f(MBMS) and MBSFN area IDs included in the MBSFN synchronization area can be informed. The MBSFN area IDs and f(MBMS) can be informed simultaneously or unsimultaneously. As an alternative, instead of broadcasting all MBSFN area IDs included the MBSFN synchronization area, only an MBSFN area ID which each mobile terminal being served by the unicast cell in question or the MBMS/unicast-mixed cell in question can receive actually can be broadcast. In other words, only the ID of an MBSFN area which overlaps the unicast cell in question or the MBMS/unicast-mixed cell in question geographically can be broadcast. As a result, only the MBSFN area ID which each mobile terminal can receive can be used for the MBMS search, and therefore there can be provided an advantage of preventing a control delay time from occurring. In the above-mentioned concrete example, the MBSFN area IDs can be informed as the MBSFN synchronization area identifier (ID). As an alternative, a part of cell IDs used in the unicast/mixed frequency layer can be used as the MBSFN area IDs. A part of physical layer cell identities (Physical Layer cell identities) used in the unicast/mixed frequency layer can be alternatively used as the MBSFN area IDs. f(MBMS) and a region of cell IDs or physical layer identities which can be used for the MBSFN area IDs are informed. f(MBMS) and the above-mentioned region can be informed simultaneously or unsimultaneously.

As an alternative, the above-mentioned region of cell IDs or physical layer identities which can be used for the MBSFN area IDs can be predetermined statically (Static). Because it becomes unnecessary to inform the parameter from the network side to each mobile terminal by using the radio resources, there can be provided an advantage of making effective use of the radio resources, and so on. Furthermore, because no radio resource is used for the transmission, there can also be provided an advantage of preventing receiving errors from occurring. A concrete example of the MBMS search operation will be disclosed hereafter. This example will be explained with reference to FIGS. 17 and 18 shown in Embodiment 2. The unicast cell or the MBMS/unicast-mixed cell, in step ST1707, broadcasts one or more frequencies f(MBMS) to mobile terminals by using a BCCH. The cell broadcasts one or more MBSFN area IDs included in the one or more frequencies f(MBMS) together with the one or more frequencies f(MBMS). The one or more frequencies f(MBMS) and the one or more MBSFN area IDs can be informed simultaneously or unsimultaneously. Each of the mobile terminals, in step ST1708, receives the one or more frequencies f(MBMS) and the one or more MBSFN area IDs included in the one or more frequencies f(MBMS) which are transmitted thereto by using the BCCH from the serving base station. An MBMS dedicated cell, in step ST1723, broadcasts a primary synchronization channel (P-SCH), a secondary synchronization channel (S-SCH), a reference signal (RS (MBMS)), a BCCH to mobile terminals being served thereby. Although the P-SCH can be an added sequence for exclusive use in a frequency layer dedicated to MBMS transmission, which has been debated in the 3GPP, the same P-SCH as that for use in a unicast/mixed frequency layer is used in this concrete example.

The S-SCH is brought into correspondence with an MBSFN area ID. The S-SCH can be uniquely brought into correspondence with an MBSFN area ID. As an alternative, an MBSFN area ID can be identified from a sequence in which the P-SCH and the S-SCH are united. Each of the mobile terminals, in step ST1724, receives the P-SCH, the S-SCH, the RS (MBMS), and the BCCH (a broadcast control channel) from the MBMS dedicated cell. Each of the mobile terminals, in step ST1725, performs a searching operation of searching for an MBMS. Each of the mobile terminals carries out the search operation of searching for an MBMS on the basis of the one or more frequencies f(MBMS) and the one or more MBSFN area IDs included in f(MBMS) which are received from the serving base station. Each of the mobile terminals carries out the search operation of searching for an MBMS on the basis of the MBSFN area ID included in f(MBMS) to which the mobile terminal has switched in step ST1722. Each of the mobile terminals carries out blind detection by using the same P-SCH as that in the unicast/mixed frequency layer instead of the added sequence for exclusive use in the frequency layer dedicated to MBMS transmission which has been debated in the 3GPP. Each of the mobile terminals which has blind-detected the P-SCH can carry out 5 ms-timing detection. Next, each of the mobile terminals carries out blind detection of the S-SCH by using the one or more MBSFN area IDs received in step ST1708.

Each of the mobile terminals which has blind-detected the S-SCH can carry out 10 ms-timing detection. A comparison with the method of adding a sequence for exclusive use in the frequency layer dedicated to MBMS transmission to the P-SCH, which has been debated in the 3GPP, will be made. In accordance with the conventional technology, the number of times that the blind detection of the S-SCH is carried out corresponds to all sequences allocated for MBSFN area IDs. In contrast with this, in accordance with this embodiment, the number of times that the blind detection of the S-SCH is carried out can be made to be equal to the number of MBSFN area IDs received in step ST1708, and therefore can be reduced greatly. For example, in this embodiment, when the number of MBSFN area IDs received in step ST1708 is one, the blind detection of the S-SCH has only to be carried out only once. As a result, there can be provided an advantage of preventing a control delay time from occurring in the mobile communication system. Furthermore, there can be provided an advantage of establishing low power consumption in each mobile terminal. Each of the mobile terminals receives the BCCH by using a scrambling code (Scrambling Code) related to the MBSFN area ID. Because the subsequent processes are the same as those of a concrete example shown in Embodiment 2 and so on, the explanation of the processes will be omitted hereafter.

Next, variant 1 of this Embodiment will be explained. Another concrete example of the search operation will be disclosed hereafter. Each of the mobile terminals acquires prescribed information from an MBSFN area ID, and searches for an MBMS on the basis of the prescribed information (or a specific symbol or sequence). Because the same methods as those mentioned above can be used as a concrete example of the method of informing an MBSFN area ID from a unicast cell, an MBMS/unicast-mixed cell, or a serving cell which is a unicast cell or an MBMS/unicast-mixed cell and a concrete example of how to inform the MBSFN area ID, the explanation of the methods will be omitted. Each of the mobile terminals determines the prescribed information (or the specific symbol or sequence) from the MBSFN area ID. An identical computation expression is used by the network side and the mobile terminal side. As a result, the transmission of the small amount of information which is the MBSFN area ID from the network side to each of the mobile terminals makes it possible for the network side and each of the mobile terminals to acquire the prescribed information common to them. There can be provided an advantage of making effective use of the radio resources. A correspondence between the MBSFN area ID and the prescribed information (or the specific symbol or sequence) can be predetermined statically (Static). Because the transmission of the information from the network side to each mobile terminal can be therefore eliminated, there can be provided an advantage of making effective use of the radio resources. Furthermore, because no radio resource is used for the transmission, there can also be provided an advantage of preventing receiving errors from occurring. Because each of the mobile terminals does not have to determine the prescribed information, there can be provided an advantage of preventing a control delay time from occurring in each of the mobile terminals.

The prescribed information (or the specific symbol or sequence) which is brought into correspondence with the MBSFN area ID can be alternatively transmitted from the serving cell to the mobile terminals being served by the serving cell. Because each of the mobile terminals does not have to determine the prescribed information, there can be provided an advantage of preventing a control delay time from occurring in each of the mobile terminals. A concrete example of how to use the prescribed information will be disclosed hereafter. The MBMS dedicated cell inserts the prescribed information physically, and each of the mobile terminals carries out blind detection by using prescribed information. A concrete example of a method of mapping the prescribed information will be disclosed. The prescribed information is mapped onto a physical channel transmitted via a multi-cell transmission scheme. The prescribed information is mapped as a specific length. The prescribed information is mapped at fixed periods. As a concrete example, the prescribed information is mapped onto each radio frame. Accordingly, each of the mobile terminals can establish frame synchronization. The prescribed information can be mapped onto each subframe. Accordingly, each of the mobile terminals can establish subframe synchronization. The prescribed information can be mapped onto a predetermined frequency. As a concrete example, the prescribed information is mapped onto a number of subcarriers at the center of the system bandwidth. By mapping the prescribed information onto a number of subcarriers at the center of the system bandwidth, there can be provided an advantage of eliminating the necessity for each mobile terminal to know the bandwidth at the time of performing the search operation of searching for an MBMS. A concrete example of the search operation of searching for an MBMS will be disclosed.

The search operation will be explained with reference to FIGS. 17 and 18 of Embodiment 2. The unicast cell or the MBMS/unicast-mixed cell, in step ST1707, broadcasts one or more frequencies f(MBMS) to mobile terminals by using the BCCH. The cell broadcasts one or more MBSFN area IDs included in the one or more frequencies f(MBMS) together with the one or more frequencies f(MBMS). The one or more frequencies f(MBMS) and the one or more MBSFN area IDs can be informed simultaneously or unsimultaneously. Each of the mobile terminals, in step ST1708, receives the one or more frequencies f(MBMS) and the one or more MBSFN area IDs included in the one or more frequencies f(MBMS) which are transmitted thereto by using the BCCH from the serving base station. An MBMS dedicated cell, in step ST1723, determines prescribed information on the basis of the ID of the MBSFN area to which the self-cell belongs. The MBMS dedicated cell broadcasts the prescribed information, a reference signal (RS(MBMS)), and a BCCH to mobile terminals being served thereby. As a concrete example of a method of transmitting the prescribed information, the above-mentioned method can be used. In this case, as a concrete example, the prescribed information is broadcast with a number of subcarriers at the center of the system bandwidth every radio frame. The number of subcarriers can be determined statically (Static), or can be informed from the network side. In a case in which the MBMS dedicated cell belongs to a plurality of MBSFN areas, the MBMS dedicated cell can transmit the pieces of prescribed information corresponding to the MBSFN areas which the MBMS dedicated cell belongs in order. As a concrete example, the MBMS dedicated cell can transmit the plural pieces of prescribed information corresponding to the plurality of MBSFN areas by using TDM or CDM.

Each of the mobile terminals, in step ST1724, receives the prescribed information, the RS(MBMS) and the BCCH (broadcast control channel) from the MBMS dedicated cell. Each of the mobile terminals, in step ST1725, carries out the search operation of searching for an MBMS. Each of the mobile terminals carries out the search operation of searching for an MBMS on the basis of the one or more frequencies f(MBMS) and the one or more MBSFN area IDs included in f(MBMS) which are received from the serving base station. Each of the mobile terminals carries out the search operation of searching for an MBMS on the basis of the MBSFN area ID included in f(MBMS) to which the mobile terminal has switched in step ST1722. Each of the mobile terminals determines prescribed information on the basis of the MBSFN area ID. Each of the mobile terminals carries out blind detection with the prescribed information. Each of the mobile terminals carries out blind detection with a number of subcarriers at the center of the system bandwidth. Accordingly, each of the mobile terminals can establish radio frame synchronization. Each of the mobile terminals receives the BCCH by using a scrambling code (Scrambling Code) related to the MBSFN area ID. Because the subsequent processes are the same as those of a concrete example shown in Embodiment 2 and so on, the explanation of the processes will be omitted hereafter. This method can eliminate the transmission of the P-SCH and the S-SCH from the MBMS dedicated cell. As a result, there can be provided an advantage of making effective use of the radio resources.

Next, variant 2 of this embodiment will be explained. Another concrete example of the search operation will be disclosed hereafter. Each of the mobile terminals acquires prescribed information from an MBSFN area ID, and searches for an MBMS on the basis of the prescribed information (or a specific symbol or a sequence). Because the same methods as those mentioned above can be used as a concrete example of the method of informing an MBSFN area ID from a unicast cell, an MBMS/unicast-mixed cell, or a serving cell which is a unicast cell or an MBMS/unicast-mixed cell, a concrete example of how to inform the MBSFN area ID, and the method of acquiring the prescribed information, the explanation of the methods will be omitted. A concrete example of how to use the prescribed information will be disclosed hereafter. The MBMS dedicated cell multiplies certain information by the prescribed information, and each of the mobile terminals carries out blind detection by using the prescribed information. The MBMS dedicated cell performs scrambling on certain information by using the prescribed information, and each of the mobile terminals carries out blind detection by using the prescribed information. As a concrete example of the certain information, the P-SCH, the S-SCH, or the like can be provided. The MBMS dedicated cell can perform the scrambling on the certain information at fixed periods. As a concrete example of the length of each of the fixed periods, a number of radio frames or subframes or the like can be provided. The MBMS dedicated cell can alternatively perform spreading on certain information by using the prescribed information, and each of the mobile terminals can carry out blind detection by using the prescribed information. As a concrete example of the certain information, the P-SCH, the S-SCH, or the like can be provided. The MBMS dedicated cell can perform the spreading on the certain information at fixed periods. As a concrete example of the length of each of the fixed periods, a number of radio frames or subframes or the like can be provided. This method can eliminate the transmission of the P-SCH and the S-SCH from the MBMS dedicated cell. As a result, there can be provided an advantage of making effective use of the radio resources.

Embodiment 27

In each of a unicast cell and an MBMS/unicast-mixed cell, system information is mapped onto a broadcast control channel (BCCH) which is a logical channel, and the broadcast control channel is mapped onto a downlink shared channel (DL-SCH) which is a transport channel and the downlink shared channel is further mapped onto a physical downlink shared channel (PDSCH) which is a physical channel, so that the system information is informed to mobile terminals. In contrast, it is unknown whether a PDSCH exists in a physical channel of an MBMS dedicated cell. A problem is therefore that any method of transmitting system information from an MBMS dedicated cell to mobile terminals being served by the MBMS dedicated cell is not established. In each of a unicast cell and an MBMS/unicast-mixed cell, the system information is specific to the cell. In contrast, an MBMS dedicated cell needs multi-cell transmission in an MBSFN area. Therefore, it is impossible to apply a method of transmitting the system information in each of a unicast cell and an MBMS/unicast-mixed cell, the system information being specific to the cell, to an MBMS dedicated cell which needs multi-cell transmission, just as it is. A solution of the above-mentioned problem will be disclosed hereafter. An MBMS dedicated cell maps the system information onto a PMCH to transmit the system information to mobile terminals being served thereby. At that time, the MBMS dedicated cell can map the system information as an information element of an MCCH or an MTCH, or can map the system information physically. In the case of mapping the system information physically, the MBMS dedicated cell needs to map the system information onto a physical resource in the PMCH which is identified in common by the network side and the UE side. A method of informing a parameter regarding the physical resource which is identified in common by the network side and the UE side will be disclosed hereafter.

The MBMS dedicated cell broadcasts the parameter regarding the physical resource which is identified in common. The parameter regarding the physical resource which is identified in common is mapped onto a broadcast control channel (BCCH) which is a logical channel, and the broadcast control channel is mapped onto a broadcast channel (BCH) which is a transport channel and the broadcast channel is further mapped onto a physical broadcast channel (PBCH) which is a physical channel to inform the parameter to mobile terminals. As an alternative, the parameter regarding the physical resource which is identified in common can be mapped onto master information and the master information can be mapped onto a master information block (MIB), the master information block can be mapped onto the broadcast control channel (BCCH) which is a logical channel, and the broadcast control channel can be mapped onto the broadcast channel (BCH) which is a transport channel and the broadcast channel can be further mapped onto the physical broadcast channel (PBCH) which is a physical channel to inform the parameter to the mobile terminals.

As another informing method, the unicast cell or the MBMS/unicast-mixed cell broadcasts or informs the parameter regarding the physical resource which is identified in common. The parameter regarding the physical resource which is identified in common is mapped onto a broadcast control channel (BCCH) which is a logical channel, and the broadcast control channel is mapped onto a broadcast channel (BCH) which is a transport channel and the broadcast channel is further mapped onto a physical broadcast channel (PBCH) which is a physical channel to inform the parameter to mobile terminals. As an alternative, the parameter regarding the physical resource which is identified in common can be mapped onto master information and the master information can be mapped onto a master information block (MIB), the master information block can be mapped onto the broadcast control channel (BCCH) which is a logical channel, and the broadcast control channel can be mapped onto the broadcast channel (BCH) which is a transport channel and the broadcast channel can be further mapped onto the physical broadcast channel (PBCH) which is a physical channel to inform the parameter to the mobile terminals.

As an alternative, the parameter regarding the physical resource which is identified in common can be mapped onto the broadcast control channel (BCCH) which is a logical channel, and the broadcast control channel can be mapped onto a downlink shared channel (DL-SCH) which is a transport channel and the downlink shared channel can be further mapped onto a physical downlink shared channel (PDSCH) which is a physical channel to inform the parameter to the mobile terminals. The parameter regarding the physical resource which is identified in common can be alternatively mapped onto system information and the system information can be mapped onto a system information block (SIB), the system information block can be mapped onto the broadcast control channel (BCCH) which is a logical channel, and the broadcast control channel can be mapped onto the downlink shared channel (DL-SCH) which is a transport channel and the downlink shared channel can be further mapped onto the physical downlink shared channel (PDSCH) which is a physical channel to inform the parameter to the mobile terminals. As an alternative, the parameter regarding the physical resource which is identified in common can be mapped onto a common control channel (CCCH), a dedicated control channel (DCCH), a multicast control channel (MCCH) or a multicast traffic channel (MTCH), which is a logical channel, and this logical channel can be mapped onto the downlink shared channel (DL-SCH) which is a transport channel and the downlink shared channel can be further mapped onto the physical downlink shared channel (PDSCH) which is a physical channel to inform the parameter to the mobile terminals.

As an another method, instead of informing the parameter regarding the physical resource which is identified in common, the parameter regarding the physical resource which is identified in common is predetermined statically (Static). Because it becomes unnecessary to inform the parameter from the network side to each mobile terminal by using the radio resources, there can be provided an advantage of making effective use of the radio resources, and so on. Furthermore, because no radio resource is used for the transmission, there can also be provided an advantage of preventing receiving errors from occurring. As an another method, instead of informing the parameter regarding the physical resource which is identified in common, the base station maps prescribed information (or a symbol) onto a physical radio resource of a part of the PMCH. Accordingly, each mobile terminal detects the physical resource onto which the system information is mapped by carrying out blind detection of the physical radio resource with the prescribed information (or a symbol). Because the position of the mapping of the physical resource can be changed without informing the parameter from the network side to each mobile terminal, there can be provided an advantage of being able to use the radio resources with a high degree of flexibility.

Next, a concrete example of a method of, in the case in which the system information is mapped physically, multiplexing an area of the PMCH onto which the system information is mapped and an area of the PMCH onto which the system information is not mapped will be disclosed hereafter. Time division multiplexing (TDM) of the area of the PMCH onto which the system information is mapped and the area of the PMCH onto which the system information is not mapped is carried out. In this case, as a concrete example of the parameter regarding the physical resource which is identified in common, there can be considered a starting point (as a concrete example, SFN, a subframe number, or a symbol number), a period length (as a concrete example, a number of radio frames, a number of subframes, or a number of symbols), etc. As a concrete example of the multiplexing, the system information can be mapped onto the leading two OFDM symbols of each subframe of the physical resource allocated to the PMCH. As another multiplexing method, frequency division multiplexing (FDM) of the area of the PMCH onto which the system information is mapped and the area of the PMCH onto which the system information is not mapped can be carried out. In this case, as a concrete example of the parameter regarding the physical resource which is identified in common, there can be considered a frequency, a bandwidth, etc. As a concrete example of the multiplexing, the system information can be mapped onto a number of subcarriers at the center of the physical resource allocated to the PMCH. As an alternative, the system information can be mapped onto a number of subcarriers at an end of the physical resource allocated to the PMCH. As another multiplexing method, code division multiplexing (CDM) of the area of the PMCH onto which the system information is mapped and the area of the PMCH onto which the system information is not mapped can be carried out. In this case, as a concrete example of the parameter regarding the physical resource which is identified in common, there can be considered a spreading code, a scrambling code, etc. As a concrete example of the multiplexing, the area of the PMCH onto which the system information is mapped and the area of the PMCH onto which the system information is not mapped can be multiplied by scrambling codes respectively. As an alternative, only one of the areas can be multiplied by a scrambling code.

As another solution, the MBMS dedicated cell maps the system information onto master information to transmit the system information to mobile terminals being served thereby. At that time, the MBMS dedicated cell can map the system information as an information element of the master information, or can map the system information physically. In the case of mapping the system information physically, the MBMS dedicated cell needs to map the system information onto a physical resource which is identified in common by the network side and the UE side. The above-mentioned method disclosed for the case of mapping the parameter onto the PMCH to inform the parameter can be used as a method of informing the parameter regarding the physical resource which is identified in common by the network side and the UE side. Furthermore, as a concrete example of a method of, in the case in which the system information is mapped physically, multiplexing an area of the master information onto which the system information is mapped and an area of the master information onto which the system information is not mapped, the above-mentioned method disclosed for the case of mapping the areas onto the PMCH to transmit the system information.

As another solution, a new channel is disposed, and the MBMS dedicated cell maps the system information onto the above-mentioned new channel to transmit the system information to mobile terminals being served thereby. The new channel is transmitted via a multi-cell transmission scheme. Accordingly, there can be provided an advantage of making it possible for each mobile terminal to carry out SFN combining, thereby improving the reception quality of the system information by each mobile terminal. The new channel can exist in an MBSFN subframe. In the new channel, it is necessary to map the system information onto a physical resource different from the PMCH which is identified in common by the network side and the UE side. The above-mentioned method disclosed for the case of mapping the parameter onto the PMCH to inform the parameter can be used as a method of informing the parameter regarding the physical resource which is identified in common by the network side and the UE side. Furthermore, as a concrete example of a method of, in the case in which the system information is mapped physically, multiplexing an area onto which the system information is mapped and an area onto which the system information is not mapped, the above-mentioned method disclosed for the case of mapping the areas onto the PMCH to transmit the system information. The above-mentioned new channel will be referred to as a control channel (PMCCH) for physical multi-transmission from here on.

As the PMCCH, the same physical resource as that used by each of a unicast cell and an MBMS/unicast-mixed cell when transmitting an L1/L2 control signal can be used. The physical channel of the MBMS dedicated cell can be made to be similar to that of each of the unicast cell and the MBMS/unicast-mixed cell, and there can be provided an advantage of being able to avoid the complexity of the mobile communication system. As a concrete example, the MBMS dedicated cell transmits the PMCCH in each subframe. As an alternative, the MBMS dedicated cell can transmit the PMCCH with the leading one to three OFDM symbols of each subframe. The MBMS dedicated cell can alternatively transmit the PMCCH with the leading one or two OFDM symbols of each subframe. The MBMS dedicated cell can multiply each information mapped onto the PMCCH by an identifier specific to the type of the information. As a concrete example, a case in which the MBMS dedicated cell transmits the system information and other control information by using the PMCCH will be considered. The MBMS dedicated cell multiplies the system information by an identifier for the system information and also multiplies the other control information by an identifier for the other control information, and then transmits them by using the PMCCH. A mobile terminal which needs to receive the system information, among the mobile terminals being served by the MBMS dedicated cell, carries out blind detection by using the identifier for the system information. Furthermore, a mobile terminal which needs to receive the other control information, among the mobile terminals being served by the MBMS dedicated cell, carries out blind detection by using the identifier for the other control information. As a result, there can be provided an advantage of enabling such a mobile terminal to receive required information when the mobile terminal requires the information. Accordingly, there can be provided an advantage of reducing the power consumption of the mobile terminal. There can be provided a further advantage of preventing a control delay time from occurring in the mobile terminal. The above-mentioned method of informing the parameter regarding the physical resource which is identified in common which is disclosed for the case of mapping the parameter onto the PMCH to inform the parameter can be used as a method of informing the identifier for each of the information types. Furthermore, the method of informing the identifier for each of these information types is not limited this embodiment, and can be applied to a case of using an identifier for each information type.

Information mapped onto an L1/L2 control signal in each of the unicast cell and the MBMS/unicast-mixed cell is multiplied by an identifier of the mobile terminal which is the destination to which the information is to be transmitted. A mobile terminal which needs to receive the L1/L2 control signal, among mobile terminals being served by each of the unicast cell and the MBMS/unicast-mixed cell, carries out blind detection by using the identifier of the mobile terminal. As a result, the mobile terminal acquires the necessary information from the L1/L2 control signal. On the other hand, it has been examined that no uplink channel exists in the MBMS dedicated cell. Therefore, the MBMS dedicated cell has no independent function of getting to know which mobile terminal belongs thereto as a mobile terminal being served thereby. Accordingly, there arises a problem that it is impossible to multiply the information which the MBMS dedicated cell maps onto the PMCCH by an identifier of a mobile terminal. Therefore, there arises a problem that each mobile terminal cannot acquire the necessary information by carrying out blind detection of the PMCCH by using the identifier of the mobile terminal.

A solution of this problem will be disclosed hereafter. The MBMS dedicated cell gets to know which mobile terminal belongs to the MBMS dedicated cell, an MBSFN area, or an MBSFN synchronization area as a mobile terminal being served by the MBMS dedicated cell, the MBSFN area, or the MBSFN synchronization area, and multiplies the information mapped onto the PMCCH by the identifier of a mobile terminal specified thereby. As a concrete example of how to get to know which mobile terminal belongs to the MBMS dedicated cell, an MBSFN area, or an MBSFN synchronization area as a mobile terminal being served by the MBMS dedicated cell, the MBSFN area, or the MBSFN synchronization area, an MBMS receiving state notification method, as described in Embodiment 2 and so on, which a mobile terminal uses to notify an MBMS receiving state to a serving cell in a unicast cell or an MBMS/unicast-mixed cell is used. The system information transmitted from the MBMS dedicated cell to mobile terminals being served by the MBMS dedicated cell, the MBSFN area, or the MBSFN synchronization area by using either one of the above-mentioned methods can be repeatedly broadcast at fixed periods. As an alternative, a part of the system information can be repeatedly broadcast at fixed periods. Master information (MIB) can be alternatively transmitted from the MBMS dedicated cell to mobile terminals being served by the MBMS dedicated cell, the MBSFN area, or the MBSFN synchronization area by using either one of the above-mentioned methods. By either one of the above-mentioned methods, there can be provided an advantage of establishing the method of transmitting the system information from the MBMS dedicated cell to mobile terminals being served by the MBMS dedicated cell, the MBSFN area, or the MBSFN synchronization area. Also in this embodiment, like in the case of Embodiment 2, the method of including, as identifiers of each mobile terminal, a mobile terminal identifier used in a unicast/mixed frequency layer and a mobile terminal identifier used in a frequency layer dedicated to MBSFN transmission can be used.

Next, variant 1 of this embodiment will be explained. MCCH scheduling of the MBMS dedicated cell, as described in Embodiment 2 and so on, can be informed from the MBMS dedicated cell to mobile terminals being served by the MBMS dedicated cell by using the above-mentioned method. The MCCH scheduling of the MBMS dedicated cell can be alternatively mapped onto broadcast information (BCCH) of the MBMS dedicated cell, and can be informed from the MBMS dedicated cell to the mobile terminals being served by the MBMS dedicated cell by using the above-mentioned method. The MCCH scheduling of the MBMS dedicated cell can be alternatively mapped onto the system information of the MBMS dedicated cell, and can be informed from the MBMS dedicated cell to the mobile terminals being served by the MBMS dedicated cell by using the above-mentioned method. The MCCH scheduling of the MBMS dedicated cell can be alternatively mapped onto SIB2 of the MBMS dedicated cell, and can be informed from the MBMS dedicated cell to the mobile terminals being served by the MBMS dedicated cell by using the above-mentioned method. The MCCH scheduling of the MBMS dedicated cell can be alternatively mapped onto MIB of the MBMS dedicated cell, and can be informed from the MBMS dedicated cell to the mobile terminals being served by the MBMS dedicated cell by using the above-mentioned method. As a result, there can be provided an advantage of establishing the method of transmitting the MCCH scheduling from the MBMS dedicated cell to the mobile terminals being served by the MBMS dedicated cell.

Embodiment 28

It is described in nonpatent reference 6 (Chapter 6.10.2.1) that when determining the start position of OFDM symbols for a cell-specific reference signal (Reference signal), i.e., the start position of mapping, a cell ID (N cell ID) is used. An N cell ID is defined as a physical layer cell identity (Physical Layer cell identity). On the other hand, the reference has a description about an MBSFN reference signal (MBSFN reference signal) in an MBSFN subframe. It is also described that an MBSFN area ID (N MBSFN ID) is used when determining the start position of OFDM symbols for a reference signal, i.e., the start position of mapping. Furthermore, it is described in nonpatent reference 7 (Chapter 5.2.2.9) that a base station informs a setting of MBSFN subframes to mobile terminals being served thereby with a system information block 2 (SIB2) in system information included in broadcast information. In contrast, this reference does not have any description about an MBSFN area ID. The following problems arise in the conventional technology.

Each mobile terminal cannot grasp the symbol position of an MBSFN reference signal in an MBSFN subframe at the time when it has received the broadcast information of a serving cell. This is because an MBSFN area ID is needed for the determination of the start position of OFDM symbols of the MBSFN reference signal. That is, in order for each mobile terminal to grasp the position of the reference signal in the MBSFN subframe, the use of only a conventional cell ID is not enough and an MBSFN area ID specific to the MBSFN subframe is needed. Therefore, this problem is specific to MBSFN. This results in a problem that each mobile terminal cannot carry out a correct measurement of the quality of reception by using the MBSFN reference signal in the MBSFN subframe at the time when it has received the broadcast information of the serving cell. This problem is specific to a mobile communication system having MBSFN subframes. In other words, the problem is specific to a mobile communication system having a time period during which multi-cell transmission is carried out. Therefore, the problem is the newly-arising one which has not arisen in conventional mobile communication systems.

Furthermore, there arises another problem as will be mentioned below. MBMS data are transmitted with a radio resource excluding the MBSFN reference signal in the MBSFN subframe. Therefore, each mobile terminal cannot grasp an OFDM symbol used for the transmission of the MBMS data (an MCCH and an MTCH) with the MBSFN subframe at the time when it has received the broadcast information of the serving cell. Therefore, there arises a problem that each mobile terminal cannot receive an MBMS service with MBSFN subframes at the time when it has received the broadcast information of the serving cell.

A solution of the above-mentioned problem will be disclosed hereafter. A base station informs an MBSFN area ID with broadcast information to mobile terminals being served thereby. As a concrete example of the base station, a unicast cell or an MBMS/unicast-mixed cell can be provided. This method can also be applied to an MBMS dedicated cell. As a concrete example of the MBSFN area ID, the ID of an MBSFN area to which the self-cell belongs can be provided.

In a case in which the self-cell belongs to a plurality of MBSFN areas, a plurality of MBSFN area IDs can be transmitted to mobile terminals being served by the cell. As a concrete example of the transmission, the MBSFN area ID of the self-cell can be mapped onto a broadcast control channel (BCCH) which is a logical channel, and the broadcast control channel is mapped onto a broadcast channel (BCH) which is a transport channel and the broadcast channel is further mapped onto a physical broadcast channel (PBCH) which is a physical channel to transmit the MBSFN area ID of the self-cell to the mobile terminals. As an alternative, the MBSFN area ID of the self-cell can be mapped onto master information and the master information can be mapped onto a master information block (MIB), the master information block can be mapped onto the broadcast control channel (BCCH) which is a logical channel, and the broadcast control channel can be mapped onto the broadcast channel (BCH) which is a transport channel and the broadcast channel can be further mapped onto the physical broadcast channel (PBCH) which is a physical channel to transmit the MBSFN area ID of the self-cell to the mobile terminals. The information mapped on the physical broadcast channel is received by all the mobile terminals being served by the serving cell before each of the mobile terminals camps on the serving cell, or at an earlier time after each of the mobile terminals camps on the serving cell. Therefore, this solution can provide an advantage of being able to start a correct measurement of the quality of reception using the MBSFN reference signal in the MBSFN subframe, and reception of an MBMS service with MBSFN subframes at an earlier time. That is, there can be provided an advantage of preventing a control delay time from occurring.

Another solution will be disclosed hereafter. A base station informs an MBSFN area ID with broadcast information to mobile terminals being served thereby. As a concrete example of the base station, a unicast cell or an MBMS/unicast-mixed cell can be provided. This method can also be applied to an MBMS dedicated cell. As a concrete example of the MBSFN area ID, the ID of an MBSFN area to which the self-cell belongs can be provided. In a case in which the self-cell belongs to a plurality of MBSFN areas, a plurality of MBSFN area IDs can be transmitted to mobile terminals being served by the cell. As a concrete example of the transmission, the MBSFN area ID of the self-cell can be mapped onto a broadcast control channel (BCCH) which is a logical channel, and the broadcast control channel is mapped onto a downlink shared channel (DL-SCH) which is a transport channel and the downlink shared channel can be further mapped onto a physical downlink shared channel (PDSCH) which is a physical channel to transmit the MBSFN area ID of the self-cell to the mobile terminals. As an alternative, the MBSFN area ID of the self-cell can be mapped onto system information and the system information can be mapped onto a system information block (SIB), the system information block can be mapped onto the broadcast control channel (BCCH) which is a logical channel, and the broadcast control channel can be mapped onto the downlink shared channel (DL-SCH) which is a transport channel and the downlink shared channel can be further mapped onto the physical downlink shared channel (PDSCH) which is a physical channel to transmit the MBSFN area ID of the self-cell to the mobile terminals. As an alternative, the MBSFN area ID of the self-cell can be mapped onto SIB2 in a system information block and the SIB2 can be mapped onto the broadcast control channel (BCCH) which is a logical channel, and the broadcast control channel can be mapped onto the downlink shared channel (DL-SCH) which is a transport channel and the downlink shared channel can be further mapped onto the physical downlink shared channel (PDSCH) which is a physical channel to transmit the MBSFN area ID of the self-cell to the mobile terminals.

This solution can provide the following advantages. The setting of MBSFN subframes is broadcast by using the SIB2 as mentioned above. Therefore, each mobile terminal becomes able to acquire the "setting of MBSFN subframes" and the "MBSFN area ID" which are the information required for a correct measurement of the quality of reception using the MBSFN reference signal in the MBSFN subframe through the reception of the same system information block. Accordingly, there can be provided an advantage of being able to avoid the complexity of the measurement operation of correctly measuring the quality of reception using the MBSFN reference signal in the MBSFN subframe which is performed by each mobile terminal. This results in another advantage of preventing a control delay time from occurring. Furthermore, each mobile terminal becomes able to acquire the "setting of MBSFN subframes" and the "MBSFN area ID" which are the information required for the reception of MBMS data with MBSFN subframes through the reception of the same system information block. Accordingly, there can be provided an advantage of being able to avoid the complexity of the operation of receiving MBMS data with MBSFN subframes which is performed by each mobile terminal. This results in another advantage of preventing a control delay time from occurring.

Another solution will be disclosed hereafter. A base station informs an MBSFN area ID with broadcast information to mobile terminals being served thereby. As a concrete example of the base station, a unicast cell or an MBMS/unicast-mixed cell can be provided. This method can also be applied to an MBMS dedicated cell. As a concrete example of the MBSFN area ID, the ID of an MBSFN area to which the self-cell belongs can be provided. In a case in which the self-cell belongs to a plurality of MBSFN areas, a plurality of MBSFN area IDs can be transmitted to mobile terminals being served by the cell. As a concrete example of the transmission, the MBSFN area ID of the self-cell can be mapped onto a common control channel (CCCH) or a dedicated control channel which is a logical channel, and the common control channel or dedicated control channel is mapped onto a downlink shared channel (DL-SCH) which is a transport channel and the downlink shared channel can be further mapped onto a physical downlink shared channel (PDSCH) which is a physical channel to transmit the MBSFN area ID of the self-cell to the mobile terminals. This solution can provide an advantage of being able to carry out a correct measurement of the quality of reception using the MBSFN reference signal in the MBSFN subframe, and reception of an MBMS service with MBSFN subframes while providing control featuring high flexibility for the mobile communication system.

Embodiment 29

Figure 102:
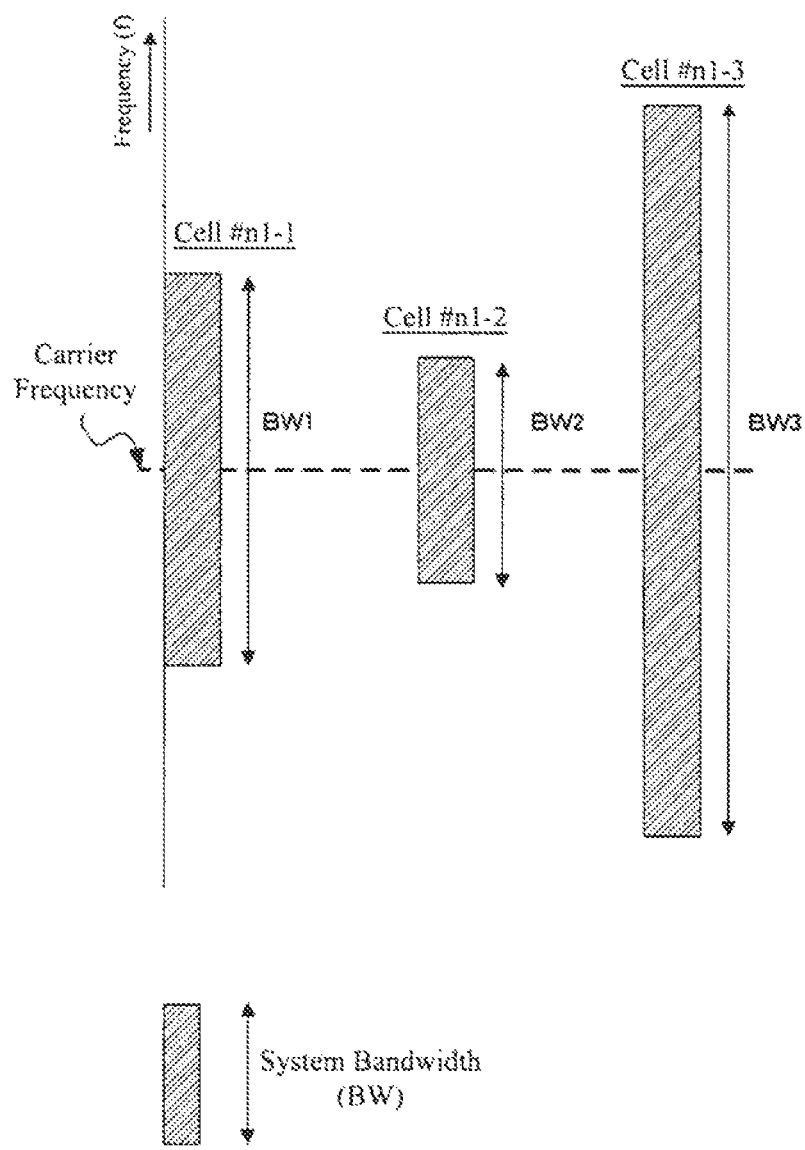
FIG. 102 is a view explaining a system bandwidth of each cell in an MBSFN area.

In a case in which the system bandwidth of a cell in a frequency layer dedicated to MBMS is broadcast from an MBMS dedicated cell, the system bandwidth has to be transmitted via a multi-cell transmission scheme because multi-cell transmission has to be carried out in the MBMS dedicated cell in an MBSFN area. Therefore, there arises a problem that in MBMS dedicated cells in an MBSFN area, their system bandwidths have to be the same as one another. In order to solve the above-mentioned problem, in this embodiment, a cell which carries out multi-cell transmission broadcasts the widest one of system bandwidths to mobile terminals being served thereby by using broadcast information. A concrete example will be shown. All cells in an MBSFN area broadcasts the same system bandwidth by using broadcast information. In this case, the same system bandwidth broadcast is the widest one of the system bandwidths of the cells in the MBSFN area. The system bandwidth information is mapped onto MIB as system information, and is broadcast by using a PBCH. An example of the system bandwidth of each cell in an MBSFN area is shown in FIG. 102. Cells #n1-1 to #n1-3 are assumed to exist in the same MBSFN area. It is assumed that the cell #n1-1 has a system bandwidth BW1, the cell #n1-2 has a system bandwidth BW2, and the cell #n1-3 has a system bandwidth BW3. The carrier frequencies of the cells are the same as one another. The system bandwidths of the cells in the MBSFN area are set in this way. In this case, because the widest one of the system bandwidths of the cells in the MBSFN area is BW3, BW3 is transmitted, as the system bandwidth information, from all the cells in the MBSFN area to mobile terminals being served by the cells.

Figure 103:
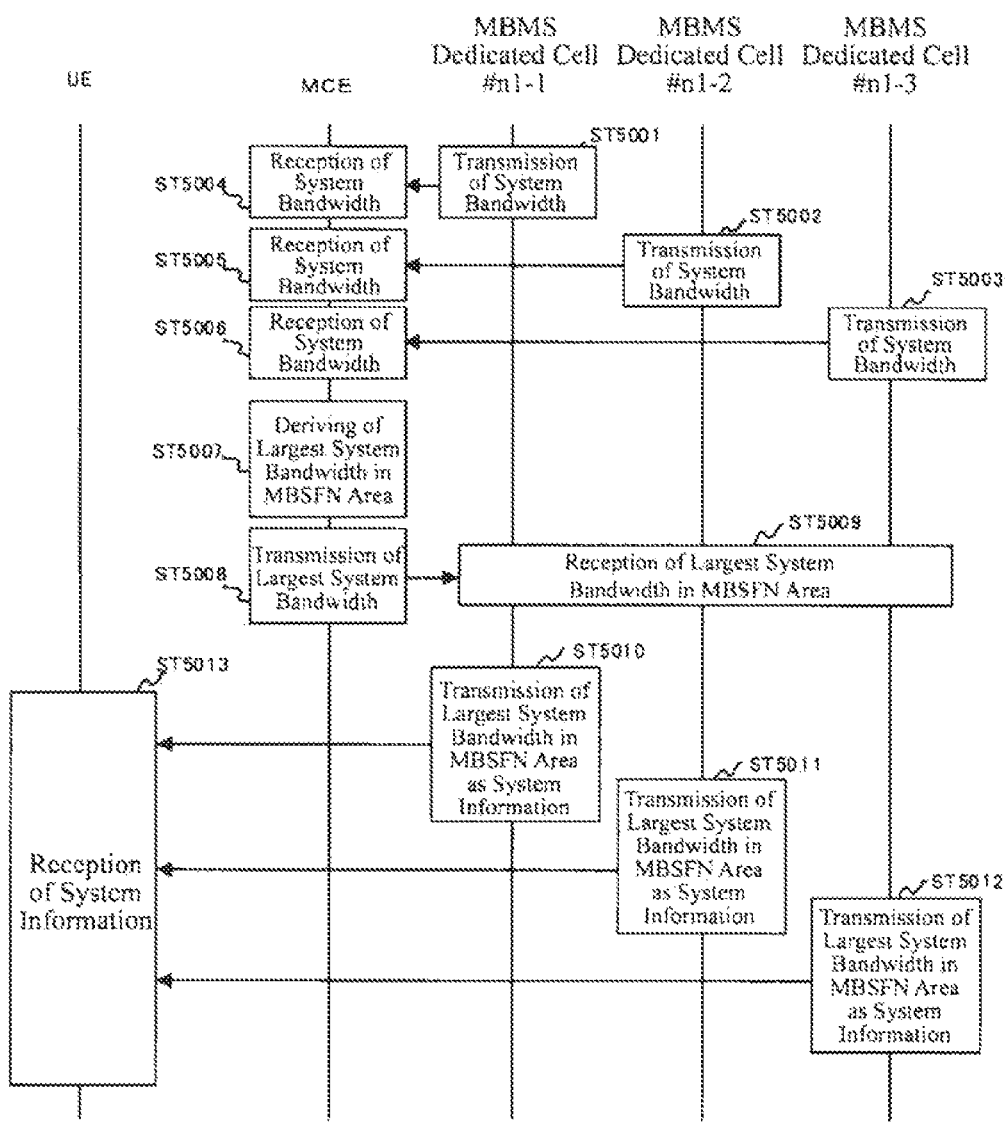
FIG. 103 is a view explaining a method of broadcasting a system bandwidth from each cell to mobile terminals being served by the cell.

The widest one of the system bandwidths of the cells in the MBSFN area is determined by, for example, an MCE which manages the cells in the MBSFN area, and the MCE informs the widest system bandwidth to each of the cells in the MBSFN area. The MCE has only to acquire the system bandwidth information about each of all the cells in the MBSFN area in advance. When each of the cells is installed in the MBSFN area, the system bandwidth information about the cell can be stored in the MCE. As an alternative, each of the cells in the MBSFN area can transmit the system bandwidth information about the self-cell to the MCE in advance, and the MCE can determine the widest one of the system bandwidths of the cells in the MBSFN area. When each of the cells is installed in the MBSFN area, the system bandwidth information about the cell can be transmitted to the MCE. An example of a method of broadcasting the system bandwidth from each cell to mobile terminals being served by the cell in this case is shown in FIG. 103. In this figure, a method of transmitting the system bandwidth information about each cell in the MBSFN area from the cell to the MCE in advance, and making the MCE determine the widest one of the system bandwidths of the cells in the MBSFN area is shown. Each of the MBMS dedicated cells #n1-1, #n1-2 and #n1-3 in the MBSFN area, in steps ST5001, ST5002, and ST5003, transmits the system bandwidth information about the self-cell to the MCE. The MCE which, in steps ST5004, ST5005, and ST5006, receives the system bandwidth information from each of all the cells in the MBSFN area, in step ST5007, derives the widest one of the system bandwidths in this MBSFN area on the basis of the above-mentioned system bandwidth information. The MCE, in step ST5008, transmits the widest system bandwidth information derived in the MBSFN area to all the cells in the MBSFN area. Each of the cells which, in step ST5009, receives the widest system bandwidth information in the MBSFN area, insteps ST5010, ST5011, and ST5012, broadcasts, as system information from each of the cells, the widest system bandwidth information in the MBSFN area to the mobile terminals being served thereby.

Each of the mobile terminals which, in step ST5013, receives the system bandwidth information carries out reception at this system bandwidth. Each of the mobile terminals performs SFN combining on a signal transmitted from an MBMS dedicated cell in the MBSFN area when receiving this signal because it is transmitted via an MC transmission scheme. Therefore, even if the system bandwidths of the cells in the MBSFN area differ from one another, each of the mobile terminals becomes able to perform SFN combining on a transmission signal from each cell in the MBSFN area because each mobile terminal is made to receive the transmission signal at the widest system bandwidth in the MBSFN area. For example, in the example of FIG. 102, when receiving a transmission signal having the bandwidth BW2, each of the mobile terminals performs SFN combining of transmission signals from the cells #n1-1, #n1-2, and #n1-3, when receiving a transmission signal having the bandwidth BW1, each of the mobile terminals performs SFN combining of transmission signals from the cells #n1-1 and #n1-3, and when receiving a transmission signal having the bandwidth BW3, each of the mobile terminals performs SFN combining of only a transmission signal from the cell #n1-3. For example, in an LTE system, because a frequency band at the center in the system band is used for an SCH for synchronization establishment or a PBCH for broadcast information transmission in each cell, the frequency band is informed in common from all the cells. The cells can be arranged in such a way that for example, the cell having the widest system bandwidth is arranged as a macro cell having a wide coverage area, and the other cells having narrower system bandwidths (e.g., a micro cell, a pico cell, a femto cell, a home base station, and so on) are arranged in adjacent areas of the above-mentioned macro cell. In accordance with a method of using frequencies in the MBSFN area, for example, bandwidths at both ends (e.g., BW3 and BW1) can be allocated to mobile terminals existing in the vicinity of the macro cell, and a bandwidth in the middle (e.g., BW1 or BW2) can be allocated to mobile terminals each existing in the vicinity of a narrow-band cell at a distant from the macro cell. By using this method configured in this way, because the SFN gain of a mobile terminal existing in the vicinity of the macro cell can be improved, the quality of reception of the mobile terminal can be improved.

By using the method disclosed in this embodiment, there is no necessity to make the system bandwidths of all cells which construct an MBSFN area be the same as one another, and therefore the system bandwidths of all the cells can be made to differ from one another. Therefore, because each cell can be arranged with flexibility and flexible arrangement of cells having different system bandwidths can improve the SFN gain of each mobile terminal, there is provided an advantage of improving the communication quality of the system. These methods can be applied also to a home base station or the like which is placed in a macro cell. In above-mentioned embodiment, cells in an MBSFN area are shown as a concrete example. However, this embodiment is not limited to cells in an MBSFN area, and can be applied to cells each of which carries out multi-cell (MC) transmission.

The invention claimed is:

1. A communication system which uses an orthogonal frequency division multiplexing (OFDM) method as a downlink access method from a base station to a mobile terminal and uses a single carrier-frequency division multiple access (SC-FDMA) method as an uplink access method from the mobile terminal to the base station, the base station and mobile terminal being included in the communication system, the communication system comprising:
   a plurality of multimedia broadcast multicast service single frequency network (MBSFN} areas each configured to provide multimedia broadcast multicast service (MBMS) on a single frequency, each MBSFN area including multiple cells,
   wherein the base station belongs to the plurality of MBSFN areas and is configured to transmit each MBSFN area identification (ID) of the plurality of MBSFN areas by a broadcast control channel (BCCH),
   the mobile terminal is configured to receive each MBSFN area ID of the plurality of MBSFN areas by the BCCH; and wherein each of a multicast control channel (MCCH) and a multicast traffic channel (MTCH) for each of the plurality of the MBSFN areas is multiplied by a scrambling code related to each MBSFN area ID of the plurality of MBSFN areas.

2. A base station used in a communication system which provides multimedia broadcast multicast service (MBMS), wherein
 the base station is configured to belong to a plurality of multimedia broadcast multicast service single frequency network (MBSFN) areas in each of which the MBMS is provided on a single frequency, each of the MBSFN areas including multiple cells,
 wherein the base station is adapted to transmit each MBSFN area identification (ID) of the plurality of MBSFN areas by a broadcast control channel (BCCH), and
 wherein each of a multicast control channel (MCCH} and a multicast traffic channel (MTCH} for each of the plurality of the MBSFN areas is multiplied by a scrambling code related to each MBSFN area ID of the plurality of MBSFN areas.

3. A mobile terminal used in a communication system which provides multimedia broadcast multicast service (MBMS), wherein
 the mobile terminal is configured to receive each multimedia broadcast multicast service single frequency network (MBSFN) area identification (ID) of a plurality of MBSFN areas that each include multiple cells by a broadcast control channel (BCCH) transmitted from a base station belonging to the plurality of MBSFN areas in each of which the MBMS is provided on a single frequency, and
 wherein each of a multicast control channel (MCCH) and a multicast traffic channel (MTCH) for each of the plurality of the MBSFN areas is multiplied by a scrambling code related to each MBSFN area ID of the plurality of MBSFN areas.

\* \* \* \* \*